United States Patent [19]

Piasecki et al.

[11] Patent Number: 4,523,309

[45] Date of Patent: Jun. 11, 1985

[54] TIME ASSIGNMENT SPEECH INTERPOLATION APPARATUS

[75] Inventors: Joshua Piasecki, Ramat-Gan; Reuven Zelinkovsky, Moshav Beit Yehoshua; Aharon Segev, Kiryat Ono; Teodor Henquin, Tel-Aviv, all of Israel

[73] Assignee: Electronics Corporation of Israel, Ltd., Tel-Aviv, Israel

[21] Appl. No.: 100,270

[22] Filed: Dec. 4, 1979

[51] Int. Cl.[3] .......... H04J 6/02

[52] U.S. Cl. .......... 370/81

[58] Field of Search .......... 370/81, 56; 179/15 C; 381/46

[56] References Cited

U.S. PATENT DOCUMENTS

| | | | |
|---|---|---|---|
| 2,958,733 | 11/1960 | Dickieson | 370/81 |
| 3,005,874 | 10/1961 | Jaeger | 370/81 |
| 3,046,347 | 7/1962 | Miedema | 370/81 |
| 3,304,373 | 2/1967 | Wright | 370/81 |
| 3,466,398 | 9/1969 | Fraser et al. | 370/81 |
| 3,836,719 | 9/1974 | Clark | 370/81 |
| 4,002,841 | 1/1977 | Ching et al. | 370/81 |
| 4,205,202 | 5/1980 | Kahn | 370/81 |

OTHER PUBLICATIONS

"A Speech Interpolation System for Private Networks" by Elder et al., Conference Record of the IEEE 1978 National Telecommunications Conference; Birmingham, Al.; Dec. 3-6, 1978, pp. 14.6.1-14.6.5.

"A Microprocessor Controlled 96/48 Digital Speech Interpolation Terminal" by Verma et al., Fourth International Conference on Digital Satellite Communications; Montreal, Canada, Oct. 23-25, 1978, pp. 261-268.

"Digital Speech Interpolation" by Campanella, Comsat Technical Review, vol. 6, No. 1, pp. 127-157, Spring 1976.

"Design of a DSI Terminal for Domestic Applications" by Maruta et al., Conference Record of the IEEE 1978 National Telecommunications Conference; Birmingham, Al., Dec. 3-6, 1978, pp. 14.3.1-14.3.5.

*Primary Examiner*—Douglas W. Olms
*Attorney, Agent, or Firm*—Browdy and Neimark

[57] ABSTRACT

A TASI system for interconnecting a transmission trunk having a first plurality of communication channels with a defined signal transmission frequency band to a second plurality of telephone communication lines, the second plurality exceeding the first end of the transmission trunk including apparatus for detecting signals on the second plurality and apparatus for assigning each telephone communication line on which signals are present to an available one of the first plurality of communication channels; receiving apparatus at a second end of the transmission link including apparatus for assigning each of the first plurality carrying signals to a corresponding one of the second plurality in accordance with assignment information received from the transmission apparatus; and apparatus for communicating messages including assignment information between the transmission apparatus and the receiving apparatus in said signal transmission band in serial data form along said first plurality of communication channels. A speech detector, echo suppressor, control message transmitter and receiver, signalling processor, RAM switching system, multichannel simultaneous serial synchronous bidirectional message communication and high speed speech detection notification apparatus are also disclosed.

31 Claims, 314 Drawing Figures

FIG. I
SYSTEM LAYOUT
A RADIO LINK
B CABLE LINK
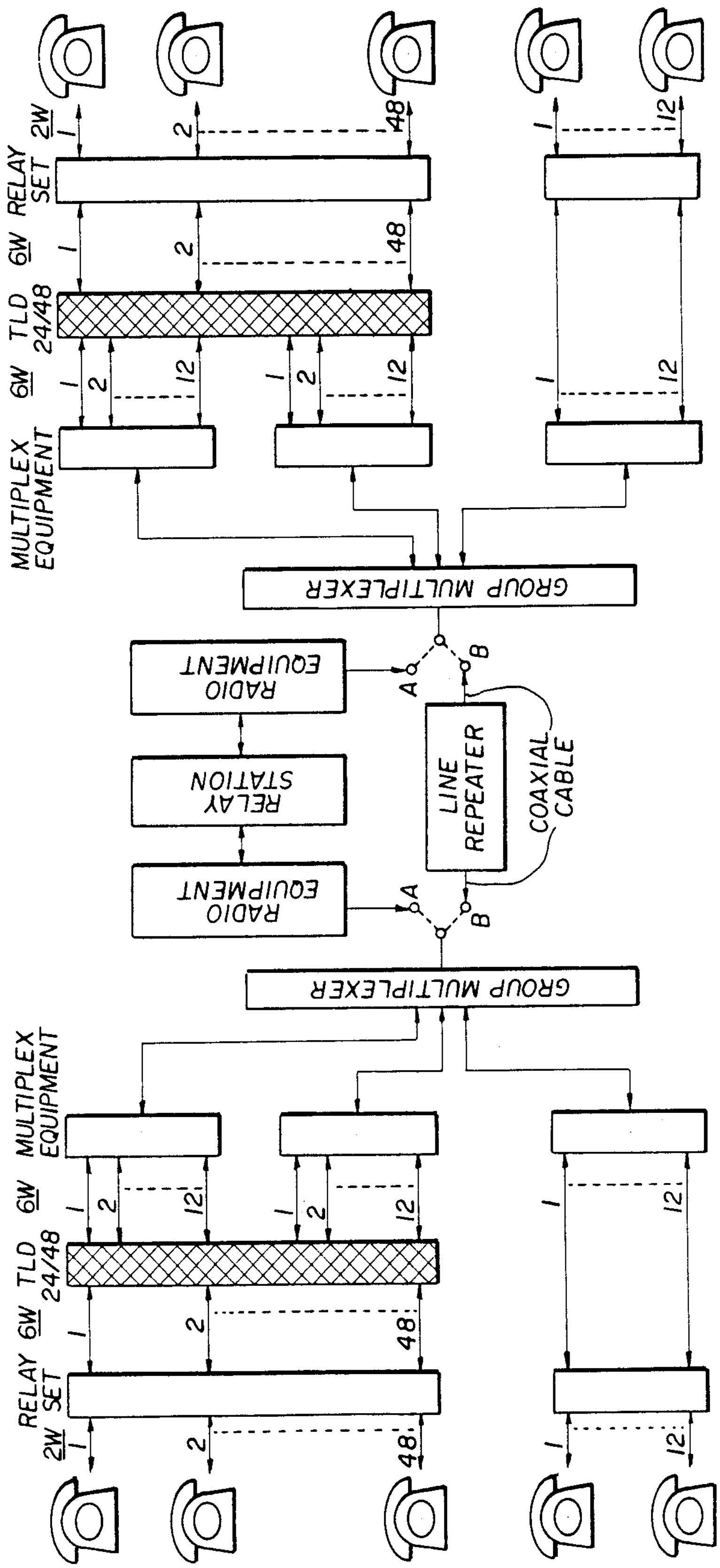

NOTE: ALL TIMING PULSES WITH SUFFIX "T"

NOTE: ALL TIMING PULSE WITH SUFFIX "T"

NOTE: ALL TIMING PULSES WITH SUFFIX "T"

NOTE: ALL TIMING PULSES WITH SUFFIX "T"

NOTE: ALL TIMING PULSES WITH SUFFIX "T"

NOTE: ALL TIMING PULSES WITH SUFFIX "T"

NOTE: ALL TIMING PULSES WITH SUFFIX "T"

Note: All Timing Pulses With Suffix "R".

Note: All Timing Pulses With Suffix "R".

NOTE: ALL TIMING PULSES WITH SUFFIX "R".

Note: All Timing Pulses With Suffix "R".

Note: All Timing Pulses With Suffix "R".

NOTE: ALL TIMING PULSES WITH SUFFIX "R".

Note: All Timing Pulses With Suffix 'R'.

NOTE: All Timing Pulses With Suffix "R".

SERIAL TO PAR. CONV. & DELAY MEMORY

FIFIN

FIFIN

FIFIN

| | $t_A$ | $t_B$ | $t_C$ | $t_D$ | $t_E \div t_H$ |
|---|---|---|---|---|---|
| TX MODE | READ | TX MODEM ACCESS | WRITE | | |
| | | | | | |
| CPU MODE | | | | | READ/WRITE |

| | $t_A$ | $t_B$ | $t_C$ | $t_D$ | $t_E \div t_H$ |
|---|---|---|---|---|---|
| | | | | | |
| RX MODE | | READ | 25Msec TIMER ACCESS | WRITE* | |
| CPU MODE | READ/WRITE | | | | READ/WRITE |

NOTE: * $t_D$ TIME SLOT IS USED IN RX MODE ONLY IF NEEDED BY RM OR 25Msec TIMER LOGIC ELSE IT CAN BE USED BY CPU.

CA1-CA5
5
BIT COUNTER MEMORY
ADD BUS CA1÷CA5
7
504
P b4 b3 b2 b1 b0
CH1 BIT COUNTER
1460H÷1477H
(60H÷77H)
b0-b4 & Pn
6
DO0-DO4 & P
CH23 BIT COUNTER
5
6
CPUADD BUS
CA5÷CA1;b4;b3
518
ADD BUS MUX
2/1 (LS365)
CMT6
MSG FLAG
M
530
3
FROM TX CONT MEMORY
tA·t8
R
RM
CMT7
S
B
528
RB
1400H
502
CH1 MESSAGE
CPU DATA BUS
8
1400H÷145FH
(82S09)
14FCH
CH23 MESSAGE
DO0
DO1
DO6
DO7
LATCH
(LS373)
CL
520
tB·t4
DIGITAL MUX 8—1 (LS151)
522
SPK
b0 b1 b2
RM = DEC24·M·B·P3 ; DE24 = b3·b4
RB = (RBC1·t2 + DEC31·M)P3; DEC31 = b1,b2,b3,b4

NOTE: SIGNALS INDICATED BY ARROWS ORIGINATE WITHIN CARD 6 AND MAY BE LOCATED ON DRAWING NO. 11221-0408

NOTE: READ THIS DRAWING IN CONJUNCTION WITH FIG. 49

TX SIGNALLING CONTROL & DELAY MEMORIES TIMING
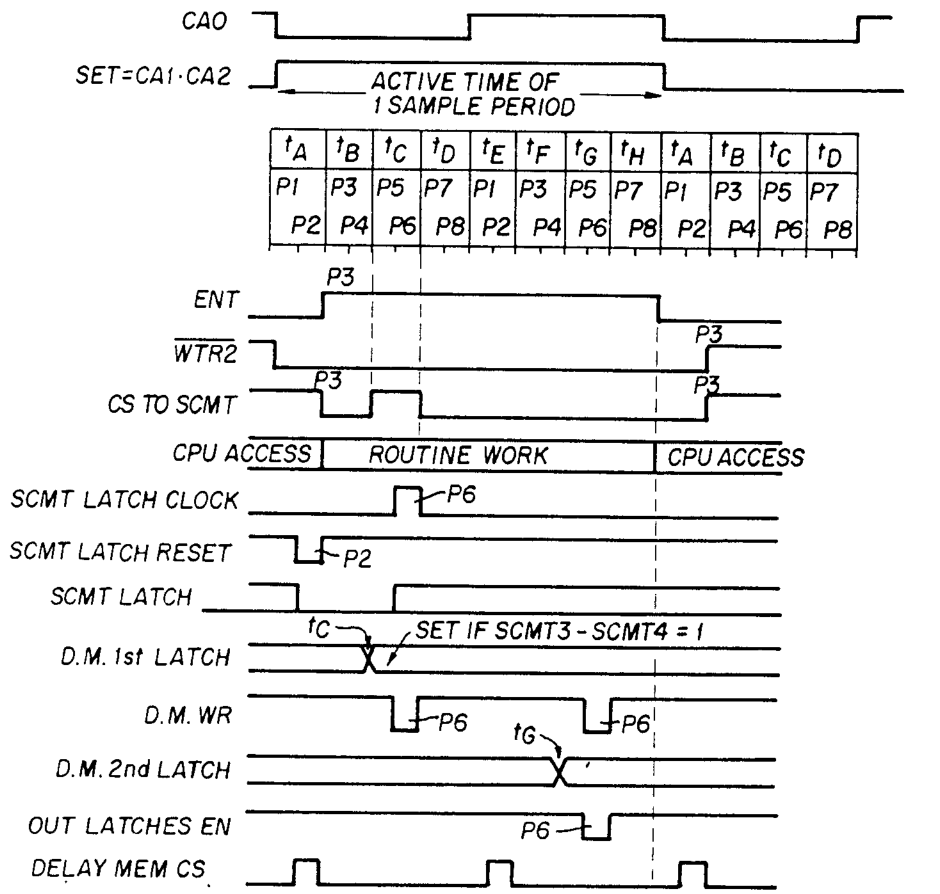
TX SIGNALLING - MAIN COUNTER TIMING
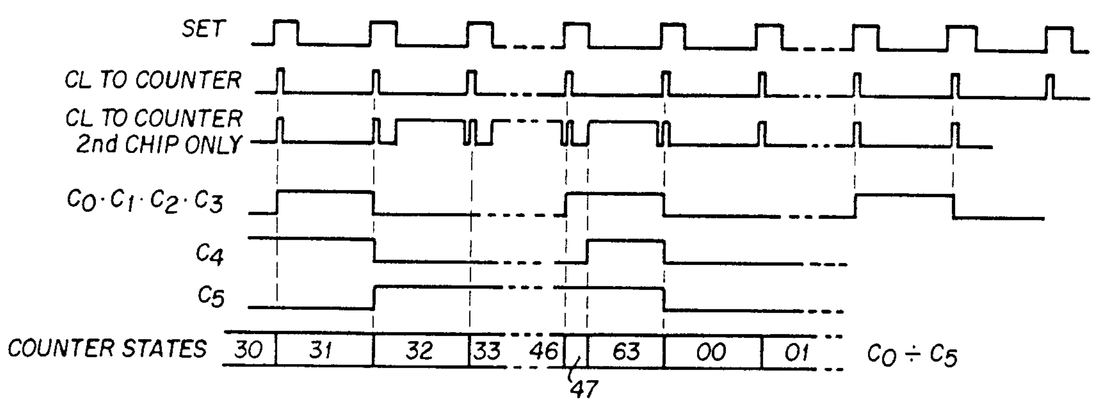
FIG. 51c

| TRUNK | 1 | 2 | 3 | 4 | 5 | 6 | 7 | 8 | 9 | 10 | 11 | 12 |
|---|---|---|---|---|---|---|---|---|---|---|---|---|
| IN | 57 | 58 | 47 | 48 | 35 | 38 | 24 | 27 | 14 | 15 | 4 | 9 |
| C.T. | 61 | 60 | 49 | 50 | 37 | 40 | 26 | 29 | 16 | 17 | 6 | 5 |
| IN | 59 | 62 | 51 | 52 | 39 | 42 | 28 | 31 | 18 | 19 | 8 | 7 |
| OUT | 55 | 56 | 45 | 46 | 41 | 36 | 30 | 25 | 20 | 21 | 10 | 11 |

NOTE:
THE SIGNALS $\overline{P8}$, $\overline{P7}$, $\overline{P5}$, $\overline{P2}$, ORIGINATE IN THE SPD ALU CIRCUIT, COMPONENT NO G1.

VOLTAGES

| COMPONENT NO | +5v | GND |
|---|---|---|
| R2, U2 | 28 | 14 |
| V3 | 16 | |
| T3, R4, N5, L3 | 5 | 12 |
| ALL OTHERS | 16/14 | |

NOTES 1. ASTERIKS (✱) INDICATE CONTINUATIONS OF SIGNALS WITHIN THIS DRAWING.

2. OUTPUT 3 OF SECTION E2 IS NOT CONNECTED TO B2 THE VALUE OF THEREFORE IS 4.

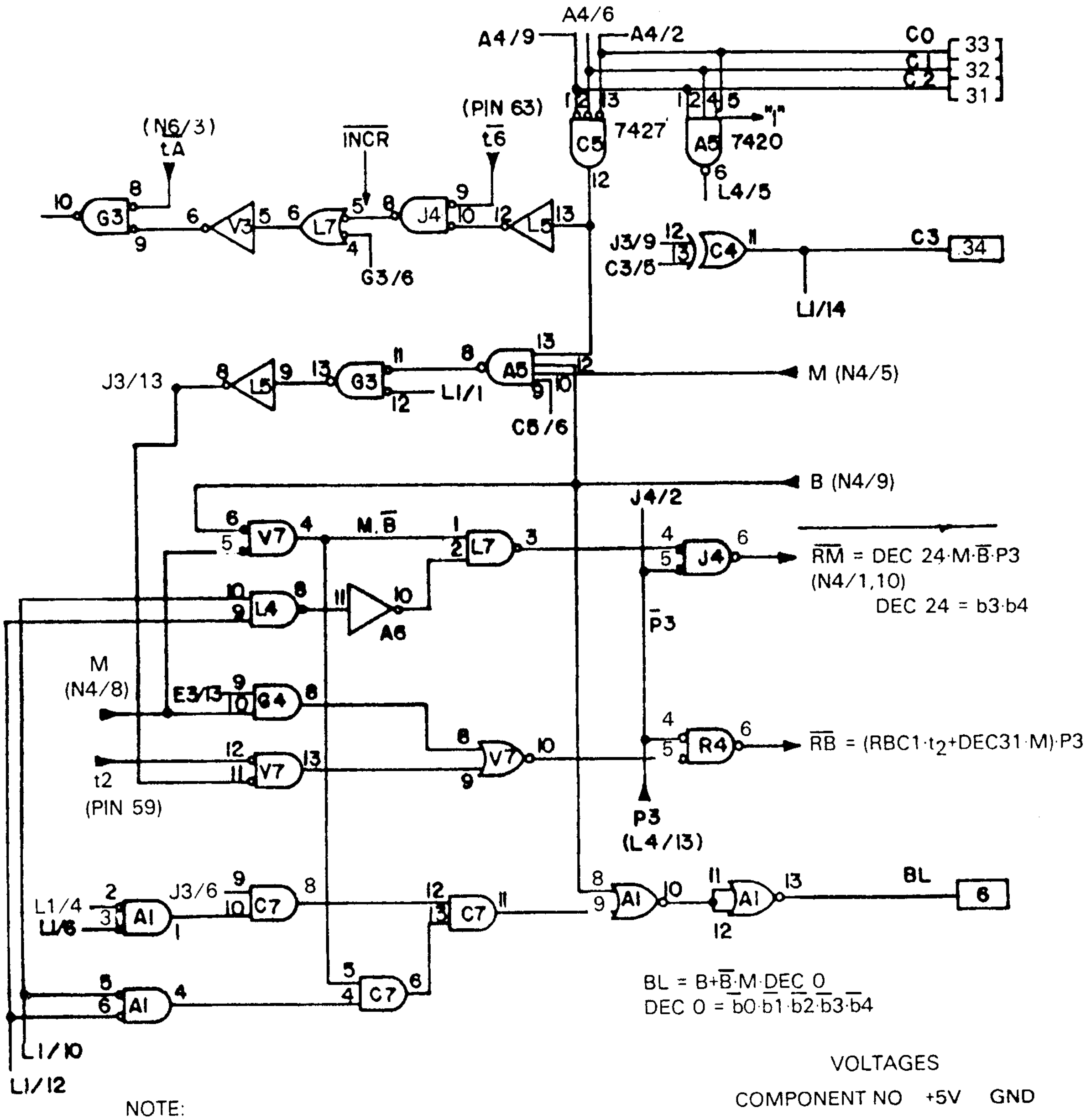
NOTE:
LINES INDICATED BY ASTERISKS AT THE INPUT TO E2 AND H1 ARE CONNECTED TOGETHER
VOLTAGES
| COMPONENT NO | +5V | GND |
|---|---|---|
| E2; H1 | 28 | 14 |
| A2, A3 | 5 | 10 |
| A4 | 5 | 12 |
| E4 | 16 | — |
| ALL OTHERS | 14/16 | 7/8 |
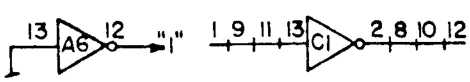
UNUSED GATES
*FIG. 69d*

THIS DIAGRAM ILLUSTRATES THE OPERATION OF A SINGLE TRUNK. IN PRACTICE BETWEEN EACH OF THE SAMPLES INDICATED ABOVE THERE EXIST 23 ADDITIONAL SAMPLES. ONE FOR EACH OF THE REMAINING TRUNKS.

VOLTAGES:

| COMPONENT NO | +5V | +12V | -5V | GND |
|---|---|---|---|---|
| A2 — A5 C2 — C5<br>E2 — E5 G2 — G5<br>J2 — J5 L2 — L5 | 9 | 8 | 1 | 16 |
| ALL OTHERS | 14/16 | — | — | 7/8 |

NOTE: ALL SIGNALS INDICATED BY ARROWS ORIGINATE ON CARD D4 AND MAY BE FOUND ON THE COUNTER SCHEMATIC DWG. NO. 11221-0405.

UNUSED GATES

| | $t_A$ | $t_B$ | $t_C$ | $t_D$ | $t_E$ — $t_H$ |
|---|---|---|---|---|---|
| TX MODE | READ | TX MODEM ACCESS | WRITE | | |
| RX MODE | | READ | 25sec TIMER ACCESS | WRITE | |
| CPU MODE | | | | | READ/WRITE |

NOTE:
$t_D$ TIME SLOT IS USED OM RX MODE ONLY IF NEEDED BY RM OR 25sec TIMER LOGIC ELSE IT CAN BE USED BY CBU.

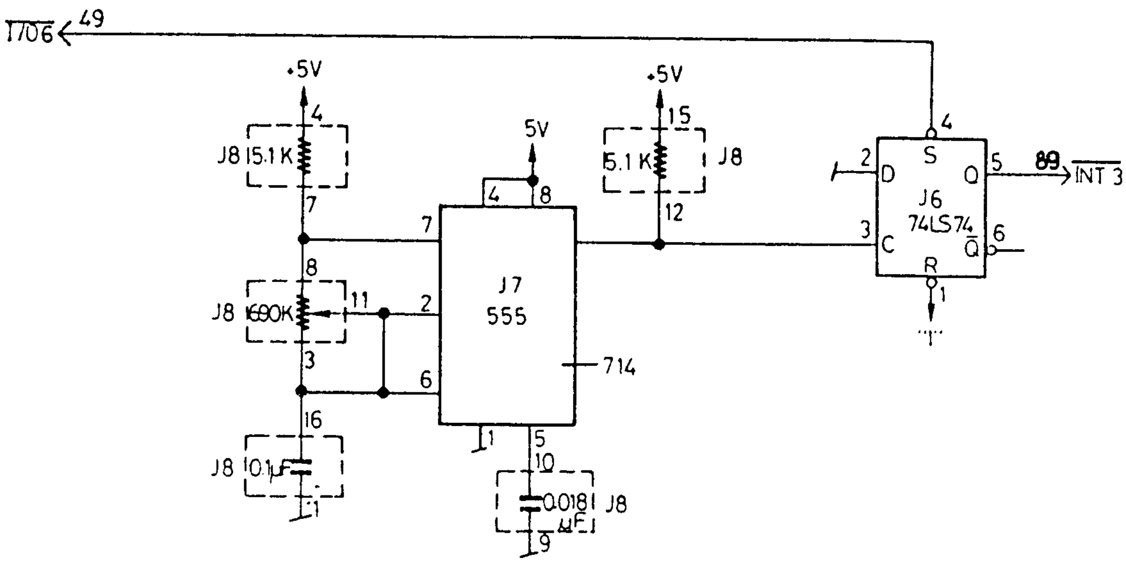
50msec Timer
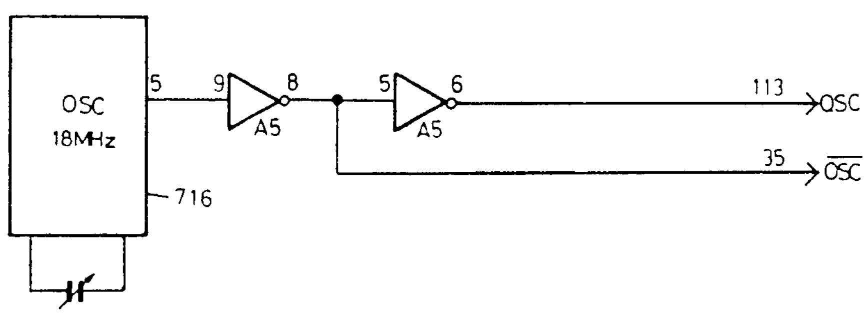
18MHz OSC.
FIG. 78b

CRT INTERCONNECTION DIAGRAM

NOTES

A. THE SIGNALS PO-P9 LOCATED ON CARD D6 ARE NOT OUTPUTTED FROM THAT CARD AND SERVE ONLY THE CIRCUITRY.

B. THE SIGNALS P1-P8 LOCATED ON CARD D2 ARE OUTPUTTED TO THE ENTIRE SYSTEM AND ARE MADE USE OF FOR GENERAL TIMING PURPOSES.

NOTES

A. IF THE CYCLE STEAL PULSE OCCURS DURING DBIN, FLIP FLOP N2/8 WILL NOT CHANGE STATE SINCE THE 7474 IS AN EDGE TRIGGERED DEVICE. THE WRITE PULSE WILL APPEAR ONLY WITH THE NEXT DEBIN THAT ESTABLISHES THE CONDITION M1 OR INTA.

B. IT IS NOT PERMITTED TO USE AN XTHL COMMAND BECAUSE IT'S LENGTH IS GREATER THAN 8 μsec.

NOTE:
THE DOTTED LINES INDICATE
THE POSITION OF THE TX AND RX BLANKS
DURING ONE TO ONE OPERATION.
IN THIS EVENT THE TX MUX AND THE RX
DEMUX RECEIVE ROUTING INSTRUCTIONS FROM
COUNTER CA1 - CA5

NOTE:

IN THE RECIEVER THE ORDER OF TRUNK INPUTS IS SHIFTED.
THE ORDER IS 24.1, 2....23 THIS SHIFT IS TO ENABLE THE CONTENTS OF EACH TRUNK TO BE ENTERED INTO THE DELAY MEMORY WHIL THE NEXT TRUNK IS BEING SAMPLED.

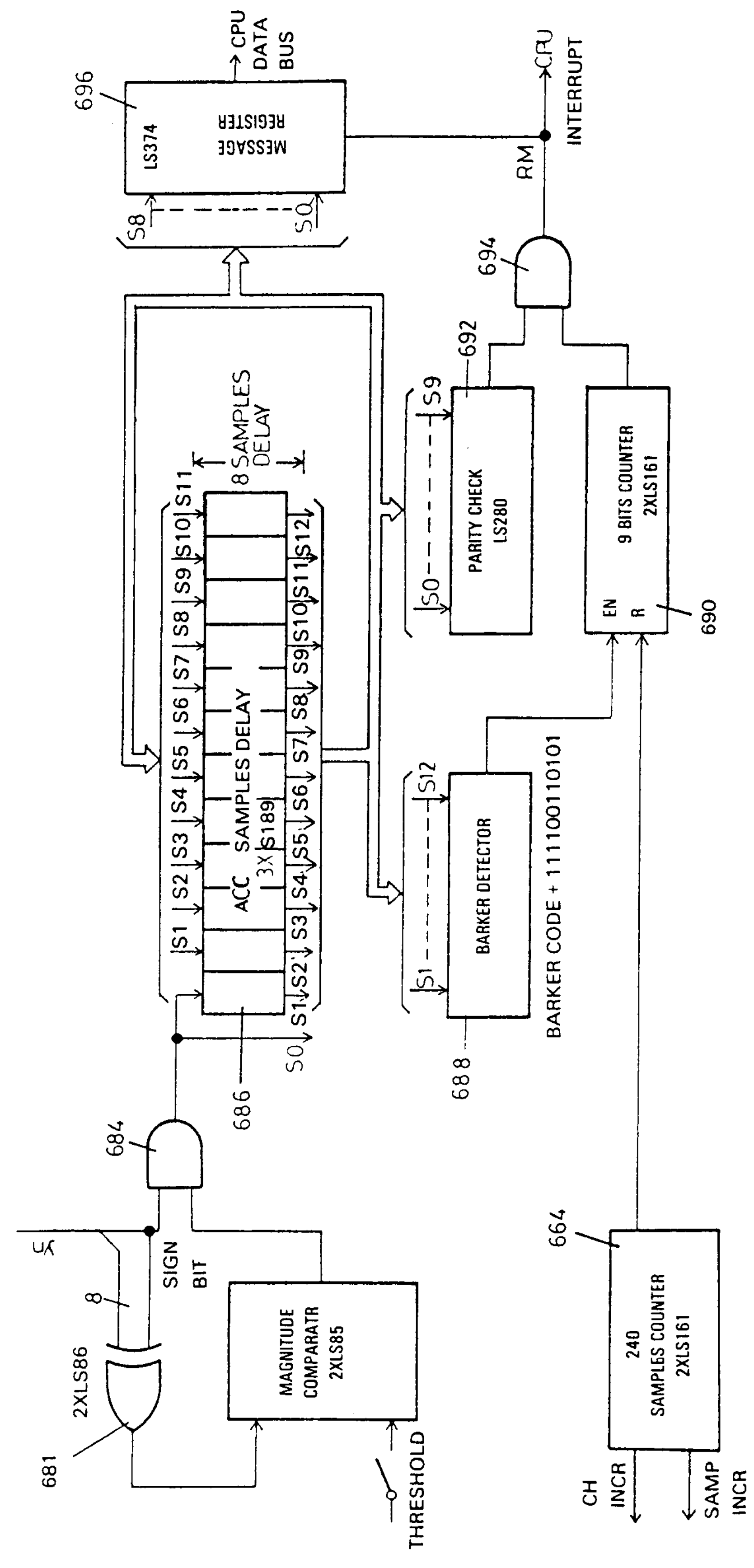
FIG. 9/b

TIME ASSIGNMENT SPEECH INTERPOLATION APPARATUS

FIELD OF THE INVENTION

The present invention relates to telephone switching apparatus and more particularly to a TASI (Time Assignment Speech Interpolation) communications system.

BACKGROUND OF THE INVENTION

Time Assignment Speech Interpolation (TASI) communication systems have been known for approximately twenty years. Their function, stated in general terms, is to exploit the fact that during a normal telephone conversation, information is being transmitted only about 35% of the time. TASI communication systems serve to connect a speaker to a transmission line only during those portions of a conversation when speech is actually present. During the other portions of the conversation, the transmission line is connected to another speaker, currently speaking in another conversation.

By using time assignment speech interpolation a given number of transmission lines, say 24 can usually carry about 48 simultaneous conversations.

ASI systems are extensively represented in the patent literature. Some examples of U.S. patents in this area are listed below: Nos.

| | | | |
|---|---|---|---|
| 4,138,597 | 3,878,337 | 3,508,007 | 2,927,968 |
| 4,131,765 | 3,864,524 | 3,466,398 | 2,907,829 |
| 4,124,777 | 3,848,093 | 3,424,869 | 2,870,260 |
| 4,100,377 | 3,840,708 | 3,424,868 | 2,692,303 |
| 4,095,052 | 3,836,719 | 3,406,257 | 2,651,678 |
| 4,066,844 | 3,832,491 | 3,311,707 | 2,631,194 |
| 4,061,878 | 3,811,014 | 3,304,373 | 2,629,021 |
| 4,059,730 | 3,804,990 | 3,304,372 | 2,629,020 |
| 4,048,447 | 3,803,405 | 3,153,196 | 2,564,419 |
| 4,052,068 | 3,790,715 | 3,118,018 | 2,548,661 |
| 4,032,719 | 3,721,767 | 3,056,858 | 2,541,932 |
| 4,012,595 | 3,712,959 | 3,046,347 | 2,388,001 |
| 4,005,276 | 3,706,091 | 3,042,752 | 2,311,707 |
| 4,002,841 | 3,686,442 | 3,030,447 | 2,301,223 |
| 4,001,505 | 3,681,533 | 2,974,198 | 2,271,000 |
| 3,997,729 | 3,668,645 | 2,961,492 | 1,905,359 |
| 3,985,956 | 3,660,645 | 2,958,733 | 1,873,786 |
| 3,927,286 | 3,649,766 | 2,957,946 | 1,852,727 |
| 3,890,467 | 3,644,680 | 2,957,945 | 4,147,896 |
| 3,882,458 | 3,560,660 | 2,948,779 | U.S. Pat. |
| RE 23,313 | 3,520,999 | 2,941,039 | Application |
| RE 25,546 | 3,510,596 | 2,935,569 | 863,902 |

Most of the prior art patents known to applicants and listed above relate to systems in which assignment, synchronization and acknowledgement messages between TASI apparatus on opposite ends of a transmission trunk link are passed along control lines, separate from the voice carrying lines, This arrangement involves a number of disadvantages, principal among which is the vulnerability of the entire transmission trunk link to failure of the control lines, Another disadvantage is the inability of the conventional TASI systems to readily sense and bypass inoperative voice lines.

U.S. Pat. No. 4,147,896 described TASI apparatus in which messages are transmitted along voice channels by means of a parallel combination of tones. This apparatus suffers from the disadvantage that the number of message bits is severely limited thereby limiting the message vocabulary. The apparatus has limited reliability due to the use of tone transmission.

A number of the above-listed patents describe TASI-type apparatus for use with a T-1 digital trunk. U.S. Pat. No. 4,066,844 discloses such a system in which the assignment information is included in some of the 24 digital time slots employed in voice channels. This patent and U.S. Pat. Nos. 4,048,447 and 3,330,605 which exemplify such systems are limited in their application to operation with digital trunk lines and are inherently incapable of operating with an analog telephone trunk.

Although the use of digital telephone trunks is increasing rapidly in the U.S., the majority of telephone trunks in the U.S. and throughout the world will remain analog during the coming few decades. There is therefore a need for TASI-type equipment capable of use with both analog and digital telephone trunks. There is also need for apparatus capable of operation with analog trunks which overcomes the design disadvantages of the prior art analog apparatus which is described in many of the above-listed patents. No such apparatus presently exists.

It is also noted that no TASI-type equipment is presently available for use with out of band signalling.

SUMMARY OF THE INVENTION

The present invention seeks to provide a TASI communication system which is capable of use with both analog and digital telephone trunks and which overcomes the disadvantages described hereinabove.

There is thus provided in accordance with an embodiment of the present invention a time assignment speech interpolation communication system capable of interconnecting a transmission trunk link having a plurality of digital or analog communication channels to a second plurality of telephone communication lines, the second plurality exceeding the first plurality, and comprising: transmission apparatus at a first end of the transmission trunk link and including apparatus for detecting signals on the second plurality of telephone communication lines and apparatus for assigning each telephone communication line on which signals are present to an available one of the first plurality of communication channels; receiving apparatus at a second end of the transmission link including apparatus for assigning each of the first plurality of communication channels carrying signals to a corresponding one of the second plurality of telephone communication lines in accordance with assignment information received from the transmission apparatus; and apparatus for communicating messages including assignment information between the transmission apparatus and the receiving apparatus, the transmission and receiving apparatus comprising apparatus for selectable interfacing with communication channels carrying analog and digital signal transmissions.

Additionally in acçordance with an embodiment of the present invention there is provided a time assignment speech interpolation communication system for interconnecting a transmission trunk link having a plurality of analog communication channels with a defined signal transmission frequency band to a second plurality of telephone communication lines, the second plurality exceeding the first plurality, and comprising: transmission apparatus at a first end of the transmission trunk link including apparatus for detecting signals on the second plurality of telephone communication lines and apparatus for assigning each telephone communication line on which signals are present to an available one of the first plurality of communication channels; receiving apparatus at a second end of the transmission link including apparatus for assigning each of the first plurality of communication channels carrying signals to a corresponding one of the second plurality of telephone communication lines in accordance with assignment information received from the transmission apparatus; and apparatus for communicating messages including assignment information between the transmission apparatus and the receiving apparatus in said signal transmission band in serial data form along the first plurality of communication channels.

BRIEF DESCRIPTION OF THE DRAWINGS

The present invention will be more fully understood and appreciated from the following detailed description taken in conjunction with the drawings in which:

FIG. 1 is a block diagram illustrating the orientation of the apparatus of the invention in a telephone system;

DETAILED DESCRIPTION OF THE INVENTION

Figure 2A:
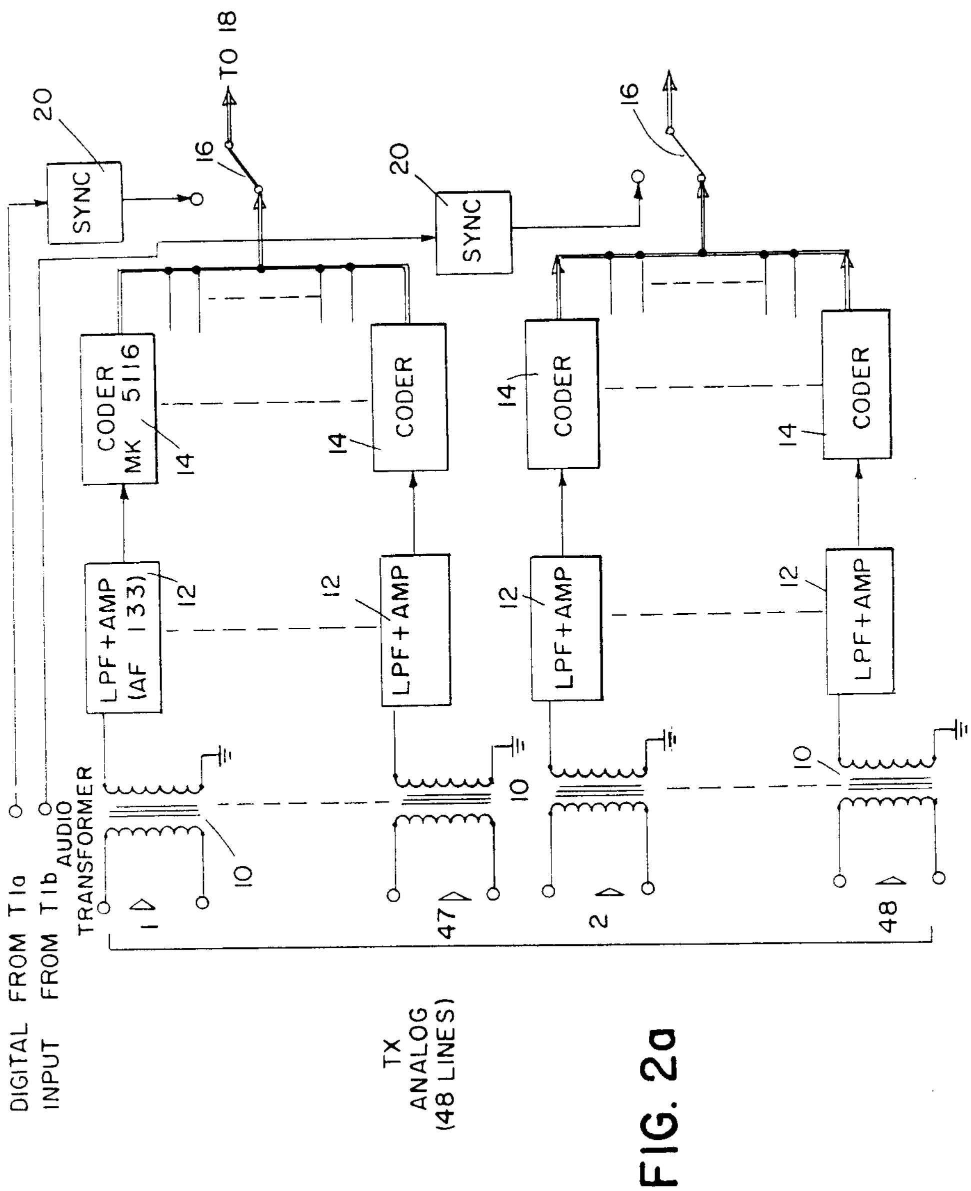
FIG. 2(*a* to *f*) is a block diagram illustration of the apparatus of the system except for out of band signalling apparatus; divided into six parts a–f.
Figure 2B:
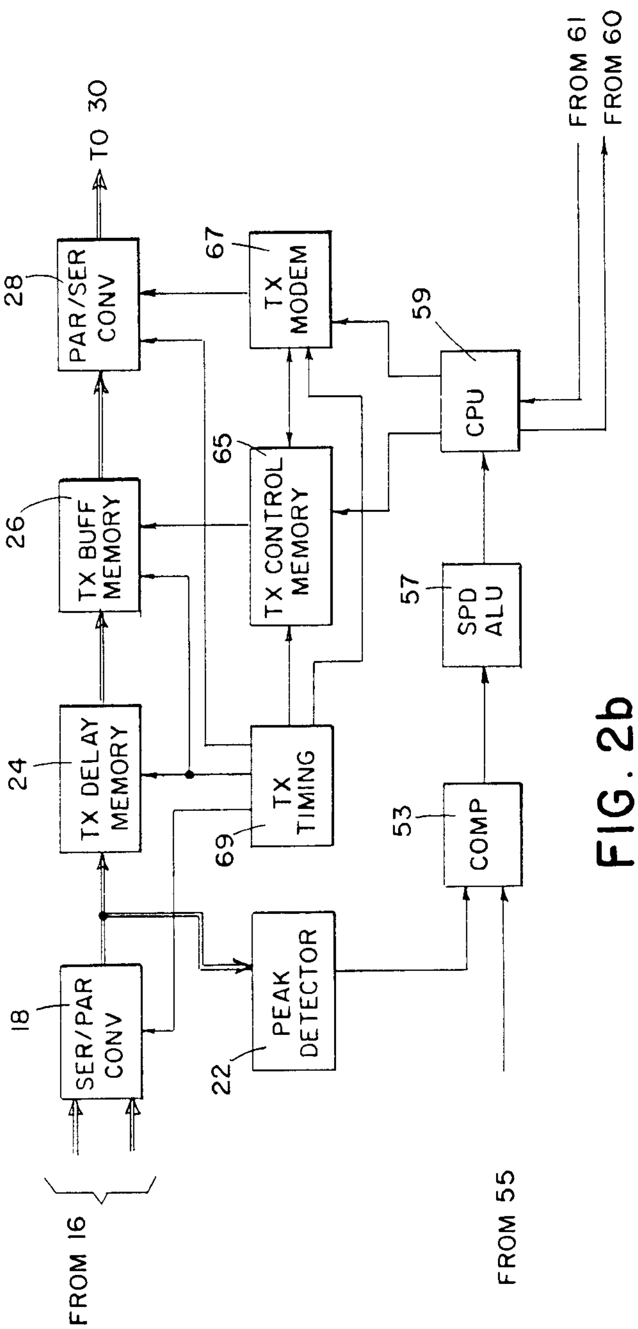
Figure 2C:
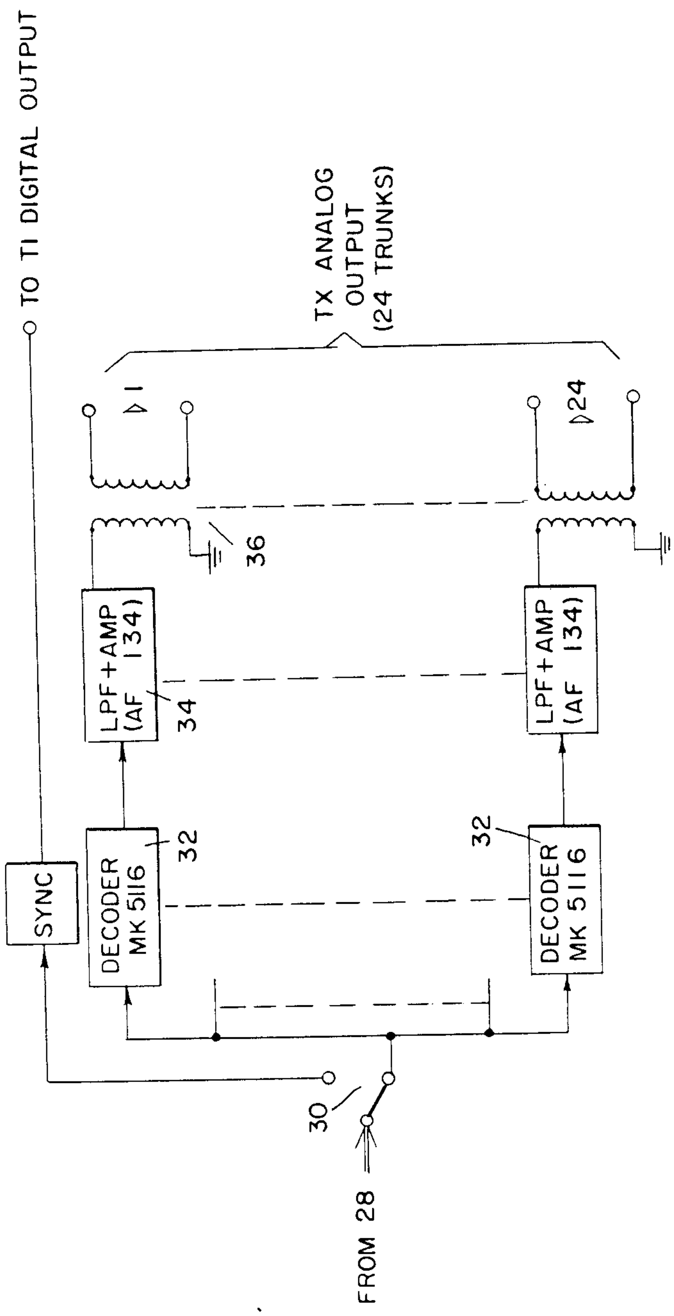

Reference is now made to FIG. 1 which illustrates a communcations system including time assignment speech interpolation (TASI) apparatus constructed and operative in accordance with an embodiment of the invention. The communications system comprises a transmission trunk 100 including a microwave radio portion 102 having a pair of transceivers 104 linked by relay apparatus 106. The transmission link may additionally or alternatively comprise a coaxial cable portion 108 which may operate in parallel to the microwave link and which is provided with suitable amplification apparatus 110.

At both ends of the transmission link 100 there are provided Frequency Division Multiplexers 112 and 114 of conventional construction and operation and each of which is connected to a plurality of carrier multiplexers 116 of conventional construction and operation, such as Z - 12 or System 7 of Siemens. The total number of terminals of each of the carrier multiplexers 116 at each end of the transmission link represents the total number of communications channels available over the transmission link.

In the exemplary embodiment illustrated herein, TASI apparatus 120 and 122 is connected to each group of 24 terminals of the carrier multiplexers at respective ends of the link transmission trunk. Each TASI apparatus of the invention is also connected to a respective relay set 124, 126 which is connected, in turn via suitable exchange equipment (not shown) to 48 active subscriber lines. By "active subscriber line" is meant a line which is currently assigned by exchange equipment to the relay set and which is potentially in use for carrying a conversation. In fact only about 85% of the active subscriber lines are actually carrying conversations at any given time during peak load periods under normal conditions.

It is appreciated that in the illustrated embodiment, TASI apparatus suitable for use with 48 active subscriber lines and 24 communications channels is shown. It is within the scope of the invention to provide larger capacity TASI apparatus or smaller capacity units. It is noted that the unit must have a sufficient number of communications channels available to it to enable it to operate at a 2 to 1 ratio of active subscriber lines to communications channels without an unacceptable incidence of freeze-out, i.e. denying service to a given subscriber line during voice transmission thereby.

Reference is now made to FIG. 2 which is a block diagram illustration of the portion of the TASI apparatus which deals with voice transmissions over communications channels.

For the purposes of background and definition, it is to be understood that a conventional telephone with out of band signalling is coupled to an exchange normally by two wires. Circuitry in the exchange converts the two wire connection to a six wire connection including two wires for passing dialling and billing information, for example, and four wires, two in each direction for carrying voice or other information. It is appreciated that the six wire telephone connection is used only with out of band signalling. In band signalling requires only a four wire connection which carries only audio signals. The apparatus illustrated in FIG. 2 receives only the four voice connections. The signalling channels are dealt with by apparatus illustrated in block diagram form in FIG. 3 and which will be described hereinafter.

The term "communication channels" used throughout the specification and claims refers to trunk channels which carry voice communications. Trunk channels which carry only signalling are referred to herein as trunk signalling lines.

It is noted that the TASI apparatus of the present invention need not necessarily be associated wth relay sets or with any other particular type of interconnecting or switching circuitry. The term "telephone communication line" will be used hereinafter and in the claims to denote one of the, typically 48, lines which may carry signals, voice, or otherwise, which it is desired to communicate via one of the communication channels. The term "active subscriber line" defined hereinabove refer to a telephone communication line which is associated with the use of a relay set.

Referring now to FIG. 2 there is seen a block diagram illustration of a time assignment speech interpolation communications unit constructed and operative in accordance with an embodiment of the invention. Forth-eight analog input lines are each connected to a relay set (not shown) and are received at respective inputs of 48 audio transformers 10. The outputs of the audio transformers 10 are supplied to AF 133 (National) low pass filters and amplifiers 12, also 48 in number. The outputs of the low pass filters and amplifiers 12 are supplied to 48 MK 5116 coders (Mostek) 14 which convert the audio inputs into 8 bit serial digital signals. The outputs of the 48 coders 14 are supplied, via a switch 16, to a serial to parallel converter 18.

It is a particular feature of the embodiment of the invention illustrated herein that switch 16 is operative to input to the serial to parallel converter either the outputs from coders 14 or digital inputs such as a standard PCM (Pulse Code Modulation) output. Thus the versatility of the time assignment speech interpolation communications unit is greatly increased, enabling it to operate with analog or digital signal transmissions or a combination thereof.

Where digital outputs from standard PCM apparatus such as a T 1 trunk are received, the received digital signal is supplied to synchronization circuitry 20 and thence to the serial to parallel converter 18. The synchronization circuitry 20 is operative to process the normal 193 bit frame timing such that only the 192 information bits are dealt with by the circuitry that follows the serial to parallel converter, and the additional bit is used to define the signalling bit timing, and is described later in detail.

The circuitry described above, comprising low pass filters and amplifiers 12 and coders 14 will be referred to hereinafter as coder circuitry, it being appreciated that coders 14 and decoders 66 described hereinafter are embodied in a MK 5116 CODEC chip.

The output of serial to parallel converter 18 is supplied to a peak detector 22 and to a transmitter delay memory 24, which are illustrated in respective FIGS. 14, 15 which will be described hereinafter. The operation of the transmitter delay memory 24 is entirely digital and provides a delay of 48 ms and supplies an output to a transmitter buffer memory 26, such as a Motorola 6810. The output of transmitter buffer memory 26 is supplied to a parallel to series converter 28, whose output is provided via a switch 30 either to synchronization circuitry 31 or to 24 decoders, 32, each embodied in a MK 5116 chip, depending on whether analog or digital signal transmissions are involved.

The output of each decoder is to an AF 134 low pass filter and amplifier 34. The output of each filter and amplifier 34 is supplied via an audio transformer 36 to one of 24 communications channels in the transmission trunk link. The output of synchronization circuitry 31 is supplied as a 193 bit digital output to a digital transmission trunk such as a T 1 trunk.

Considering now the received signals from the transmission trunk link received on the 24 communications channels, these are supplied via coder circuitry comprising 24 audio transformers 40, 24 AF 133 low pass filters and amplifiers 42 and 24 MK 5116 coders 44, embodied together with decoders 32 in MK 5116 CODEC chips, and via a switch 46 to a serial to parallel converter 48. The output of the serial to parallel converter 48 is supplied to a receiver delay memory 50 (FIG. 17) and thence to a receiver buffer memory 52.

Synchronization circuitry 47 receives a digital input such as standard PCM from the transmission trunk and operates similarly to synchronization circuitry 20. It is noted that switches 30 and 46 may be controlled together with switch 16 such that when digital information is being supplied, the coder and decoder circuitry is bypassed and the signals pass via the synchronization circuitry which deals with the 193'rd bit of the PCM format.

The output of receiver buffer memory 52 is supplied to a parallel to serial converter 56 which also receives an input from blanking logic circuitry 58 (FIG. 42) which operates in response to an output from a receiver control memory 60. The output of parallel to serial converter 56 is supplied via a switch 62 either to digital outputs such as a standard PCM via synchronization circuitry 64 similar to synchronization circuitry 31, or alternatively to decoder circuitry comprising 48 MK 5116 decoders 66, mentioned above, each followed by an AF 134 low pass filter and amplifier 68 and an audio transformer 70. The outputs of the 48 audio transformers are supplied each to a line of a 48 line analog output which may interface with a relay set.

It is noted that in accordance with an alternative embodiment of the invention, switches 16, 30, 46 and 62 may be independently controlled so as to enable digital transmissions received from a telephone communication line to be transmitted along an analog trunk and vice versa. It is also appreciated that the telephone communication lines and the communication channels may be selectably divided between analog and digital lines, as required by the intended use of the system. The proportion can be changed readily, should use requirements change over time.

The output of peak detector 22 is supplied to one input of a comparator 53 which also receives an input from Expected Echo Arithmetic Logic Unit 55. Unit 55 determines the threshold of comparator 53 in response to the output of the receiver buffer memory 52 which indicates the signal amplitude of the 48 telephone communication lines, and which will be described in detail hereinafter.

The output of comparator 53 is supplied to SPD Arithmetic Logic Unit circuitry 57, which will be described in detail hereinafter. The output of circuitry 57 is supplied to a Central Processing Unit 59, which will be described hereinafter in detail.

The output of the receiver delay memory 50 is supplied to a receiver modem 61, which in turn provides an output to the CPU 59. The receiver modem scans the delay memory 50 to detect received messages in the contents of memory 50 and to transfer the contents thereof to the CPU. The receiver modem operates in association with a speed up counter 64 which addresses the delay memory 50 during scanning thereof by the receiver modem.

In response to a change in the output of the SPD ALU circuitry 57, the CPU 59 provides control inputs to a transmit control memory 65. Memory 65 contains the data which defines which of the 48 telephone communication lines are coupled to which of the 24 communication channels. This information is defined by the dynamic assignment of communication channels to telephone communication lines and is indicated by an output of the control memory 65 to transmit buffer memory 26, which is selectably read in accordance with the output of the control memory 65.

The CPU also provides control inputs to a transmit modem 67 which indicate the contents of the message to be transmitted as well as the communication channel on which the message is to be transmitted. The message is transmitted by an output of the transmitter modem 67 to parallel-serial converter 28 in accordance with timing signals provided by transmitter timing circuitry 69.

The timing circuitry 69 will be described hereinafter in detail and provides an output to serial to parallel converter 18 and an output to parallel to serial converter 28 in addition to providing timing signals to transmitter modem 67, and providing timing signals to the transmitter delay memory 24 and the transmitter control memory 65 in order to synchronize the operation thereof.

The various elements of the transmitter circuitry described hereinabove will be described hereinafter in greater detail with reference to detailed block diagrams and schematic illustrations.

It is noted that a variety of control functions are assigned to the CPU and appreciated that alternatively these control functions may be carried out by discrete dedicated circuitry. Simplicity of design and economy are achieved by use of the CPU as described herein.

The receiver circuitry will be described hereinafter in greater detail with reference to FIG. 17. Receiver control memory 60 is updated by inputs from the CPU 59 in response to messages received at the modem receiver 61. Receiver timing circuitry 71 provides an address to the receiver control memory 60 for governing the read/write cycle thereof in a sequential manner and also provides outputs to receiver buffer memory 52, receiver delay memory 50, speed up counter 63, parallel to serial converter 56, serial to parallel converter 48 and receiver modem 61, for synchronizing the operation thereof.

Figure 3:
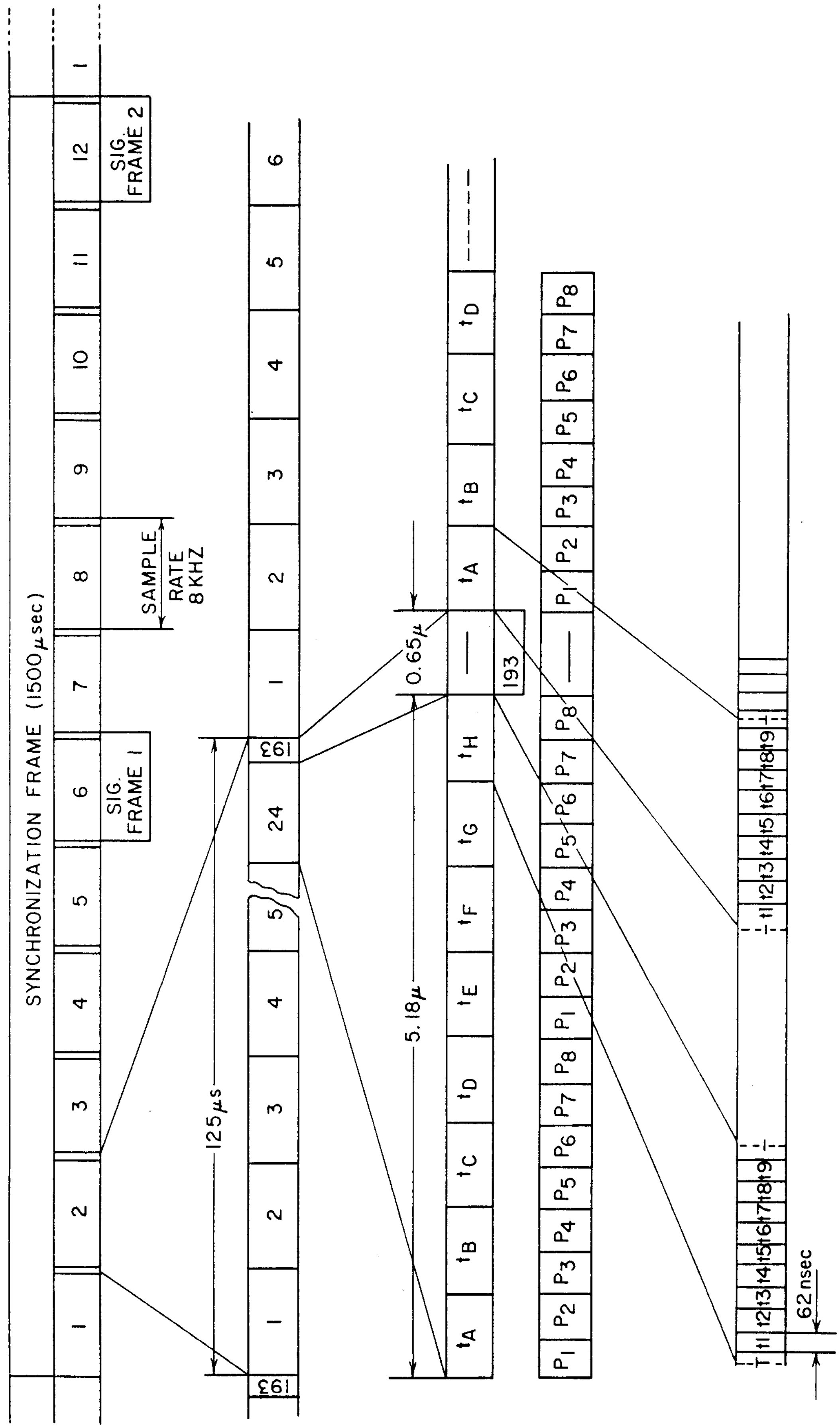
FIG. 3 is a timing diagram indicating various timing frames employed in the apparatus of the invention.

Reference is now made to FIG. 3 which is a diagram illustrating the relationship between the various timing periodicities employed in the embodiment of the invention presently described. Since the apparatus of the invention operates in association with digital or analog transmission trunks, T 1 timing, used in digital transmissions is adopted as the timing base of the system, so as to enable straightforward connection to T 1 transmission links.

The basic timing frame comprises 193 data bits representing 24 channels, each represented by 8 PCM coded bits and a 193'rd framing bit. As the standard sampling rate is 8 KHz, the duration of each basic timing frame is 125 microseconds. A synchronization frame comprises 12 basic frames and is of duration 1500 microseconds. The 193'rd bits of each basic timing frame indicate the signalling synchronization phase. Singalling information is transmitted during the sixth and 12th basic timing frames of each synchronization frame.

Each data bit is of duration 0.65 microseconds approximately. The duration of each channel data period is 5.18 microseconds, such that the 8 PCM coded bits which it comprises each are of duration 0.65 microseconds. Each channel data period is divided into 8 timing pulses t A—t H each of duration 0.65 microseconds and is also divided into two cycles, each comprising 8 timing pulses each of puration 0.32 microseconds approximately and identified as P 1—P 8.

Each timing pulse t A—t H includes 9 timing pulses t 1-t 9, each of duration 62 nanoseconds.

It will be noted that two independent timing sources are employed in the apparatus of the invention. Both produce pulses of the periodicities described hereinabove. The pulses are distinguished from each other by subscripts T and R which refer to either the transmitter or receiver timing respectively.

Figure 4A:
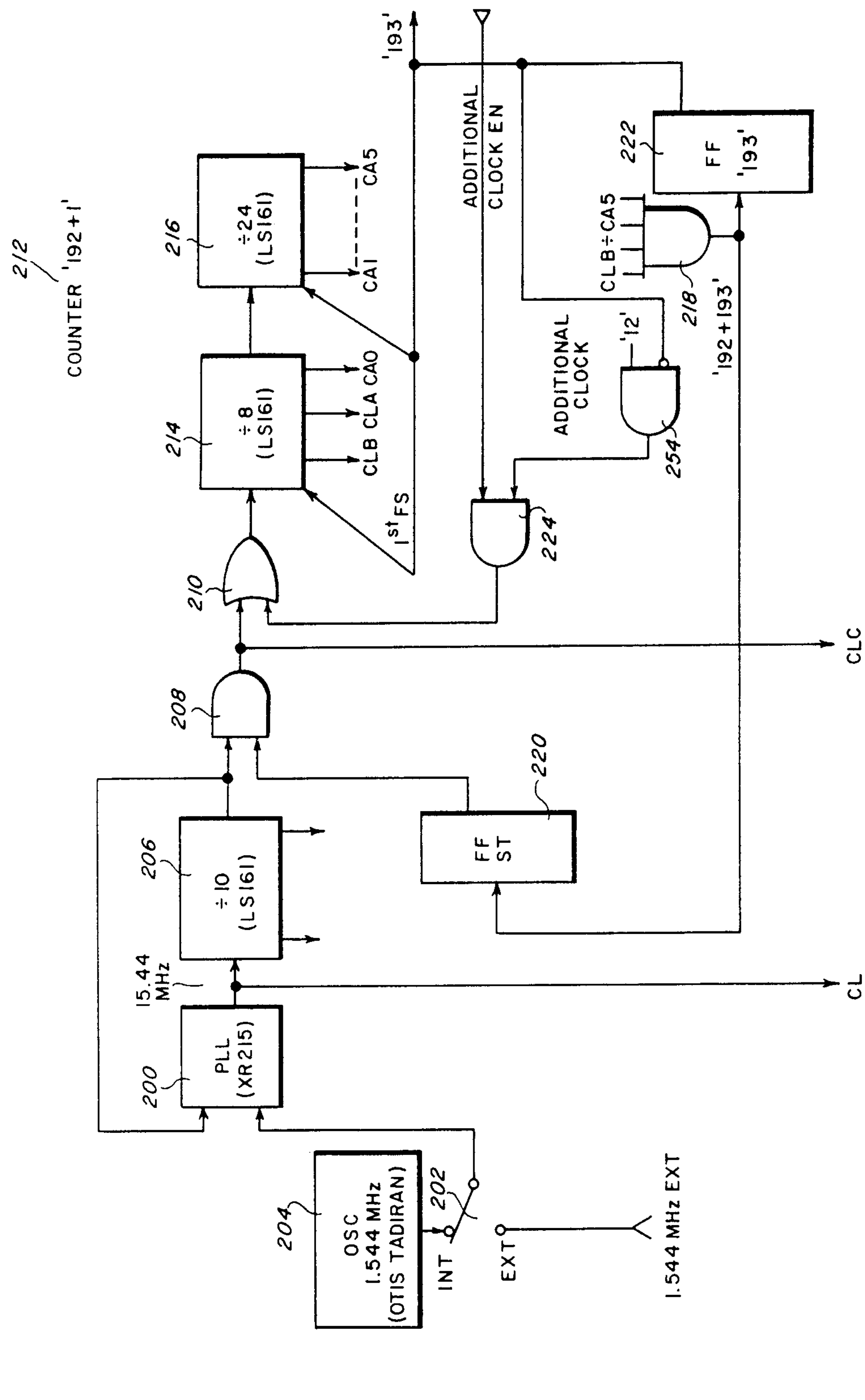
FIG. 4(*a* to *c*) is a block diagram of transmit timing circuitry; divided into three parts a–c.
Figure 4B:
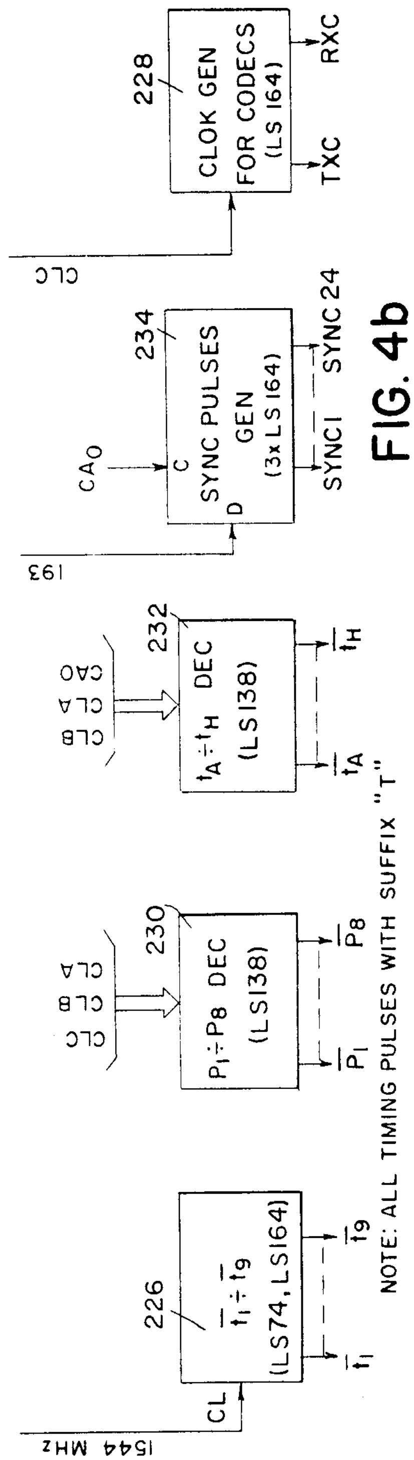
Figure 4C:
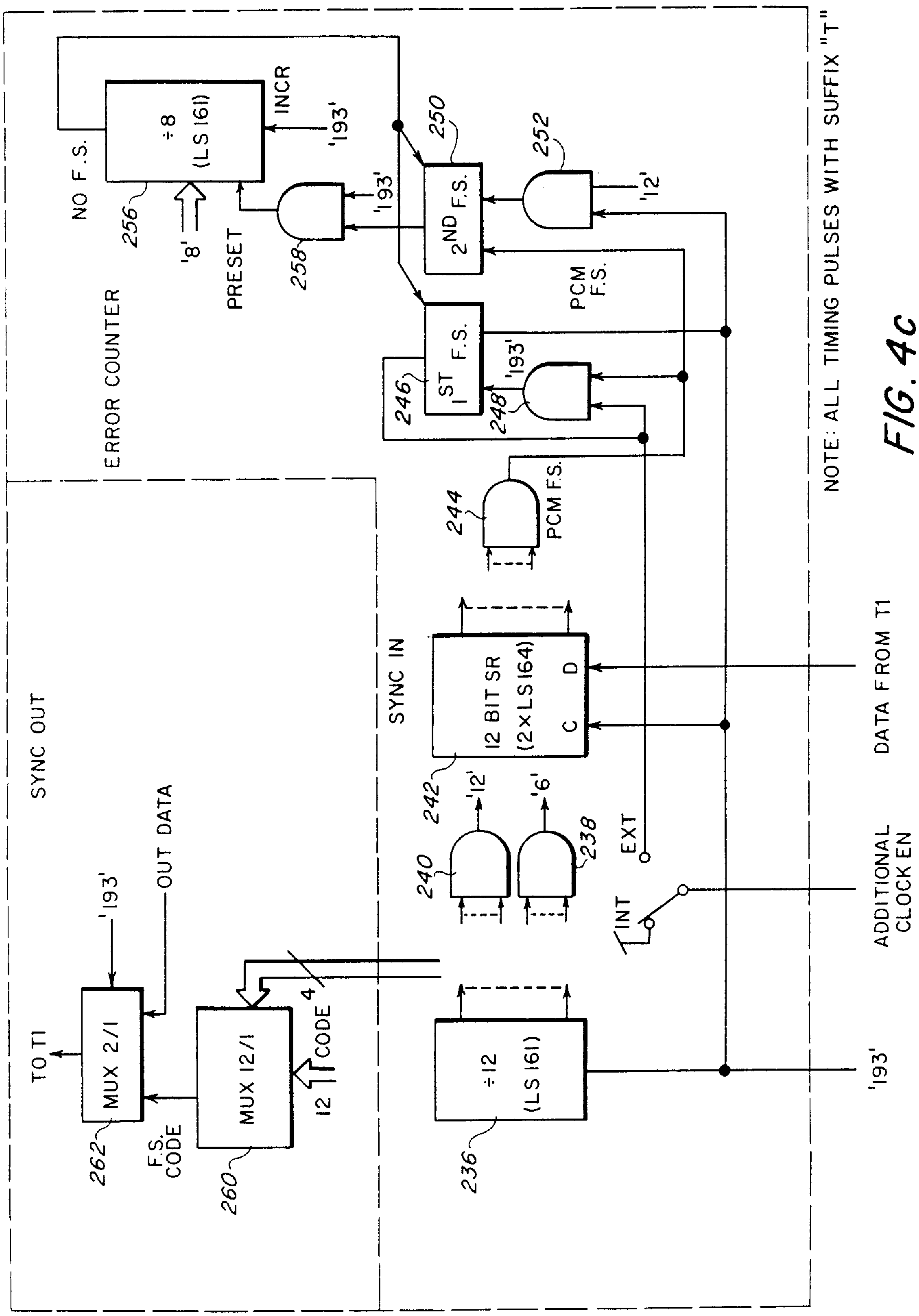
Figure 5A:
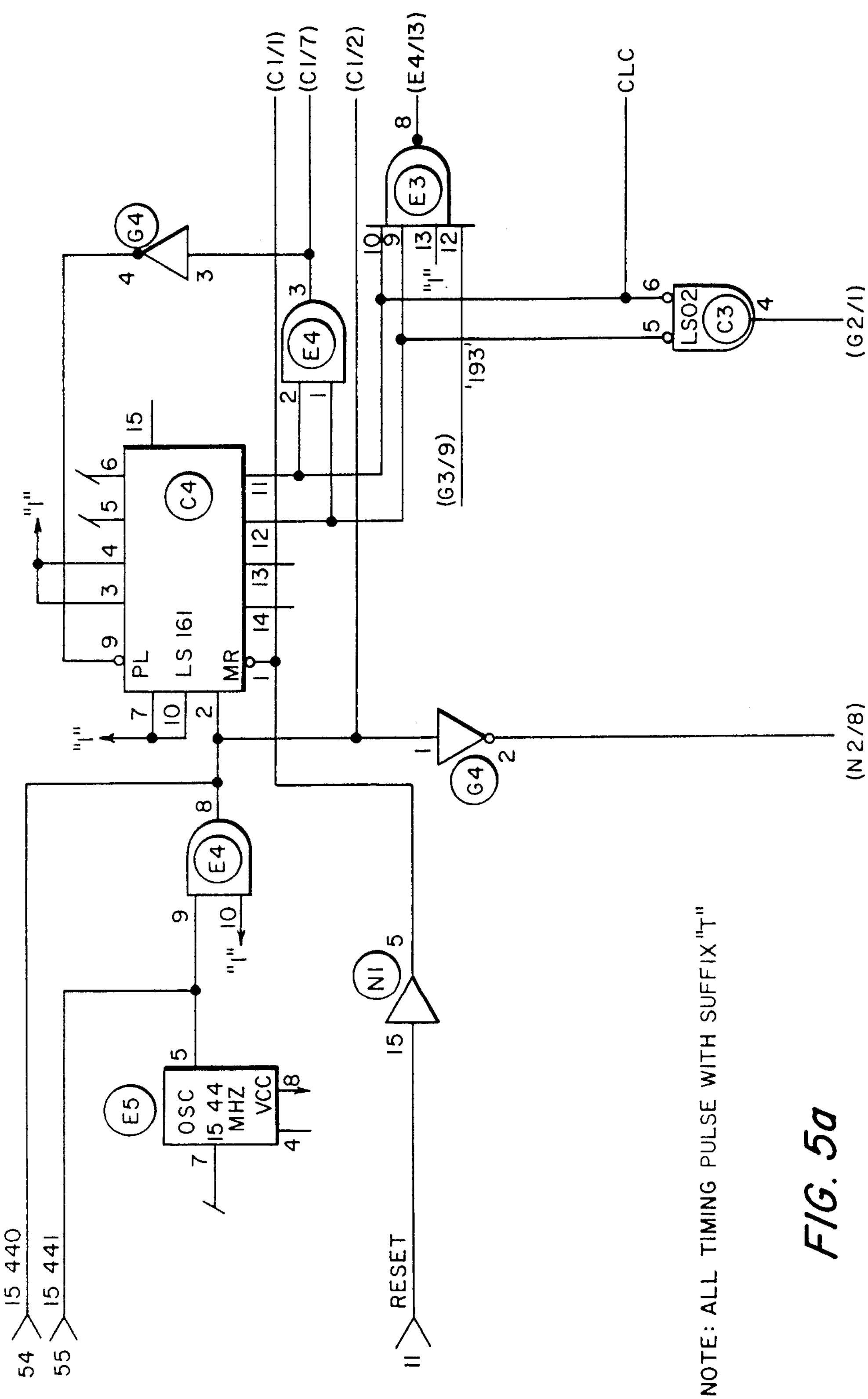
FIG. 5(*a* to *f*) is a schematic illustration of the timing circuitry of FIG. 4.
Figure 5B:
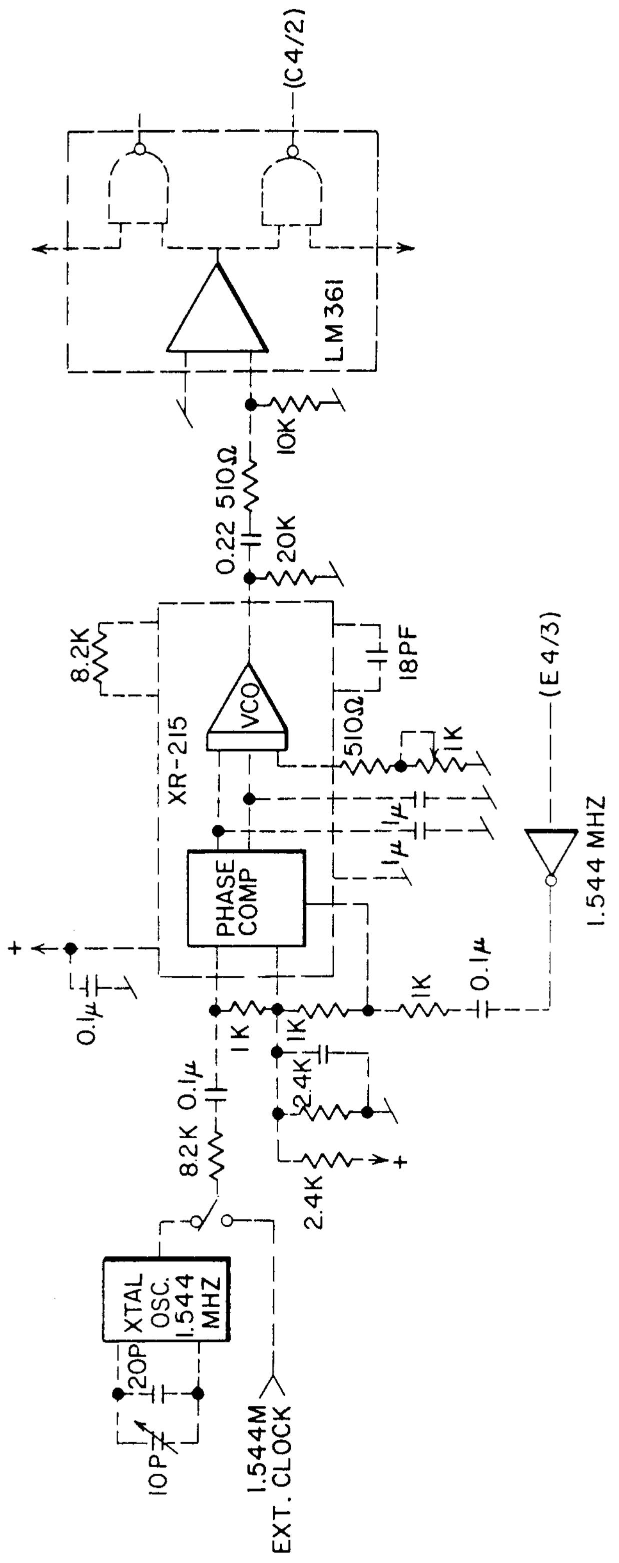
Figure 5C:
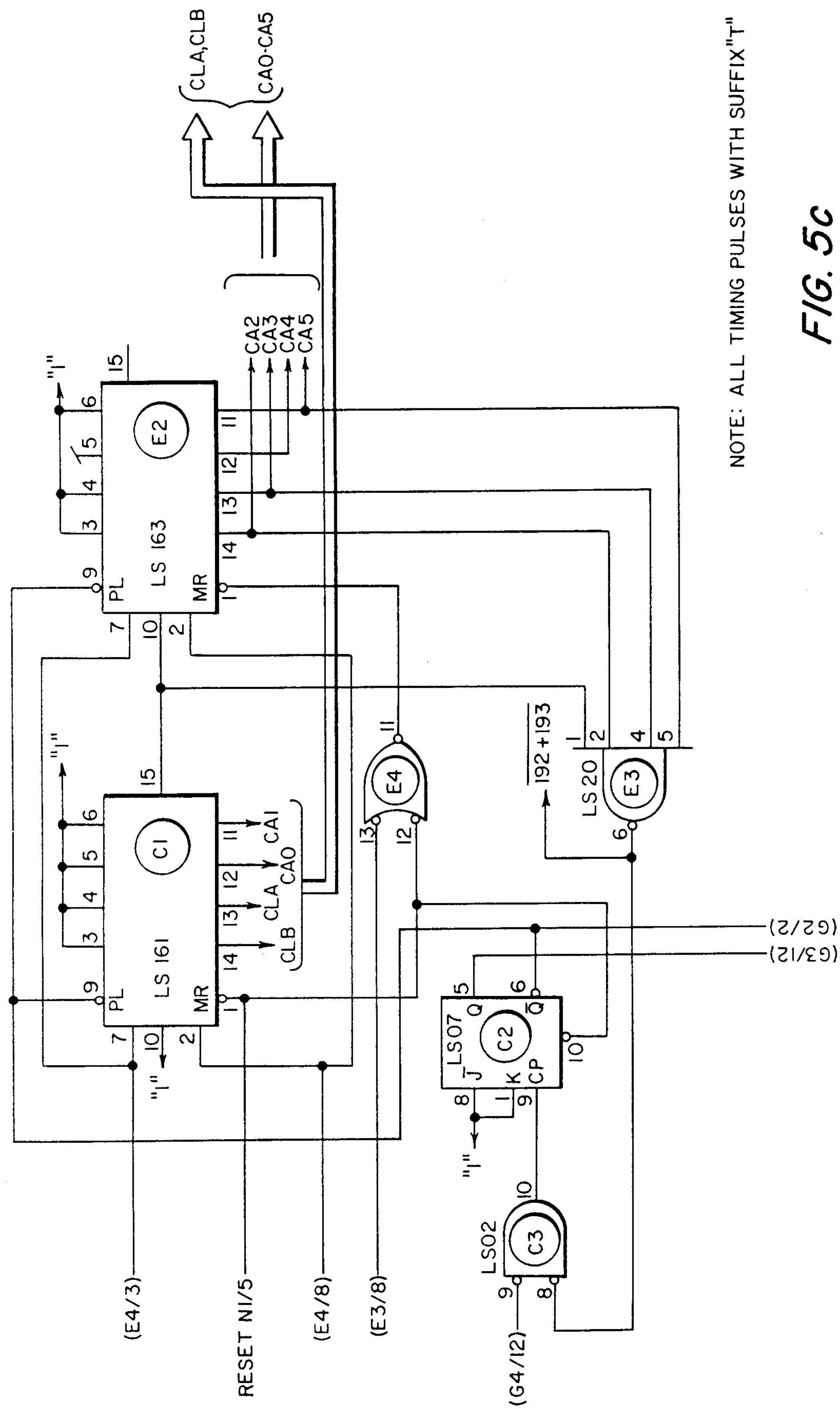
Figure 5D:
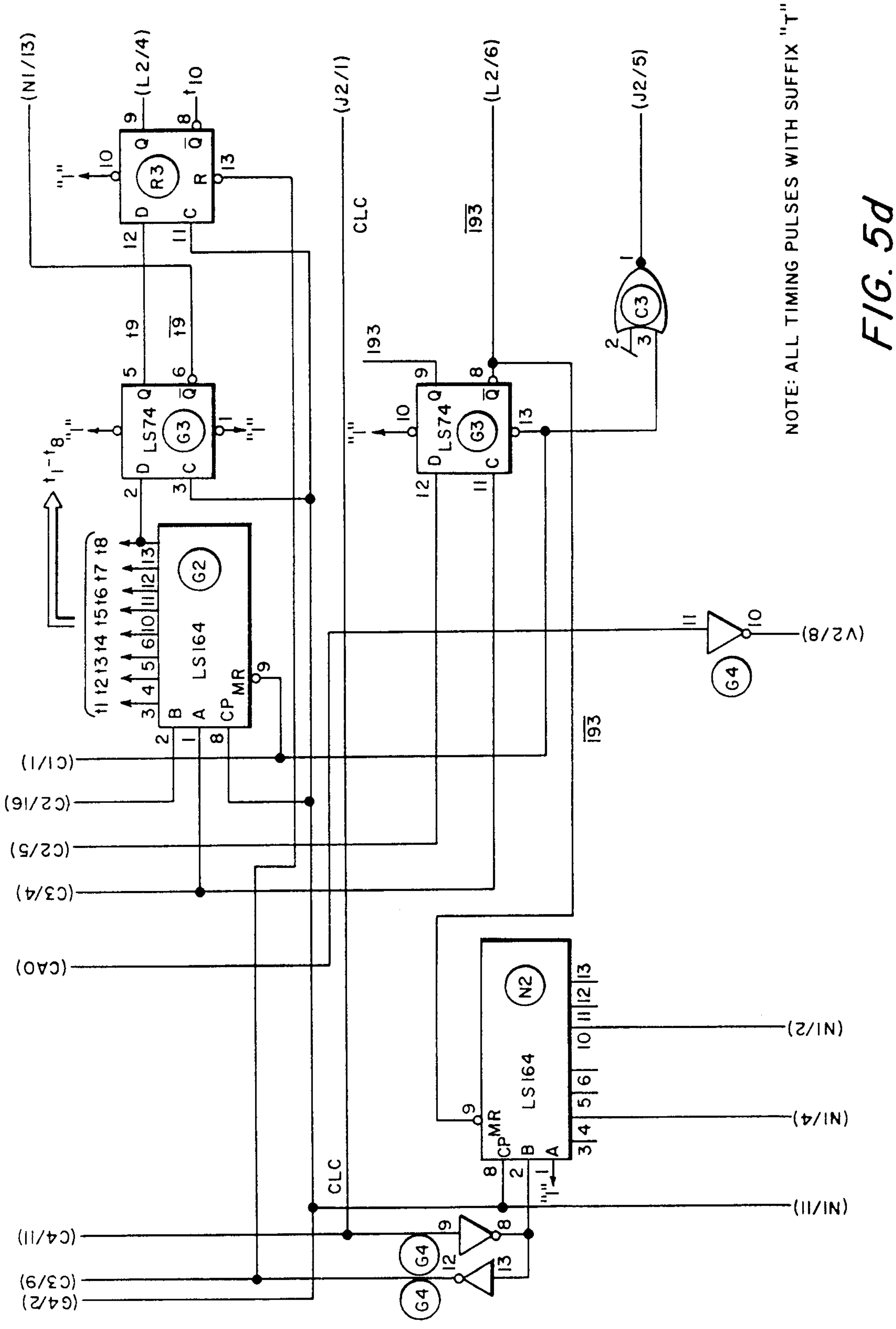
Figure 5E:
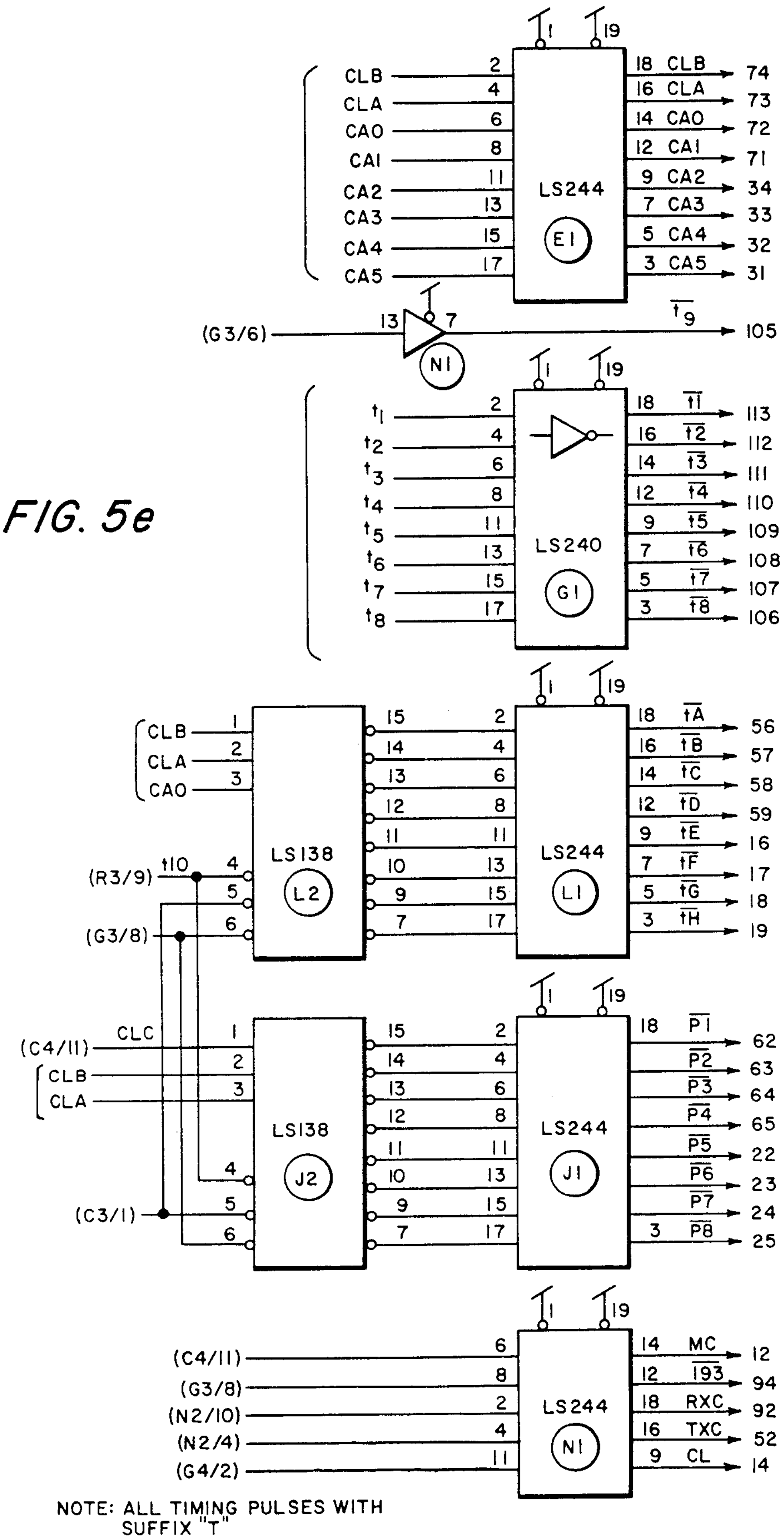
Figure 5F:
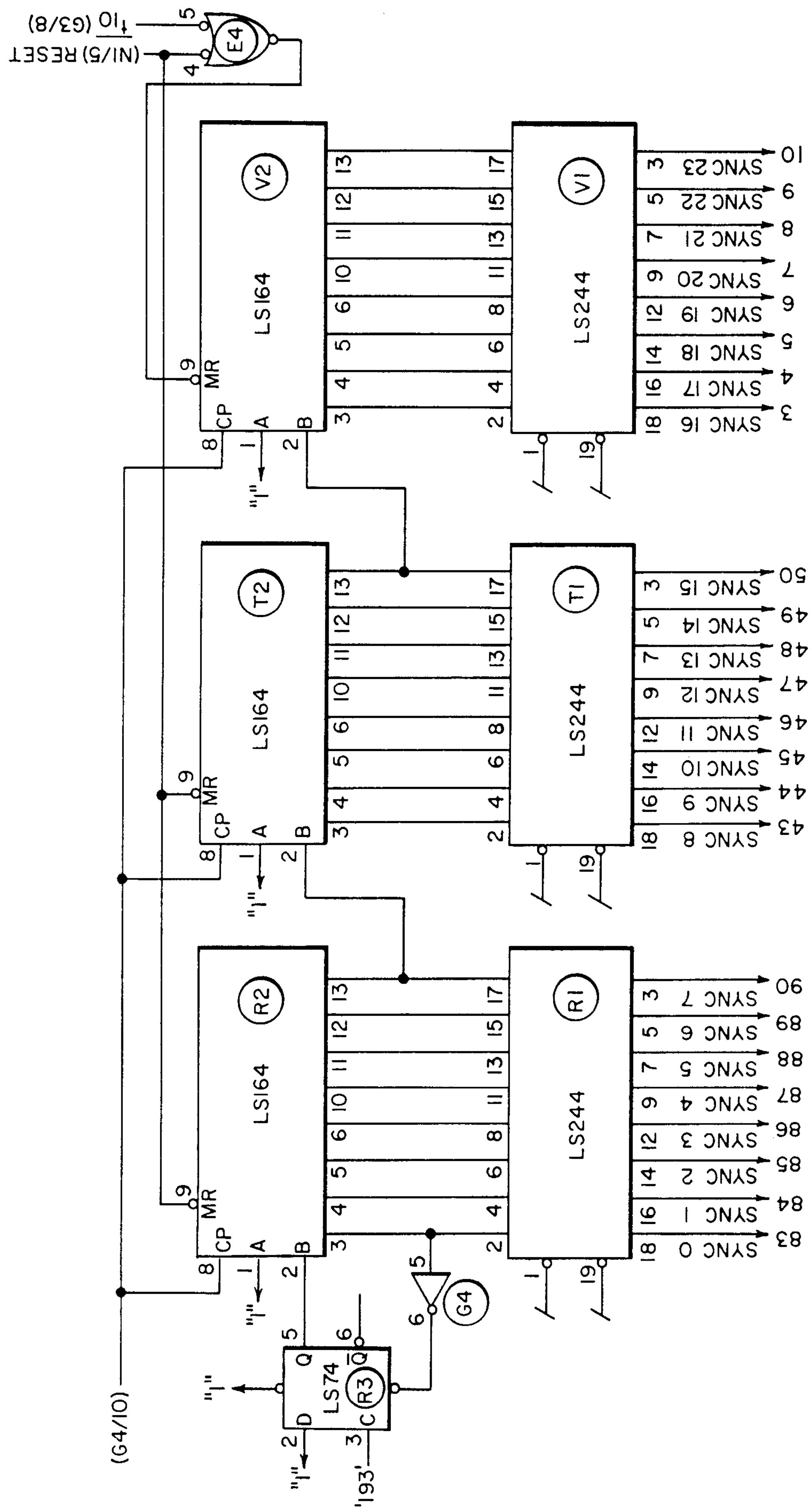

Reference is now made to FIG. 4 which is a block diagram of transmitter timing circuitry 69 mentioned in connection with FIG. 2. A phase lock loop 200 receives an oscillator input at 1.544 MHz via a switch 202 from either an oscillator 204 such as a Tadiran OTIS or from an external source such as a T 1 digital clock source. The phase lock loop 200 is typically an XR 215 and provides an output to a frequency divider 206, such as an LS 161 whose output is fed back to a second input of the phase lock loop. The phase lock loop thus operates as a frequency synthesizer, producing an output signal of frequency 15.44 MHz which is the basic frequency used in the circuitry.

The output of divider 206 is supplied via an AND gate and an OR gate 210 to a synchronous "192 +1 counter" 212, typically comprising a divide by 8 counter 214 and a divide by 24 counter 216 both of which are typically LS 161 chips. The counter 214 provides CLB, CLA and CAO outputs, while counter 216 provides outputs CA 1-CA 5.

A four input AND gate 218, which receives inputs from Counter 212 provides an output signal every 192nd and 193rd pulse. This output signal is supplied to the SET input of a flip-flop 220, which provides an output to AND gate 208. The output of AND gate 218 is also supplied to a flip-flop 222, whose output is supplied as a reset input to counters 214 and 216.

OR gate 210 also receives an input from an AND gate 224 which receives an input from synchronization circuitry 20 (FIG. 2) which a T 1 digital input is received. This connection enables synchronization of the operation of counter 212 with the T 1 timing input signals.

The output of the phase-lock loop 200, hereinafter referred to as CL is supplied to a shift register 226 comprising LS 74 and LS 164 chips and which provides t 1-9 timing outputs. The CLC output of AND gate 208 is supplied to a clock generator for codecs 228 which provides TXC and RXC outputs and comprises an LS 164 chip. The CLC, CLB and CLA outputs are supplied to a decoder 230 such as an LS 138 and which provides timing outputs P1–P 8. The CLB, CLA and CAO outputs are supplied to a decoder 232 such as an LS 138 which provides timing outputs t A–t H. The output of flip-flop 222 is supplied as an initiate pulse together with clock pulse CAO to a synchronization pulses generator 234, comprising 3 LS 164 chips and which provides synchronization pulses SYNC 1–SYNC 24. The output of flip-flop 222 will be referred to hereinafter as the "193" pulse.

The synchronization circuitry 20, 47 (input) 31, 64 (output) shown in FIG. 2 will now be described. It is understood that this circuitry is required only when a T 1 carrier is connected to the system, and provides the necessary synchronization between the system timing and the external PCM apparatus.

A counter 236 receives the 193 pulse and counts the basic timing frames in cycles of 12. A pair of AND gates 238 and 240 code the 6th and 12th states of the counter to identify signalling frames. A shift register 242 shifts in the 193 bit from each of the 12 basic timing frames and an AND gate 244 decodes the synchronization pattern at the output of shift register 242.

The output of AND gate 244 is coupled to a flip-flop 246 via an AND gate 248 and is also coupled directly to a flip-flop 250. The 193 pulse is supplied as a clock input directly to flip-flop 246 and via an AND gate 252 to flip-flop 250 as a clock input. AND gate 252 multiplies the 193 pulse by the output of AND gate 240.

When the apparatus is in the state of synchronization acquistion, both flip-flops 246 and 250 are reset. When a synchronization pattern appears at the output of shift register 242, flip-flop 246 is set. The synchronization is verified by checking the apparance of the synchronization pattern at the output of shift register 242 at the end of the next cycle of 12 basic timing frames. If during synchronization acquisition, no synchronization pattern appears at the output of shift register 242 during 12 basic timing frames, an additional clock input is provided to AND gate 224 from an AND gate 254 which receives the output of AND gate 240 and the inverted output of flip-flop 246. The additional clock input causes a shift in system timing by one data bit period.

When synchronization is achieved, flip-flop 250 is set and an error counter 256 is preset every basic timing frame via an AND gate 258 which also receives the 193 pulse. When synchronization is lost the preset is terminated and the error counter is incremented by the 193 pulse. When the counter reaches eight error counts it resets flip-flops 246 and 250 and the apparatus returns to a synchronization acquisition state.

The above circuitry is comprised in the synchronization input circuits 20 and 47 of FIG. 2. The synchronization output circuitry additionally comprises a 12/1 multiplexer 260 which has a hard wired input representing a predetermined synchronization pattern, and is addressed by a four bit output from counter 236.

The output of multiplexer 260 is supplied to an input of a 2/1 multiplexer 62 which receives the OUT DATA output from the parallel to serial converter (28 or 56 in FIG. 2). Multiplexer 260 inserts the synchronization pattern bit by bit in the 193rd time slot of the basic timing frame. The output of multiplexer 262 is supplied to an external PCM device.

Figure 8B:
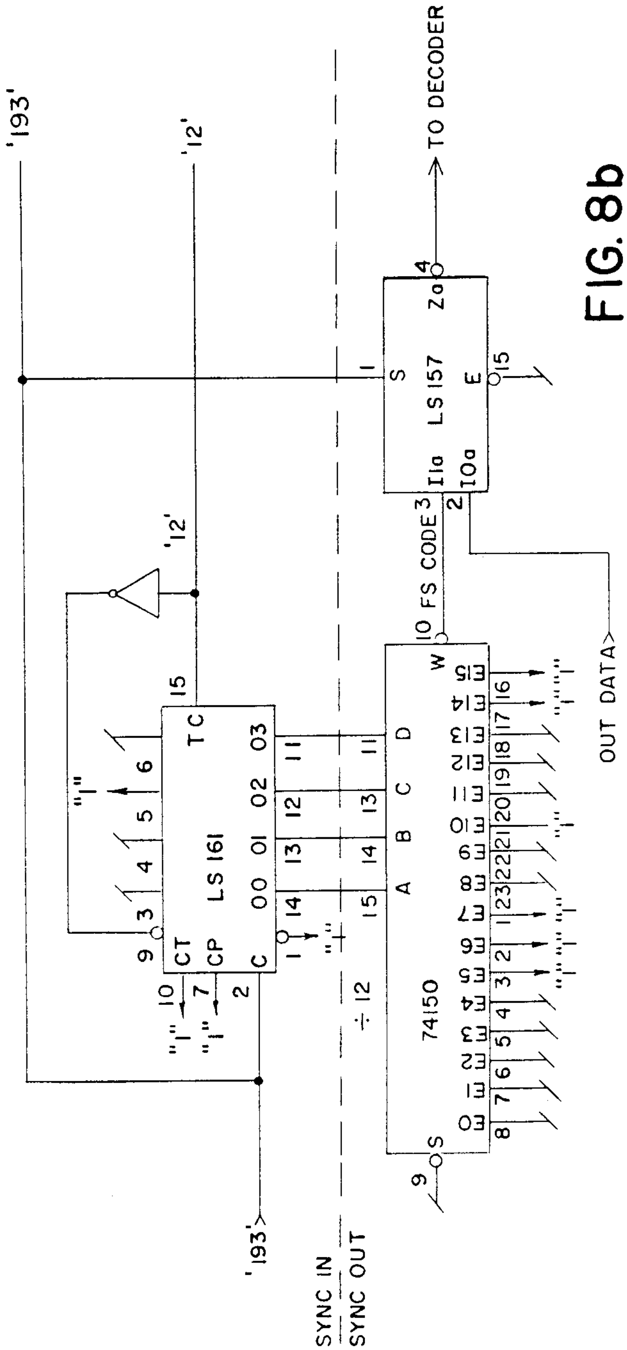
FIG. 8(*a* & *b*) is a schematic illustration of input and output synchronization circuitry.
Figure 6:
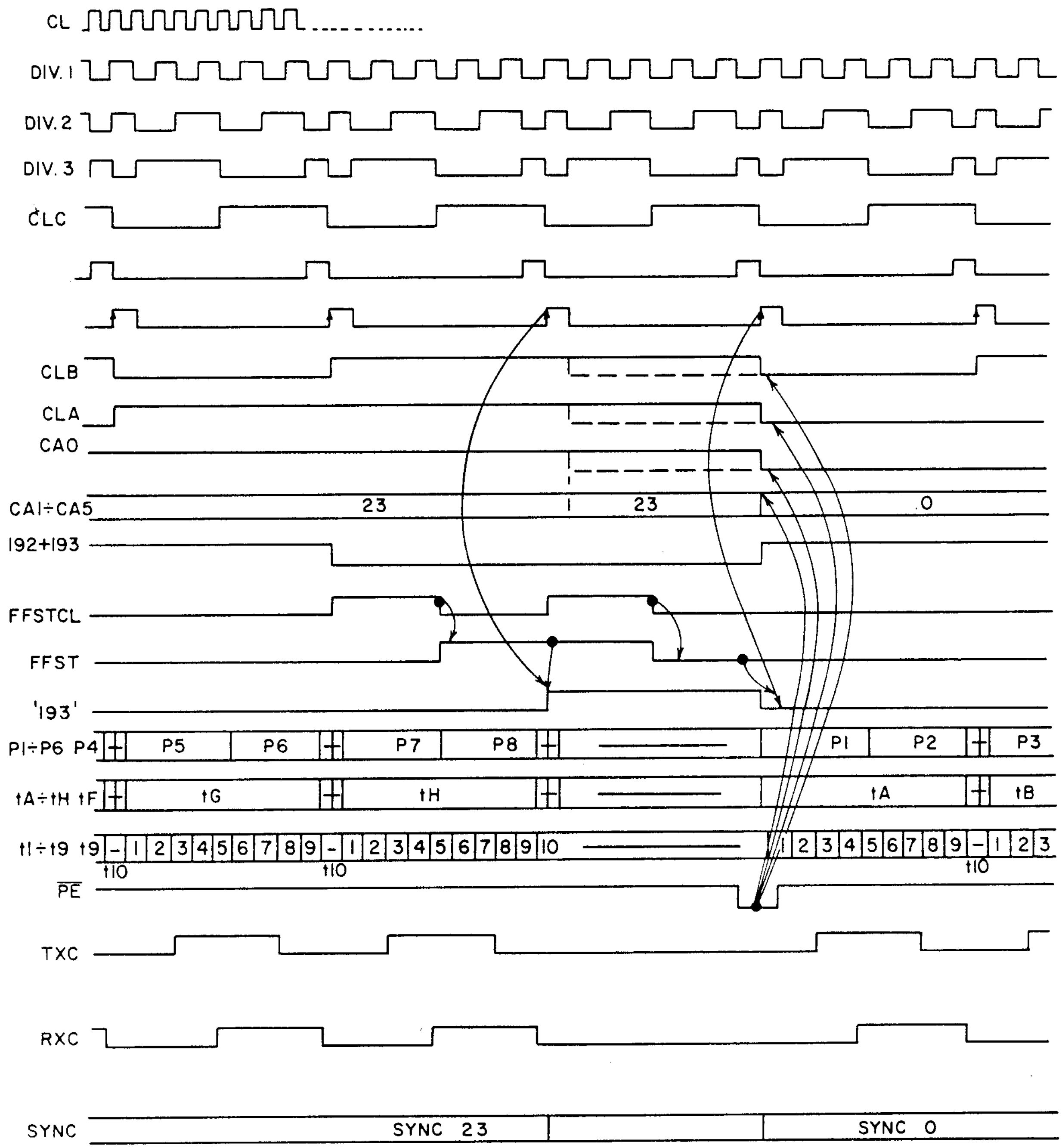
FIG. 6 is a main timing diagram of the system.
Figure 7:
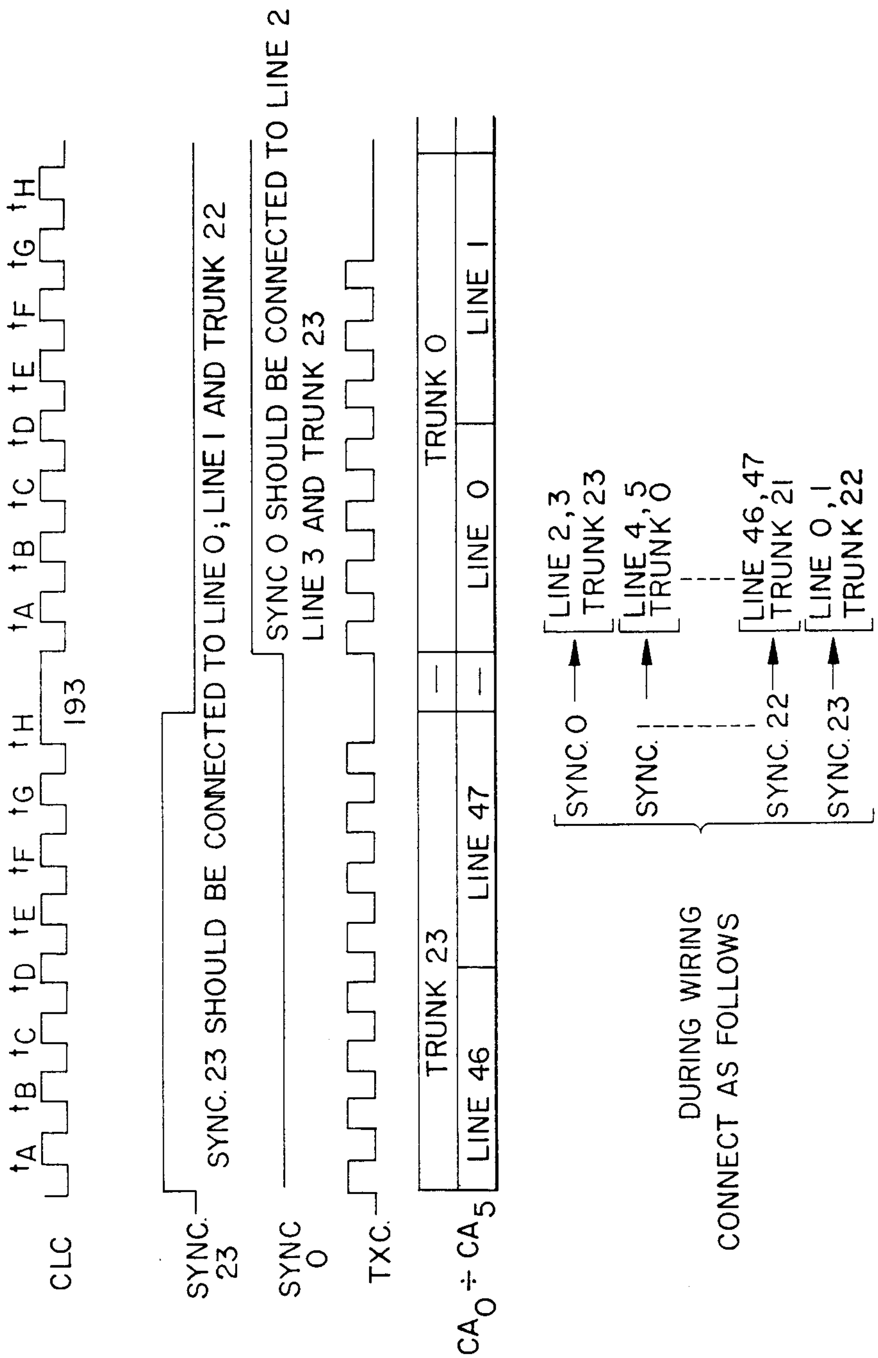
FIG. 7 is a timing diagram of the transmit synchronization timing.
Figure 8A:
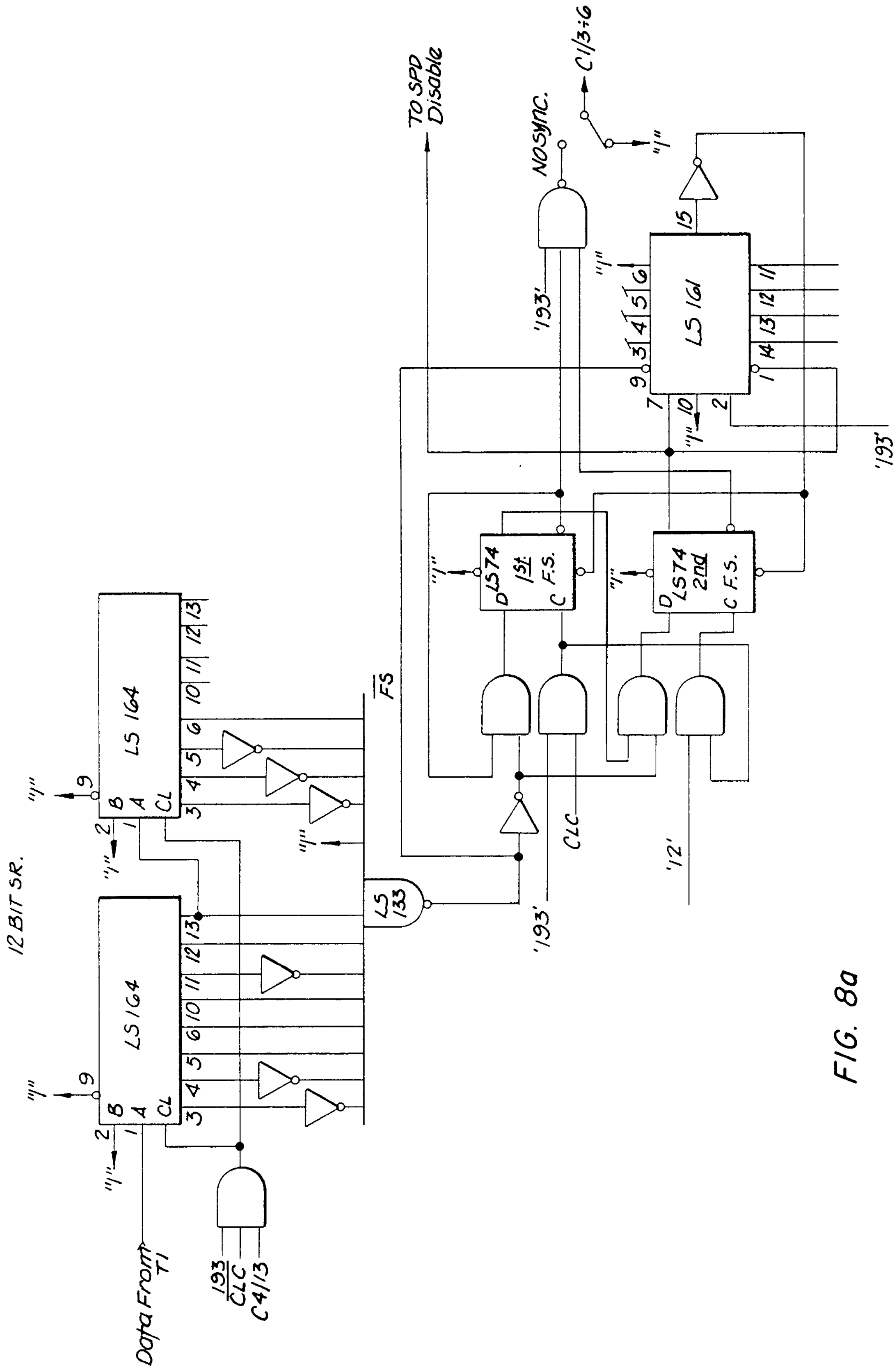
Figure 9A:
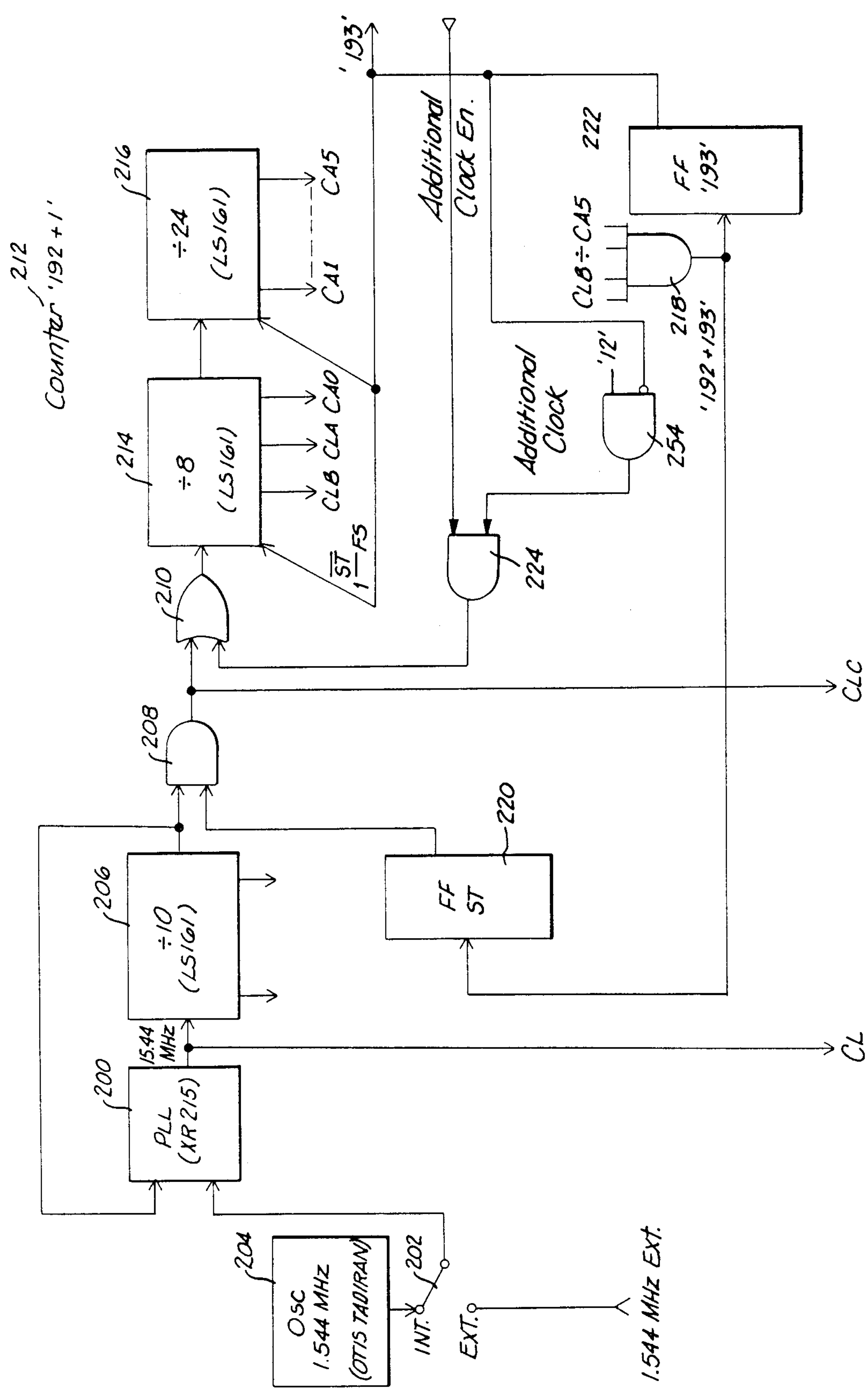
FIG. 9(*a* to *c*) is a block diagram of receive timing circuitry; divided into three parts a–c.
Figure 9B:
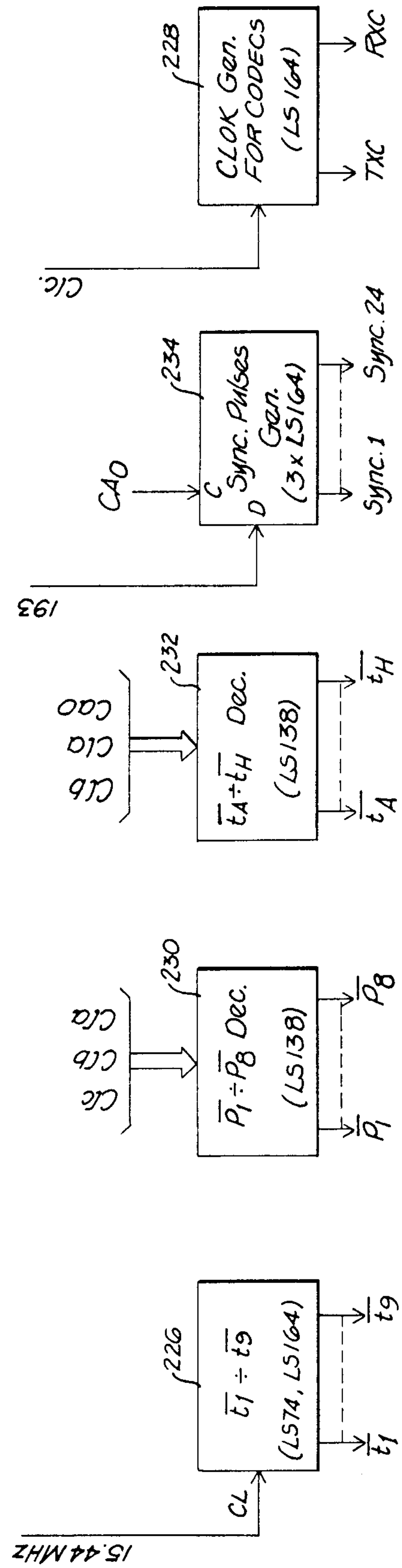
Figure 9C:
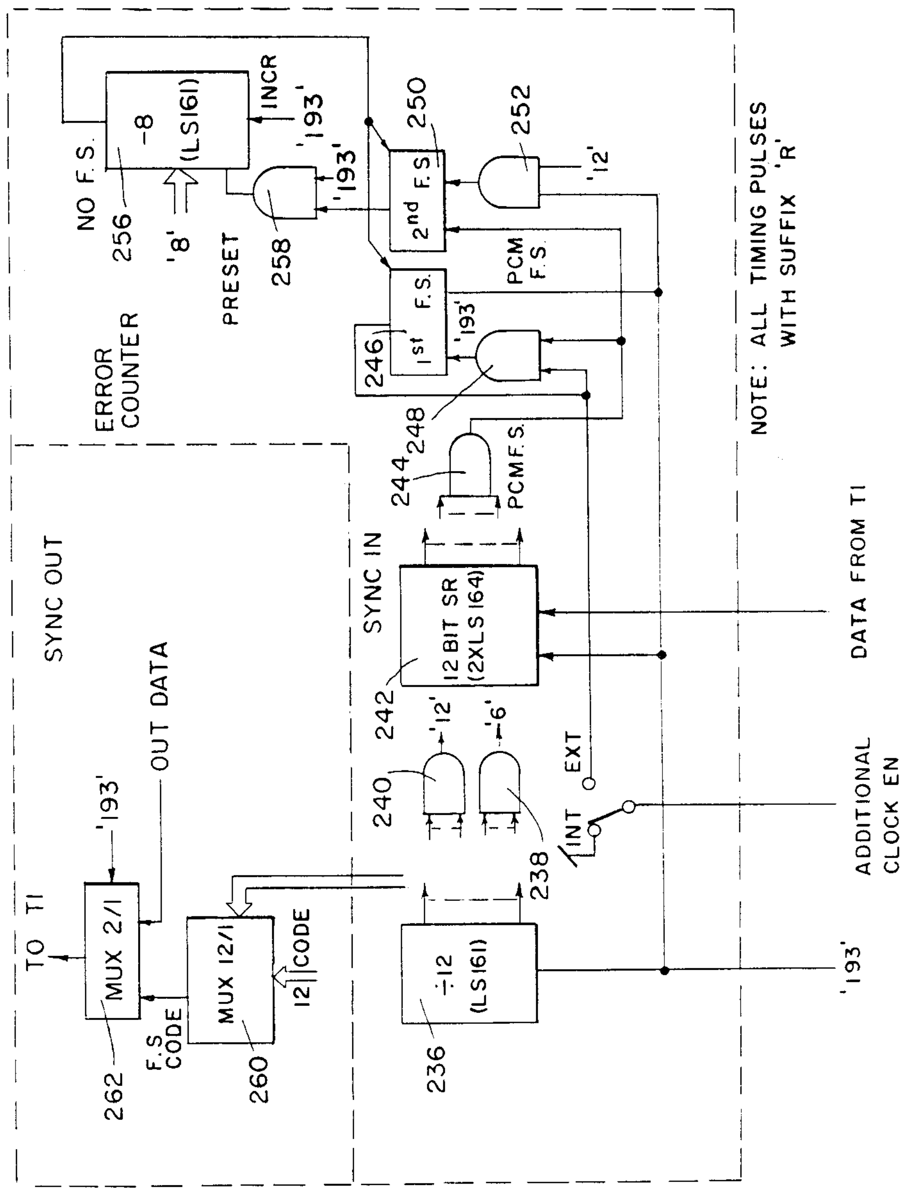
Figure 10A:
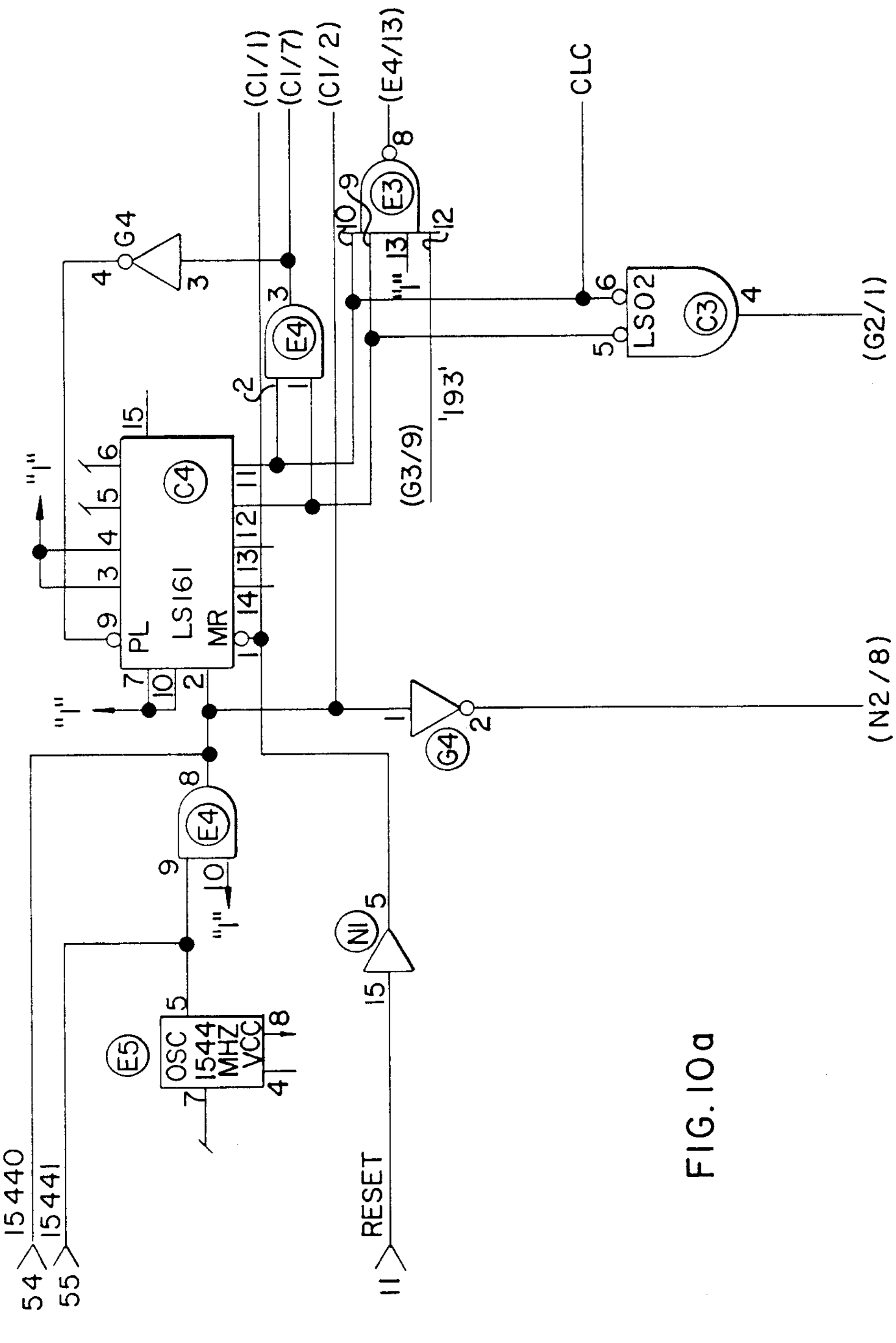
FIG. 10(*a* to *f*) is a schematic illustration of receive timing circuitry shown in FIG. 9.
Figure 10B:
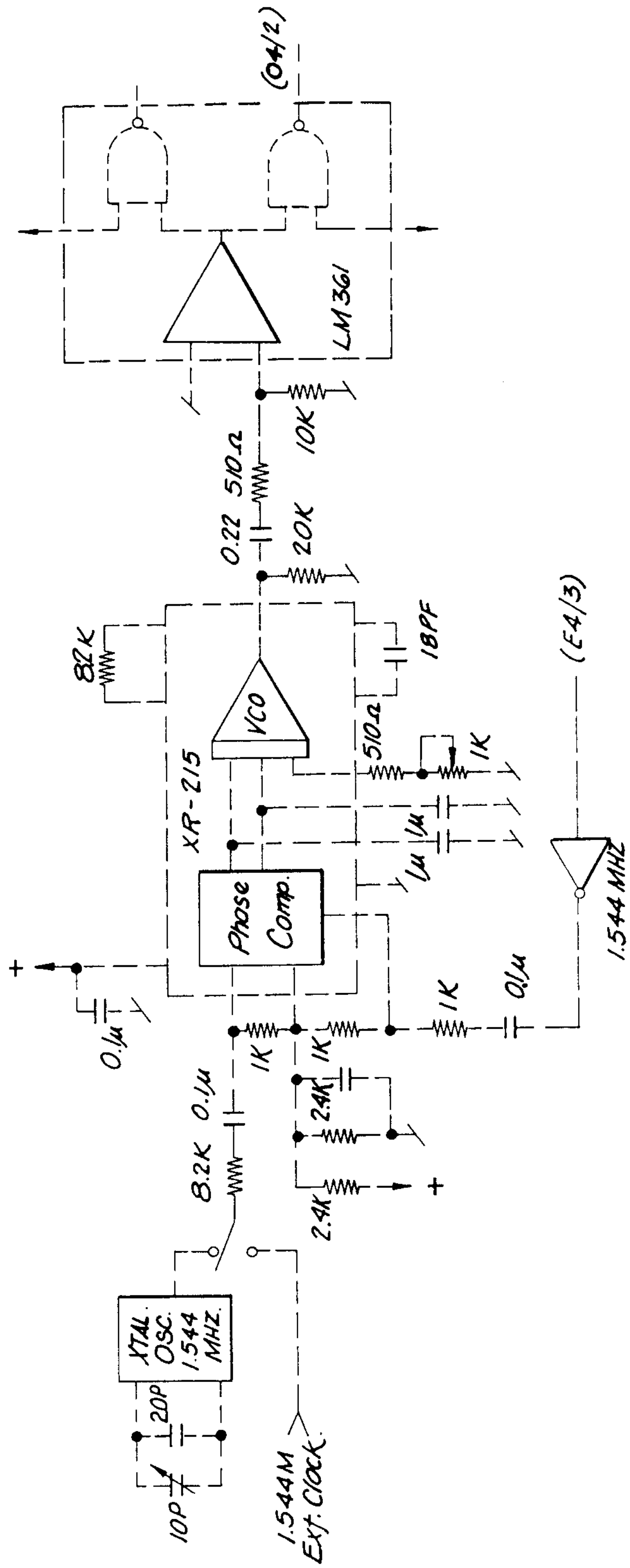
Figure 10C:
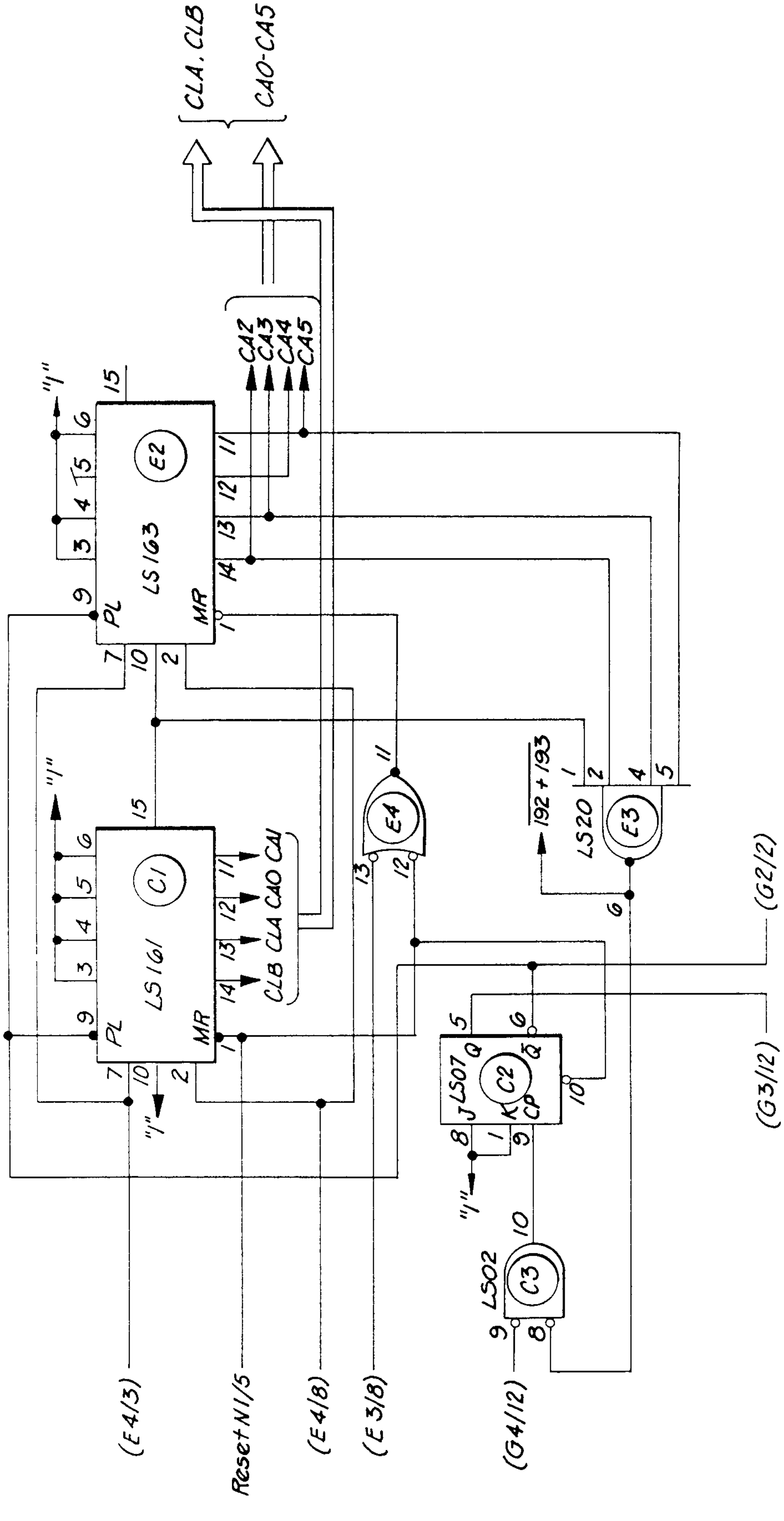
Figure 10D:
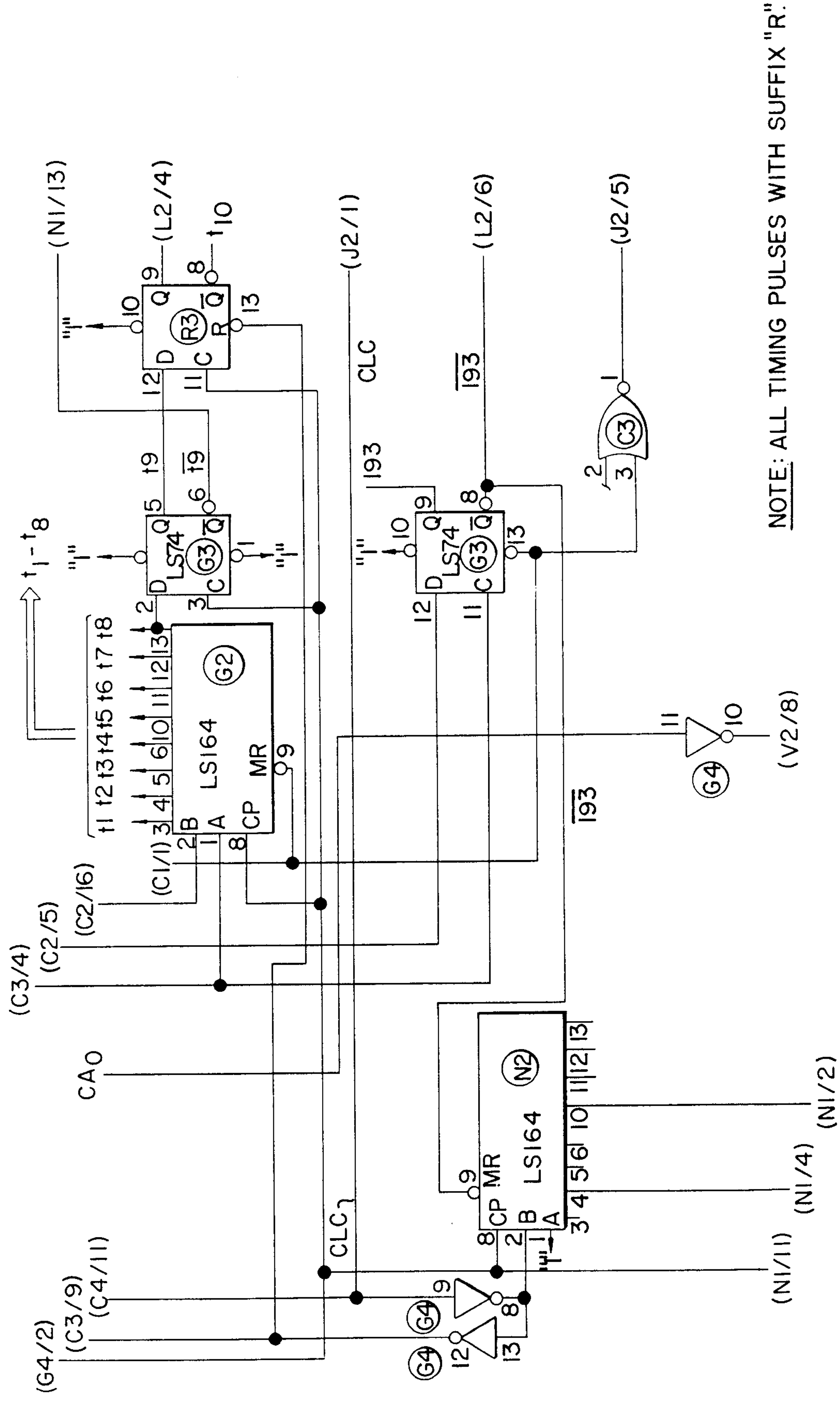
Figure 10E:
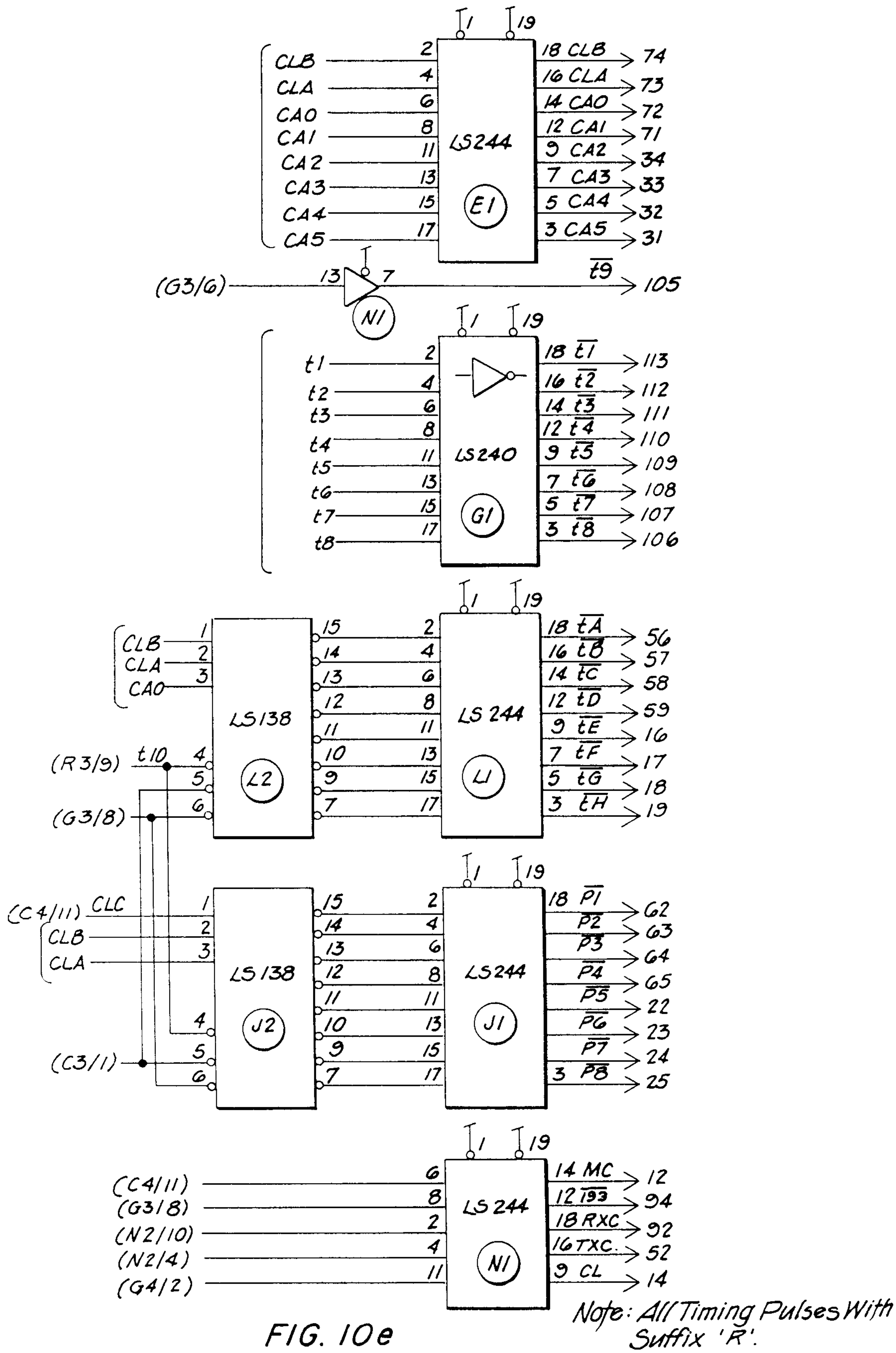
Figure 10F:
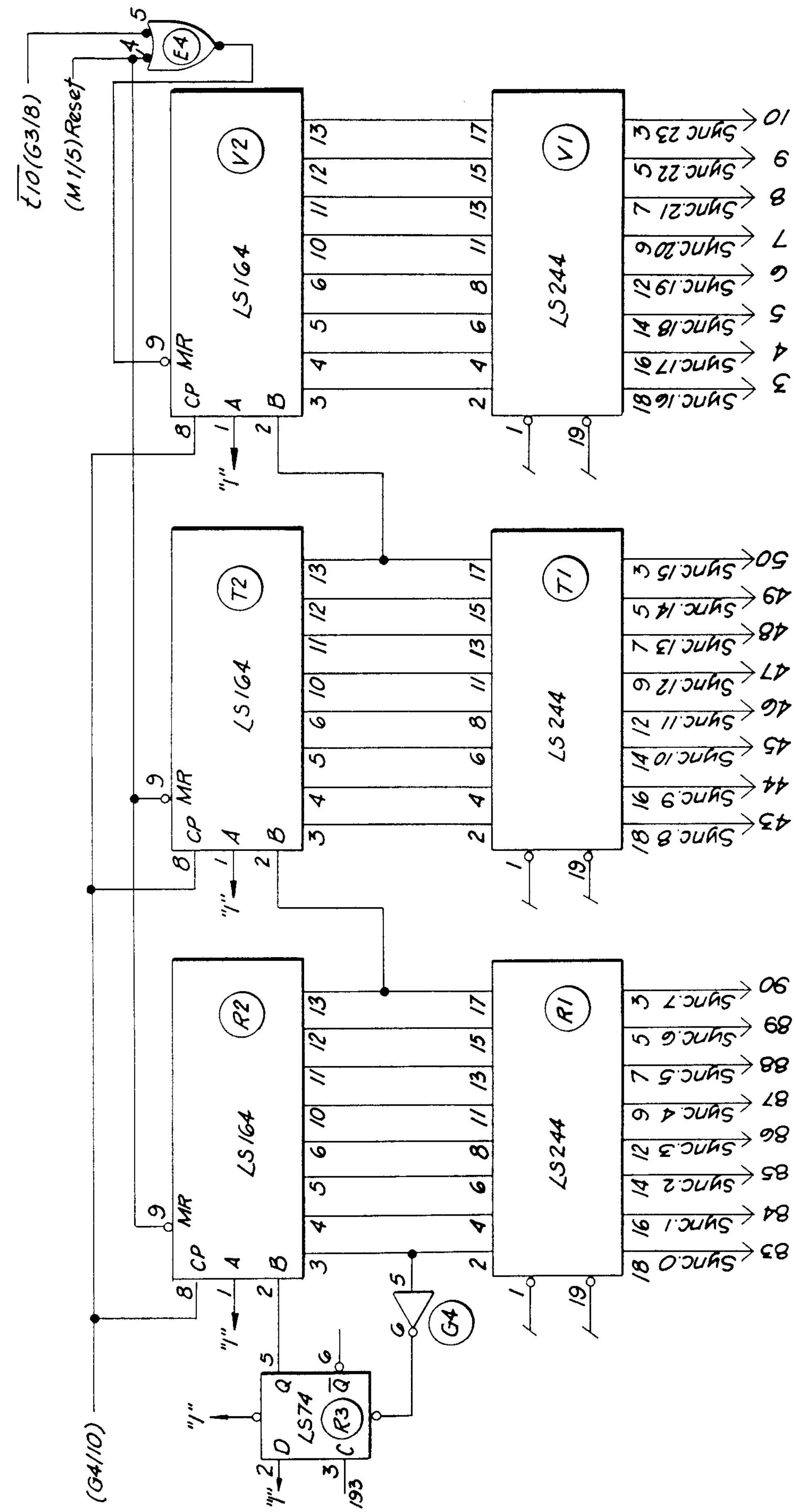

Reference is now made to FIG. 5 which is a detailed schematic illustration of the timing circuitry illustrated in block diagram form in FIG. 4 FIG. 6 is a timing diagram of the timing circuitry if FIGS. 5 and 10. FIG. 7 is a timing diagram of the interrelationship of the outputs of synchronization pulse generator 234 (FIG. 4). FIG. 8 is a detailed schematic illustration of the synchronization circuitry (input and output) described in block diagram form in FIGS. 4 and 9. FIG. 9 is a block diagram of receiver timing circuitry which corresponds exactly to the timing circuitry of FIG. 4 and for the sake of conciseness, will not be described here in detail except by general reference to the block diagram. FIG. 10 is a detailed schematic illustration of the timing circuitry of FIG. 9.

Figure 11:
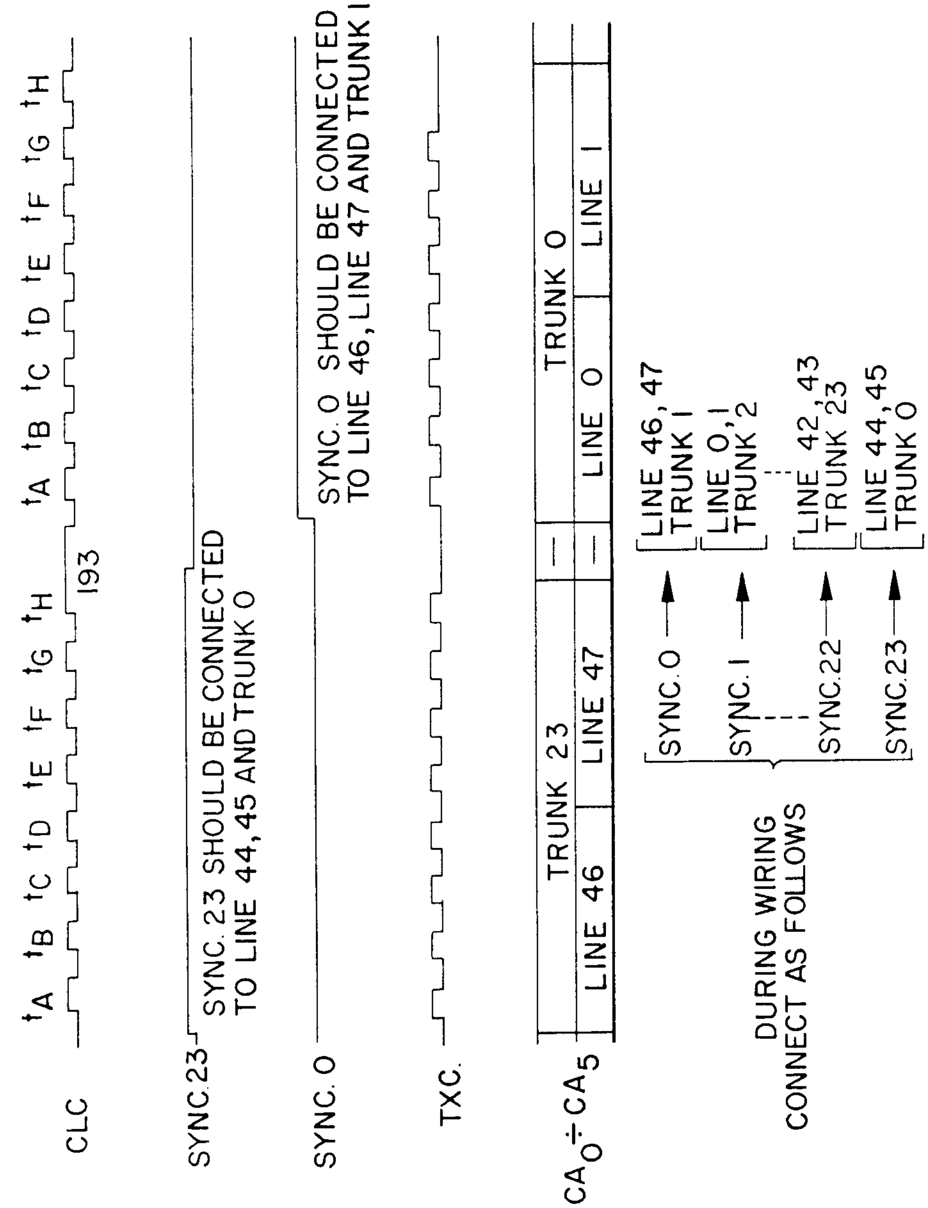
FIG. 11 is a timing diagram of the receive synchronization timing.

FIG. 11 is a timing diagram of the interrelationship of the outputs of the synchronization pulse generator shown in FIG. 9.

Figure 12B:
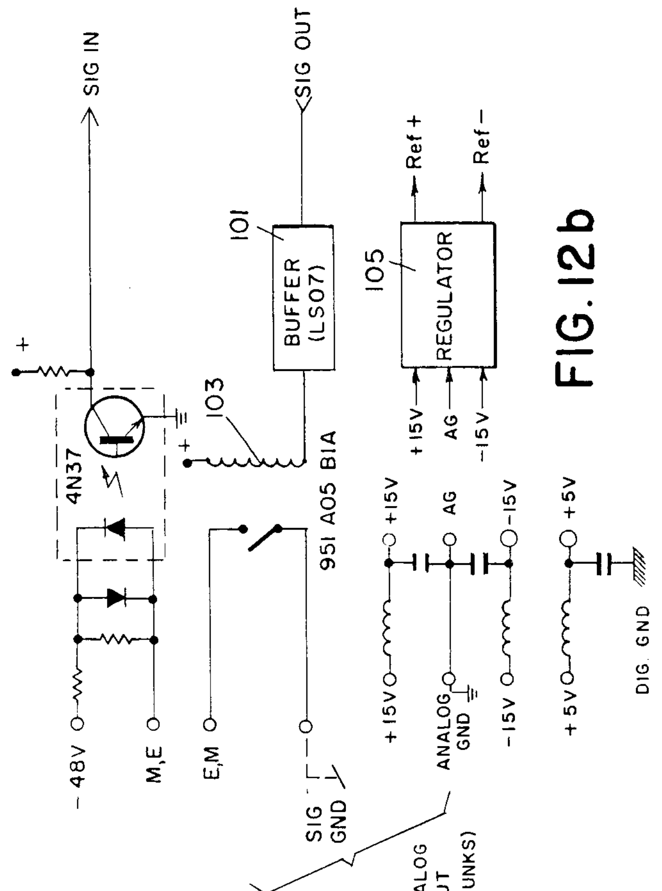
FIG. 12(*a* & *b*) is a block diagram of interface circuitry; divided into 2 parts a,b.
Figure 2D:
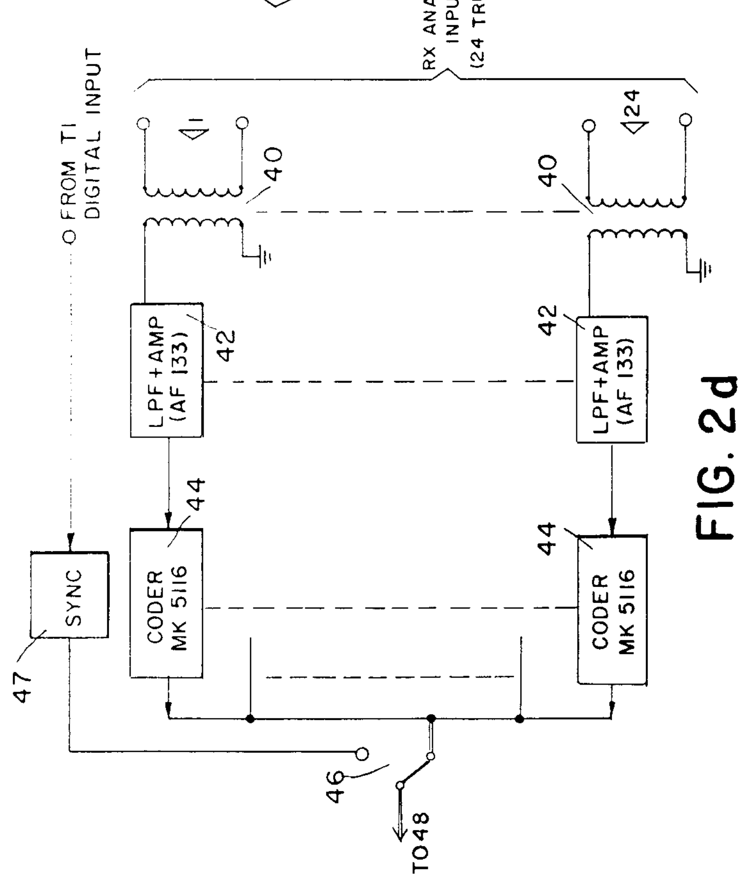
Figure 2E:
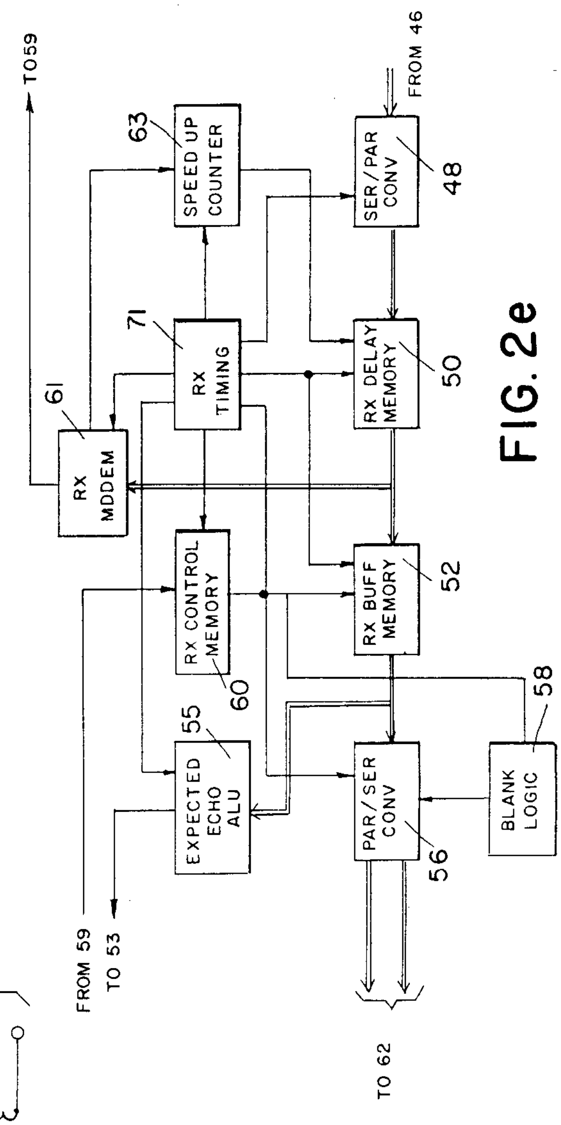
Figure 2F:
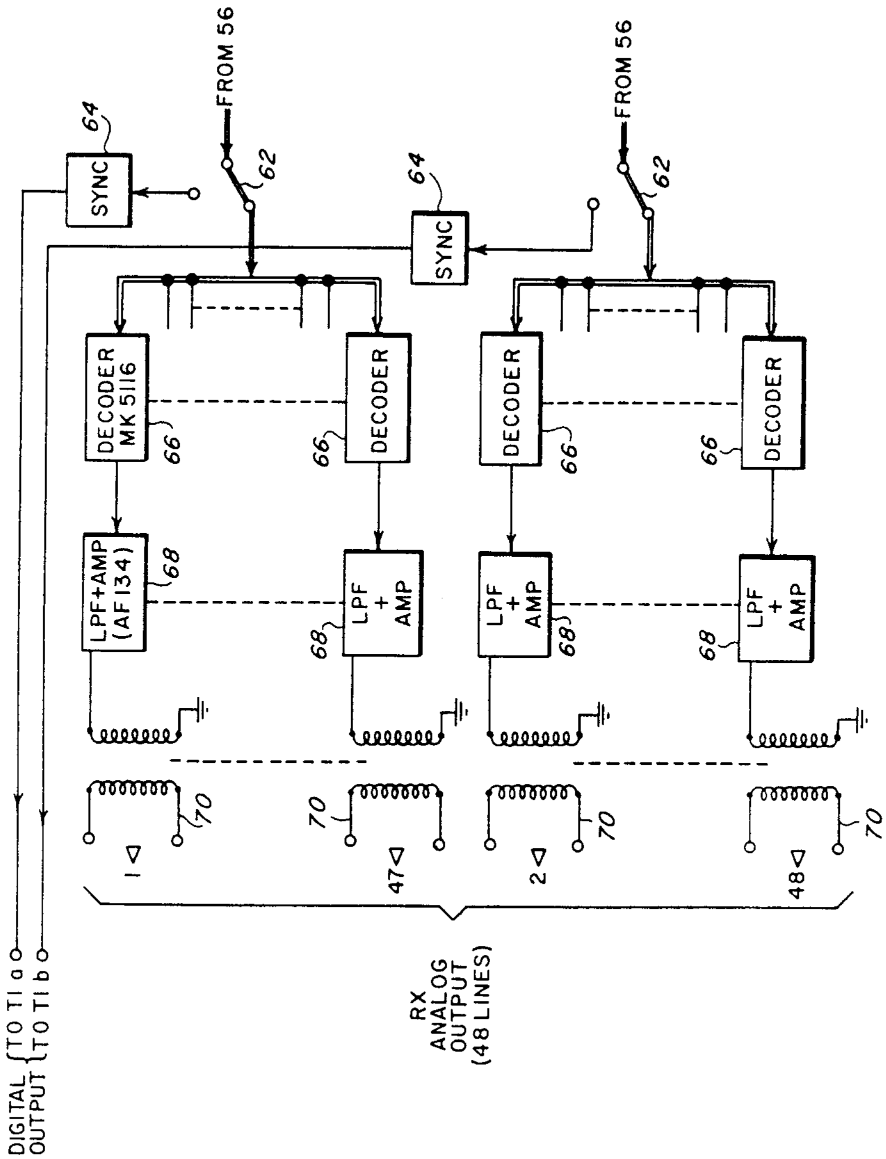
Figure 12A:
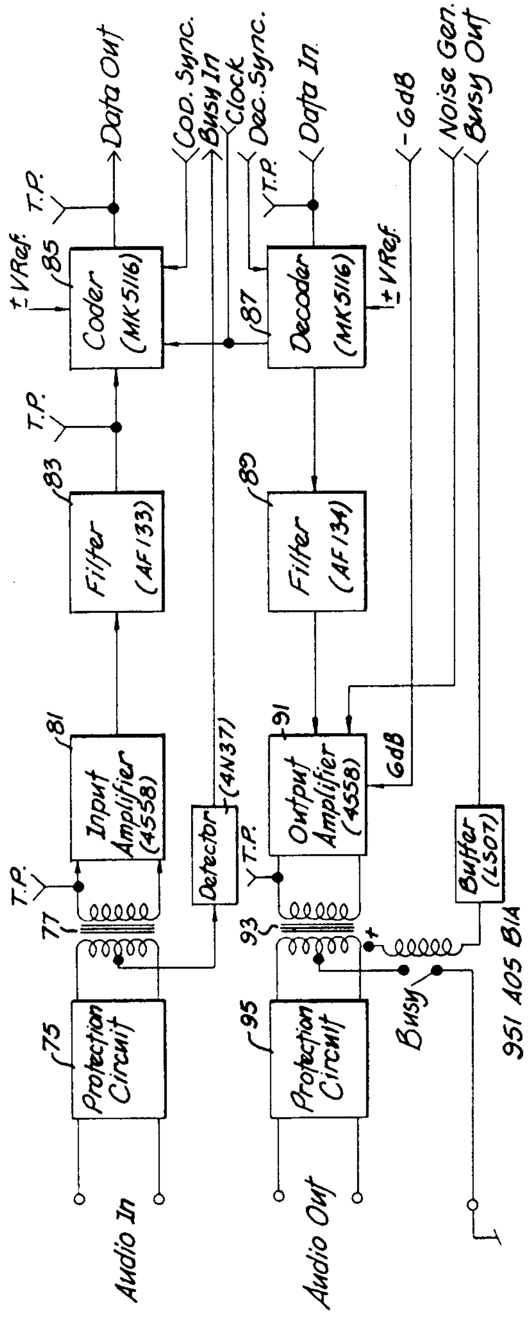
Figure 13A:
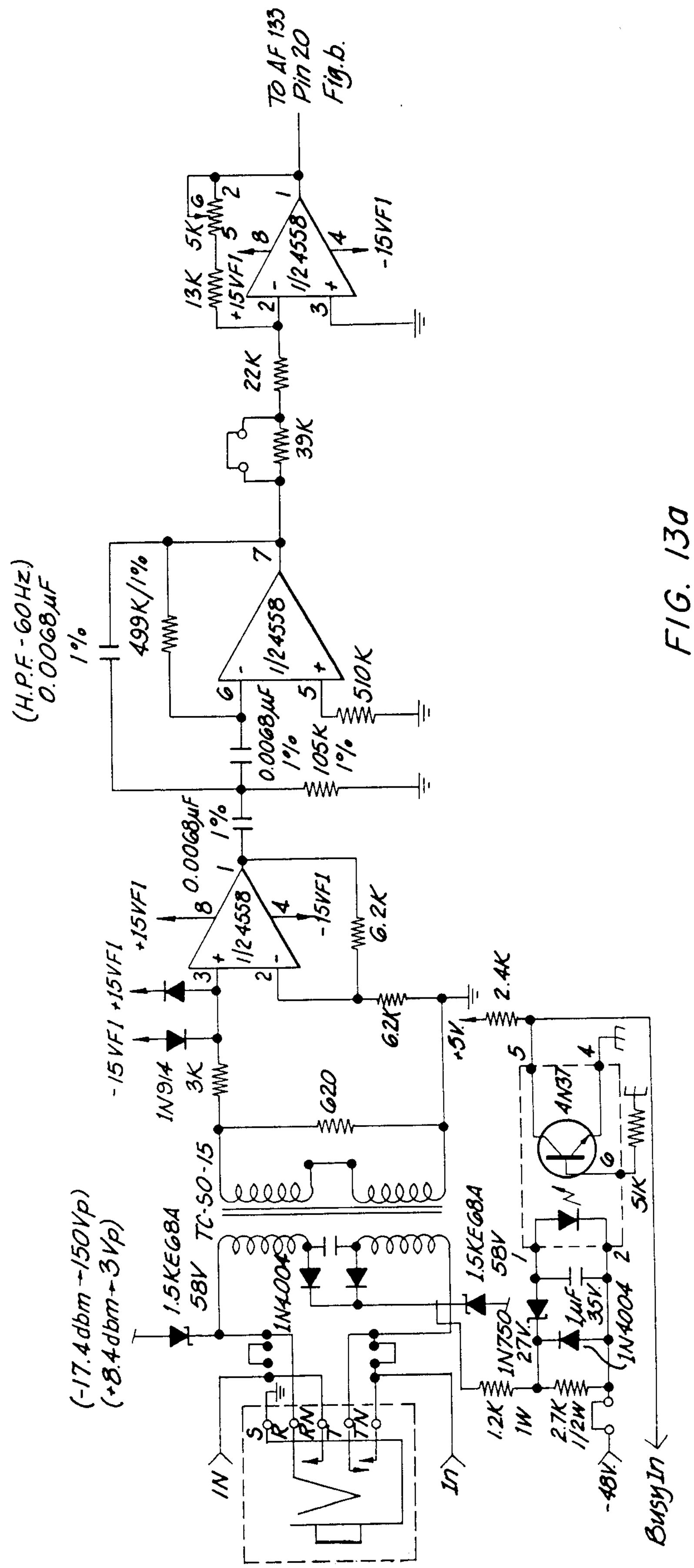
FIG. 13(*a* to *d*) is a schematic illustration of the interface circuitry shown in FIG. 12.
Figure 13B:
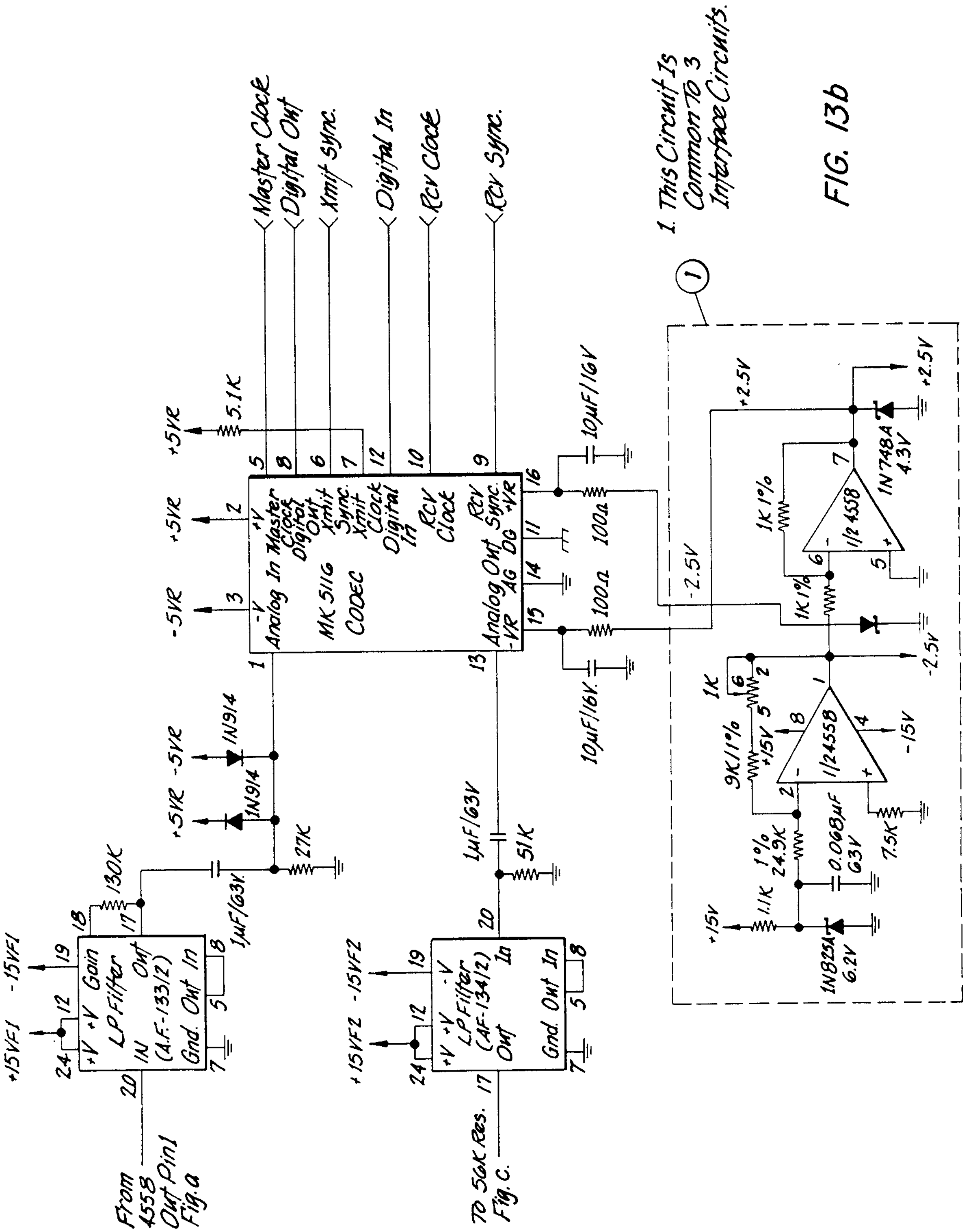
Figure 13C:
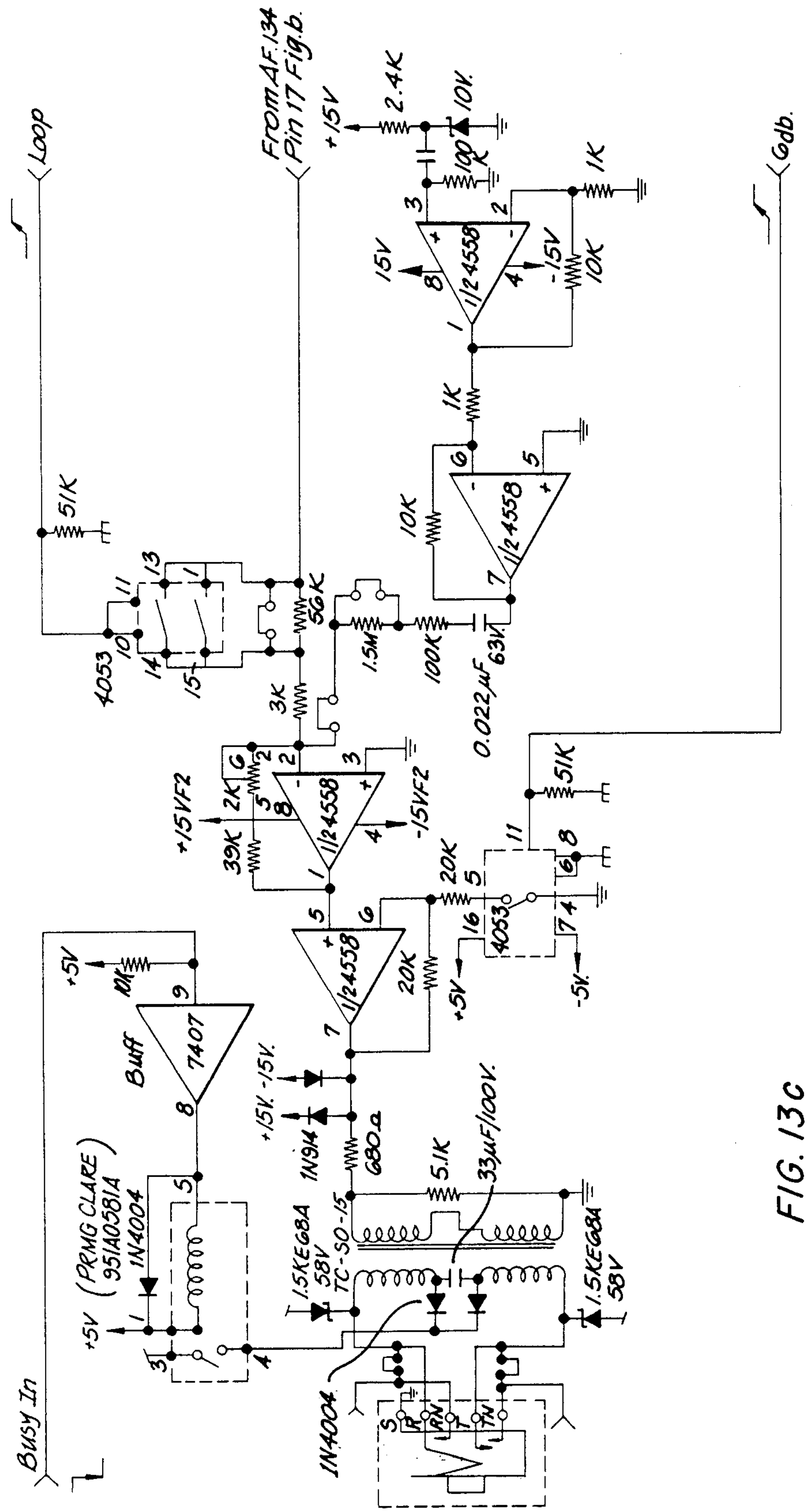
Figure 13D:
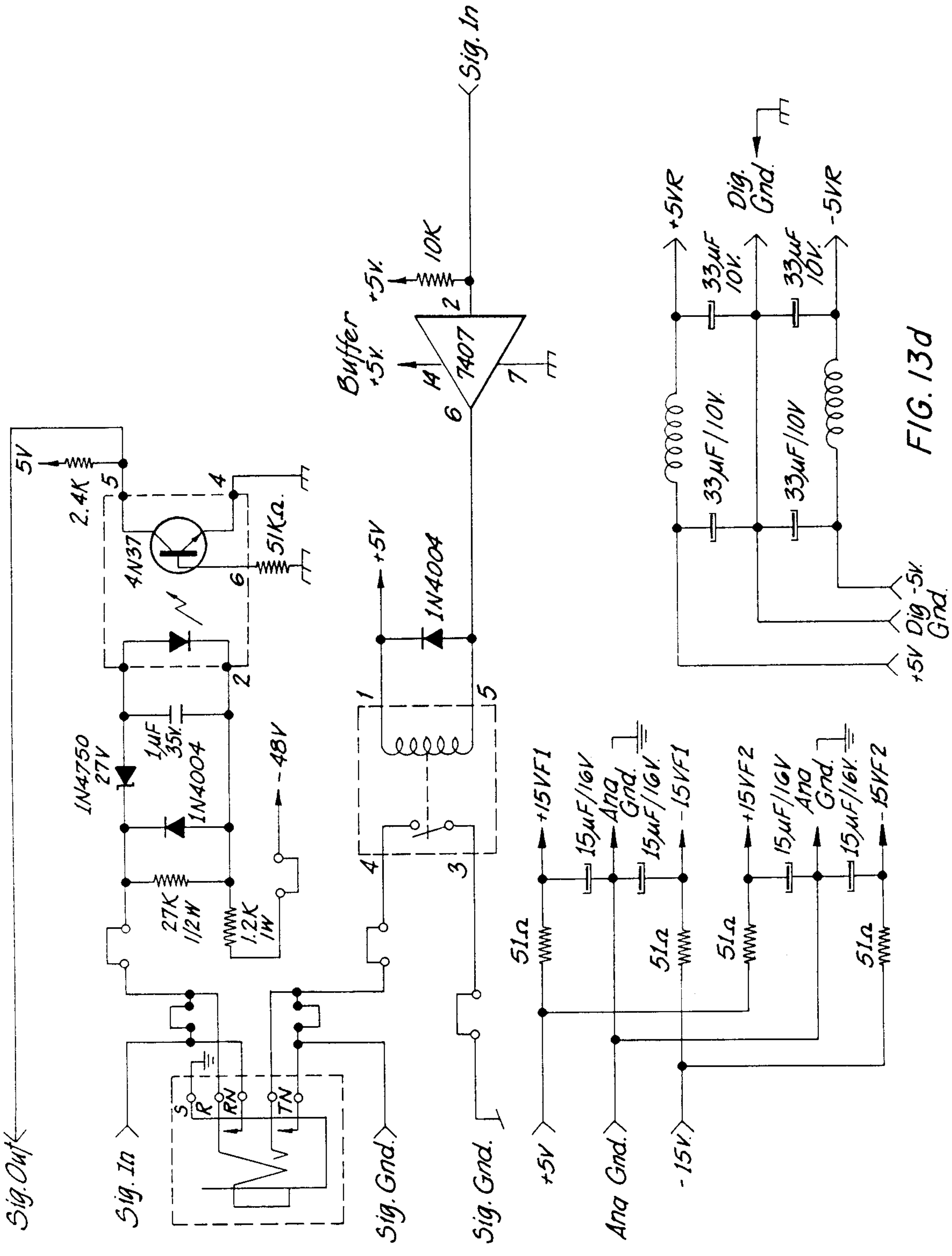

Reference is now made to FIG. 12 which is a block diagram of the interface circuitry for use with analog transmissions. 48 of these circuits interconnect the apparatus with 48 telephone communication lines and 24 of these circuits interconnect the apparatus with 24 communication channels in the illustrated embodiment.

An audio input from either a telephone communication line or a communication channel is supplied to a protection circuit 75 whose output is supplied to a transformer 77 (10 or 40 in FIG. 2). The center tap of the transformer 77 is connected to the input of a detector 79 which detects a ground potential provides by multiplex equipment external of the apparatus and indicating a busy status. The output of transformer 77 is supplied to an input amplifier 81 for adjusting the signal level at the input to that required by the coder. The output of amplifier 81 is supplied via a low-pass filter 83 to a coder 85 (14 or 44 in FIG. 2), which receives timing and clock inputs from timing circuitry described hereinabove. In response to receipt of a code synchronization signal from the timing circuitry, the coder provides an 8 bit serial channel data output.

Decoder 87 (32 or 66 in FIG. 2) receives 8 bit serial input data from parallel to serial converter 28 or 56 (FIG. 2) and clock and timing inputs from the timing circuitry and provides an analog output to a low pass filter 89. The output of filter 89 is supplied to an output amplifier 91 which receives an input from a noise generator and a 6 dB attenuation command signal from SPD/ALU circuitry 57 (FIG. 2). The output of amplifier 91, being a combination of the input from filter 89 and from the noise generator, is supplied to a transformer 93 (70 or 36 in FIG. 2). The output of transformer 93 is supplied via a protection circuit 95 to the audio output to either a telephone communication line or a communication channel.

A BUSY OUT signal from signalling circuitry is supplied via a buffer 97 to a relay 99. When relay 99 is activated, a BUSY signal is applied to the audio output via the center tap of transformer 93.

Out of band signalling input signals M or E are supplied via an optocoupler 99 to an input of the signalling circuitry. A buffer 101 receives a signalling output from the signalling circuitry and drives relay 103 which when activated transmits an E or M signal. A regulator 105 supplies reference voltages for the coder and decoder.

FIG. 13 is a detailed schematic illustration of the circuitry illustrated in FIG. 12 according to a preferred embodiment of the present invention.

Figure 14A:
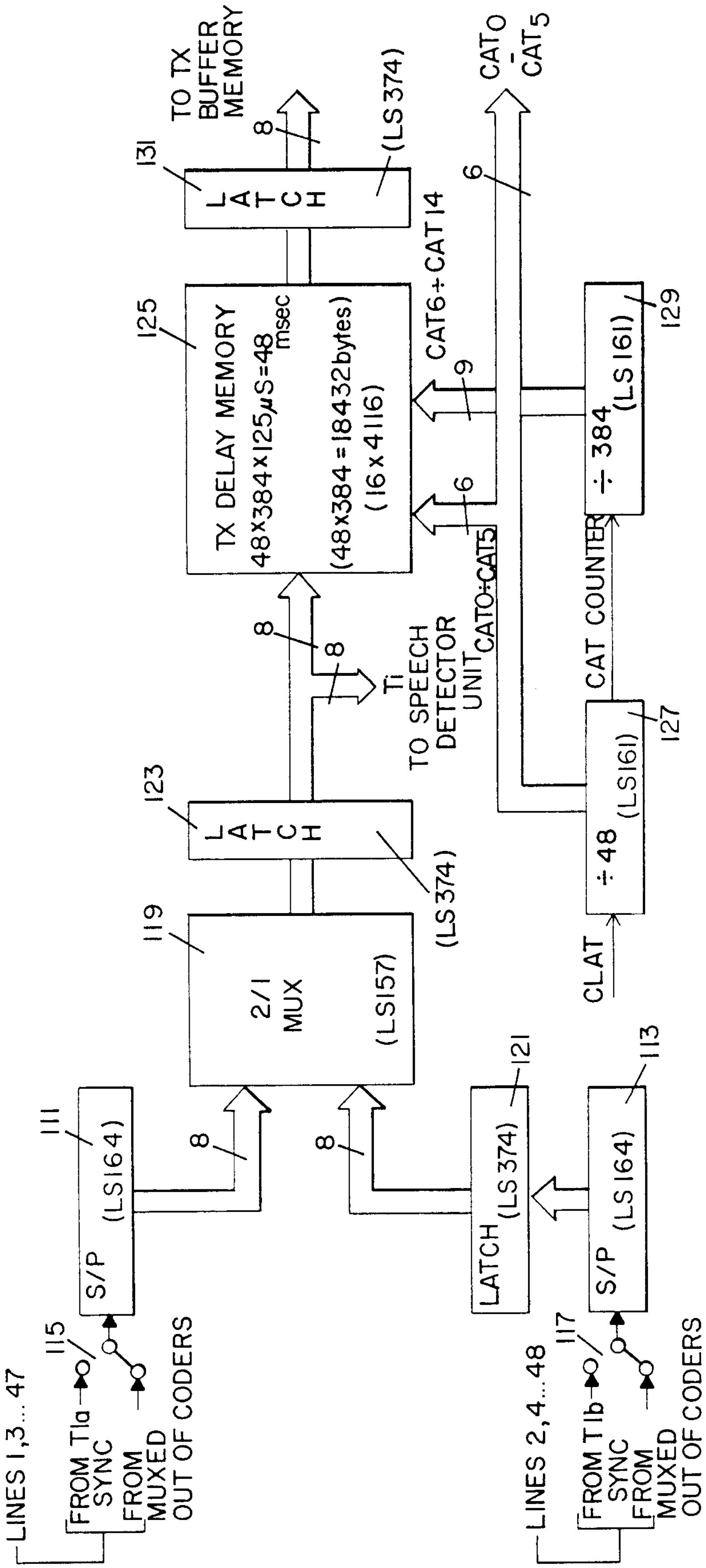
FIG. 14(*a* & *b*) is a block diagram of the transmit speech flow in the circuitry of FIG. 2; divided into two parts a,c.
Figure 14B:
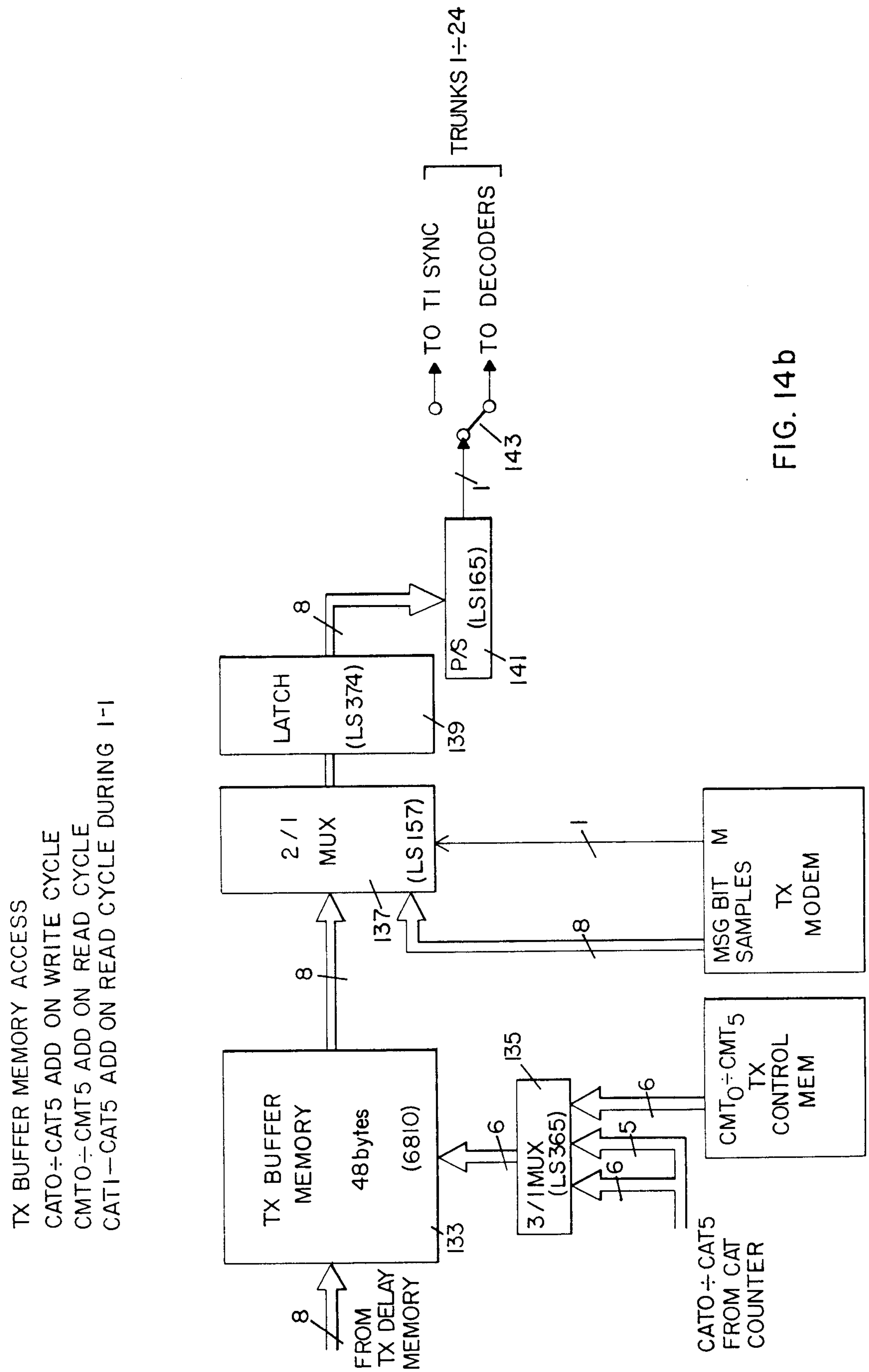
Figure 15A:
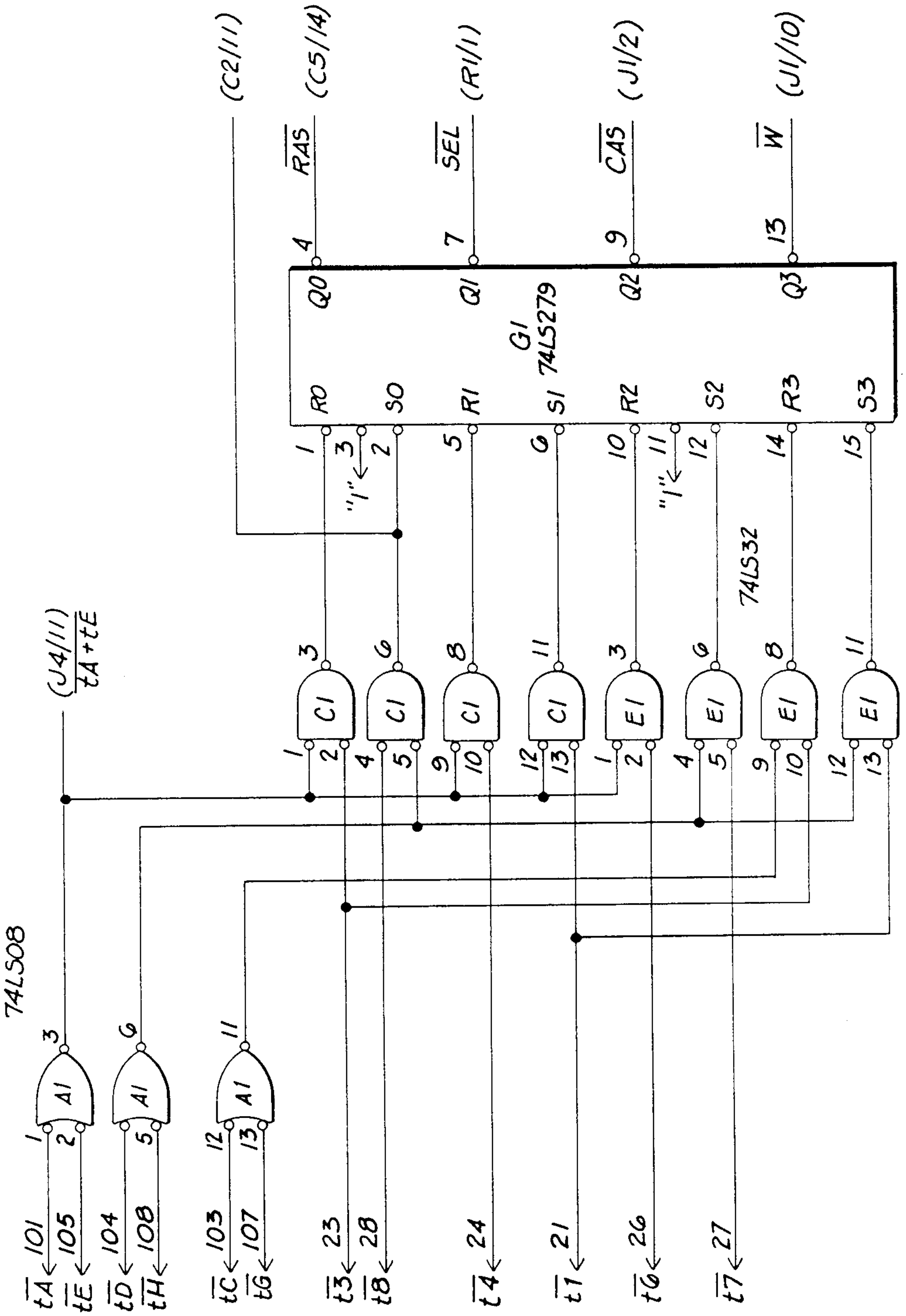
FIG. 15(*a* to *k*) is a schematic illustration of the circuitry of FIG. 14.
Figure 15B:
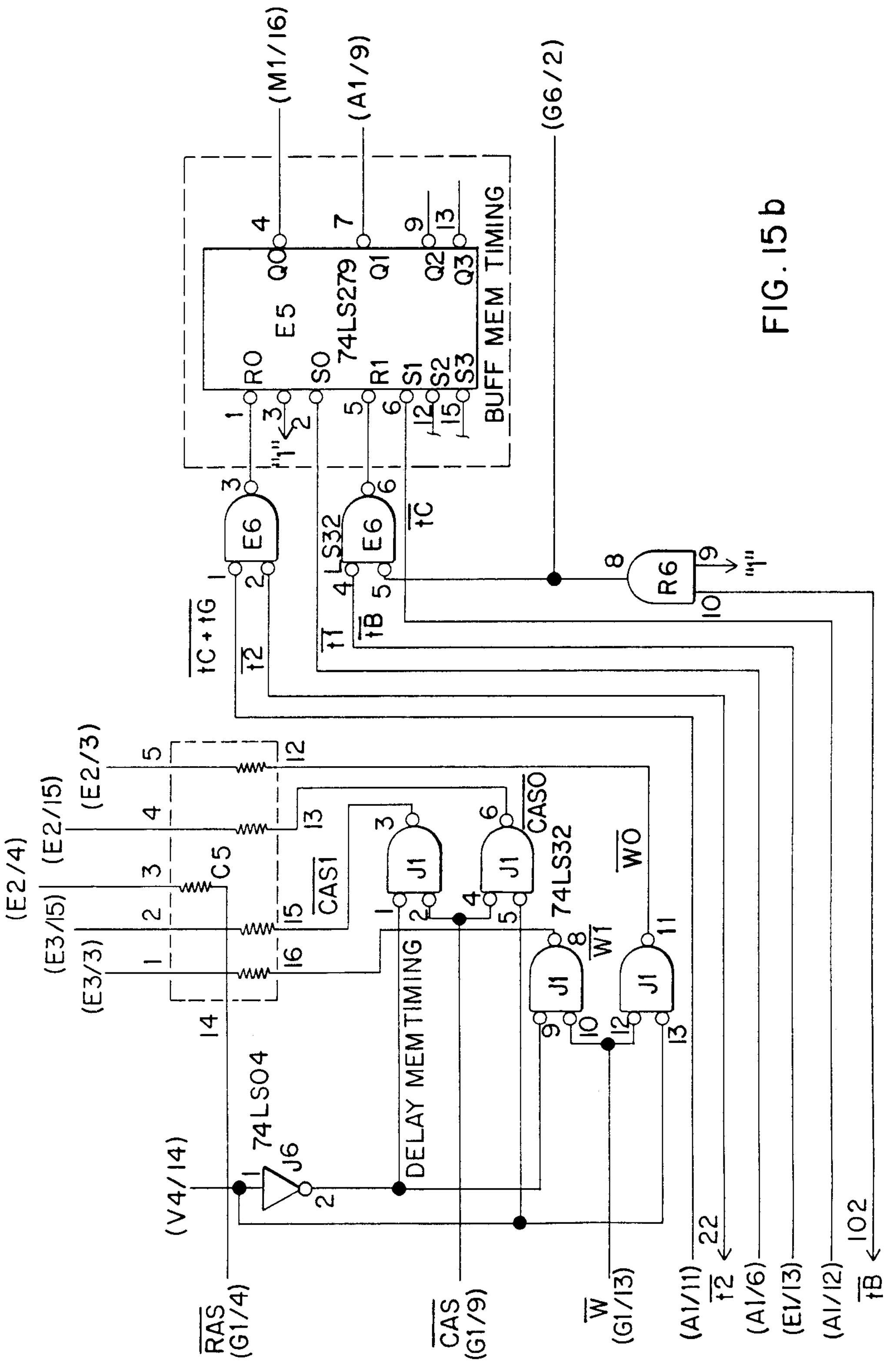
Figure 15C:
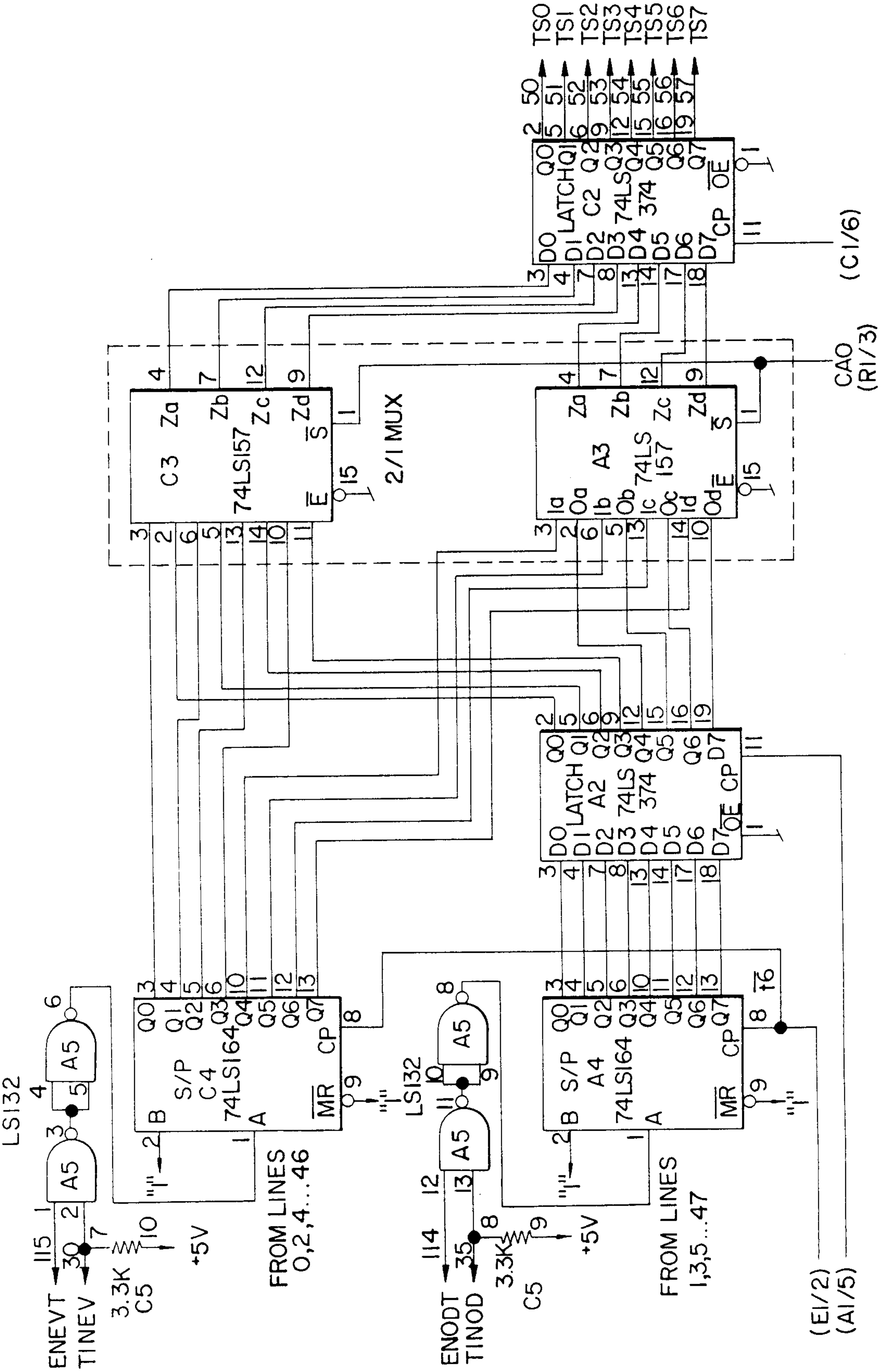
Figure 15D:
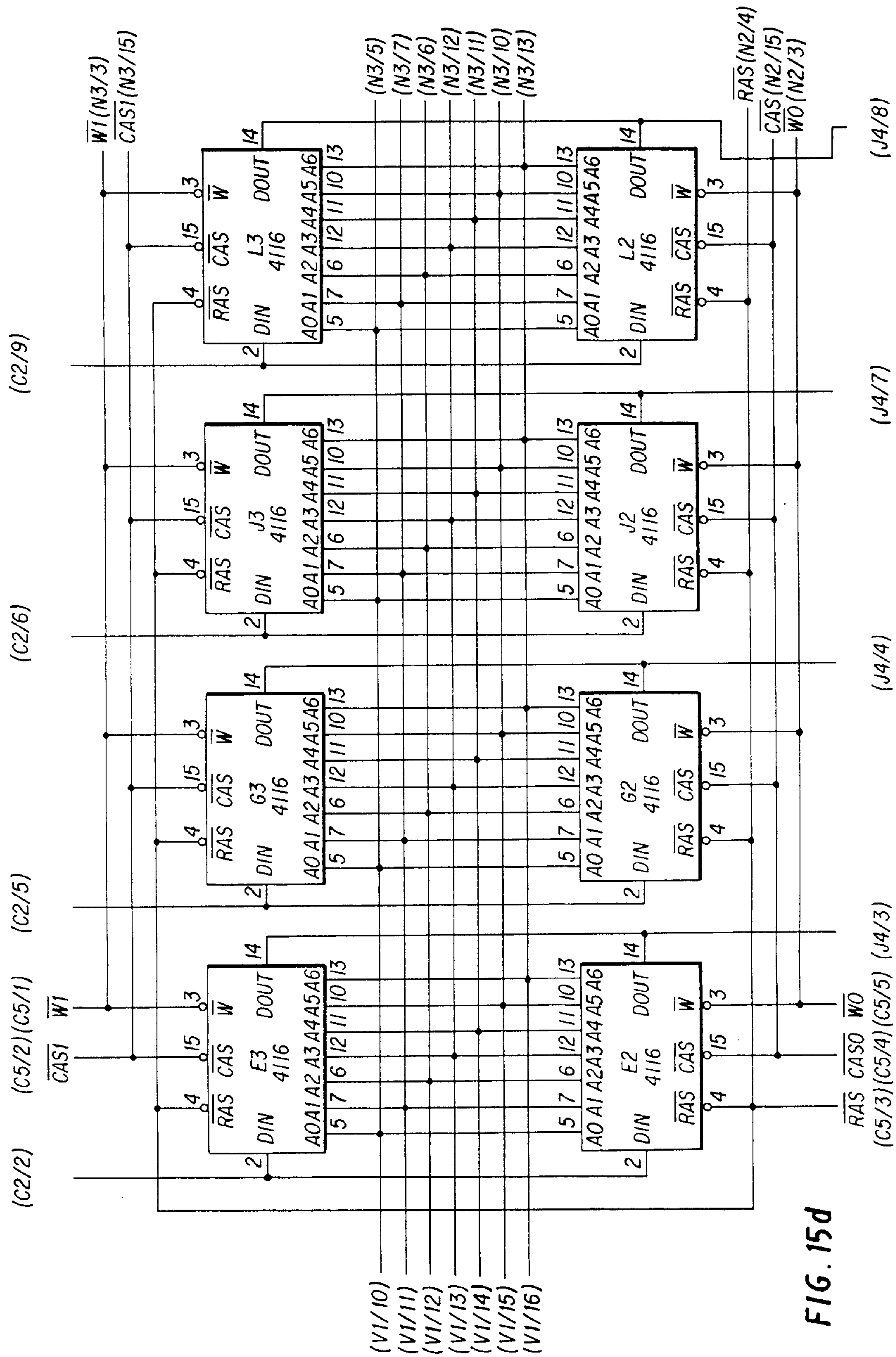
Figure 15E:
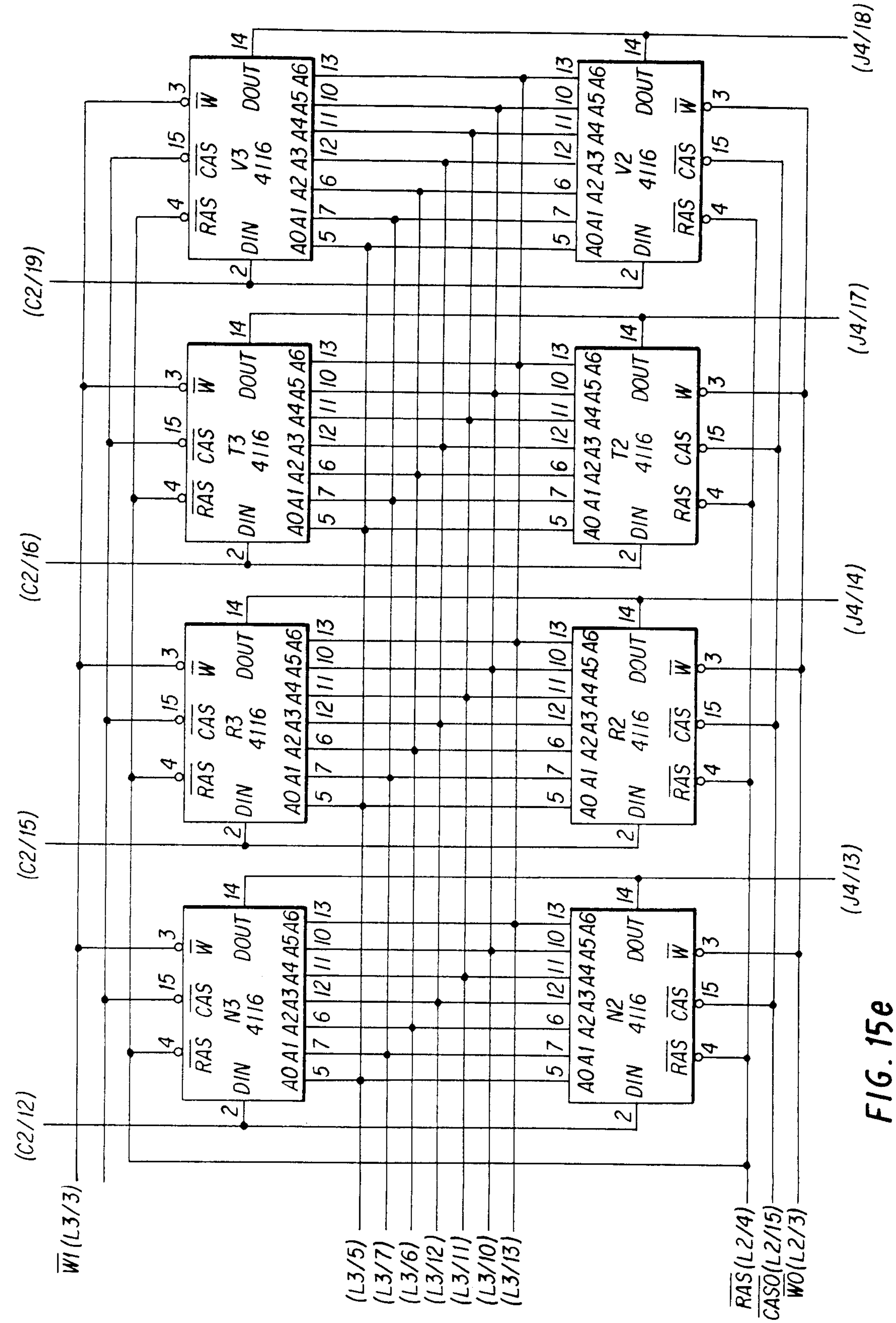
Figure 15F:
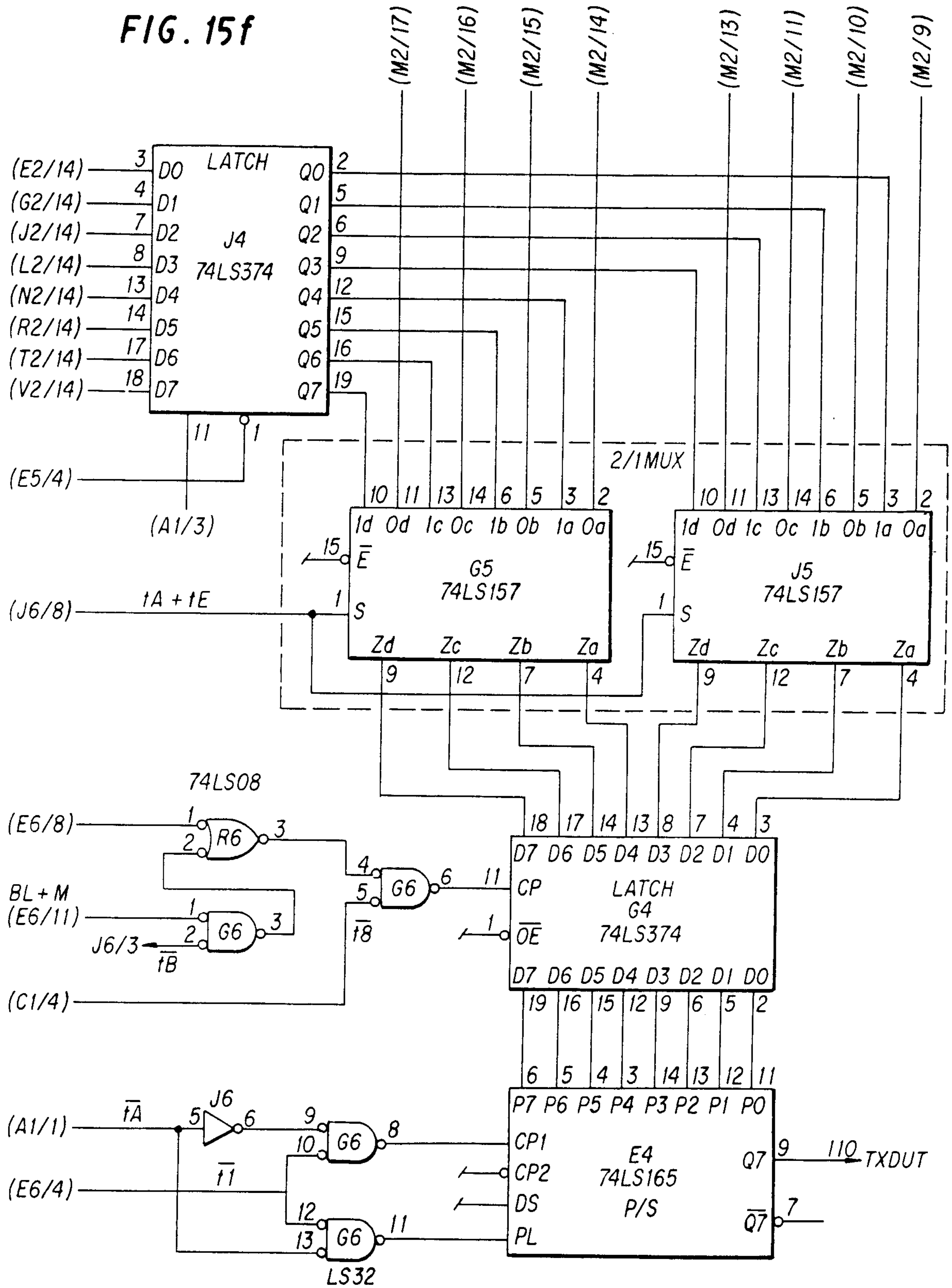
Figure 15G:
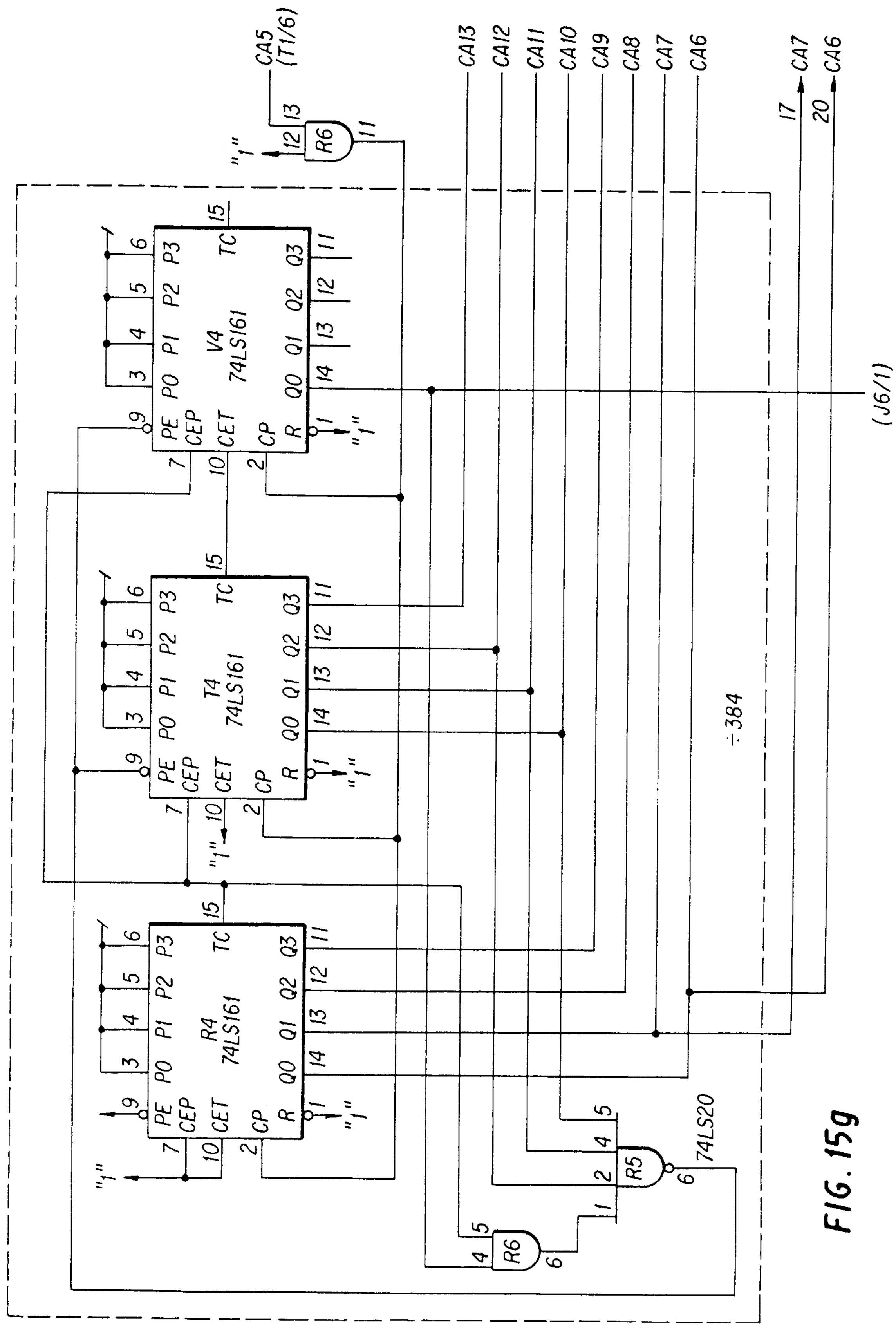
Figure 15H:
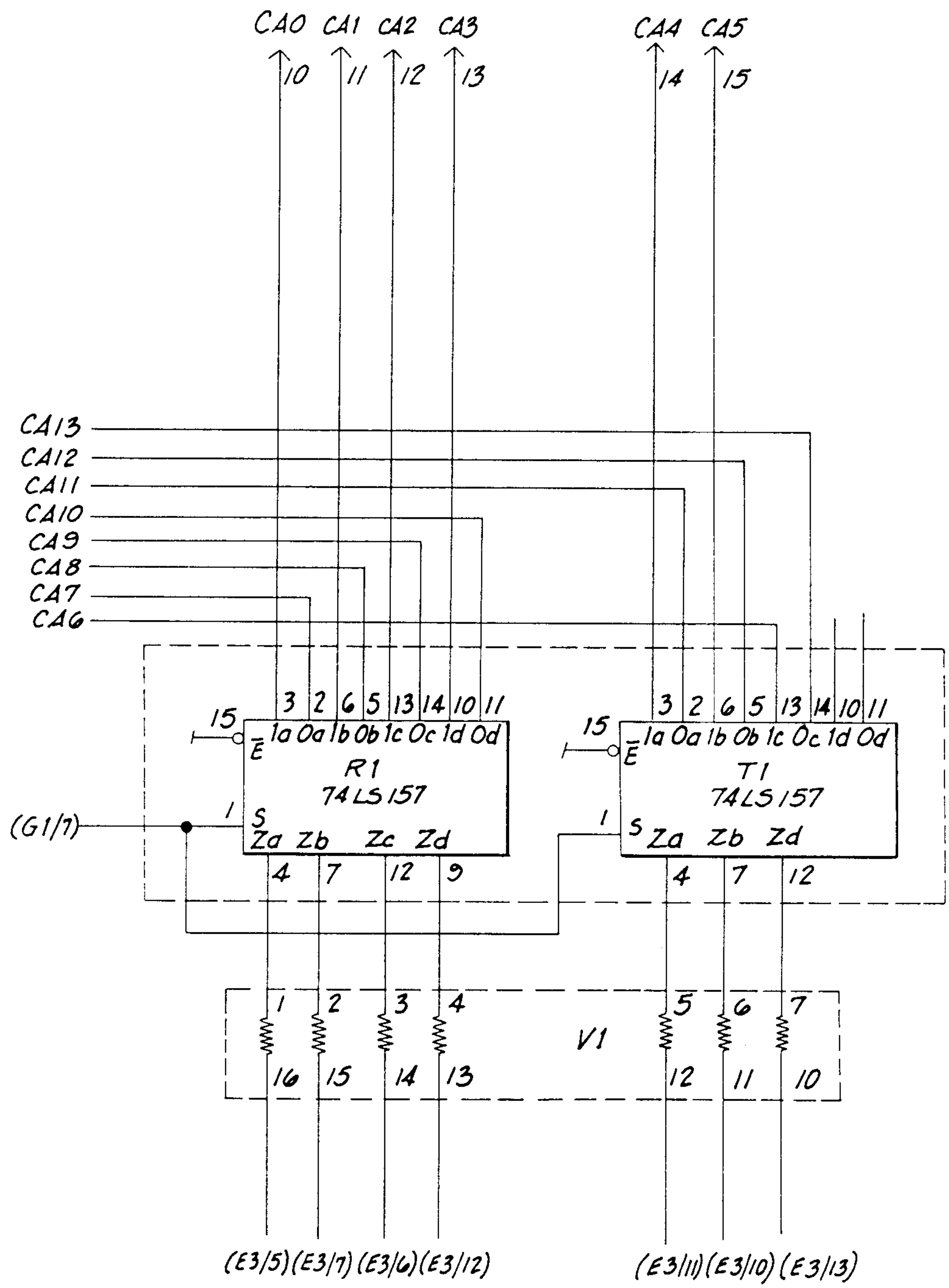
Figure 15I:
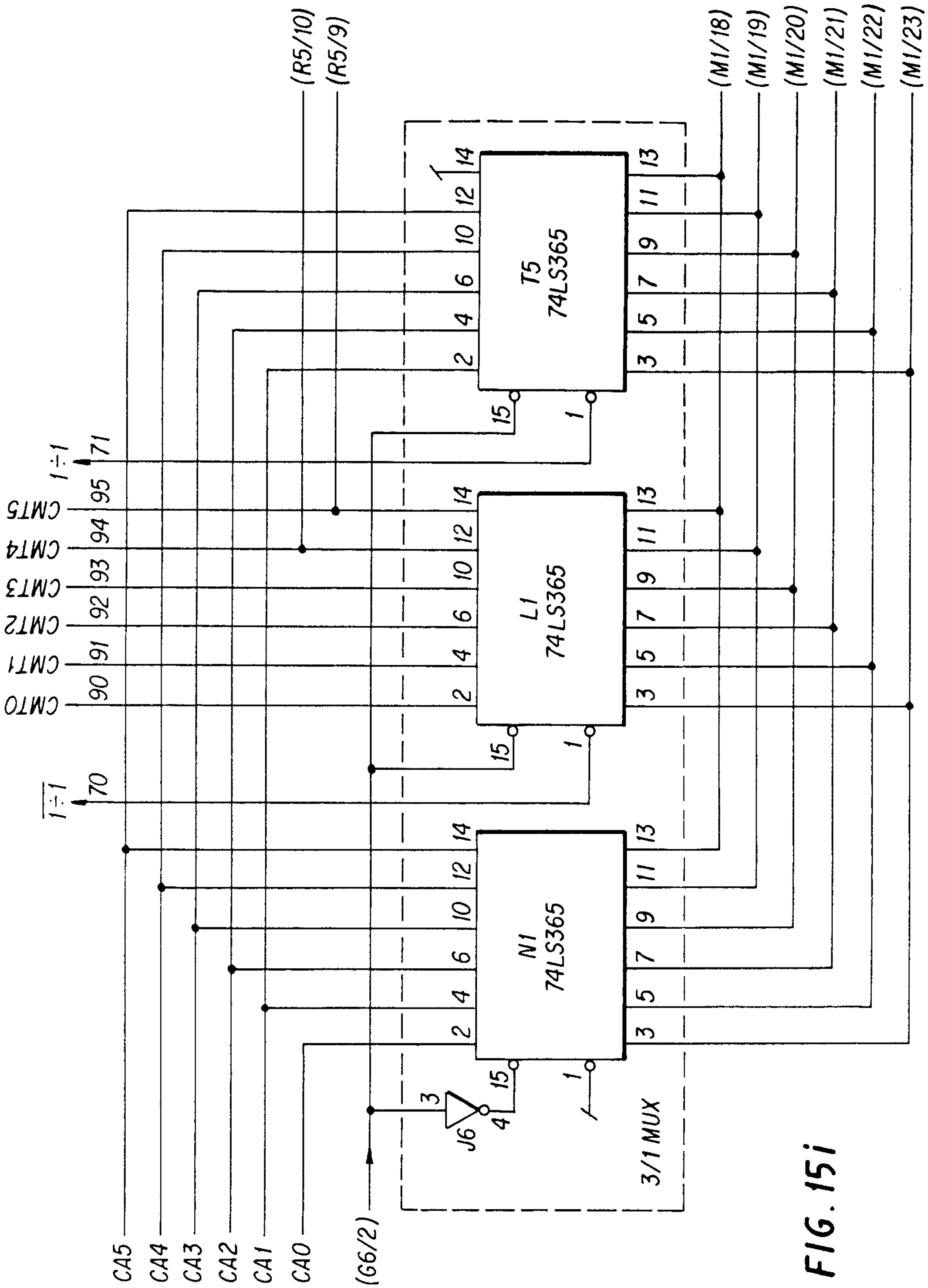
Figure 15J:
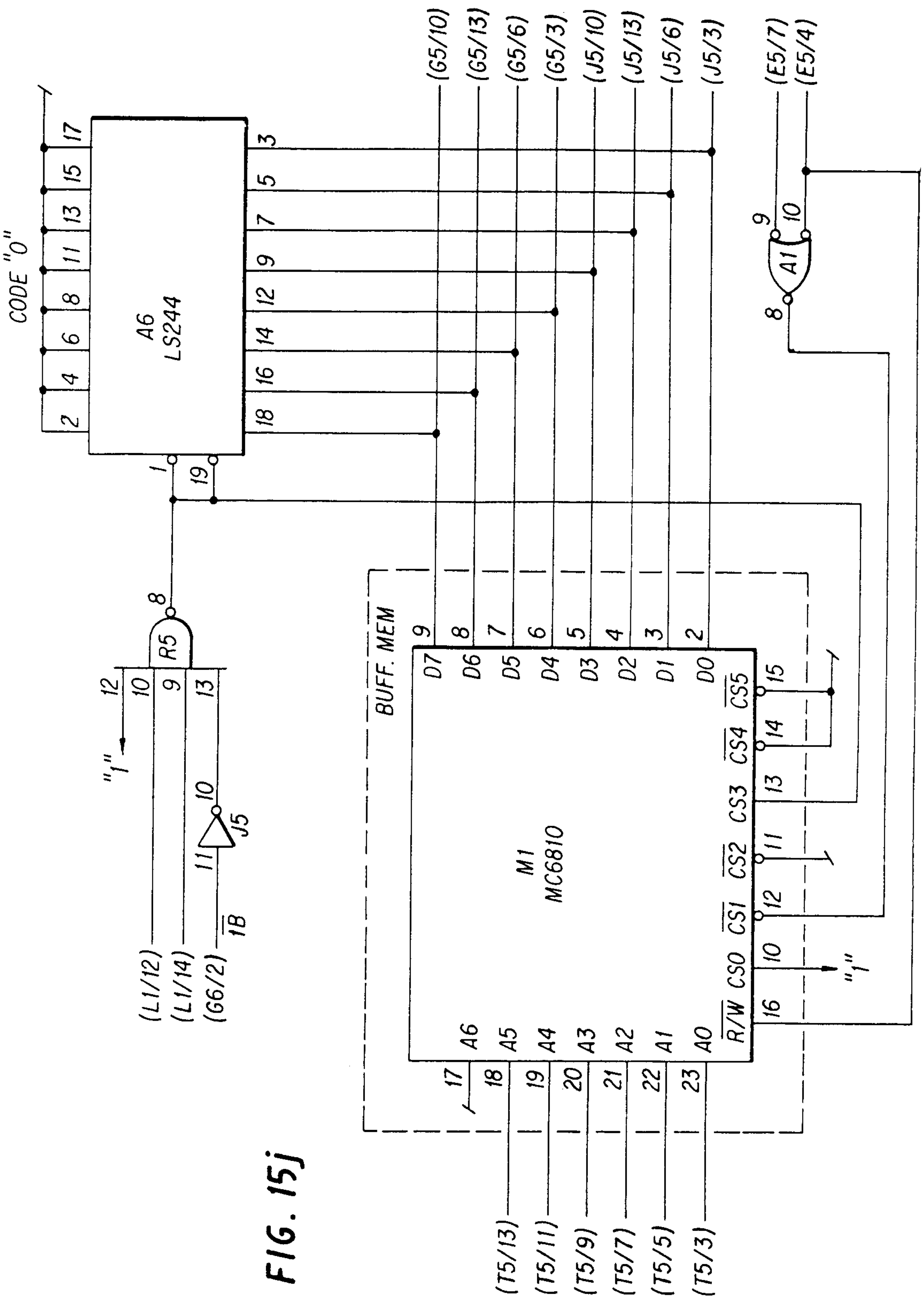
Figure 15K:
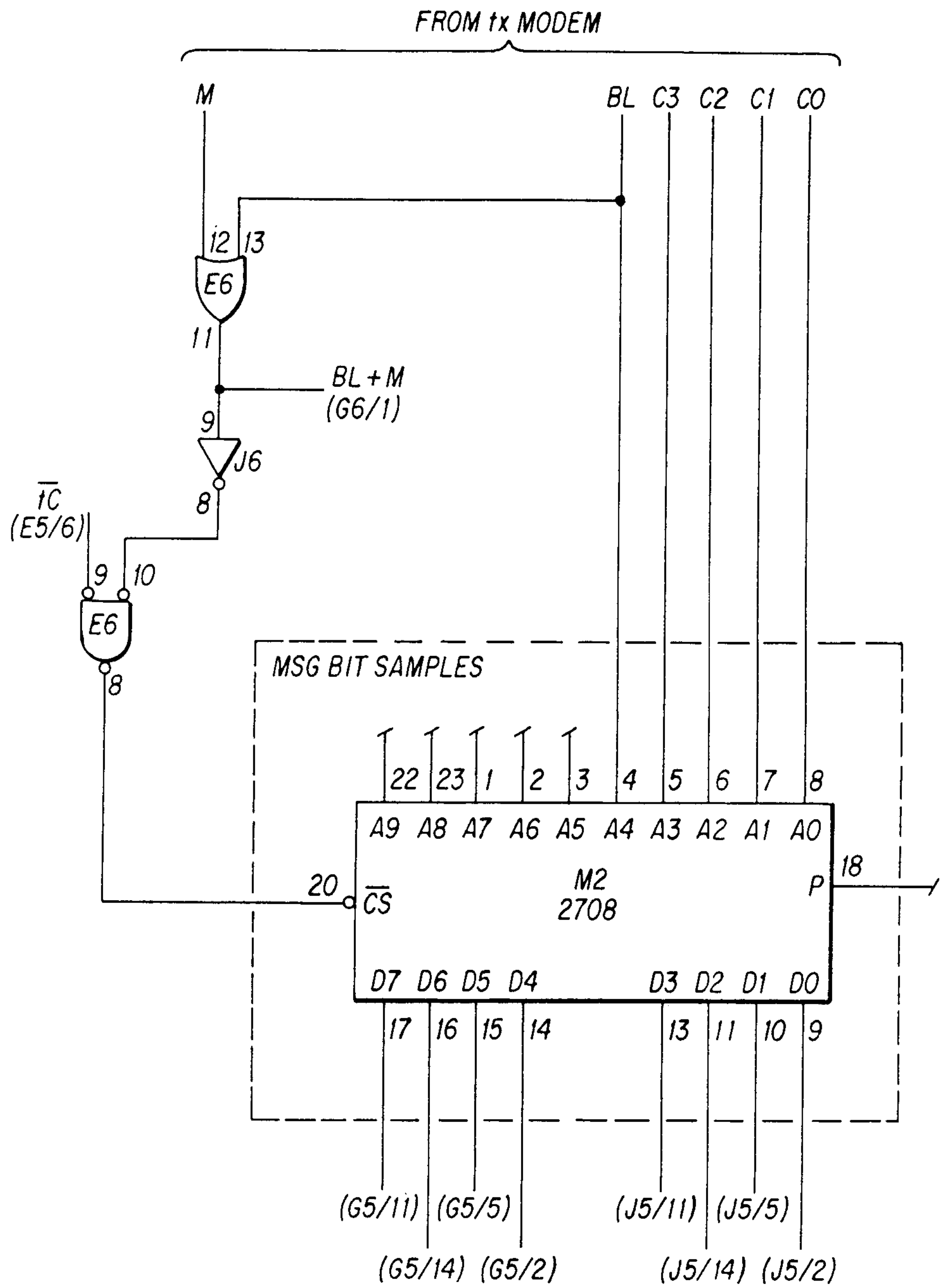

Reference is now made to FIG. 14 which illustrates the transmit speech flow apparatus which comprises the serial to parallel converter 18, transmit delay memory 24, transmit buffer memory 26 and parallel to serial converter 28 illustrated in FIG. 2 and described hereinabove.

A pair of serial to parallel converters 111 and 113 each receive via switches 115 and 117 24 digital inputs either from the outputs from coders 14 (FIG. 2) or directly from the T 1 output of PCM apparatus, via synchronization circuitry 20. The serial to parallel converters 111 and 113 are each typically embodied in a single LS 164 chip, and are arranged to receive alternatively numbered telephone communication line outputs. Thus, while multiplex information from lines 1, 3, 5 etc is received at converter 111, multiplex information fron lines 2, 4, 6, etc. is received at converter 113.

The two serial to parallel converters 111 and 113 operate on the same time base. The output of converter 111 is supplied directly to a 2/1 multiplexer 119 while the output of converter 113 is supplied to the multiplexer 119 via a latch 121 such as a LS 374 which holds the data for an additional half cycle in order to enable the multiplexer to pass the data alternatively from converter 111 and 113. The output of multiplexer 119 is held temporarily in a latch 123, such as an LS 374. The output of latch 123 is supplied to peak detector 22(FIG. 2) and to transmit delay memory 125.

The transfer rate at the outputs of converters 111 and 113 is an 8 bit parallel output every 5.18 microseconds per converter. Thus the rate at which data enters the delay memory is an 8 bit parallel couput every 2.59 microseconds.

The transmit delay memory typically comprises 16 Mostek 4116 chips having a capacity of 384 bytes for each of the 48 telephone communication lines and thus providing a delay of 384·125 microseconds delay per byte at 8 KHz sampling rate=48 msec. Counters 127 and 129 provide addressing for the delay memory 125. Counter 127 provides the identification of the telephone communication lines and counter 129 provides sequencing through the bytes of the delay memory.

The basic operation of the delay memory is reading out to latch 131 the oldest sample and inserting the most recently received sample in the memory, from latch 123. Delay memory 24 (FIG. 2) comprises delay memory 125, counters 127 and 129, and latch 131.

The output of latch 131 is supplied to a buffer memory 133, typically a Motorola 6810 and having a 48 byte capacity. The function of the buffer memory is to accomodate the cyclically operative decoders 32 (FIG. 2) provided at the output of the circuitry to interface with analog transmission apparatus. The buffer memory 133 operates cyclically on its WRITE cycle corresponding to receipt of information from 48 telephone communication lines being controlled by the CAT O-CAT 5 outputs from counter 127. On its READ cycle, the buffer memory is controlled by the CMT O-CMT 5 control memory outputs which run cyclically along 24 communication channels but randomly with respect to the control memory contents. This operation effects switching of 24 out of the 48 telephone communication lines onto the 24 communication channels.

In the case of equipment malfunction a command for 1-1 operation of the buffer memory is generated in the CPU causing the the same 24 telephone communication lines to be continuously connected to the 24 communication channels. Multiplexer 135 controls the address to the buffer memory and thereby determines its mode of operation.

The output of buffer memory 133 is supplied to a 2/1 multiplexer 137 such as an LS 157. Multiplexer 137 is operative in response to control signals from modem transmitter 67 (FIG. 2) to transmit via a latch 139 (such as an LS 374) either the output of buffer memory 133 or alternatively message samples from the modem transmitter to parallel to serial converter 141 (28 in FIG. 2). The output of converter 141 is supplied via a switch 143 (13 in FIG. 2) to the 24 communication channels or to T 1 digital apparatus.

FIG. 15 is a detailed schematic illustration of the transmit speech flow apparatus described above in connection with FIG. 14.

Figure 16A:
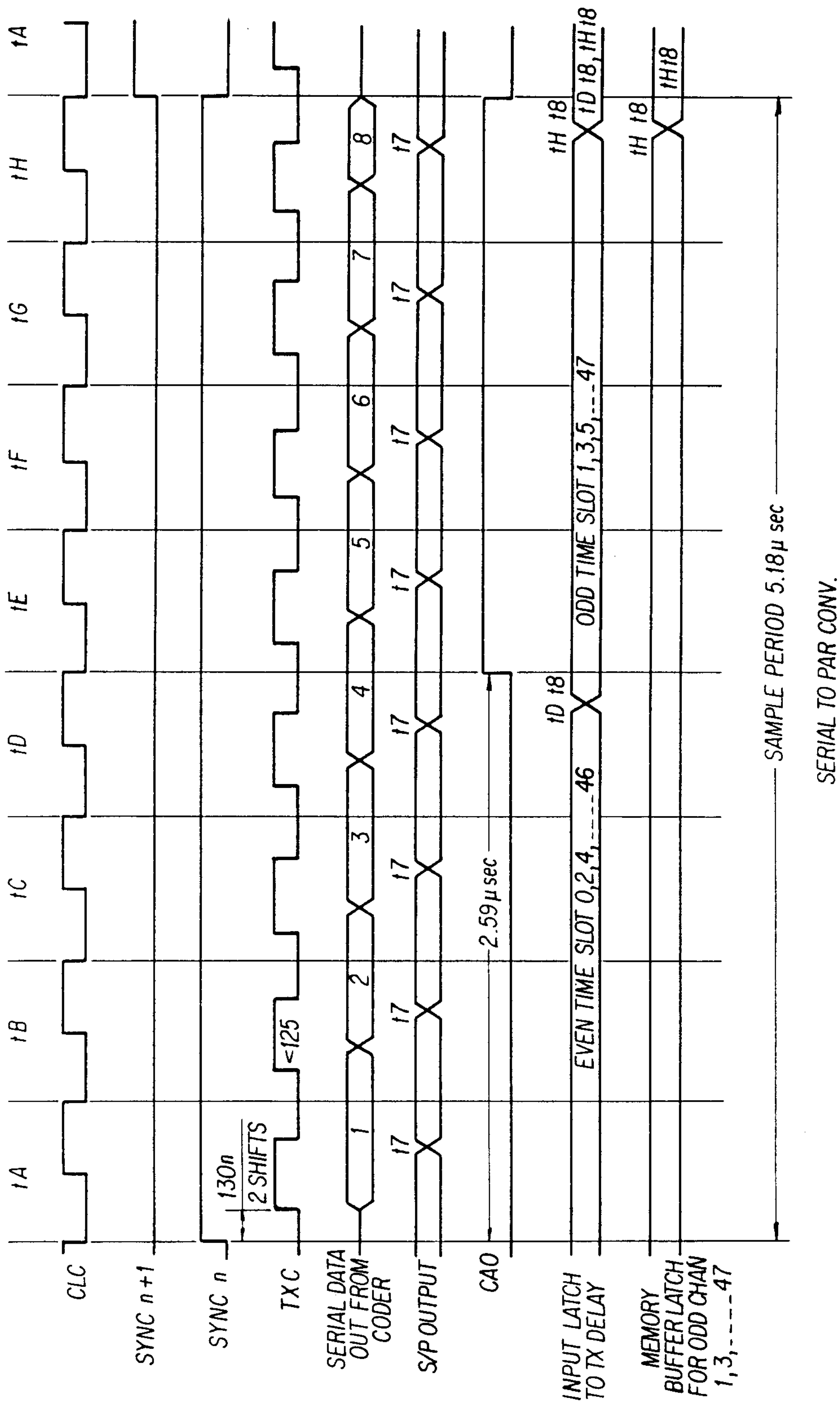
FIG. 16(*a* to *c*) is a timing diagram of the transmit speech flow timing; divided into three parts a–c.
Figure 16B:
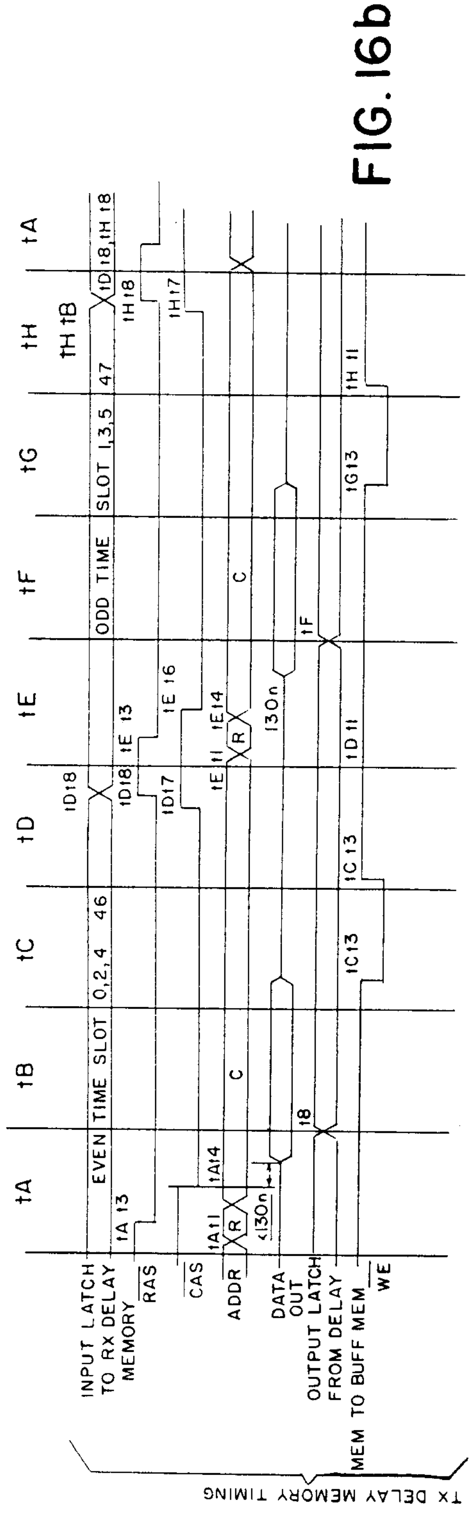
Figure 16C:
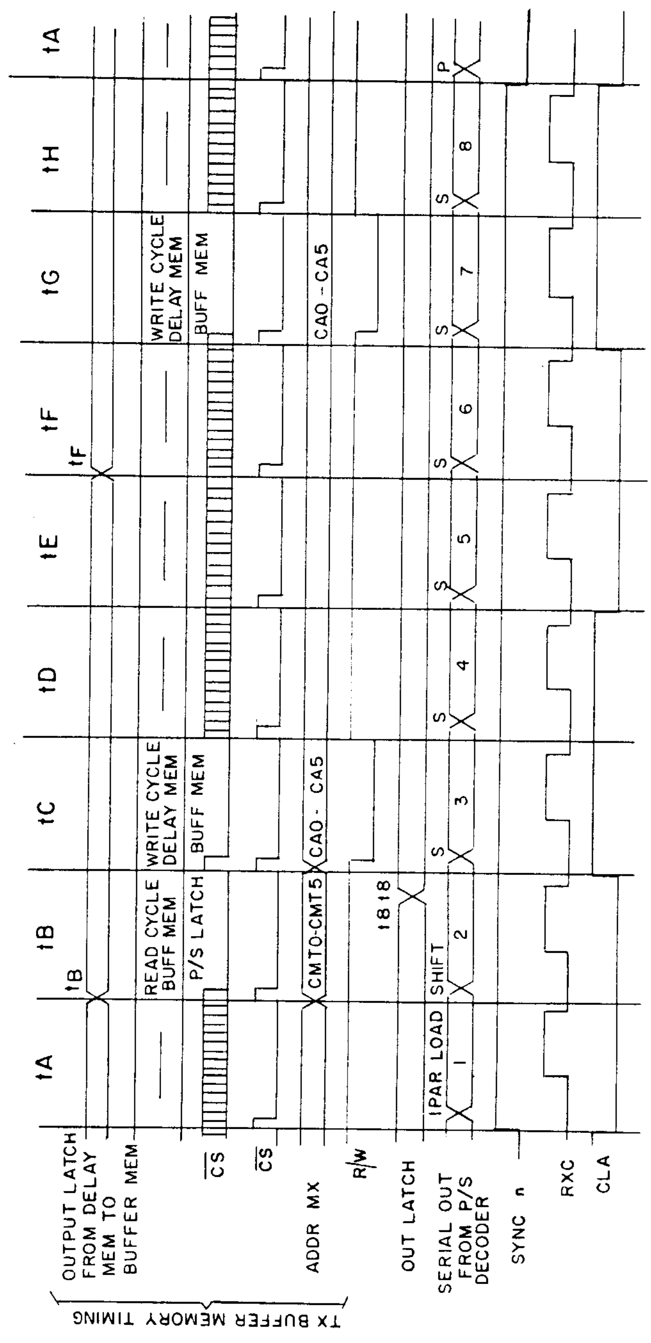

FIG. 16 is a detailed timing diagram of the circuitry illustrated in FIGS. 14 and 15.

Figure 17A:
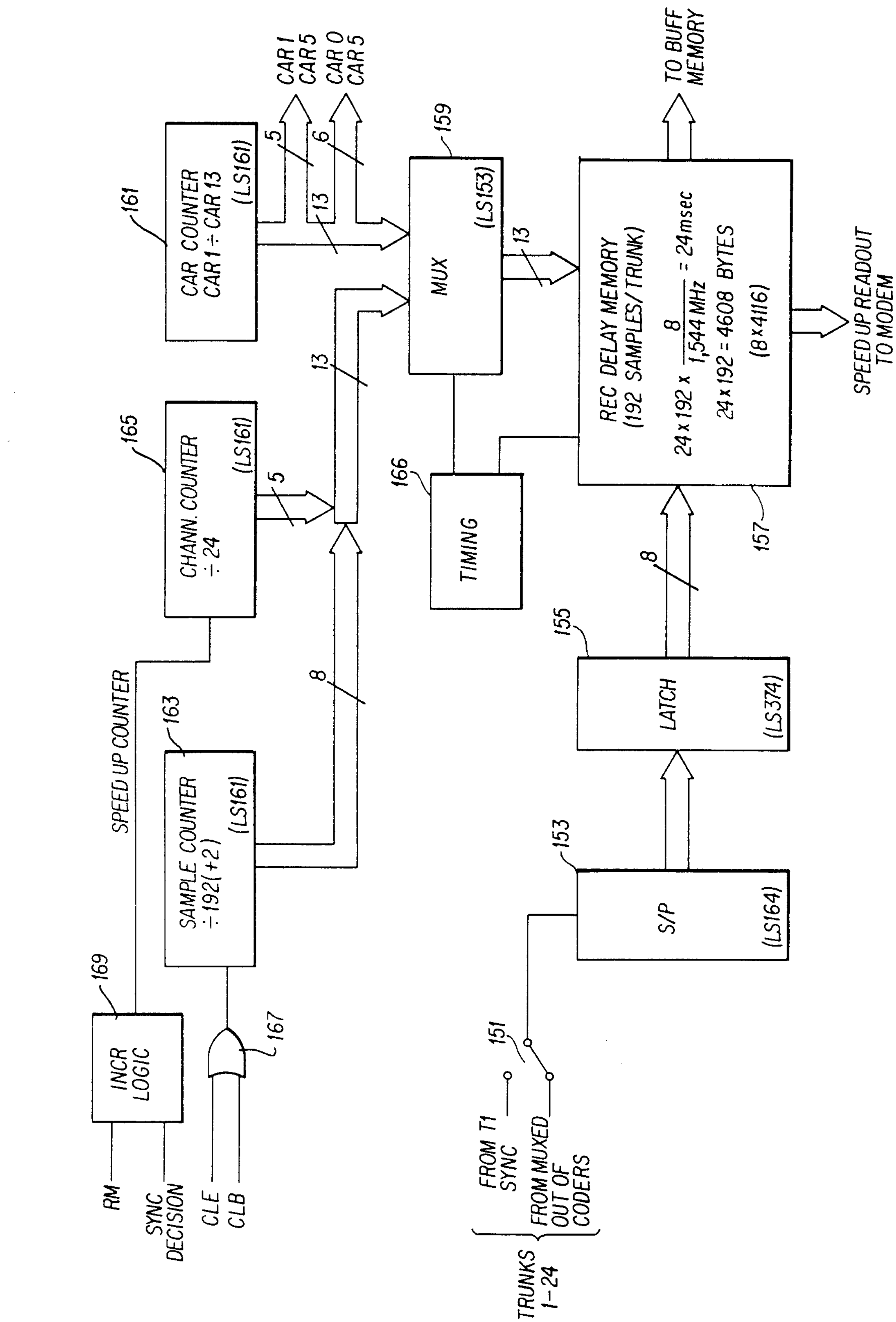
FIG. 17(*a* & *b*) is a block diagram of the receive speech flow in the circuitry of FIG. 2.
Figure 17B:
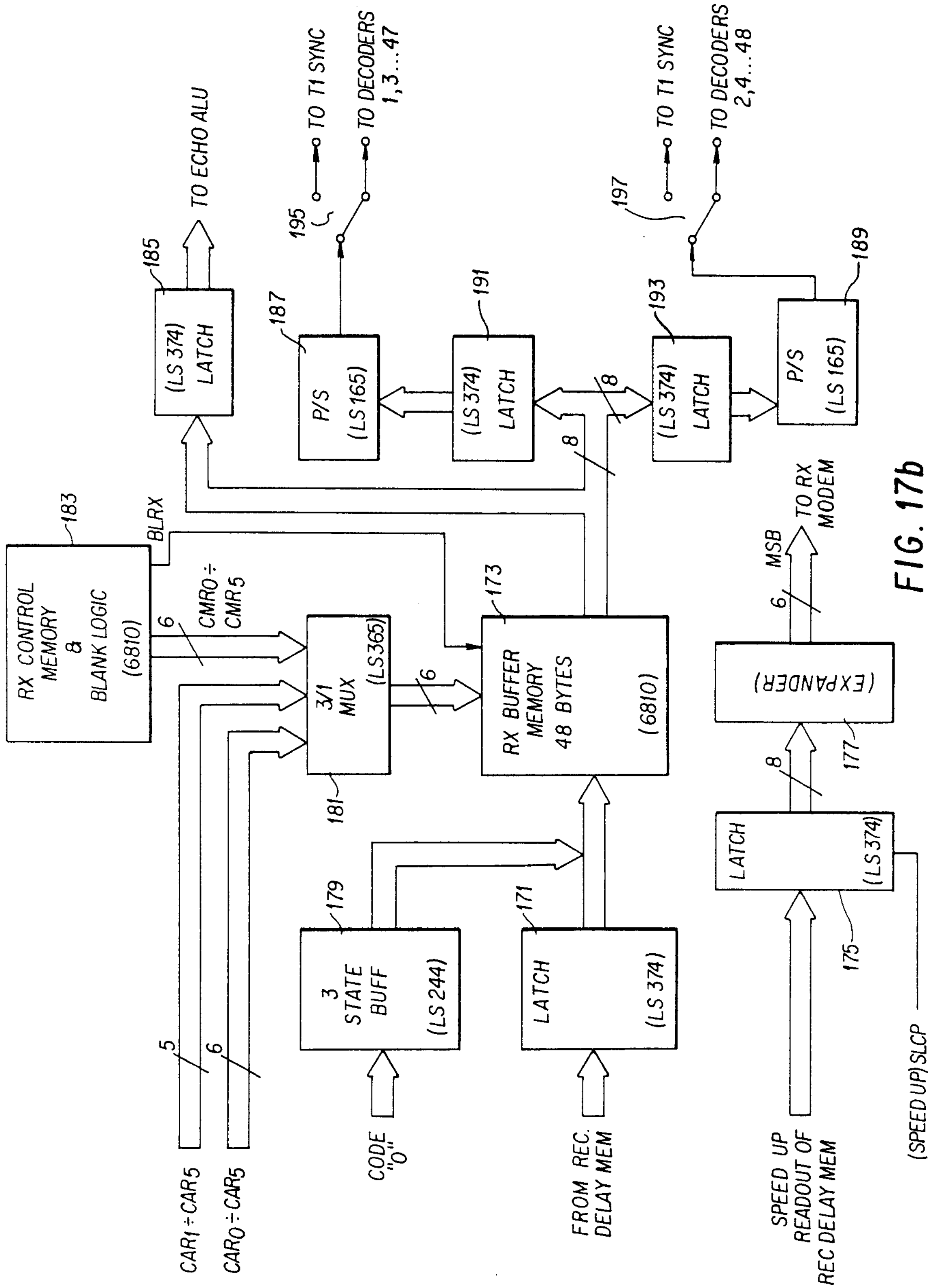
Figure 18A:
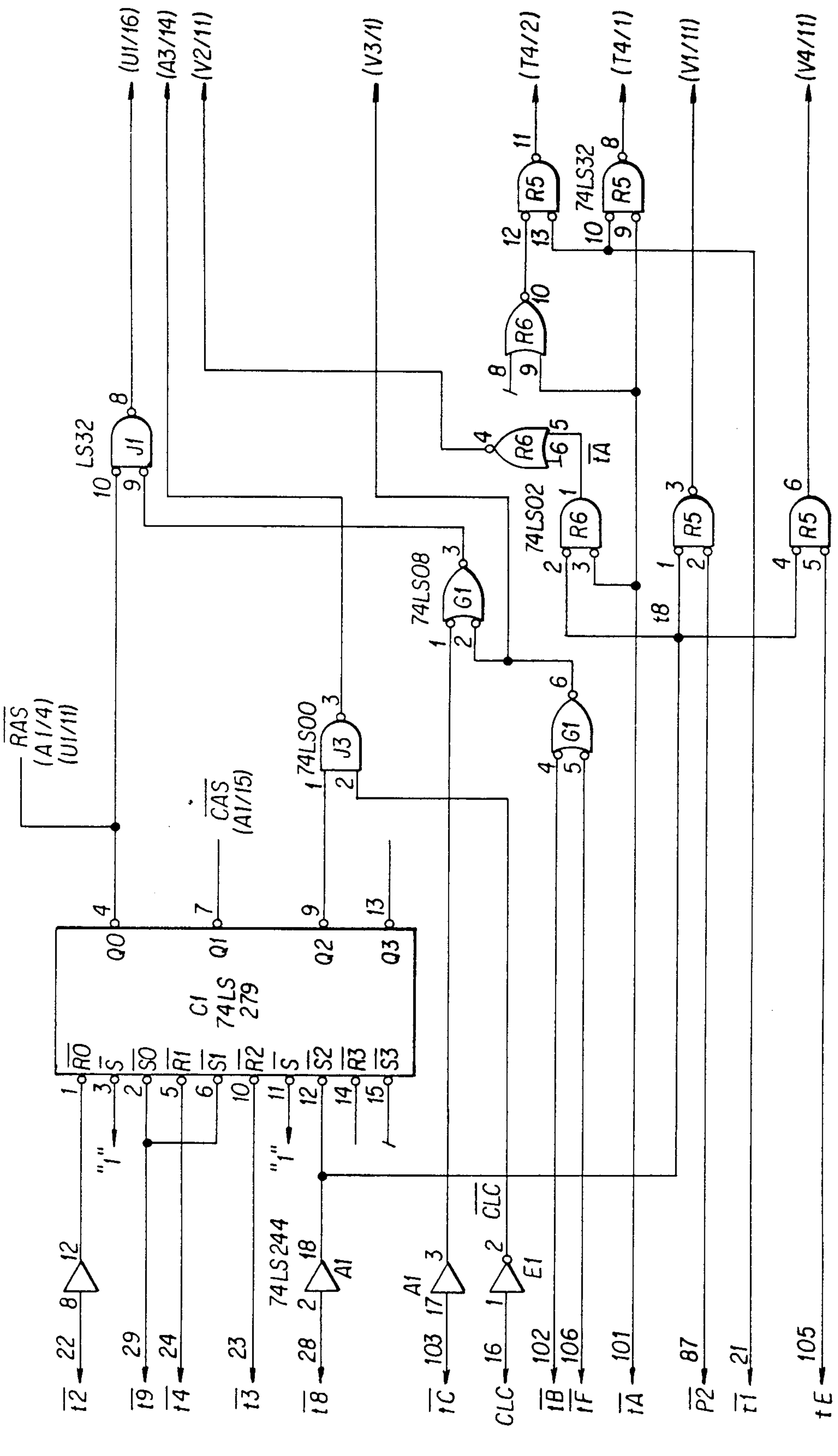
FIG. 18(*a* to *h*) is a schematic illustration of the circuitry of FIG. 17.
Figure 18B:
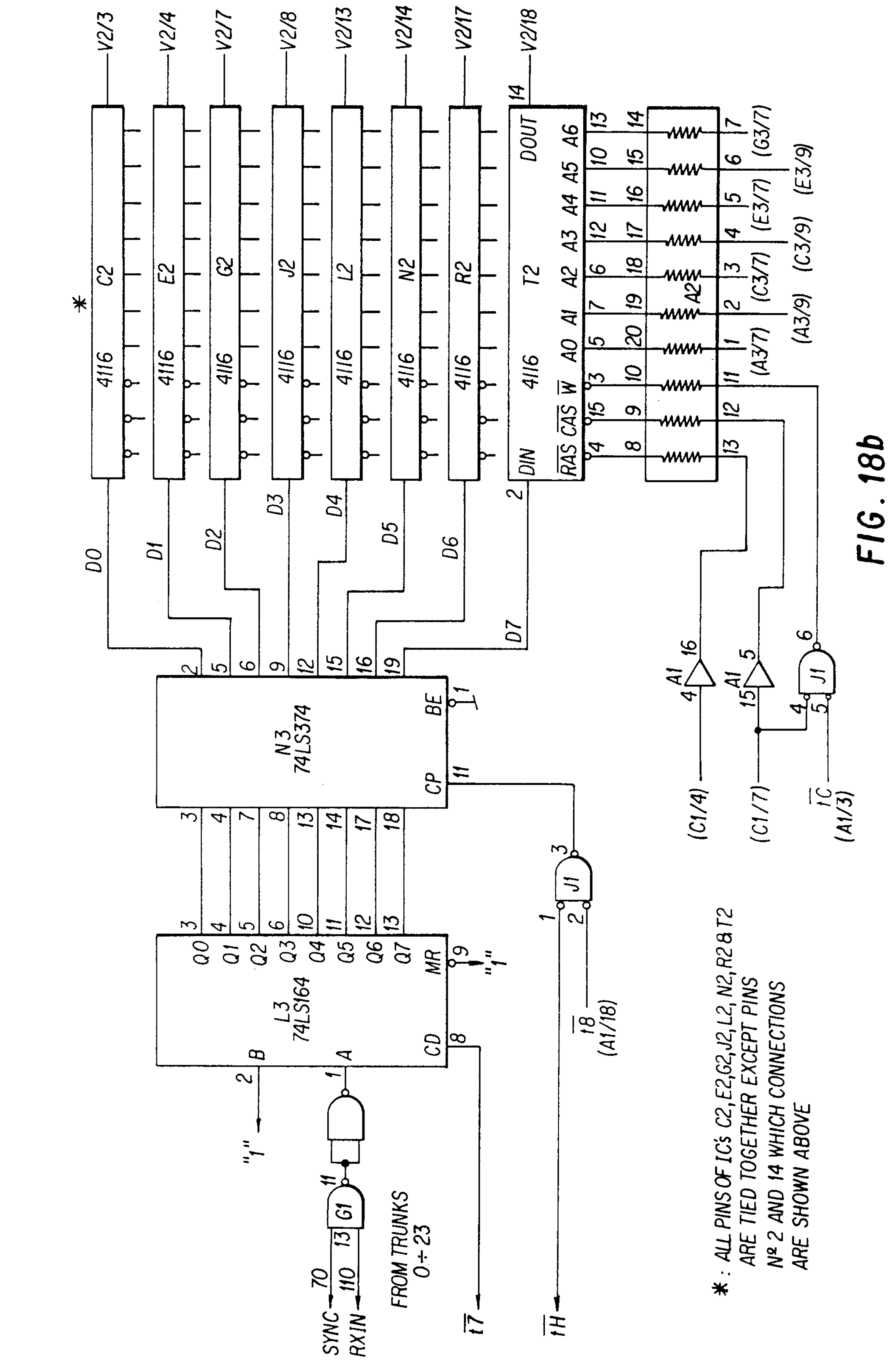
Figure 18C:
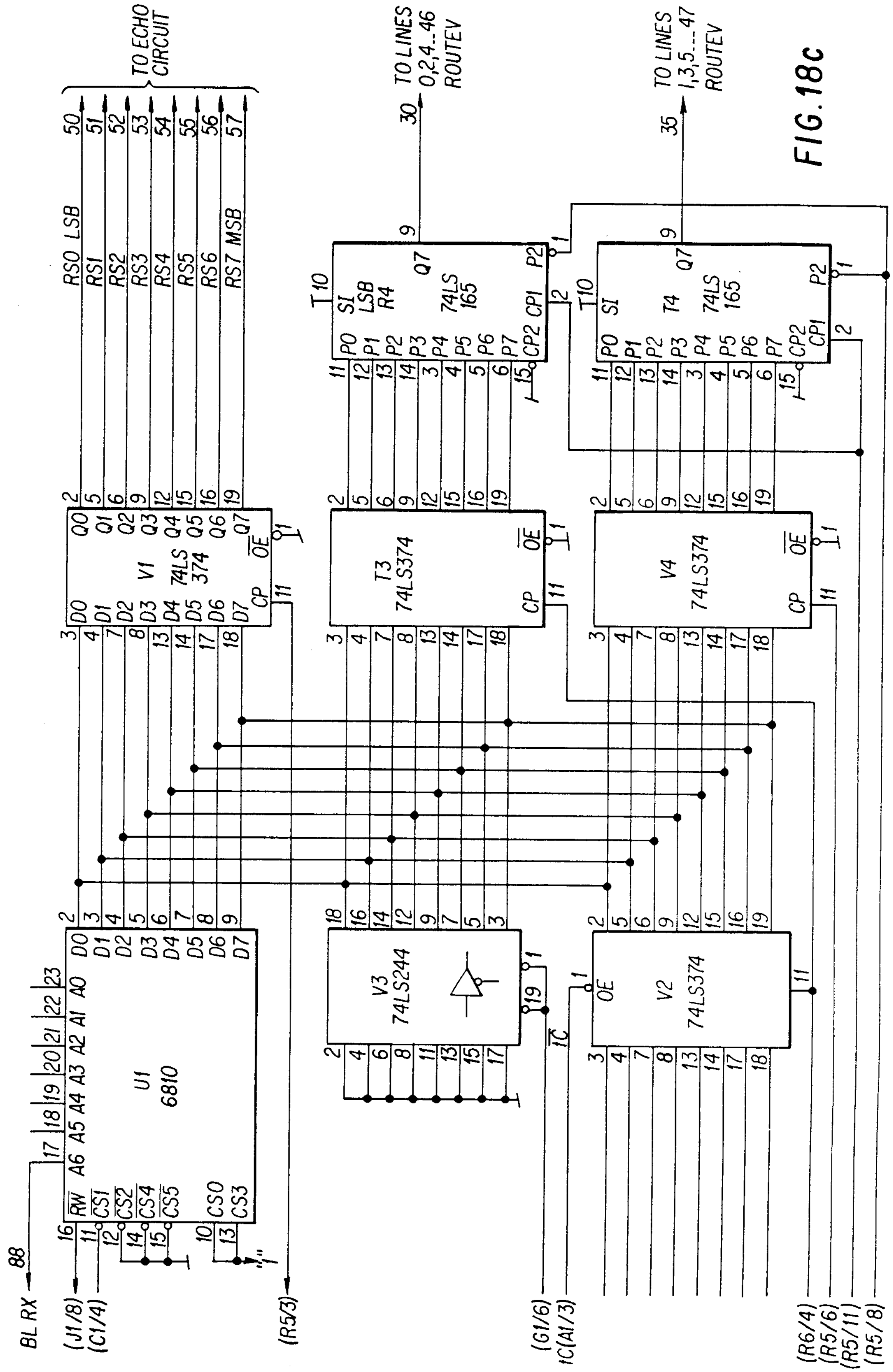
Figure 18D:
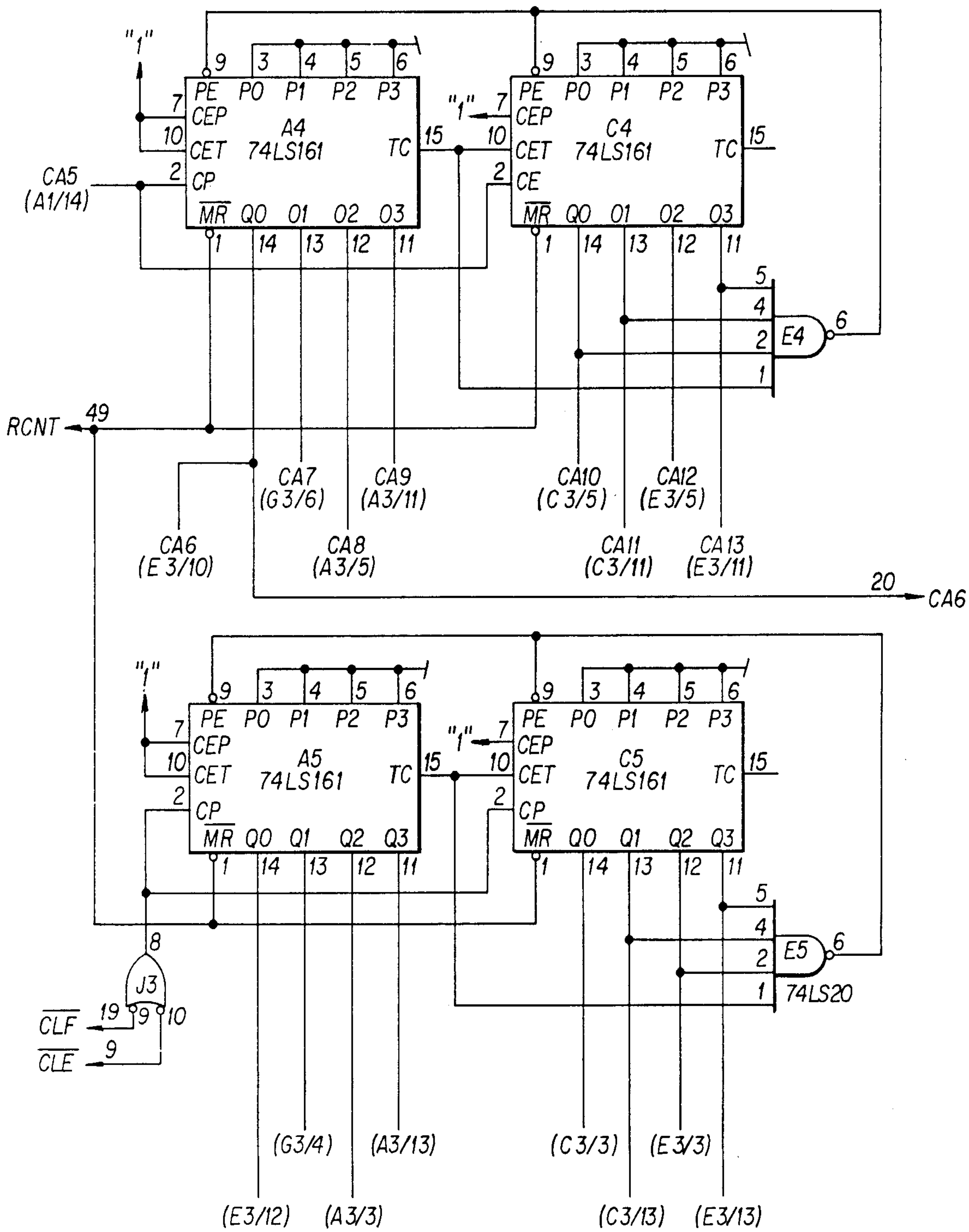
Figure 18E:
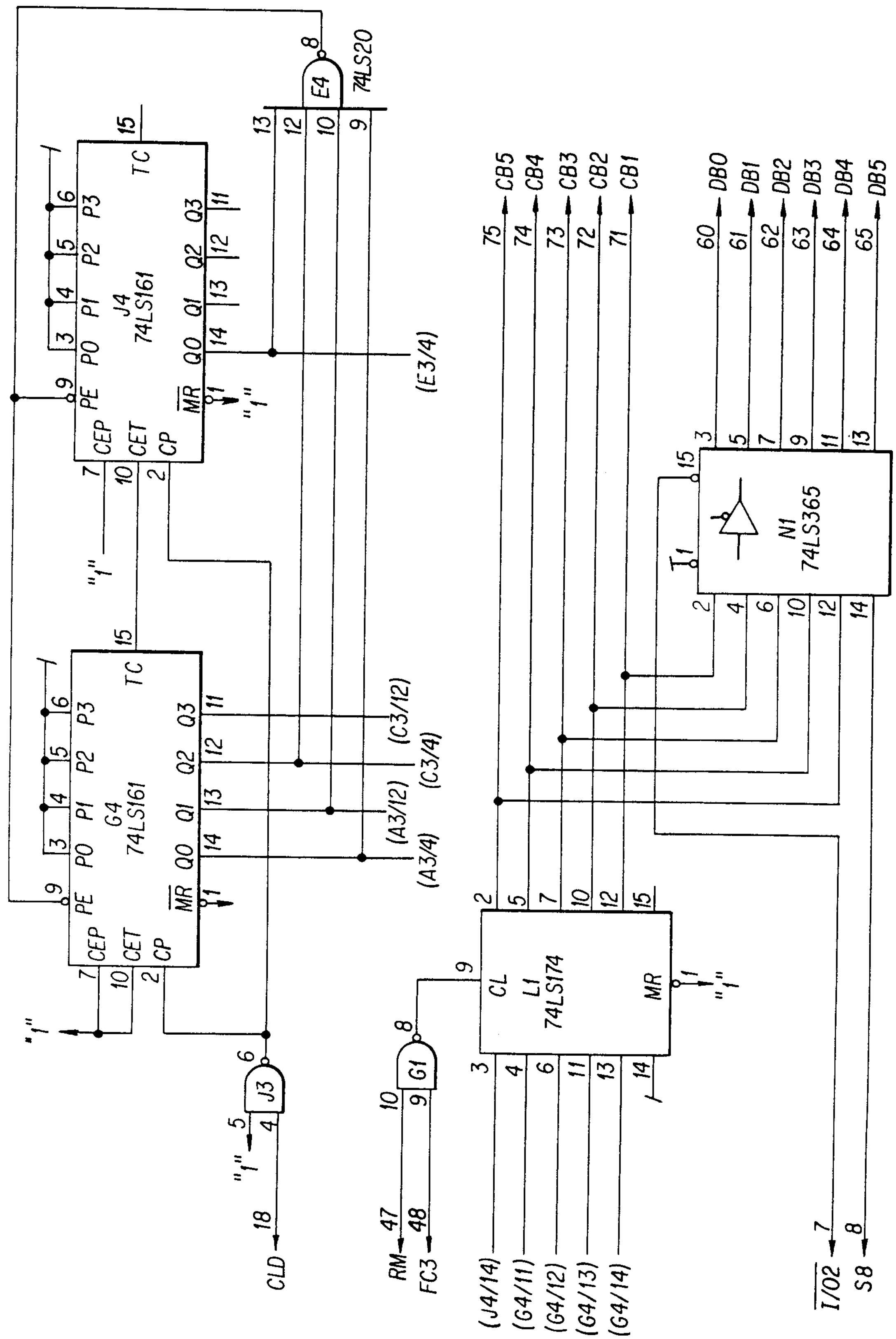
Figure 18F:
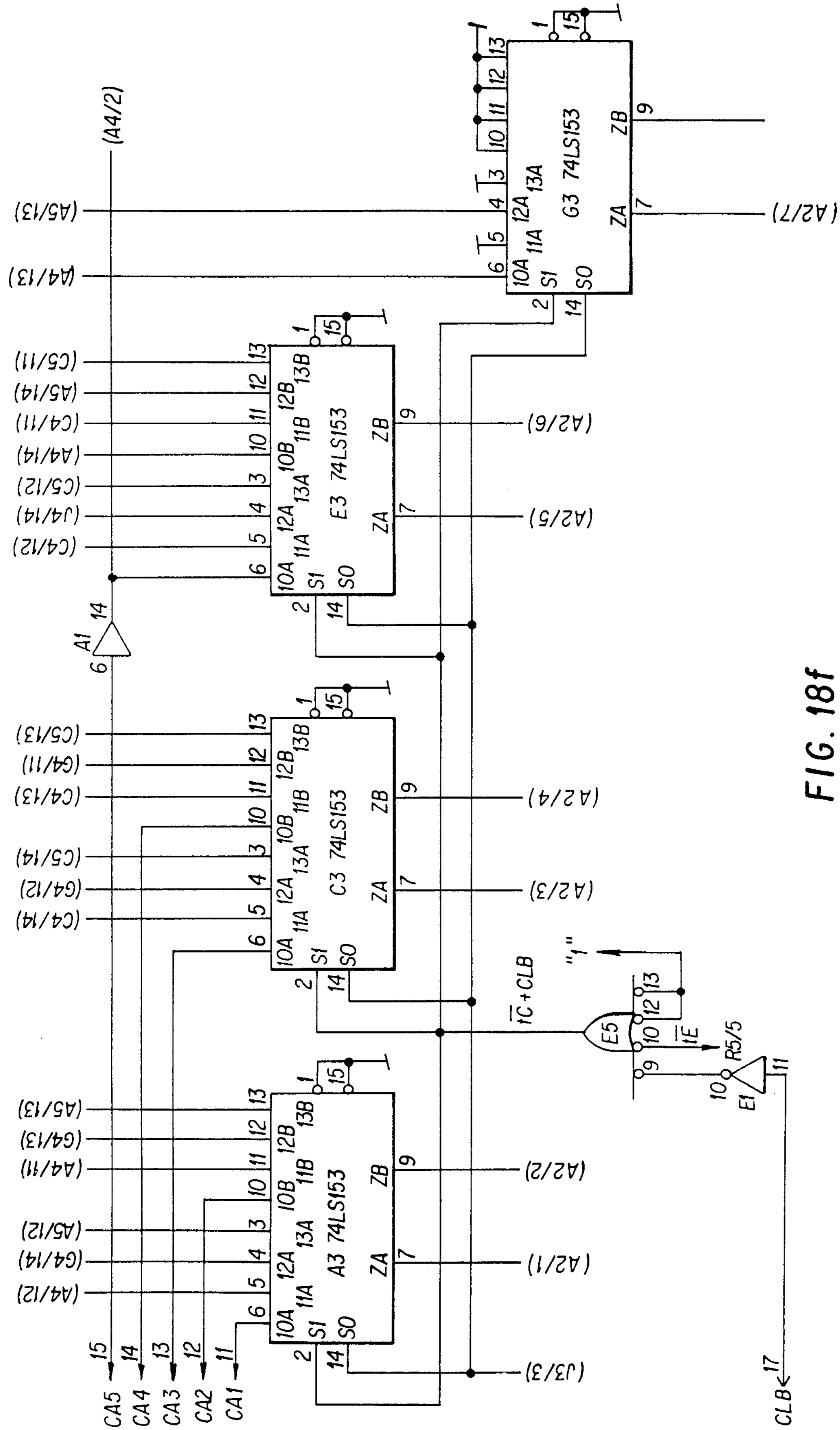
Figure 18G:
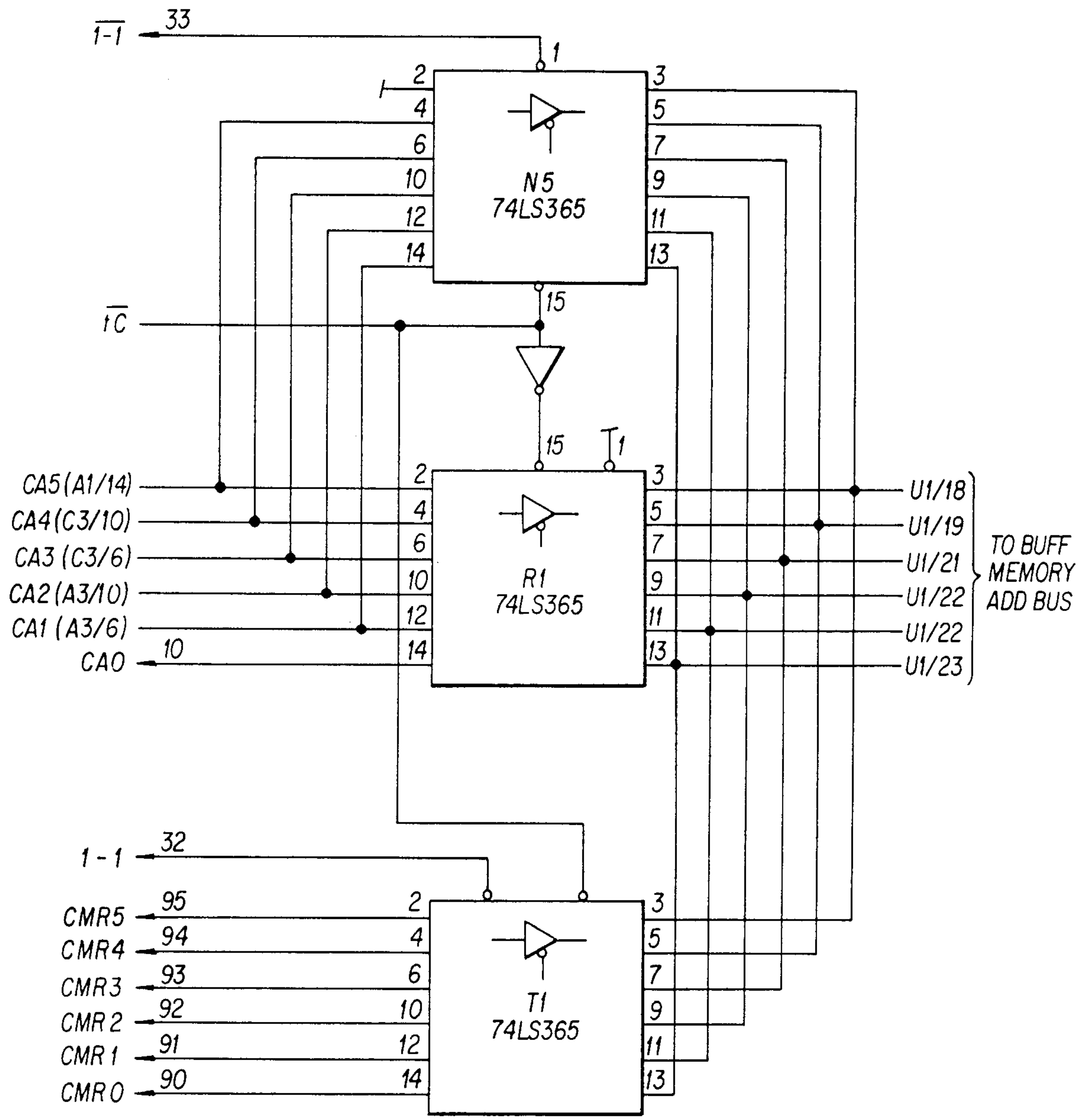
Figure 18H:
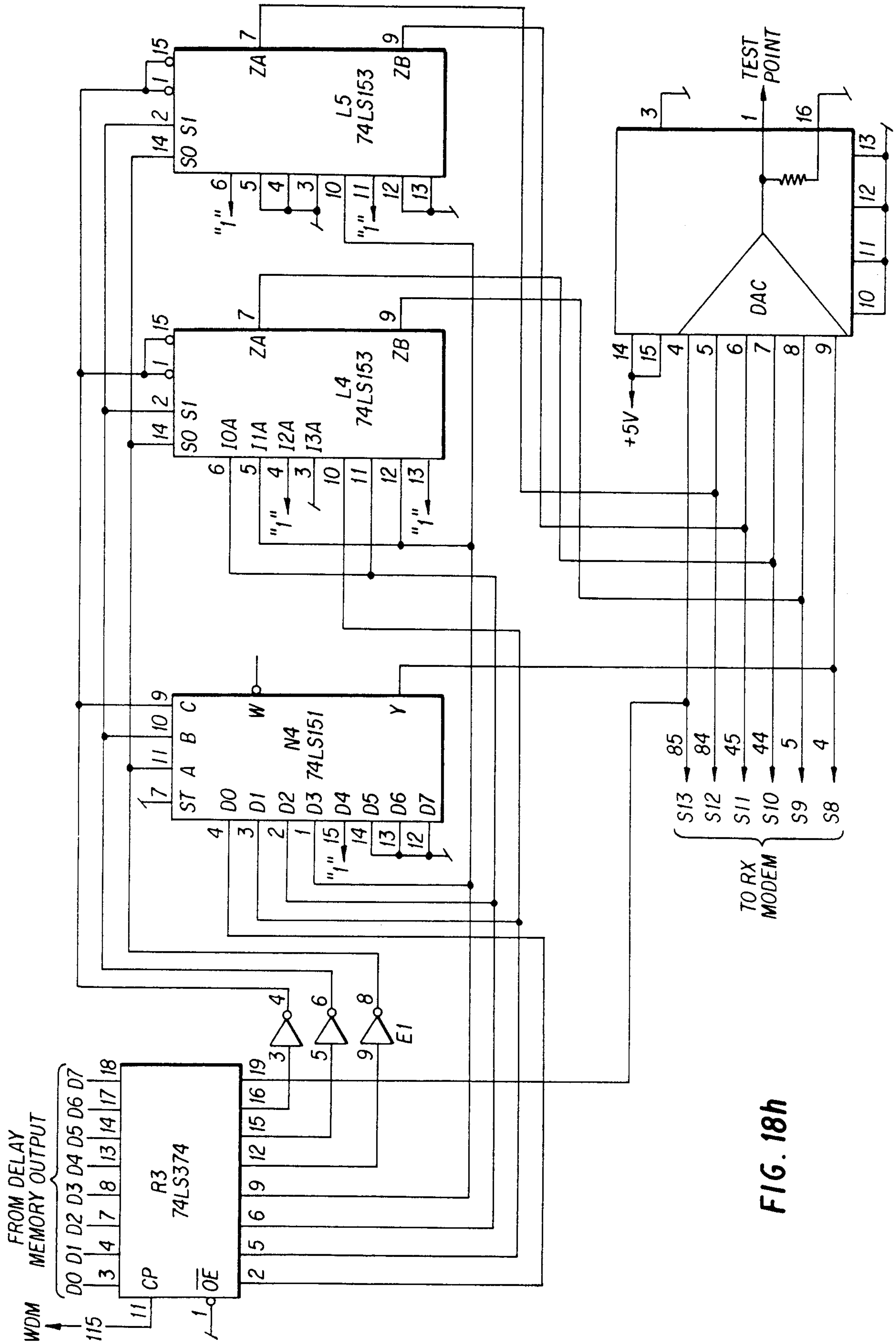

Reference is now made to FIG. 17 which illustrates the receive speech flow apparatus which comprises serial to parallel converter 48, RX delay memory 50, speed up counter 63, RX buffer memory 52, parallel to serial converter 56 and blanking logic 58. Twenty-four communication channels are connected via switch 151 to a serial to parallel converter 153, such as an LS 164. If communication channels carry digital data such as the output of PCM apparatus, synchronization circuitry 47 (FIG. 2) is interposed before switch 151. If analog signals are carried by the communication channels, the outputs of coders 44 (FIG. 2) are connected to the terminals of switch 151.

The output of converter 153 is supplied via a latch 155 such as an LS 374 to a receiver delay memory 157 comprising 8 4116 Mostek chips having a 16K byte capacity and providing a 24 millisecond delay for each of 24 communication channels. The operation of memory 157 is controlled by the output of a multiplexer 159 such as an LS 153, having two inputs. One input is the output of a 13 bit CAR counter 161, such as an LS 161 which sequences the delay memory through its cyclic read/write operations, as described hereinabove in connection with the transmit delay memory. The second input is the combined output of a sample counter 163 such as an LS 161 and channel counter 165, such as an LS 161, which together function as speed up counter 63 of FIG. 2.

The function of the speed up counter is to scan rapidly the contents of the receiver delay memory 157 for each channel to detect messages which may be contained therein. Multiplexer 159 is operative to permit addressing by the speed up counter between read and write cycles controlled by the CAR counter 161. The multiplexer 159 and the read/write operation of the delay memory 157 are controlled by signals from timing circuitry 166.

The sample counter 163 is incremented by an OR gate 167 which receives CLB and CLE from the timing circuitry 71 (FIG. 2) and modem receiver 61 (FIG. 2). The CLB input increments the sample counter for scanning within a given channel, while the CLE input increments the sample counter by two at the end of each channel scan. Increment logic 169 provides increment inputs to channel counter 165 and receives the RM output and the SYNC DECISION outputs from modem receiver 61 (FIG. 2). It produces a single increment pulse at the end of each channel scan when no time correction is required, two increment pulses at the end of each channel scan when a forward time correction is required, and no increment pulses at the end of each channel scan when a reverse time correction is required. Thus it may be appreciated that timing corrections are here carried out either by skipping a channel scan or scanning a channel twice.

The output of receiver delay memory 157 is supplied via a latch 171 to a receiver buffer memory 173 and via a latch 175 and an expander 177 to modem receiver 61 (FIG. 2). The expander converts the logarithmically coded signal samples to a linear code.

The input to buffer memory 173 comprises in addition to the output of latch 171, the output of a three state gate 179, which inserts a code "0" for blanking purposes. A multiplexer 181, such as an LS 365, provides addressing to the buffer memory 173. It has three inputs, as follows: a six bit input CAR O-CAR 5 from the CAR counter 161, for memory readout; CAR 1-CAR 5 from CAR counter 161 for memory write in in the 1:1 operation mode; and CMR O-CMR 5 from the RX control memory and blank logic 183 (60, 58 respectively) for selective write.

The operational sequence of the buffer memory 173 is as follows: The buffer memory first sequentially reads out in the sequence of the 48 telephone communication lines in response to receipt of the output from counter 161. Since the buffer memory contains information for only 24 of the 48 telephone communication lines, the blank logic, blank logic 183 together with gate 179 writes in a code zero for those subscribers for which buffer memory 173 contains no information, by means of a BLRX output.

At the same time the contents of the receive buffer memory 173 are updated sequentially according to the 24 communication channels and randomly into the buffer memory, in response to addresses received from the CAR counter 161. The output of buffer memory 173 is supplied to latch 185 for transmission to echo ALU circuitry 55 (FIG. 2). The output of buffer memory 173 to a pair of parallel to serial converters 187 and 189 via respective latches 191 and 193. The timing of parallel to serial converters 187 and 189 is the same but the output to the converters from the buffer memory takes place in an alternating sequence. Thus the latches 191 and 193 synchronize the parallel data outputs.

The serial outputs of converters 187 and 189 are supplied via switches 195 and 197 either to decoders 66 (FIG. 2) for analog telephone communication lines or via synchronization circuitry 64 (FIG. 2) to PCM apparatus.

FIG. 18 is a detailed schematic illustration of the receive speech flow circuitry shown in block diagram form in FIG. 17.

Figure 19A:
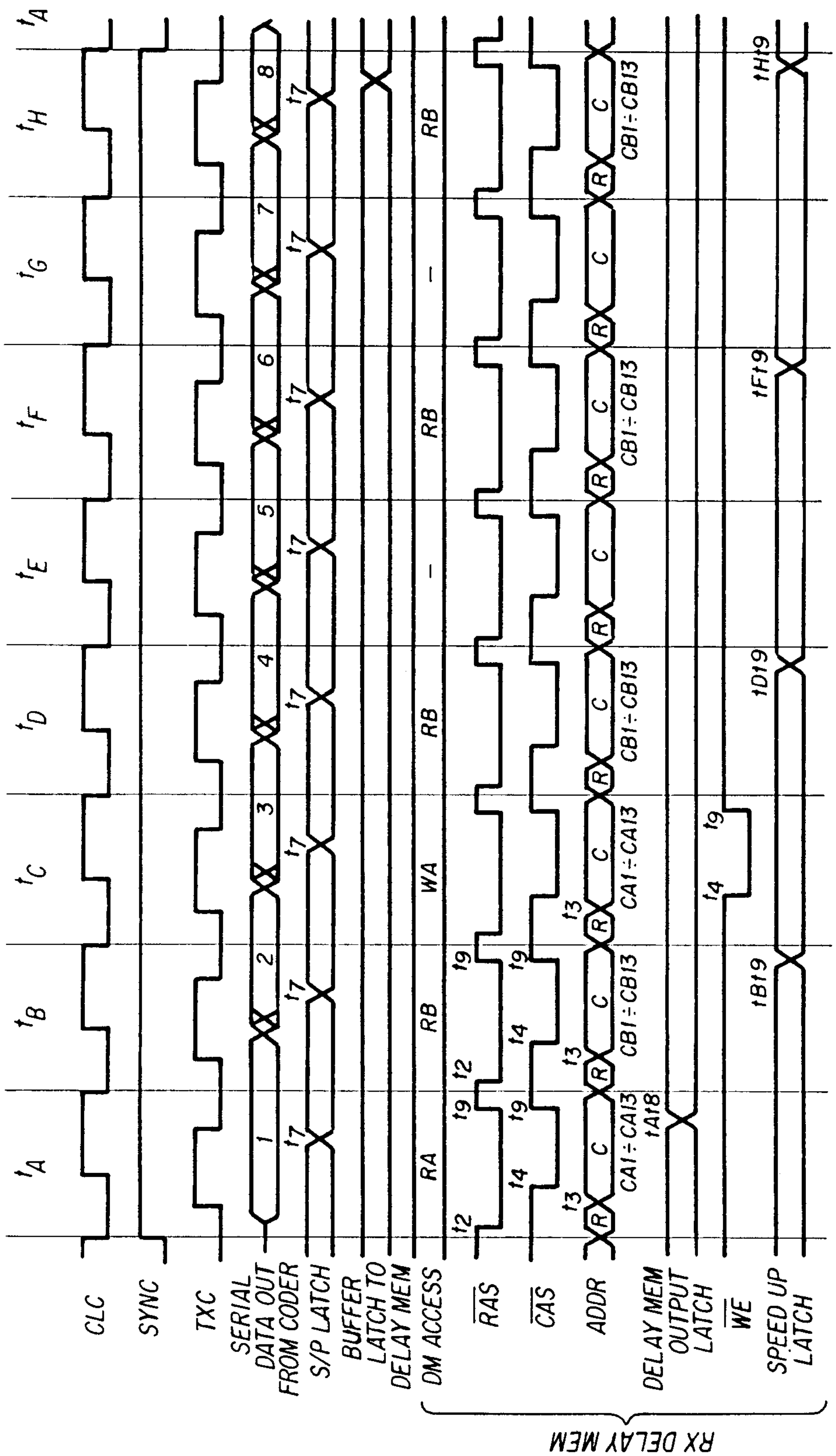
FIG. 19(*a* & *b*) is a timing diagram of the receive speech flow timing; divided into two parts a,b.
Figure 19B:
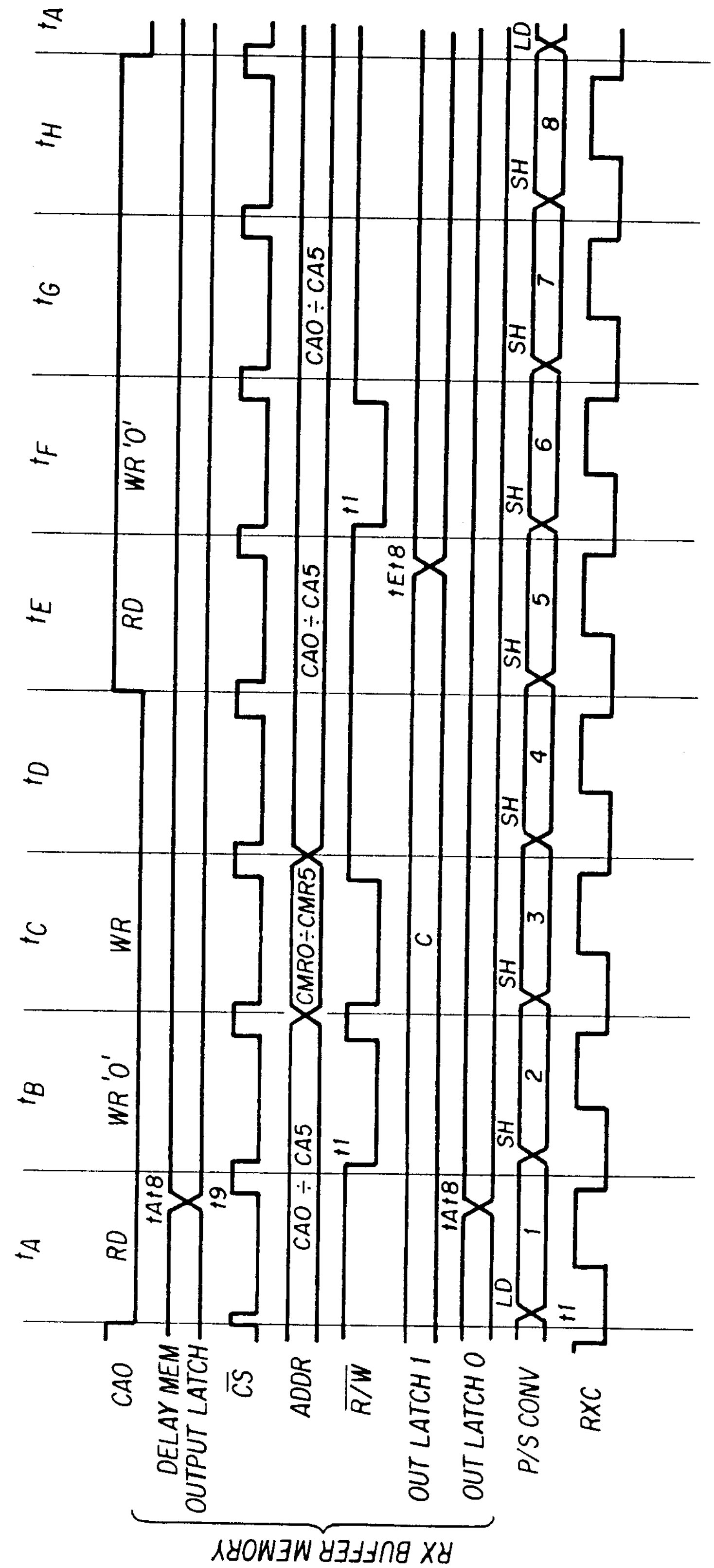

FIG. 19 is a detailed timing diagram of the circuitry described in FIGS. 17 and 18.

The signal detection circuitry will now be described with reference to FIGS. 20–25. The operation of the signal detection circuitry may be described in summary form as the comparison of signals received from telephone communication lines with a minimum threshold plus an added variable threshold provided for echo suppression. Should the signal received from the telephone communication lines exceed this threshold, it is passed along to integration circuitry which provides a desired amount of hangover and establishes a minimum signal duration for line assignment.

Figure 20A:
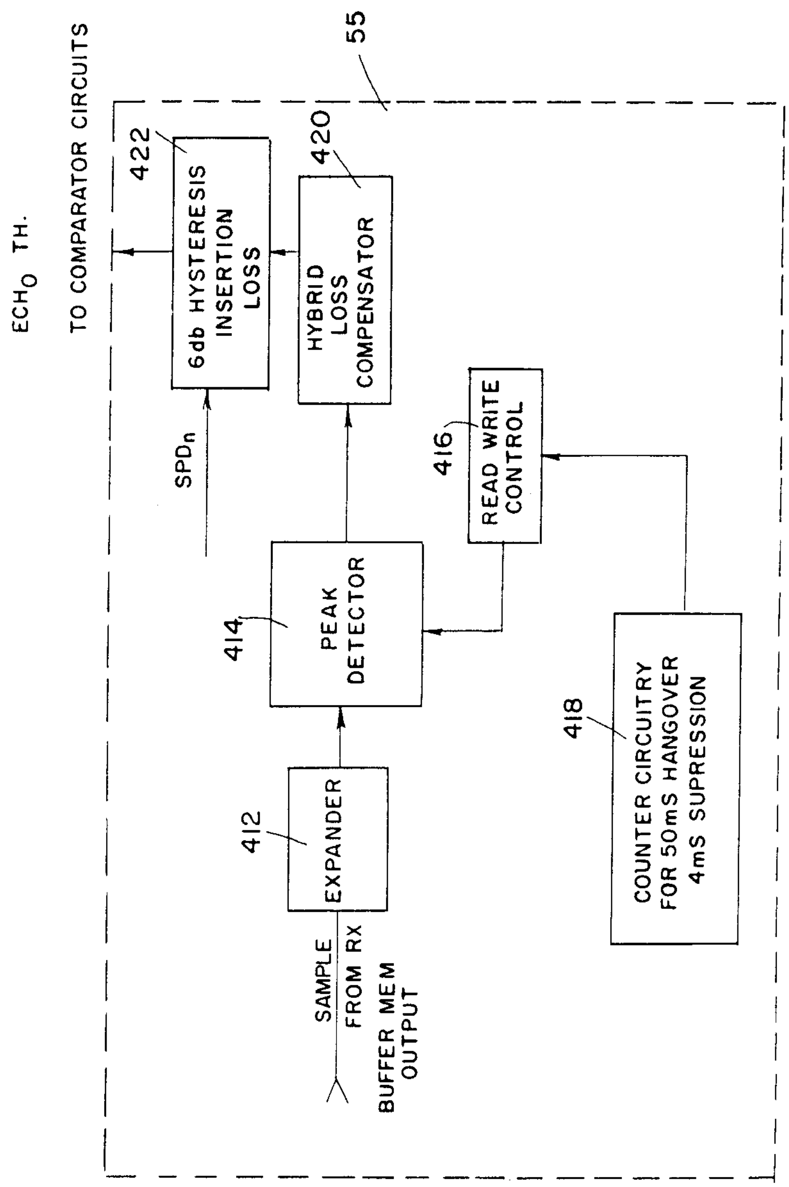
FIG. 20(*a* to *c*) is a block diagram of speech detection circuitry; divided into three parts a–c.
Figure 20B:
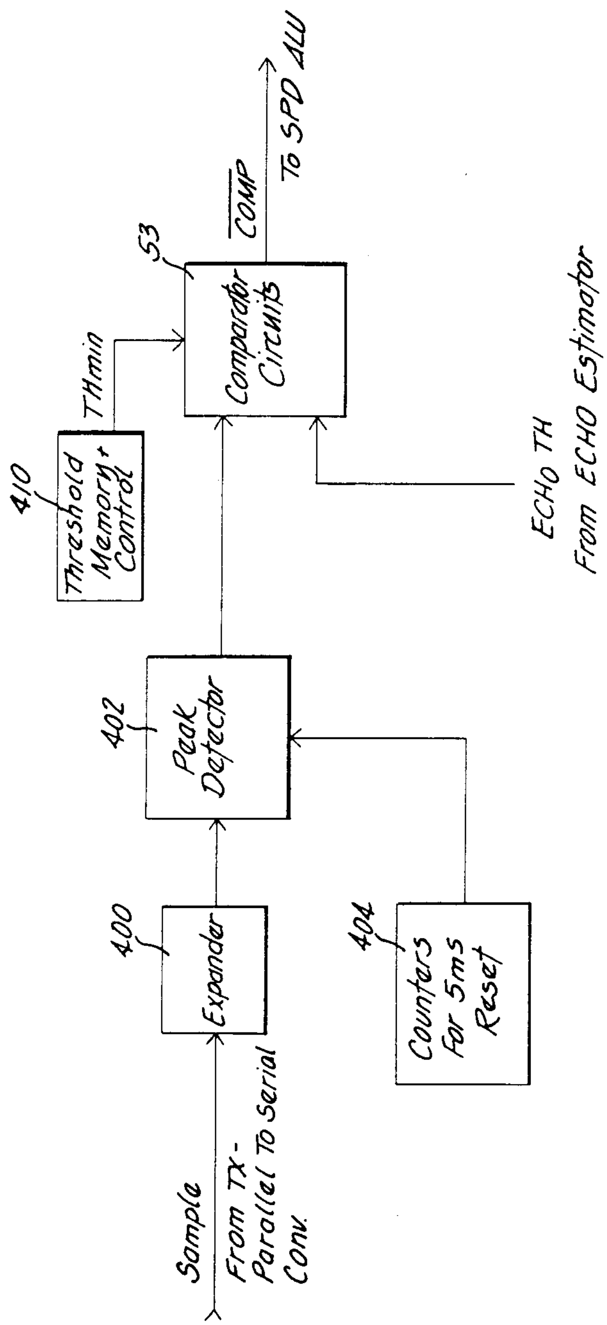
Figure 20C:
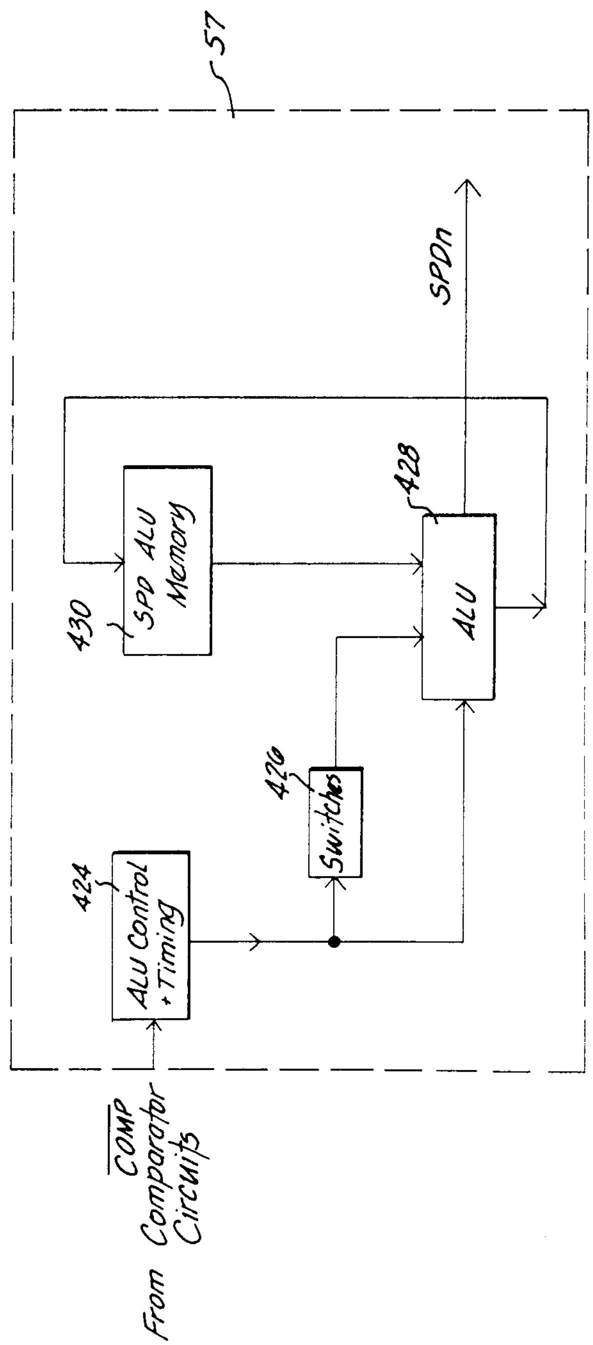

Reference is now made to FIG. 20 which illustrates in block diagram form the signal detection circuitry constructed and operative in accordance with an embodiment of the present invention. The output of serial to parallel converter 18 is supplied to an expander 400 which provides an 8-bit linear parallel output to a peak detector 402. The structure of the peak detector will be described hereinafter in detail. Its function is to preserve the highest peak level and it is reset every 5 ms to enable it to drop to the then current signal level. Counters 404 provide inputs to the peak detector 402 for resetting thereof.

The output of peak detector 402 is supplied to comparator circuitry 53. Comparator circuitry 53 also receives an input signal from expected echo suppression circuitry 55 and a minimum threshold control signal THmin from threshold memory and control circuitry 410.

Echo suppression circuitry 55 comprises an expander 412 which receives signal inputs from the output of receiver buffer memory 52 and provides an 8 bit linear parallel output to a peak detector 414. Peak detector 414 is operative to hold a peak level until 50 ms following cessation of the signal and is also operative to ignore the first 4 ms of a received signal, in order to provide protection against noise spikes.

Peak detector 414 receives control inputs from read-write control circuitry 416 which in turn receives control inputs from counter circuitry 418 which provides the timing for the 50 ms hangover and the 4 ms suppression. It is noted that the hangover and suppression times given here are those considered preferred and may be adjusted.

The output of peak detector 414 is supplied to comparator 53 via viable attenuation circuits 420 and 422, typically a hybrid loss compensator and a 6 db Hysteresis insertion loss circuit respectively. These circuits will be described in detail as to structure and function hereinafter.

The output of comparator 53 is supplied to SPD Arithmetic Logic Unit circuitry 57. Circuitry 57 comprises ALU control and timing circuitry 424 which receives the comparator output and which supplies output signals to switches 426 and to an adder 428. A SPD-ALU memory 430 is associated with the adder 428. Circuitry 57 is operative in response to each indication of signal presence to add a predetermined amount to a memory until a predetermined threshold is reached and in response to each indication of signal absence to subtract a smaller amount from the memory. It establishes a minimum signal duration for line assignment and provides a variable amount of line assignment hangover during signal absence and displays certain hysteresis characteristics. The structure and function of circuitry 57 will be described in detail hereinafter.

Figure 21A:
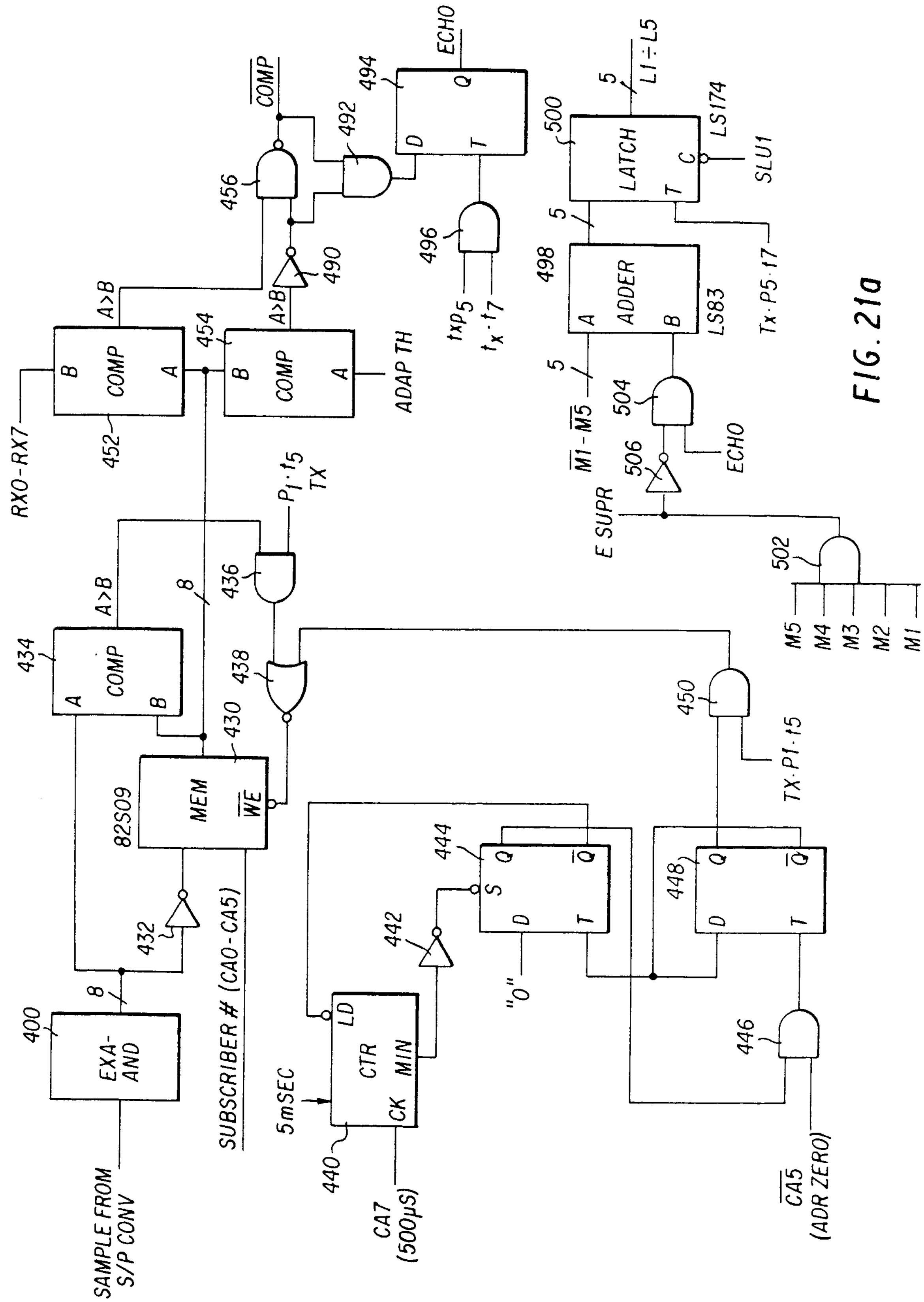
FIG. 21(*a*& *b*) is a simplified illustration of a portion of the circuitry of FIG. 20; divided into two parts a,b.
Figure 21B:
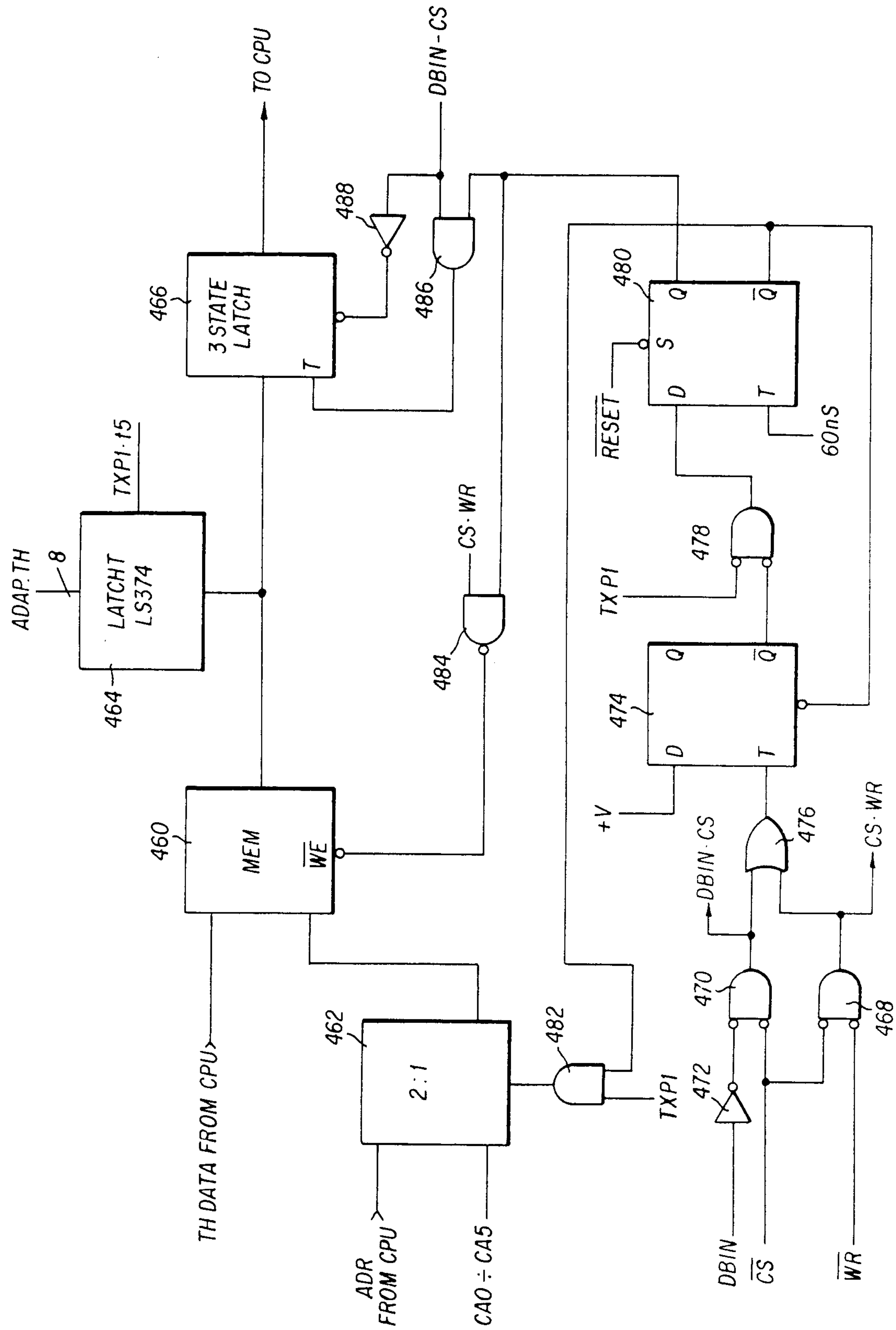

Reference in now made to FIG. 21 which is a simplified schematic illustration of peak detector circuitry 22 and comparator circuit 53 shown in FIG. 2 and which includes elements 400, 402, 404, 53 and 410 of FIG. 20. Expander 400 receives the output from the serial to parallel converter 18 (FIG. 2) and provides an output to a memory 430 via an inverter 432. Expander 400 comprises 4 LS 151 and 2 LS 153 multiplexers and associated control logic illustrated in detail in FIG. 24.

Memory 430 comprises an 82S09 chip of Signetics which receives the output of expander 400 as well as a six-bit address input from timing circuitry (CA 0–CA 5) which indicates which of the 48 telephone communication lines is presently connected to the memory. The output of expander 400 is also supplied to a comparator 434, typically comprising two LS 85 comparator chips. Comparator 434 also receives the output of memory 430 and thus compares the signal level currently received with the peak signal level received since the last 5 ms reset. If the current signal level is higher than that in the memory, comparator 434 provides an output signal to an AND gate 436 which provides a WRITE signal via a NOR gate 438 to the $\overline{WE}$ input of memory 430 at a time determined by a timing signal P 1·T 5 supplied by the timing circuitry to AND gate 436. In response to this WRITE signal the current sample level is intered into the memory, and becomes the new peak level. If the current signal level does not exceed that in the memory, no WRITE signal is generated.

Reset counters 404 comprise a LS 191 up-down counter 440 and a CA 7 timing signal from the timing circuitry having a 500 microsecond periodicity. Counter 440 is controlled by toggle switches (not shown) to provide an output every 5 msecs. The MIN output of counter 440 is connected via an inverter 442 to the present input of a Flip-Flop 444, typically an LS 74 chip. The $\overline{Q}$ output of Flip-Flop 444 is coupled to the LD input of counter 440 and the Q output of Flip-Flip 444 is supplied to an input of an AND gate 446 which also receives a $\overline{CA}$ 5 timing signal from the timing circuitry. AND gate 446 supplies an output to the clock input of a Flip-Flop 448. The $\overline{Q}$ output of Flip-Flop 448 is supplied to its own D input and to the Clock input of Flip-Flop 444. The Q output of Flip-Flop 448 is supplied to an AND gate 450 which also receives a timing signal P 1·T 5 timing signal. The output of AND gate 450 is supplied via NOR gate 438 to the $\overline{WE}$ input of memory 430.

It may be understood that output of Flip Flop 448 is provided for one sampling cycle following each 5 ms reset to AND gate 450. The P 1·T 5 timing signal sequences through the 48 telephone comunications lines, such that the write signal is provided for each of the 48 telephone communications lines one time immediately following the 5 ms reset, independent of the operation of comparator 434.

The output of memory 430 is supplied in parallel to two comparator circuits, 452 and 454, each comprising two LS 85 comparators. Comparator 452 compares the output of memory 430 with the output of echo circuitry 55 (RX 0–RX 7) and provides an output a NAND gate 456 if if the output of memory 430 exceeds the output of circuitry 55.

Comparator 454 compares the output of memory 430 with the output of threshold memory and control circuitry 410. Threshold memory and control circuitry 410 comprises an 82S09 memory 460 which stores minimum threshold values for each of the 48 telephone communication lines in response to inputs from the CPU. The address input to memory 460 receives an input from a 2:1 multiplexer 462. This input is either the address of the telephone communication line currently being received by the peak detector 420 indicated by timing signals CA 0–CA 5 or another telephone communication line address specified by the CPU, depending on the select signal provided at the select input to the multiplexer.

The output of memory 460 is supplied to a latch 464 leading to comparator 454. The latch 464 is clocked by timing signals P 1·T 5. The memory output is also supplied to a tristate latch 466 which interfaces with the CPU data bus, for readout from memory 460 to the CPU. It is to be understood here that memory 460 is under the control of the detector circuitry and is also under control of the CPU. Circuitry to be described immediately hereinafter is provided for governing the priority between the sequenced activities of the detector circuitry and the random activities of the CPU, so as not to interfere with the activities of the detector circuitry. The detector circuitry may instruct the memory to read out via latch 464 and the CPU may instruct the memory to write or to read out via latch 466.

A write command from the CPU is supplied to an input of a NOR gate 468. A chip select input $\overline{CS}$ is supplied from the CPU to Nor gate 468 and a NOR gate 470. A DBIN input from the CPU, representing a read request is supplied via an inverter 472 to a second input of NOR gate 470. The outputs of NOR gates 468 and 470 are routed to the clock input of a Flip-Flop 474 via an OR gate 476. The $\overline{Q}$ output of Flip-Flop 474 is supplied to an input of a NOR gate 478 which receives a P 1 timing signal at its second input. The output of NOR gate 478 to the data input of Flip-Flop 480 which receives a 60 ns clock input. The $\overline{Q}$ output of Flip-Flop 480 is supplied to an input of an AND gate 482 which also receives a P 1 timing input from the transmitter timing circuitry. The output of AND gate 482 provides the select signal to multiplexer 462 insuring that the multiplexer will pass the CPU-determined address to the memory 460 at all times except for a period of time preceding and including receipt of the detector circuitry $\overline{READ}$ command P 1·T 5.

The $\overline{Q}$ output of Flip-Flop 480 is also supplied to the CLEAR input of Flip-Flop 474. The Q output of Flip-Flop 480 is supplied to a first input of a NAND gate 484 which also receives the output of NOR gate 468. The output of NAND gate 484 supplies a WRITE signal to memory 460 at its $\overline{WE}$ input. The Q output of Flip-Flop 480 is also supplied to an input of an AND gate 486 which also receives the output of NOR gate 470. The output of NOR gate 470 is also supplied via an inverter 488 to the output control of tristate latch 466. The clock input to latch 466 is supplied by the output of AND gate 486.

Comparator 454 provides an output to an inverter 490. The output of inverter 490 provides a signal when the signal in memory 430 is greater than or equal to the minimum threshold level indicated by the output of latch 464. The output of inverter 490 is supplied to a NAND gate 456. The output of NAND gate 456 is a $\overline{COMP}$ signal which is supplied to the ALU control and timing circuitry 424. This signal is low only when the contents of the memory 430 are equal to or greater than the minimum threshold established at comparator 454 and greater than the expected echo threshold established at comparator 452.

The output of NAND gate 460 is supplied to an AND gate 492 which also receives the output of inverter 490. AND gate 492 provides an output when the contents of memory 430 are greater than the minimum threshold but do not exceed the expected echo threshold. A flip-flop 494 stores the output of AND gate 492 and is clocked by the output of an AND gate 496 which receives timing inputs t 7 and P 5. The Q output of the flip-flop 494 is supplied to the ALU control and timing circuitry 424 for indicating whether echo suppression is taking place.

Circuitry for determining whether the failure to detect a signal results from echo suppression of extended duration is provided by an adder 498 which adds either one or zero to a memory output (not shown) in response to the presence of an echo signal at each sample. The output of the adder is supplied to a latch 500 which in turn supplies the new total to the memory. When the memory reaches a predetermined threshold an AND gate 502 which receives the memory outputs (M 1–M 5) provides an output signal which terminates further adding and also provides an output indication to the CPU indicating extended duration echo suppression. The latch and thereby the memory is reset to zero in response to signal detection. The input to the adder for addition is connected via an AND gate 504 which receives the ECHO signal and also receives, via an inverter 506 the output from AND gate 502.

Figure 22A:
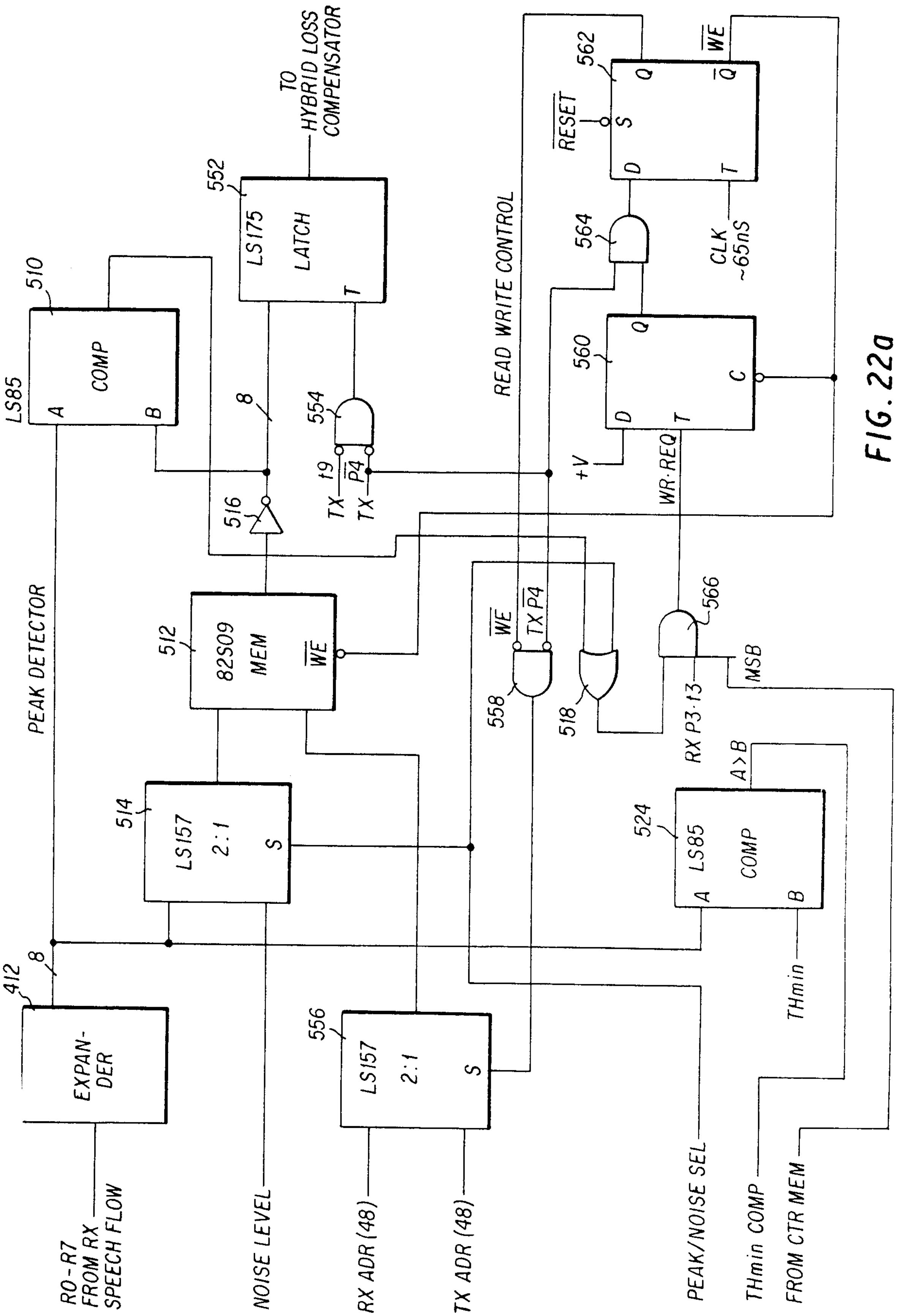
FIG. 22(*a* to *c*) is a simplified illustration of echo suppresion circuitry forming part of the circuitry of FIG. 20; divided into three parts.
Figure 22B:
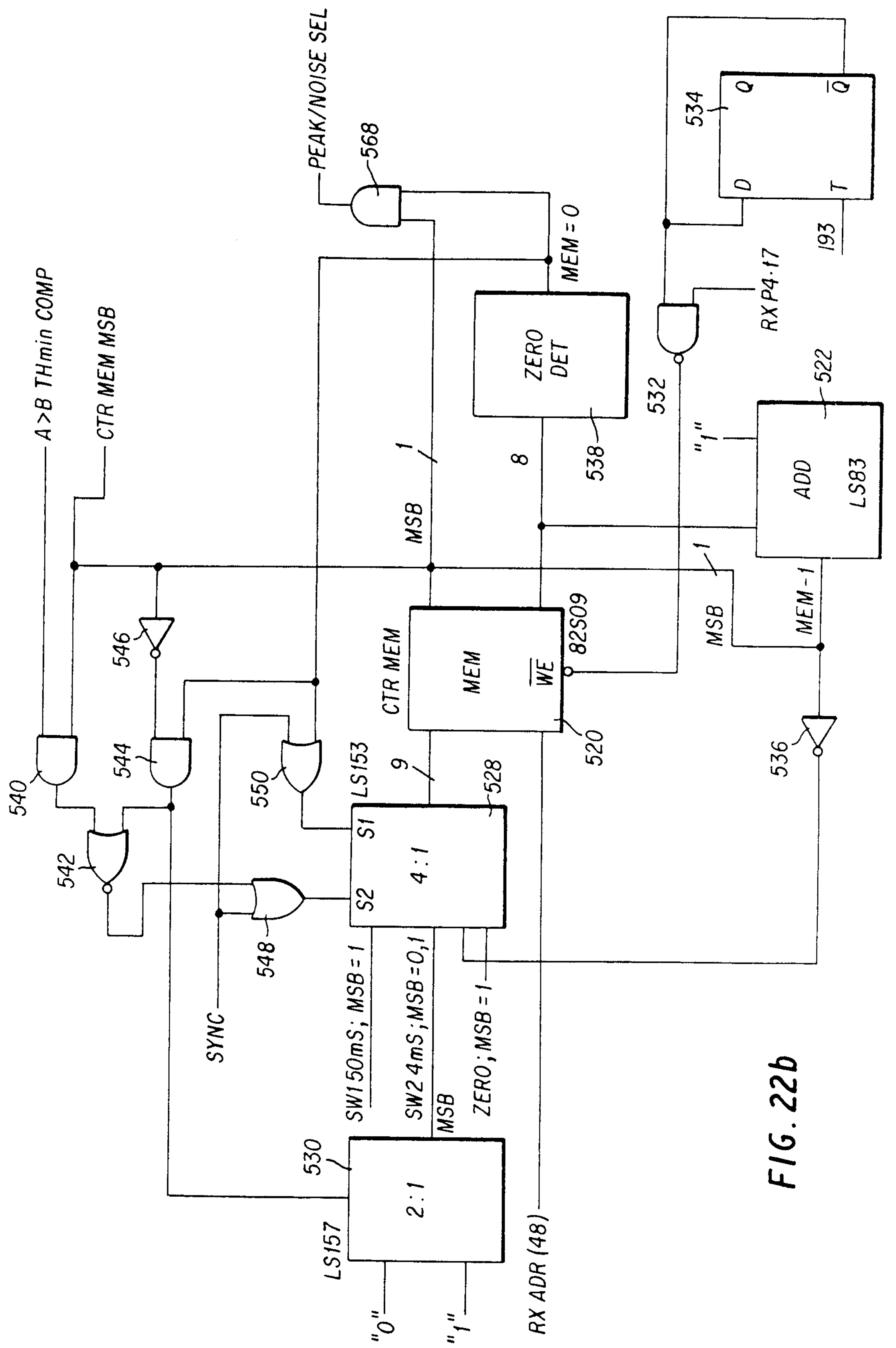
Figure 22C:
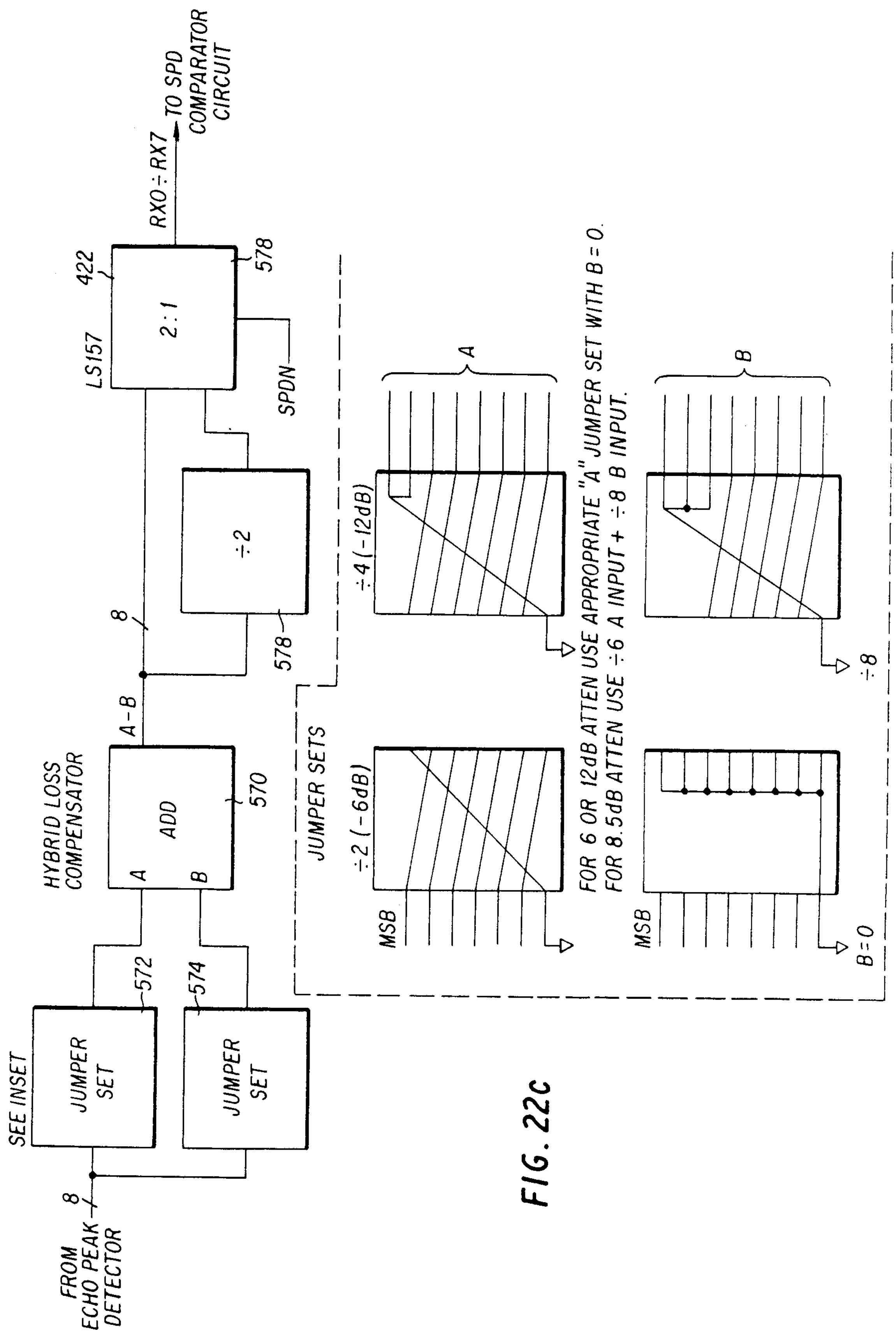
Figure 23A:
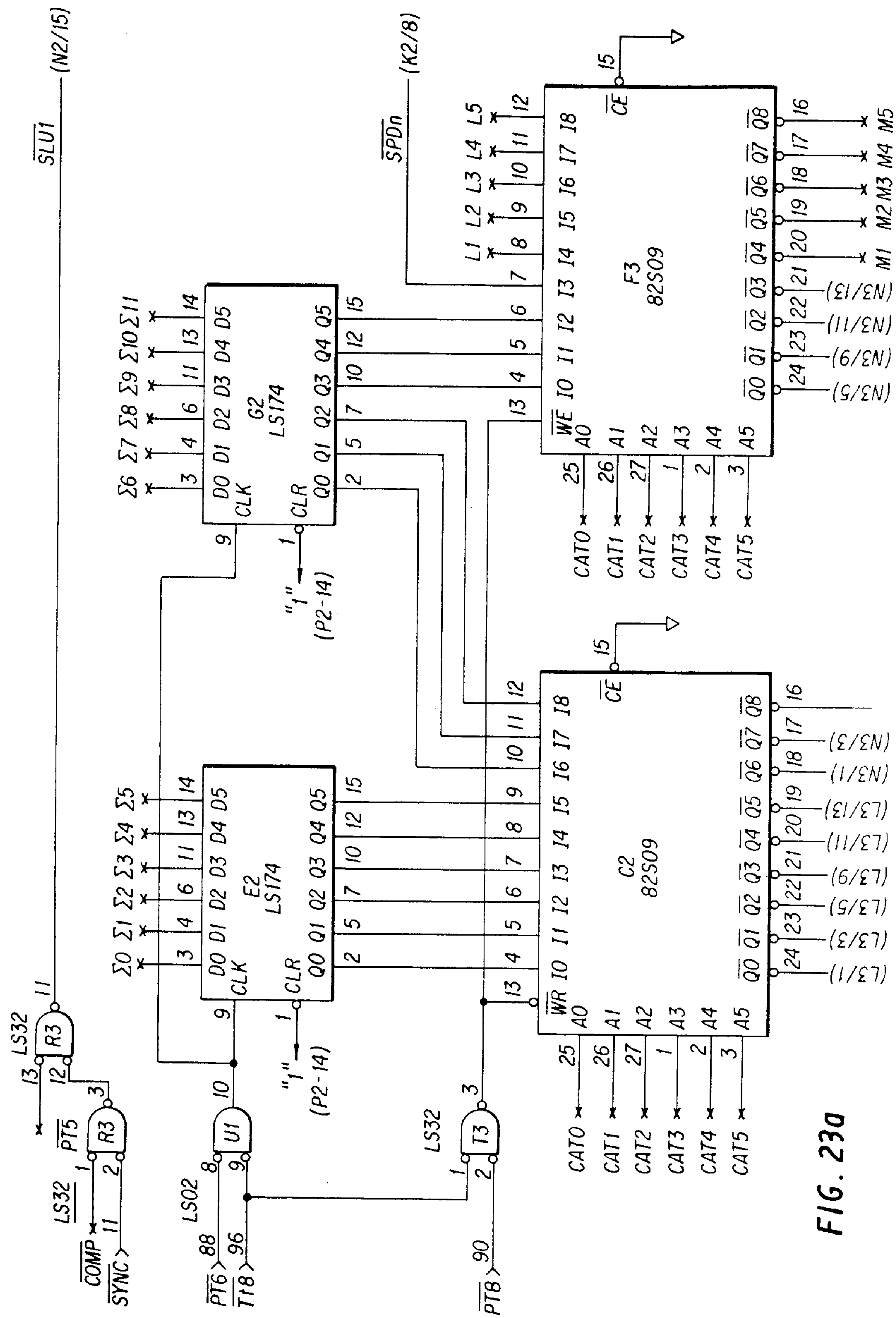
FIG. 23(*a* to *d*) is a schematic illustration of SPD ALU circuitry.
Figure 23B:
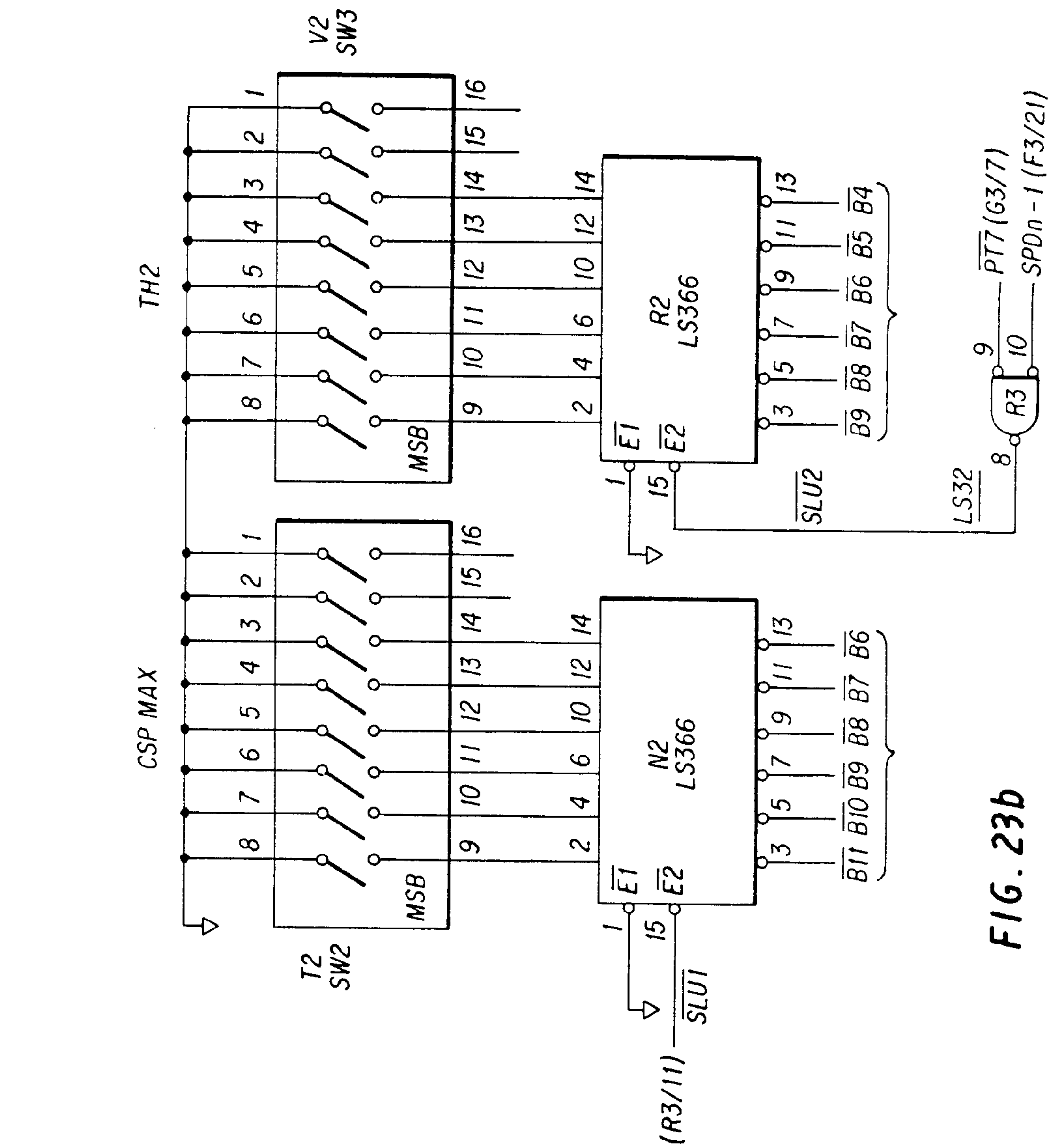
Figure 23C:
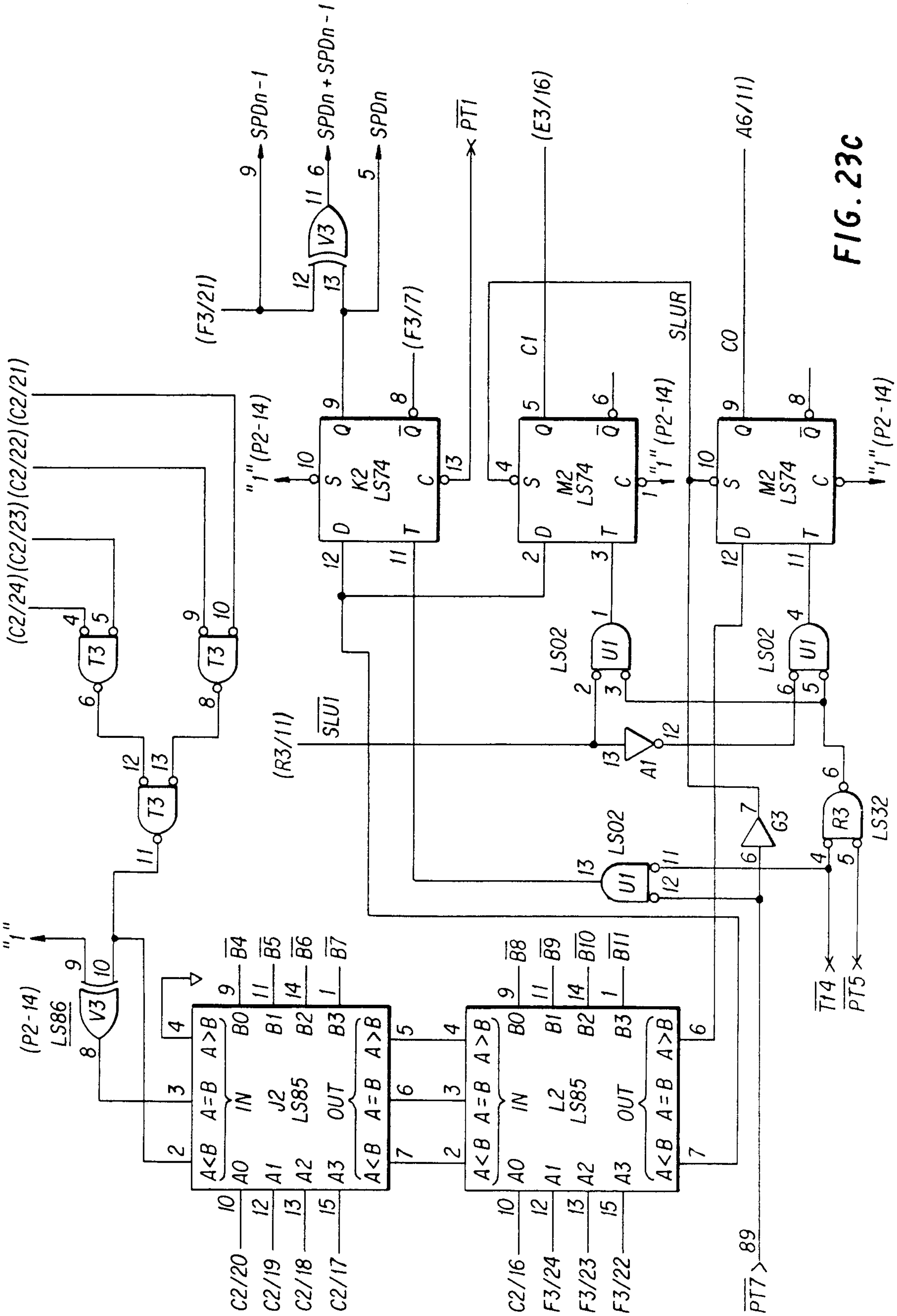
Figure 23D:
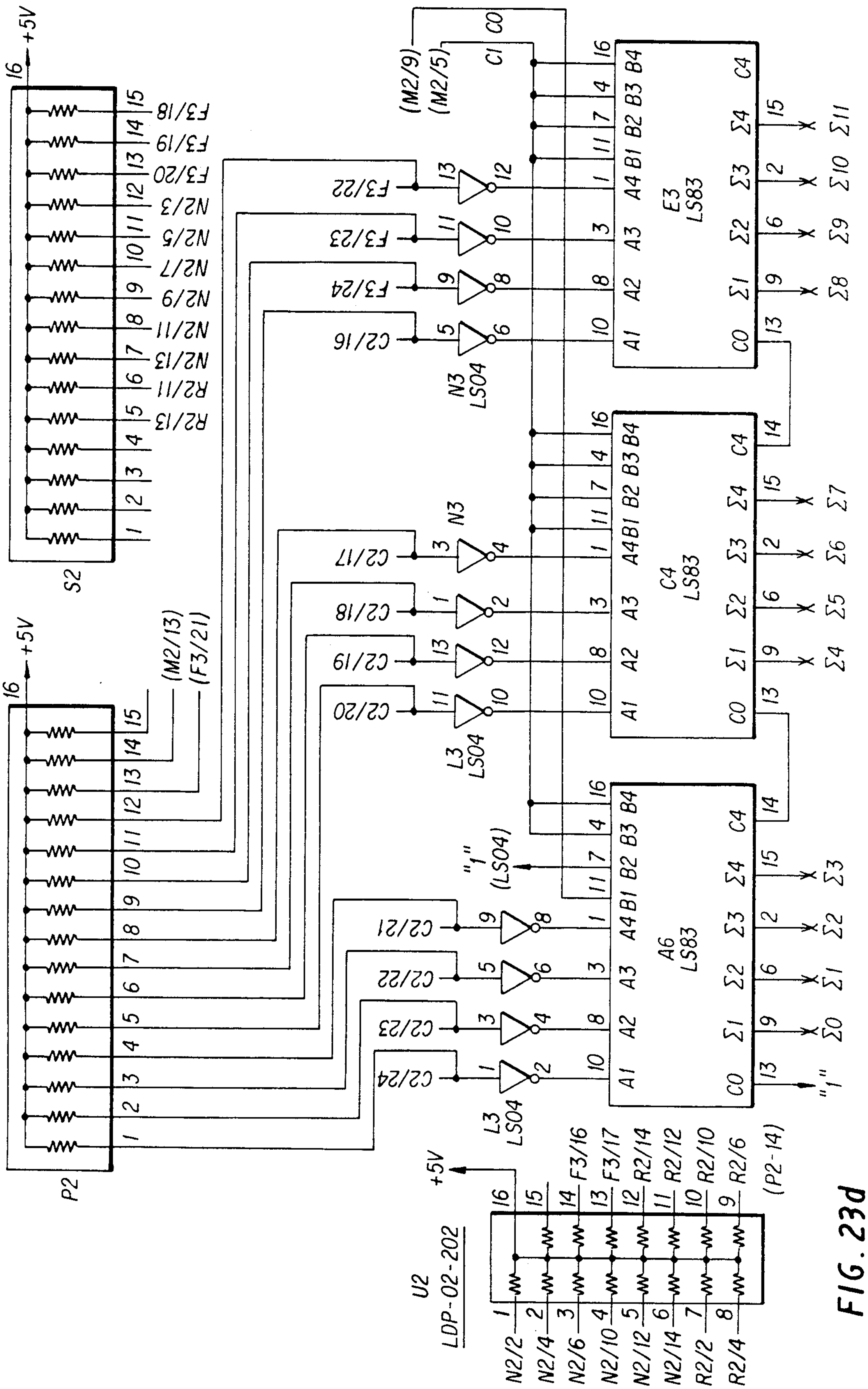
Figure 24A:
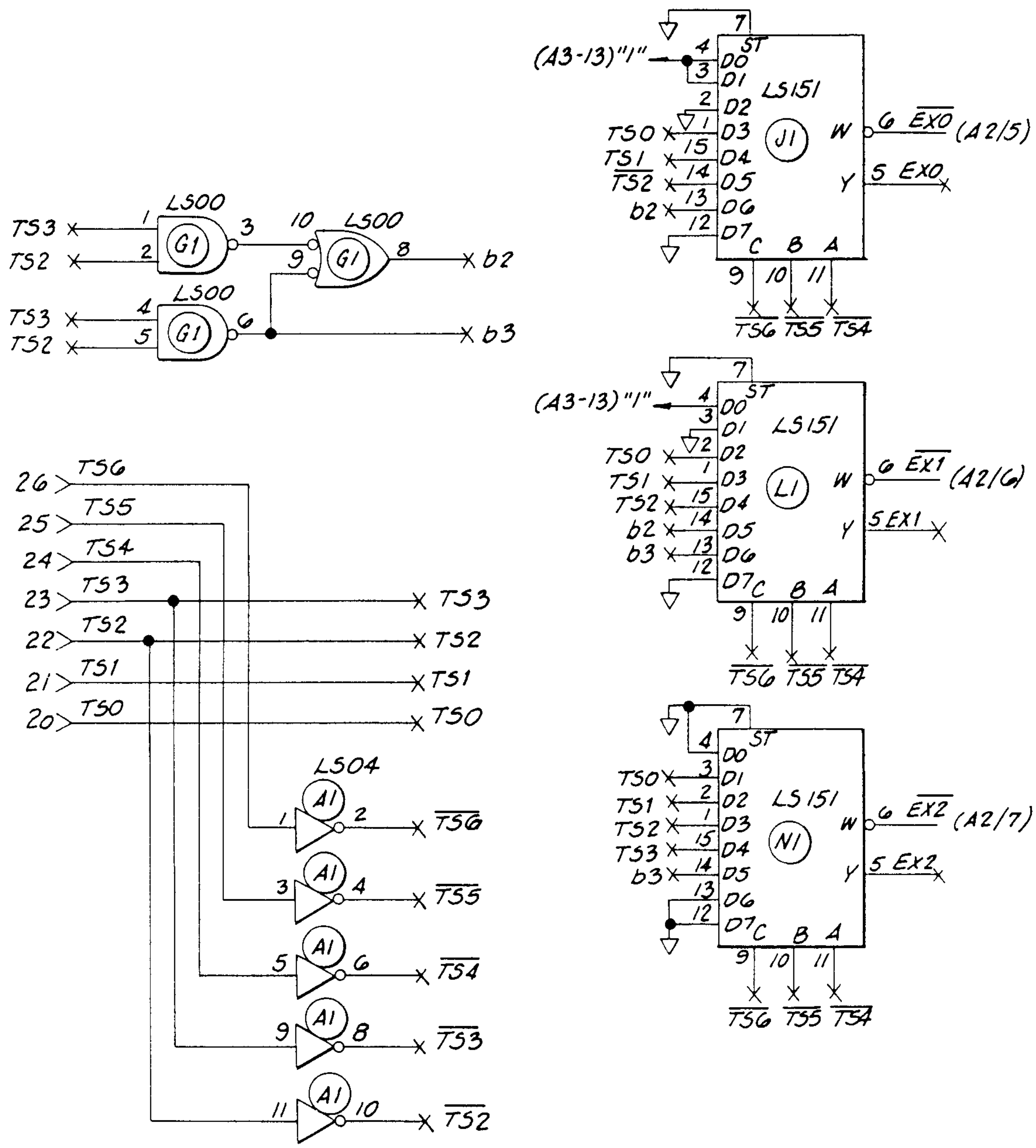
FIG. 24(*a* to *f*) is a schematic illustration of SPD comparison circuitry.
Figure 24B:
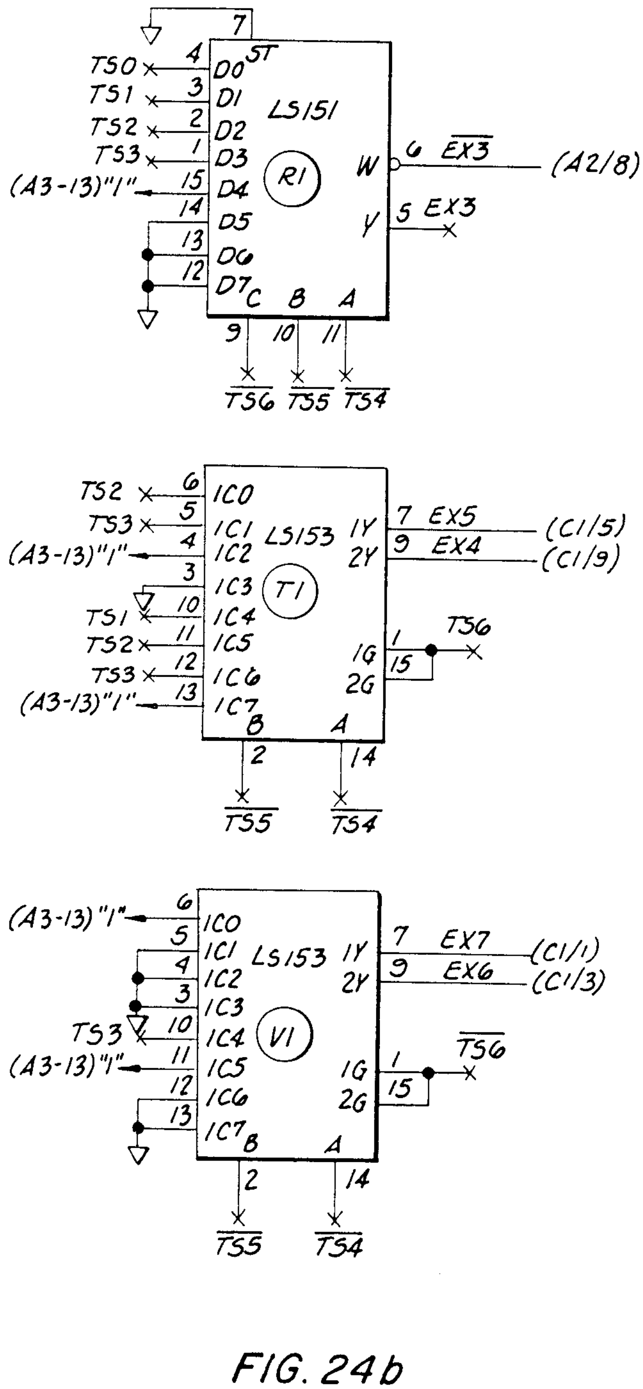
Figure 24C:
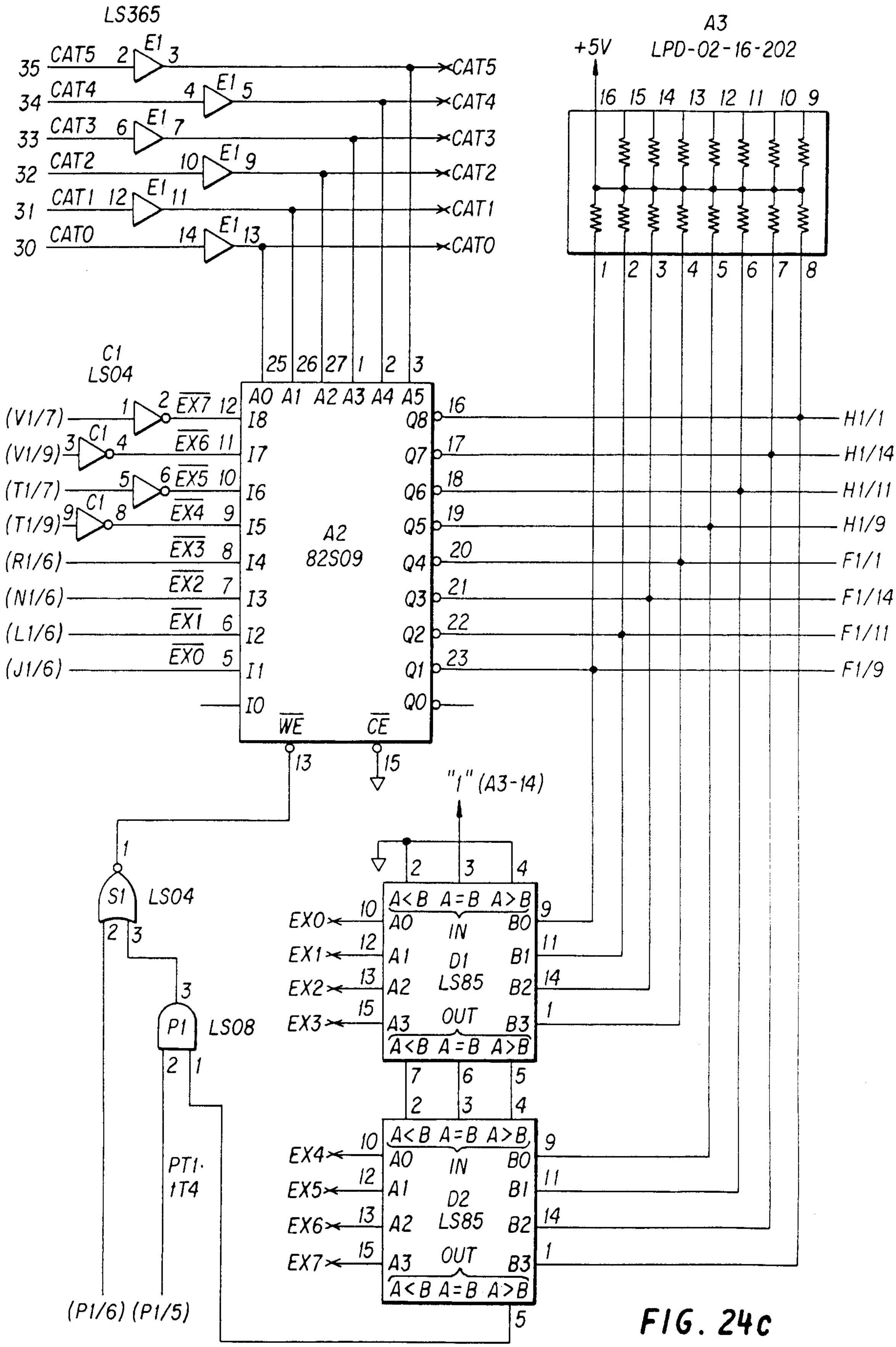
Figure 24D:
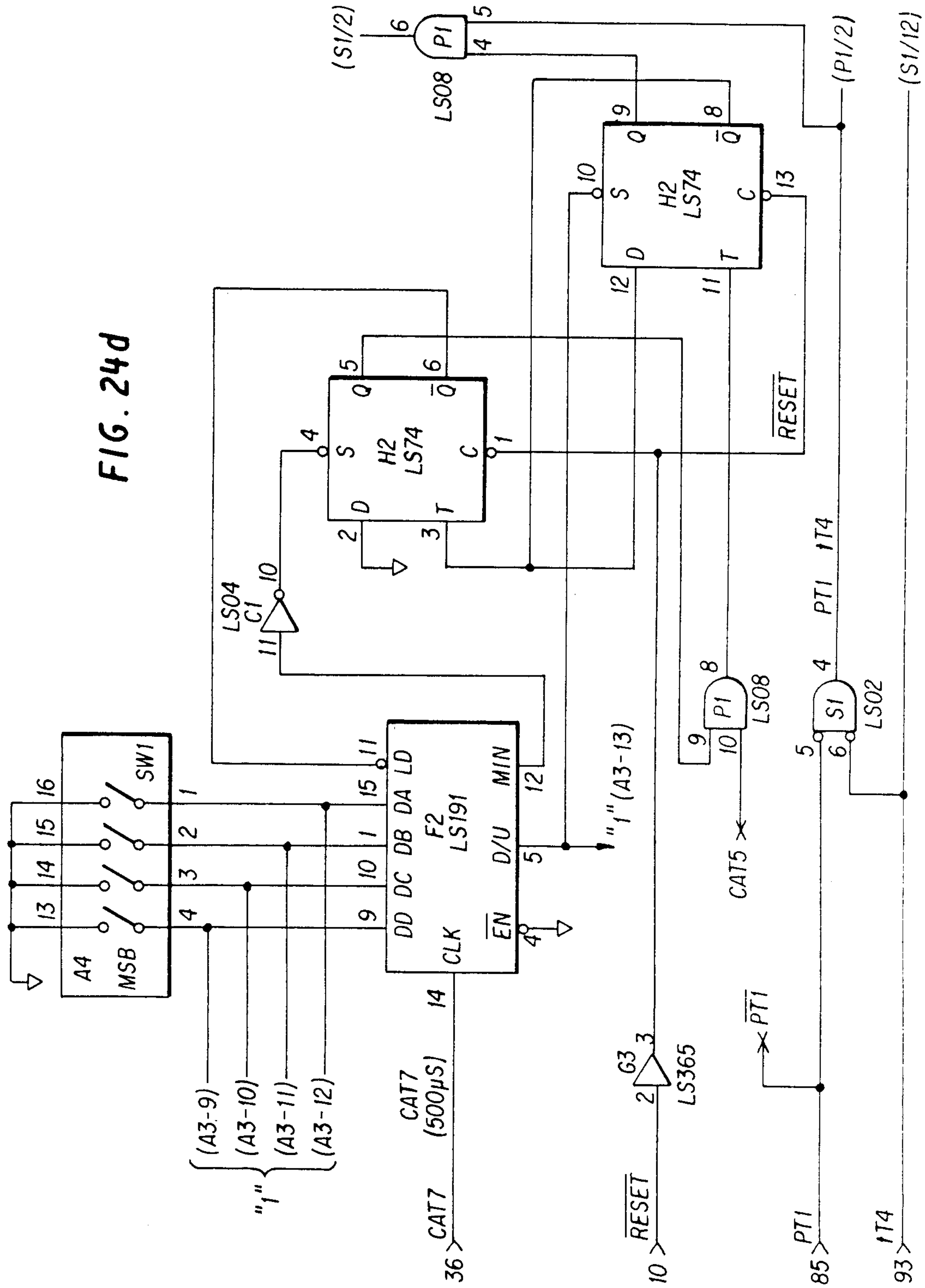
Figure 24E:
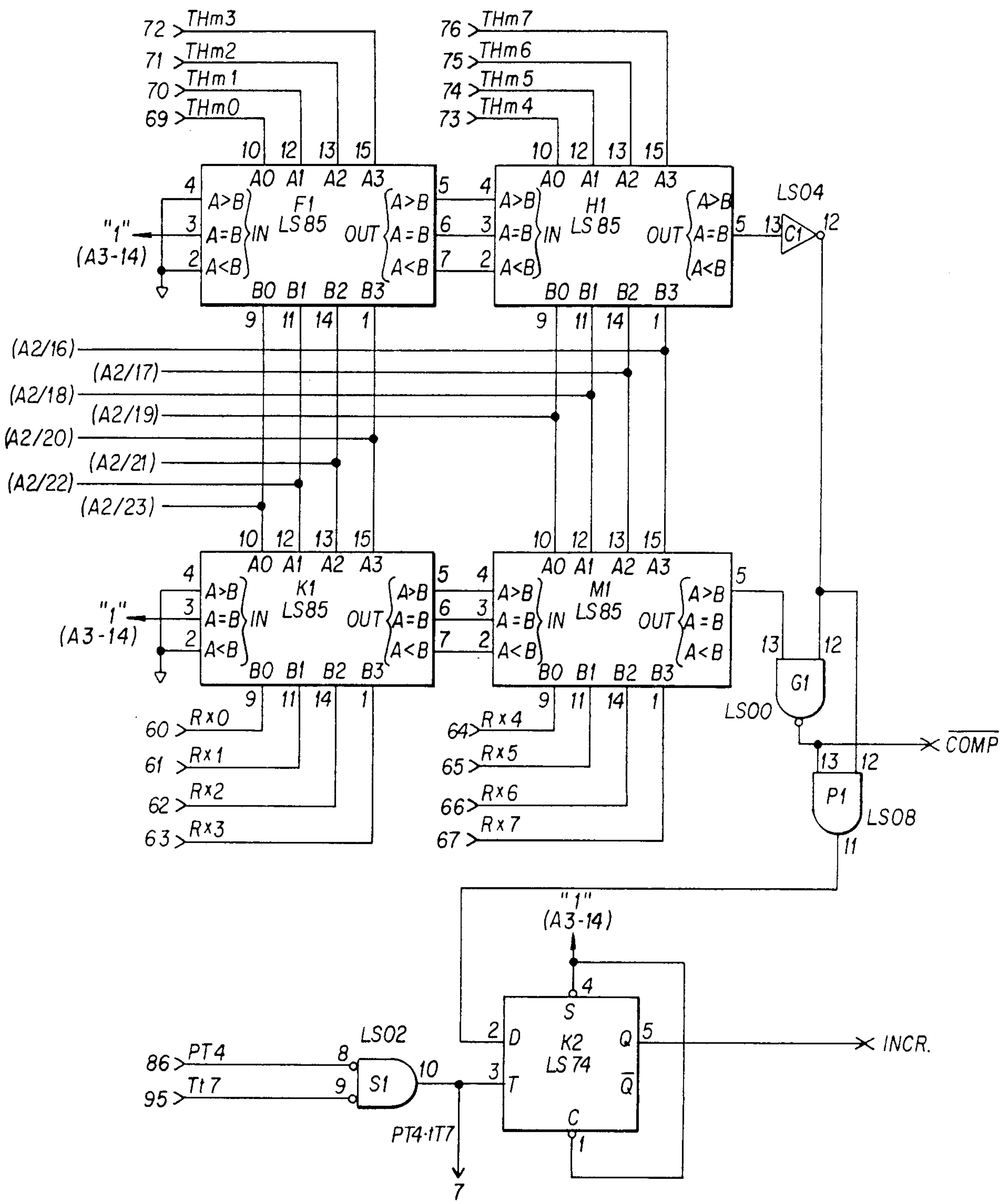
Figure 24F:
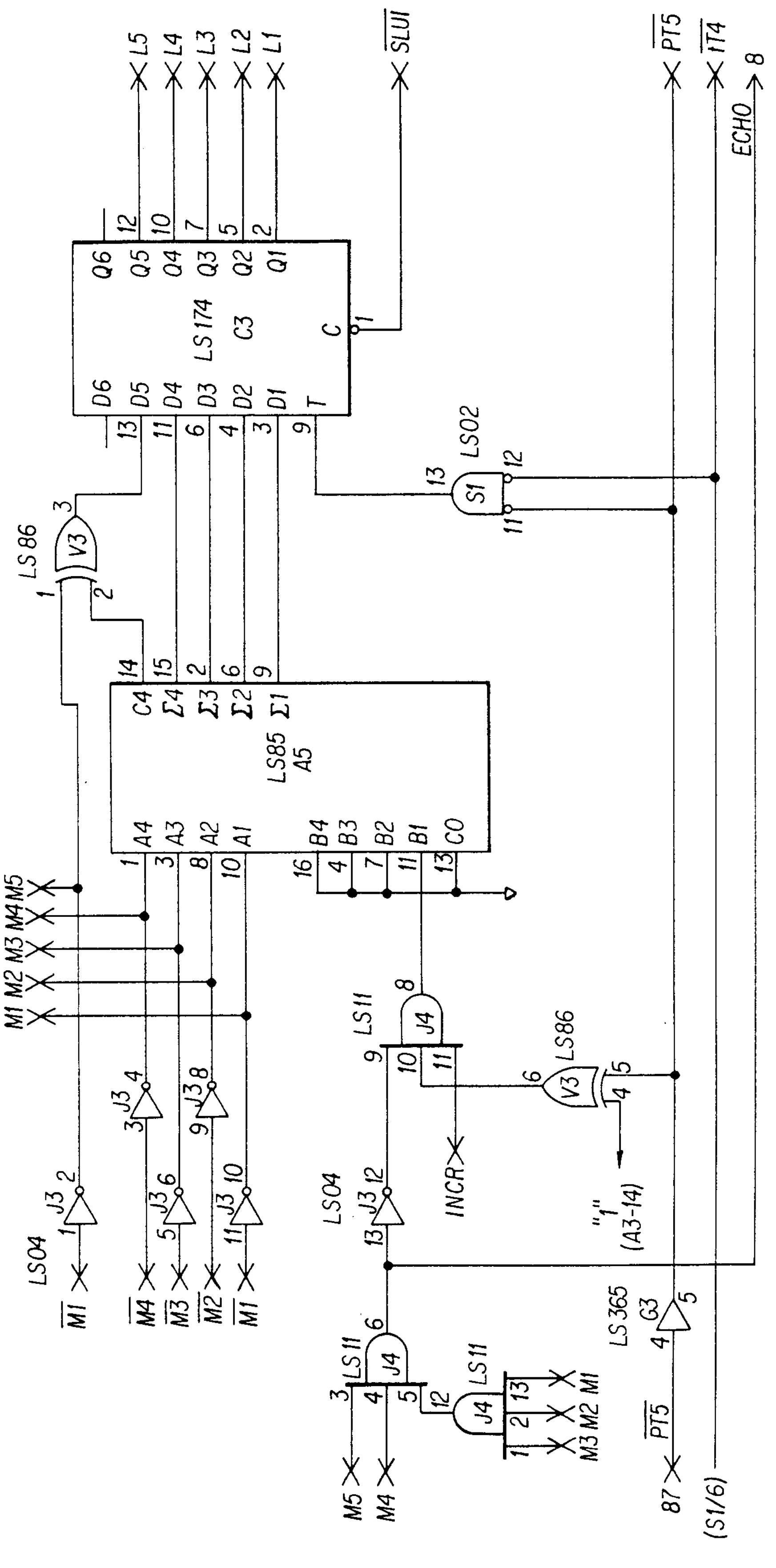
Figure 25A:
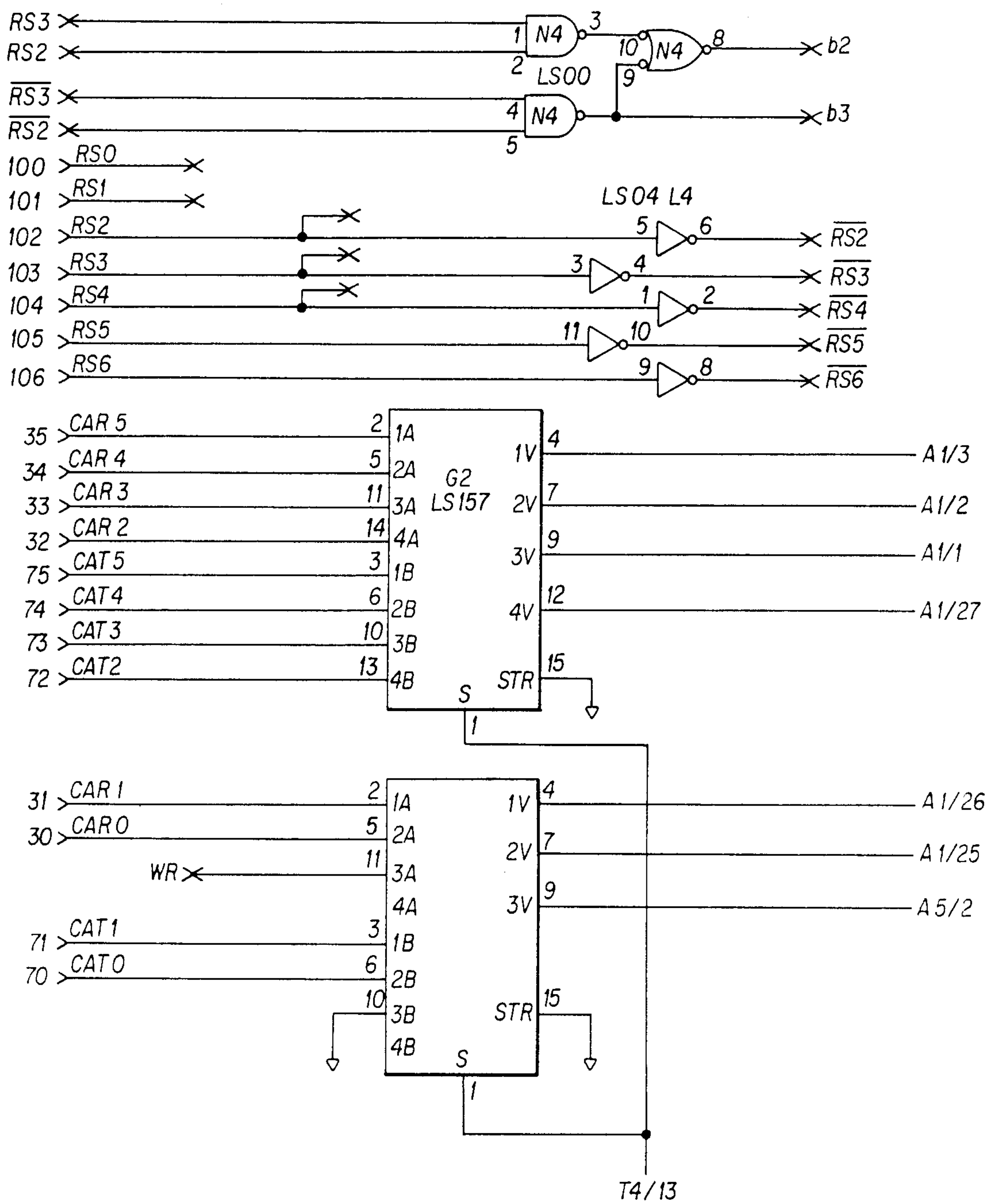
FIG. 25(*a* to *h*) is a schematic illustration of echo suppression circuitry shown in FIG. 22.
Figure 25B:
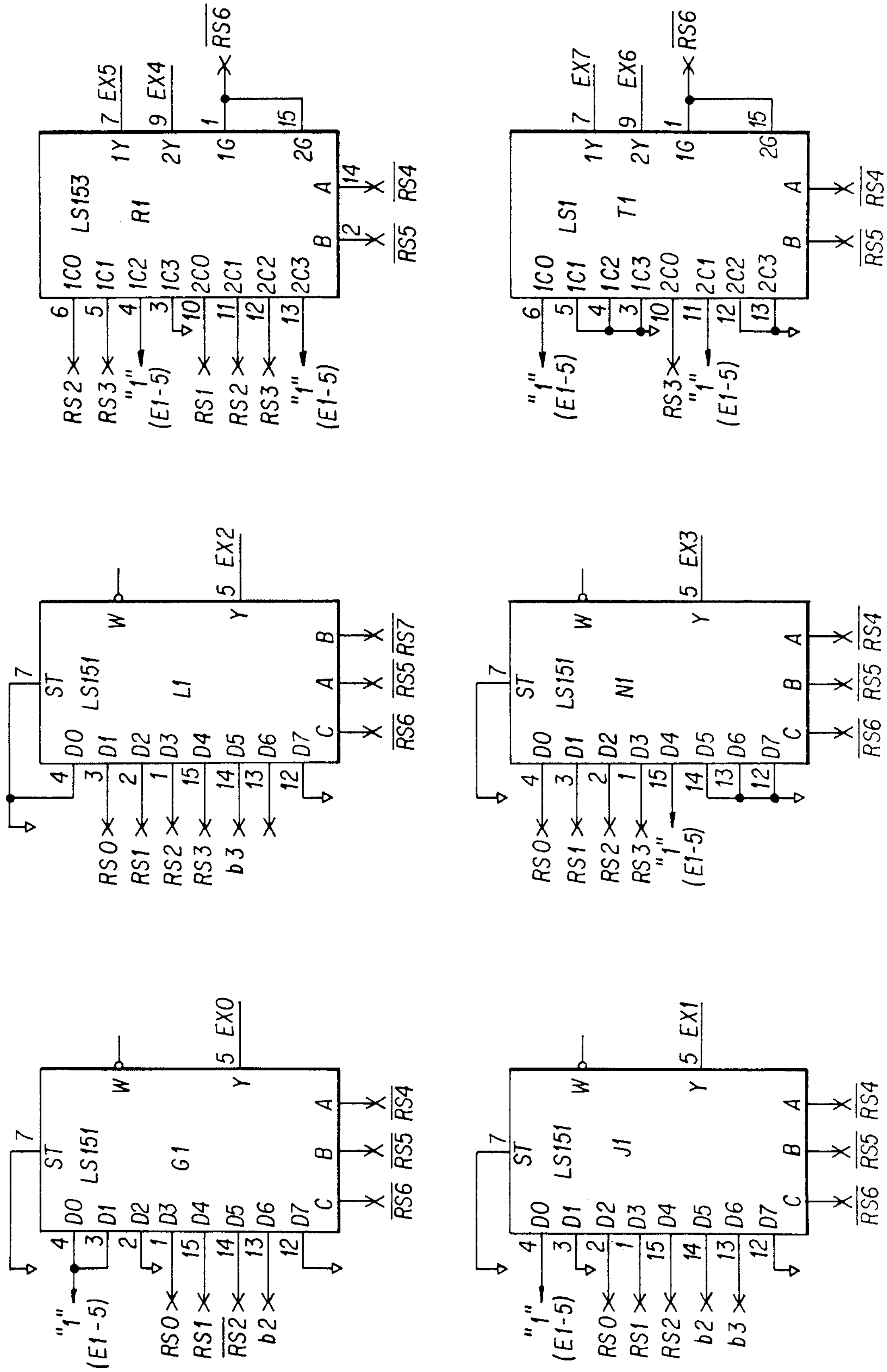
Figure 25C:
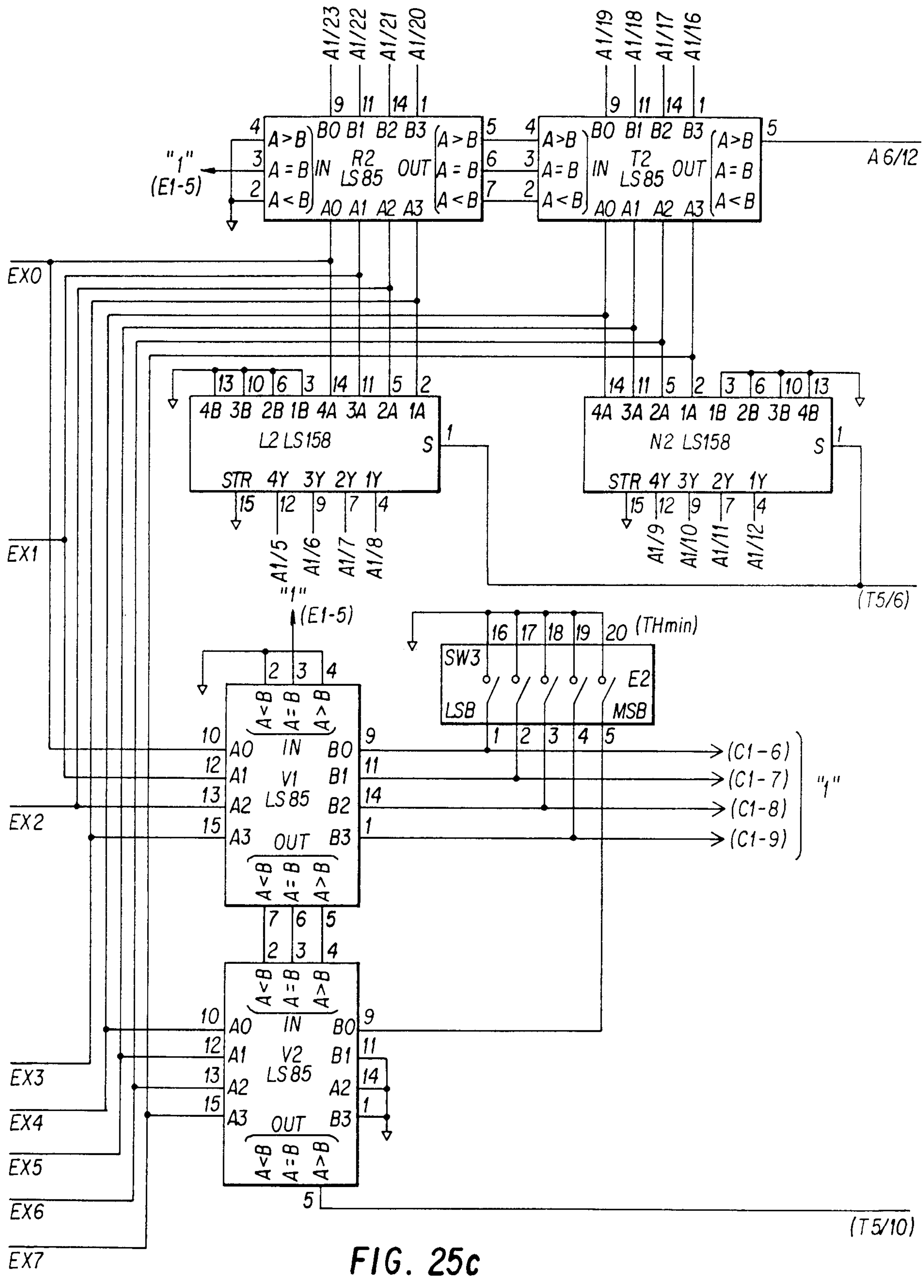
Figure 25D:
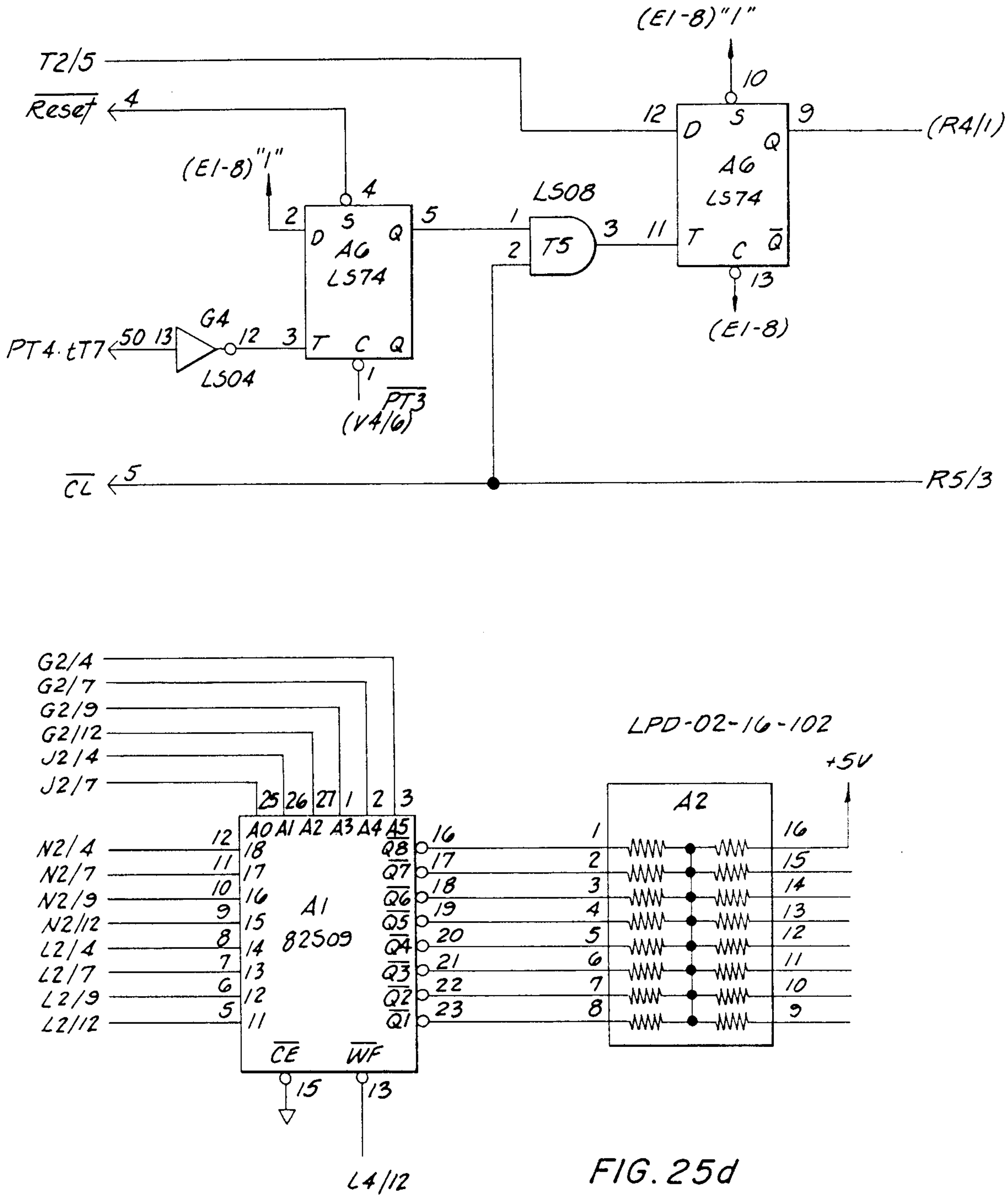
Figure 25E:
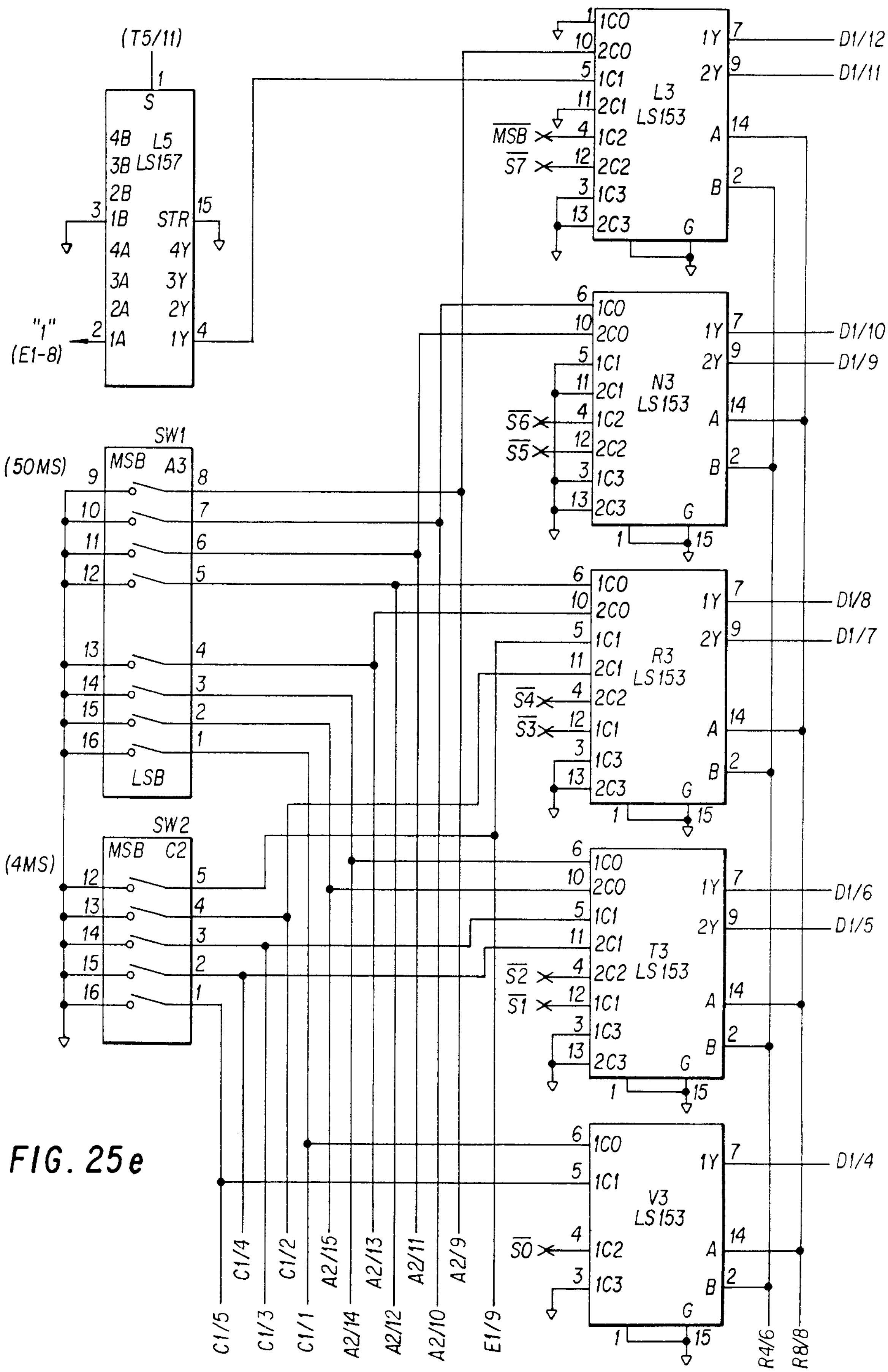
Figure 25F:
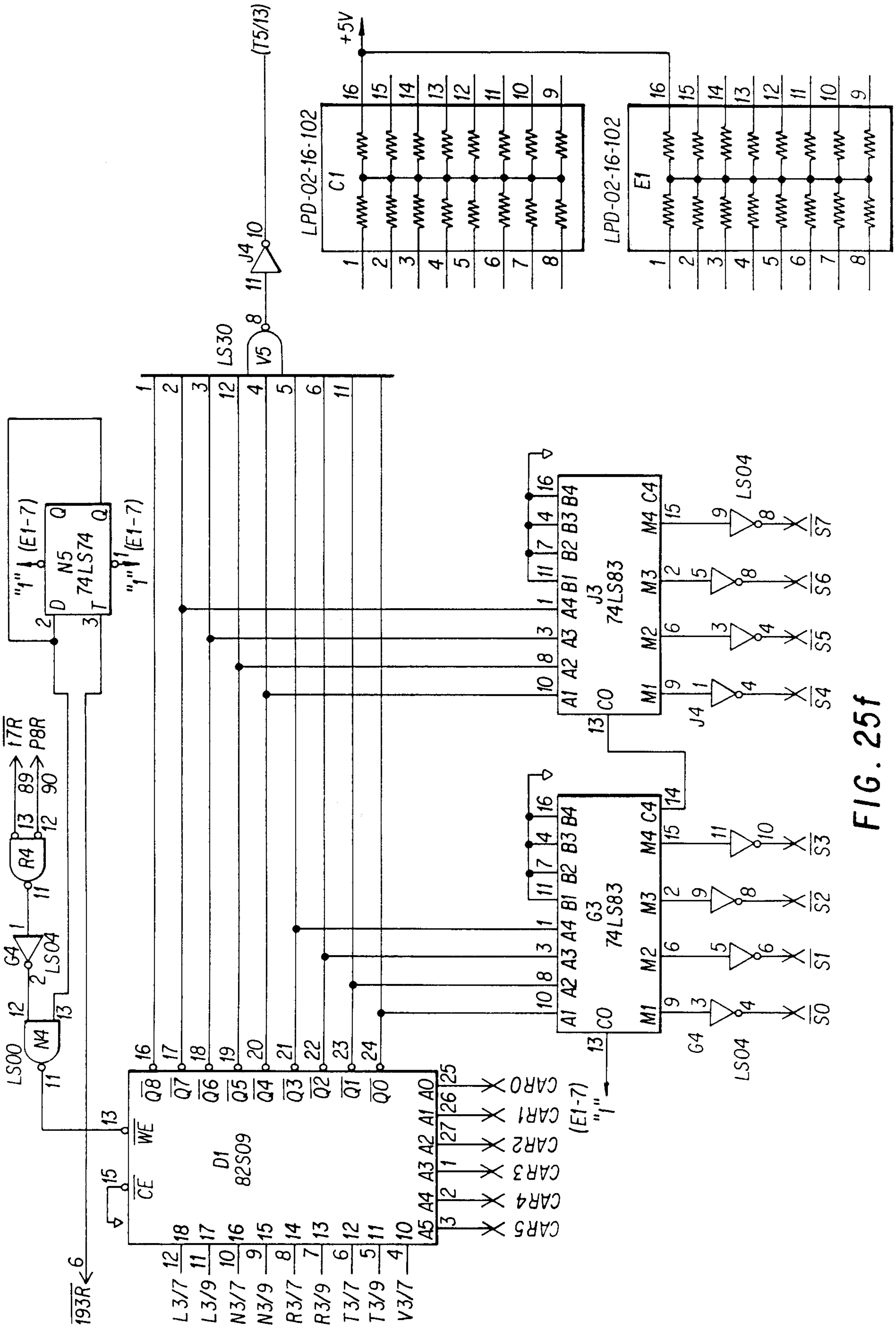
Figure 25G:
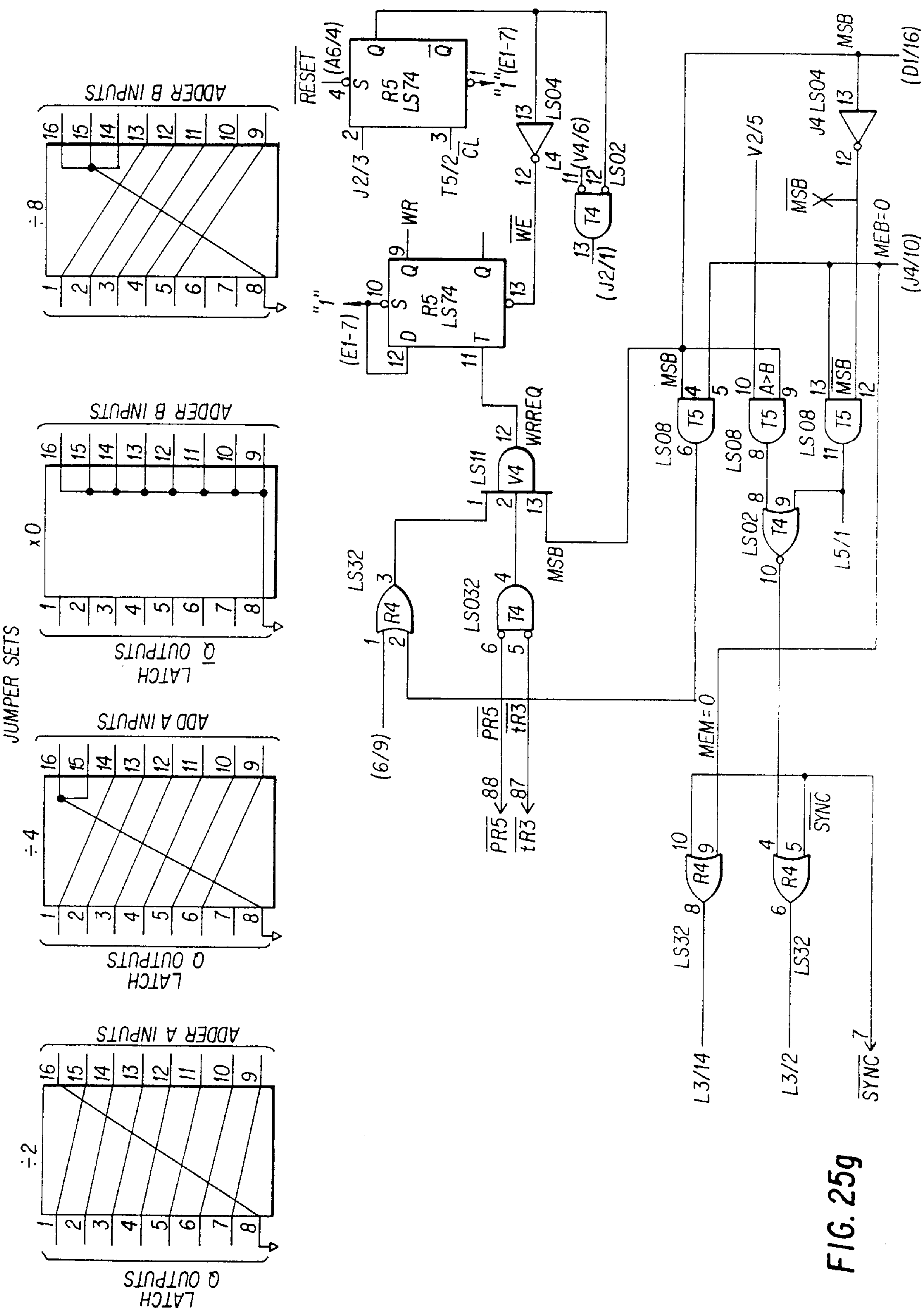
Figure 25H:
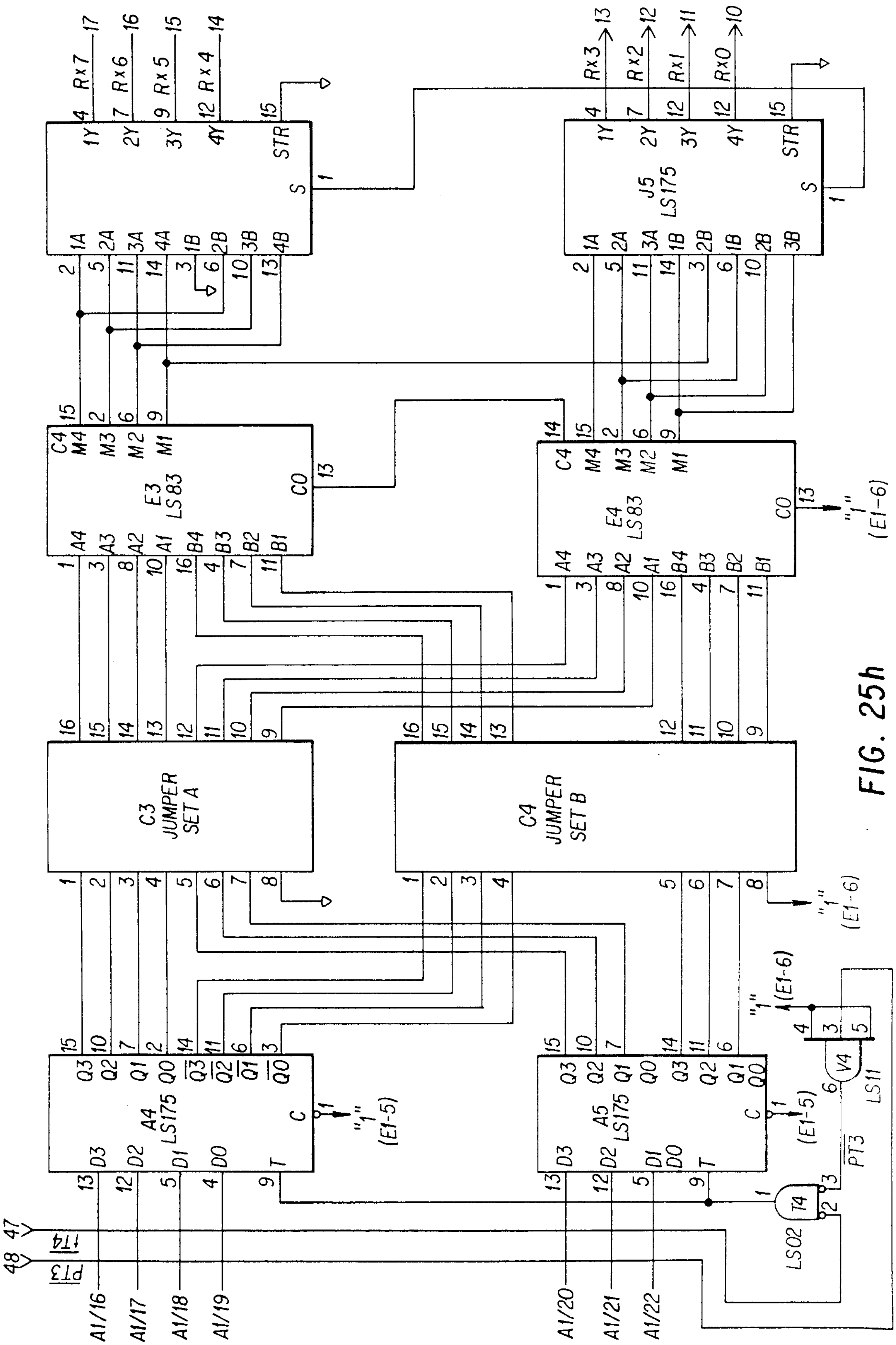

Reference is now made to FIG. 22 which is a detailed block diagram-simplified schematic illustration of the expected echo suppression circuitry 55. An 8-bit parallel signal (R 0–R 7) from the buffer memory 52 is supplied to expander 412 which is identical to expander 400 and represents the level of the received signal. The output of expander 412 is supplied to the A input of a comparator 510 comprises of a pair of LS 85 chips, and to a memory 512 such as a 82S09 chip via a 2:1 multiplexer 514, such as a pair of LS 157 chips. Alternatively supplied to memory 512 via multiplexer 514 is a signal representing an average noise level less than the minimum threshold level for signal detection, which signal may be zero, and which signal is applied to the memory by the multiplexer during the reset of the peak detector.

The output of memory 512 is supplied via an inverter 516 to the B input of comparator 510. Comparator 510 provides an output when the received signal level at its A input exceeds the level stored in memory 512 which represents the peak value of the currently received signal sensed so far.

The output of comparator 510 is supplied to an input of an OR gate 518 and is one of the factors determining whether a WRITE signal will be generated at memory 512, for introducing a new peak value into the memory.

A memory 520, such as a 82S09 chip serves as 48 individual individual counters, one for each of the 48 telephone communication channels, and in association with an adder 522 used in a subtracting mode, counts both the 4 ms suppression period at the onset of signal detection and the 50 ms hangover time following the termination of signal detection. A comparator 524 receives at its A input the output from expander 412 and receives at its B input a TH min signal which determines the minimum signal threshold for detection.

Comparator 524 provides an output whenever the signal level exceeds the minimum threshold. The comparator output is supplied to a control logic network 526 which is associated with the select input to a 4:1 multiplexer 528 which selects one of four data inputs to memory 520. Prior to receipt of a signal exceeding TH min the multiplexer 528 provides zeros on the eight least significant data inputs to memory 520, which comprise the counter portion of the memory. The most significant bit (MSB) which serves as a status bit is set to one.

The first time that the output of comparator 524 indicates receipt of a signal greater than TH min, following reset of memory 512, the multiplexer 528 supplies to the eight least significant data bits, hereinafter termed memory counter bits, a data input specified as by toggle switches, (not shown), which will result in a memory countdown of 4 ms. The state of the MSB is determined by a 2:1 multiplexer 530 whose output is routed via multiplexer 528. During the 4 ms memory countdown the MSB is zero.

The $\overline{\text{WE}}$ write input to memory 520 receives signals via a NAND gate 532 from the output of a flip-flop 534. NAND gate 532 also receives a timing signal which sequences at the sample rate for the telephone communication lines, this signal being provided by the receiver timing circuitry. Flip-flop 534 changes state at the end of each complete cycle of sampling 48 communication lines and as a result a write cycle is produced for each telephone communication line, every second sampling cycle.

As soon as the 4 ms data input is entered into the memory by the WRITE signals to the $\overline{\text{WE}}$ input, the memory 520 and associated circuitry begins operation in a countdown mode. Hereinafter and until the memory reaches zero, the multiplexer 528 supplies memory counter bits which represent the current contents of the memory minus one. The multiplexer 528 receives inputs from adder 522, operating in a subtraction mode via an inverter 536. The adder 522 receives as its inputs the eight least significant output bits from memory 520. The MSB remains zero. During the entire 4 ms period operation of the peak detector memory 512 is disabled.

When the output of memory 520 reaches zero, as detected by a conventional zero detector 538, typically comprising four logic gates, multiplexer 528 again passes on to the memory counter bits the values for a 4 ms countdown. In this case, however, the MSB is set to one rather than to zero, as specified by multiplexer 530. Hereinafter, every time that the output of comparator 524 indicates a received signal greater than TH min, multiplexer 528 supplies memory counter bits corresponding to a 50 ms countdown, as set by toggle switches, (not shown) for example. The MSB remains at one. Alternatively, each time that the comparator 524 indicates receipt of a signal not exceeding the minimum threshold, multiplexer 528 supplies to the memory counter bits the output of adder 522, thereby causing the memory 520 to count down by one.

It is appreciated that in the manner described hereinabove, the absence of a signal exceeding TH min during a period of 50 consecutive milliseconds causes the counter memory to count down to zero. At this point, the peak detector memory 512 is set to the noise level, the MSB is set to one and the memory has returned to its initial state and is ready to receive a new signal and to begin the 4 ms suppression. Until memory 520 reaches zero, WRITE signals to memory 512 are enabled and the peak detector is operational. The 50 ms countdown provides the desired hangover for peak detector operation.

It is to be noted that in the event that no signal exceeding TH min is received following the 4 ms suppression then the hangover time will be 4 ms instead of 50 ms.

Control logic network 526 comprises an AND gate 540 which receives the output of comparator 524 and the MSB of the counter memory 520 output and which provides an output to a NOR gate 542. NOR gate 542 also receives an input from a second AND gate 544. AND gate 544 receives an input from the output of zero detector 538 and also receives the MSB from memory 520 via an inverter 546. The output of NOR gate 542 is supplied to the SELECT 2 input of multiplexer 528 via an OR gate 528. The SELECT 1 input of multiplexer 528 is provided by the output of an OR gate 550, which receives an input from the output of zero detector 538. Both OR gates 548 and 550 receive a system SYNC signal, to initialize memory 512 to the noise level.

The output of peak detector memory 512 is also supplied via inverter 516 to the inputs of a latch 552, typically an LS 175 chip. Latch 552 receives a clock input from the output of a NOR gate 554. The clock of the latch 552 is controlled by the transmitter timing circuitry which determines the inputs to NOR gate 554.

This is required because the outputs of latch 552 are utilized by the SPD circuitry which operates on transmitter timing, in contrast to the echo circuitry which operates predominantly on receiver timing. For the same reason, when information is entered into latch 552 the address determined by the transmitter timing circuitry must be presented to the address lines of memory 512. At all other times the address determined by the receiver timing is presented to the address lines of memory 512. A 2:1 multiplexer 556 comprising a pair of LS 157 chips selects between the two addresses in response to a select signal provided by the output of a NOR gate 558.

In order to give priority to the transmitter timing over the receiver timing in addressing and also to delay the provision of a WRITE signal to memory 512 in the event of simultaneous requests for WRITE and READ thereto, a circuit is provided comprising a pair of flip flops 560 and 562 and an AND gate 564. The clock input to flip-flop 560 representing a write request is supplied from the output of an AND gate 566 which receives as its inputs the output of OR gate 518, the MSB of memory 520 and a receiver timing signal which occurs once per telephone communication line sample. The Q output of flip-flop 560 is supplied to an input of AND gate 564, which also receives an input from P 4, a transmitter timing signal. The output of AND gate 564 is supplied to the D input of flip-flop 562 which receives a clock input of 65 ns periodicity. The $\overline{Q}$ output of flip-flop 562 provides a WRITE signal to the $\overline{WE}$ input of memory 512. The $\overline{Q}$ output is also supplied to the CLEAR input of flip-flop 560.

The Q output of flip-flop 562 is supplied to one input of NOR gate 558 which also receives the P 4 transmitter timing signal. An AND gate 568 receives as its inputs the MSB of memory 520 and the output of zero detector 538. The output of AND gate 568 controls the SELECT input of multiplexer 514, and also provides the second input to OR gate 518.

The outputs of latch 552 are provided to a hybrid loss compensator 420 comprising an adder 570 formed of 2 LS 83 chips. The inputs to adder 570 are received via a pair of selectable plug in jumper sets 572 and 574 which provide desired amounts of attenuation. This selectable attenuation factor is provided to compensate for inconsistencies in loss characteristics found in the hybrid circuits found in telephone interface circuitry.

The outputs of adder 570 are supplied to hysteresis insertion loss circuitry 422 comprising a 2:1 multiplexer 576, comprising a pair of LS 157 chips, both directly and via a divide by two connection 578. The outputs of multiplexer 576 are supplied to B inputs of comparator 452 located in the SPD circuitry illustrated in FIG. 24.

FIG. 23 describes in detailed schematic form SPD computation circuitry which appears in blocks 424, 426, 428 and 430 of FIG. 20. FIG. 24 is a detailed description of the circuitry shown in FIG. 21 and FIG. 25 is a detailed schematic illustration of the circuitry shown in FIG. 22.

Figure 26A:
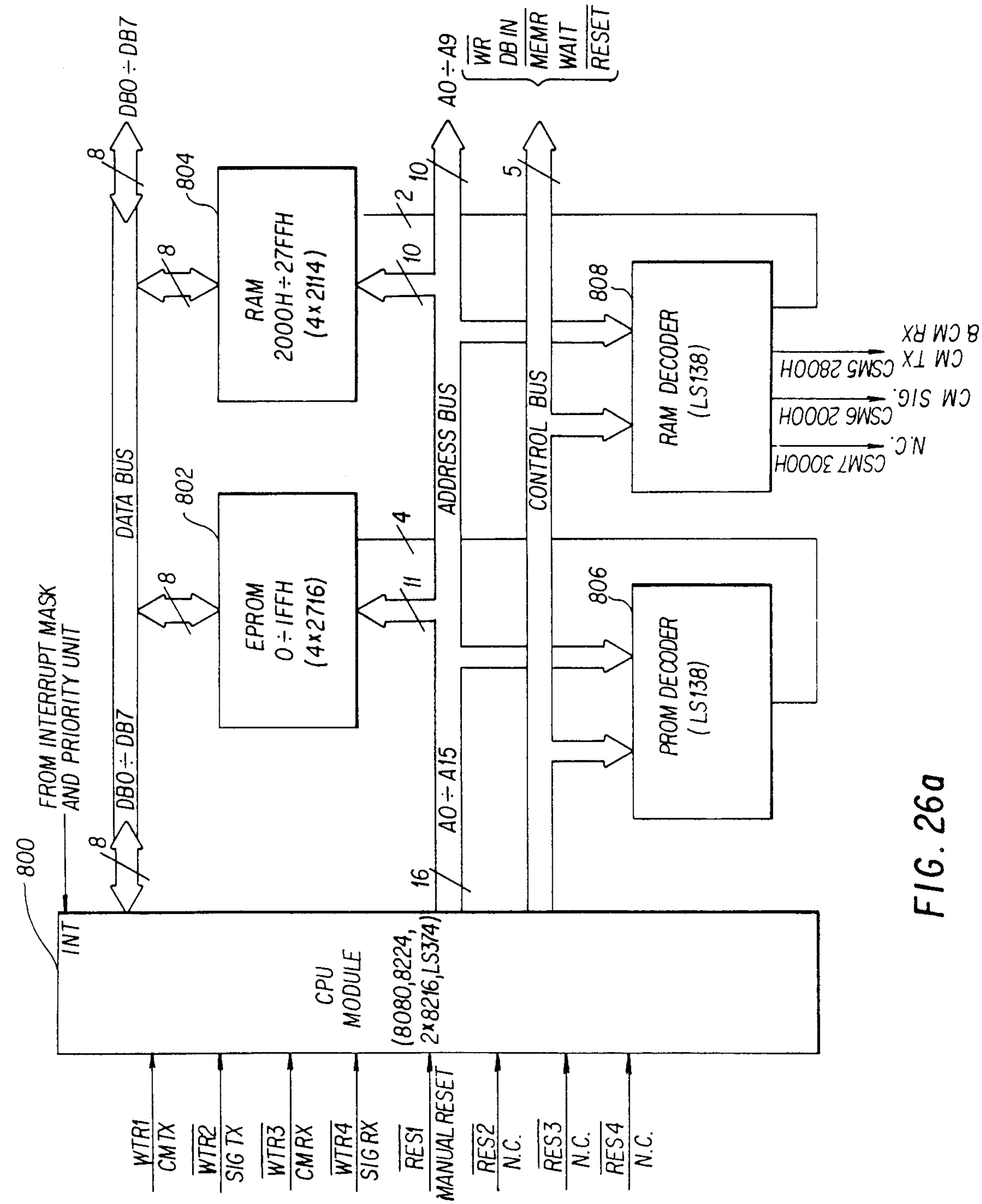
FIG. 26(*a* & *b*) is a functional block diagram of the CPU; divided into two parts a,b.
Figure 26B:
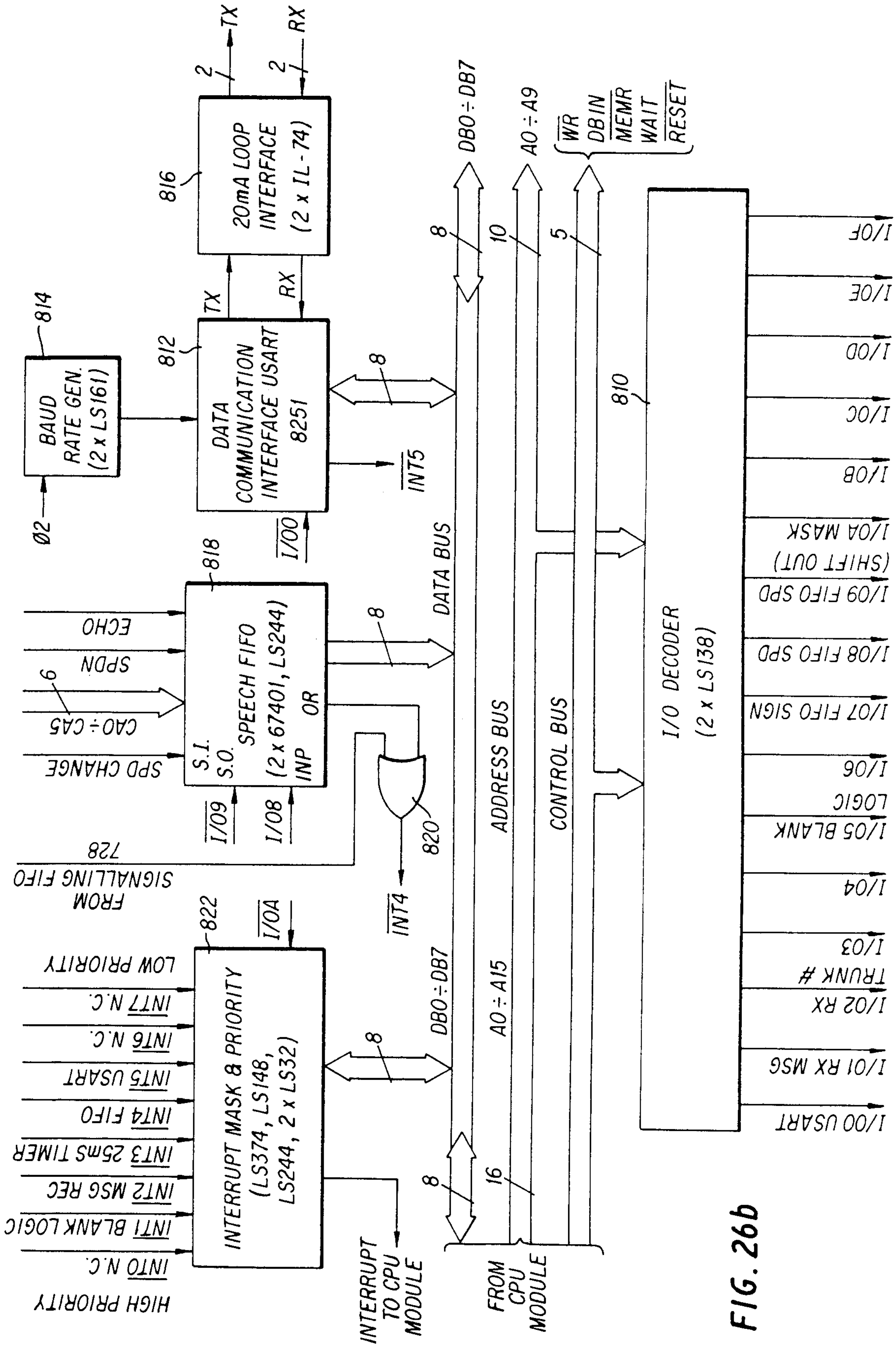
Figure 27A:
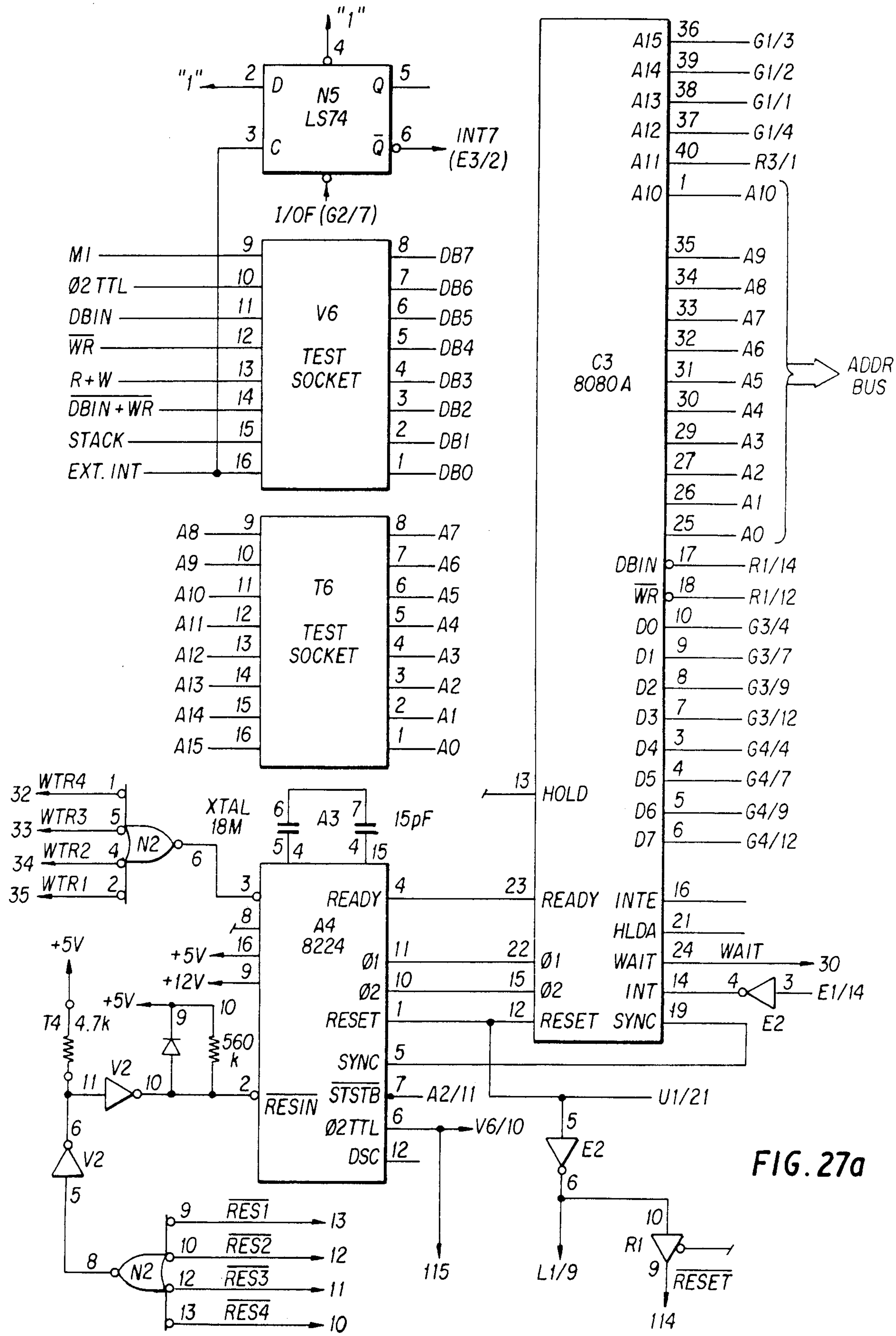
FIG. 27(*a* to *h*) is a schematic illustration of the CPU.
Figure 27B:
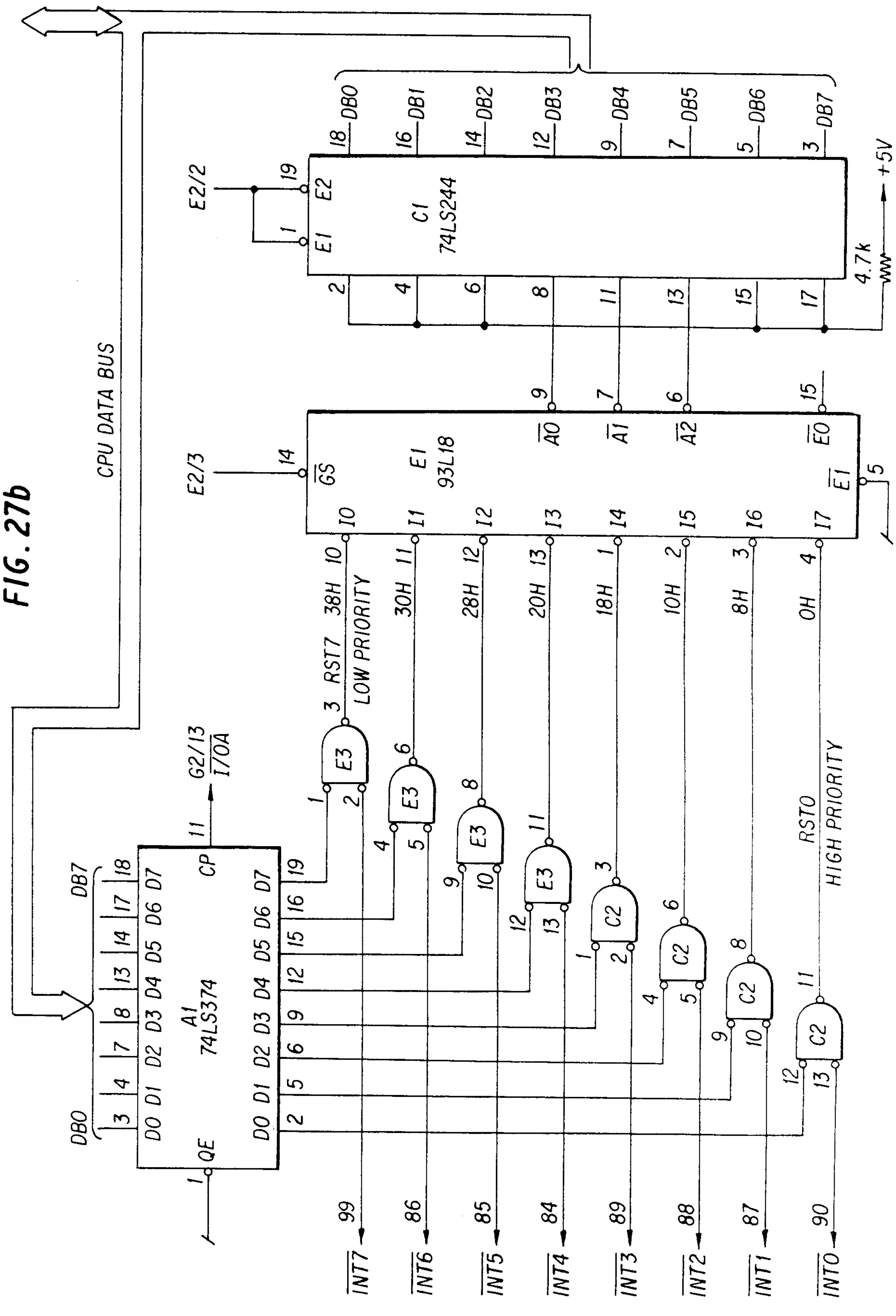
Figure 27C:
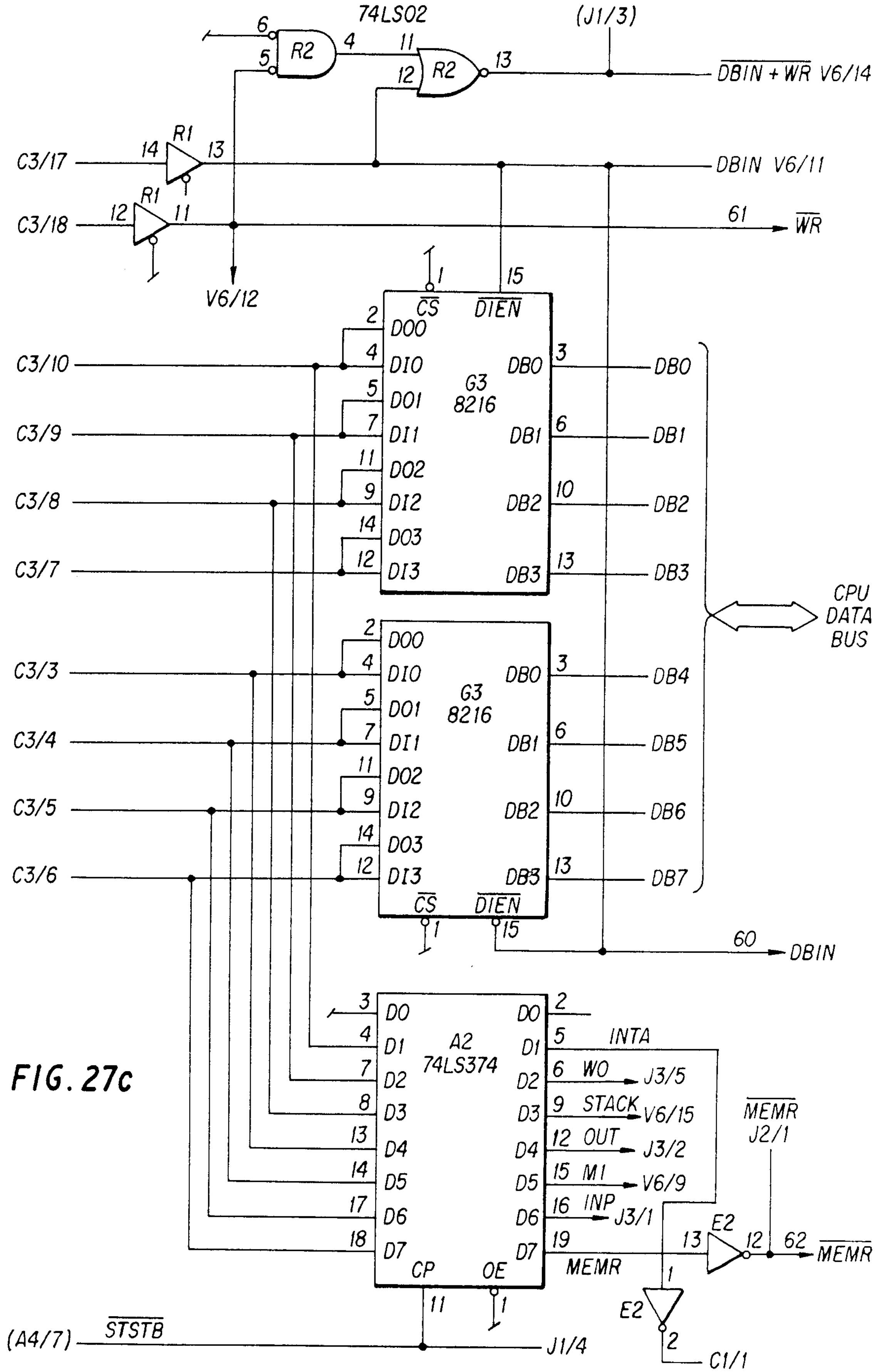
Figure 27D:
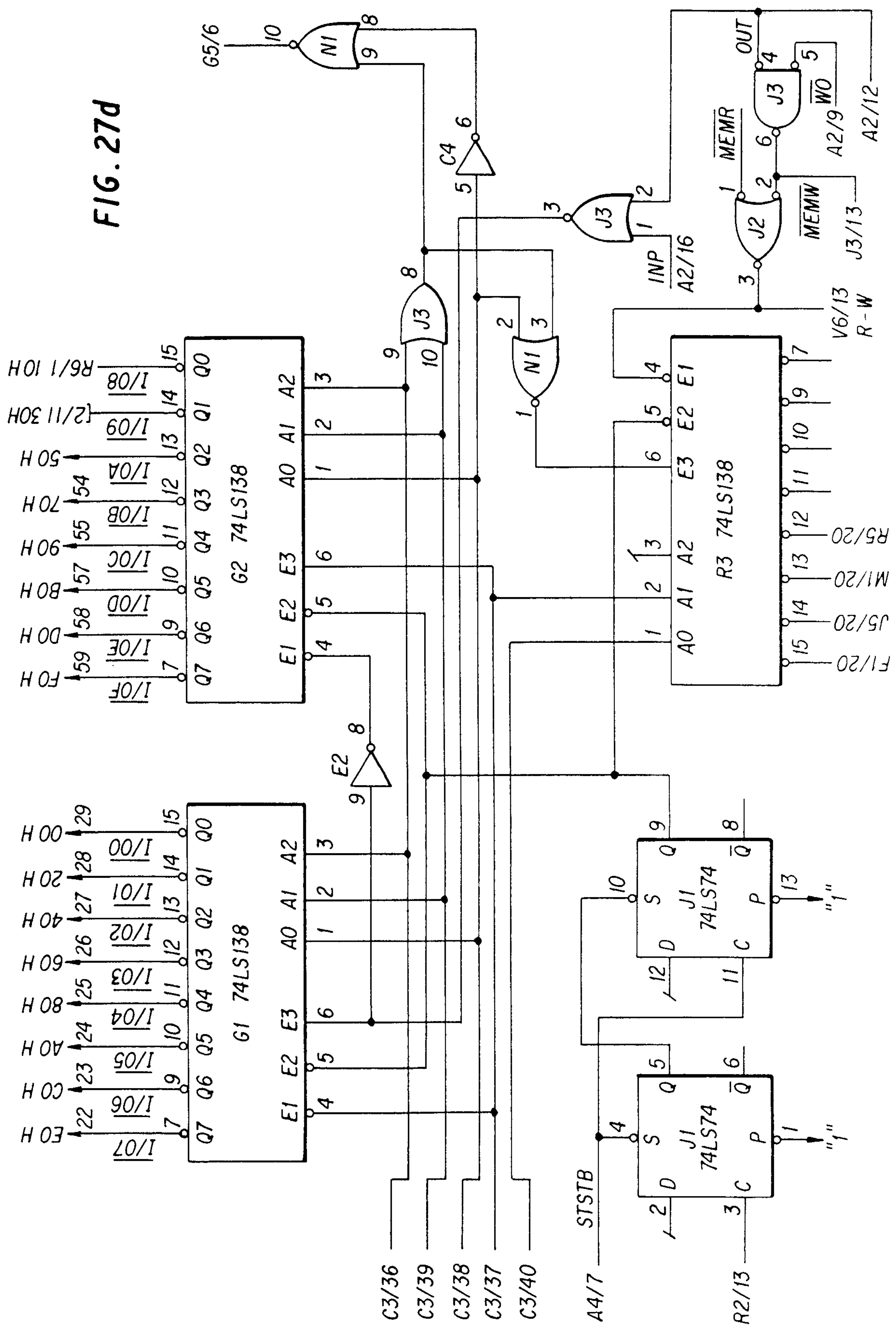
Figure 27E:
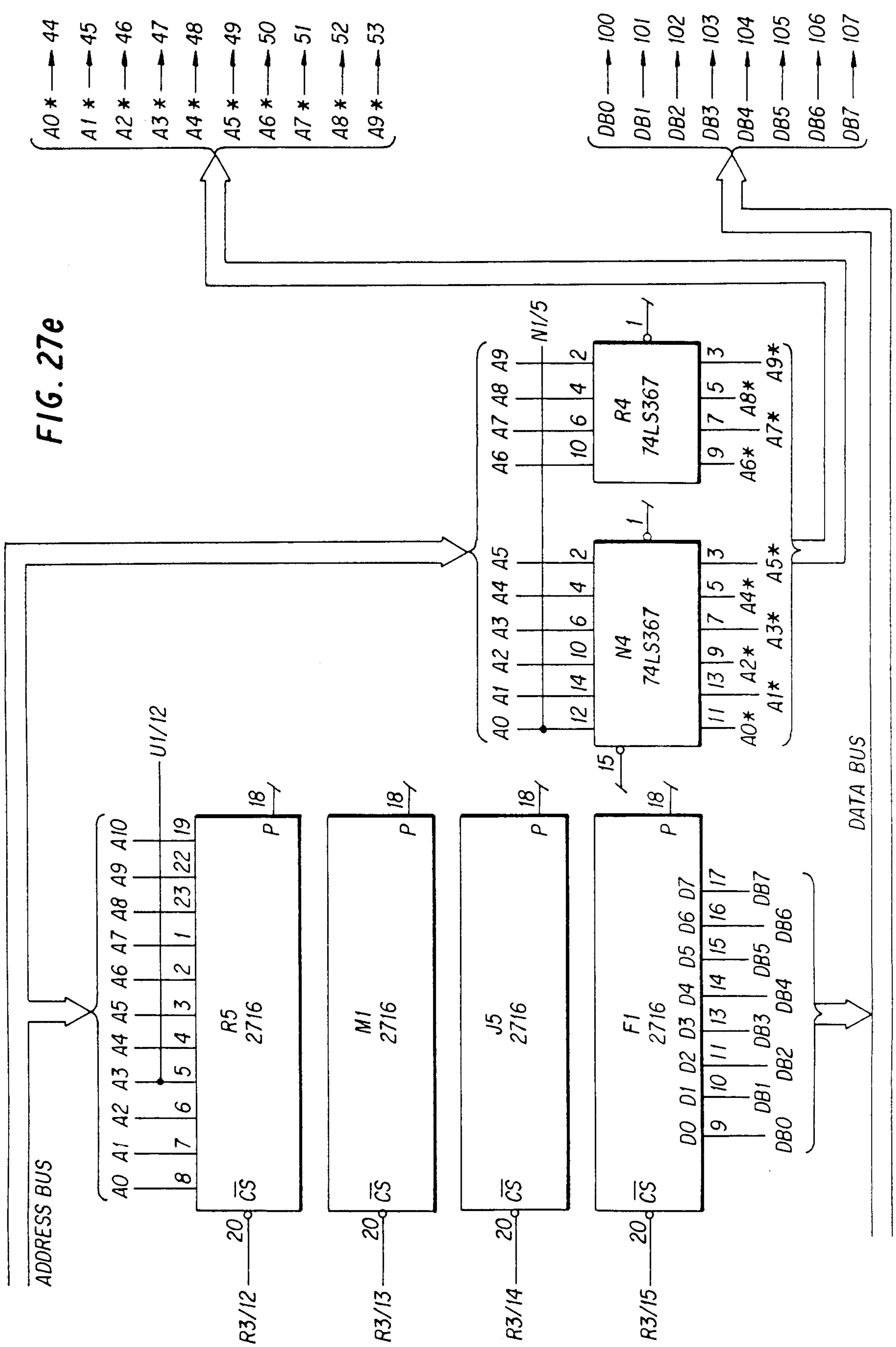
Figure 27F:
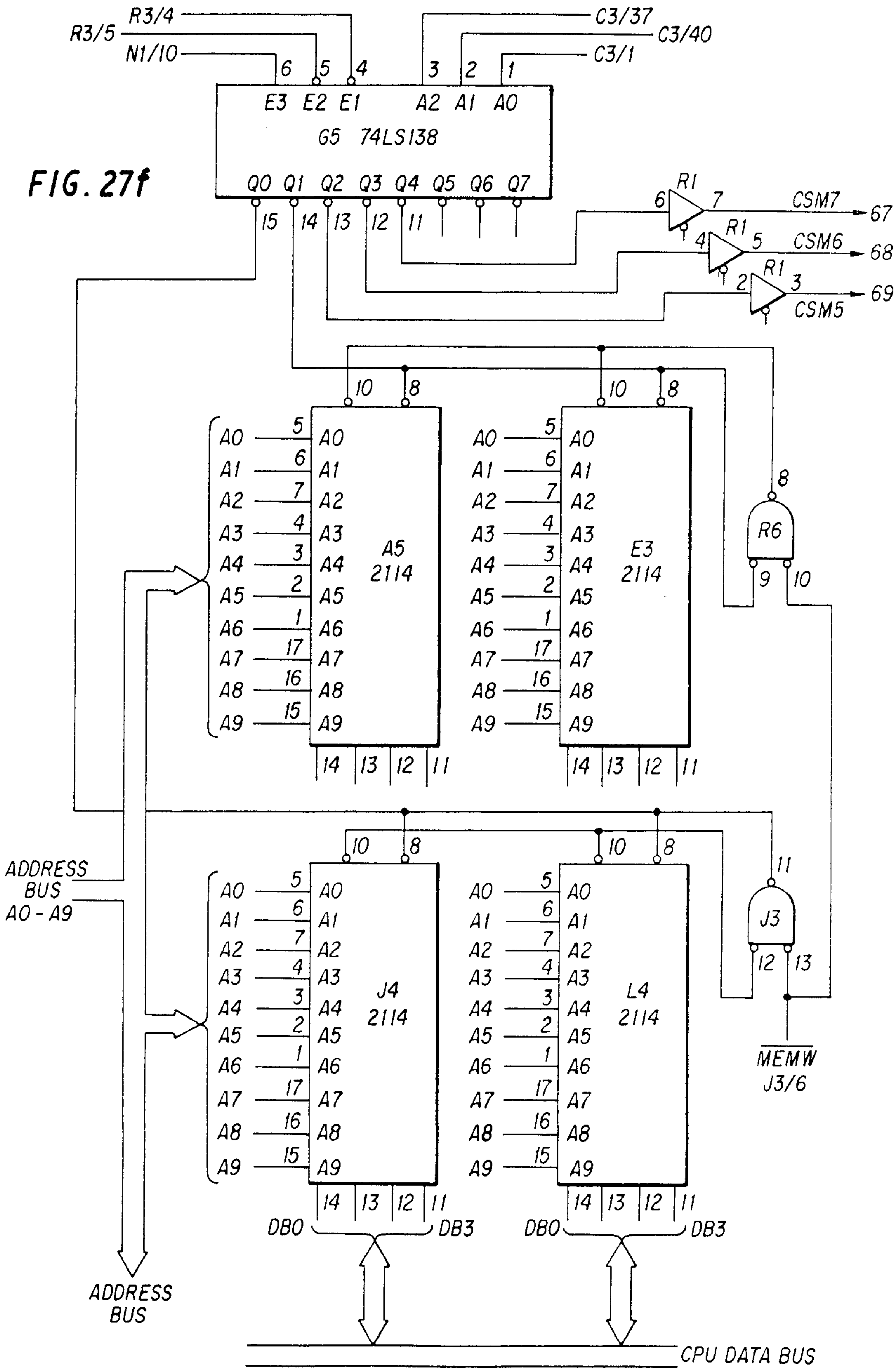
Figure 27G:
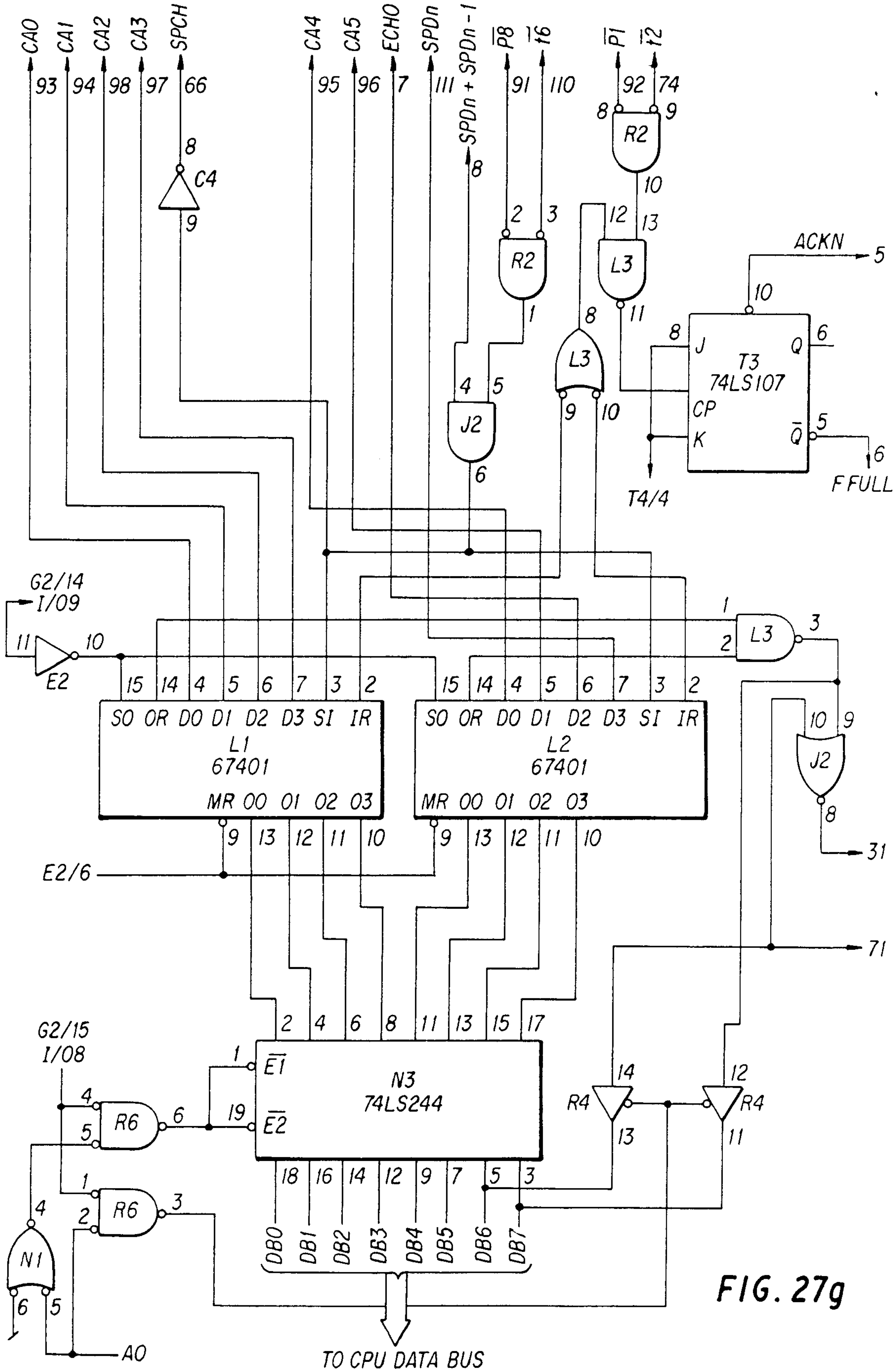
Figure 27H:
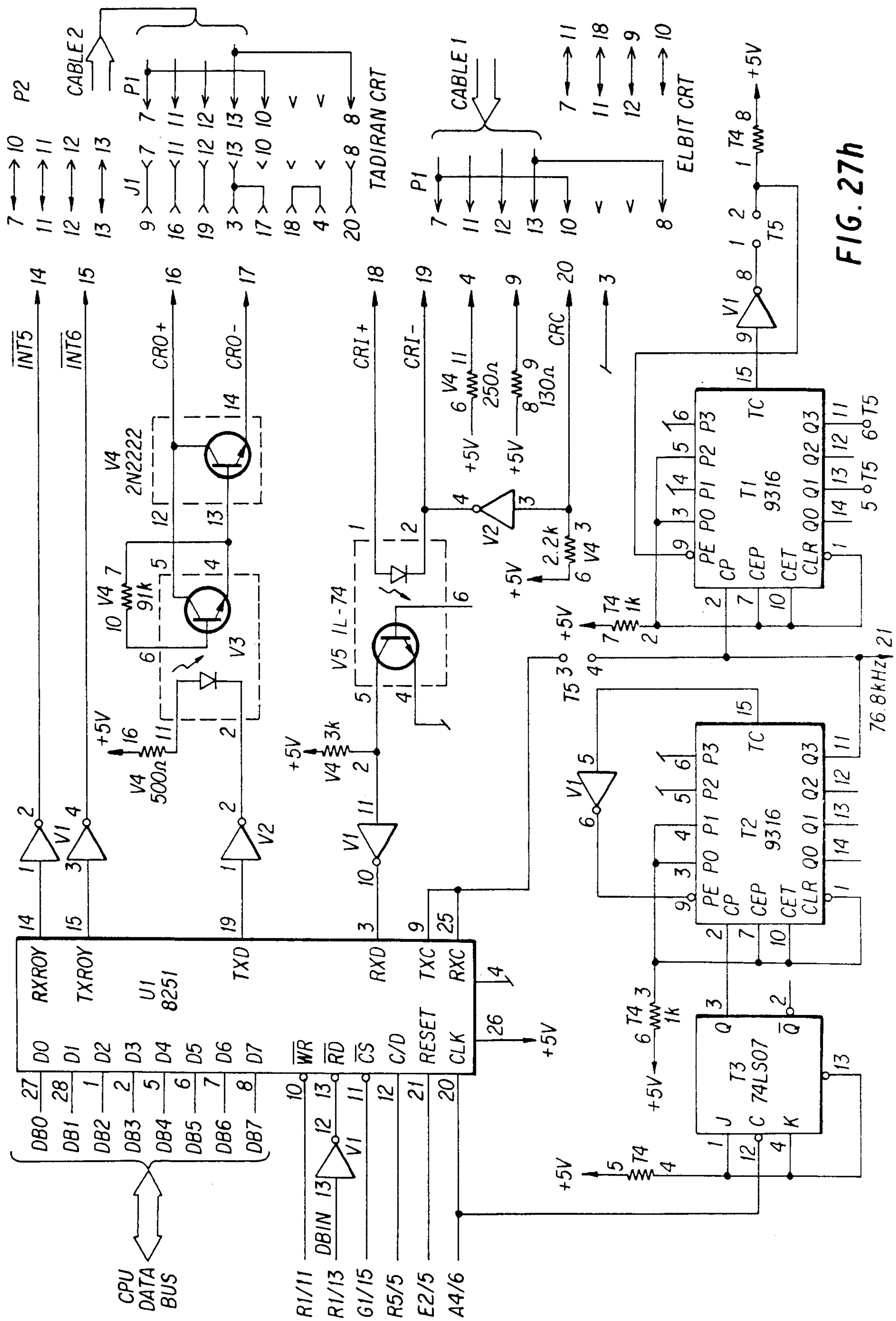
Figure 28:
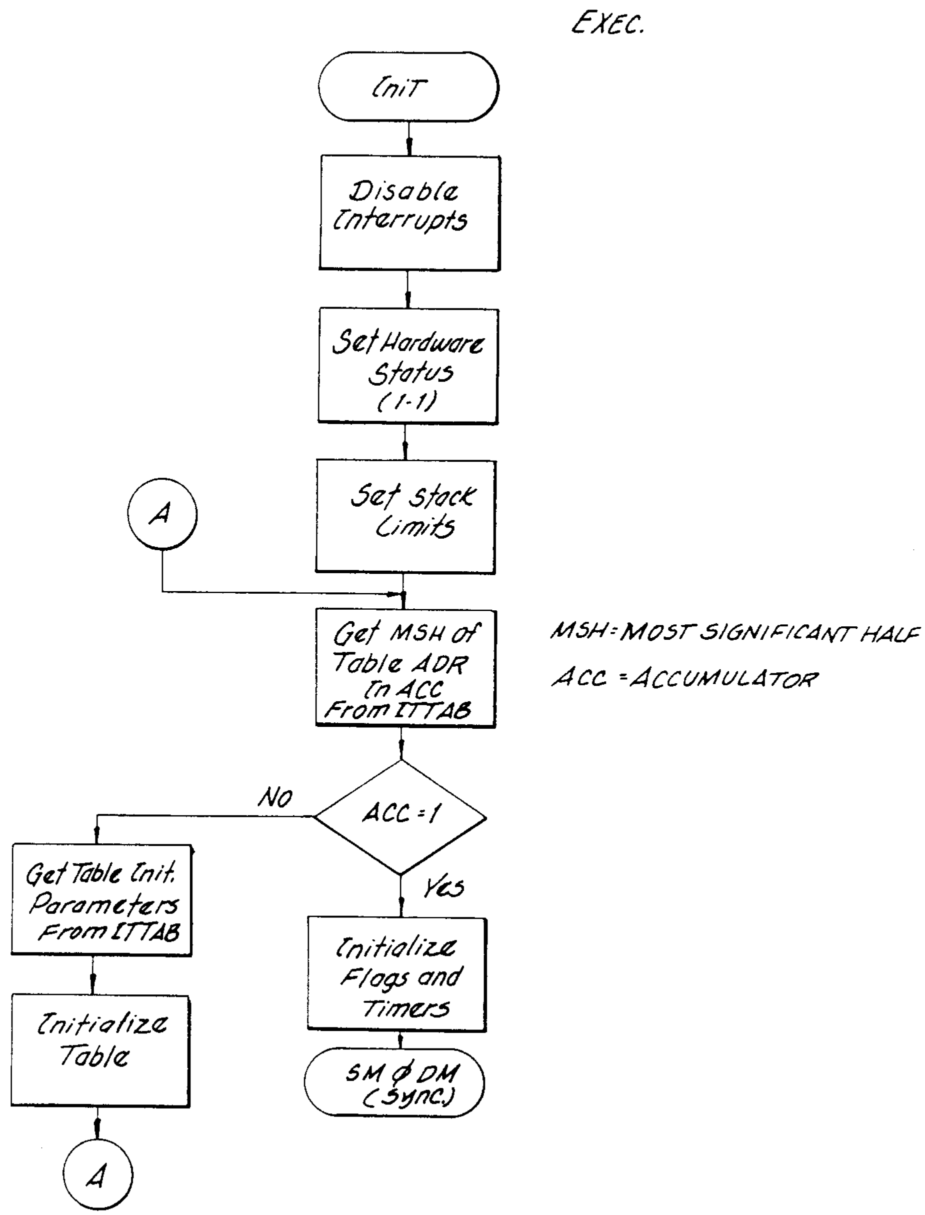
FIG. 28 is a flow chart initialization program INIT.
Figure 29A:
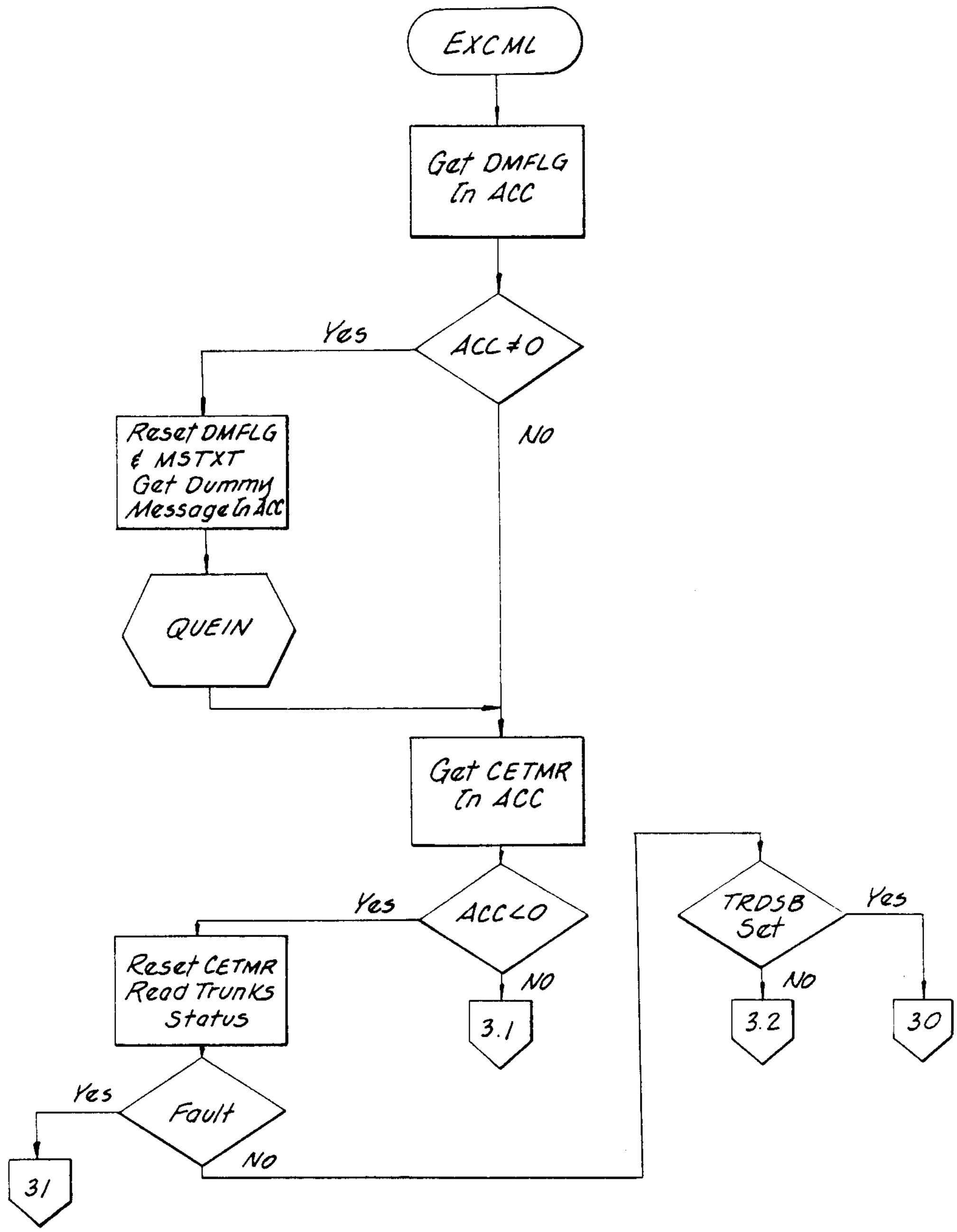
FIG. 29(*a* to *c*) is a flow chart illustrating the executive program EXCML; divided into three parts a–c.
Figure 29B:
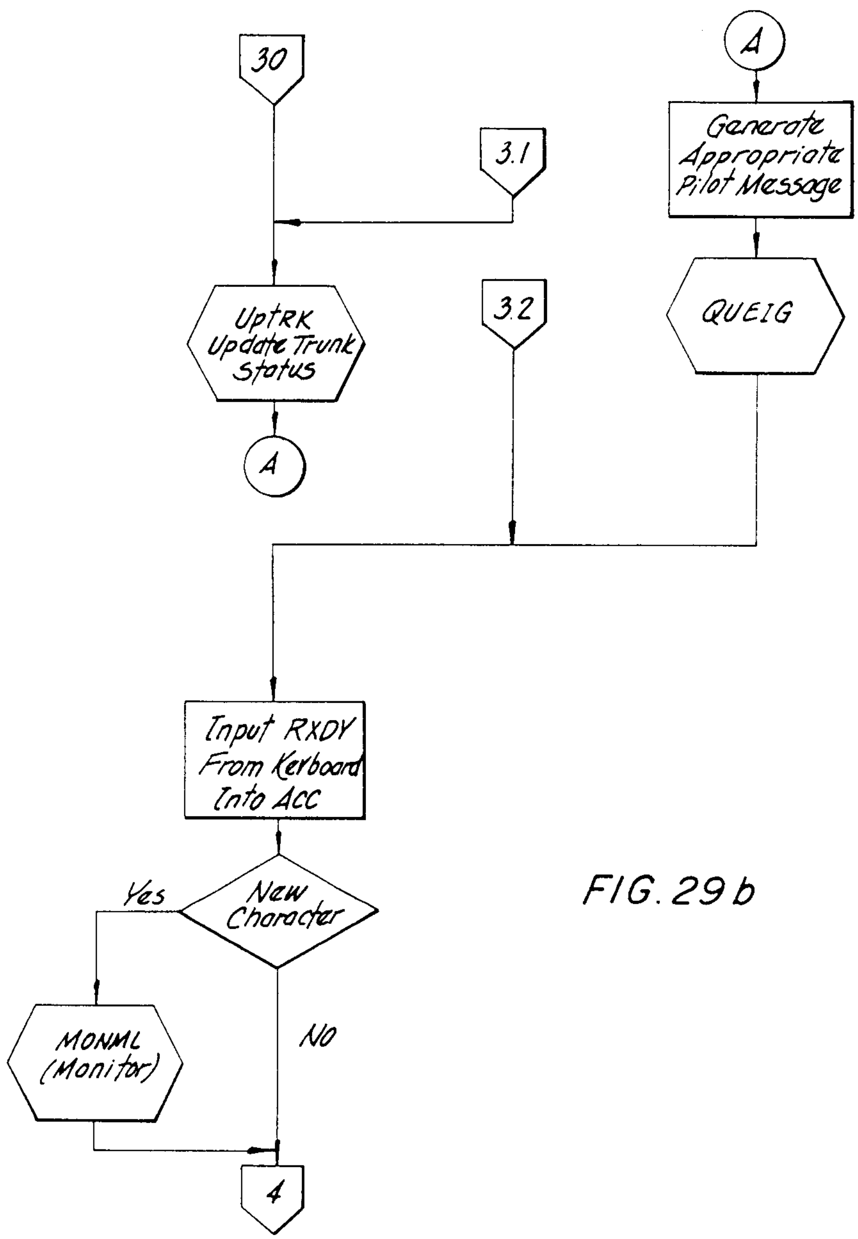
Figure 29C:
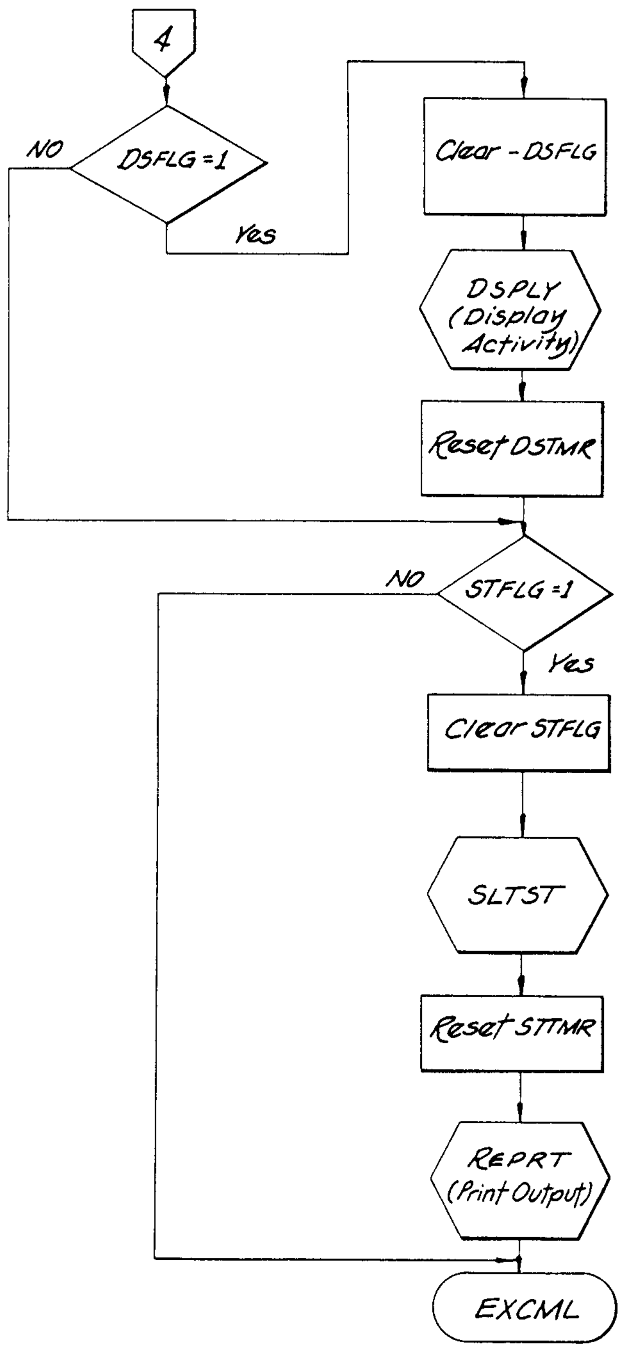
Figure 30A:
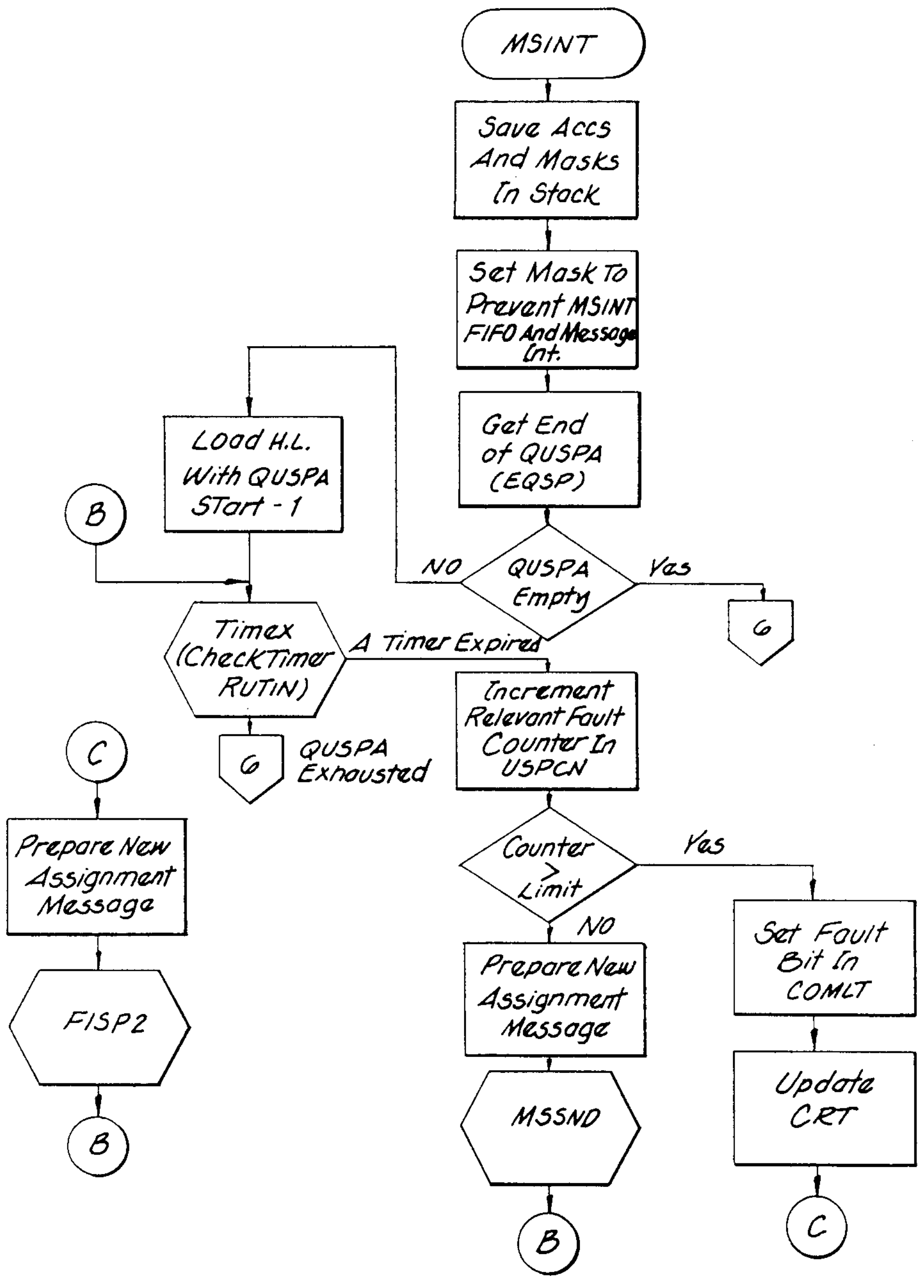
FIG. 30(*a* to *f*) is a flowchart illustrating operation of the time base interrupt function of the CPU; MSINT divided into six parts a–f.
Figure 30B:
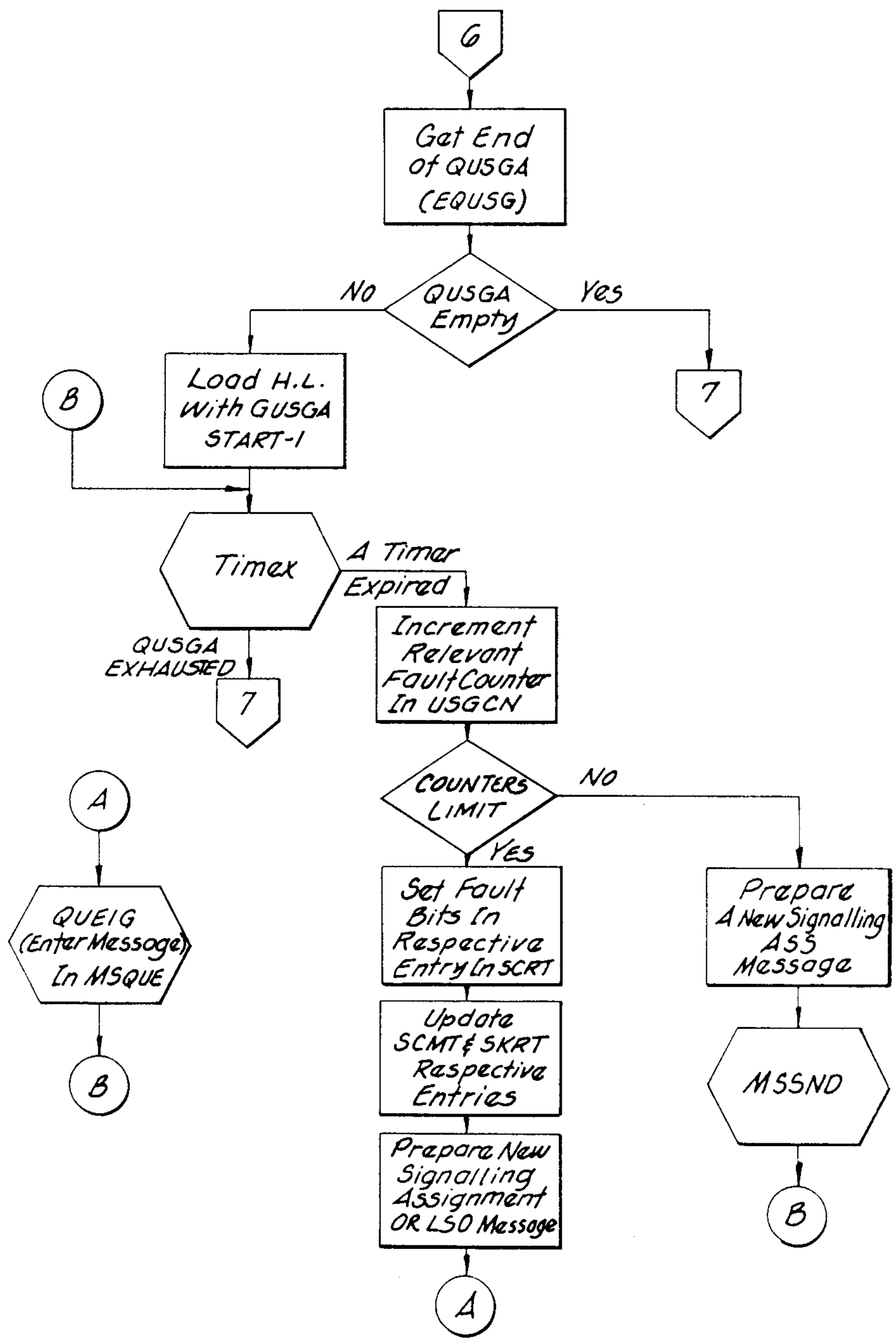
Figure 30C:
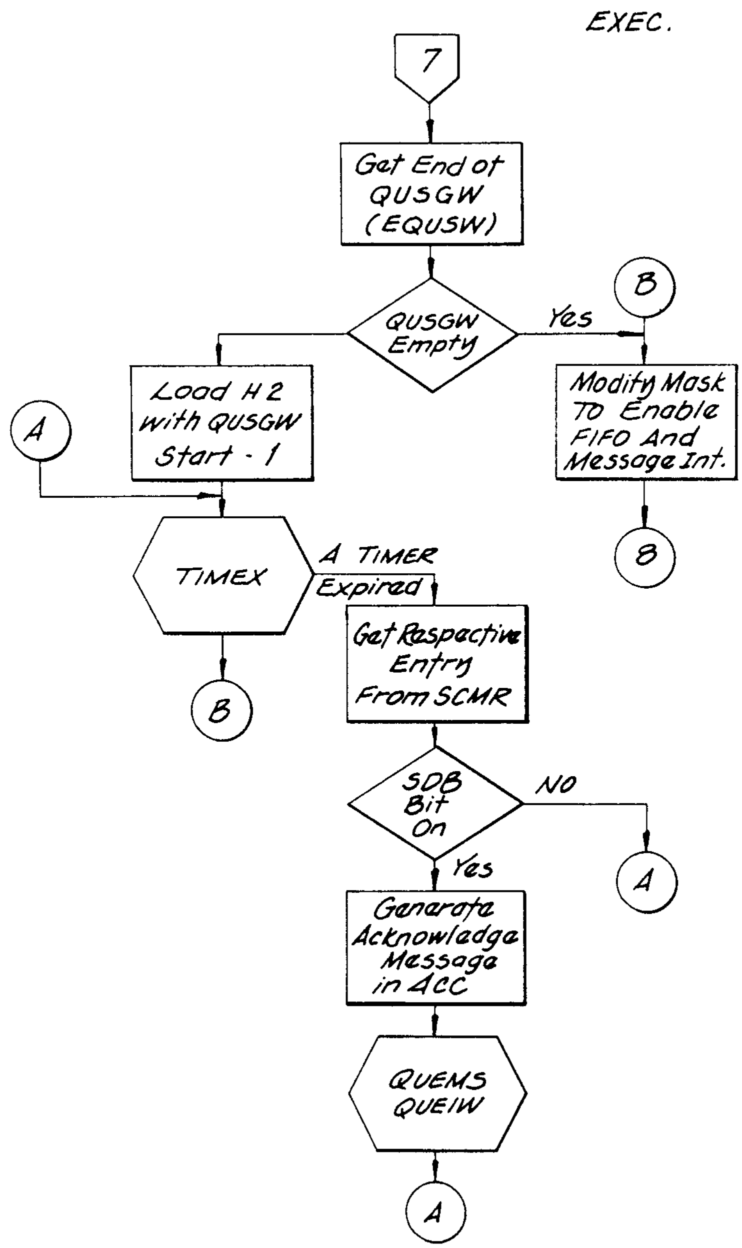
Figure 30D:
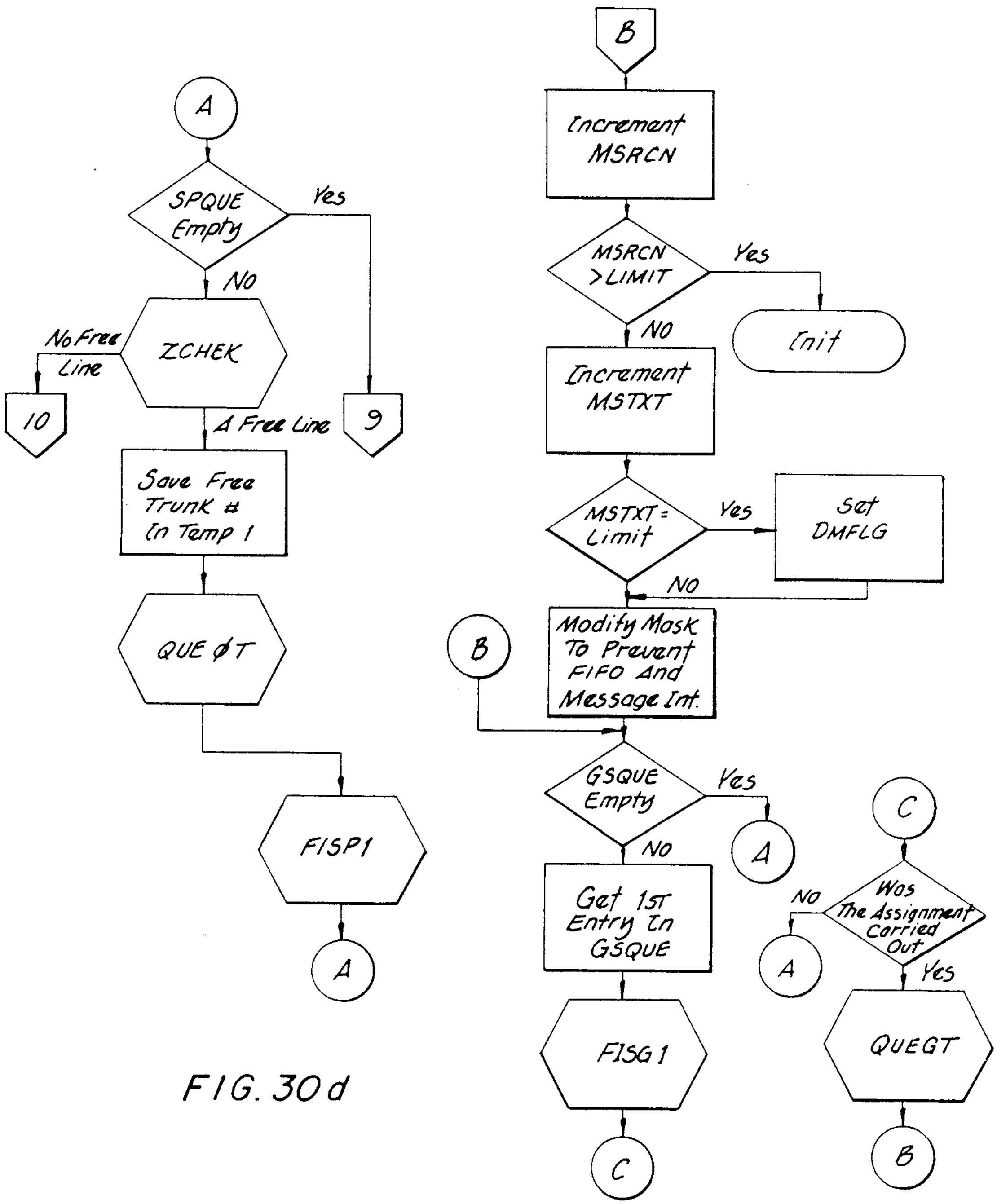
Figure 30E:
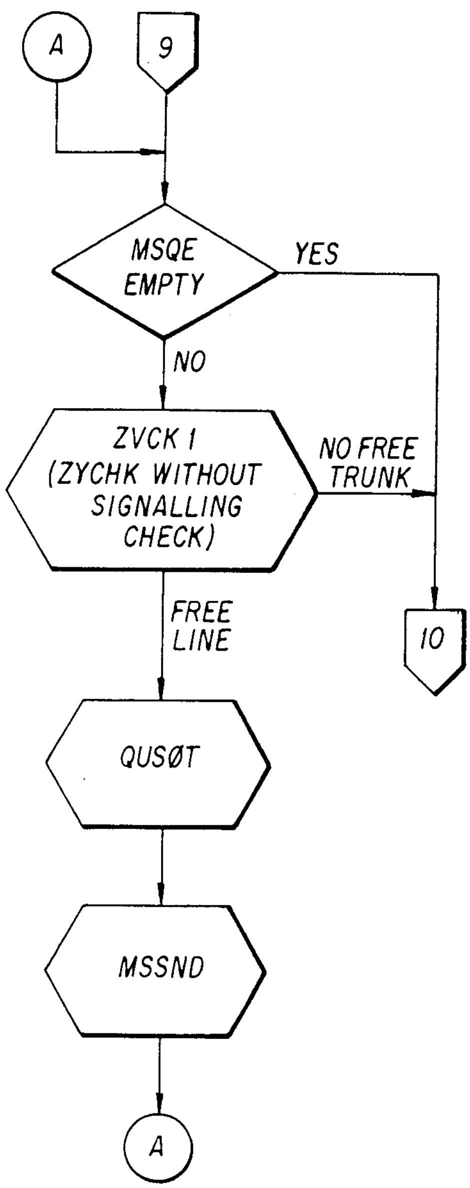
Figure 30F:
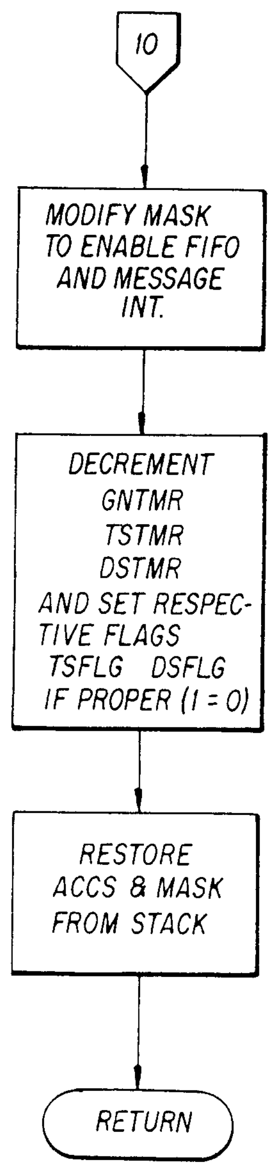
Figure 31:
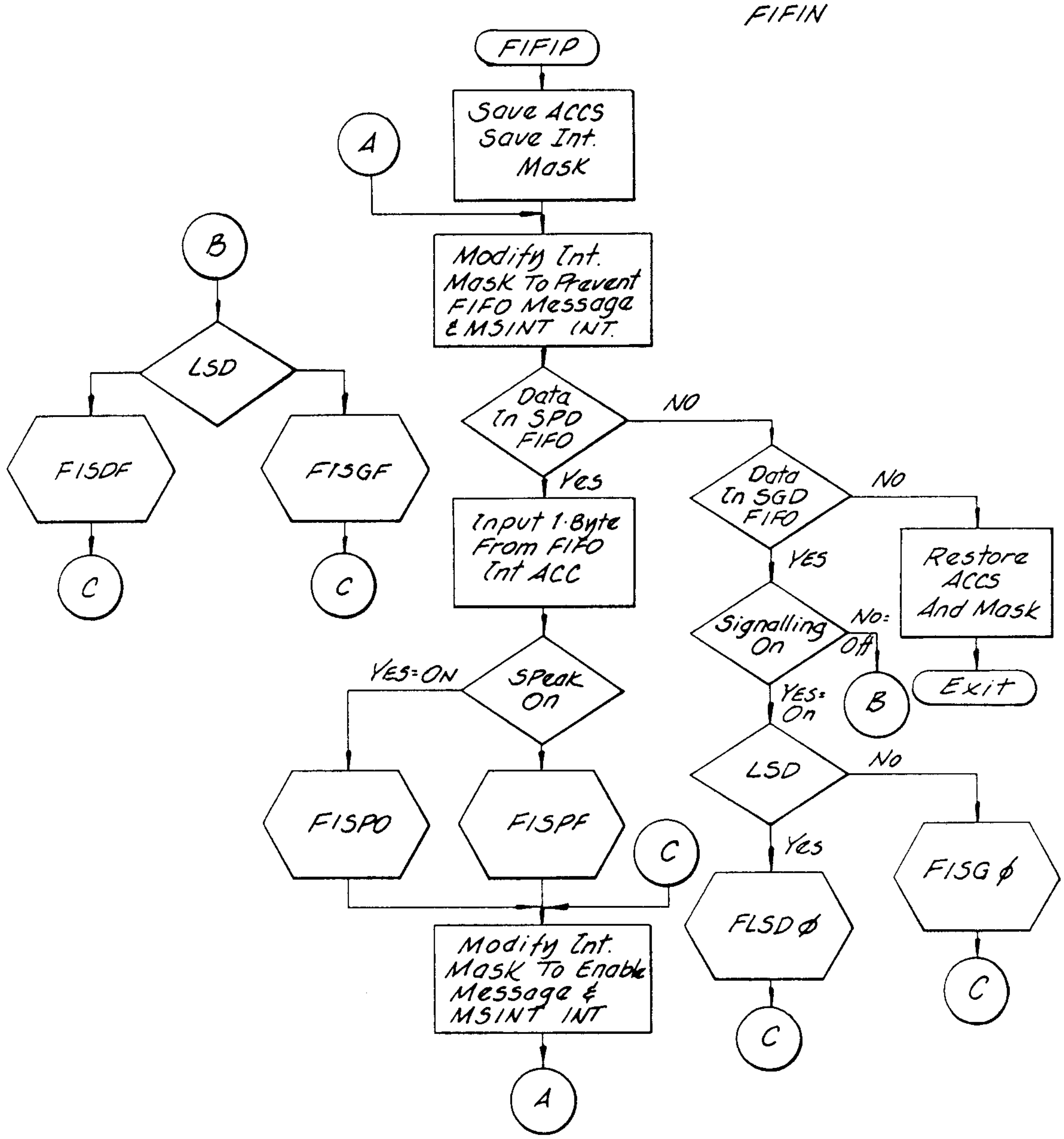
FIG. 31 is a flowchart illustrating the FIFO input program FIFIP.
Figure 32A:
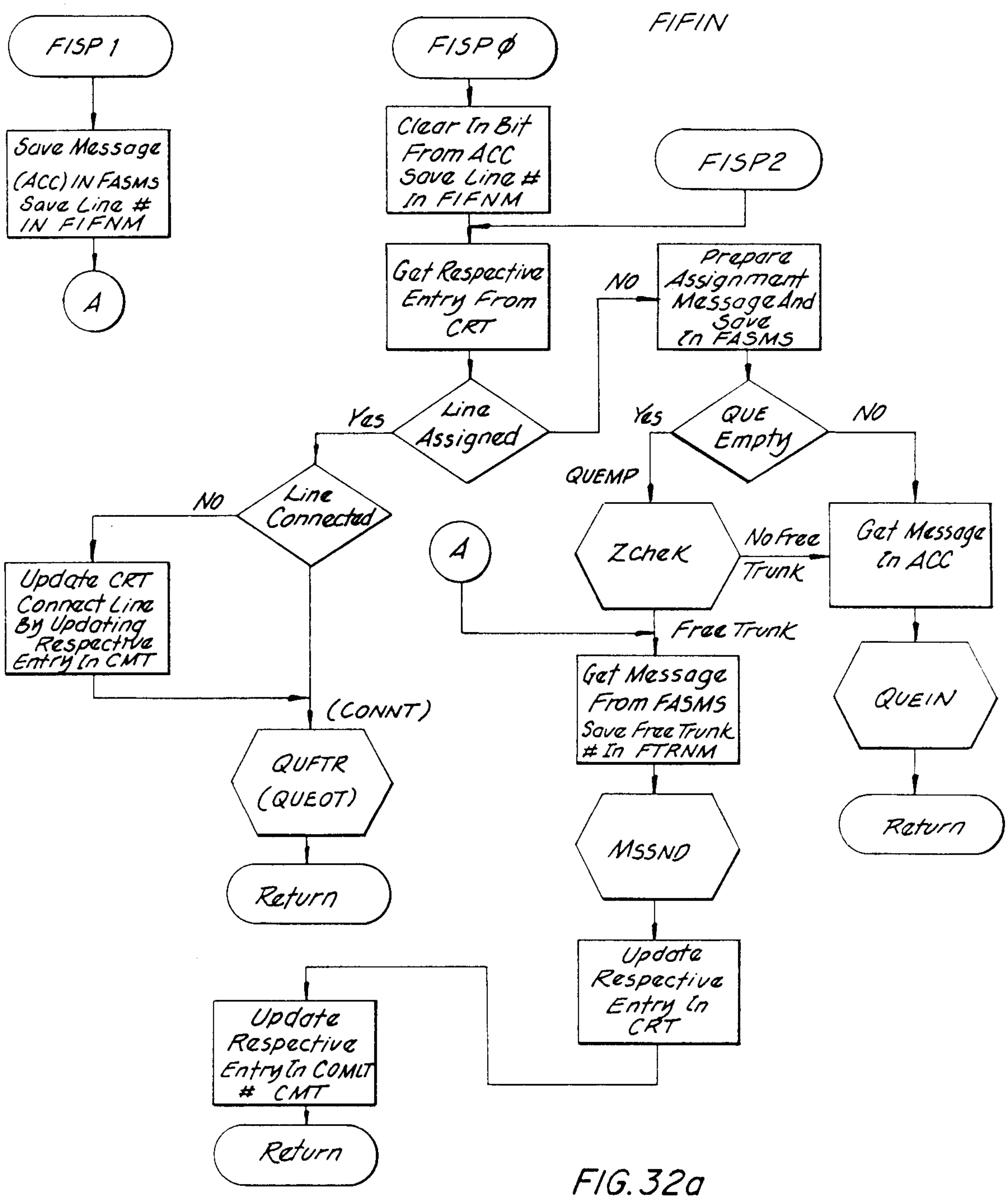
FIG. 32(*a* & *b*) is a flowchart illustrating the speech transmission handing programs: FISP0, FISP1, FISP2, FISPF divided into two parts a,b.
Figure 32B:
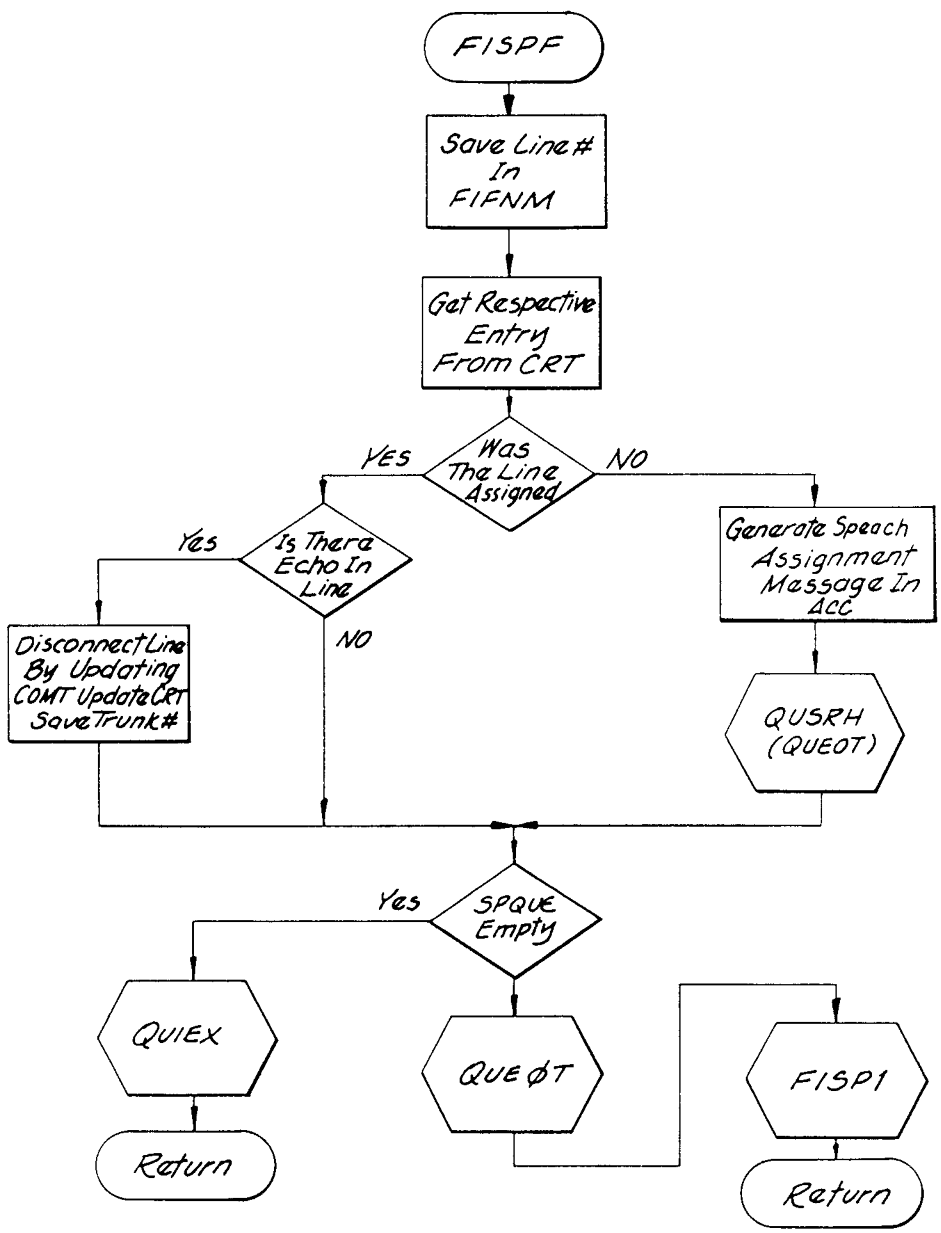
Figure 33A:
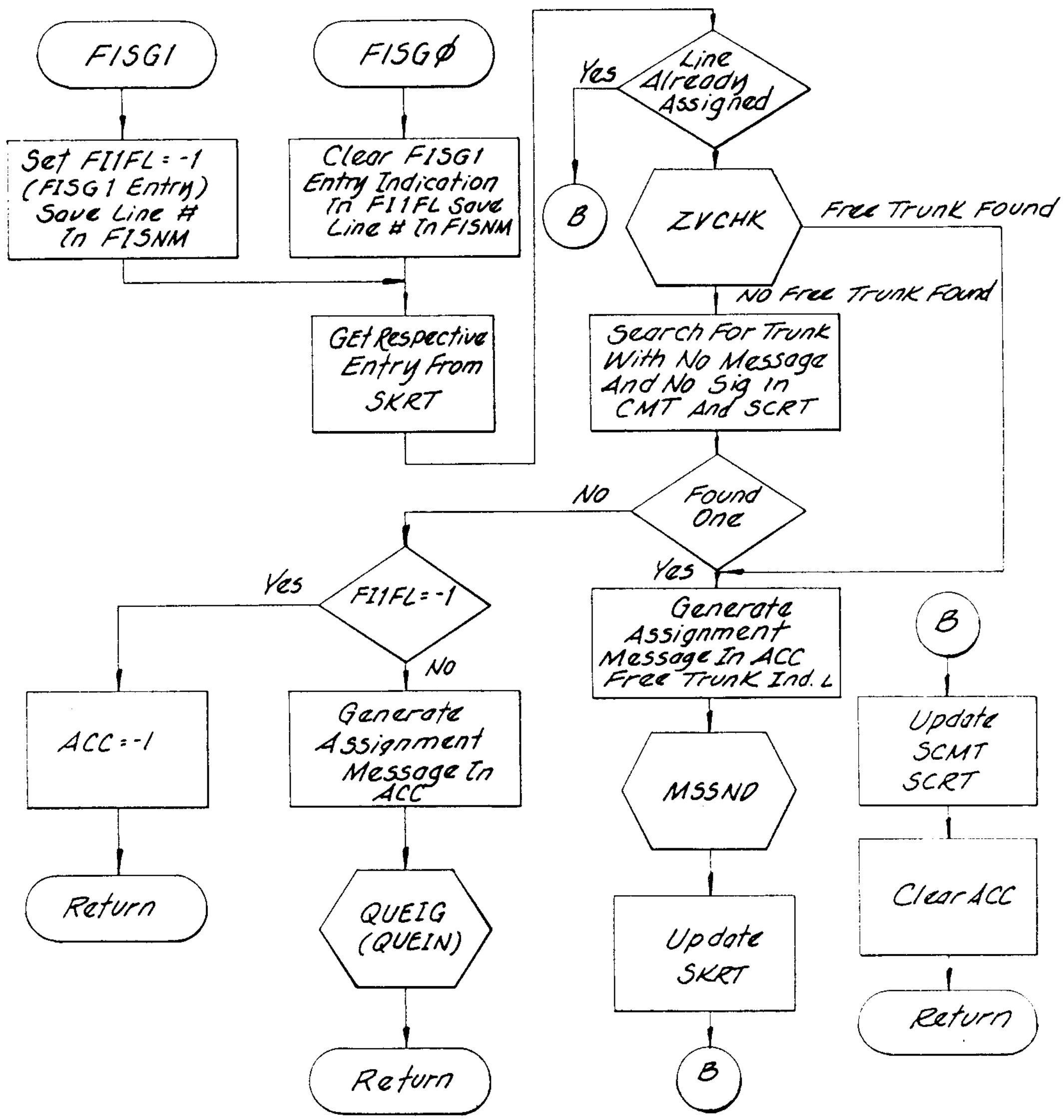
FIG. 33(*a* to *d*) is a flowchart illustrating the signalling transmission handling programs: FISG0, FISG1, FISGF, FLSD0, FLSDF, divided into four parts a–d.
Figure 33B:
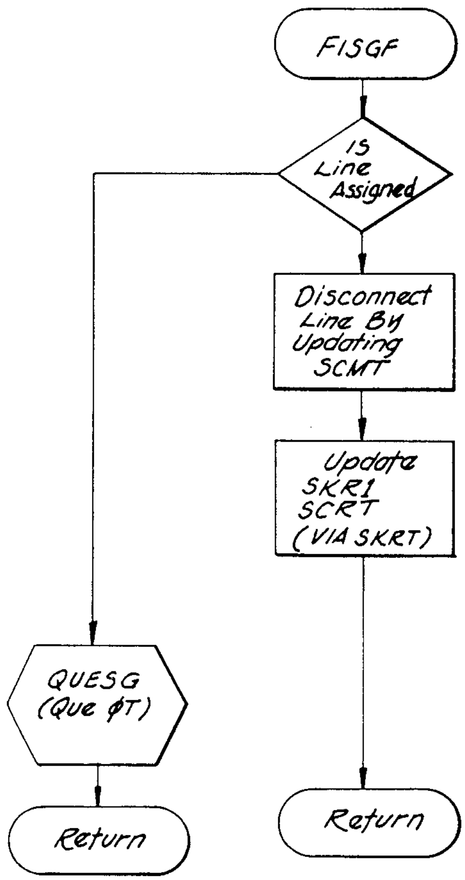
Figure 33C:
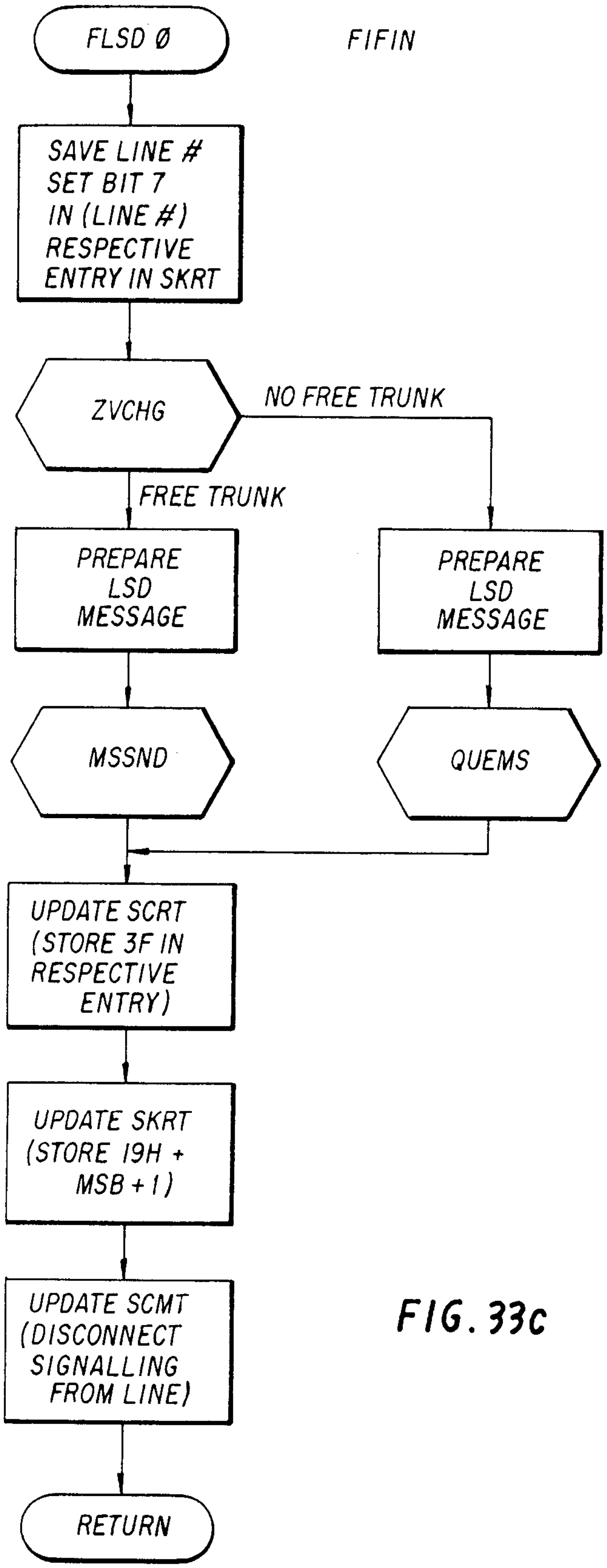
Figure 33D:
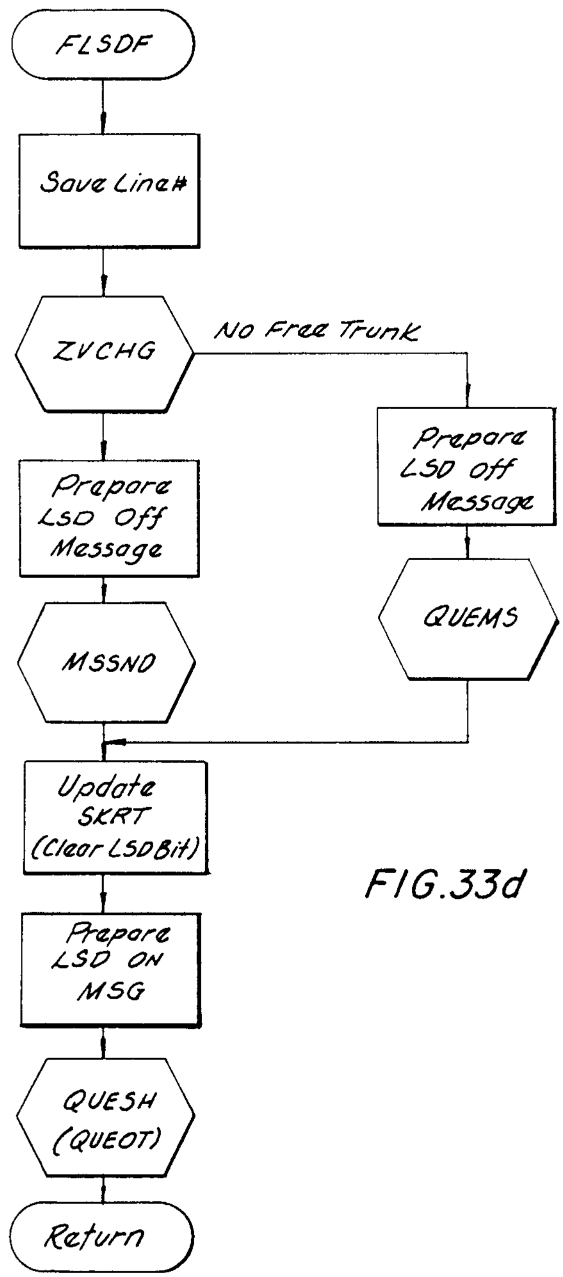
Figure 34A:
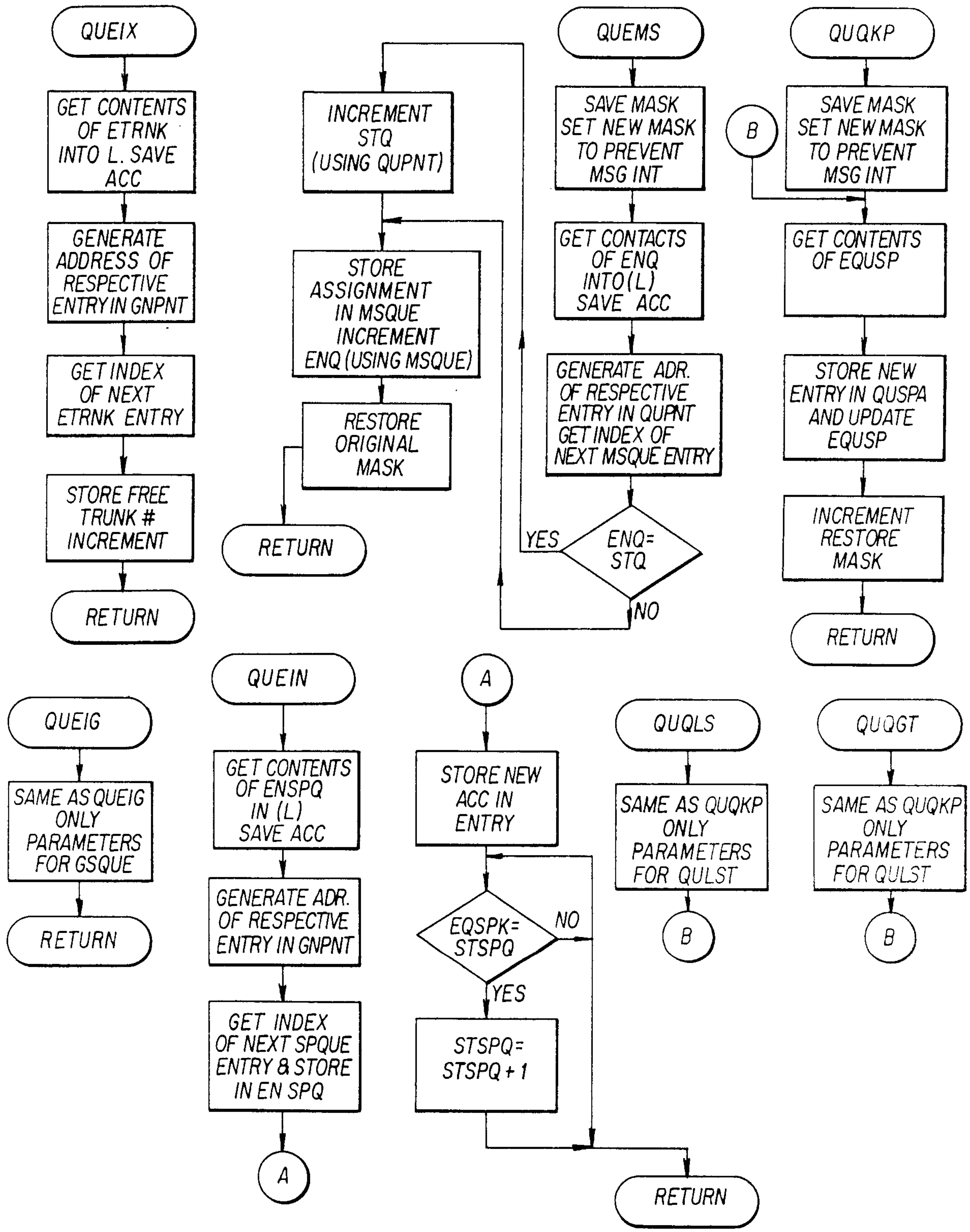
FIG. 34(*a* to *c*) is a flowchart illustrating queue handling routines QUQLS, QUQGT, QUEIX, QUEMS, QUQKP, QUEIN, QUSRH, QUFTR, QMSOT, QUEGT, QUEOT, QUESH, QUESG, QUIOX, QUIOY, QUIOZ, divided into three parts 1–c.
Figure 34B:
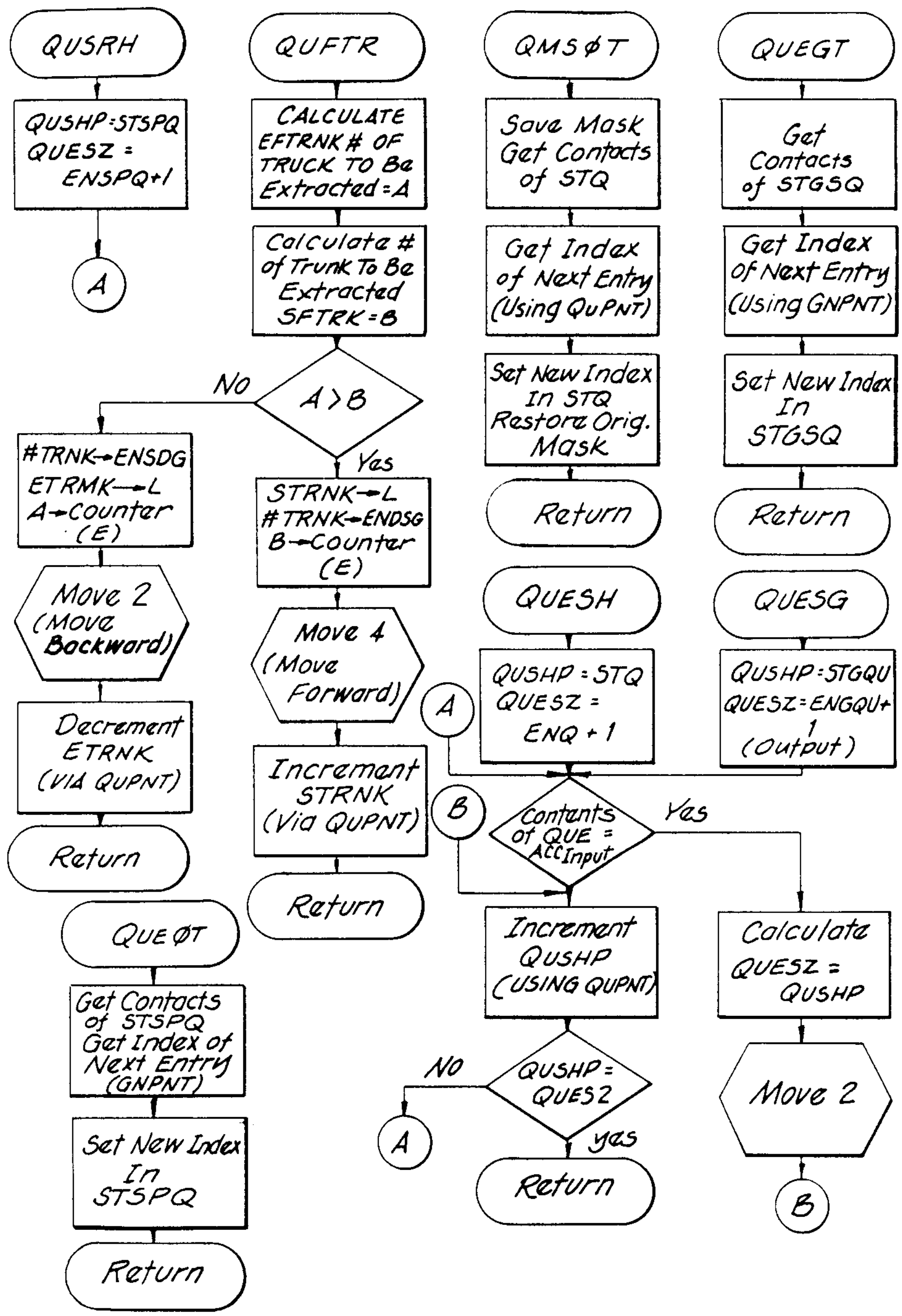
Figure 34C:
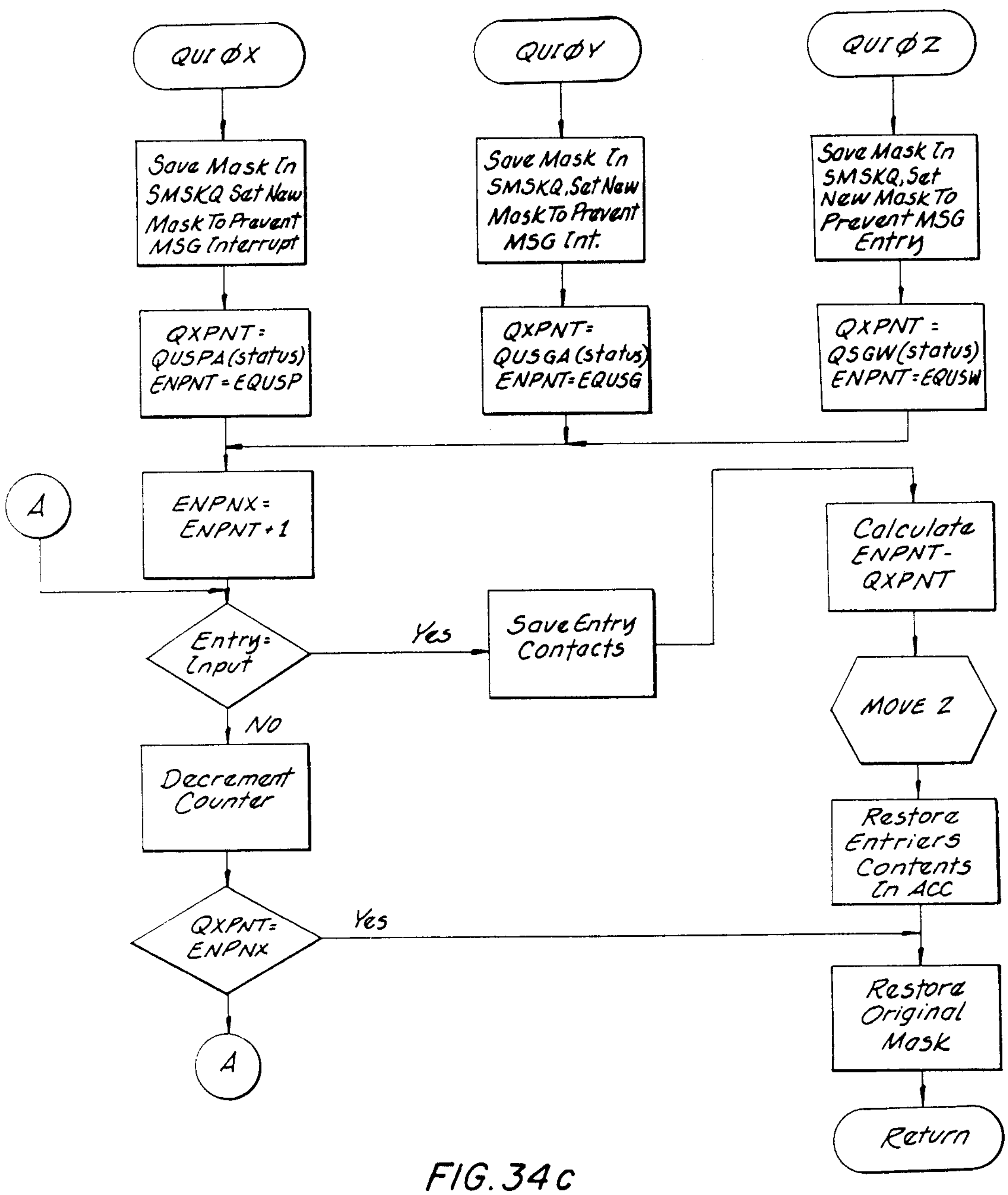
Figure 35A:
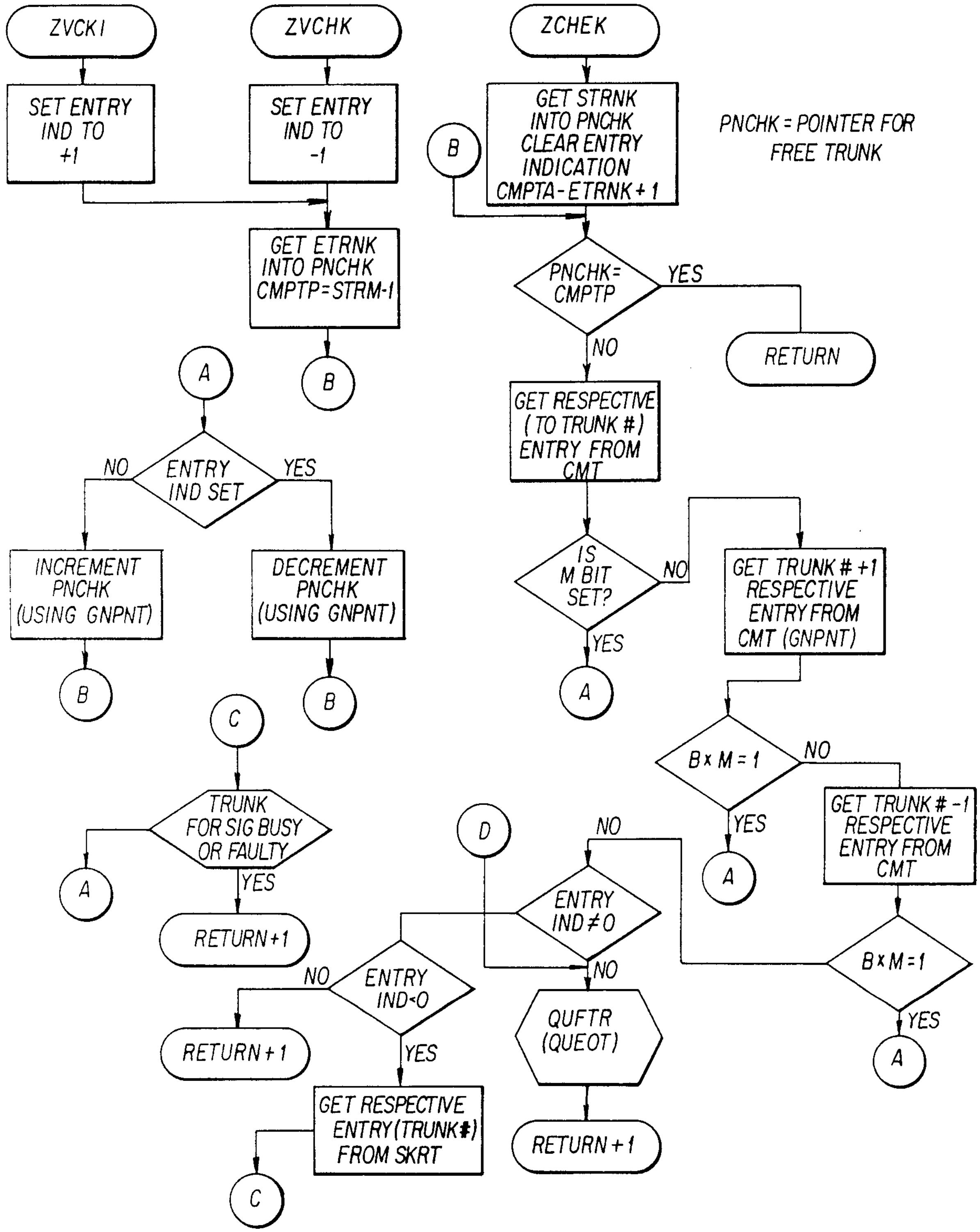
FIG. 35(*a* & *b*) is a flowchart illustrating the control message transmission routines: ZVCK1, ZVCHK, ZCHEK, MSSND, divided into two parts a,b.
Figure 35B:
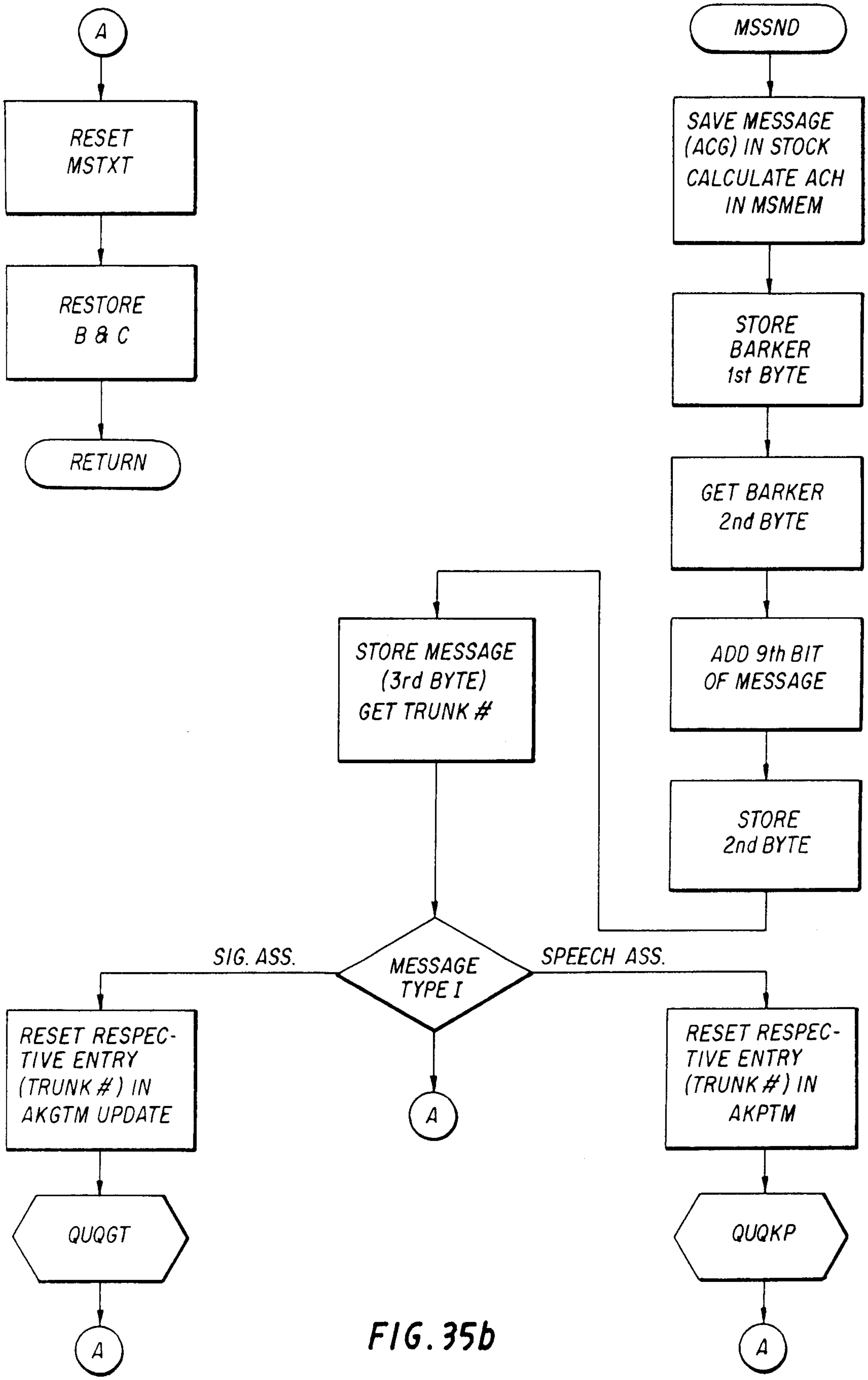
Figure 36A:
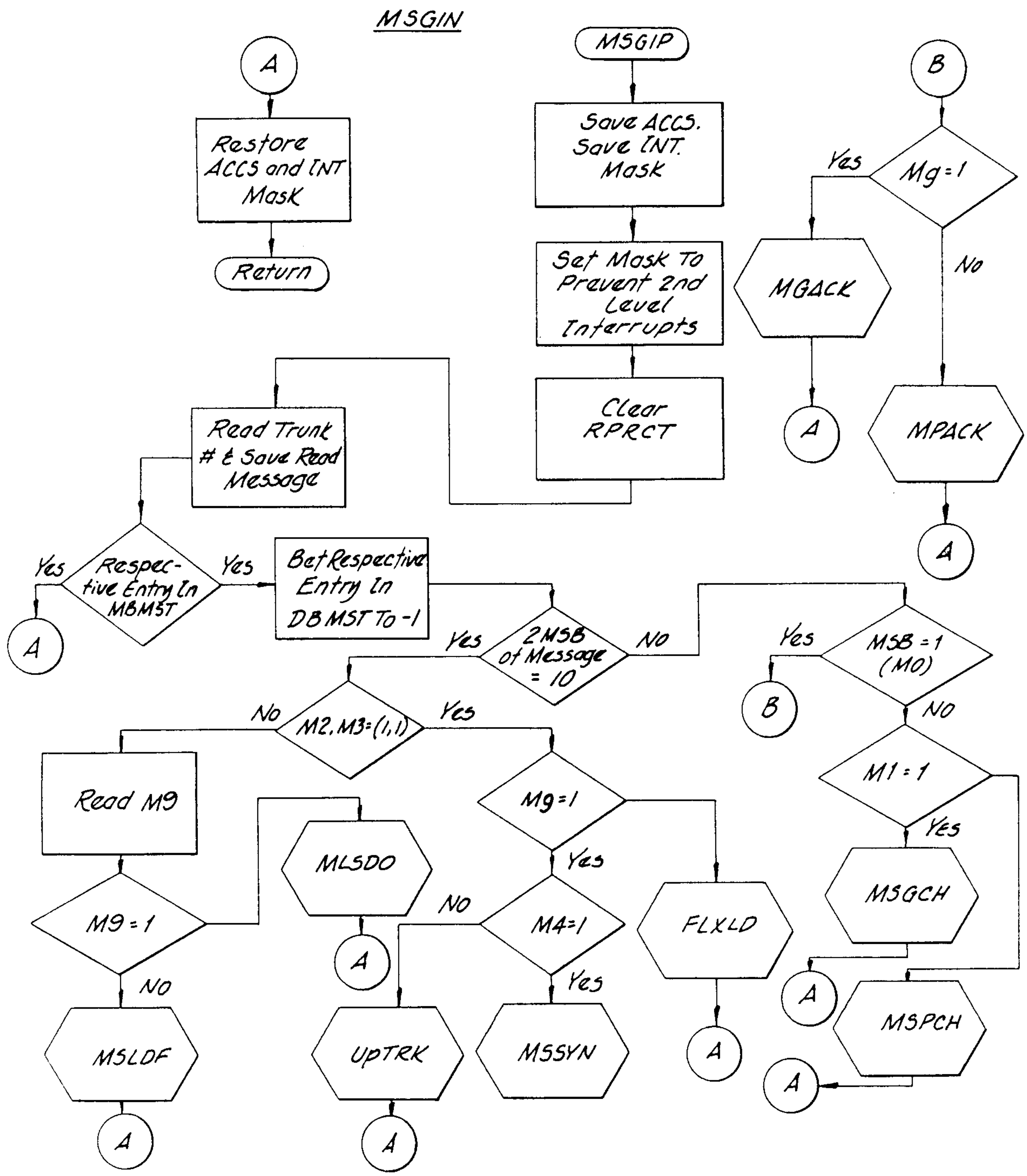
FIG. 36(*a* to *g*) is a flowchart illustrating the control messages receipt routines: MSGIP, MSPCH, MSGCH, MPACH, MS20I, MLSDO, MLSDF, divided into seven parts a–g.
Figure 36B:
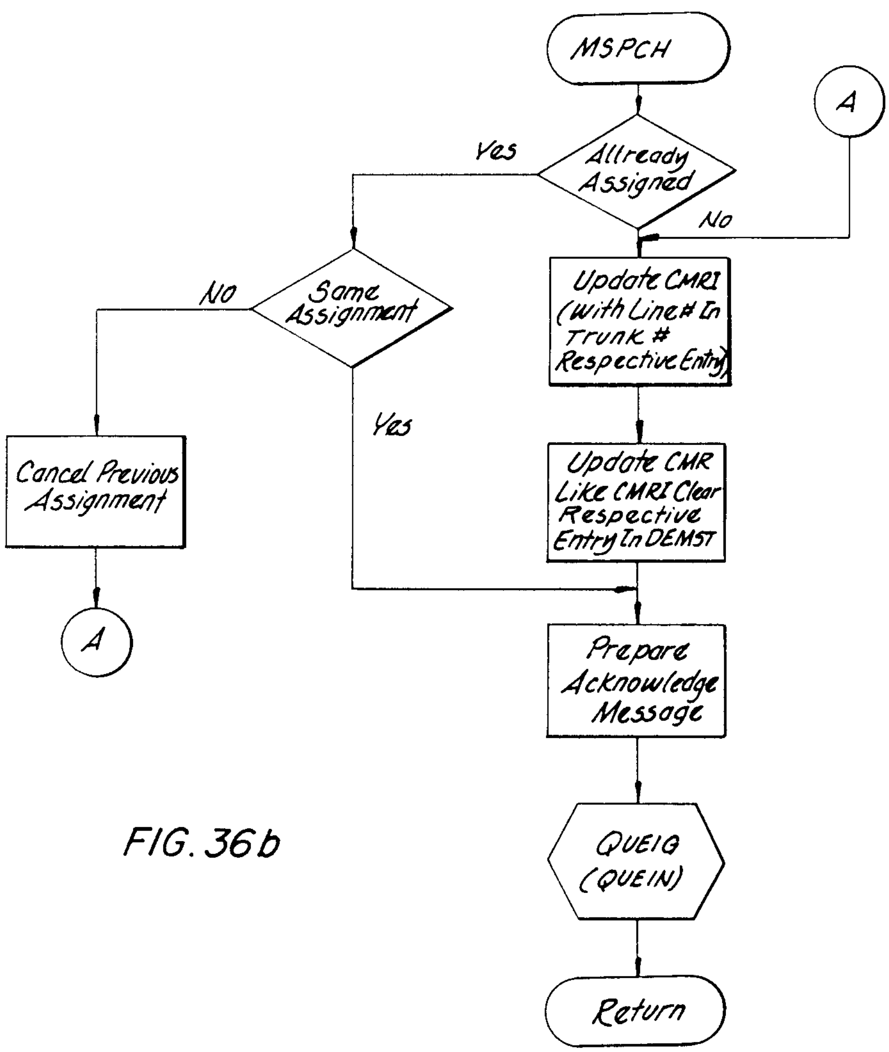
Figure 36C:
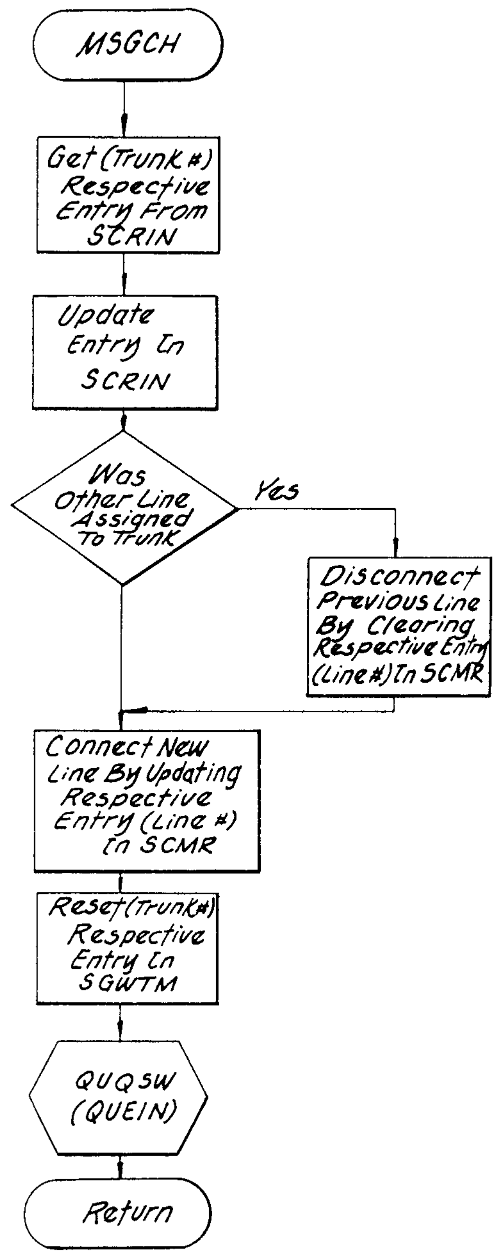
Figure 36D:
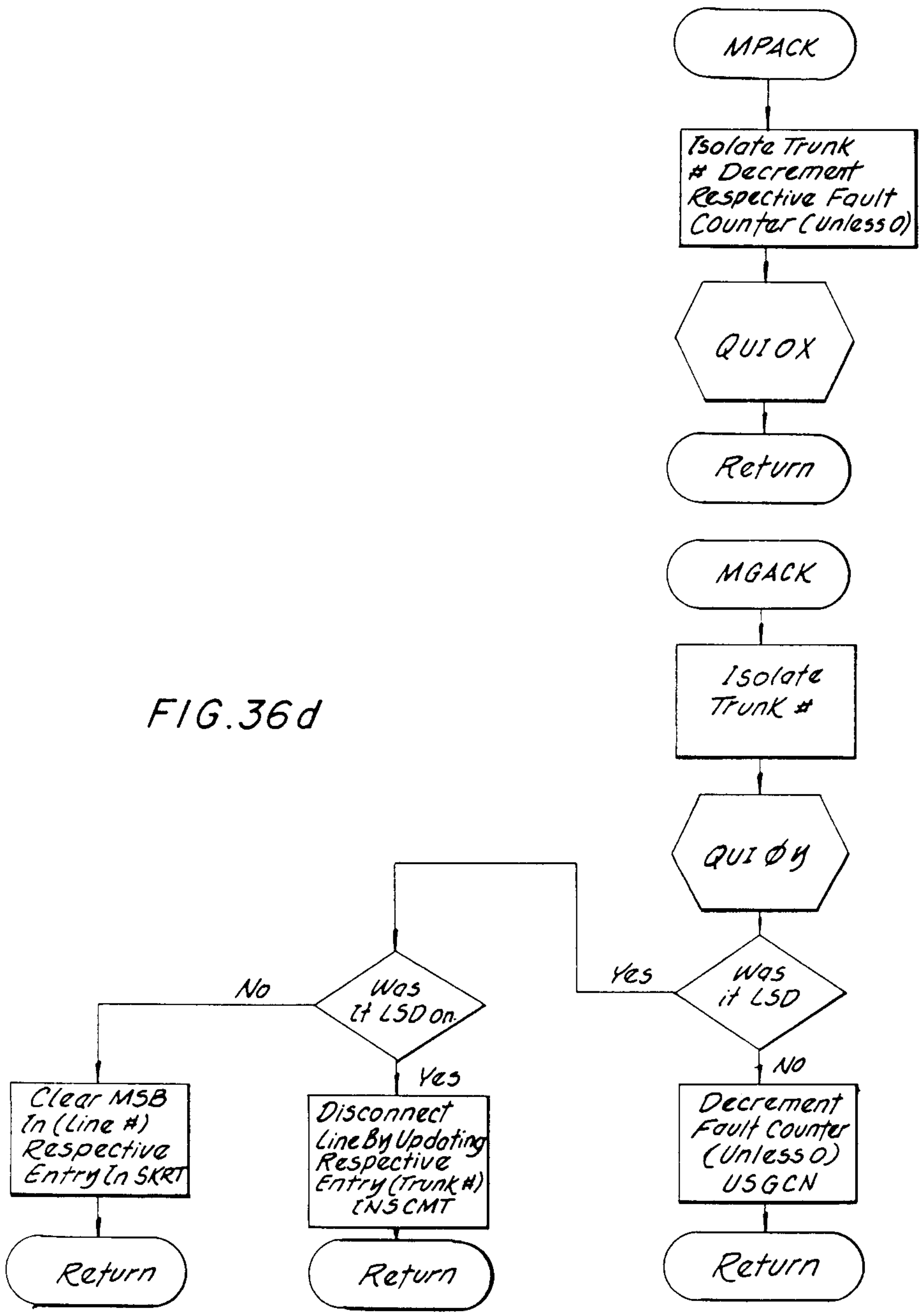
Figure 36E:
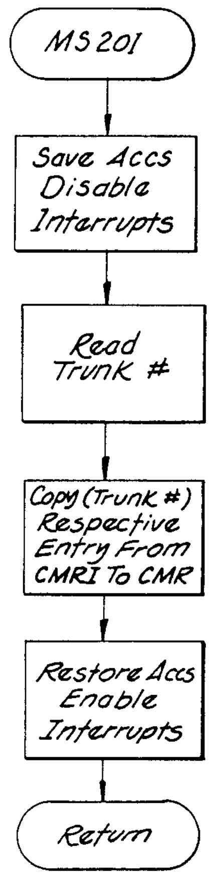
Figure 36F:
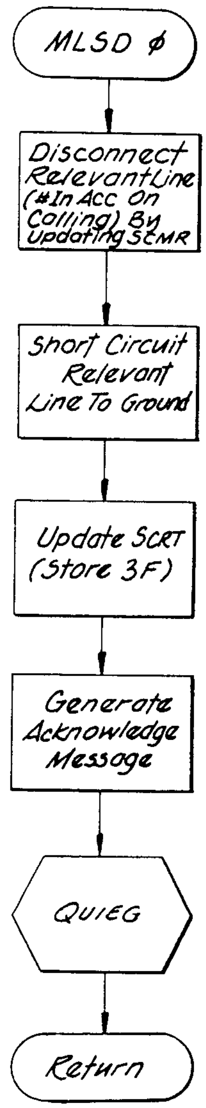
Figure 36G:
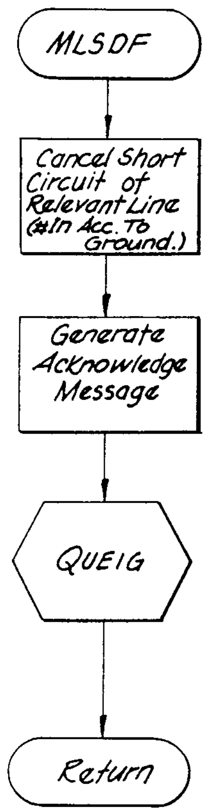
Figure 37A:
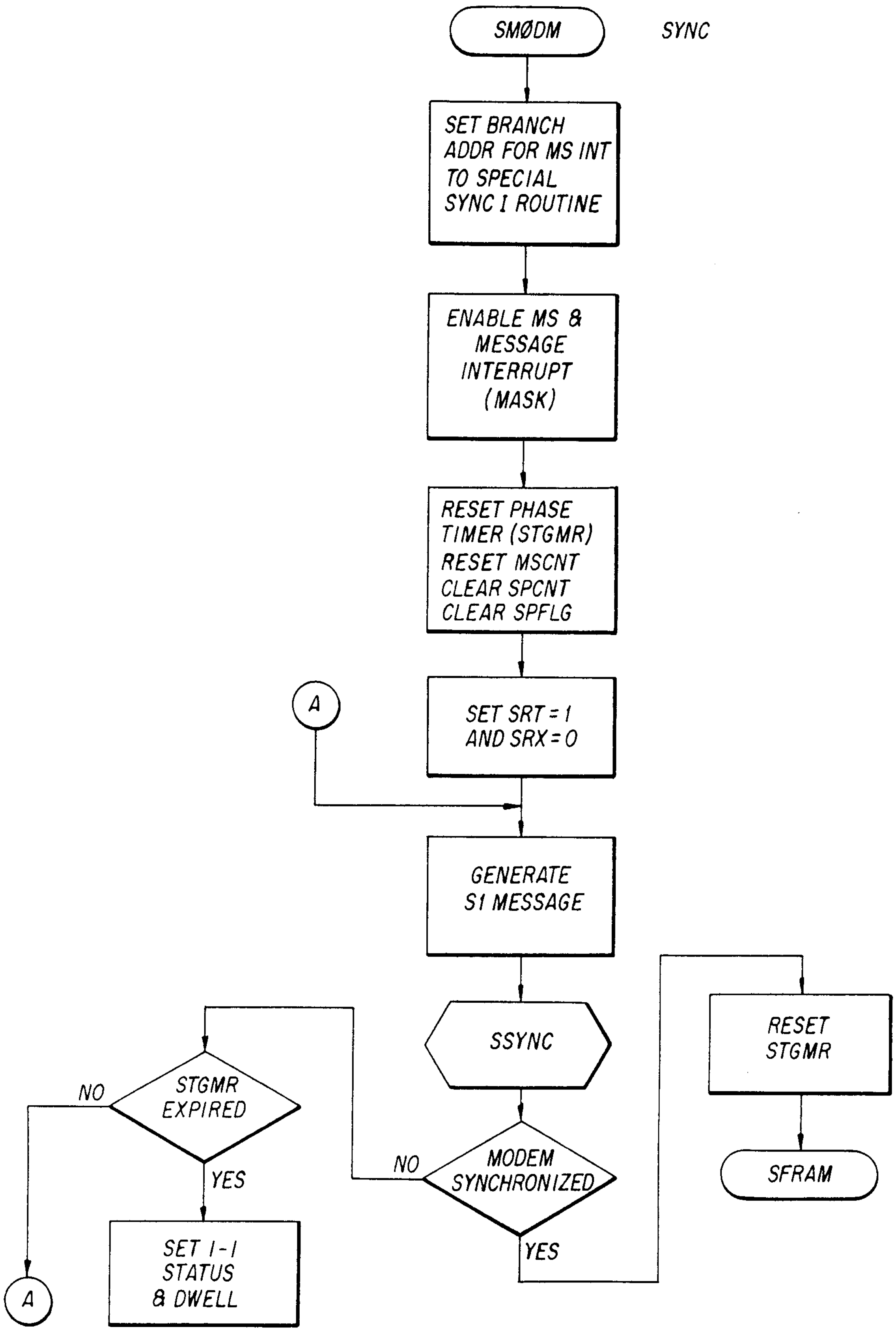
FIG. 37(*a* to *e*) is a flowchart illustrating the system synchronization routines: SMODM, SFRAM, MSSYN, SSYNC, MSINX.
Figure 37B:
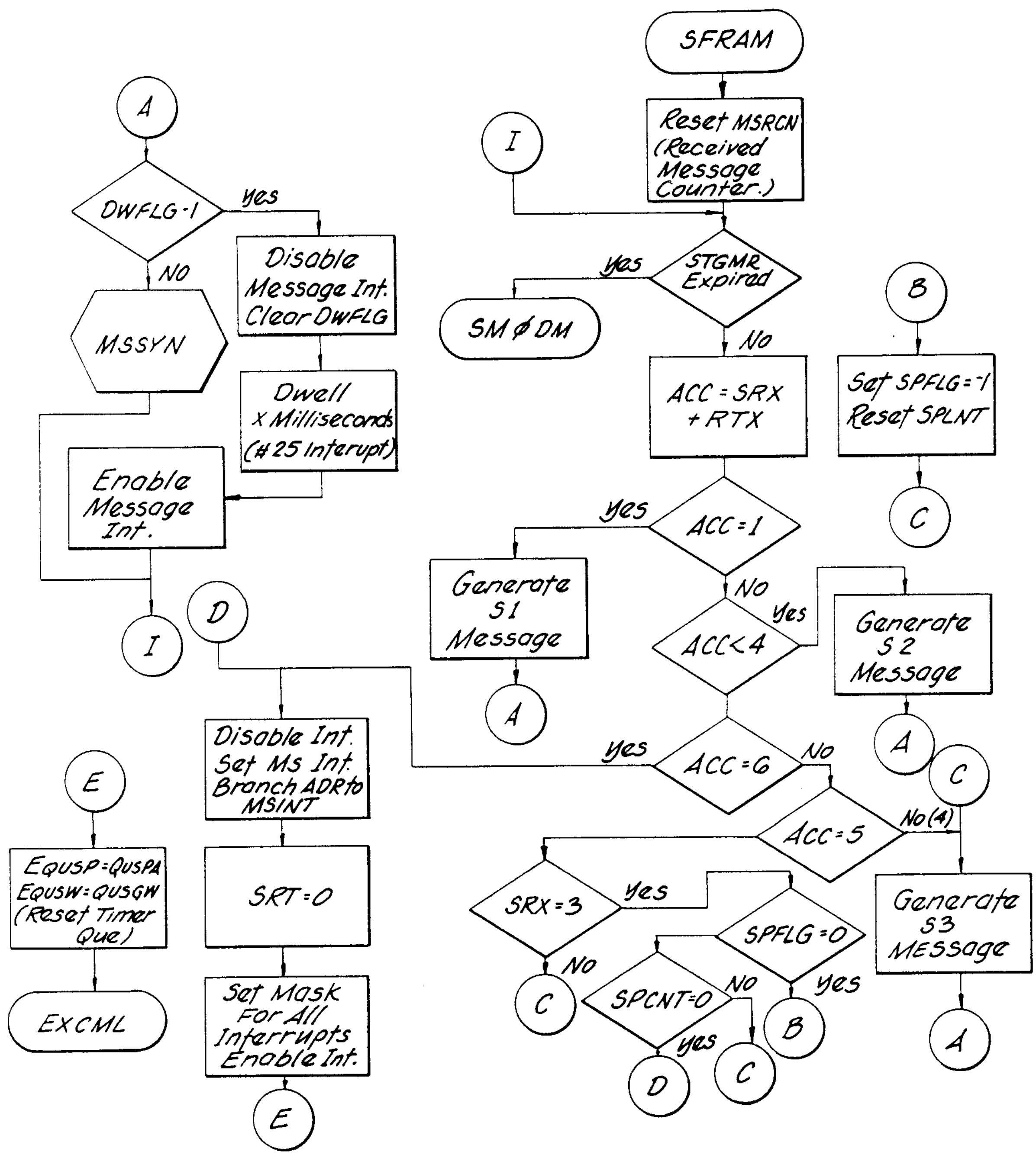
Figure 37C:
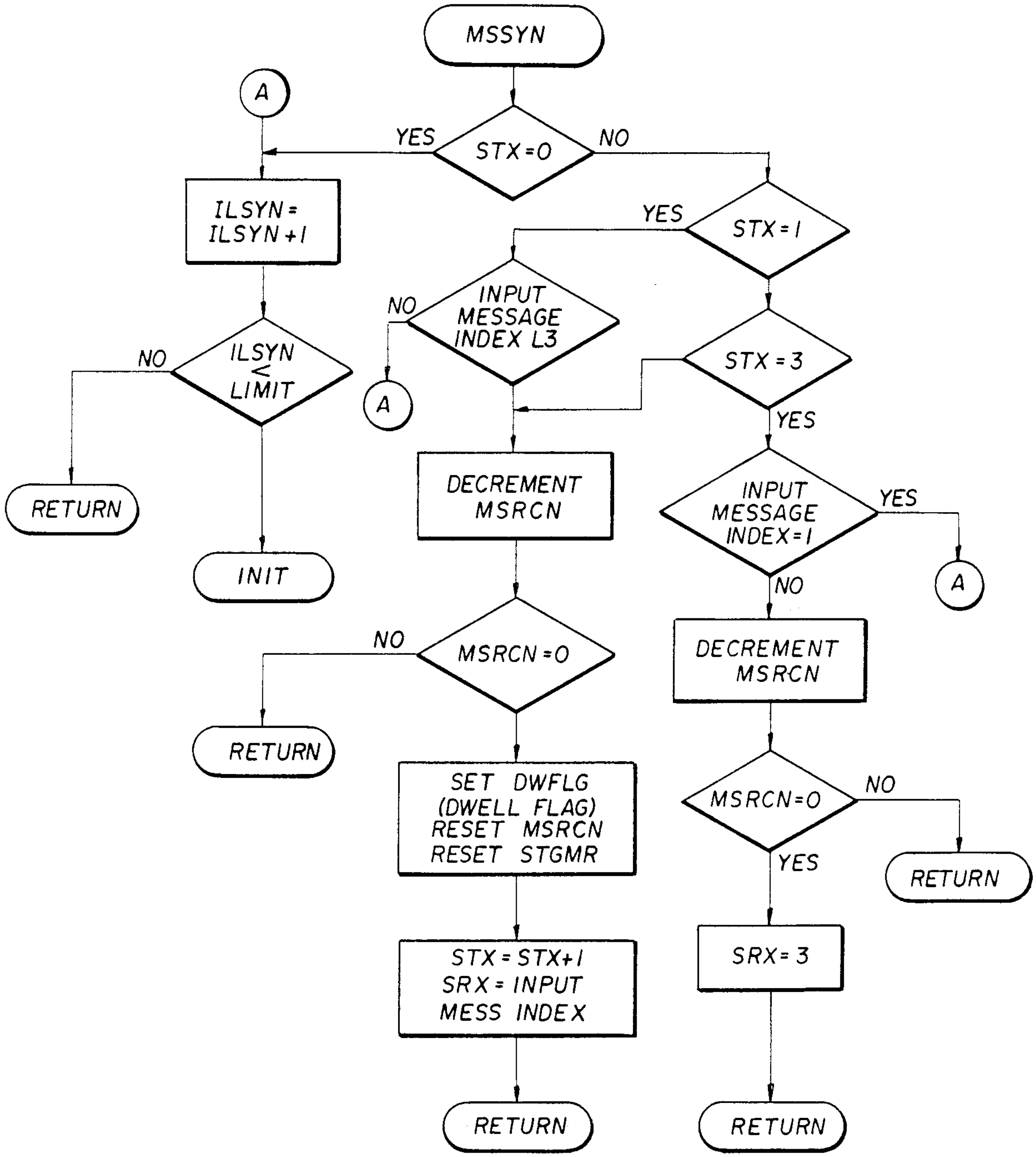
Figure 37E:
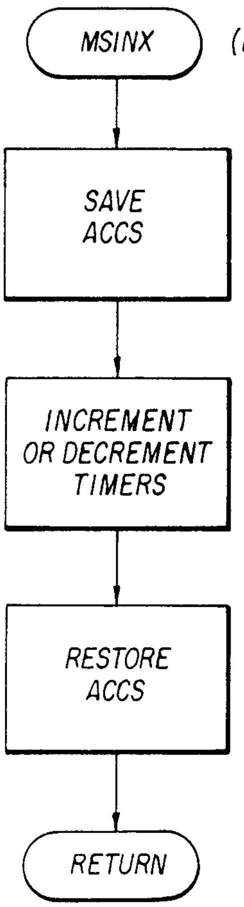
Figure 37D:
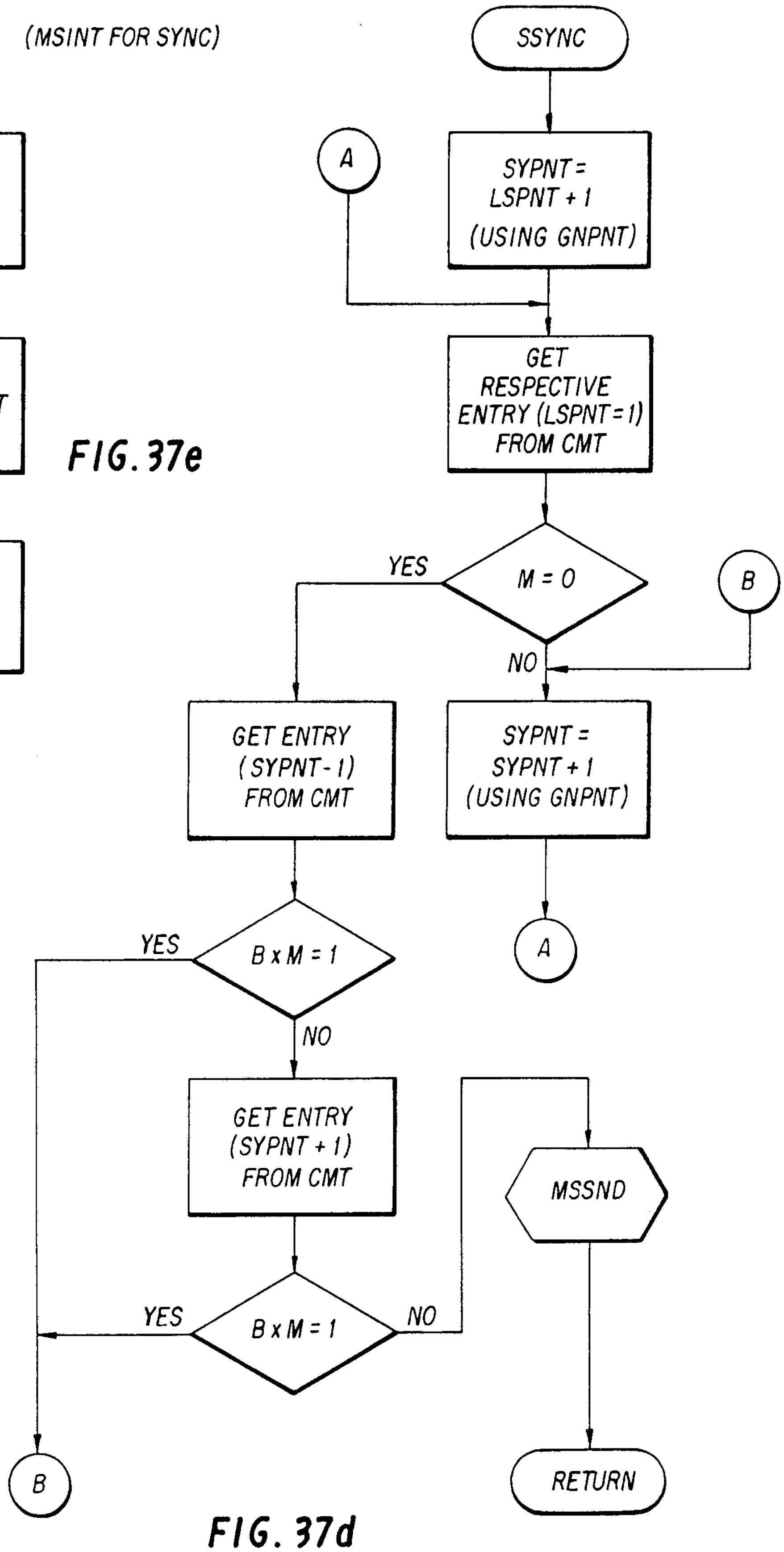

Reference is now made to FIG. 26 which is a functional diagram of the CPU 59. The heart of the CPU is a conventional Intel 8080 microprocessor 800 associated with 8K bytes of program, and 2K of RAM workspace. It is appreciated that the CPU is embodied in the preferred embodiment of the invention for purposes of design simplicity and economy and may be replaced in an alternative embodiment of the invention by conventional logic circuitry.

Program memory 802 comprises typically 4 Intel 2716 EPROM chips each containing 2K bytes of program. The EPROMs are enabled by a PROM DECODER 806 typically an LS138 chip. The decorder accepts the address bus and control bus and generates ROM enable signals.

RAM memory 804 comprises typically 4 static RAM 1K×4 chips 2114 in a 2K×8 configuration. The RAM memory is enabled by a RAM decoder 808, typically an LS138 chip. The decoder is connected to the address bus and to the control bus of the microprocessor and generates enable signals to microprocessors RAM memory 804 and CSM5, CSM6 signals to speech flow control memories 65 and 60, and to signalling control memories 704 and 750 respectively.

Additional peripherals of said microprocessor are:

1. I/O decoder 810, typically 2 LS138 chip which generate the following Input/Output enable signals:
   - I/O Ø to input and output data to and from data communication interface - USART 812.
   - I/O 1 to input message contents from message R×61.
   - I/O 2 to input channel number from message R×61.
   - I/O 5 to input channel number from blank logic 58.
   - I/O 7 to shift data in signalling FIFO 728.
   - I/O 8 to input data from speech and signalling F1F0.
   - I/O 9 to shift data in speech FIF0 818.
   - I/O A to load mask data in interrupt mask 822.
2. Data communication interface 812 - USART typically Intel 8251, which interfaces between the CPU and an external data terminal for system operation monitoring.

Data rate for USART 812 is generated by a baud rate generator 814, comprising typically 2 LS163 chips. Said baud rate generator may be selected to generate rates of 110, 300 or 1200 bits/sec.

The USART 812 is connected to the external data terminal via a 20 mA loop interface 816 comprising typically 2 opto couplers IL-74.

3. SPEECH FIFO 818 which accepts: line number CAO-CA5, SPDn, ECHO and SPD CHANGE signals from SPD ALU 57. The data output of speed FIFO 818 is connected to the data bus of the CPU. The speech FIFO generates also an output whenever it is loaded with speech detection data, this output is connected to OR gate 820, OR gate 820 receives signals from speed FIFO 820 and from signalling FIFO 728, and generates INT4 to the CPU.

4. Interrupt mask and Priority Logic 822 which receives various interrupts and transfers them to the microprocessor 800 according to mask data and priority logic.

The CPU receives interrupt inputs INT1-INT5 from blank logic 58, receive modem 61, timing circuit 69, speech and signalling detection FIFOs 818 and 728 respectively and from a USART 812 which is an interface to a data terminal.

A detailed schematic illustration of the CPU is provided in FIG. 27.

1. The following is a function description of the operation of the CPU and makes reference to the flow charts of FIGS. 28–37.

Following the functional description there is provided detailed listings of the CPU program according to a preferred embodiment of the present invention.

2. GENERAL DESCRIPTION OF THE CPU PROGRAM of the TASI Apparatus of the Invention, hereinafter also referred to as TLD

2.1 Software Functions

The TLD software program performs all control and report functions associated with the operation of the system. Its main functions are:

2.1.1. Servicing of the speech and signalling detectors (via the FIFO buffer and FIFO interrupts), including assignment of lines to trunks (speech and signalling), assignment messages transmission, updating the queue of messages transmission, updating the queue of messages waiting for acknowledgement and of assignments, waiting for trunks and updating trunks status (busy/free).

2.1.2 Servicing of the messages receiver (invoked by the receiver interrupt) including routing of speech and signalling trunks to the proper line, handling of acknowledgement and synchronization messages, transmission of acknowledged messages for received assignment messages.

2.1.3. Monitoring the communication lines for malfunctions with the aid of message acknowledgement timers, maintaining a minimum of message traffic transmission of dummy messages when necessary, and reading of trunks status from an external device.

2.1.4 Synchronization of two TLD systems which are operating at the ends of the same trunks after power-on and whenever synchronization loss is detected by the program (sub-minimal message traffic).

2.1.5 Computation of various statistics such as freeze-out time, maximal and minimal traffic rates, and operational statistics of separate lines. This data will be outputed to a display unit at fixed time intervals or at the operator's request.

2.1.6 Interfacing between the system and a display unit in an interactive manner to enable communication between the system and an operator.

2.1.7. Self-Test operations to detect faults in the TLD hardware and software.

2.2 General Program Structure

The TLD software program is organized in a modular fashion so as to facilitate programming and debugging, and to enable flexibility of modification.

The various program modules operate in two main levels: The first level includes routines which service peripherals - the speech and signalling detectors and the message receiver - in real time. The second level includes routines which perform off-line functions such as display of statistics, interaction with the operator and self-test.

The first level routines are invoked by an interrupt from the peripheral device.

The invokation of the second level routines and the coordination of the two levels is done by a main line type executive program.

The main modules of the TLD software program are:

(a) The executive program - EXEC.
(b) The FIFO interrupts (speech and signalling detector FIFO buffers) service module - FIFIN.
(c) The message receiver service module - MSGIN.
(d) The synchronization program - SYNC.
(e) The system-operator interaction module - MONIT.
(f) Output program for reports - REPRT.
(g) Self-Test program - SLTST.

3. THE STRUCTURE OF THE VARIOUS PROGRAM MODULES

3.1 Exec—The System's Executive Program

The executive program controls the operation of the second level modules and coordinates the two levels. In addition to this, EXEC is responsible for the updating and testing of various timers, with the aid of 25 milisecond clock interrupt, and for the detection of malfunctions in operation by the use of these timers.

Exec consists of the following sub-modules:

(a) Initialization routine—INIT.
(b) Executive main-line—EXCML.
(c) The 25 milisecond clock interrupt service routine—MSINT.

3.1.1 INIT—initialization routine—The initialization program-INIT is invoked by a power-on interrupt, or by EXCML, when a loss of synchronization is detected. The program initializes flags, tables and timers and sets the initial hardware status. After accomplishing its tasks it passes control to the synchronization routine.

INPUT—None

OUTPUT—Initialized tables, flags and timers.

Data base—An initialization table, ITTAB, which includes the initialization values of the various flags, tables and timers, addresses and lengths of the initialized tables.

3.1.2 EXCML—the executive program mainline. This routine is running in the system whenever no other routine does. It sequentially checks flags and timers and invokes other routines accordingly. Each routine which is invoked by EXCML returs control to EXCML after accomplising its tasks.

INPUT—the following flags and timers:

(a)—DMFLG—A flag for dummy messages transmission
(b)—CETMA—A timer for reading of trunks external fault detectors,
(c)—STTMR—A timer for Self-Test activation and a character for the display keyboard.

OUTPUT—Updating of CETMR and DMFLG character to the MONIT program.

3,1.3 MSINT—The 25 miliseconds clock interrupt service routine.

MSINT is a service routine for a 40 HZ clock interrupt. From this clock rate MSINT derives various timers. When such a timer expires MSINT performs the appropriate operation. The main operations performed by MSINT (either directly or by invoking the appropriate routine) are: indicating malfunctioning of trunks (expiring of acknowledge timer), Setting of Flags such as DMFLG. Checking the assignment queues verses the free trunk queue and assigning lines to trunks when necessary (by involing the appropriate assignment routines), invokation of the display routine to display system statistics.

INPUT—None

OUTPUT—Data base updated (including DMFLG set when appropriate)

Data Base—AKPTM—A 24 acknowledge timer for speech assignment messages.

AKETM—A 24 acknowledge timer for signalling assignment messages.

SGWTM—A 24 confirmation timer for signalling assignments

QUSPA—A queue for speech trunks waiting for acknowledgment.

QUSGA—A queue for signalling trunks waiting for acknowledgement.

QUSGW—A queue for signalling trunks waiting for confirmation.

USPCN—A table for fault counters in speech trunks.

USGCN—A table for fault counters in signalling trunks.

GNTMR—A general system software clock

TSTMR—A 5 minutes timer

DSTMR—Display timer

CETMR—A timer for faulty trunks check using an external device

MSRCN—No message received timer

MSTXT—No message transmitted timer

MSQUE—General message queue

FTRNK—The free trunks queue 3.2 FIFIN—The speech and signalling detectors' FiFo Interrupt Service Routine FIFIN is a service module for the speech and signalling detectors. FIFIN is invoked by an Interrupt from the Fifo buffer and performs all functions required for the handling of the detectors' information, including classification of information (speech detection, end of talk spurt detection, signalling detection, end of signalling detection, echo presence) and invokation of the appropriate routines accordingly.

FIFIN consists of the following sub-modules:

3.2.1 FIFIP—This routine inputs data from the speech detector (SPD) and signalling detector (SGD) Fifos, classifies it accordingly to source (SPD or SGD) and contents (on detection or off detection and is echo present) and according to this classification invokes one of the routines 3.2.2-3.2.5 or 3.2.10-3.2.11.

After accomplishing its tasks each such routine returns control to FIFIP which continues the process of inputing from the Fifos until both of them are empty. During this process additional Fifo interrupt are disabled (using the interrupt mask)

3.2.2 FISPO—This routine is invoked by FIFIP whenever a speech detection data is classified by FIFIP. FISPO assigns the interrupting line to a trunk, if it is not yet assigned, accordingly FISPO transmits an appropriate message by invoking MSSND and updates the relevant control memory location. If no free trunk is available (i.e. the speech assignment queue is not empty) FISPO enters the new assignment into the queue.

3.2.3 FISPF—This routine is invoked by FIFIP detection whenever an end of talk spurt is classified by FIFIP. FISPF enters the relevant trunk into the free trunk queue (FTRNK) and if echo is preset, disconnects the line from the trunk, if an assignment is waiting for a trunk. FISPF invokes the appropriate assignment routine (FISPO) and does not enter the free trunk in FTRNK.

3.2.4 FISGO—This routine is invoked by FIFIP whenever a signalling detection is classified by FIFIP. FISGO assigns the interrupting line to a free signaling trunk, (by updating the relevant location of a central memory) if it is not assigned yet. In case of new assignment FISGO generates a signalling assignment message and transmits it by invoking MSSND. If no free trunk is available for both message transmission and signalling FISGO searches one which is free for signalling only, and if one is found, assigns the line to it and transmits a message by breaking in 3.2.5 FISGF—This routine is invoked by FIFIP whenever FIFIP classifies an end of signalling detection. FISGF disconnects the interrupting line from the trunk it is assigned to and updates the trunk and line status in the relevant tables.

3.2.6 QUEIN—The routines grouped under this name enter new entries into the system queue (see 3.2.14 for details of queus).

3.2.7 QUEOT—The routines grouped under this name extract entries from the system queues (see 3.2.14 for details of queues).

3.2.8 ZCHEK—This routine checks if the free trunk queue (FTRNK) includes a trunk which is free for message transmission by checking the B and M bits in the control memory locations corresponding to a particular trunk and the two adjacent to it. The search starts from the trunk oldest in the queue and continues in a sequential manner.

3.2.9 MSSND—This routine accepts a message contents and a trunk number and transmits the message via the trunk by writing the message plus Barker plus parity bit in the message transmitter memory locations corresponding to the particular trunk. MSSND also triggers timers for acknowledge message to be received.

3.2.10 FLSDO—This routine is invoked by FIFIP whenever an on-hook signalling detection is classified by FIFIP. FLSDO generates an appropriate message, and searches for a free trunk and invokes MSSND to transmit the message. If no free trunk is found the message is entered into the general messages queue MSQUE by invoking QUEIN.

3.2.11 FLSDF—This routine is invoked by FIFIP whenever an end of on-hook signalling is classified by FIFIP. FLSDF generates an appropriate message and sends it according to the procedure described in 3.2.10.

3.2.12 INPUT—Input to FIFIN module consists of a byte read from the SPD or SGD Fifo buffer. Each byte includes the interrupting line number in bits 2-7, an indication if it was speech (signalling) or end of talk spurt (signalling) detection in bit number 0 (most significant). A byte read from the SPD Fifo includes an echo indication in bit number 1, and a byte read from the SGD Fifo includes an indication of an on-hook signalling in bit number 1.

3.2.13 OUTPUT—Assignment message transmitted to the other end system. Modification of signalling and speech transmission control memories SCMT and CMT (in order to route lines via trunks).

3.2.14 Data Base—All the queues and tables mentioned in the Data Base of 3.1.3 except QUSGW and the following tables:

CRT—the speech transmission trunk cross reference table

COMLT—the speech transmission trunks status table

SCRT—the signalling transmission trunks cross reference table

SKRT—the lines signalling transmission cross reference table 3.3 MSGIN—The Message Receiver Interrupt Service Module MSGIN is a service module for, and is invoked by an interrupt from the message receiver. The functions performed by MSGIN include input of the message information, classification of the message, assignments of lines to trunks according to the message and transmission of acknowledge messages.

MSGIN consists of the following sub-modules:

3.3.1 MSGIP—This routine is invoked by an interrupt from the message receiver whenever a message is received. MSGIP reads the message, classifies it according to its contents and invokes the appropriate routine-one amoung 3.3.2-3.3.6 and 3.3.8-3.3.11. Additionally it rests the "no-message received" timer MSRCN.

3.3.2 MSPCH—This routine is invoked by MSGIP whenever a received message is a speech assignment message. MSGCH routes the line by updating the corresponding location in the Control Memory Receive Image (CMRI), generates an acknowledge message and enters it into the general message queue MSQUE, and updates the trunks and lines status bytes in the appropriate tables.

3.3.3 MSGCH—This routine is invoked by MSGIP whenever a received message is a signalling assignment message. MSGIP disconnects another line from the particular trunk if one is routed through it and routes the line indicated by the assignment message by updating the signalling Control Memory Receiver. In addition MSGCH updates the line and trunk status in the relevant tables, and resets a signalling confirmation timer and enters the trunk number into the signalling confirmation timers queue (QUSGW).

3.3.4 MPACK—This routine is invoked by MSGIP whenever a received message is a speech assignment acknowledge message. MPACK extracts the respective trunk number from the queue for acknowledge timers for speech assignments queue (QUSPA), by invoking QUEOT.

3.3.5 MGACK—This routine is invoked by MSGIP whenever a received message is a signalling assignment acknowledge message. MGACK extracts the respective trunk number from the queue for acknowledge timers for signalling assignment queue (QUSGA) by invoking QUEOT.

3.3.6 MSSYN—This routine is invoked by MSGIP whenever a received message is a synchronization message. For description of functions of MSSYN see 3.4.3.

3.3.7. MS2OI—This routine is invoked by the end of message interrupt issued by the message receiver 20 miliseconds after the reception of each message. MS2OI read the trunk number through which the message was received and updates CMR according to its image CMRI.

3.3.8 MLSDO—This routine is invoked by MSGIP whenever a received message is on-hook or signalling message. MLSDO routine short circuits the relevant line to the ground, enters an acknowledge message into the General Message queue MSQUE, and updates line status byte in the relevant table.

3.3.9 MLSDF—This routine is invoked by MSGIP whenever a received message is an end of on-hook signalling message. MLSDF disconnects the relevant line from the ground, enters an acknowledge message into the General Message que MSQUE, and update line status byte in the relevant table.

3.3.10 MLSDK—This program is invoked by MSGIP whenever a received message is an acknowledge message for an on-hooksignalling message. MLSDK disconnects the relevant line from the trunk it is routed on and updates the line status in the relevant table.

3.3.11 MLSDR—This program is invoked by MSGIP whenever a received message is an acknowledge message for an end of an on-hook signalling message MLSDR updates the line status in the relevant table.

3.3.12 INPUT—Messages received by message receiver, including line number, and message type (for details see 4.1.3)

3.3.13 OUTPUT—Acknowledge messages entered into the General Message queue MSQUE. Modification of Signalling and Speech Control Memories-Receive SCMR and CMR. p0 3.3.14 Data Base:

QUSPA—A queue for speech trunks waiting for acknowledge

QUSGA—A queue for signalling trunks waiting for acknowledge

QUSGW—A queue for signalling trunks waiting for confirmation

SGWTM—24 timers for signalling confirmation table

SCRT—Signalling trunks receive cross reference table

SKRIN—Signalling trunk receive status table 3.4 SYNC—Synchronization Program

Sync is invoked by INIT. (i.e. after power-on or when the system synchronization is lost) and its function is to synchronize two TLD systems which are connected to the ends of the same trunks group.

The synchronization procedure is a double-stage one-at first stage the Modem are synchronized (mainly a hardware function) and at the second stage, which consists of three phases, the message transmitter/receiver of the two end frames are synchronized.

SYNC consists of the following sub-modules:

3.4.1 SMODM—This routine is responsible for the synchronization of the Modem. This is done by transmitting synchronization messages (invoking SSYNC for this purpose). If after a fixed number of messages synchronization is not achieved, the routine shall set the system in a one-one correspondence state. If synchronization is achieved, control is passed to SFRAM.

TABLE 1

| System Synchronization States | | |
|---|---|---|
| Received Messages | Transmitted Messages | Transmission Changed to |
| 0 | S1 | S1 |
| S1 | S1 | S2 |
| S2 | S1 | S2 |
| S1 | S2 | S2 |
| S2 | S2 | S3 |
| S3 | S2 | S3* |
| S2 | S3 | S3 |

TABLE 1-continued

| System Synchronization States | | |
|---|---|---|
| Received Messages | Transmitted Messages | Transmission Changed to |
| S3 | S3 | regular operation |

*after enter several S3 messages into MSQUE - (General Message Queue) the system starts regular operation.
NOTES:
(a) During the change of phases a 50 milisecond dwell is performed to prevent former phase messages interleaving with present phase.
(b) The transmission of messages is always done by invoking SSYNC.
(c) At each phase a timer is reset, and if it expires before an appropriate sync message is received the routine returns to the previous phase.
(d) The change of phase is done only after a fixed number of appropriate sync messages are received (more than 3).

3.4.2 SFRAM—This routine function is to insure that two end frames connected to the same trunks group will send assignment messages to each other only after they are fully synchronized.

The procedure for achieving this purpose consists of the phases:

(a) The system "knows" that its Modem is synchronized, does not have any information about the other system and transmits a sync message—S1.

(b) The system "knows" that both systems' modems are synchronized and transmits a sync message—S2

(c) The system "knows" that the other system "knows" about both system modems being synchronized already and sends a sync message—S3

The possible states are described in Table 1.

3.4.3 MSSYN—This routine is invoked by MSGIP (see 3.3) whenever a received message is a synchronization message. MSSYN analyzes the message and changes the system state accordingly.

3.4.4 SSYNC—This routine is invoked by SFRAM or SMOBEM whenever they need to send a sync message, SSYNC searches for a free trunk to transmit the message through it, if no such trunk is found, the message is transmitted by breaking into one of the trunks (different one each time).

3.5 MONIT—The system—Operator Interaction Module

MONIT's purpose is to enable interaction between an operator and the system during its regular operation.

It enables the operator to read and write into the system's RAMS, read the system PROMS and ask for a print out (or display) of various reports.

MONIT consists of the following submodules:

3.5.1 MONML—This is the MONIT main line which is invoked by EXCML (see 3.1.2) when a new character is inputed from the display keyboard. According to the nature of this character (and previous or following characters if the operation code is longer than one character) and after a validity check, MONML invokes the appropriate routine from PRLIB. Such routine, after accomplishing its tasks, returns control to MONML which returns control to EXCML. There is also an option for MONML to operate offline without being dependent on EXCML and the rest of the system.

3.5.2 PRLIB—This is a name for a group of routines which perform the various functions requested by the operator, such as changing the contents of a memory location, reading a memory section and preparing it for printing by translating it into ASCII, computing special statistics, etc.

3.5.3 INPUT—Control characters and parameters from the keyboard 3.5.4 OUTPUT—Information required by the operator ready for printing.

3.5.5 Data Base—Binary to ASCII translation table.

3.6 REPRT—Output Freq.

The REPRT routine is responsible for handling of output to the display. It exploits a cyclic output buffer, into which any program wishing to print data stores it, in ASCII format.

REPRT is invoked by EXCML once per loop (of EXCML) and returns control to EXCML, if the cyclic buffer is empty, if the display is not ready for input or after the output to the display was executed.

3.6.1 INPUT—PRBUF: A cyclic output buffer
STBUF: A pointer to PRBUF head
ENBUF: A pointer to PRBUF tail

3.7 SLTST—Self Test Module

This module serves for a continuous testing of the software and hardware of the TLD system, during its regular operation.

Components checked include: the CPU, the Memory and the detectors (SPO, SGO).

SLTST is invoked by EXCML at fixed time interval, at each such invokation a different function of the system is tested.

SLTST consists of the following sub-modules:

3.7.1 STEXC—This routine is the control routine of the self-test module. It is of a table driven type main line routine.

STEXC is invoked by EXCML (see 3.1.4) every time a self-test timer expires and at each such invokation, it uses the driver table and an adjunct pointer to decide which test-routine is to be invoked.

Each sub-module invoked by STEXC returns control to STEXC together with the test results which are displayed by STEXC (A fault lamp plus fault number on the digital display). If a fault was detected STEXC switches the system to a one to one correspondence state. Otherwise control is returned to EXCML.

3.7.2. STCPU—This routine is a minimal diagnostic routine for the CPU and tests its various logic, arithmetic and addressing functions.

3.7.3 STROM—This routine checks the software program by executing a check sun. The routine tests 1K EPROM at a time.

3.7.4 STRAM—This routine checks the RAM by writing into it and reading back from it a test pattern. Such tests are executed on a small block of RAM locations at a time since it requires disabling interrupts.

3.7.5. STDTC—This routine tests the speech and signalling detection SPD and SGD by activating hardware while transmits signals of appropriate routine and amplitude so that they should be detected by the SPD and SGD.

3.7.6 INPUT—None 3.7.7 OUTPUT—Fault numerical code displayed on the digital display and the fault lamp is turned on if a fault is detected.

3.7.8 Data Base—STDRV—Drive table for STEXC. Various constants for the tests.

4. DATA STRUCTURES

This paragraph describes the structure of tables, buffers, queues, I/O's and flags.

4.1 CONTROL MEMORIES

4.1.1 CMT—(Control Memory Transmit)

CMT is the TX speech assignment control memory including 24 bytes, one byte for each channel, from 0 to 23. Absolute addresses of CMT are 1480H–1497H. Byte structure is as follows:

| | | |
|---|---|---|
| M | M | No. of assigned Line |

M=1 —A message is transmitted on the channel.

B=1 —Channel is blanked

Line numbers are $0\text{–}2F_H$. $3F_H$ code means that no line is assigned on the channel.

A line assigned to a channel means that the proper byte content in CMT will be the line number. (Hardware requirements are negative logic).

4.1.2 SCMT—(Signalling control memory transmit)

SCMT is the TX signalling assignment control memory, including 48 bytes, one byte for each line (M—wire), numbered 0–47. Absolute addresses of SCMT are $1800_H\text{–}182F_H$. Byte structure is as follows:

| | | | |
|---|---|---|---|
| 0 | 0 | 0 | No. of assigned Channel |

Channel numbers are $0\text{–}17_H$. $19_H$ code means that no line is assigned to this channel. A line assigned to a channel means that the proper byte contents in SCMT will be the channel number on which the line is routed.

4.1.3 MSMEM—(Message Memory)

MSMEM is the message memory including 24 sequential blocks, a block for each channel, numbered 0–23. Each block contains 4 bytes structured as follows:

| | | | | | | | |
|---|---|---|---|---|---|---|---|
| 1 | 1 | 0 | 1 | 0 | 1 | 0 | X |
| $M_8$ | P | 1 | 1 | 1 | 1 | 0 | 0 |
| $M_0$ | $M_1$ | $M_2$ | $M_3$ | $M_4$ | $M_5$ | $M_6$ | $M_7$ |
| / | / | / | / | / | / | / | / |

X—unused bit

Next 13 bits (from right to left) are constant (ref. bit=0) and 12 bits of Barker code).

Next 9 bits are message content.

Two lengths of messages are used: 8 or 9 bit long. The length of a specific message is determined by $M_O$ & $M_1$ as follows:

| Message Type | $M_8$ | $M_0$ | $M_1$ | $M_2$ | $M_3$ | $M_4$ | $M_5$ | $M_6$ | $M_7$ |
|---|---|---|---|---|---|---|---|---|---|
| Speech Assignment Message | X | 0 | 0 | Line Number | | | | | |
| Signalling Assignment Message | X | 0 | 1 | Signalling Line Number | | | | | |
| Flexible Load Disconnection Message | 0 | 1 | 0 | 1 | 1 | X | Disconnection Code | | |
| Pilot Failure Message | 1 | 1 | 0 | 1 | 1 | 0 | Block Code | | |
| Sync Message | 1 | 1 | 0 | 1 | 1 | 1 | Code | | |
| Long Signalling ON Message | 1 | 1 | 0 | Signalling Line Number* | | | | | |
| Long Signalling OFF Message | 0 | 1 | 1 | Signalling Line Number* | | | | | |
| Acknowledge Message | | | | | | | | | |
| Speech | 0 | 1 | 1 | 1 | Chan. Number of | | | | |
| Signalling | 1 | 1 | 1 | 0 | rec. assignment msg. | | | | |

*Max. line number is $2F_H$ i.e. $M_2M_3\#(1,1)$

Absolute addresses of MSMEM are $1400_H\text{–}145F_H$.

4.1.4 CMR (Control Memory Receive)

CMR is the RX speech assignment control memory including 24 bytes, a byte for each channel, from 0–23. Absolute addresses of CMR are $14A0_H\text{–}1497_H$. Byte structure is as follows:

| | | |
|---|---|---|
| 0 | 0 | Line Number |

Line numbers are 0–2FH. 3FH code means that no line is assigned on the channel.

A line assigned to a channel means that the proper byte content in CMR will be the line number. (Hardware requirements are negative logic).

4.1.5 SCMR (Signalling Control Memory Receive)

SCMR is the RX signalling assignment control memory, including 48 bytes, one byte for each line (E—Wire), numbered 0–47. Absolute addresses of SCMR are $1840_H\text{–}186F_H$. Byte structure is as follows:

| | | | |
|---|---|---|---|
| SDR | 0 | 0 | No. of assigned |

SDR Bit indicates Signalling Rec. Detector:

SDR=0 No signalling on line.

SDR=1 Signalling on line.

Channel numbers are 0–17H. 19H code means that line is not assigned to a channel. A line assigned to a channel means that the proper byte content in SCMR will be the channel number on which line is routed.

4.2 TABLES

4.2.1 ITTAB (Initialization Table)

This table is used for initialization of TLD. Each entry in ITTAB includes 4 bytes. Entry structure is as follows:

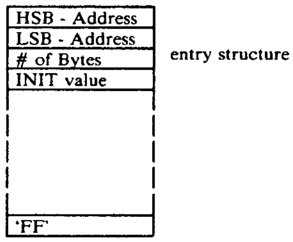

4.2.2 AKPTM (Ack Speech Timers)

AKPTM is a table of 24 timers for counting maximum wait time for speech ack. message. Each byte contains the timer of a channel. Default value '0'.

4.2.3 AKGTM (Ack. Signalling Timers)

AKGTM is a table of 24 timers for counting maximum wait time for signalling ack. message. Each byte contains the timer of a channel. Default value '0'.

4.2.4 SGWTM (Signalling Waiting Confirmation Timers)

SGWTM is queue of timers/flags for monitoring receiving signalling channels. Signalling ack. message is sent if TLD receives signalling on the proper line during max. 75 msec. from message reception. Default value '0'.

4.2.5 CRT (Cross Reference Table)

CRT table holds speech status and line assignment of all 48 lines. CRT includes 48 bytes, one for each line. Each byte's structure is:

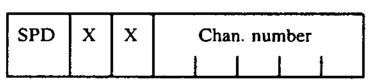

SPD=0.1—line is physically assigned

SPD=0—line is not physically assigned

Default value 1FH.

4.2.6 COMLT (Channel Status Table)

COMLT table holds channels status in transmit path. 24 bytes included in this table. Structure of byte is:

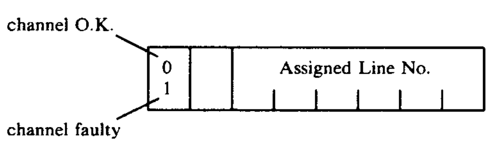

4.2.7 SCRT (Signalling Cross Ref. Table)

SCRT table holds signalling status and channel assignment of all 24 signalling M wire channels. SCRT includes 24 bytes, one for each TX channel. Byte structure:

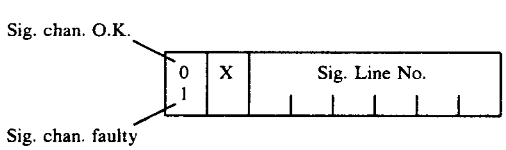

4.2.8 CMRl (Control Memory Receive Image)

CMRl table is an image of CMR table except that CMR has additional hardware functions as message output blanking.

4.2.9 GNPNT

GNPNT is a pointer table for fast sequential searching through tables of 24 bytes length. Each entry of GNPNT includes 2 bytes—LSH address of previous byte and LSH address of next byte in table under search.

Example for a table starting at address XXOO:

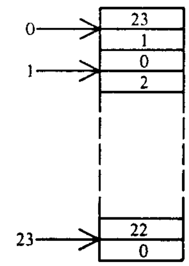

4.2.10 QUPNT

QUPNT is a pointer table for fast sequential searching through tables of 48 byte length. Principle of operation same as in 4.2.9.

4.2.11 SKRT

SKRT holds TX signalling status of 48 lines. SKRT includes 48 bytes. In each byte, 5 LSB bits hold the line assignment. 19H code means that line is not assigned.

MSB=1 means long signalling assignment

MSB=0 means usual signalling assignment 4.2.12 SKRIN

SKRIN holds RX signalling status of 24 channels. SKRIN includes 24 bytes, one for each channel. Each byte the 5 LSB hold the line assigned to the channel. 2MSB are '0'. 3FH code means no assignment on channel.

4.2.13 DBMST

DBMST includes 24 flags, one for each channel to indicate double message receiving. Flag is set on receiving a message and reset after 25 msec blanking delay.

4.2.14 USPCN

USPCN is a table of 24 counters, one for each channel. USGCN counter counts up for every speech ack. message not received during AKPTM timer count down, USPCN counter counts down to '0' for every speech ack. message received in time. If a USPCN counter arrives its max. value the channel is declared faulty.

4.2.15 USGCN

USGCN is the same as USPCN but for not received signalling ack. messages not received during AKGTM counting.

4.2.16 STDRV

STDRV is a driver table for STEXC.

STDRV includes several blocks, each containing 3 bytes. Each byte holds a parameter of the activated module. Some of the parameters are unused but they are written for uniform operation. End of table is indicated by one byte which contains 'FF'. Example of STDRV

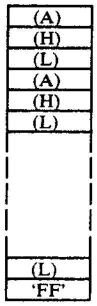

4.3 QUEUES 4.3.1 MSQUE (Message quene)

MSQUE contains all messages waiting for channel except signalling or speech assignment messages. MSQUE is a 64 byte FIFO. Messages in quene may be one or two bytes long, according to message type (see specification in 4.1.3.)

Pointers:

STQ—start of queue

ENQ—end of queue 4.3.2 FTRNK (Free Trunk Quene)

FTRNK contains all free of speech assignment trunks. The Queue is a 24 bytes FIFO and each byte contains a free trunk number.

Pointers:

STRNK—Start of Queue

ETRNK—End of Queue 4.3.3 PRBUF

PRBUF is a 64 byte buffer organized as a FIFO, used for printout characters to terminal.

Pointers:

STBUF—Start of Buffer

ENBUF—End of Buffer 4.3.4 QUSPA

QUSPA is a quene of trunks waiting for speech acknowledge message. Timers of AKPTM are incremented if respective trunk number is in QUSPA. Max. queue length is 24 bytes. Head of queue is constant.

Pointers:

EQUSP—End of QUSPA 4.3.5 QUSGA

QUSGA is a queue of signalling trunks waiting for signalling acknowledge message reception. Principle of operation is as described in4.3.4. MSB in each byte indicates type of signalling message—long signalling or usual.

Pointers:

EQUSG—End of quene 4.3.6 QUSGW

QUSGW is a quene of rec. signalling trunks waiting for signalling reception confirmation sending. Queue length is 24 bytes. Start of quene is constant.

Pointers:

EQUSW—End of queue 4.3.7 GSQUE

GSQUE contains signalling messages waiting for trunk.

GSQUE is a cyclic quene, working as a 24 byte FIFO.

Messages in que are of 1 byte or 2 bytes length depending on type.

Pointers:

STGQU—Start of queue

ENGSQ—End of queue 4.3.8 SPQUE

SPQUE contains speech messages waiting for trunk. Works as GSQUE (see 4.3.7)

Pointers:

STSPQ—Start of queue

ENSPQ—End of queue

4.4 INPUT 4.4.1 SPD FIFO (Speech Detector FIFO)

Input from SPD FIFO is a byte containing the line number on which change in speech level was detected (6 LSB) and another 2 bits R and E.

R=0—SPD off

R=1—SPD on

E=0—no echo

E=1—echo

Byte structure is:

| R | E | Line Number |
|---|---|---|

4.4.2 SDT FIFO (Signalling Detector FIFO)

Input from SDT FIFO is a byte containing the line number on which change is signalling was detected (6 LSB) and another 2 bits R and L.

R=0—signalling off

R=1—signalling on

L=0—usual signalling

L=1—long signalling Byte structure:

| R | L | Line Number |
|---|---|---|

4.4.3 MESSAGE RECEIVER

Input from MESSAGE REC. includes 2 or 3 bytes read from different I/O ports. First byte contents is the message (it may be 2 bytes long—see 4.1.3).

| TYPE | | 1st Byte |
|---|---|---|

| M8 | X | X | X | X | X | X | X | 2nd byte |
|---|---|---|---|---|---|---|---|---|

Third byte contains the channel number of received message.

This byte's structure is:

| X | X | SB | Chan. number |
|---|---|---|---|

SB=0—Rec. modem is frame synchronized

SB=1—Rec. modem is not frame synchronized

```
LOC  OBJ          SEQ        SOURCE STATEMENT

                    1        NAME    INIT
                    2 $LIST
                =   3 $INCLUDE(GNDAX)
                =   4 ; *** THIS IS THE ALLOCATION DETAILS OF THE RAM INCLUDING TABS QUE
                      S ETC
2000            =   5        ORG 2000H
0006            =   6 TS     EQU 6
2000            =   7 A0     EQU $
                =   8 ;      THIS IS THE SPEECH TX LINES CROSS R   TAB
0030            =   9 CRT:   DS 30H
2030 00         =  10 MSRCN: DB 00           ;NO-MESSAGE-RECEIVED TIMER
2031 00         =  11 MASKS: DB 0            ;STORAGE FOR CURRENT INTERRUPT MASK
2040            =  12        ORG    A0+64
                =  13 ;      THIS IS THE GENERAL MSG QUE
2040 01         =  14 MSQUE: DB 1,2,3,4,5,6,7,8
2041 02         =
2042 03         =
2043 04         =
2044 05         =
2045 06         =
2046 07         =
2047 08         =
2048 09         =  15        DB 9, 10, 11, 12, 13, 14, 15, 16
2049 0A         =
204A 0B         =
204B 0C         =
204C 0D         =
204D 0E         =
204E 0F         =
204F 10         =
2050 11         =  16        DB 17, 18, 19, 20, 21, 22, 23, 24
2051 12         =
2052 13         =
2053 14         =
2054 15         =
2055 16         =
2056 17         =
2057 18         =
0026            =  17        DS 38
207E 40         =  18 STQ:   DB LOW MSQUE    ; MSQUE HEAD POINTER
207F 57         =  19 ENQ:   DB LOW MSQUE+23 ; MSQUE TAIL POINTER
2080            =  20        ORG A0+128
001E            =  21 COMLT: DS 24+TS
20A0            =  22        ORG A0+160
                =  23 ;      THIS IS THE FREE SPEECH TRUNKS QUEUE
20A0 00         =  24 FTRNK: DB 0, 1, 2, 3, 4, 5, 6, 7
20A1 01         =
20A2 02         =
20A3 03         =
20A4 04         =
20A5 05         =
20A6 06         =
20A7 07         =
20A8 08         =  25        DB 8, 9, 10, 11, 12, 13, 14, 15
20A9 09         =
20AA 0A         =
20AB 0B         =
20AC 0C         =
20AD 0D         =
20AE 0E         =
20AF 0F         =
20B0 10         =  26        DB 16, 17, 18, 19, 20, 21, 22, 23
```

```
LOC  OBJ       SEQ       SOURCE STATEMENT

20B1 11        =
20B2 12        =
20B3 13        =
20B4 14        =
20B5 15        =
20B6 16        =
20B7 17        =
0006           =  27           DS TS
20BE A0        =  28 STRNK:  DB LOW FTRNK   ; FTRNK HEAD POINTER
20BF B7        =  29 ETRNK:  DB LOW FTRNK+23 ; FTRNK TAIL POINTER
20C0           =  30           ORG A0+0C0H
               =  31 ;
               =  32 ;         THIS IS THE LSD MSG ACK. TIMERS TAB
001E           =  33 LSDTM:  DS 30
20DE 00        =  34 QUHSK:        DB 0          ;QUEUES HOUSE KEEPING FLAG
0001           =  35 PFLAG:  DS 1    ;MONITOR FLAG
20E0 00        =  36 DMFLG:  DB 0    ;DUMMY MSG. FLAG
20E1 00        =  37 CETMR:  DB 0    ;FAULTY TRUNKS CHECK TIMER
20E2 FF        =  38 LSKBC:  DB 0FFH ;LAST KEYBOARD CHAR. STORAGE
20E3 00        =  39 DSFLG:  DB 0    ;DISPLAY FLAG
20E4 00        =  40 DSTMR:  DB 0    ;DISPLAY TIMER
20E5 00        =  41 SCTMR:  DB 0    ;1 SECOND TIMER
20E6 00        =  42 TSTMR:  DB 0    ;10 SECONDS TIMER
20E7 00        =  43 STTMR:  DB 0    ;SELF TEST TIMER
20E8 00        =  44 STFLG:  DB 0    ;SELF TEST FLAG
20E9 00        =  45 REHPN:  DB 0    ;LAST REHABILATED FAULTY TRUNK INDEX
2100           =  46           ORG A0+100H
2100           =  47 A1      EQU $
               =  48 ;         THIS IS THE SIG LINES CROSS REF TAB
2100 02        =  49 SKRT:   DB 2, 3, 4, 0, 6, 22, 23
2101 03        =
2102 04        =
2103 00        =
2104 06        =
2105 16        =
2106 17        =
001E           =  50           DS 30
2125 0F        =  51           DB 15, 17, 20, 21
2126 11        =
2127 14        =
2128 15        =
0006           =  52           DS 6
               =  53
2140           =  54           ORG A1+64
               =  55 ,         THIS IS THE MONITOR WORK
               =  56 MNBUF:
0002           =  57 INADD:  DS 2
0002           =  58 CM0:    DS 2
0002           =  59 CM3:    DS 2
0002           =  60 CM2:    DS 2
0002           =  61 CM1:    DS 2
0001           =  62 NBR:    DS 1
0002           =  63 BUFF1:  DS 2
0002           =  64 BUFF2:  DS 2
0001           =  65 CR1:    DS 1
0001           =  66 CR2:    DS 1
0001           =  67 PAC:    DS 1
0001           =  68 HEXST:  DS 1
0002           =  69 HEXED:  DS 2
0001           =  70 HFLAG:  DS 1
0001           =  71 ASCED:  DS 1
```

```
LOC  OBJ          SEQ          SOURCE STATEMENT

ØØØ6              =  72 ASCST:  DS 6
ØØØ1              =  73 BUFF3:  DS 1
215E 8ØØ9         =  74 SGPNR:  DW GNP8Ø         ;A POINTER FOR SIG. FREE TRUNK SEARCH
                  =  75
216Ø              =  76         ORG A1+96
                  =  77 ;       THIS IS THE TAB OF COUNTERS FOR FAULTY SIG TRUNKS
ØØ1E              =  78 USGCN:  DS 3Ø
217E ØØ           =  79 FISNM:  DB Ø             ;STORAGE FOR LINE # (FISGO)
217F ØØ           =  8Ø FI1FL:  DB Ø             ;STORAGE FOR FISGO (FISG1) ENTRY INDICATIO
                        N
218Ø              =  81         ORG A1+128
                  =  82 ;       THIS IS THE SIG TRUNKS CROSS REF TAB
ØØ1E              =  83 SCRT:   DS 3Ø
                  =  84
21AØ              =  85         ORG A1+16Ø
                  =  86 ;       THIS IS THE SPEECH CONTROL MEMORY RECEIVE IMAGE
ØØ1E              =  87 CMRI:   DS 3Ø
21CØ              =  88         ORG A1+ØCØH
                  =  89 ;       THIS IS THE LSD ON/OFF MEG ACK. TIMERS QUE
ØØ3Ø              =  9Ø QULST:  DS 3ØH
21FØ CØ           =  91 EQULS:  DB LOW QULST    ;QUE JAIL POINTER
22ØØ              =  92         ORG A1+1ØØH
22ØØ              =  93 A2      EQU $
                  =  94 ;       THIS IS THE SPEECK ACK TIMERS QUE
ØØ18              =  95 QUSPA:  DS 24
ØØØ6              =  96         DS TS
221E ØØ           =  97 EQUSP:  DB LOW QUSPA
222Ø              =  98         ORG A2+32
                  =  99 ;       THIS IS THE SIGN ACK TIMERS QUE
ØØ18              = 1ØØ QUSGA:  DS 24
ØØØ6              = 1Ø1         DS TS
223E 2Ø           = 1Ø2 EQUSG:  DB LOW QUSGA
224Ø              = 1Ø3         ORG A2+4ØH
                  = 1Ø4 ;       THIS IS THE TABLE OF SIG CONFIRMATION TIMERS
ØØ1E              = 1Ø5 SGWTM:  DS 3Ø
226Ø              = 1Ø6         ORG A2+96
                  = 1Ø7 ;       THIS IS A TABLE OF COUNTERS FOR FAULTY SP TRUNKS
ØØ1E              = 1Ø8 USPCN:  DS 3Ø
228Ø              = 1Ø9         ORG A2+128
                  = 11Ø ;       THIS IS A QUE FOR SIG ASSIGNMENTS
ØØ1E              = 111 GSQUE:  DS 3Ø
229E 8Ø           = 112 STGQU:  DB LOW GSQUE    ; GSQUE HEAD POINTER
229F 8Ø           = 113 ENGSQ:  DB LOW GSQUE    ; GSQUE TAIL POINTER
22AØ              = 114         ORG A2+ØAØH
ØØ1E              = 115 SCRIN:  DS 3Ø
23ØØ              = 116         ORG A2+1ØØH
23ØØ              = 117 A3      EQU $
                  = 118 ;       THIS IS THE SPEECH ASSIGNMENTS ACK TIMERS TAB
ØØ1E              = 119 AKPTM:  DS 3Ø
232Ø              = 12Ø         ORG A3+32
                  = 121 ;       THIS IS THE SIG ASSIGNMENTS ACK TIMERS TAB
ØØ1E              = 122 AKGTM:  DS 3Ø
233E ØØ           = 123 MSTXT:  DB Ø             ;TIMER FOR NO-MESSAGE-TRANSMITTED
238Ø              = 124         ORG A3+128
                  = 125 ;       THIS IS THE SPEECH ASS QUE
ØØ1E              = 126 SPQUE:  DS 3Ø
239E 8Ø           = 127 STSPQ:  DB LOW SPQUE    ; SPQUE HEAD POINTER
239F 8Ø           = 128 ENSPQ:  DB LOW SPQUE    ; SPQUE TAIL POINTER
ØØØ2              = 129 BRANC:  DS 2   ;BRANCH ADR. FOR MONIT GO COMMAND.
ØØØ1              = 13Ø CHRIN:  DS 1
24ØØ              = 131         ORG A3+1ØØH
Ø1ØØ              = 132 HEXTB:  DS 1ØØH ;MONITOR TABLE
```

```
LOC  OBJ          SEQ        SOURCE STATEMENT

Ø1ØØ              = 133 ASCTB:  DS 1ØØH ;MONITOR ASCII TAB
                  = 134
                  = 135
                  = 136 ;CONTROL MEMORIES
288Ø              = 137         ORG 288ØH
                  = 138 CMT:              ;SP CONT. MEM. TX
28AØ              = 139         ORG 28AØH
                  = 14Ø CMR:              ;SP CONT. MEM. RX
28ØØ              = 141         ORG 28ØØH
                  = 142 MSMEM:            ;MSG CONT. MEM.
2CØØ              = 143         ORG 2CØØH
                  = 144 SCMT:             ;SIG CONT. MEM. TX
2C4Ø              = 145         ORG 2C4ØH
                  = 146 SCMR:             ;SIG. CONT. MEM. RX
                  = 147
                  = 148
                  = 149
Ø9ØØ              = 15Ø         ORG 9ØØH
Ø9ØØ              = 151 DFX     EQU $
Ø94Ø              = 152         ORG DFX+64
Ø94Ø 41           = 153 GNP48:  DB 65, 66, 67, 68, 69, 7Ø, 71, 72
Ø941 42           =
Ø942 43           =
Ø943 44           =
Ø944 45           =
Ø945 46           =
Ø946 47           =
Ø947 48           =
Ø948 49           = 154         DB 73, 74, 75, 76, 77, 78, 79, 8Ø
Ø949 4A           =
Ø94A 4B           =
Ø94B 4C           =
Ø94C 4D           =
Ø94D 4E           =
Ø94E 4F           =
Ø94F 5Ø           =
Ø95Ø 51           = 155         DB 81, 82, 83, 84, 85, 86, 87. 88
Ø951 52           =
Ø952 53           =
Ø953 54           =
Ø954 55           =
Ø955 56           =
Ø956 57           =
Ø957 58           =
Ø958 59           = 156         DB 89, 9Ø, 91, 92, 93, 94, 95, 96
Ø959 5A           =
Ø95A 5B           =
Ø95B 5C           =
Ø95C 5D           =
Ø95D 5E           =
Ø95E 5F           =
Ø95F 6Ø           =
Ø96Ø 61           = 157         DB 97, 98, 99, 1ØØ, 1Ø1, 1Ø2, 1Ø3, 1Ø4
Ø961 62           =
Ø962 63           =
Ø963 64           =
Ø964 65           =
Ø965 66           =
Ø966 67           =
Ø967 68           =
Ø968 69           = 158         DB 1Ø5, 1Ø6, 1Ø7, 1Ø8, 1Ø9, 11Ø, 111,112
Ø969 6A           =
```

```
LOC  OBJ        SEQ        SOURCE STATEMENT

Ø96A 6B         =
Ø96B 6C         =
Ø96C 6D         =
Ø96D 6E         =
Ø96E 6F         =
Ø96F 7Ø         =
Ø97Ø 71         = 159       DB 113,114,115,116,117,118,119,12Ø
Ø971 72         =
Ø972 73         =
Ø973 74         =
Ø974 75         =
Ø975 76         =
Ø976 77         =
Ø977 78         =
Ø978 79         = 16Ø       DB 121,122,123,124,125,64
Ø979 7A         =
Ø97A 7B         =
Ø97B 7C         =
Ø97C 7D         =
Ø97D 4Ø         =
Ø98Ø            = 161       ORG DFX+128
Ø98Ø 81         = 162 GNP8Ø:  DB 129, 13Ø, 131, 132, 133, 134, 135, 136
Ø981 82         =
Ø982 83         =
Ø983 84         =
Ø984 85         =
Ø985 86         =
Ø986 87         =
Ø987 88         =
Ø988 89         = 163       DB 137, 138, 139, 14Ø, 141, 142, 143, 144
Ø989 8A         =
Ø98A 8B         =
Ø98B 8C         =
Ø98C 8D         =
Ø98D 8E         =
Ø98E 8F         =
Ø98F 9Ø         =
Ø99Ø 91         = 164       DB 145, 146, 147, 148, 149, 15Ø, 151, 152
Ø991 92         =
Ø992 93         =
Ø993 94         =
Ø994 95         =
Ø995 96         =
Ø996 97         =
Ø997 98         =
Ø998 8Ø         = 165       DB 128
Ø9AØ            = 166       ORG DFX+16Ø
Ø9AØ A1         = 167 GNP6Ø:  DB 161, 162, 163, 164, 165, 166, 167, 168
Ø9A1 A2         =
Ø9A2 A3         =
Ø9A3 A4         =
Ø9A4 A5         =
Ø9A5 A6         =
Ø9A6 A7         =
Ø9A7 A8         =
Ø9A8 A9         = 168       DB 169, 17Ø, 171, 172, 173, 174, 175, 176
Ø9A9 AA         =
Ø9AA AB         =
Ø9AB AC         =
Ø9AC AD         =
Ø9AD AE         =
Ø9AE AF         =
```

```
LOC  OBJ          SEQ         SOURCE STATEMENT

09AF B0           =
09B0 B1           = 169          DB 177, 178, 179, 180, 181, 182, 183, 184
09B1 B2           =
09B2 B3           =
09B3 B4           =
09B4 B5           =
09B5 B6           =
09B6 B7           =
09B7 B8           =
09B8 A0           = 170          DB 160
0A00              = 171          ORG DFX+100H
0A00              = 172 DFY      EQU $
0A80              = 173          ORG DFY+80H
0AA0              = 174          ORG DFY+160
0AA0 B8           = 175 GNP61:   DB 0B8H, 160, 161, 162, 163, 164,165, 166
0AA1 A0           =
0AA2 A1           =
0AA3 A2           =
0AA4 A3           =
0AA5 A4           =
0AA6 A5           =
0AA7 A6           =
0AA8 A7           = 176          DB 167, 168, 169, 170, 171, 172, 173, 174
0AA9 A8           =
0AAA A9           =
0AAB AA           =
0AAC AB           =
0AAD AC           =
0AAE AD           =
0AAF AE           =
0AB0 AF           = 177          DB 175, 176, 177, 178, 179, 180, 181, 182
0AB1 B0           =
0AB2 B1           =
0AB3 B2           =
0AB4 B3           =
0AB5 B4           =
0AB6 B5           =
0AB7 B6           =
0AB8 B7           = 178          DB 183
                  = 179 $INCLUDE(GNDEF)
                  = 180 ; *** MASKS EQUATES
                  = 181 ; INTERRUPTS MASK BITS
0001              = 182 RSTMB    EQU 01H ;RESET INT BIT
0002              = 183 M20MB    EQU 02H ;END OF MESSAGE BIT
0004              = 184 MSGMB    EQU 04H ;MESSAGE BIT
0008              = 185 MSTMB    EQU 08H ;MILI-SECOND BIT
0010              = 186 FIFMB    EQU 10H ;FIFO INT-BIT
0020              = 187 CRTMB    EQU 20H ;CRT CHAR. IN INT BIT
                  = 188
                  = 189
                  = 190 ; *** I/O EQUATES
0050              = 191 SMASK    EQU 50H ;INT MASK SETTING COM
0010              = 192 SNFIS    EQU 10H ;READ SPEACH FIFO FOR SENSE PURPOSE
0011              = 193 RDFIS    EQU 11H ;READ SPEACH FIFO
00E0              = 194 RDFIG    EQU 0E0H        ;READ SIG FIFO
0030              = 195 SHTSP    EQU 30H ;SHIFT OUT SP FIFO
00E1              = 196 SHTSG    EQU 0E1H        ;SHIFT OUT SIG. FIFO
0020              = 197 RDMS1    EQU 20H ;READ 1ST MSG BYTE
0040              = 198 RDTRK    EQU 40H ;READ TRUNK NUMBER FROM MSG RECEIVER
00A0              = 199 RDTRM    EQU 0A0H        ;READ TRUNK NUMBER OF 20 MS POST MSG INT.
00D0              = 200 PILOT    EQU 0D0H        ;READ PILOT STATUS
00E0              = 201 RXDY     EQU 0E0H        ;READ KEYBOARD CHAR.
                  = 202
```

```
LOC  OBJ        SEQ        SOURCE STATEMENT

                ; *** CONSTANTS EQUATES
ØØ8Ø            BØ       EQU 8ØH
ØØ4Ø            B1       EQU 4ØH
ØØ2Ø            B2       EQU 2ØH
ØØ1Ø            B3       EQU 1ØH
ØØØ8            B4       EQU Ø8H
ØØØ4            B5       EQU Ø4H
ØØØ2            B6       EQU Ø2H
ØØØ1            B7       EQU Ø1H
FFCØ            CMTDF    EQU NOT 3FH      ;CMT DEFAULT (DISCONNECT) VALUE
ØØFF            CMTXX    EQU ØFFH         ;CMT LOGIC CONSTANT (XOR WITH IT BEFORE WR
                ITE AND AFTER
                                          ,READ IN CMT)
ØØ19            SCMDF    EQU 19H ;SCMT DEFAULT (DISCONNECT) VALUE
ØØ19            SKRDF    EQU 19H ;SKRT DEFAULT (DISCONNECT) VALUE
ØØ3F            SCRDF    EQU 3FH ;SCRT DEFAULT (DISCONNECT) VALUE
ØØD5            BARK1    EQU 11Ø1Ø1Ø1B  ;1ST BARKER BYTE FOR MSMEM
ØØ3C            BARK2    EQU 1111ØØB    ;2ND BARKER BYTE FOR MSMEM
ØØ1E            ACKCP    EQU 3Ø  ;TIME CONSTANT (# OF CLOCK INT) FOR SPEECH ASSIGN
                ACK
ØØ1B            ACKCG    EQU 27  ;TIME CONSTANT (# OF CLOCK INT) FOR SIGNALLING ASS
                IGN ACK
ØØØ3            ACKCW    EQU 3   ; TIME CONSTANT  "        "   #  CONFIRMATION
ØØ1B            ACKCL    EQU 27  ;TIME CONSTANT ( "           " ) " LSD ON/OFF  ASS
                . ACK
ØØØ4            SPFCO    EQU 4   ;MAX FAULT COUNT VALUE FOR SP. TRUNKS
ØØØ4            SGFCO    EQU 4   ; "    "     "     "    "  SIG.  "
ØØ28            RXMSL    EQU 4Ø  ;MAX. NO MSG RX. TIME
ØØ27            TXMSL    EQU 39  ;MAX. NO MSG TX. TIME


ØØ18            GSQUL    EQU 24  ;SP/GS-QUE LENGTH-1 (=EFFECTIVE LENGTH)
ØØ98            GSLBT    EQU LOW SPQUE+GSQUL     ;END OF SP/GS-QUE VECTOR.


                ; *** ADDRESS EQUATES (MSH=MOST SIGNIFICANT HALF)
                ;                     (LSH=LEAST     "       "
ØØ2Ø            HBCRT    EQU HIGH CRT    ;MSH OF CRT ADR
ØØ28            HBCMT    EQU (HIGH CMT)  ;MSH OF CMT ADR
ØØ2Ø            HBCML    EQU HIGH COMLT  ;MSH OF COMLT ADR
ØØØØ            CMTBT    EQU LOW CMT AND ØEØH     ;MSBS OF LSH OF CMT ADR
ØØ8Ø            CMLBT    EQU (LOW COMLT AND ØEØH)        ;MSBS OF LSH OF COMLT ADR
ØØ21            HBSCR    EQU HIGH SCRT   ;MSH OF SCRT ADR
ØØ8Ø            SCRBT    EQU LOW SCRT AND ØEØH    ;MSCS OF LSH OF SCRT ADR
ØØ21            HBSKR    EQU HIGH SKRT   ;MSH OF SKRT ADR
ØØ6Ø            SKRBT    EQU LOW SKRT AND ØCØH    ;MSBS OF LSH OF SKRT ADR
ØØ2C            HBSCM    EQU HIGH SCMT   ;MSH OF SCMT ADR
ØØ2Ø            HBFTR    EQU HIGH FTRNK  ;MSH OF FTRNK ADR.
ØØAØ            FTRBT    EQU LOW FTRNK AND ØEØH   ;MSBS OF LSH OF FTRNK ADR.
ØØØØ            SCMBT    EQU LOW SCMT AND ØCØH    ;MSBS OF LSH OF SCMT ADR
ØØ2Ø            HBMSQ    EQU HIGH MSQUE  ;MSH OF MSQUE ADR
ØØØ9            HBP48    EQU HIGH GNP48  ;MSH OF GNP48 (POINTERSS TABLE) ADR
ØØ22            HBGSQ    EQU HIGH GSQUE  ;MSH OF GSQUE ADR
ØØØ9            HBP8Ø    EQU HIGH GNP8Ø  ;MSH OF GNP8Ø (POINTERS TABLE)
ØØØ9            HBP6Ø    EQU HIGH GNP6Ø  ;MSH OF GNP6Ø (    "        "    )
ØØØA            HBP61    EQU HIGH GNP61  ;MSH OF GNP61 (    "        "    )
ØØ23            HBSPQ    EQU HIGH SPQUE  ;MSH OF SPQUE
ØØ28            HBMSM    EQU HIGH MSMEM  ;MSH OF MSMEM (MESSAGE MEMORY)
ØØ6Ø            AKPBT    EQU LOW AKPTM AND ØEØH   ;MSBS OF LSH OF AKPTM ADR
ØØ23            HBAKP    EQU HIGH AKPTM  ;MSH OF AKPTM ADR
ØØ2Ø            AKGBT    EQU LOW AKGTM AND ØEØH   ;MSBS OF LSH OF AKGTM ADR
ØØ23            HBAKG    EQU HIGH AKGTM  ;MSH OF AKGTM ADR
```

```
LOC  OBJ            SEQ        SOURCE STATEMENT

0028              = 261 HBCMR   EQU HIGH CMR    ;MSH OF CMR ADR.
00A0              = 262 CMRBT   EQU (LOW CMR) AND 0E0H ;MSBS OF LSH OF CMR ADR.
0021              = 263 HBCNI   EQU HIGH CMRI   ;MSH OF CMRI ADR.
0023              = 264 HBAKP   EQU HIGH AKPTM  ;MSH OF AKPTM ADR.
0020              = 265 HBLSD   EQU HIGH LSDTM  ;MSH OF LSDTM ADR.
00C0              = 266 LSDBT   EQU LOW LSDTM AND 0E0H ;MSBS OF LSDTM ADR. LSH
0040              = 267 SGWBT   EQU LOW SGWTM AND 0E0H ;MSBS OF SGWTM ADR. LSH
                  = 268
                  = 269
                  = 270 $INCLUDE(ITTAB)
0AB9 0020         = 271 ITTAB:  DW A0   ; CLEAR RAM (NEXT 4 ITTAB ENTRIES ITTAB TO C)
0ABB 00           = 272         DB 0
0ABC 00           = 273         DB 0
0ABD 0021         = 274 AA:     DW (A0+100H)
0ABF 00           = 275         DB 0
0AC0 00           = 276         DB 0
0AC1 0022         = 277 AB:     DW (A0+200H)
0AC3 00           = 278         DB 0
0AC4 00           = 279         DB 0
0AC5 0023         = 280 AC:     DW (A0+300H)
0AC7 00           = 281         DB 0
0AC8 00           = 282         DB 0
                  = 283
                  = 284 ; FILL UP RAM TABLES WITH INITIALIZATION (DEFAULT) VALUES
0AC9 0020         = 285 G:      DW CRT  ; CRT DEFAULT VALUES
0ACB 30           = 286         DB 30H
0ACC 1F           = 287         DB 1FH
0ACD 8020         = 288 AH:     DW COMLT
0ACF 18           = 289         DB 24
0AD0 3F           = 290         DB 3FH
0AD1 8021         = 291 I:      DW SCRT
0AD3 18           = 292         DB 24
0AD4 3F           = 293         DB 3FH
0AD5 A021         = 294 J:      DW CMRI
0AD7 18           = 295         DB 24
0AD8 C0           = 296         DB 3FH XOR CMTXX
0AD9 A028         = 297 K:      DW CMR
0ADB 18           = 298         DB 24
0ADC C0           = 299         DB 3FH XOR CMTXX
0ADD 402C         = 300 AL:     DW SCMR
0ADF 30           = 301         DB 48
0AE0 19           = 302         DB 19H
0AE1 8028         = 303 AM:     DW CMT
0AE3 18           = 304         DB 24
0AE4 C0           = 305         DB 3FH XOR CMTXX
0AE5 C02C         = 306 N:      DW SCMT
0AE7 30           = 307         DB 48
0AE8 19           = 308         DB 19H
0AE9 0021         = 309 O:      DW SKRT
0AEB 30           = 310         DB 48
0AEC 19           = 311         DB 19H
0AED A022         = 312 P:      DW SCRIN
0AEF 18           = 313         DB 24
0AF0 3F           = 314         DB 3FH
0AF1 7E20         = 315 Q:      DW STQ
0AF3 02           = 316         DB 2
0AF4 40           = 317         DB LOW MSQUE
0AF5 BE20         = 318 Q1:     DW STRNK
0AF7 02           = 319         DB 2
0AF8 A0           = 320         DB LOW FTRNK
0AF9 9E22         = 321 R:      DW STGQU
0AFB 02           = 322         DB 2
```

```
LOC  OBJ          SEQ        SOURCE STATEMENT

0AFC 80         = 323         DB LOW GSQUE
0AFD 9E23       = 324 S:      DW STSPQ
0AFF 02         = 325         DB 2
0B00 00         = 326         DB LOW SPQUE
0B01 FF         = 327         DB 0FFH,0FFH     ;END OF TABLE INDICATION
0B02 FF         =
                  328         CSEG
                  329 $TITLE ('INIT')
                  330 ; *** THIS IS THE INITIALIZATION ROUTINE
                  331 ; *** INPUT: NONE
                  332 ; *** OUTPUT: INITIALIZED RAM (FLAGS, TIMERS,TABLES,QUEUES,POINTER
                      S),
                  333 ;                INITIALIZED HARDWARE
                  334
                  335 PUBLIC  INIT
                  336 EXTRN   INDRT,ONET1,TYOUT,MONIT,CRTIN,EXCML
                  337
                  338
                  339
0000 F3           340 INIT:   DI
0001 310000     S 341         LXI SP,STACK     ;INITIALIZE STACK
0004 CD0000     E 342         CALL ONET1       ; ASSIGN LINES TO RUNKS ON A 1 TO 1 BASIS
0007 21390A       343         LXI H,ITTAB      ; GET ADR OF INITIALIZATION DRIVER TABLE -
                       ITTAB
000A 5E           344 ITINT:  MOV E, M         ; GET LSH OF ADR OF VECTOR TO BE INITIALIZ
                      ED
000B 23           345         INX H
000C 56           346         MOV D,M          ; GET LSH     "        "        "
000D 14           347         INR D
000E CA2500     C 348         JZ NNITT         ; ZERO MEANS END OF ITTAB WAS REACHED
0011 15           349         DCR D            ; RESTORE DDR
0012 23           350         INX H
0013 46           351         MOV B,M          ; GET LENGTH OF VEC TO BE INIT
0014 23           352         INX H
0015 7E           353         MOV A,M          ; GET INIT (DEFAULT) VALUE
0016 EB           354         XCHG
0017 77           355 ITLOP:  MOV M, A         ; STORE INIT VALUE
0018 05           356         DCR B            ; COUNT
0019 CA2000     C 357         JZ NXVEC         ; JMP IF END OF VEC
001C 23           358         INX H            ; INCREMENT TO NEXT BYTE
001D C31700     C 359         JMP ITLOP
0020 EB           360 NXVEC:  XCHG
0021 23           361         INX H            ; CHECK NEXT ITTAB ENTRY
0022 C30A00     C 362         JMP ITINT
0025 3ECF         363 NNITT:  MVI A, 0CFH      ; INITIALIZE 8251 USART
0027 D3FF         364         OUT 0FFH         ; MODE
0029 D308         365         OUT 08H ; RESET PULSE-UNUSED
002B 3E15         366         MVI A,15H
002D D308         367         OUT 08H
002F 3E00         368         MVI A,LOW QUSPA ; INITIALIZE ALL TAIL-POINTER OF QUEUES
0031 321E22       369         STA EQUSP        ; WITH FIXED HEADS: QUSPA,QUSGA,QULST
0034 3E20         370         MVI A,LOW QUSGA
0036 323E22       371         STA EQUSG
0039 3EC0         372         MVI A,LOW QULST
003B 32F021       373         STA EQULS
003E 3EC0         374         MVI A,LOW QULST
0040 32F021       375         STA EQULS
0043 3E99         376         MVI A,99H
0045 329821       377         STA SCRT+24      ;CORRECTION TO PREVENT FAULTY USE OF 25TH
                      TRUNK
0048 329820       378         STA COMLT+24     ;    "        "        "
                      "
```

```
LOC  OBJ          SEQ        SOURCE STATEMENT

004B 21B720        379 FRILP:  LXI H, FTRNK+23 ;FILL FREE TRUNKS QUE WITH ALL TRUNKS
004E 0617          380         MVI B,23
0050 70            381 FRTLX:  MOV M,B
0051 2B            382         DCX H
0052 05            383         DCR B
0053 F25000    C   384         JP FRTLX
0056 3EA0          385         MVI A, LOW FTRNK
0058 32BE20        386         STA STRNK
005B 3ED8          387         MVI A, LOW FTRNK+24
005D 32BF20        388         STA ETRNK
0060 218089        389         LXI H,GNP80     ;INITIALIZE FREE-TRUNK-FOR-SIG. POINTER
0063 225E21        390         SHLD SGPNR
0066 218089        391         LXI H,GNP80     ;INITIALIZE POINTER FOR FREE TRUNKS SEARCH
                           FOR SIG. (BREAK IN)
0069 22E920        392         SHLD SEHPN
                   393 ;INITIALIZE TEMPORARY MONITOR MODULE
006C 210000    E   394         LXI H,CRTIN
006F 224021        395         SHLD INADD
0072 D3C0          396         OUT 0C0H
0074 AF            397         XRA A
0075 325121        398         STA PAC
0078 210000    E   399         LXI H,MONIT
007B 220023        400         SHLD BRANC
007E 210000        401         LXI H,00H
0081 225221        402         SHLD HEXST
0084 210000        403         LXI H,00H
0087 225621        404         SHLD ASCED
008A 210000        405         LXI H,0
008D 225521        406         SHLD HFLAG
                   407 ;RESET INTERRUPTS
0090 DB10          408         IN SNFIS
0092 DB11          409         IN RDFIS
0094 DBE0          410         IN RDFIG
0096 DB20          411         IN RDMS1
0098 DBA0          412         IN RDTRM
009A DB40          413         IN RDTRK
009C D330          414         OUT SHTSP
009E D3E1          415         OUT SHTSG
00A0 3EC9          416         MVI A,NOT (FIFMB+M20MB+MSGMB+CRTMB)
00A2 323120        417         STA MASKS
00A5 D350          418         OUT SMASK
00A7 FB            419         EI
00A8 CD0000    E   420 LOOP:   CALL TYOUT
00AB C30000    E   421         JMP EXCML
                   422 END

ASSEMBLY COMPLETE,  NO ERRORS

  LOC  OBJ          SEQ        SOURCE STATEMENT

                      1          NAME    FIFIP
                      2 $NOLIST
                    270 $LIST
                    271 CSEG
                    272          PUBLIC  FIFIQ
                    273          EXTRN   FISPO,FISPF,FISGO,FISGF,FLSDO,FLSDF
                    274
                    275 ; *** FIFIP HANDLES FIFO INTERRUPTS FROM SPD AND SDT
                    276 ; *** INPUT : FROM FIFO
                    277 ; *** OUTPUT : FIFO MESSAGE TO THE RELEVANT ROUTINE
                    278                  ; ENTER INT MACR
  0018              279 FIF1     EQU     FIFMB+MSTMB
Q 0000 656E80       280 FIFIQ:  ENINT            ;SAVE REGS AND PSW
 (    0)
```

```
LOC  OBJ          SEQ        SOURCE STATEMENT

E 0003 67677       281 FIFIP:  DISAB   FIF1
 ( 280)
                   282 ;
  0006 DB10        283         IN SNFIS        ;SENSE IF DATA IN SPFIFC
                   284 ;LHLD FISPN
                   285 ;MOV A,M
                   286 ;INR A
                   287 ;JZ CHSIO        ;DDDDDDDDDDDDDD
  0008 07          288         RLC             ;SET CARRY BIT IN PSW
  0009 DA2D00   C  289         JC CHSIG        ; NO DATA IN SP FIFO CHECK SIG
                   290 ;LHLD FISPN
                   291 ;MOV A,M
                   292 ;INX H
                   293 ;SHLD FISPN
  000C DB11        294         IN RDFIS        ;GET 1 BYTE FROM SP FIFO
  000E D330        295         OUT SHTSP       ;SHIFT OUT SP FIFO
  0010 5F          296         MOV E,A         ;
  0011 E61F        297         ANI NOT (B0+B1+B2)
  0013 FE2F        298         CPI 47          ;CHECK IF VALID DATA
  0015 D22600   C  299         JNC EFIFP       ;IF NOT VALID, SKIP HANDLING
  0018 7B          300         MOV A,E         ;RESTORE DATA IN ACC
  0019 B7          301         ORA A           ;CHECK OFF/ON BIT
  001A F22300   C  302         JP OFFSP        ;SPD OFF
  001D CD0000   E  303         CALL FISPO      ;SPD ON ROUTINE
  0020 C32600   C  304         JMP EFIFP
  0023 CD0000   E  305 OFFSP:  CALL FISPF      ;SPD OFF ROUTINE
  000C             306 FIF2    EQU MSGMB OR MSTMR
  0026 F3          307 EFIFP:  DI
E 0027 5D6E40      308         ENABL FIF2      ;ENABLE MESSAGE AND MS INT
 ( 281)
  002A C30300   C  309         JMP FIFIP
  002D 07          310 CHSIG:  RLC             ;CHECK SIG FIFO DATA BIT
  002E D23400   C  311         JNC CDSIG       ;YES HANDLE
Q 0031 F56F80      312         EXINT           ;NO, EXIT INT ROUTINE (MACRO)
 ( 308)
  0034 DBE0        313 CDSIG:  IN RDFIO        ;GET 1 BYTE FROM SIG FIFO
  0036 D3E1        314         OUT SHTSG       ;SHIFT OUT SG FIFO
  0038 5F          315         MOV E,A
  0039 E61F        316         ANI NOT (B0+B1+B2)
  003B FE2F        317         CPI 47          ;CHECK IF VALID DATA
  003D D22600   C  318         JNC EFIFP       ;IF NOT VALID, SKIP HANSLING.
  0040 7B          319         MOV A,E         ;RESTORE DATA IN ACC
  0041 B7          320         ORA A           ;CHECK OFF/ON BIT
  0042 F25700   C  321         JP OFFSG        ;SDT OFF
  0045 07          322         RLC
  0046 B7          323         ORA A           ;CHECK LSD (LONG SIG DETCTED) BIT
  0047 0F          324         RRC             ;RESTORE ACC
  0048 F25100   C  325         JP NOLSD        ;NOT LSD
  004B CD0000   E  326         CALL FLSDO      ;LSD ON ROUTINE
  004E C32600   C  327         JMP EFIFP       ;
  0051 CD0000   E  328 NOLSD:  CALL FISGO      ;SIG ON, ROUTE.
  0054 C32600   C  329         JMP EFIFP
  0057 07          330 OFFSG:  RLC
  0058 B7          331         ORA A           ;CHECK LSD BIT
  0059 0F          332         RRC             ;RESTORE AN
  005A F26300   C  333         JP NPLSD        ;NOT LSD
  005D CD0000   E  334         CALL FLSDF      ;LSP OFF RT
  0060 C32600   C  335         JMP EFIFP
  0063 CD0000   E  336 NPLSD : CALL FISGF      ;SIG OFF RT
  0066 C32600   C  337         JMP EFIFP
                   338 END

ASSEMBLY COMPLETE,
```

```
LOC  OBJ           SEQ     SOURCE STATEMENT

                                  NAME     FISPO
                           $NOLIST
                           $LIST
                                  CSEG
                           $TITLE ('FISPO-FIFIN')
                           ; *** FISPO HANDLES SPD MESSAGES CONCERNING DETECTION OF SP
                           ; *** INPUT: LINE # RIGHT-JUSTIFIED IN ACC/ FOR FISP2-LINE # IN B-
                              REG.
                           ; *** OUTPUT: SEND A MESSAGE OR ENTER MESSAGE IN QUE AND UPDATE CM
                              T
                           ;* NOTE: BAC STORAGE REGISTERS. DO NOT CHANGE IN ROUTINES CALLED:Z
                              CHEK,MSSND
                           ;
                           PUBLIC  FISPO,FISP1,FISP2
                           EXTRN   QUFTX,QUEIN,ZCHEK,MSSND
0000 E63F                  FISPO:  ANI NOT (B0+B1); CLEAR 2 MSB
0002 47                            MOV B,A           ;SAVE LINE # IN B
0003 6F                            MOV L,A           ;LINE # = INDEX IN CRTY
0004 2620                          MVI H,HBCRT       ;GET MSBS OF CRT ADR
0006 7E                            MOV A,M           ;GET CRT ENTRY CONTENTS
0007 57                            MOV D,A           ;SAVE CRT ENTRY CONTENTS
0008 FE1F                          CPI 1FH           ;IS IT ASSIGNED? (IF IT IS THEN TRUNK # IN
                              ACC)
000A CA2D00     C                  JZ NTASS          ;NOT ASSIGNED
000D B7                            ORA A             ;CHECK MSB I.E, IS LINE CONNECTED?
000E FA7800     C                  JM CONNX          ; CONNECTED
0011 5F                            MOV E,A           ;TRUNK # IN E
0012 F6C0                          ORI B0+B1         ;SET MSB #4 INDICATE CONNECTION AND B1 TO
                              INDICATE ACTIVITY
0014 77                            MOV M,A           ;UPDATE CRT
0015 E63F                          ANI NOT (B0+B1)   ;CLEAR MSB        ******1
0017 2628                          MVI H, HBCMT      ;GET MSB OF CMT ADR
0019 F680                          ORI CMTBT         ;SET CMT LSB MSB        *******1
001B 6F                            MOV L,A           ;SET CMT INDEX IN L
001C 3EFF                          MVI A,CMTXX       ;GET CMT LOGIC CONSTANT
001E A8                            XRA B             ;CONNECT LINE BY UPDATING CMT
001F 77                            MOV M,A           ;SET PROPER LOGIC AND STORE
0020 3E40                  CONNT:  MVI A,B1          ;CHECK IF LINE WAS  ACTIVE,I.E., IF TRUNK
                              NOT FREE
0022 A2                            ANA D
0023 C0                            RNZ               ;IF WAS ACTIVE,RETURN
0024 3E3F                          MVI A,NOT (B0+B1)      ;IF WAS NOT, INDICATE ACTIVE AND E
                              XTRACT FROM QUFTR
0026 A2                            ANA D             ;TRUNK # PROPER IN ACC
0027 CD0000     E                  CALL QUFTX        ;EXTRACT TRUNK FROM FREE TRUNKS QUE
002A C9                            RET               ;RETURN

                           FISP2:
                           NTASS:                    ;LINE NOT ASSIGNED TO A TRUNK. NEXT SECTIO
                              N
                                                     ;TRIES TO ASSIGN IT
002B 3A9E23                        LDA STSPQ         ;GET CONTENTS OF POINTER TO START OF SPQUE
002E 219F23                        LXI H,ENSPQ       ;GET ADR OF SPQUE TAIL POINTER INTO (H,L)
0031 BE                            CMP M             ;IS END = START
0032 78                            MOV A,B           ;LINE # (ASS MSG) IN ACC
0033 CA3B00     C                  JZ QUEMP          ;YES, QUE EMPTY
0036 78                    ENINQ:  MOV A,B
0037 CD0000     E                  CALL QUEIN        ;NO, ENTER MSG IN SPQUE
003A C9                            RET

003B CD0000     E          QUEMP:  CALL ZCHEK        ;SEARCH FOR A FREE TRUNK
003E C33600     C                  JMP ENINQ         ;NO FREE TRUNK
```

```
LOC  OBJ             SEQ        SOURCE STATEMENT

0041 4F              322               MOV C,A          ;SAVE FREE TRUNK # IN C
0042 F680            323 FISP1:        ORI CMLBT        ;
0044 6F              324               MOV L,A          ; LSH OF COMLT ADR. IN L-REG
0045 CD6C00     C    325               CALL NOTAX
0048 69              326               MOV L,C
0049 78              327               MOV A,B          ;LINE # (SPEECH ASS. MSG) IN ACC.
004A 1E00            328               MVI E,00H        ;CLEAR B9 OF MSG
004C CD0000     E    329               CALL MSSND       ;SEND MESSAGE
004F 79              330               MOV A,C          ;GET TRUNK # INTO ACC
0050 2620            331               MVI H, HBCRT     ;CREATE ADR OF CRT ENTRY IN (H,L)
0052 68              332               MOV L,B          ;LINE # IS INDEX IN CRT
0053 F6C0            333               ORI B0+B1        ;SET MSB TO INDICATE CONNECTION AND B1 TO
                     INDICATE LINE ACTIVE.
0055 77              334               MOV M,A          ;UPDATE CRT
0056 79              335               MOV A,C          ;GET TRUNK INTO ACC
0057 F680            336               ORI CMLBT        ;SET MSB OF COMLT LSH
0059 2620            337               MVI H, HBCML     ;CREATE ADR OF COMLT ENTRY IN (H,L)
005B 6F              338               MOV L,A          ;LSH OF COMLT ADR IN L
005C 7E              339               MOV A,M          ;GET PREVIOUS ASS.
005D FE3F            340               CPI 3FH          ;WAS THERE ONE ?
005F CA6A00     C    341               JZ NOTAS         ;IF NOT,SKIP.
0062 1620            342               MVI D,HBCRT      ;UPDATE CRT IN ORDER
0064 E63F            343               ANI NOT(B0+B1)   ;TO INDICATE
0066 5F              344               MOV E,A          ;TERMINATION OF PREVIOUS ASS.
0067 3E1F            345               MVI A,1FH        ;
0069 12              346               STAX D
006A 70              347 NOTAS:        MOV M,B          ;UPDATE COMLT (B CONTAINS LINE #)
006B C9              348               RET
006C 2628            349 NOTAX:        MVI H, HBCMT     ;CREATE CMT ENTRY ADR
006E 7E              350               MOV A,M          ;GET ENTRY CONTENTS
006F EEFF            351               XRI CMTXX        ;COMPENSATE FOR NEGATIVE LOGIC
0071 E680            352               ANI B0           ;LEAVE M-BIT ONLY AS ITIS
0073 B0              353               ORA B            ;INSERT LINE # IN ORDER TO ROUTE SPEECH
0074 EEFF            354               XRI CMTXX        ;SET CORRECT LOGIC
0076 77              355               MOV M,A          ;UPDATE CMT (SEND MESSAGE)
0077 C9              356               RET
                     357
0078 F640            358 CONNX:        ORI B1           ;INDICATE: LINE-ACTIVE
007A 77              359               MOV M,A          ;
007B C32E00     C    360               JMP CONNT        ;
                     361 END

ASSEMBLY COMPLETE,  NO ERRORS

LOC  OBJ             SEQ        SOURCE STATEMENT

                       1               NAME     FISPF
                       2 $NOLIST
                     271 $LIST
                     272 $TITLE ('FISPF-FIFIN')
                     273 ; *** FISPF HANDLES SPD MESSAGES CONCERNING DISAPPEARANCE OF SP
                     274 ; *** INPUT: LINE # RIGHT JUSTIFIED + INDICATION OF ECHO IN MSB, I
                         N ACC
                     275 ; *** OUTPUT: ENTER FREE TRUNK IN QUE OR ASSIGN SP IF WAITING
                     276 ; *NOTE: B&C STORAGE REGISTERS. DO NOT CHANGE IN ROUTINES CALLED:
                     277 ; QUSRH, QUEIX AND QUEOT
                     278 PUBLIC  FISPF
                     279 EXTRN   QUSRH,QUEIX,QUEOT,FISP1
0000 47              280 FISPF:  MOV B,A          ; SAVE LINE # + ECHO IND. IN B
0001 E63F            281         ANI NOT (B0+B1)  ; CLEAR 2 MSB
0003 5F              282         MOV E,A          ; SAVE
```

```
LOC  OBJ          SEQ        SOURCE STATEMENT

0004 4F            283          MOV L,A          ; LINE # = INDEX IN CRT
0005 2620          284          MVI H, HBCRT     ; GET MSBS OF CRT ADR
0007 7E            285          MOV A,M          ; GET ENTRY FROM CRT
0008 B7            286          ORA A
0009 F24300   C    287          JP NOTAS         ;JMP IF LINE NOT PHISYCALLY CONNECTED
000C E63F          288          ANI NOT (B0+B1)  ;TRUNK # PROPER IN ACC
000E 4F            289          MOV C,A          ; SAVE TRUNK# IN C
000F 78            290          MOV A,B          ; RESTORE ORIG. DATA
0010 E640          291          ANI B1           ; CHECK FOR ECHO
0012 CA2200   C    292          JZ NOECH         ; NO ECHO
0015 79            293          MOV A,C          ; TRUNK # IN A
0016 F680          294          ORI CHTBT        ; SET MSBS OF CMT ADR LSH
0018 5F            295          MOV E,A          ;
0019 1628          296          MVI D, HBCMT     ; (D&E) ADR OF ENTRY IN CMT
001B 3EC0          297          MVI A, CMTDF     ; GET CMT DEFAULT VALUE
001D 12            298          STAX D           ; DISCONNECT LINE
001E 7E            299          MOV A,M          ; GET CRT ENTRY
001F E67F          300          ANI NOT B0       ; CLEAR CONNECT # ON BIT
0021 77            301          MOV M,A          ; UPDATE CRT
0022 3E40          302 NOECH:   MVI A,B1         ;CHECK IF LINE WAS ACTIVE(TRUNK NOT FREE)
0024 A6            303          ANA M
0025 CA4300   C    304          JZ NOTAS         ;LINE FREE ALREADY(DOUBLE SP OFF)
0028 3EBF          305          MVI A,NOT B1     ;WAS ACTIVE,INDICATE NOT ACTIVE ANYMORE.
002A A6            306          ANA M
002B 77            307          MOV M,A          ;UPDATE CRT
002C 219F23        308          LXI H, ENSPQ     ; ADR OF SPQUE END POINTER IN (H,L)
002F 3A9E23        309          LDA STSPQ        ; START OF SPQUE IN ACC
0032 BE            310          CMP M            ; IS SPQUE EMPTY?
0033 C23B00   C    311          JNZ NOEMP        ; NOT EMPTY
0036 79            312          MOV A,C          ; EMPTY. TRUNK # IN ACC
0037 CD0000   E    313          CALL QUEIX       ; ENTER TRUNK # IN FREE TRUNK QUE
003A C9            314          RET              ; RETURN
003B CD0000   E    315 NOEMP:   CALL QUEOT       ; GET FIRST SP ASS FROM SPQUE
003E 47            316          MOV B,A          ; LINE # IN B
003F CD0000   E    317          CALL FISP1       ; ASS WAITING LINE
0042 C9            318          RET
0043 7D            319 NOTAS:   MOV A,L          ;LINE # (SP ASS) IN ACC.
0044 CD0000   E    320          CALL DUSRH                ;EXTRACT FROM SP IF EXISTS
0047 C9            321          RET
                   322 $EJECT

LOC  OBJ          SEQ        SOURCE STATEMENT

                     1          NAME    FISGO
                     2 $NOLIST
                   271 $LIST
                   272 $TITLE ('FISGO-FIFIN')
                   273 ; *** FISGO HANDLES SDT MESSAGES CONCERNING APPEARANCE OF SIG
                   274 ; *** INPUT: LINE # RIGHT JUSTIFIED IN ACC
                   275 ; *** OUTPUT: SEND A MESSAGE OR ENTER MESSAGE IN QUE
                   276 ;********NOTE:SCRT,COMLT&CMT, AND,SCMT&SKRT, MUST BE EQUALLY ALLIG
                       NED IN MEMORY
                   277 PUBLIC FISGO,FISG1
                   278 EXTRN ZVCHK,MSSND,QUEIG
0000 E63F          279 FISGO:   ANI NOT (B0+B1)          ; CLEAR 2 MSB
0002 327E21        280          STA FISNM                ; SAVE LINE #
0005 AF            281          XRA A                    ; CLEAR
0006 327F21        282          STA FI1FL                ; IND FISGO ENTRY IND
0009 3A7E21        283 FISGX:   LDA FISNM                ; RESTORE LINE #
000C 210021        284          LXI H, SKRT              ; GET ADR OF SKRT
000F 85            285          ADD L                    ; GET ADD OF ENTRY
0010 6F            286          MOV L,A
```

```
LOC  OBJ              SOURCE STATEMENT

0011 7E                       MOV A,M            ; GET SKRT ENTRY
0012 E63F                     ANI NOT (B0+B1)    ;
0014 FE19                     CPI 19H            ; IS LINE ALREADY ASSIGNED?
0016 C27400    C              JNZ LNASS          ; ASSIGN, SKIP ASSIGNING PROC.
0019 CD0000    E              CALL ZVCHK         ; SEARCH FOR A FREE TRUNK
001C C32300    C              JMP FRTNA          ; FREE TRUNK NOT AVAILABLE
001F 6F                       MOV L,A            ; FREE TRUNK AVAILABLE
0020 C35F00    C              JMP FRTAV
0023 0E18             FRTNA:  MVI C,24           ; SET COUNTER FOR FREE TRUNK SEARC
                      H
0025 2A5E21                   LHLD SGPNR         ; GET CONTENTS OF BREAK-IN SIG MSG
                       TRUNK
                                                 ; WHICH ACTUALLY POINTS TO GNPBP E
                      NTRY ADR
0028 1628                     MVI D,HBCMT        ; GET MSH OF CMT ADR
002A 6E               FRTNZ:  MOV L,M            ; GET INDEX OF NEXT ENTRY
002B 5D                       MOV E,L
002C 1A                       LDAX D             ; GET ENTRY CONTENTS FROM COMLT
002D EEFF                     XRI CMTXX          ;CHECK MSBS (M-BIT AND B-BIT) ,NEG
                      ATIVE LOGIC
002F E6C0                     ANI B0+B1          ;
0031 C28600    C              JNZ TRNFR          ; JMP IF TRUNK NOT FREE FOR MSG
0034 2621                     MVI H,HBSCR        ;GET SCRT ADR.
0036 7E                       MOV A,M            ;GET SCRT ENTRY CORRESPONDING TO T
                      RUNK #
0037 B7                       ORA A              ;
0038 2609                     MVI H,HBPB0        ;RESTORE POINTER TABLE ADR. IN (H,
                      L)
003A FA8600    C              JM TRNFR           ;
003D FE3F                     CPI 3FH            ; IF MSB=1 SIG TRUNK OUT OF ORDER
                                                 ; IS ANOTHER LINE ASSIGNED ON THIS
                       SIG TRUNK?
003F CA5100    C              JZ FNFRE           ; NO, TRUNK FREE FOR SIG
0042 162C                     MVI D,HBSCM        ;GET RESPECTIVE SCMT ENTRY
0044 5F                       MOV E,A            ;IN ORDER TO CHECK IF LINE IS CONN
                      ECTED.
0045 1A                       LDAX D             ;
0046 FE19                     CPI 19H            ;
0048 C28200    C              JNZ TRNFB          ;ENTRY=/ 19, LINE CONNECTED,NOT FR
                      EE.
004B 3E19                     MVI A,19H          ;TERMINATE LINE ASSIGNMENT BY UPDA
                      TING SKRT.
004D 2621                     MVI H,HBSKR        ;
004F 12                       STAX D             ;
0050 5D                       MOV E,L            ;
0051 1620             FNFRE:  MVI D,HBCML        ;GET MSH OF COMLT ADR.
0053 1A                       LDAX D
0054 B7                       ORA A              ;IS TRUNK FAULTY (B0=1) ?
0055 FA0400    C              JM TRNFY           ;JMP IF FAULTY
0058 225E21                   SHLD SGPNR         ;UPDATE LAST ASSIGNED TRUNK POINTE
                      R
005B 7D                       MOV A,L            ; GET TRUNK #
005C E61F                     ANI 1FH            ; CLEAR 3 MSB
005E 6F                       MOV L,A            ; TRUNK # INL
005F 3A7E21           FRTAV:  LDA FISNM          ; LINE # IN ACC (FREE TRUNK AVAILA
                      BLE)
0062 F640                     ORI B1             ; GENERATE SIG ASS MSG
0064 1E00                     MVI E,0            ;M9 OF MSG IS 0
0066 CD0000    E              CALL MSSND         ; SEND MSG
0069 3A7E21                   LDA FISNM          ; GET LINE #
006C F600                     ORI SKRBT          ; GENERATE INDEX FOR SKRT
006E 5F                       MOV E,A            ;
```

```
LOC  OBJ          SEQ       SOURCE STATEMENT

006F 1621         337       MVI D, HBSKR           ;
0071 7D           338       MOV A,L                ; GET TRUNK # INT O A
0072 12           339       STAX D                 ; UPDAT SKRT
0073 6B           340       MOV L,E                ;LINE # (INDEX INTO SCMT) IN L
0074 262C         341 LNASS: MVI H, HBSCM          ; GET MSH OF SCMT (ENTRY ADR IN (H
                      ,L))
0076 77           342       MOV M,A                ; UPDATE SCMT
0077 F680         343       ORI SCRBT
0079 6F           344       MOV L,A
007A 2621         345       MVI H, HBSCR           ; (H,L) CONTAINS ADR OF RESPECTIVE
                      ENTRY IN SCRT
007C 3A7E21       346       LDA FISNM              ; GET LINE #
007F 77           347       MOV M,A                ; UPDATE SCRT
0080 AF           348       XRA A                  ; CLEAR ACC
0081 C9           349       RET
0082 2609         350 TRNFB: MVI H,HDP80           ;
0084 1620         351 TRNFY: MVI D,HBCML           ;RESTORE ADR. OF CMT ENTRY IN (D,E
                      )
0086 0D           352 TRNFR: DCR C                 ;COUNT DOWN TRUNKS
0087 CA8D00    C  353       JZ TRNFX               ;NO MORE TRUNKS=NO FREE TRUNK
008A C32A00    C  354       JMP FRTNZ              ;GO CHECK NEXT TRUNK
                  355 TRNFX:
                  356                              ; TRUNK NOT FREE
008D 3A7F21       357       LDA FI1FL              ; GET ENTRY IND
0090 B7           358       ORA A
0091 C29D00    C  359       JNZ FIS1E              ; ROUTINE WAS INVOKED AT FISG1 ENT
                      RY ELSE:
0094 3A7E21       360       LDA FISNM              ; GET LINE #
0097 F640         361       ORI B1                 ;GENERATE SIG. MSG
0099 CD0000    E  362       CALL QUEIC             ; ENTER NEW ASS. SIG ASS QUE - GSQ
                      UE
009C C9           363       RET
009D 3EFF         364 FIS1E: MVI A,0FFH            ; INDICATE NO ASS IN ACC
009F C9           365       RET
00A0 E63F         366 FISG1: ANI NOT (B0+B1)
00A2 327E21       367       STA FISNM              ; SAVE LINE #
00A5 3EFF         368       MVI A,0FFH
00A7 327F21       369       STA FI1FL              ; INDICATE FISG1 ENTRY
00AA C39900    C  370       JMP FISGX
                  371 $EJECT

LOC  OBJ          SEQ       SOURCE STATEMENT

                    1       NAME    FISGF
                    2 $NOLIST
                  271 $LIST
                  272 $TITLE ('FISGF-FIFIN')
                  273 ; *** FISGF HANDLES SPD MESSAGES CONCERNING DISAPPEARANCE OF SIG
                  274 ; *** INPUT:  LINE # RIGHT JUSTIFIED IN ACC
                  275 ; *** OUTPUT :  UPDATE OF SCRT, SCMT
                  276 EXTRN QUESG
                  277 PUBLIC FISGF
0000 E63F         278 FISGF: ANI NOT (B0+B1)
0002 47           279       MOV B,A
0003 F600         280       ORI SKRBT              ; INSERT MSBS OF SKRT ADR LSH
0005 6F           281       MOV L,A
0006 2621         282       MVI H, HBSKR           ; CREATE ADR OF ENTRY IN SKRT IN (
                      H,L)
0008 7E           283       MOV A,M                ; GET CONTENTS OF RESPECTIVE ENTRY
0009 FE19         284       CPI SKRDF              ; WAS THE LINE ASSIGNED?
000B CA1A00    C  285       JZ LNNAS               ; NO
```

```
LOC  OBJ           SEQ          SOURCE STATEMENT

000E 262C           286          MVI H,HBSCM
0010 68             287          MOV L,B                   ;
0011 7E             288          MOV A,M                   ;WAS THE LINE CONNECTED?
0012 FE19           289          CPI 19H                   ;
0014 CA1A00    C    290          JZ LNNAS                  ;IF SCMT ENTRY IS 19, NOT CONNECTE
                        D.
0017 3619           291          MVI M, SCMDF              ; STORE DEFAULT VALUE (DISCONNECT
                        LINE)
0019 C9             292          RET
001A 78             293 LNNAS:   MOV A,B
001B F640           294          ORI B1                    ; CREATE SIG ASS MSG CODE
001D CD0000    E    295          CALL QUESG                ; EXTRACT RELEVANT ASS MSG FROM GS
                        QUE IF THERE
0020 C9             296          RET
                    297 END

ASSEMBLY COMPLETE.  NO ERRORS

LOC  OBJ           SEQ          SOURCE STATEMENT

                      1          NAME    FLSDO
                      2 $NOLIST
                    271 $LIST
                    272 $TITLE ('FLSDO-FIFIN')
                    273 ; *** THIS ROUTINE HANDLES HOOK-ON SIGNALLING
                    274 ; *** INPUT : NUMBER OF HOOK-ON LINE IN ACC
                    275 ; *** OUTPUT: MESSAGE INDICATING LINE ON-HOOK.
                    276 PUBLIC  FLSDO
                    277 EXTRN   QUEMS,ZVCK1,MSSND,QUQLS
0000 E63F           278 FLSDO:   ANI NOT (B0+B1) ; CLEAR 2 MSBS
0002 F5             279          PUSH PSW        ; SAVE LINE #
0003 CD0000    E    280          CALL ZVCK1      ; SEARCH FOR A FREE TRUNK TO SEND MSG ON
0006 C31300    C    281          JMP FLFNT       ; FOUND NO TRUNK
0009 6F             282          MOV L,A         ; FREE TRUNK # INL
000A F1             283          POP PSW         ; LINE # IN ACC
000B F680           284          ORI B0          ; GENERATE 1ST BYTE OF LDS ON (ON-HOOK SIG
                        ) IN ACC
000D 1E80           285          MVI E, B0       ; GENERATE 2ND BYTE OF LSD ON MSG
000F CD0000    E    286          CALL MSSND      ; SEND MSG
0012 C9             287          RET             ; RETURN TO POINT OF CALL
0013 F1             288 FLFNT:   POP PSW         ; NO TRUNK FOR MSG TX. GENERATE MSG (2 BYT
                        ES AS ABOVE)
0014 F680           289          ORI B0
0016 1E80           290          MVI E, B0
0018 CD0000    E    291          CALL QUEMS      ; ENTER MSG INTO GENERAL MSG QUE - MSQUE
001B C9             292          RET
                    293 $EJECT

LOC  OBJ           SEQ          SOURCE STATEMENT

                      1          NAME    FLSDF
                      2 $NOLIST
                    271 $LIST
                    272 $TITLE ('FLSDF-FIFIN')
                    273 ; *** THIS ROUTINE HANDLES END OF HOOK-ON SIGNALLING (HOOK-OFF)
                    274 ; *** INPUT: NUMBER OF HOOK-OFF LINE IN ACC
                    275 PUBLIC  FLSDF
                    276 EXTRN   ZVCK1,QUESH,MSSND,QUQLS,QUEMS
0000 E63F           277 FLSDF:   ANI NOT (B0+B1) ; CLEAR 2 MSBS
0002 F5             278          PUSH PSW        ; SAVE LINE #
```

```
LOC  OBJ          SEQ          SOURCE STATEMENT

0003 F680          279          ORI B0           ; GENERATE IN ACC AND E-REG LSD ON MSG IN
                           ORDER TO
0005 0680          280          MVI B,B0         ; NEUTRALIZE SUCH A MSG FROM MSQUE IF THER
                           E IS ONE
0007 CD0000    E   281          CALL QUESH       ; EXTRACTR LSD-ON MSG FROM MSQUE (NEUTRALI
                           ZE)
000A CD0000    E   282          CALL ZVCK1       ; LOOK FOR A FREE LINE TO TX MSG ON
000D C31A00    C   283          JMP FFNFT        ; NO SUCH TRUNK
0010 6F            284          MOV L,A          ; FREE TRUNK # IN L
0011 F1            285          POP PSW          ;RESTORE LINE# IN ACC
0012 F600          286          ORI B0           ; PREPARE LSD-OFF MSG IN ACC + E-REG
0014 1E00          287          MVI E,0
0016 CD0000    E   288          CALL MSSND       ; SEND MSG
0019 C9            289          RET
001A F1            290 FFNFT:   POP PSW          ; NO FREE TRUNK. GENERATE LSD-OFF MSG
001B F600          291          ORI B0
001D 1E00          292          MVI E,0
001F CD0000    E   293          CALL QUEMS       ; ENTER MSG INTO MSQUE (GENERAL MSG-QUE)
0022 C9            294          RET
                   295 $EJECT

LOC  OBJ          SEQ          SOURCE STATEMENT

                     1           NAME    QUEIN
                     2 $NOLIST
                   271 $LIST
                   272 $TITLE ('FIFIN-QUEIN')
                   273 ; *** QUEIN ENTERS A MESSAGE INTO SPQUE - THE SPEECH ASS MSG QUE
                   274 ; *** INPUT: THE SPEECH ASS MSG IN ACC
                   275 ; *** OUTPUT: MODIFIED SPQUE AND SPQUE TAIL-POINTER ENSPQ
                   276
                   277 PUBLIC  QUEIN
0000 219F23        278 QUEIN:  LXI H, ENSPQ    ; GETS ADR OF SPQUE TAIL POINTER
0003 5E            279         MOV E,M         ; GET FIRST EMPTY ENTRY INDEX
0004 1623          280         MVI D, HBSPQ    ; GET MSH OF SPQUE ADR
0006 12            281         STAX D          ; STORE MSG
0007 1609          282         MVI D, HBP80    ; GET MSH OF GNP80 (POINTERS TABLE) ADR
0009 1A            283         LDAX D          ; GET INDEX OF NEXT ENTRY IN GSQUE
000A 77            284         MOV M,A         ; UPDATE GSQUE TAIL-POINTER
000B 219E23        285         LXI H,STSPQ     ;GET ADR. OF HEAD POINTER
000E BE            286         CMP M           ;IS HEAD=TAIL?
000F C0            287         RNZ             ;IF NOPT,RETURN
0010 5F            288         MOV E,A         ;IF EQUAL,ADVANCE HEAD POINTER
0011 1A            289         LDAX D          ;
0012 77            290         MOV M,A         ;
0013 C9            291         RET
                   292 $EJECT

LOC  OBJ          SEQ          SOURCE STATEMENT

                     1           NAME    QUEIG
                     2 $NOLIST
                   270 $LIST
                   271           CSEG
                   272 $TITLE ('QUEIG-FIFIN')
                   273 ; *** QUEIG ENTERS A MESSAGE INTO GSQUE - THE SIG. ASS MSG QUE
                   274 ; *** INPUT: THE SIG ASS MSG IN ACC
                   275 ; *** OUTPUT: MODIFIED GSQUE AND GSQUE TAIL-POINTER ENGSQ
                   276
                   277 PUBLIC  QUEIG
```

```
LOC  OBJ          SEQ        SOURCE STATEMENT

0000 219F22        278 QUEIQ:  LXI H, ENGSQ    ; GET ADR OF ESQUE TAIL-POINTER
0003 5E            279         MOV E,M         ; GET FIRST EMPTY ENTRY INDEX
0004 1622          280         MVI D, HDGSQ    ; GET MSH OF GSQUE ADR
0006 12            281         STAX D          ; STORE MSG
0007 1609          282         MVI D, HBP80    ; GET MSH OF GNP80 (POINTERS TABLE) ADR
0009 1A            283         LDAX D          ; GET INDEX OF NEXT ENTRY IN GSQUE
000A 77            284         MOV M,A         ; UPDATE GSQUE TAIL-POINTER
000B 219E22        285         LXI H,STGQU     ;GET ADR OF HEAD POINTER
000E BE            286         CMP M           ;IS HEAD=TAIL?
000F C0            287         RNZ             ;IF NOT,RETURN
0010 5F            288         MOV E,A         ;IF EQUAL,ADVANCE HEAD POINTER
0011 1A            289         LDAX D          ;
0012 77            290         MOV M,A         ;
0013 C9            291         RET
                   292 $EJECT

LOC  OBJ          SEQ        SOURCE STATEMENT

                     1         NAME    QUEIX
                     2 $NOLIST
                   271 $LIST
                   272 $TITLE ('QUEIX-FIFIN')
                   273 ; *** QUEIX ENTERS A TRUNK # INTO ITRNK - THE FREE TRUNKS QUE
                   274 ; *** INPUT: A TRUNK # IN ACC
                   275 ; *** OUTPUT: MODIFIED FTRNK AND FTRND TAIL POINTER-ETRNK
                   276 ; ***NOTE: FOR THE TIME BEING - TRUNKS ARE NOT CHECKED FOR FAULT
                       BEFORE ENTERING
                   277
                   278 PUBLIC  QUEIX
0000 21BF20        279 QUEIX:  LXI H, ETRNK    ; GET ADR OF POINTER TO FIRST EMPTY ENTRY
                       IN FTRNK
0003 5E            280         MOV E,M         ; GET ENTRY INDEX
0004 1620          281         MVI D, HBFTR    ; GET MSH OF FTRNK ADR
0006 12            282         STAX D          ; STORE FREE TRUNK #
0007 1609          283         MVI D,HBP60     ; GET MSH OF GNP60 POINTERS TABLE ADR
0009 1A            284         LDAX D          ; GET INDEX OF NEXT ENTRY FROM POINTERS TA
                       BLE
000A 77            285         MOV M,A ; UPDATE POINTER TO FTRNK TAIL
000B C9            286         RET
                   287 $EJECT

LOC  OBJ          SEQ        SOURCE STATEMENT

                     1 NAME    QUEMS
                     2 $NOLIST
                   271 $LIST
                   272 $TITLE ('QUEMS-FIFIN')
                   273 ; *** QUEMS ENTERS A MESSAGE INTO THE GENERAL MESSAGES QUE - MSQUE
                   274 ; *** INPUT: MESSAGE CONTENTS IN ACC AND REG E (MSG LENGTH=2 BYTES
                       )
                   275 ; *** OUTPUT: MODIFIED MSQUE AND MSQUE - POINTER: ENQ
                   276
                   277 PUBLIC  QUEMS
0000 C5            278 QUEMS:  PUSH B
0001 D5            279         PUSH D
0002 E5            280         PUSH H
0003 47            281         MOV B,A          ; SAVE 1ST MSG BYTE
0004 F3            282         DI
0005 3A3120        283         LDA MASKS        ; GET CURRENT INT MASK
0008 F5            284         PUSH PSW         ; AND SAVE
E 0009 3E7770      285         DISAB MSGMB+MSTMB+FIFMB ; SPREVEN MSG, FIFO AND CLOCK INT
```

```
LOC  OBJ          SEQ        SOURCE STATEMENT

(   0)
004C 217F20        286       LXI H, ENQ       ; GET ADR OF MSQUE TAIL POINTER
000F 6E            287       MOV L,M          ; GET CONTENTS OF POINTER
0010 2620          288       MVI H, HBMSQ     ; GET MSH OF MSQUE ADR
0012 70            289       MOV M,B          ; STORE 1ST MSG BYTE
0013 2609          290       MVI H, HBP48     ;GET NEXT QUE BYTE INDEX
0015 6E            291       MOV L,M
0016 2620          292       MVI H, HBMSQ
0018 73            293       MOV M,E          ; STORE 2ND MSG BYTE
0019 2609          294       MVI H, HBP48
001B 7E            295       MOV A,M          ; GET NEXT QUE BYTE INDEX
001C 327F20        296       STA ENQ          ; UPDATE MSQUE TAIL POINTER
001F 5F            297       MOV E,A          ;SAVE NEW TAIL POINTER
0020 3A7E20        298       LDA STQ          ;GET HEAD POINTER CONTENTS
0023 BB            299       CMP E            ;IS IT EQ TO TAIL?
0024 C22D00   C    300       JNZ NTZ01        ;IF NOT EXIT QUENS
0027 3C            301        INR A           ;EQ., MOVE HEAD TAIL FORWARD TO PREVENT FA
                       LSE EMPTYING(HEAD=TAIL) OF QUEUE, 1ST MSG
0028 6F            302       MOV L,A          ;FIRST INR DOES NOT HAAVE TO BE VIA GNP80
0029 7E            303       MOV A,M          ;GET INDEX OF NEXT ENTRY FROM GNP80
002A 327E20        304       STA STQ          ;UPDATE HEAD POINTER
002D F1            305 NTZ01: POP PSW ; RESTORE INT MASK
002E F3            306       DI
002F 323120        307       STA MASKS
0032 D350          308       OUT SMASK
0034 FB            309       EI
0035 E1            310       POP H
0036 D1            311       POP D
0037 C1            312       POP B
0038 C9            313       RET
                   314 $EJECT

LOC  OBJ          SEQ        SOURCE STATEMENT

                     1         NAME     QMSOT
                     2 $NOLIST
                   271 $LIST
                   272 $TITLE ('QMSOT-FIFIN')
                   273 ; *** QMSOT EXTRACTS THE 1ST ENTRY FROM THE GENERAL MSG QUE - MSQU
                       E
                   274 ; *** INPUT: NONE
                   275 ; *** OUTPUT: THE EXTRACTED MSG IN ACC AND E-REG. MSQUE HEAD-POINT
                       ER STQ,
                   276 ; MODIFIED
                   277
                   278 PUBLIC  QMSOT
0000 E5            279 QMSOT:  PUSH H
0001 F3            280         DI
0002 3A3120        281         LDA     MASKS   ; SAVE CURRENT INT MASK
0005 F5            282         PUSH    PSW
E 0006 676770      283         DISAB   MSGMB+MSTMB+FIFMB ; PREVENT MSG, FIFO AND CLOCK IN
                       T
(   0)
0009 2620          284        MVI     H,HBMSQ ; GET MSH OF MSQUE ADR
000B 3A7E20        285        LDA     STQ     ; GET HEAD POINTER VALUE
000E 6F            286        MOV     L,A     ; ADR OF 1ST ENTRY IN (H,L)
000F 4E            287        MOV     C,M     ; GET 1ST BYTE OF MSG
0010 2C            288        INR     L
0011 5E            289        MOV     E,M     ; GET 2ND BYTE OF MSG
0012 3E7D          290        MVI     A,LOW MSQUE-61
```

```
LOC  OBJ          SEQ          SOURCE STATEMENT

0014 BD            291          CMP     L        ; IS 2ND EXTRACTED BYTE INDEX EQ. TO LAST
                      BYTE OF VEC.
0015 7D            292          MOV     A,L
0016 C21B00   C    293          JNZ     QNSXX    ; IF
0019 3E3F          294          MVI     A,(LOW MSQUE)-1 ; RESET STQ TO 1ST BYTE OF VEC.
001B 3C            295 QNSXX:   INR     A
001C 327E20        296          STA     STQ      ; UPDATE HEAD-POINTER
001F F1            297          POP     PSW      ; RESTORE INT MASK
0020 F3            298          DI
0021 323120        299          STA     MASKS
0024 D350          300          OUT     SMASK
0026 FB            301          EI
0027 79            302          MOV     A,C
0028 E1            303          POP H
0029 C9            304          RET
                   305 END

ASSEMBLY COMPLETE

LOC  OBJ          SEQ          SOURCE STATEMENT

                     1          NAME    QUQKP
                     2 $NOLIST
                   271 $LIST
                   272 $TITLE ('QUQKP-FIFIN')
                   273 ; *** QUQKP ENTERS A TIMER INDEX INTO THE SP ASS ACK TIMERS QUE-QU
                      SPA
                   274 ; *** QUQGT    "        "        "    SIG    "     "     " -QU
                      SGA
                   275 ; ***  QUQLS   "        "        "   , LSD    "     "     " -QULST
                   276 ; *** INPUT: THE TIMER'S INDEX IN ACC
                   277 ; *** OUTPUT: MODIFIED QUSPA AND QUSPA TAIL-POINTER EQUSP
                   278 ; ***                    "       QUSGA        "        EQUSG
                   279 ; ***                    "        QULST       "         EQULS
                   280
                   281 PUBLIC  QUQKP,QUQGT,QUQLS
0000 F5            282 QUQKP:  PUSH PSW
0001 E5            283         PUSH H
0002 111E22        284         LXI D, EQUSP     ; GET ADR OF QUSPA TAIL-POINTER
0005 0617          285         MVI B,LOW QUSPA+23      ;GET END OF VECTOR(NOT TAIL)
0007 C5            286         PUSH B           ;SAVE END OF VECTOR INDEX
0008 47            287         MOV B,A          ;SAVE TIMER INDEX
0009 0E80          288         MVI C,B0               ;SET HOUSEKEEPING FLAG D0 FOR QUSP
                      A
000B 210022        289         LXI H,QUSPA            ;GET ADR OF SP TIMERS QUEUE
000E 3ADE20        290 QUQXX:  LDA QUHSK              ;GET QUES HOUSEKEEPING FLAG
0011 B1            291         ORA C                  ;UPDATE FLAG
0012 32DE20        292         STA QUHSK
0015 0E64          293         MVI C,100              ;INDICATE THAT TIMER WAS NOT YET I
                      NSERTED-C-REG
                   294                                ;SERVES AS INDICATOR IN THIS LOOP.
0017 C32C00   C    295         JMP NOTNY              ;
001A 7E            296 MBWAB:  MOV A,M                ;GET ENTRIES CONTENTS(M POINTS TO
                      TIMERS QUE)
001B B8            297         CMP B                  ;IS TIMER INDEX ALREADY IN QUE ?
001C CA4100   C    298         JZ RETRN               ;IF ALREADY IN,RETRN.
001F 3C            299         INR A                  ;NOT A MATCH, IS IT A NEUTRALIZED
                      ENTRY('FFH') ?
0020 C22B00   C    300         JNZ NOTNT              ;
0023 0C            301         INR C                  ;IT IS A NEUTRAL, WAS TIMER ALREAD
                      Y INSERTED (C=FFH) ?
```

```
LOC  OBJ         SEQ         SOURCE STATEMENT

0024 CA2A00   C   302           JZ NOTHX                ;YES,SKIP.
0027 70           303           MOV M,B                 ;NO,INSERT TIMER`S INDEX
0028 0E00         304           MVI C,00                ;INDICATE INSERTION IN C-REG
002A 0D           305 NOTNX:    DCR C                   ;RESTORE INDICATOR VALUE
002B 2C           306 NOTNT:    INR L                   ;ADVANCE SEARCH POINTER
002C 1A           307 NOTNY:    LDAX D                  ;GET END OF VEC INDEX
002D BD           308           CMP L                   ;END OF QUEUE ALREADY?
002E C21A00   C   309           JNZ MBWAB               ;NO,KEEP SEARCHING
0031 0C           310           INR C                   ;WAS TIMER INSERTED
0032 CA4700   C   311           JZ RETRX                ;IF WAS, GO TO RETRX
0035 70           312           MOV M,B                 ;STORE TIMER`S INDEX
0036 F1           313           POP PSW                 ;END OF VECTOR IN C
0037 BD           314           CMP L                   ;IS TAIL=END OF VEC.
0038 CA3E00   C   315           JZ NIGMR                ;IF TRUE,DO NOT UPDATE TAIL
003B 7D           316           MOV A,L
003C 3C           317           INR A                   ;NO,ADVANCE TAIL POINTER
003D 12           318           STAX D
003E C34800   C   319 NIGMR:    JMP RETRY
0041 0C           320 RETRN:    INR C                   ;WAS TIMER INSERTED
0042 C24700   C   321           JNZ RETRX               ;IF NOT GO TO RETRX
0045 0D           322           DCR C                   ;RESTORE INDICATOR VALUE
0046 71           323           MOV M,C                 ;NEUTRALIZE ENTRY
0047 F1           324 RETRX:    POP PSW
0048 E1           325 RETRY:    POP H
0049 F1           326           POP PSW
004A C9           327           RET
004B F5           328 QUQGT:    PUSH PSW
004C E5           329           PUSH H
                  330                           ; GET PARAMETERS FOR QUSGP
004D 113E22       331           LXI D, EQUSG    ; GET ADR OF QUSGA TAIL-POINTER
0050 0637         332           MVI B,LOW QUSGA+23      ;GET END OF VEC. INDEX
0052 C5           333           PUSH B          ;SAVE END OF VEC IND.
0053 47           334           MOV B,A
0054 0E40         335           MVI C,B1                ;HOUSE KEEPING BIT FOR QUSGA
0056 212022       336           LXI H,QUSGA             ;GET ADR OF QUEUE
0059 C30E00   C   337           JMP QUQXX
                  338
005C F5           339 QUQLS:    PUSH PSW
005D E5           340           PUSH    H
005E 11F621       341           LXI D,EQULS
0061 06EF         342           MVI B,LOW QULST+47
0063 C5           343           PUSH B
0064 47           344           MOV B,A
0065 0E10         345           MVI C,B3
0067 21C021       346           LXI H,QULST
006A C30E00   C   347           JMP QUQXX
                  348 END

ASSEMBLY COMPLETE,  NO ERRORS


LOC  OBJ         SEQ         SOURCE STATEMENT

                    1           NAME    QUIOX
                    2 $NOLIST
                  271 $LIST
                  272 $TITLE ('QUIOX/Y/Z-FIFIN')
                  273 ; *** QUIOX(Y/Z) NEUTRALIZE POINTERS TO TIMERS IN THE QUEUES. QUSP
                      A, QUSGA
                  274 ; *** AND QUSGW RESPECTIVELY, BY INSERTING 'FF' IN AN ENTRY MATCHI
                      NG THE
```

```
LOC  OBJ          SEQ        SOURCE STATEMENT

                  275 ; *** INPUT INDEX (BY CONTENTS)
                  276 ; *** INPUT: CONTENTS OF ENTRY TO BE NEUTRALIZED
                  277 ; *** OUTPUT: MODIFIED ENTRY IF FOUND
                  278
                  279 PUBLIC  QUIOX,QUILS,QUIOY
                  280 QUIOX:                     ; GET PARAMETERS FOR QUSPA
0000 211E22       281         LXI     H,EQUSP ; ADR OF TAIL-POINTER IN (H,L)
0003 110022       282         LXI     D,QUSPA ; ADR OF QUE HEAD IN (D,E)
0006 C31800   C   283         JMP     QUIAA
0009 21F021       284 QUILS:  LXI H,EQULS     ;GET PARAMETERS FOR QULST
000C 11C021       285         LXI D,QULST
000F C31800   C   286         JMP QUIAA
                  287 QUIOY:                     ; GET PARAMETERS FOR QUSGA
0012 213E22       288         LXI     H,EQUSG
0015 112022       289         LXI     D,QUSGA
0018 4F           290 QUIAA:  MOV     C,A     ; SAVE INDEX TO BE MATCHED
0019 7B           291         MOV     A,E
001A BE           292         CMP     M       ; IS IT THE QUE-TAIL?
001B C8           293         RZ              ; YES, END SEARCH
001C 1A           294         LDAX    D       ; GET CONTENTS OF QUE ENTRY
001D B9           295         CMP     C       ; A MATCH?
001E CA2500   C   296         JZ      TJBMS   ; YES
0021 1C           297         INR     E       ; NO, CHECK NEXT ENTRY
0022 C31900   C   298         JMP     QUIAA+1
0025 3EFF         299 TJBMS:  MVI     A,0FFH  ; NEUTRALIZE MATCHING ENTRY
0027 12           300         STAX    D       ; BY INSERTING FF
0028 C9           301         RET
                  302 $EJECT

LOC  OBJ          SEQ        SOURCE STATEMENT

                    1           NAME    QUEOT
                    2 $NOLIST
                  271 $LIST
                  272 $TITLE ('QUEOT-FIFIN')
                  273 ; ***.QUEOT EXTRACTS THE 1ST MESSAGER FROM THE SP ASS QUE - SPQUE
                  274 ; *** QUEGT EXTRACTS THE 1ST MESSAGE FROM THE SIG  ASS QUE - GQUUE
                  275 ; *** INPUT: NONE
                  276 ; OUTPUT: THE EXTRACTED MSG IN ACC. THE RELEVANT QUE AND QUE HEAD-
                      POINTER
                  277 ;         MODIFIED
                  278
                  279 PUBLIC  QUEOT,QUEGT
0000 C5           280 QUEOT:  PUSH B             ;SAVE B&C
0001 3A9E23       281         LDA STSPQ          ; GET ADR OF FIRST ENTRY IN SPQUE
0004 6F           282         MOV L,A            ; GET INDEX OF HEAD OF SPQUE
0005 0E9E         283         MVI C, LOW STSPQ; SAVE LSH OF STSPQ ADR
0007 2623         284         MVI H, HBSPQ       ; GET MSH OF SPQUE ADR
0009 C31500   C   285         JMP QUEYY
                  286
000C C5           287 QUEGT:  PUSH B             ;SAVE B&C
000D 3A9E22       288         LDA STGQU          ; GET ADR OF FIRST ENTRY IN GSQUE
0010 6F           289         MOV L,A            ; GET INDEX OF HEAD OF GSQUE
0011 2622         290         MVI H, HBGSQ       ; GET MSH OF GSQUE ADR
0013 0E9E         291         MVI C, LOW STGQU; SAVE LSH OF STGSQ ADR
0015 1609         292 QUEYY:  MVI D, HBP80       ; GET MSH OF GNP80 ADR
0017 46           293         MOV B,M            ; GET CONTENTS OF 1ST ENTRY
0018 5D           294         MOV E,L            ; GENERATE RESPECTIVE ENTRY ADR IN GNP
0019 1A           295         LDAX D  ; GET INDEX OF NEXT Q ENTRY
001A 69           296         MOV L,C            ; RESTORE ADR OF QUE HEAD POINTER
```

```
LOC  OBJ            SEQ        SOURCE STATEMENT

001B 77              297         MOV M,A          ; UPDATE QUE HEAD-POINTER ADR
001C 78              298         MOV A,B          ; PREPARE OUTPUT
001D C1              299         POP B            ;RESTORE B&C
001E C9              300         RET
                     301 $EJECT

LOC  OBJ            SEQ        SOURCE STATEMENT

                       1         NAME      QUESH
                       2 $NOLIST
                     271 $LIST
                     272 $ TITLE ('QUESH-FIIFIN')
                     273 ; *** QUESH SEARCHES FOR A GIVEN MSG (2 BYTES) IN THE GENER MSG QU
                         E - MSQUE
                     274 ; *** IF SUCH A MSG IS FOUND IT IS EXTRACTED AND THE QUE AND ITS P
                         OINTERS
                     275 ; *** MODIFIED
                     276 ; *** INPUT: A MSG CONTENTS IN ACC AND B-REG
                     277 ; *** OUTPUT: MODIFIED MSQUE, ENQ, STQ
                     278
                     279 PUBLIC QUESH
0000 4F              280 QUESH:  MOV     C,A      ; SAVE MSH OF MSG
0001 1620            281         MVI     D,HBMSQ  ; GET MSH OF MSQUE ADR
0003 3A7E20          282         LDA     STQ      ; GET INDEX OF MSQUE HEAD
0006 217F20          283         LXI     H,ENQ    ; GET ADR OF MSQUE TAIL-POINTER (TO INITIA
                         LIZE SEARCH POINTER)
0009 BE              284 SLOOP:  CMP     M        ; HEAD=TAIL=POINTER
000A C8              285         RZ               ; YES, END SEARCH
000B 5F              286         MOV     E,A      ; IN (D,E) ADR OF ENTRY IN MSQUE TO BE COM
                         PARED
000C 79              287         MOV     A,C      ; RESTORE MSH OF MSG IN ACC
000D EB              288         XCHG             ; IN (H,L) ADR OF ENTRY BEING COMPARED, IN
                          (D,E) ADR OF TAIL
000E BE              289         CMP     M        ; MSG=ENTRY (MSH)?
000F CA2300     C    290         JZ      FNDMB    ; YES, GO CHECK LSH
0012 EB              291 COMPI:  XCHG             ; IN (H,L) ADR OF MSQUE TAIL POINTER
0013 7B              292         MOV     A,E      ; GET SEARCH POINTER
0014 FE7D            293         CPI     LOW MSQUE+61     ; IS IT LAST BYTE OF MSQUE VECTOR?
0016 CA1E00     C    294         JZ      RESSP    ; YES, RESET SEARCH POINTER
0019 C602            295         ADI     02H      ; NO, INCREMENT POINTER
001B C30900     C    296         JMP     SLOOP    ; CHECK NEXT ENTRY
001E 3E40            297 RESSP:  MVI     A,LOW MSQUE      ; GET LSH OF MSQUE
0020 C30900     C    298         JMP     SLOOP
0023 78              299 FNDMB:  MOV     A,B      ; CHECK 2'ND MSG BYTE
0024 2C              300         INR     L        ; MOVE SEARCH POINTER TO 2'ND BYTE OF MSG
0025 BE              301         CMP     M        ; EQUAL?
0026 CA2D00     C    302         JZ      FOUN1    ; YES, FOUND ENTRY, EXTRACT
0029 2D              303         DCR     L        ; NO, SEARCH ON
002A C31200     C    304         JMP     COMPI
002D 2D              305 FOUN1:  DCR     L        ; IN ORDER NOT TO PREVENT MSG INT WHILE EX
                         TRACTING ENTRY
002E 36FF            306         MVI     M,0FFH   ; AN ILLEGAL MSG CODE (IF) IS STORED INTO
                         THE 1ST BYTE
0030 C31200     C    307         JMP     COMPI
                     308 $EJECT
```

```
LOC  OBJ          SEQ        SOURCE STATEMENT

                    1          NAME     QUESO
                    2 $NOLIST
                  271 $LIST
                  272 $TITLE ('QUESG, QUSRH-FIFIN')
                  273 ; *** QUESG (QUSRH) SEARCHES FOR A GIVEN MSG (1 BYTE) IN THE SIGNA
                      LLING (SPEECH
                  274 ; *** ASSIGNMENTS QUE GSQUE (SPQUE)). IF SUCH A MSG IS FOUND, IT I
                      S EXTRACTED
                  275 ; *** AND THE QUE AND  ITS POINTERS MODIFIED
                  276 ; *** INPUT: A MSG CONTENTS IN ACC.
                  277 ; *** OUTPUT: MODIFIED GSQUE (SPQUE),STGQU(STSPQ),ENGSQ(ENSPQ).
                  278 ; *** NOTE: THIS ROUTINE IS DEPENDENT OF SPQUE AND SPQUE BEING ALL
                      IGNED ON THE
                  279 ;         SSAME LSH ADRESS (2ND BYTE OF 1ST BYTE ADR MUST BE EQUAL)!
                      !!
                  280
                  281 PUBLIC  QUESG,QUSRH
                  282 EXTRN   MOVE1,MOVE2
0000 4F           283 QUESG:  MOV     C,A      ; SAVE MSG
0001 1622         284         MVI     D,HBGSQ  ; GET MSH OF GSQUE ADR
0003 3A9E22       285         LDA     STGQU    ; GET GSQUE HEAD POINTER
0006 219F22       286         LXI     H,ENGSQ  ; GET ADR OF GSQUE TAIL POINTER
0009 C31500    C  287         JMP     QUEZZ
000C 4F           288 QUSRH:  MOV     C,A      ; SAVE MSG
000D 1623         289         MVI     D,HBSPQ  ; GET MSH OF SPQUE ADR
000F 3A7E23       290         LDA     STSPQ    ; GET SPQUE HEAD POINTER
0012 219F23       291         LXI     H,ENSPQ  ; GET SPQUE TAIL POINTER ADR
0015 BE           292 QUEZZ:  CMP     M        ; IS HEAD=TAIL=POINTER?
0016 C8           293         RZ               ; YES, END SEARCH
0017 5F           294         MOV     E,A      ; IN (D,E) ADR OF QUE ENTRY TO BE COMPARED
0018 79           295         MOV     A,C      ; RESTORE MSG IN ACC
0019 EB           296         XCHG             ; IN (H,L) ADR OF ENTRY BEING COMPARED, IN
                       (D,E) ADR OF
                  297                          ; TAIL POINTER
001A BE           298         CMP     M                 ; IS MSG = ENTRY
001B CA2F00    C  299         JZ      FOUEN    ; YES, GO TO EXTRACT
001E 3E98         300 CMPIT:  MVI     A,GSLBT  ; GET LSH OF LAST QUE VEC BYTE ADR (SEE NO
                      TE!!!)
0020 BD           301         CMP     L        ; EQUAL TO CURRENT ENTRY?
0021 7D           302         MOV     A,L      ; INDEX OF CURRENT ENTRY IN ACC
0022 EB           303         XCHG             ; TRAIL POINTER ADR IN (H,L)
0023 CA2A00    C  304         JZ      RSTSP    ; YES, RESET SEARCH POINTER
0026 3C           305         INR     A        ; INCREMENT SEARCH POINTER
0027 C31500    C  306         JMP     QUEZZ
002A 3E80         307 RSTSP:  MVI     A,LOW SPQUE     ; RESET POINTER TO 1ST QUE VEC BYT
                      E (SEE NOTE!!!)
002C C31500    C  308         JMP     QUEZZ
002F D5           309 FOUEN:  PUSH    D        ; FOUND EQUAL ENTRY. EXTRACT
0030 1E9E         310         MVI     E,LOW STSPQ     ; GENERATE IN (D,E) ADR OF HEAD PO
                      INTER
                  311                                 ; (SEE NOTE!!!)
0032 1A           312         LDAX    D        ; GET HEAD INDEX
0033 BD           313         CMP     L        ; IS HEAD INDEX>FOUND ENTRY INDEX?
0034 CA4B00    C  314         JZ      HAIEQ    ; IF ENTRY INDX EQUAL TO HEAD THEN MODIFY
                      STGQU(STSPQ)ONLY
0037 D25E00    C  315         JNC     MVBCK    ;HEAD>FOUND THEN MOVE MACKWARDS
003A 3C           316         INR     A        ; UPDATE STGQU (STSPQ) BY INCREMENTING (SE
                      E NOTE!!!)
003B 12           317         STAX    D
003C 3D           318         DCR     A        ; RESTORE VALUE
003D 5D           319         MOV     E,L      ; L HOLDS TARGET INDEX
```

```
LOC  OBJ         SEQ         SOURCE STATEMENT

003E 1D           320          DCR      E          ; TARGET INDEX - 1 IS SOURCE INDEX
003F 95           321          SUB      L          ; IN A - (# OF BYTES TO BE MOVED)
0040 2F           322          CMA                 ; NEGATE ACC
0041 3C           323          INR      A
0042 E5           324          PUSH     H          ; SAVE (H,L) IN STACK
0043 CD0000   E   325          CALL     MOVE1      ; MOVE TO EXTRACT ENTRY
0046 E1           326          POP      H          ; RESTORE H,L
0047 D1           327          POP      D          ;    "    D,E
0048 C31E00   C   328          JMP      CMPIT      ; GO ON SEARCHING
004B EB           329 HAIEQ:   XCHG               ; IN (H,L) HEAD POINTER ADR. IN (D,E) CURR
LOC  ODJ         SEQ  ENT ENTRY
004C 3E98         330          MVI      A,GSLBT ; GET LSH OF LAST VEC YTE (SEE NOTE!!!)
004E BE           331          CMP      M          ; IS HEAD = LAST BYTE?
004F C25800   C   332          JNZ      HAIEK   ; NO
0052 3E80         333          MVI      A,LOW SPQUE     ; YES, RESET HEAD TO 1ST BYTE
0054 77           334          MOV      M,A        ; UPDATE HEAD POINTER (RESET)
0055 C35900   C   335          JMP      HAIEX
0058 34           336 HAIEK:   INR      M
0059 EB           337 HAIEX:   XCHG     ; IN (D,E) CURRENT ENTRY ADR
005A D1           338          POP      D         ;IN (D,E) ADR. OF TAIL POINTER, IN(H,L) AD
                      R OF MATCHING ENTRY
005B C31E00   C   339          JMP      CMPIT      ; GO ON SEARCHING
                  340 MVBCK:                       ; CURRENT ENTRY INDEX<HEAD INDEX MOVE BACK
                      WARDS
005E E5           341          PUSH     H          ; SAVE (H,L) (CURRENT ENTRY ADR)
005F 1E9F         342          MVI      E,LOW ENSPQ     ; IN (D,E) ADR OF TAIL POINTER (SE
                      E NOTE!!!)
0061 1A           343          LDAX     D          ; GET TAIL INDEX
0062 3D           344          DCR      A          ; IN ACC NEW TAIL POINTER VALUE
0063 12           345          STAX     D          ; UPDATE TAIL POINTER
0064 95           346          SUB      L          ; CALCULATE # OF BATES TO BE MOVED
0065 CA1500   C   347          JZ       QUEZZ
0068 5D           348          MOV      E,L        ; GENERATE IN E SOURCE INDEX (TARGET+1)
0069 1C           349          INR      E
006A CD0000   E   350          CALL     MOVE2
006D D1           351          POP      D          ; EXCHANGE (H,L) WITH (D,E)
006E E1           352          POP      H
006F 7D           353          MOV      A,E
0070 C31500   C   354          JMP      QUEZZ      ; GO ON SEARCHING
                  355 $EJECT

LOC  OBJ         SEQ         SOURCE STATEMENT

                    1          NAME     QUFTR
                    2 $NOLIST
C                 179 $INCUDE(GNDEF)
 (    0)
                  181 $LIST
                  182 $TITLE ('QUFTR-FIFIN')
                  183 ; *** QUFTR EXTRACTS AN ENTRY FROM THE FREE TRUNKS QUE - FTRNK
                  184 ; *** INPUT: ADDRESS OF ENTRY TO BE EXTRACTED IN H,L
                  185 ; *** OUTPUT: MODIFIED FTRNK, STRNK, ETRNK
                  186
                  187 PUBLIC  QUFTR
                  188 EXTRN   MOVE1,MOVE2
0000 3ADF20       189 QUFTR:   LDA      ETRNK      ; GET TAIL INDEX
0003 0602         190          MVI      B,2
0005 95           191          SUB      L          ; CALCULATE # OF BYTES TO BE MOVED BACKWAR
                      DS
0006 F20C00   C   192          JP       POSQ1      ; IF NEGATIVE THEN ADD 24 TO GET CURRENT N
                      UMBER
```

```
LOC  OBJ           SEQ        SOURCE STATEMENT

0009 C61E          193          ADI     30      ; AND ADD 6 TO COMPENSATE FOR SPLIT VECTOR
                      REDUCTION
000B 05            194          DCR     B       ; INDICATE SPLIT BACKWARDS
000C 57            195 POSQ1:   MOV     D,A     ; SAVE RESULT
000D 3ABE20        196          LDA     STRNK   ; GET HEAD INDEX
0010 0E02          197          MVI     C,2
0012 95            198          SUB     L       ; CALCULATE # OF BYTES TO BE MOVED FORWARD
0013 2F            199          CMA             ; SINCE WHAT WAS CALCULATED ABOVE IS HEAD-
                   L, NEGATE
0014 3C            200          INR     A       ; TO GET L-HEAD
0015 F21B00    C   201          JP      POSQ2   ; IF NEGATIVE THEN ADD 24 TO GET CORRECT N
                   UMBER AND
0018 C61E          202          ADI     30      ; ADD 6 TO COMPENSATE FOR SPLIT VECTOR RED
                   UCTION
001A 0D            203          DCR     C
001B BA            204 POSQ2:   CMP     D       ; WHICH MOVEMENT IS SHORTER, FORWARD (A) O
LOC  OBJ           SEQ R BACKWARD (D)
001C D25E00    C   205          JNC     MVBCK   ; IF A>D THEN MOVE BACKWARD
001F 0D            206          DCR     C       ; MOVE FORWARD, CHECK FOR SPLIT
0020 CA3C00    C   207          JZ      FRSPT   ; SPLIT FORWARD
0023 54            208          MOV     D,H     ; GENERATE IN (D,E) ADR OF SOURCE VECTOR W
                   HICH
0024 5D            209          MOV     E,L     ; EQUALS TARGET VEC. ADR. (H,L) -1.
0025 1D            210          DCR     E
0026 CD0000    E   211          CALL    MOVE1   ; MOVE VECTOR
0029 3ABE20        212 UPDHP:   LDA     STRNK   ; UPDATE HEAD-POINTER
002C FEB8          213          CPI     LOW FTRNK+24    ; IS HEAD ON LAST VEC. BYTE
002E CA3600    C   214          JZ      STTOF   ; YES, SET IT TO 1ST BYTE
0031 3C            215          INR     A       ; INCREMENT HEAD POINTER
0032 32BE20        216          STA     STRNK
0035 C9            217          RET
0036 3EA0          218 STTOF:   MVI     A,LOW FTRNK     ; RESET HEAD POINTER TO 1ST VEC. B
                   YTE
0038 32BE20        219          STA     STRNK
003B C9            220          RET
003C 3EA0          221 FRSPT:   MVI     A,LOW FTRNK     ; GET ADR OF FIRST VEC. BYTE
003E 95            222          SUB     L       ; CALCULATE NUMBER OF BYTES TO BE MOVED
003F 2F            223          CMA             ; SINCE RESULT NEGATIVE, NEGATE
0040 3C            224          INR     A
0041 54            225          MOV     D,H     ; GENERATE IN (D,E) ADR OF SOURCE VECTOR
0042 5D            226          MOV     E,L     ; WHICH EQUALS TARGET VEC. ADR. -1
0043 1D            227          DCR     E
0044 CD0000    E   228          CALL    MOVE1
0047 3AB820        229          LDA     FTRNK+24; MOVE LAST BYTE OF VEC.
004A 32A020        230          STA     FTRNK   ; TO 1ST BYTE OF VEC.
004D 3ABE20        231          LDA     STRNK   ; GET HEAD INDEX
0050 D6B8          232          SUI     LOW FTRNK+24    ; CALCULATE # OF BYTES TO BE MOVED
0052 2F            233          CMA
0053 3C            234          INR     A       ; ADR OF SOURCE VEC. IN (D,E)
0054 2EB8          235          MVI     L, LOW FTRNK+24
0056 1EB7          236          MVI     E, LOW FTRNK+23 ; ADR OF TARGET VEC. IN (H,L)
0058 CD0000    E   237          CALL    MOVE2
005B C32900    C   238          JMP     UPDHP   ; UPDATE HEAD-POINTER
                   239 MVBCK:
005E 05            240          DCR     B       ; IS IT SPLIT VEC. REDUCTION
005F CA7100    C   241          JZ      BKSPT   ; SPLIT
0062 7A            242          MOV     A,D     ; NOT SPLIT, NUMBER OF BYTES TO BE MOVED I
                   N ACC.
0063 5D            243          MOV     E,L     ; GENERATE ADR OF SOURCE VEC. IN (D,E) =(T
```

```
LOC  OBJ          SEQ          SOURCE STATEMENT

                      ARGET VEC+1)
0064 1C            244          INR     E
0065 54            245          MOV     D,H
0066 CD0000    E   246          CALL    MOVE2
0069 3ABF20        247 UPDTP:   LDA     ETRNK    ; DECREMENT
006C 3D            248          DCR     A
006D 32BF20        249          STA     ETRNK
0070 C9            250          RET
                   251 BKSPT:                    ; MOVE BACKWARDS-SPLIT
0071 3EB8          252          MVI     A, LOW FTRNK+24
0073 95            253          SUB     L        ; CALCULATE # OF BYTES TO BE MOVED
0074 5D            254          MOV     E,L
0075 1C            255          INR     E        ; GENERATE ADR OF SOURCE VEC (=TARGE+1) IN
                      (D,E)
0076 54            256          MOV     D,H
0077 CD0000    E   257          CALL    MOVE2
007A 3AA020        258          LDA     FTRNK    ; MOVE 1ST VEC. BYTE
007D 32D820        259          STA     FTRNK+24; TO LAST VEC. BYTE
0080 3ABF20        260          LDA     ETRNK    ; GET INDEX OF TAIL
0083 D6A0          261          SUI     LOW FTRNK        ; CALCULATE # OF BYTES TO BE MOVED
0085 CA9200    C   262          JZ      STPON    ; IF 0, UPDATE TAIL-POINTER ONLY. (DO NOT
                      MOVE)
0088 2EA0          263          MVI     L, LOW FTRNK     ; GENERATE ADR OF TARGET VEC (1ST
                      VEC BYTE)
008A 5D            264          MOV     E,L      ; IN (H,L) ANMD SOURCE VEC (TARGET+1) IN (
                      D,E)
008B 1C            265          INR     E
008C CD0000    E   266          CALL    MOVE2
008F C36900    C   267          JMP     UPDTP
0092 3EB8          268 STPON:   MVI     A, LOW FTRNK+24 ; SET TAIL POINTER TO LAST VEC. BY
                      TE
0094 32BF20        269          STA     ETRNK
0097 C9            270          RET
                   271 $EJECT

LOC  OBJ          SEQ          SOURCE STATEMENT

                     1          NAME    MOVE1
                     2 $NOLIST
                   230 $LIST
                   231 $TITLE ('MOVE1/2-FIFIN')
                   232 ; *** MOVE1(2) IS A ROUTINE WHICH MOVES A SOURCE VECTOR FORWARD (B
                      ACKWARD) TO A
                   233 ; *** TARGET VECTOR
                   234 ; *** INPUT: # OF BYTES TO BE MOVED IN ACC.
                   235 ;                ADR OF TARGET VECTOR IN (H,L)
                   236 ;                   "    SOURCE VECTOR  " (D,E)
                   237 ; *** OUTPUT: MOVED VECTORS
                   238
                   239 PUBLIC  MOVE1,MOVE2
0000 B7            240 MOVE1:   ORA     A
0001 C8            241          RZ                  ; IF BYTES COUNTER=0, RETURN
0002 C5            242          PUSH    B
0003 47            243          MOV     B,A      ; BYTES COUNTER IN B
0004 1A            244 LUPM1:   LDAX    D        ; GET BYTE FROM SOURCE
0005 77            245          MOV     M,A      ; STORE BYTE IN TARGET
0006 05            246          DCR     B
0007 CA1E00    C   247          JZ      RTW      ; RETURN IF BYTES COUNTER 0
000A 1B            248          DCX     D                ; DECREMENT SOURCE POINTER (VECTOR
                      BEING MOVED FORWARD)
```

```
LOC  OBJ        SEQ        SOURCE STATEMENT

000B 2B          249            DCX     H        ; DECREMENT TARGET POINTER
000C C30400  C   250            JMP     LOPM1    ; GO ON MOVING
000F B7          251 MOVE2:     ORA     A        ; ALL NOTES IN MOVE2 SAME AS IN MOVE1 EXCE
                     PT WHERE NOTED
0010 C8          252            RZ
0011 C5          253            PUSH    B
0012 47          254            MOV     B,A
0013 1A          255 LOPM2:     LDAX    D
0014 77          256            MOV     M,A
0015 05          257            DCR     B
0016 CA1E00  C   258            JZ      RTW
0019 13          259            INX     D        ; INCREMENT SOURCE POINTER (VECTOR BEING M
                     OVED BACKWARD)
001A 23          260            INX     H        ; INCREMENT TARGET POINTER
001B C31300  C   261            JMP     LOPM2
001E C1          262 RTW:       POP     B
001F C9          263            RET
                 264 END

ASSEMBLY COMPLETE,  NO ERRORS

LOC  OBJ        SEQ        SOURCE STATEMENT

                   1            NAME     ZCHEK
                   2 $NOLIST
                 271 $LIST
                 272 $TITLE ('ZCHEK-CIFIN')
                 273 ; *** THIS ROUTINE SEARCHES THE FREE TRUNKS QUE, FTRNK, FOR A TRUN
                     K WITH M BIT
                 274 ; *** NOT SET. IF ONE, IS FOUND, ZCHEK EXTRACTS IT FROM THE QUE
                 275 ; *** INPUT: NONE
                 276 ; *** OUTPUT: INDEX OF FREE TRUNK IN ACC - IF FOUND. RETURNS THE P
                     OINT OF CALL
                 277 ;                 IF NOT SUCCESSFUL SEARCH, AND TRY TO POINT OF CALL
                      +1 IF
                 278 ;                 SUCCESSFUL
                 279 PUBLIC  ZCHEK,ZVCHK,ZVCK1
                 280 EXTRN   QUFTR
                 281 ZCHEK:
0000 C5          282            PUSH B            ; SAVE (B,C)
0001 0E01        283            MVI C,1           ; INDICATE REGULAR FORWARD SEARCH
0003 2609        284            MVI H, HDP60      ; GET ADR OF GNP60 POINTERS TABLE
0005 3ABF20      285            LDA ETRNK         ; GET INDEX OF QUE TAIL
0008 47          286            MOV B,A           ; SAVE TAIL INDEX
0009 3ADE20      287            LDA STRNK         ; GET INDEX OF QUE HEAD
000C 6F          288            MOV L,A           ; GENERATE ADR OF RESPECTIVE ENTRY IN GPN6
                    0
000D 5F          289            MOV E,A
000E 1620        290 CHFMB:     MVI D, HBFTR
0010 B8          291            CMP B             ; IS SEARCH POINTER=TAIL (OR HEAD-1 IF BAC
                    KWARDS SEARCH)
0011 CA7500  C   292            JZ EXZCH                ; YES, EXIT
0014 1A          293            LDAX D            ; GET TRUNK #
0015 F5          294            PUSH PSW          ; SAVE TRUNK #
0016 1620        295            MVI D, HBCNT      ; GET MSB OF CNT TABLE ADR
0018 C600        296            ADI CMTBT         ; GET INDEX FOR TRUNK
001A 5F          297            MOV E,A           ; GET RESPECTIVE ENTRY FROM CMT
001B 1A          298            LDAX D
001C EEFF        299            XRI CMTXX         ; ARE M AND B  BITS SET?
001E E6C0        300            ANI BC+B1         ;
0020 C23300  C   301            JNZ NXTFT         ; YES, KEEP SEARCHING
```

```
LOC  OBJ          SEQ        SOURCE STATEMENT

0023 0D           302              DCR C            ; NO, CHECK WHICH LABEL WAS CALLED
0024 C23B00    C  303              JNZ WZCHK        ; JMP IF ROUTINE ENTERED NOT AT ZCHEK (I.E
                          ZVCHK OR ZVCK1)
0027 2620         304              MVI H, HBFTR     ; RESTORE ADR OF ENTRY IN FTRNK, IN (H,L)
0029 CD0000    E  305              CALL QUFTR       ; EXTRACT FREE TRUNK FROM FTRNK
002C F1           306 GOBWC:       POP PSW          ; RESTORE FREE TRUNK #
002D C1           307              POP B            ; RESTORE (B,C)
002E E1           308              POP H            ; RETURN TO POINT OF CALL +1
002F 23           309              INX H
0030 23           310              INX H
0031 23           311              INX H
0032 E9           312              PCHL
0033 6E           313 NXTFT:       MOV L,M          ; GET POINTER TO NEXT FTRNK ENTRY FROM GPH
                          60
0034 7D           314              MOV A,L          ; INDEX OF NEXT ENTRY IN C
0035 5D           315              MOV E,L          ; INDEX      "        "     E FOR READING NEX
                          T TRUNK #
0036 33           316              INX SP           ;RESTORE STACK POINTER POSITION.
0037 33           317              INX SP
0038 C30E00    C  318              JMP CHFMB
003B 0C           319 WZCHK:       INR C            ; WAS IT ZVCHK ENTRY
003C F22C00    C  320              JP GOBWC         ; NO, RETURN TO POINT OF CALL +1
003F F1           321              POP PSW
0040 F5           322              PUSH PSW         ; YES, CHECK SIG TRUNK
0041 E5           323              PUSH H
0042 2621         324              MVI H, HBSCR     ; GET MSH OF SCRT ADR
0044 C600         325              ADI SCRBT        ; GENERATE ADR OF RESPECTIVE ENTRY IN SCRT
0046 6F           326              MOV L,A
0047 7E           327              MOV A,M          ; GET ENTRY RESPECTIVE TO RELEVANT TRUNK
0048 B7           328              ORA A            ;CHECK IF SIGNALING TRUNK IS FAULTY
0049 FA5500    C  329              JM TRNFS         ;IF FAULTY CONTINUE SEARCH
004C FE3F         330              CPI 3FH          ; IS IT FREE FOR SIG
004E DA7700    C  331              JC TRNFX         ; JMP IF NOT FREE
0051 E1           332 TRFIX:       POP H            ; RESTORE STACK PNT
0052 C32C00    C  333              JMP GOBWC        ; RETURN TO POINT OF CALL +1
0055 E1           334 TRNFS:       POP H            ; NOT FREE
0056 C33300    C  335              JMP NXTFT        ; GO CHECK NEXT ENTRY IN FTRNK
0059 C5           336 ZVCHK:       PUSH B           ; THIS ENTRY IS FOR LOOKING FOR A
005A 0EA6         337              MVI C,-90        ; TRUNK FREE FOR SIGNALLING IN A BACKWARD
                          SEARCH
005C C36200    C  338              JMP ZKNIM
005F C5           339 ZVCK1:       PUSH B           ; THIS ENTRY IS FOR SEARCHING FOR M BIT FR
                          EE
0060 0E5A         340              MVI C, +90       ; TRUNK IN A BACKWARDS DIRECTION
0062 260A         341 ZKNIM:       MVI H, HBP61     ; GET MSH OF ADR OF POINTERS TABLE FOR BAC
                          KWARDS STEPPING
0064 3ADE20       342              LDA STRNK        ; GET HEAD OF FRTRNK
0067 6F           343              MOV L,A          ; GENERATE RESPECTIVE ADR, IN POINTERS TAB
                          LE
0068 46           344              MOV B,M          ; GET ADR OF END OF SEARCH (HEAD-1)
0069 3ABF20       345              LDA ETRNK        ; GET FROM POINTERS TABLE ADR FOR START OF
                          SEARCH
006C 6F           346              MOV L,A          ; I.E TAIL-1
006D 5E           347              MOV E,M
006E 1620         348              MVI D, HBFTR     ; IN D, MSH OF THE QUE ADR
0070 7B           349              MOV A,E
0071 F5           350              PUSH PSW         ;SP ADJUSTMENT
0072 C33300    C  351              JMP NXTFT        ;START SEARCH
0075 C1           352 EXZCH:       POP B            ;RESTORE B&C
0076 C9           353              RET
0077 6F           354 TRNFX:       MOV L,A          ;
```

```
LOC  OBJ          SEQ        SOURCE STATEMENT

0078 262C          355        MVI H,HBSCM      ;SET RESPECTIVE SCMT ENTRY IN ORDER TO CHE
                         CK
007A 3E19          356        MVI A,19H        ;IF LINE IS CONNECTED.
007C BE            357        CMP M
007D C25500   C    358        JNZ TRNFS        ;IF ENTRY =/ 19, LINE CONNECTED, TRUNK NOT
                         FREE.
0080 2621          359        MVI H,HBSKR      ;TRUNK FREE, TERMINATE LINE ASSIGNMENT BY
                        UPDATING
0082 3619          360        MVI M,19H        ;SKRT

LOC  OBJ          SEQ        SOURCE STATEMENT

0084 C35100   C    361        JMP TRFIX
                   362 END

ASSEMBLY COMPLETE,  NO ERRORS

LOC  OBJ          SEQ        SOURCE STATEMENT

                     1        NAME     MSSND
                     2 $NOLIST
                   271 $LIST
                   272 $TITLE ('MSSND-FIFIN')
                   273 ; *** MSSND SENDS A MESSAGE TO THE OTHER END TLD SYS AND SETS
                   274 ; *** TIMERS FOR ACKNOWLEDGE MSG WHEN NEEDED
                   275 ; *** INPUT: THE 1ST BYTE OF THE MSG IN ACC. THE 2ND BYTE IN E-REG
                   276 ; *** (IF JUST 1 BYTE, E=0). THE NUMBER OF THE TRUNK ON WHICH THE
                   277 ; *** MSG IS TO BE SENT IN L-REG
                   278 ; *** OUTPUT: MODIFIED MSMEM, MSTXT, AKPTM, AKGTM, QUSPA, QUSGA,CM
                       T ENTRY
                   279 PUBLIC  MSSND
                   280 EXTRN   QUQKP,QUQGT,QUQLS
0000 E5            281 MSSND:  PUSH H
0001 C5            282         PUSH B             ; SAVE B&C
0002 B7            283         ORA A              ;SET PARITY BIT IN PSW
0003 F5            284         PUSH PSW           ; SAVE 1ST MSG BYTE
0004 E20B00   C    285         JPO GNPBX          ;
0007 AF            286         XRA A              ; CLEAR ACC IF PARITY EVEN
0008 C30E00   C    287         JMP GNPBT
000B 3E40          288 GNPBX:  MVI A,B1           ; PARITY BIT IN
000D 07            289         RLC                ; COMPLEMENT PARITY BIT
000E AB            290 GNPBT:  XRA E              ; IF M8 OF MSG (IN E-REG) IS SET
000F 0F            291         RRC
0010 B3            292         ORA E              ; ADD M8 OF MSG
0011 C63C          293         ADI BARK2          ; ADD 2ND BYTE OF BARKER
0013 5F            294         MOV E,A            ; SAVE 2ND BYTE FOR MSG MEM
0014 55            295         MOV D,L            ; SAVE TRUNK #
0015 7D            296         MOV A,L
0016 07            297         RLC                ; GENERATE ADR IN MSMEM (MSG CONTROL MEM)
                       BY MULTIPLYING
0017 07            298         RLC                ; TRUNK # BY 4 (NOTE: MSMEM MUST BE 0 ALLI
                       GNED!!)
0018 6F            299         MOV L,A
0019 2628          300         MVI H, HBMSM       ; GET MSH OF MSMEM ADR
001B 36D5          301         MVI M, BARK1       ; STORE 1ST BARKER BYTE
001D 2C            302         INR L
001E 73            303         MOV M,E            ; STORE 2ND BARKER BYTE + PARITY + M8
001F 2C            304         INR L
0020 F1            305         POP PSW
0021 77            306         MOV M,A            ; STORE 1ST MSG BYTE
0022 47            307         MOV B,A            ;SAVE 1ST MSG BYTE
```

```
LOC  OBJ          SEQ      SOURCE STATEMENT

0023 2628          308          MVI H,HBCMT      ;GENERATE ADR. OF CMT ENTRY
0025 3E80          309          MVI A,CMTBT      ;CORRESPONDING TO TRUNK#
0027 B2            310          ORA D            ;IN (H,L)
0028 6F            311          MOV L,A          ;
0029 7E            312          MOV A,M          ;GET ENTRY CONTENTS
002A EEFF          313          XRI CMTXX        ;ADJUST LOGIC(NEG/POS)
002C F6C0          314          ORI B0+B1        ;SET MSBS (M-BIT AND B-BIT) TO SEND MSG.
002E EEFF          315          XRI CMTXX        ;
0030 77            316          MOV M,A          ;
0031 78            317          MOV A,B          ;RESTORE 1ST MSG BYTE IN ACC
0032 17            318          RAL
0033 DA5D00   C    319          JC RSBCX         ;IF MSB NOT 0 THAN NOT A SIG OR SPEECH AS
                           S
0036 17            320          RAL
0037 DA4900   C    321          JC SIGAS         ; IF M1=1, THEN IT IS A SIG ASS
003A 7A            322          MOV A,D          ; A SPEECH ASS
003B C600          323          ADI  AKPBT       ; GENERATE ADR OF RESPECTIVE ENTRY IN AKPT
                           M
003D 6F            324          MOV L,A          ; IN (H,L)
003E 2623          325          MVI H,HBAKP
0040 361E          326          MVI M, ACKCP     ; RESET SPEECH TRUNK ASSIGNMENT ACK TIMER
0042 7A            327          MOV A,D          ; TRUNK # IN ACC
0043 CD0000   E    328          CALL QUQKP       ; ENTER TRUNK # INTO QUE FOR SPEECH ACK TI
                           MERS
0046 C35500   C    329          JMP RSBCM
0049 7A            330 SIGAS:   MOV A,D          ; A SIGNALLING ASSIGNMENT MSG
004A C620          331          ADI AKGBT        ; NOTES AS FOR TREATMENT OF SPEECH
004C 6F            332          MOV L,A          ; ASSIGNMENT (ABOVE) ONLY, PARAMETERS FOR
004D 2623          333          MVI H, HBAKG     ; SIGNALLING
004F 361B          334          MVI M, ACKCG
0051 7A            335          MOV A,D
0052 CD0000   E    336          CALL QUQGT
0055 C1            337 RSBCM:   POP B            ; RESTORE B&C
0056 213E23        338          LXI H, MSTXT     ; GET ADR OF TIMER FOR "NO MESSAGES TRANSM
                           ITTED"
0059 3600          339          MVI M, 0         ; RESET TIMER
005B E1            340          POP H
005C C9            341          RET
005D EE60          342 RSBCX:   XRI B1+B2        ;
005F FA5500   C    343          JM RSBCM         ;IF B0(SINCE SHIFTED THIS IS M1) IS SET,NO
                           T LSD ASS.
0062 CA5500   C    344          JZ RSBCM         ;IF B1=B2=1("    "     " M2&M3)  THEN, NOT
                            LSD ASS.
0065 78            345          MOV A,B          ;GET LINE# PROPER IN ACC (THIS IS AN LSD O
                           FF/ON MSG)
0066 E63F          346          ANI NOT (B0+B1) ;
0068 47            347          MOV B,A          ;SAVE LINE #
0069 C6C0          348          ADI LSDBT        ;GENERATE LSD ACK TIMERS TAB. ENTRY ADR. I
                           N (H,L)
006B 6F            349          MOV L,A
006C 2620          350          MVI H,HBLSD
006E 361B          351          MVI M,ACKCL      ;RESET LST MSG. ACK. TIMER
0070 78            352          MOV A,B          ;RESTORE LINE # IN ACC
0071 CD0000   E    353          CALL QUQLS       ;ENTER LINE # IN LSD ACK. TIMERS QUE
0074 C35500   C    354          JMP RSBCM
                   355 $EJECT
```

Figure 38A:
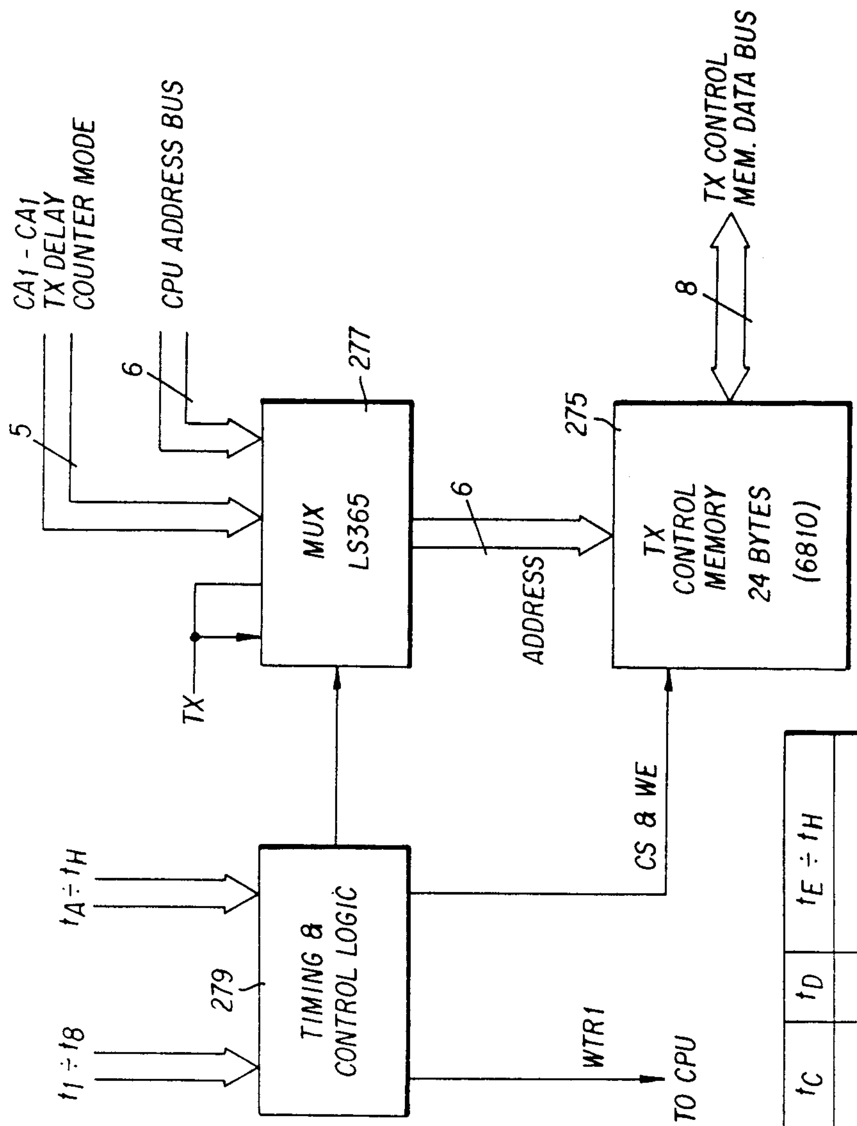
FIG. 38(*a* & *b*) is a block diagram of the transmitter control memory; divided into two parts a,b.
Figure 38B:
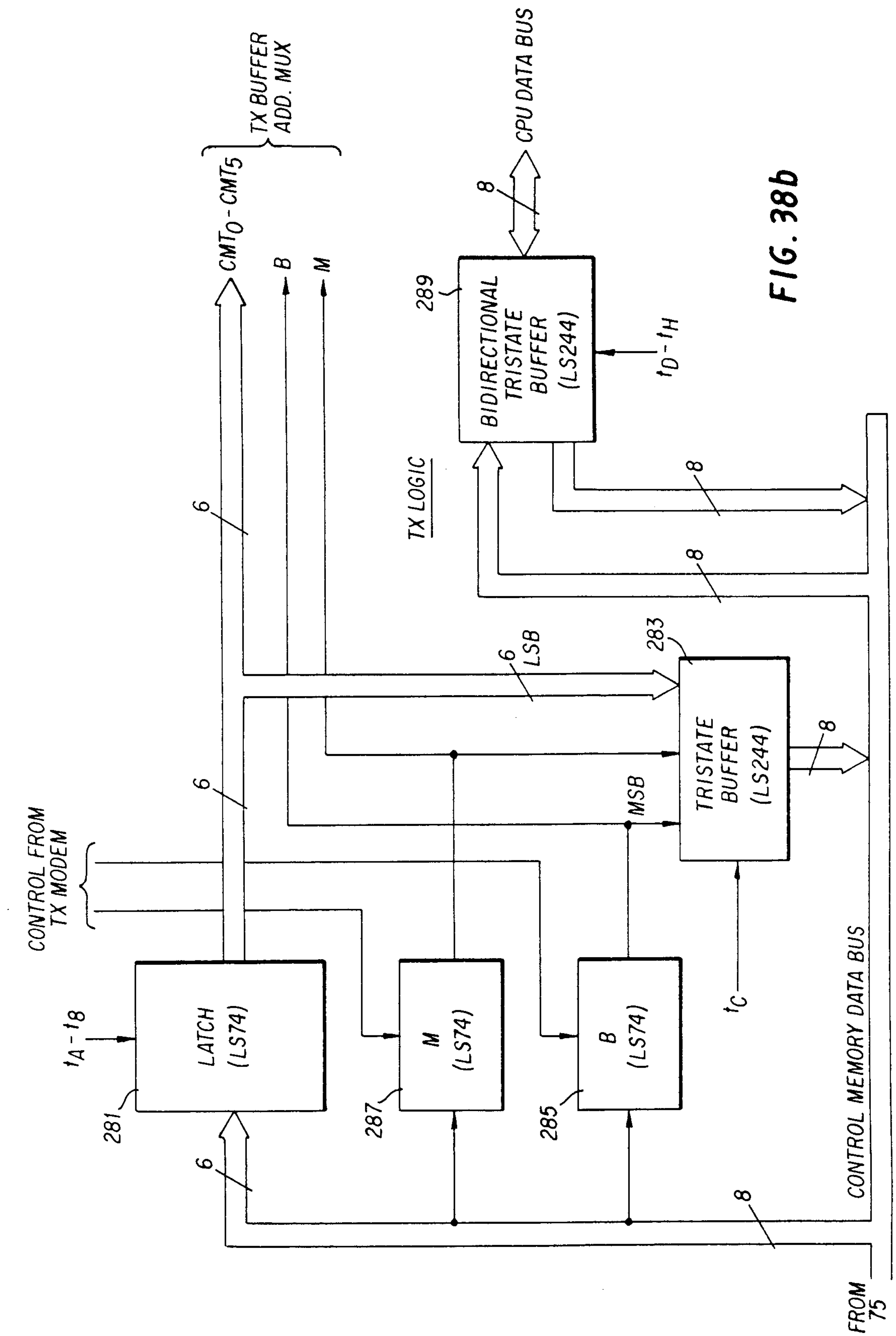
Figure 39A:
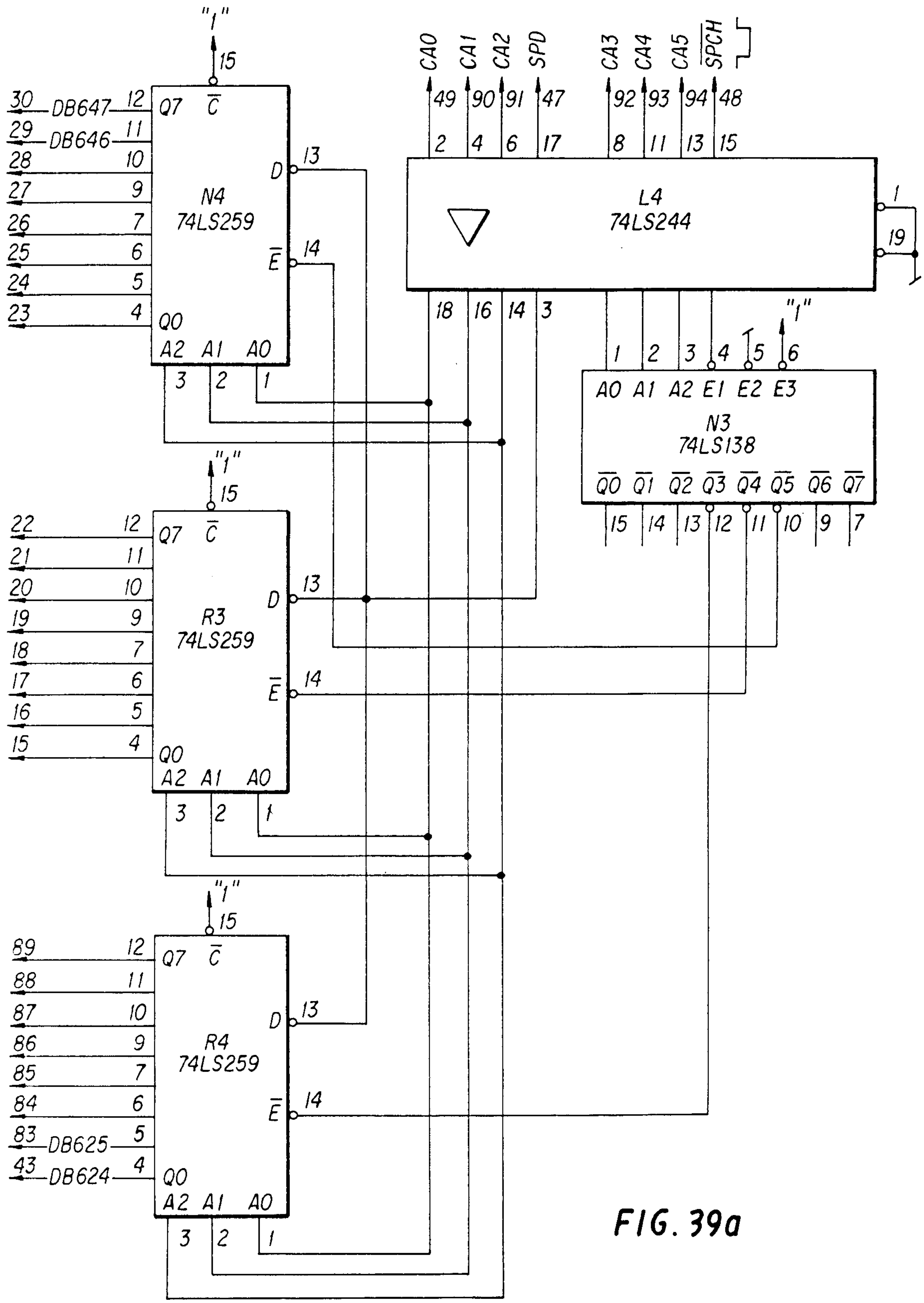
FIG. 39(*a* to *e*) is a schematic illustration of the circuitry shown in FIG. 38.
Figure 39B:
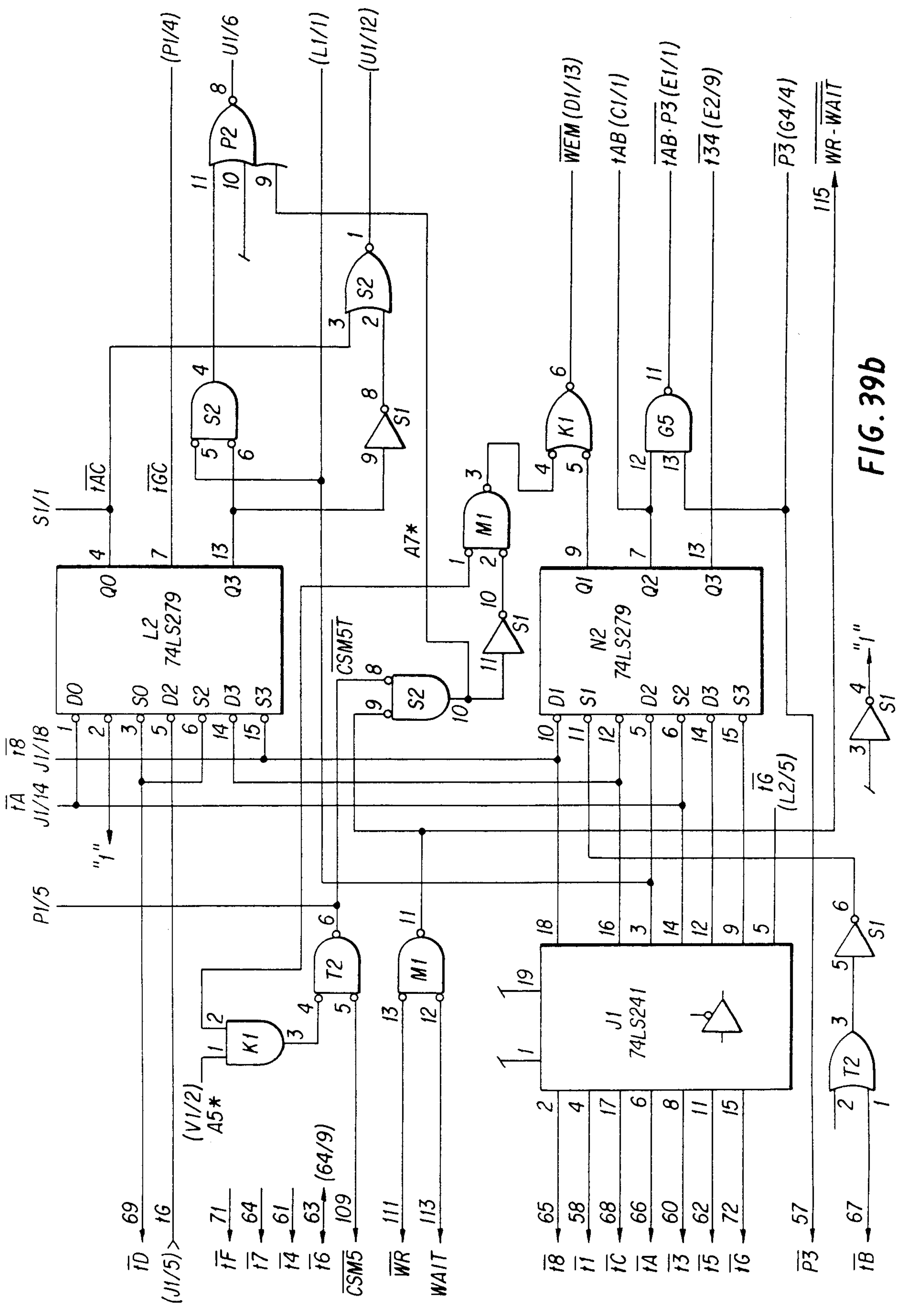
Figure 39C:
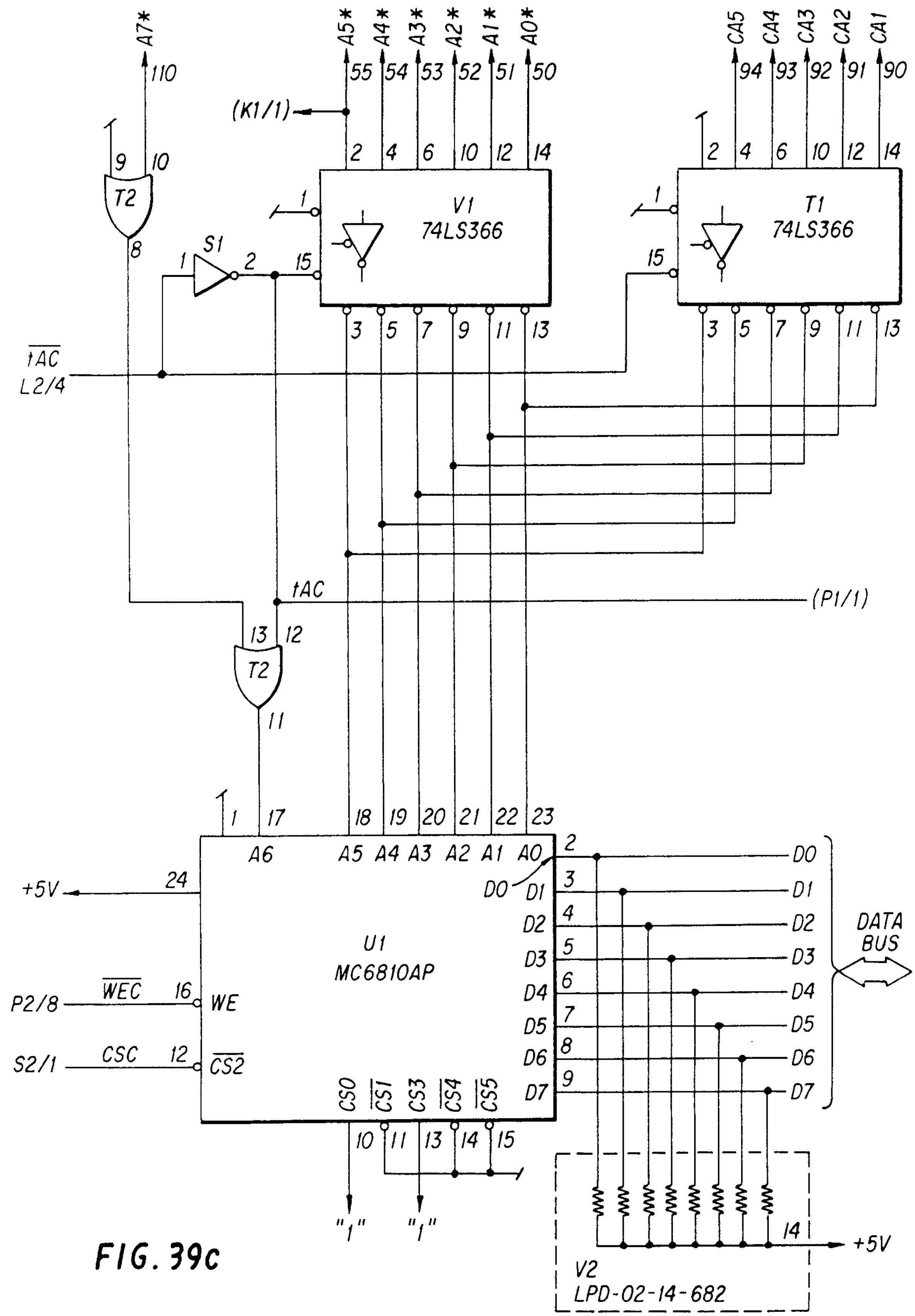
Figure 39D:
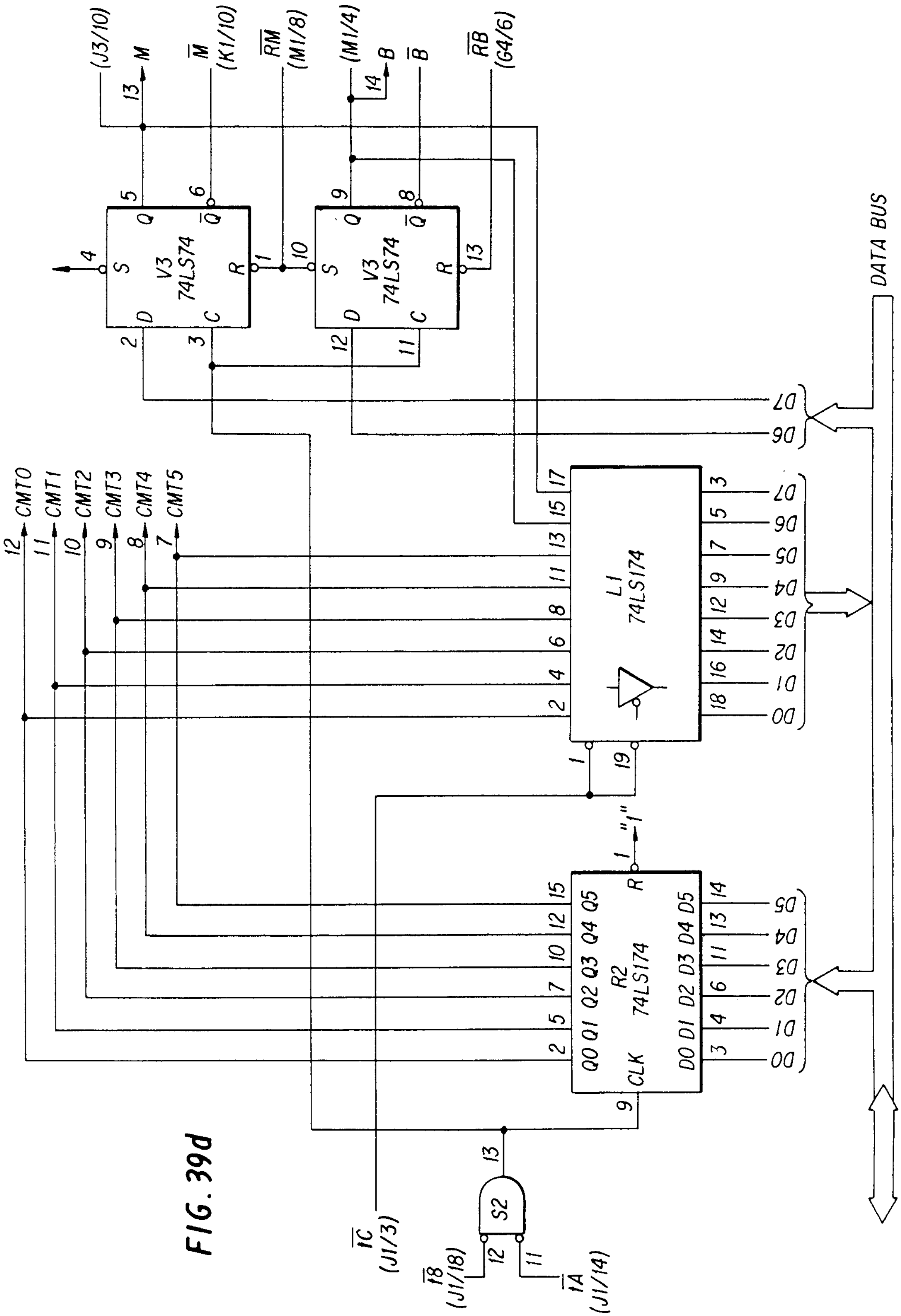
Figure 39E:
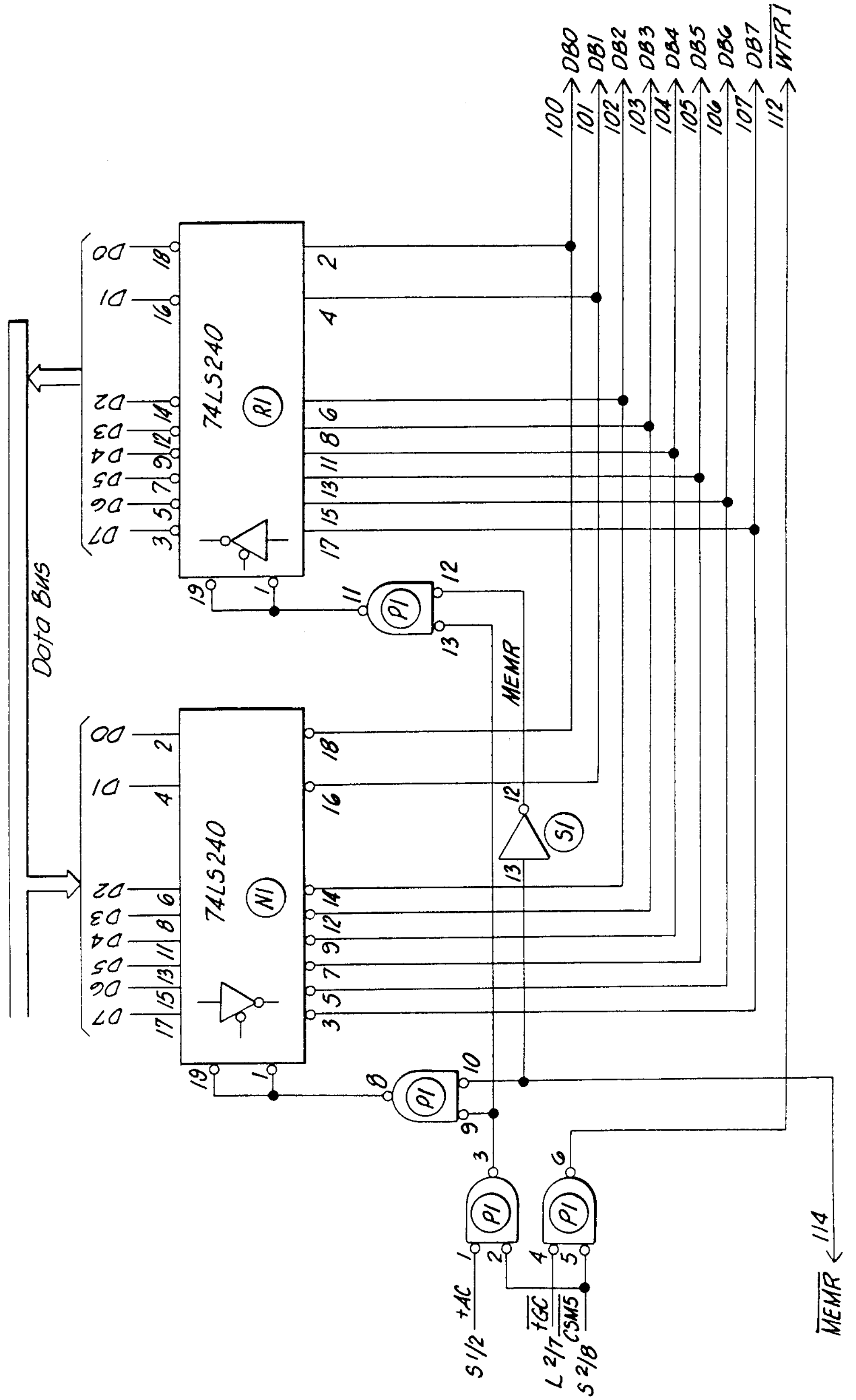

Reference is now made to FIG. 38 which is a detailed block diagram of the transmit control memory 65 illustrated in FIG. 2.

Transmit control memory 65 receives from the CPU assignment information indicating which of the 48 telephone communication lines is to be matched with each of the 24 communication channels. This information is randomly updated by the CPU along the CPU bus. The readout of this information is done cyclically and sequentially according to the order of the 24 communication channels is real time as the assignment is taking place.

The heart of the control memory is a 6810 chip 275 which contains 24 bytes, each of which contains information referring to one of the 48 telephone communication lines. Control memory chip 275 is addressed via an LS 365 multiplexer 277, which receives two alternative address inputs, CAT 1-CAT 5 from timing circuitry 69 which sequences the control memory serially through the 24 bytes, and address inputs from the CPU address bus, which indicate CPU interaction with the control memory.

Since the CPU operates asynchronously, timing and control logic circuitry 279 is provided for providing a WTR 1 signal to the CPU instructing it to wait until the CAT 1-CAT 5 addressing is completed. In practice, eight time slots t AT–t HT are provided and during the first three of these, the control memory is engaged in its "routine operations" in response to CAT 1-CAT 5 addressing. During the next five time slots of each sample, the control memory is free for interaction with the CPU.

In response to each address indicated by CAT 1-CAT 5, the control memory provides an 8 bit output, six bits of which are supplied to an LS 174 latch 281, which supplies them as signals CMT 0-CMT 5 in response to timing signals indicating time t AT t 8T. These signals are supplied to the buffer memory 26 (FIG. 2) and to a tristate buffer 283 such as an 81 LS 244. The most significant bit is supplied to an LS 74 latch 285 and is supplied to the buffer memory and the tristate buffer 283 as a B signal and the next most significant bit is supplied to an LS 74 latch 287 and is supplied to the buffer memory and the tristate buffer 283 as an M signal. The B and M signals are used and updated in response to signals supplied to respective latches 285 and 287 by the TX Modem 67 during the t BT time slot.

During time slot t CT immediately following time slot t BT the entire 8 bits, as updated by the TX modem are fed back to the control memory via tristate buffer 283 in response to timing signal tc T received at buffer 283.

Interface with the CPU is via a bidirectional tristate buffer 289, such as LS 244 chips which operate during the t DT–t HT time slots.

A detailed schematic illustration of the transmit control memory is provided in FIG. 39.

Figure 40A:
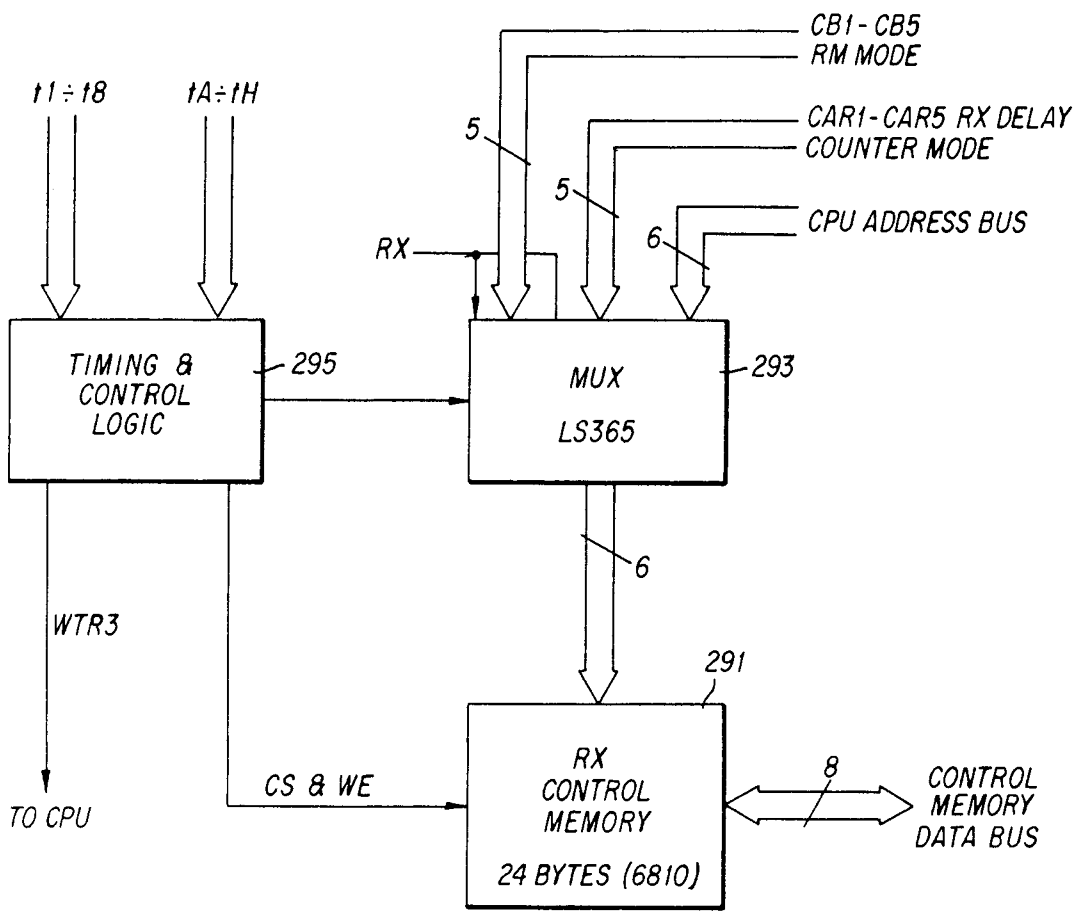
FIG. 40(*a* & *b*) is a block diagram of the receive control memory, divided into two parts a,b.
Figure 40B:
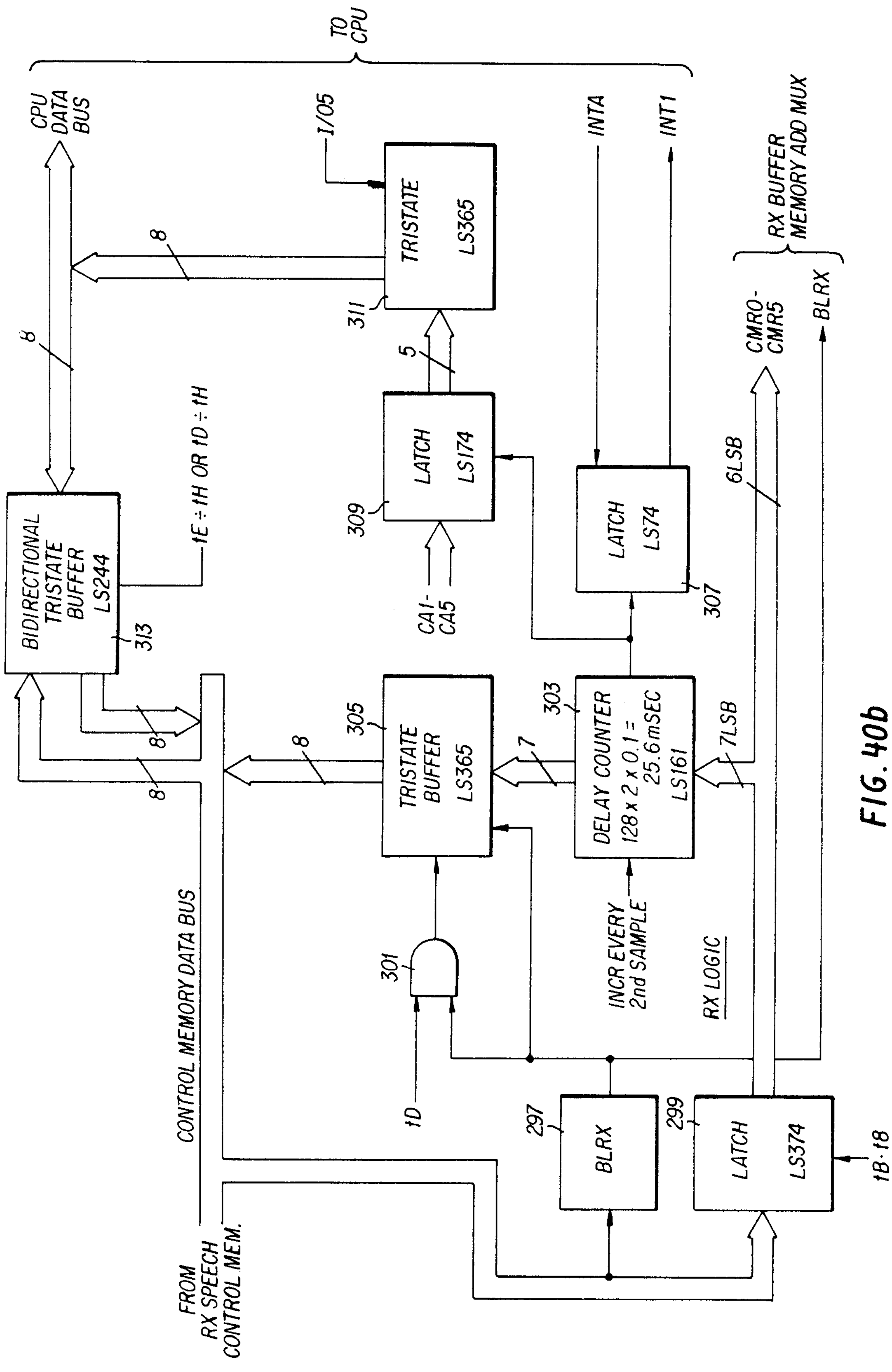
Figure 41A:
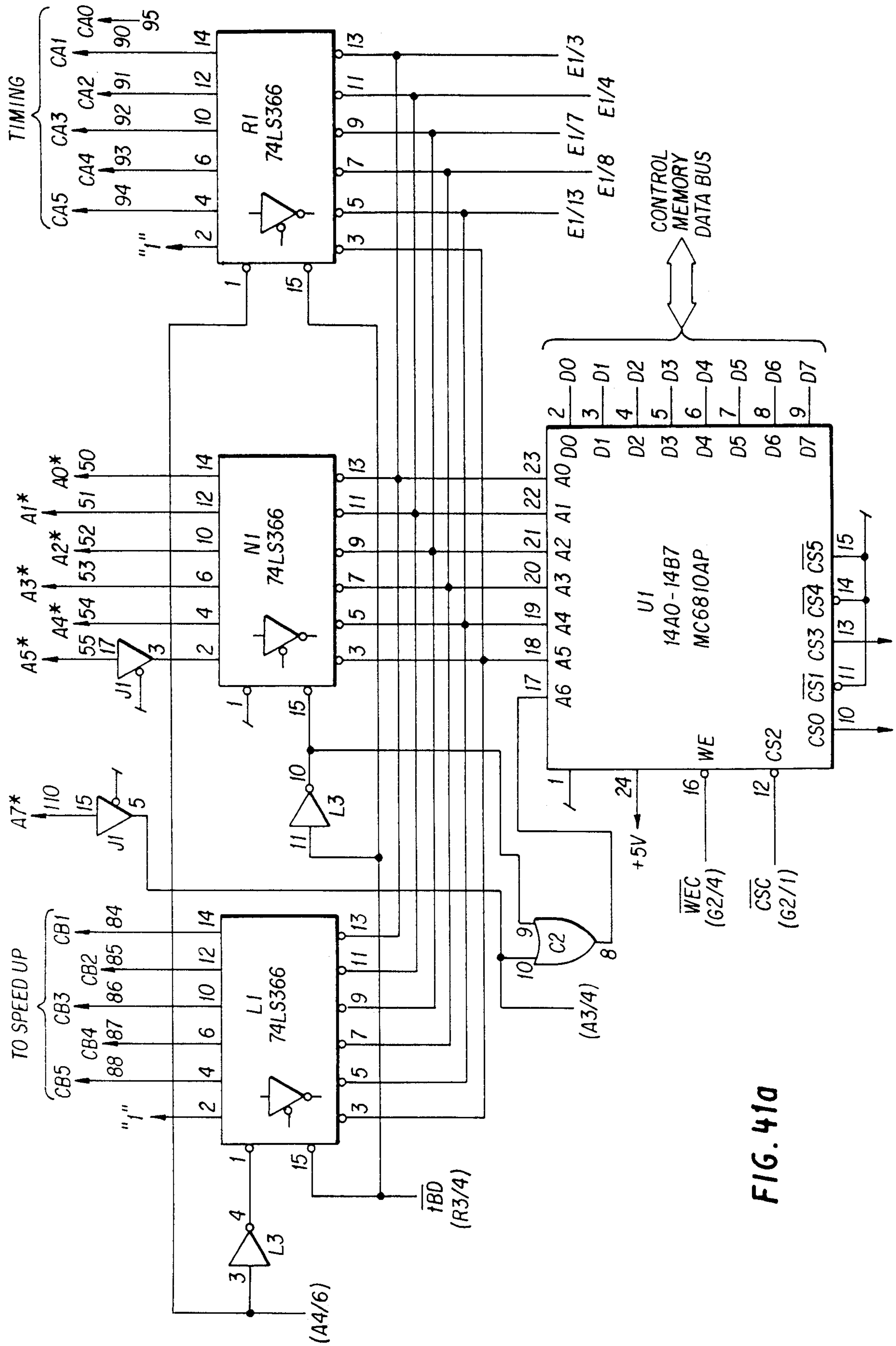
FIG. 41(*a* to *f*) is a schematic illustration of the circuitry shown in FIG. 40 in part.
Figure 41B:
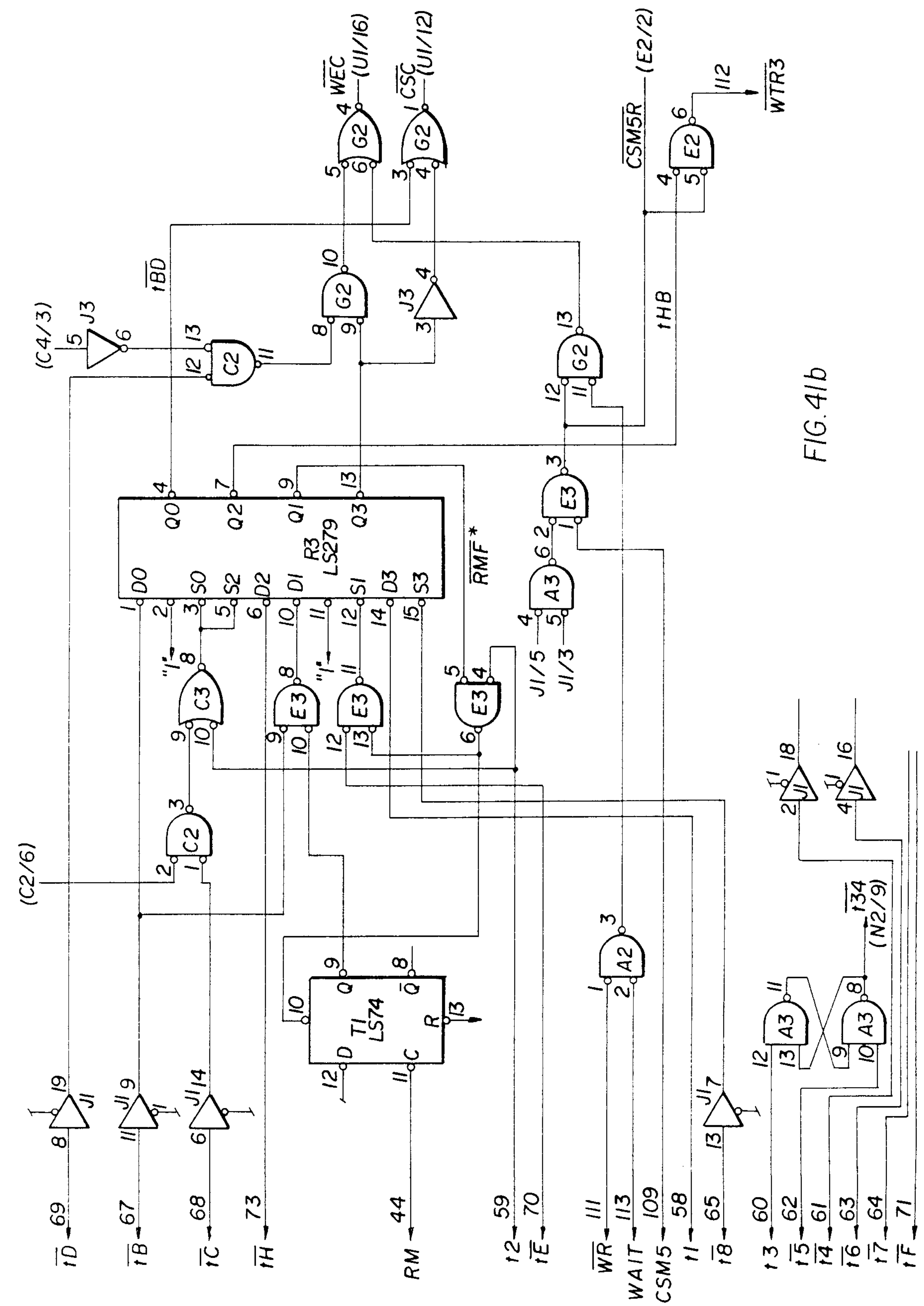
Figure 41C:
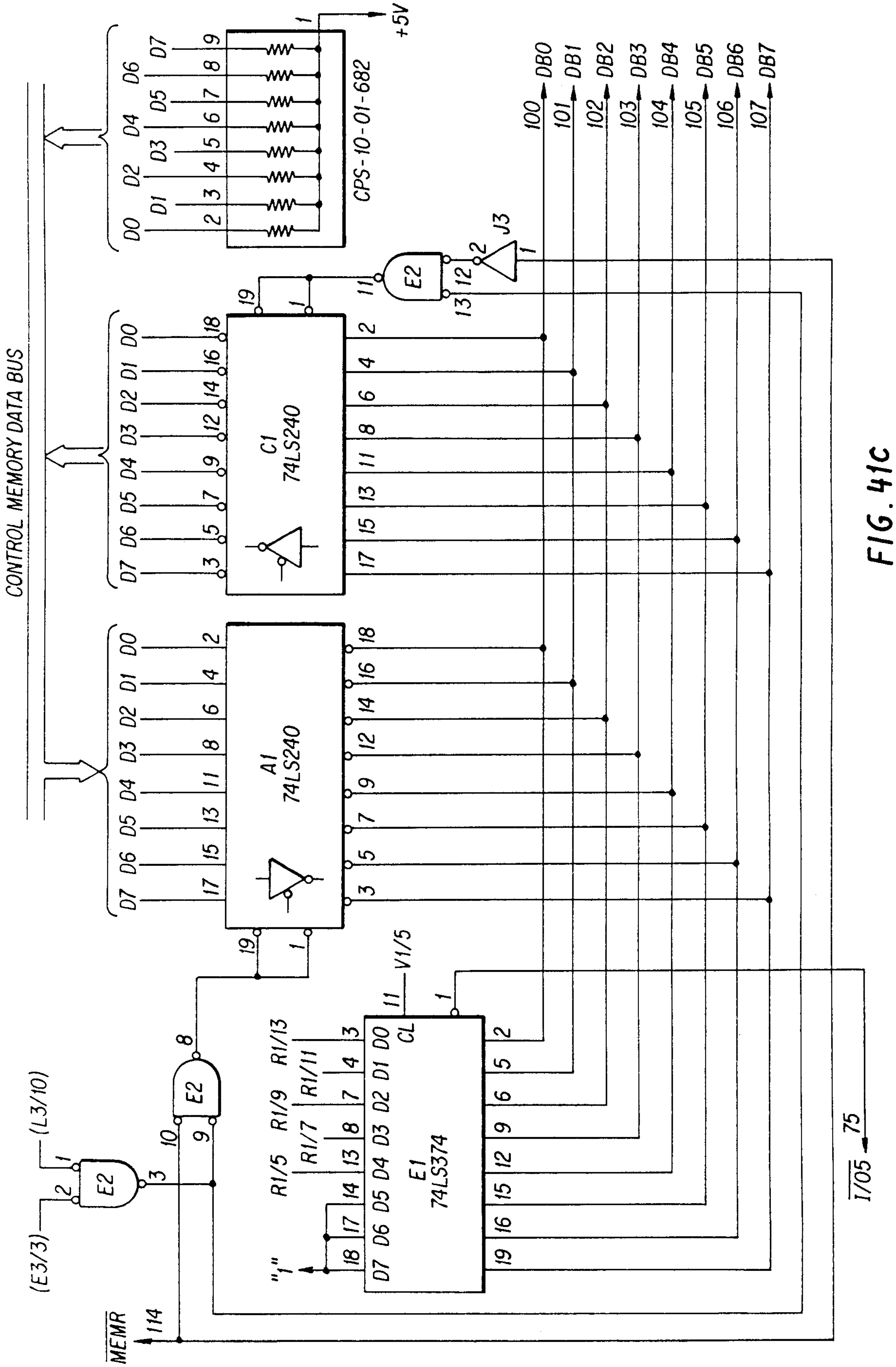
Figure 41D:
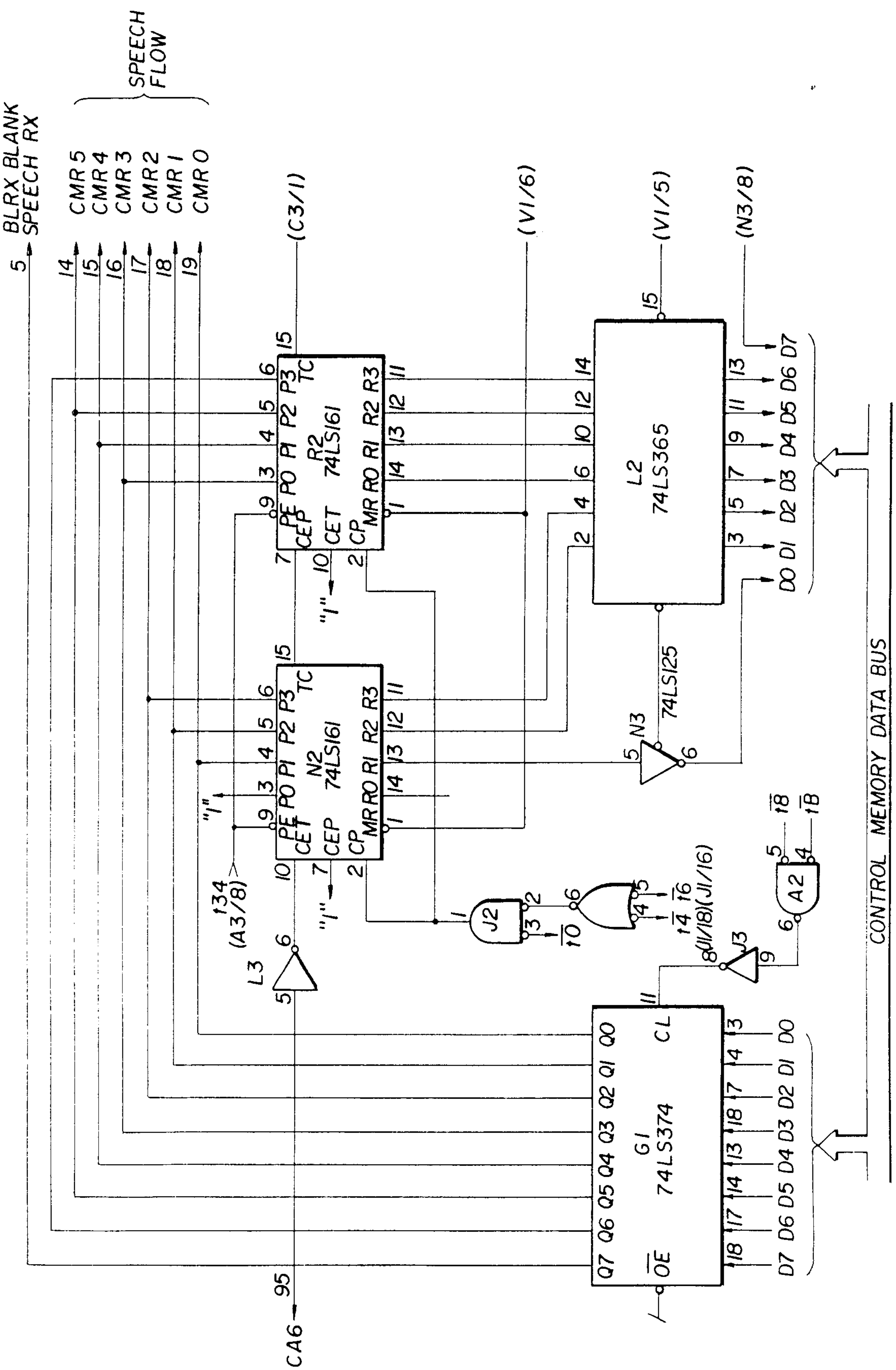
Figure 41E:
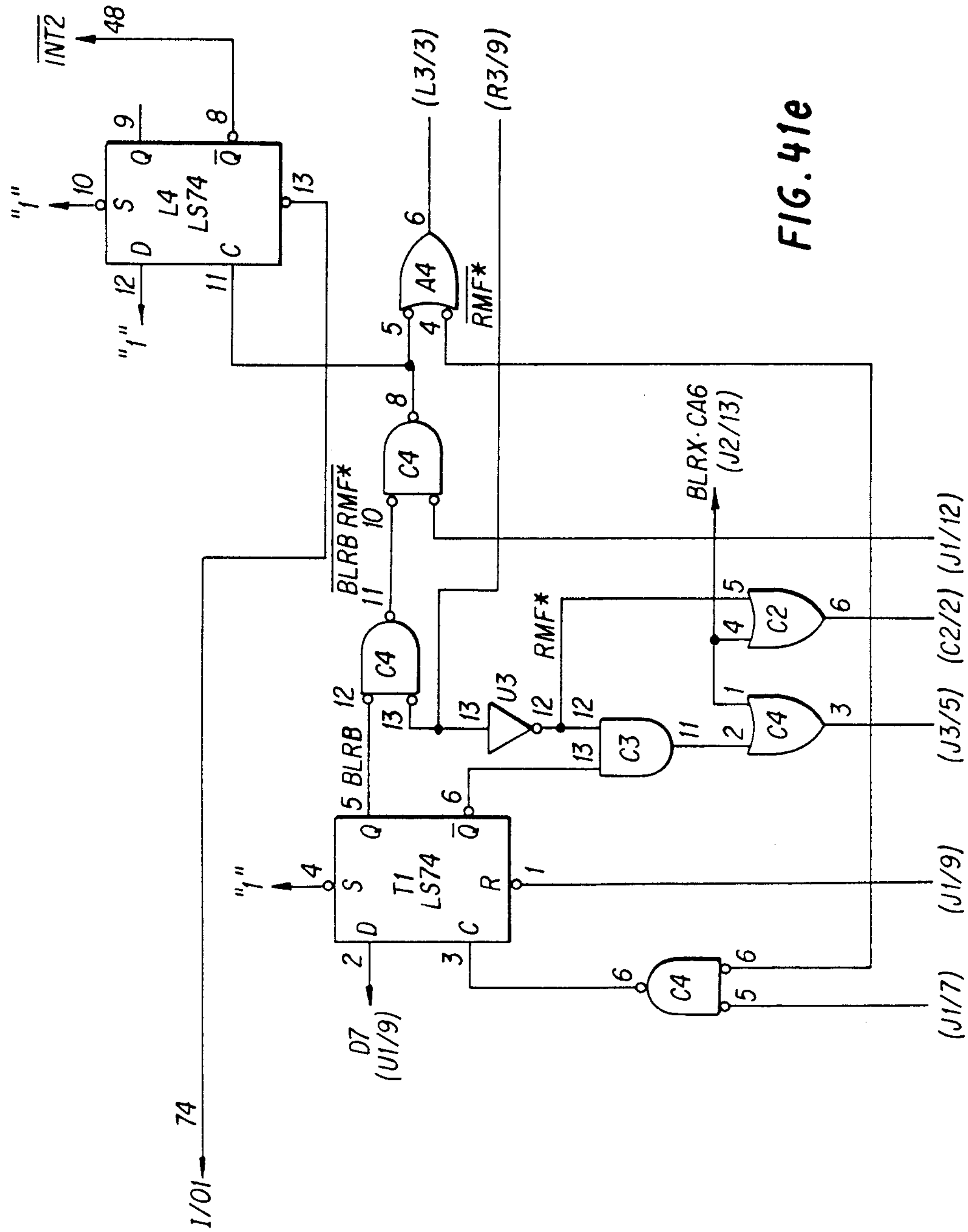
Figure 41F:
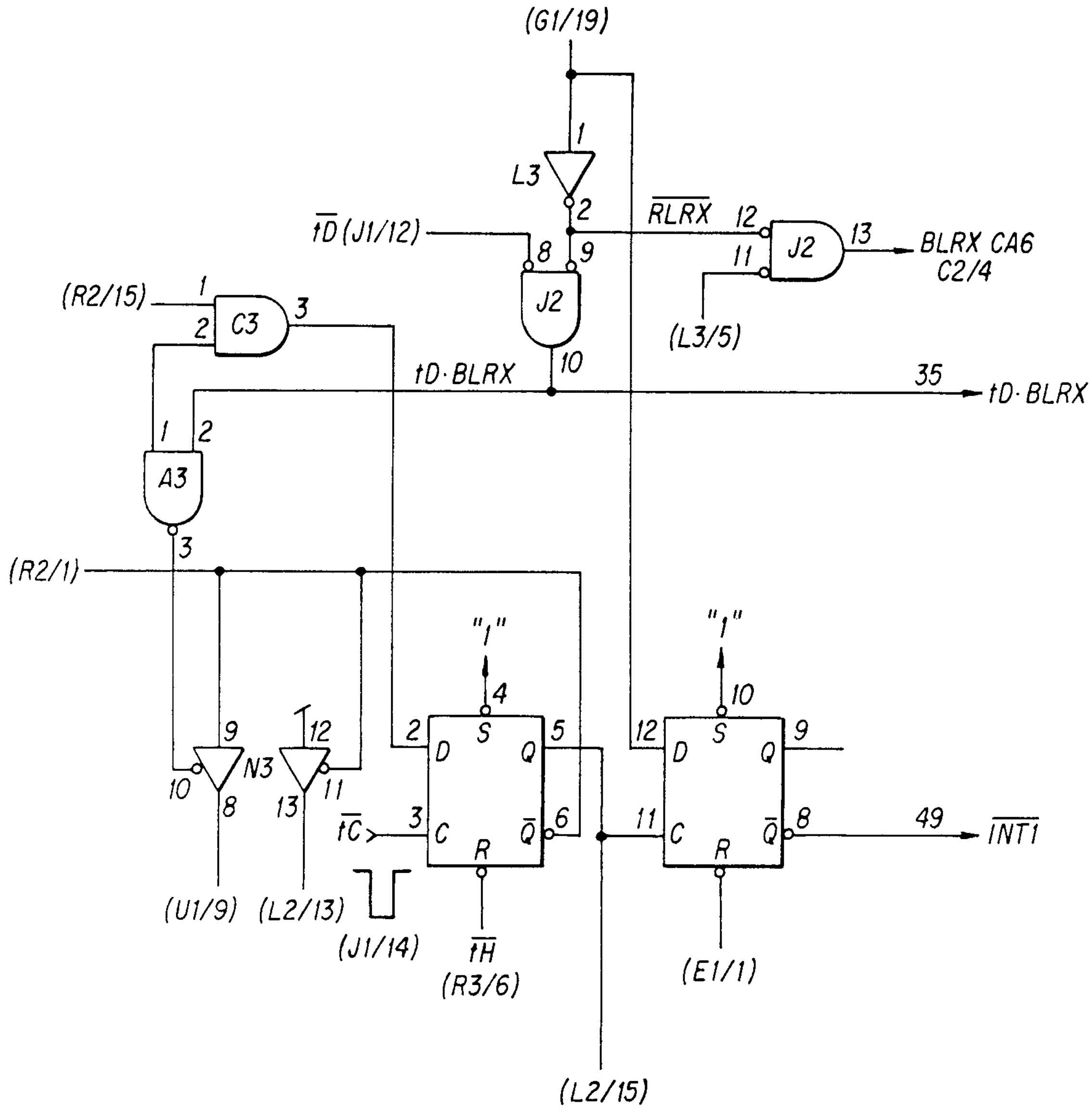

Reference is now made to FIG. 40 which illustrates the receiver control memory 60 and blank logic 58 of FIG. 2. The principal function of the receiver (RX) control memory is to cyclically read out its contents to the receiver buffer memory. It has an additional function, that of blanking the output to the buffer memory upon detection of a message in the received signal, so as to prevent the message beeps being heard by the subscriber.

The contents of the receive control memory is updated by the CPU asynchronously in response to received assignment messages.

Similarly to the transmitter control memory described above, the heart of the receiver control memory is a 6810 memory chip 291 which receives a six bit address via a LS 365 multiplexer 293 which receives three alternative address inputs: CAR 1-CAR 5 for sequencing through the addresses cyclically during normal operation; CB 1-CB 5 for presetting blanking counter during message receipt and the CPU address bus. Timing and control logic circuitry 295 coordinates the operation of multiplexer 293 and memory 291 and provides a WTR 3 wait signal to the CPU when the control memory is engaged in routine sequencing operations.

The most significant bit of the output of control memory 291 is supplied to a BLRX latch 297 while the six least significant bits are supplied to a latch 299 which outputs its contents to the RX buffer memory address but in response to a timing signal indicating t B·t 8, i.e. the last eight of the t BR time slot.

The output of the BLRX latch 297, hereinafter referred to as the BLRX signal is operative to blank the output of RX buffer memory 52 in order to prevent the message being passed on to the audio output to the telephone communication line. Upon receipt of a message by the RX Modem 61 (FIG. 2) multiplexer 293 of the control memory provides the address of the communication channel which received the message and the control memory content at that address is changed to all ones. Thus the most significant bit of the content of control memory 291 which is the input to BLRX latch 297 is 1, and BLRX becomes 1 for 25 milliseconds which is the length of the message, thereby preventing the received message from reaching the audio output.

While BLRX is high, the contents of the memory for that channel represent the remaining blanking time, and are supplied via latch 299 to delay counter 303. Delay counter 303 is incremented during time slot t C for every second sample to achieve the required delay. The output of delay counter 303 is supplied via a tristate buffer 305, back to control memory 291 for updating thereof. Tristate buffer is enabled by an AND gate 301 which is controlled by time signal t DR and BLRX.

When counter 303 reaches the end of its count, it provides an output signal to a latch 307 and to a latch 309. Latch 307 provides the address of the channel whose delay count has been completed to the CPU via a tristate buffer 311. The CPU inserts in the control memory 291 the identification of the telephone communication line which is assigned to that channel, via a bidirectional tristate buffer 313.

Figure 42:
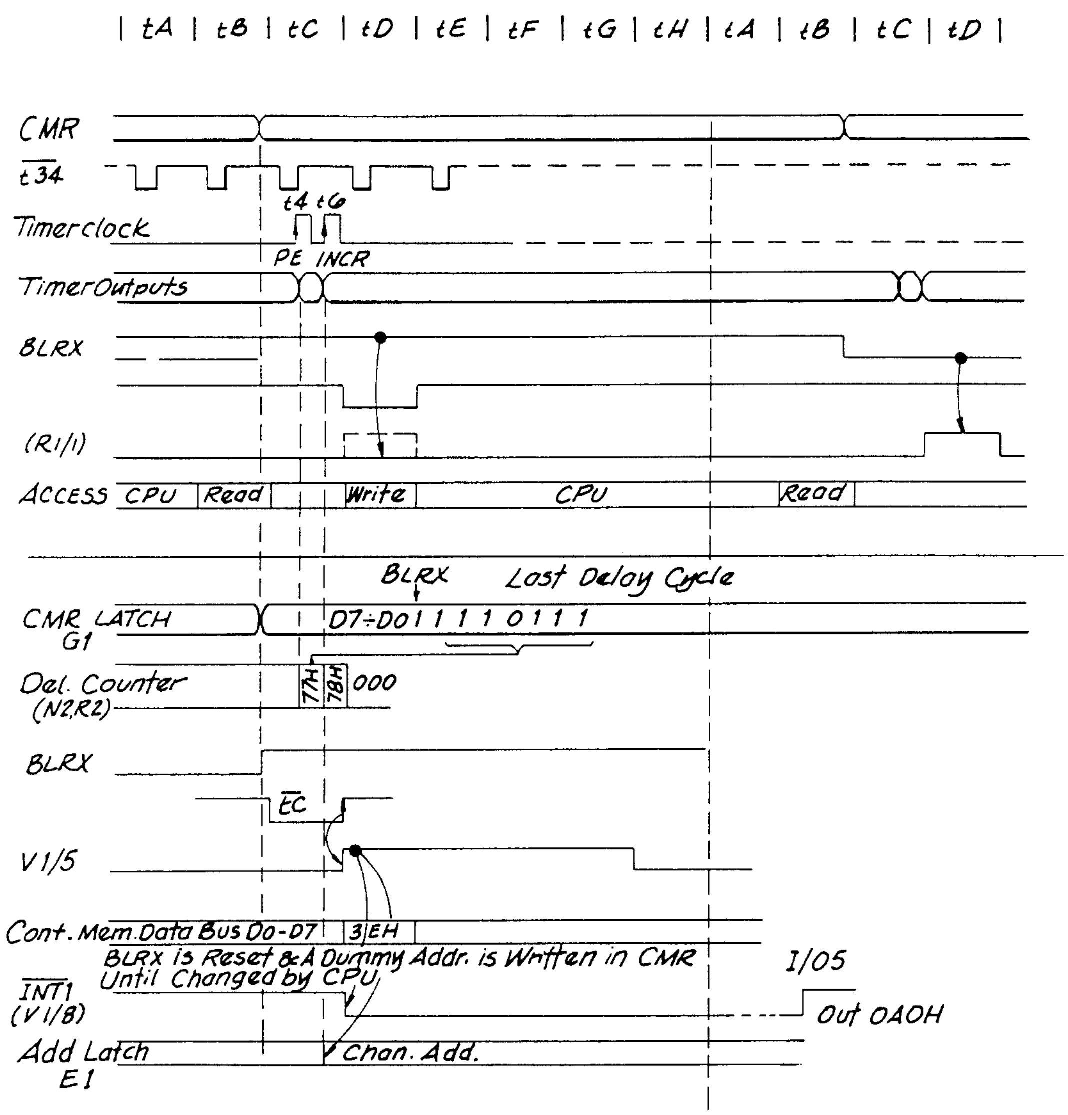
FIG. 42 is a timing diagram of a portion of the circuitry shown in FIG. 40*b;*

A detailed schematic illustration of the receiver control memory and blank logic is provided in FIG. 41. FIG. 42 is a timing diagram of the receive control memory.

It is appreciated that control messages including assignment information are transmitted over the communication channels serially using DPSK modulation, generated by a modem transmitter and recevied by a modem receiver. The modem transmitter provides digital samples of an analog waveform. Thus the message transmission may employ either analog or digital transmission facilities. Each message comprises 24 data bits, each of which comprises eight digital samples. The modem transmitter operates cyclically in a time sharing mode for the 24 communication channels.

For each time slot corresponding to a communication channel, the modem transmitter checks the message status of the channel, computes the digital value of the message sample to be transmitted and outputs it to the transmit speech flow unit. Message transmission is synchronous and each communication channel has a predetermined time slot for commencement of message transmission.

Message transmission is initiated by setting B (blank) and M (message) bits in the transmit control memory. A blank code is outputed from the modem transmitter until the designated time slot occurs. The 24 data bits of the message are then transmitted serially followed by a blanking period.

Figure 43A:
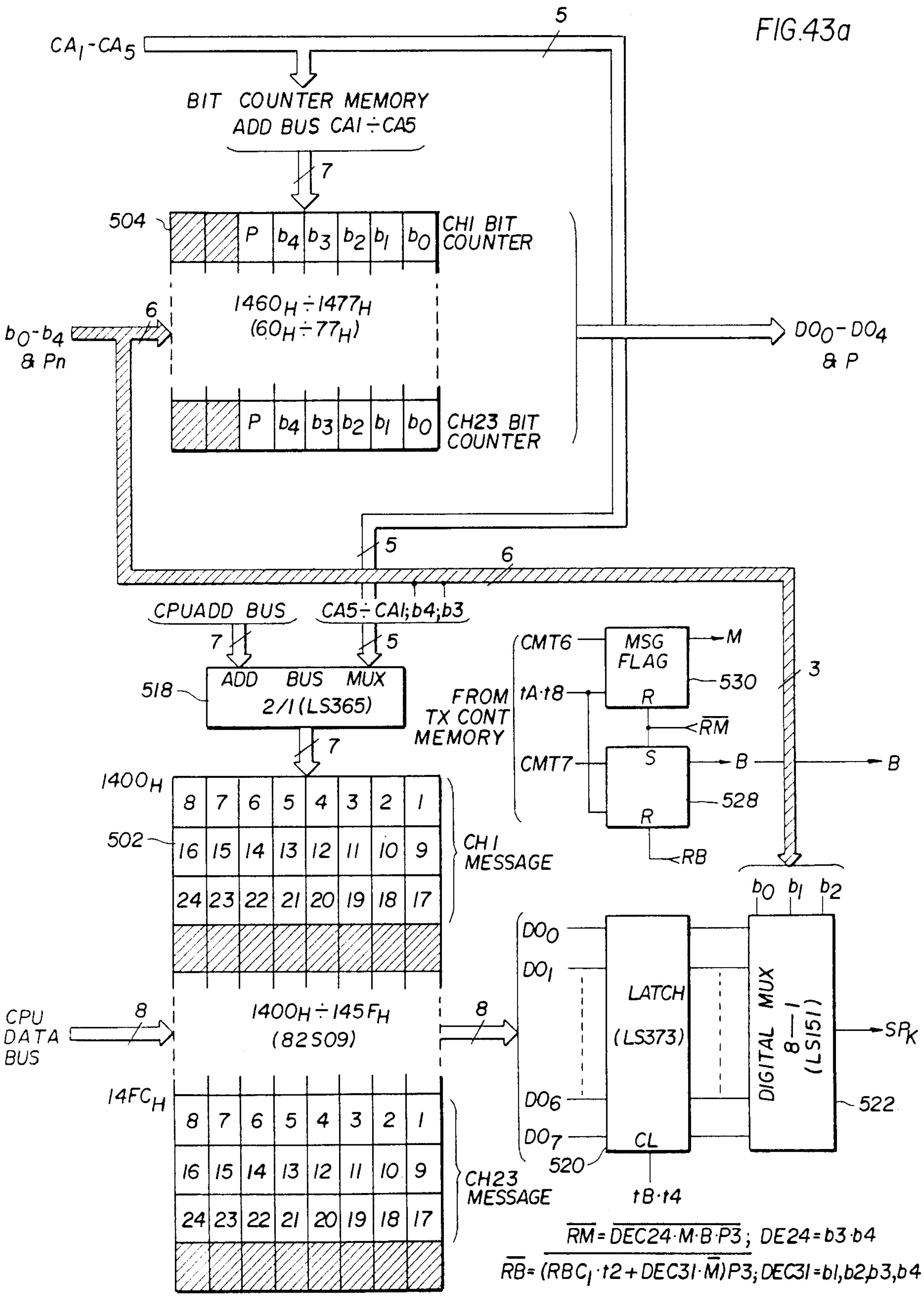
FIG. 43(*a* to *c*) is a block diagram of the modem transmitter, divided into three parts a–c.
Figure 43B:
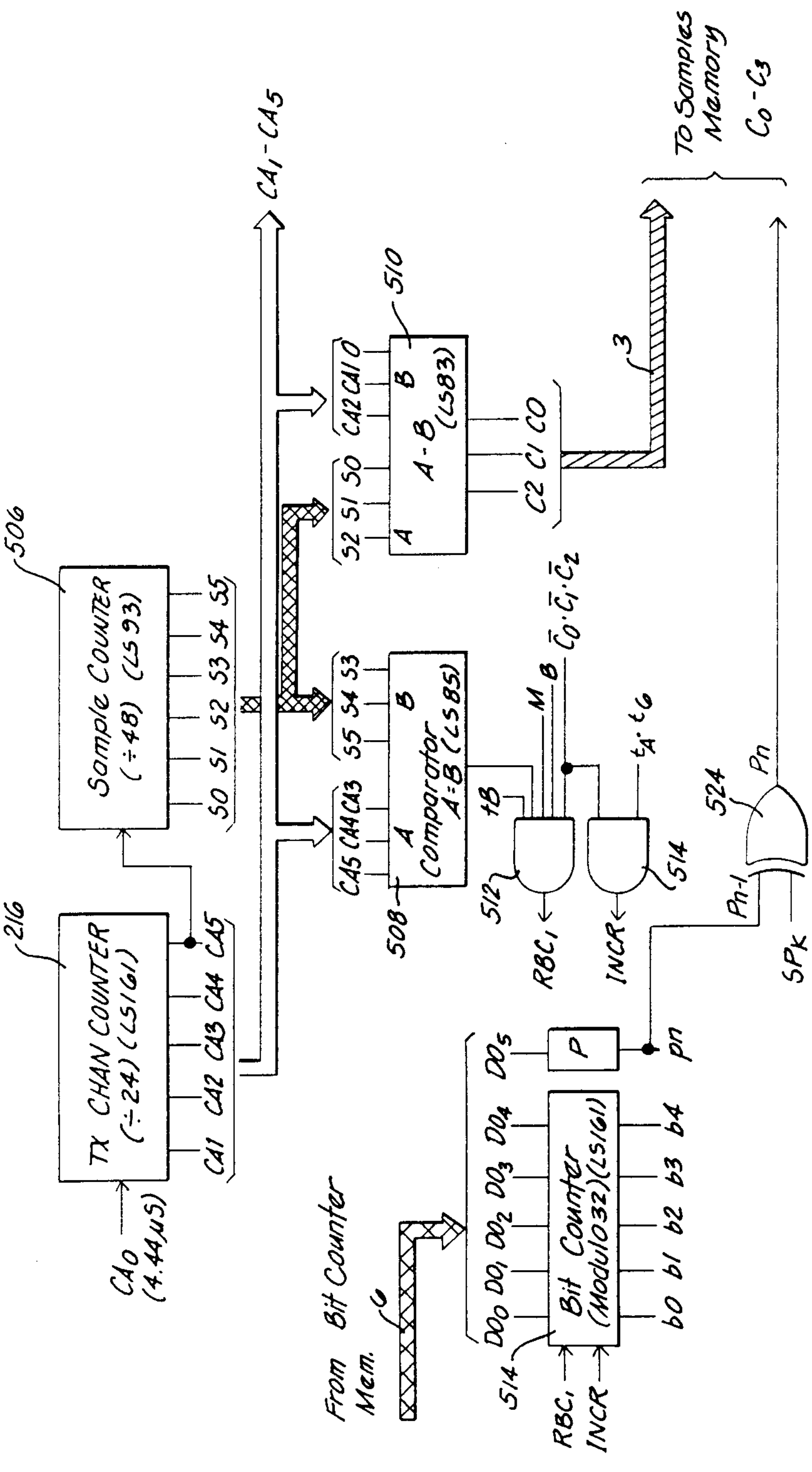
Figure 43C:
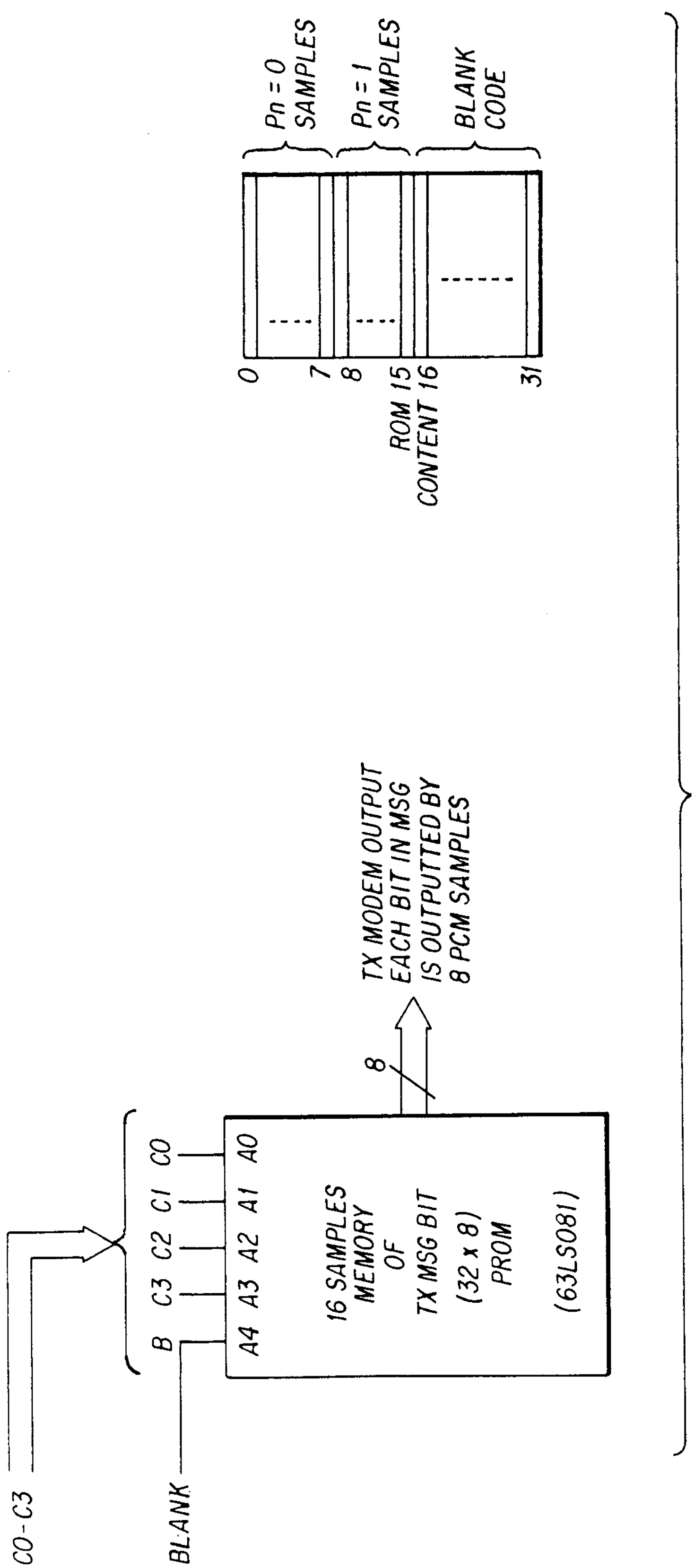
Figure 44A:
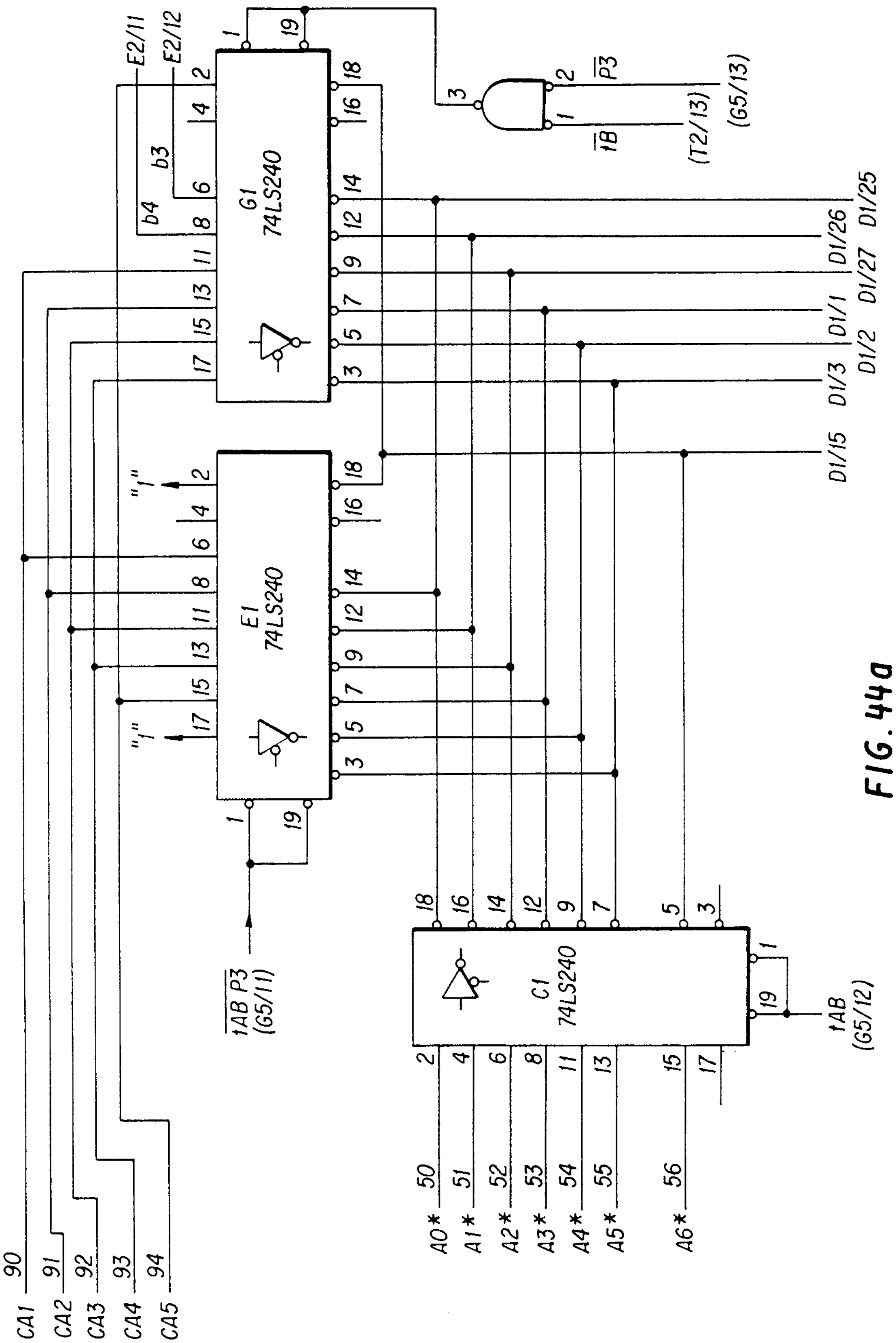
FIG. 44(*a* to *e*) is a schematic illustration of the modem transmitter.
Figure 44B:
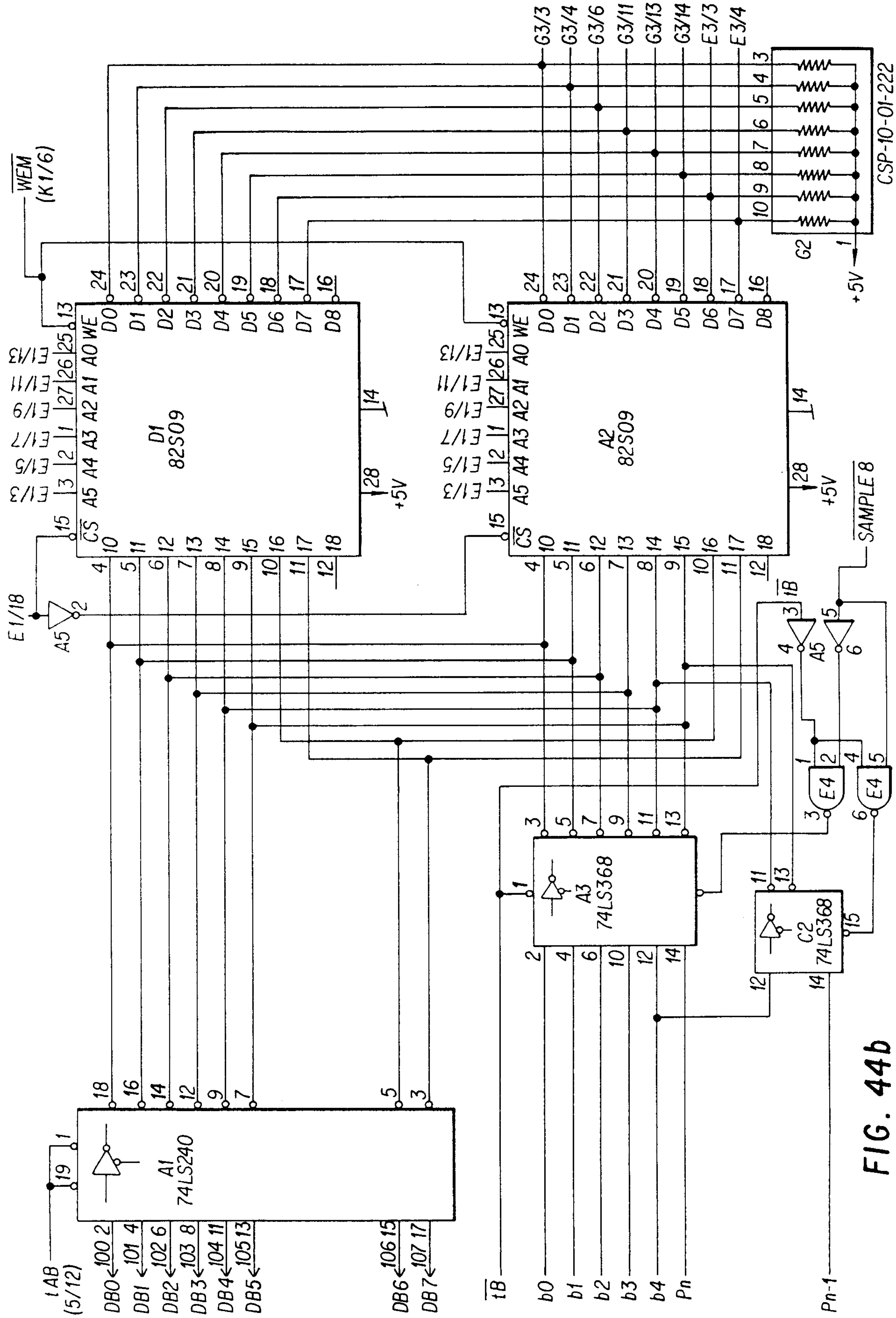
Figure 44C:
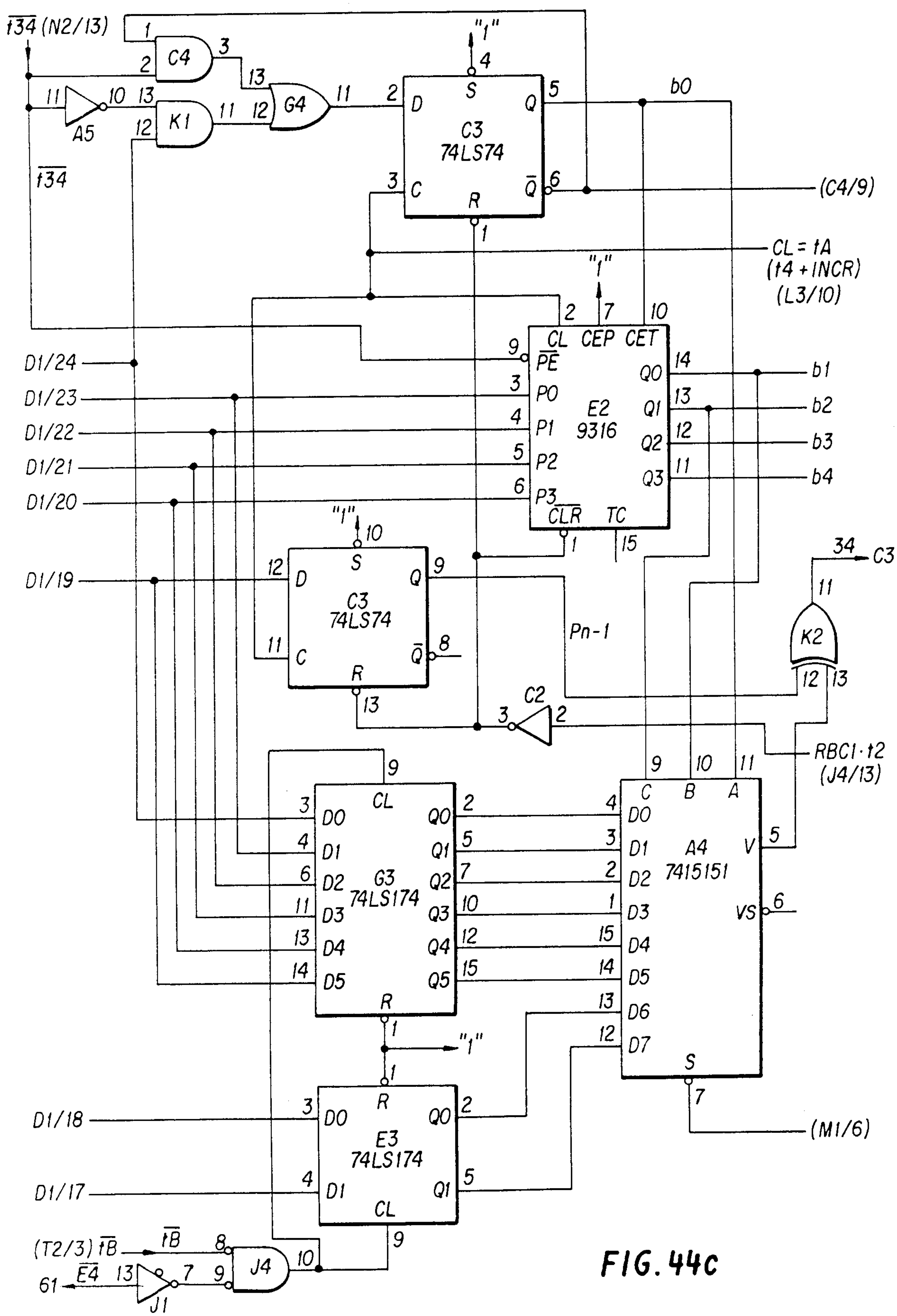
Figure 44D:
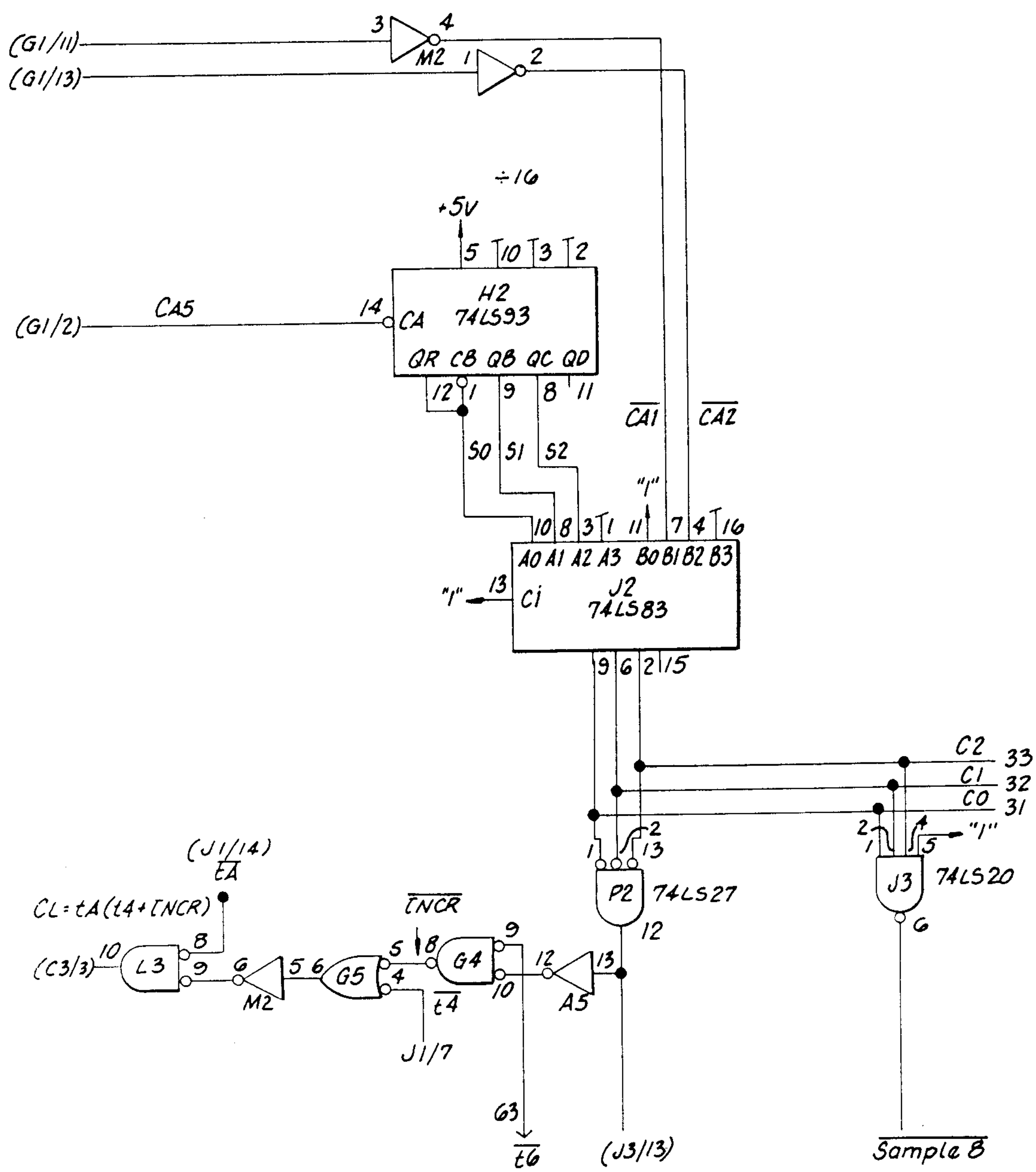
Figure 44E:
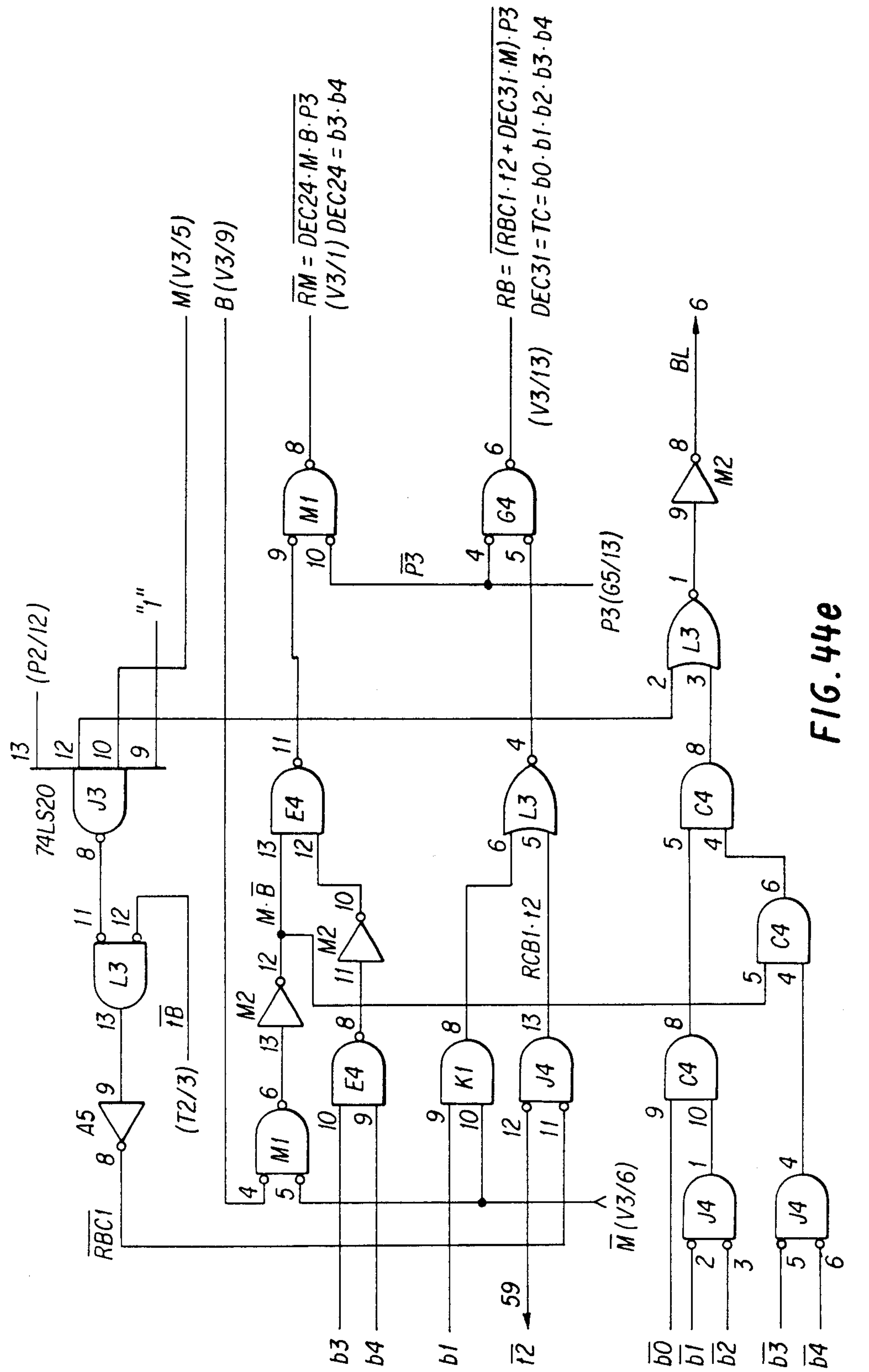

Modem transmitter 67 of FIG. 2 is illustrated in block diagram form of FIG. 43. The heart of the modem transmitter is a message memory 502 such as two 82S09. Message memory 502 receives inputs from a CPU data bus and contains the message to be transmitted along each of the 24 communication channels following a blank bit: 13 bits of Barker code, 8 bits of message data, one bit of parity and one reference bit required for DPSK transmissions for a total of 24 bits per channel arranged in three eight bit memory locations.

A secondary memory 504, such as an 82S09 serves to monitor all of the 24 communication channels to indicate the bit number for each channel to be transmitted and the state of transmission of the message at each channel. For each channel there is a location having 5 bits indicating which of the 24 communication channels is being transmitted and a phase bit used in DPSK coding.

The output of counter 216 (FIG. 2) is supplied to a divide by 48 sample counter 506 which provides a 6 bit output, the 3 most significant bits thereof indicating which communication channel is to be transmitted. By comparing the outputs of counters 216 and 506 the required matching between each channel and its predetermined time slot is achieved for enabling transmission.

The three most significant bits of the outputs of counters 216 and 506, which identify the channel are supplied to a comparator 508 which provides an output signal in response to sensed equality. The three least significant bits of the output of counter 506 are supplied to a subtractor 510. These bits represent the 8 DPSK samples of each data bit. The second input to the subtractor 510 comprises the two least significant bits of the output of counter 216 and a zero bit. It may thus be appreciated that the output of the subtractor is zero only at the beginning of the 8 sample sequence of a message bit for each channel.

A transmit enable signal RBC 1 is provided by an AND gate which receives the output from comparator 508, a zero output from subtractor 510, a t B timing signal indicating the blanking was just completed and M and B signals from transmit control memory 65 (FIG. 2).

The RBC 1 signal is supplied as reset to a bit counter 514 such as an LS 161 which also receives an increment signal from an AND gate 516 which receives the zero result signal from subtractor 510 as well as the combined timing signal t A·t 6.

Bit counter 514 receives a 5 bit output from memory 504 which sequences through the memory contents channel by channel. The appearance of an RBC 1 signal at the counter during a given channel indicates the occurance of a timeslot for commencement of message transmission.

The updated output of a bit counter 514 is supplied back to memory 504.

Message memory 502 is addressed via a 2/1 multiplexer 518 such as an LS 365 which receives inputs from the CPU address bus and also the CA 1–CA 5 outputs from counter 216. During the write cycle it receives the CPU address bus input and during the read cycle, the CA 1–CA 5 outputs which indicate the channel number. In a second operation cycle, message data is read out from message memory 502. In this cycle the memory 502 is addressed by the CA 1–CA 5 signals together with the two most significant bits of the output of the bit counter which indicate which of the three lines of data corresponding to each channel is to be read out to a latch 520 such as an LS 373.

The output of latch 520 is connected to a digital multiplexer 522 such as an LS 151 which is controlled by the three least significant bits of the output of bit counter 514, thereby to select one of the 8 data bits for transmission.

An exclusive OR gate 524 receives the output of digital multiplexer 522 and also receives the output of the memory 502 which indicates the phase of the previous bit.

The output of exclusive OR gate is supplied to the A 3 input of a programmable read only memory (PROM) 526 which stores sixteen samples, being the eight samples which comprise each of the two DPSK phases. Memory 526 also receives the B blanking output from a flip-flop 528. A flip-flop 530 provides the M message signal which is supplied to AND gate 512 together with the B signal. The reset input of flip-flop 530 and the set input of flip-flop 528 receive the $\overline{RM}$ input indicating completion of the 24th message bit transmission. A signal $\overline{RB}$ is generated seven message bit durations afterwards to terminate the blanking.

A detailed schematic illustration of the transmitter modem is provided in FIG. 44.

Figure 91A:
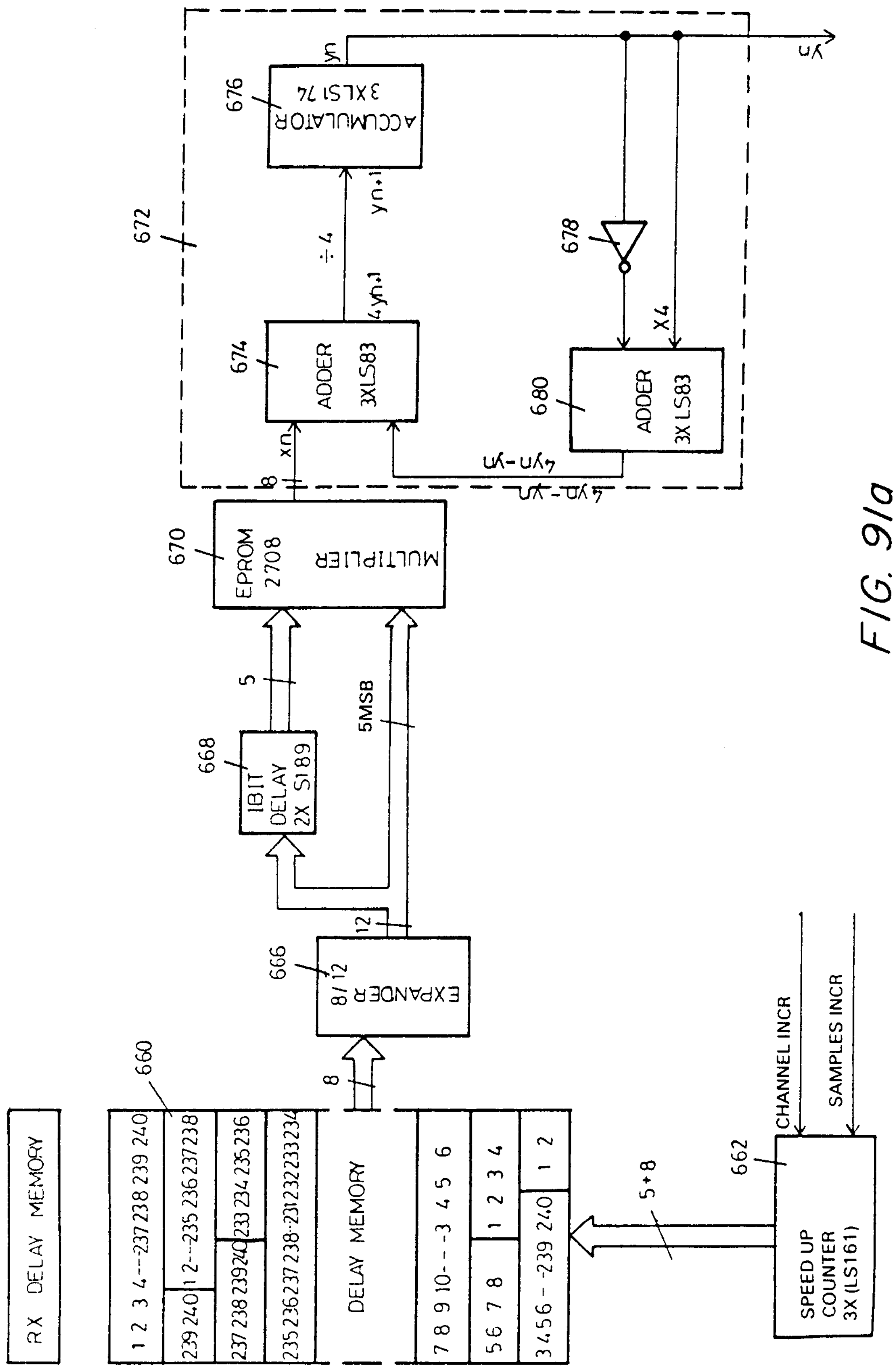
FIG. 91(*a* & *b*) is a block diagram of a synchronous modem receiver, divided into two parts a,b.
Figure 92A:
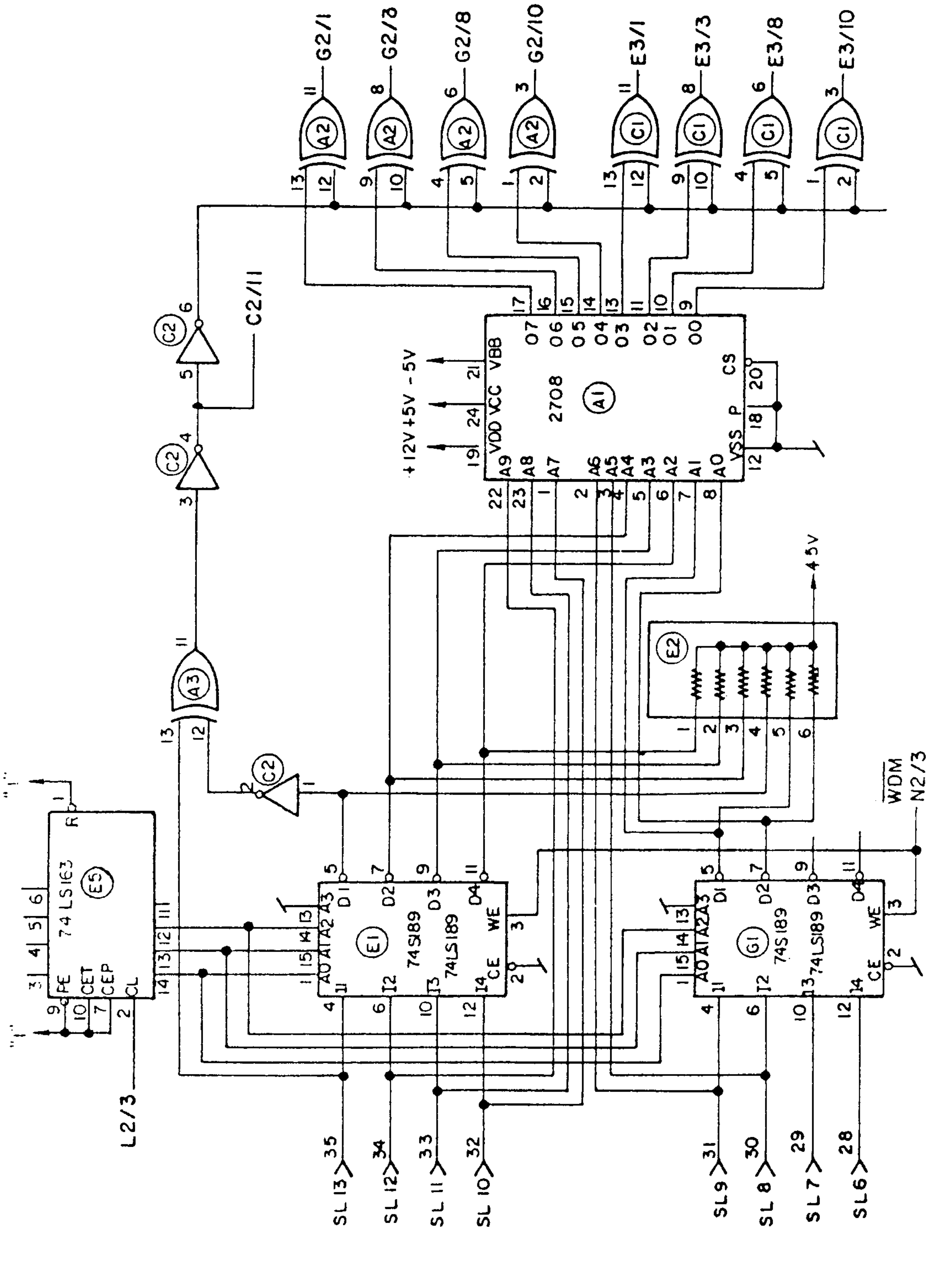
FIG. 92(*a* to *i*) is a schematic illustration of modem receiver circuitry shown in FIG. 91.
Figure 92B:
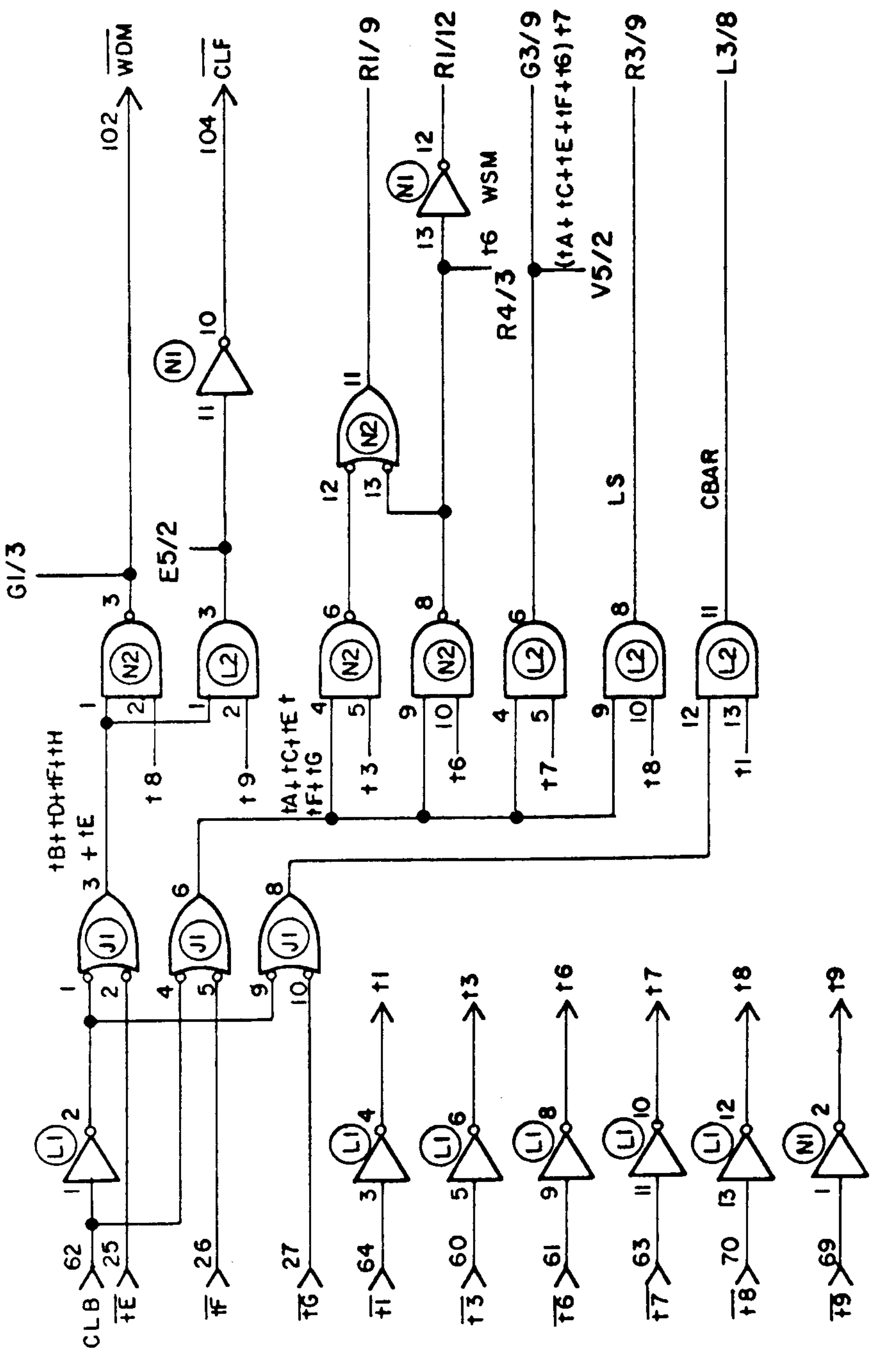
Figure 92C:
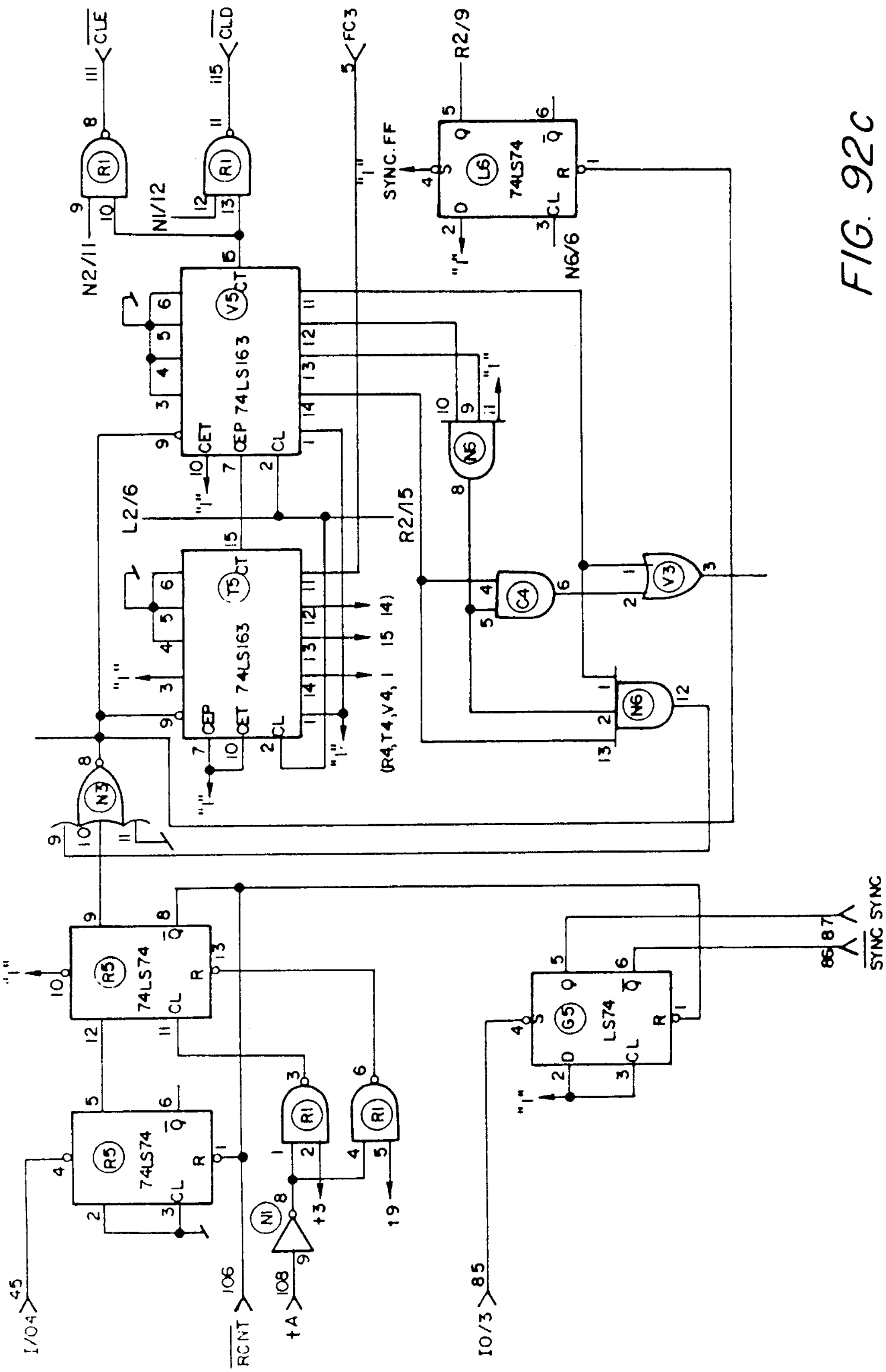
Figure 92D:
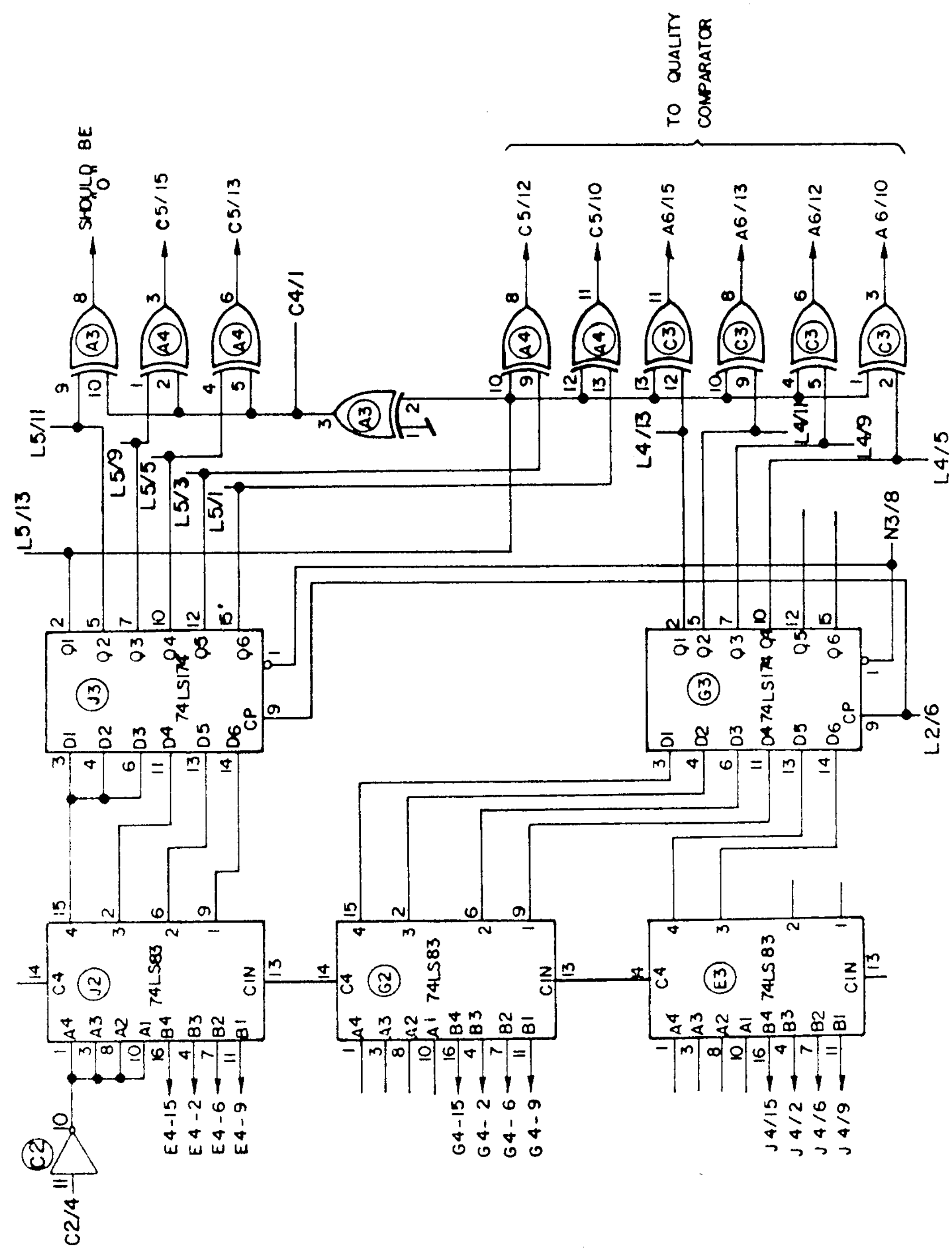
Figure 92E:
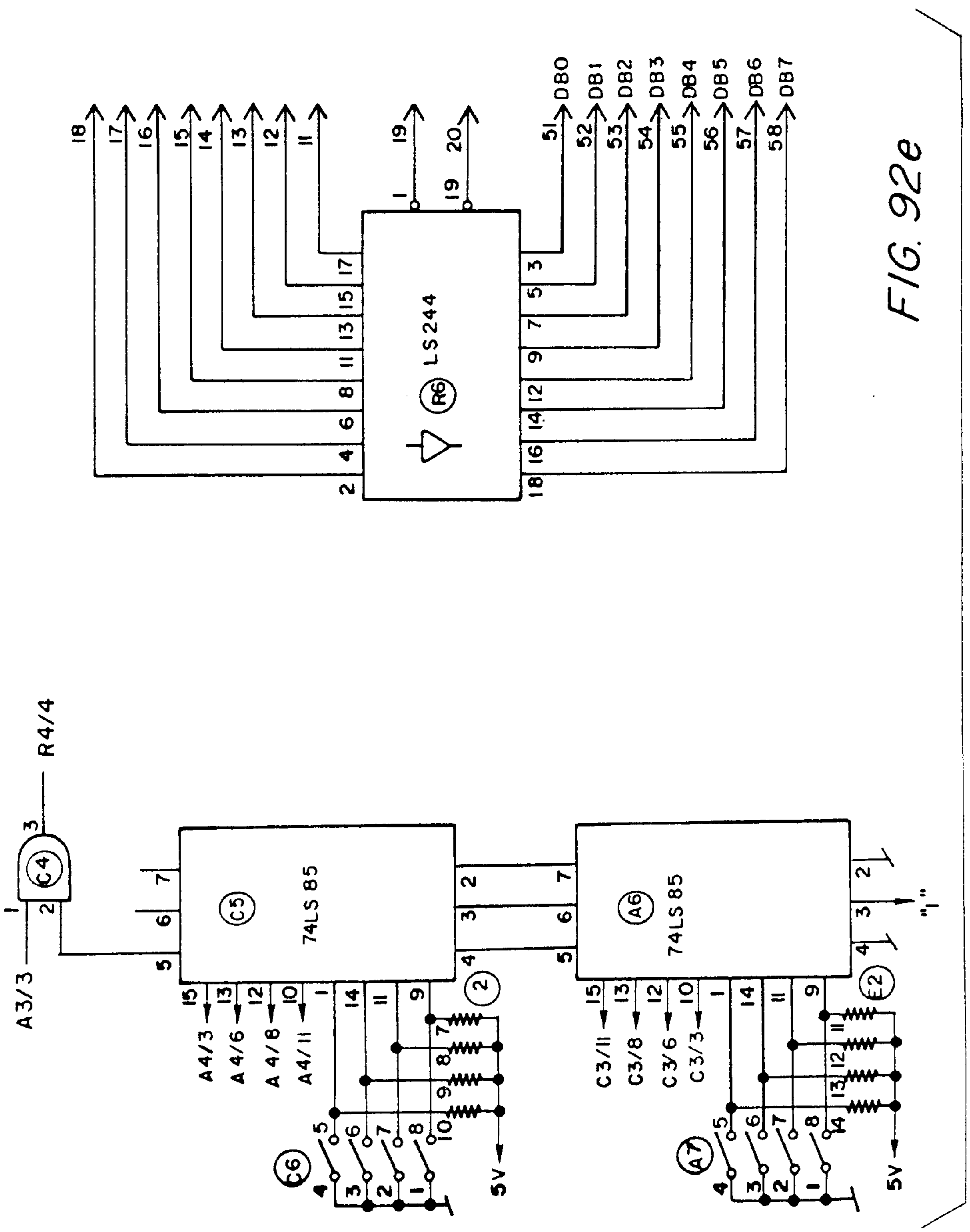
Figure 92F:
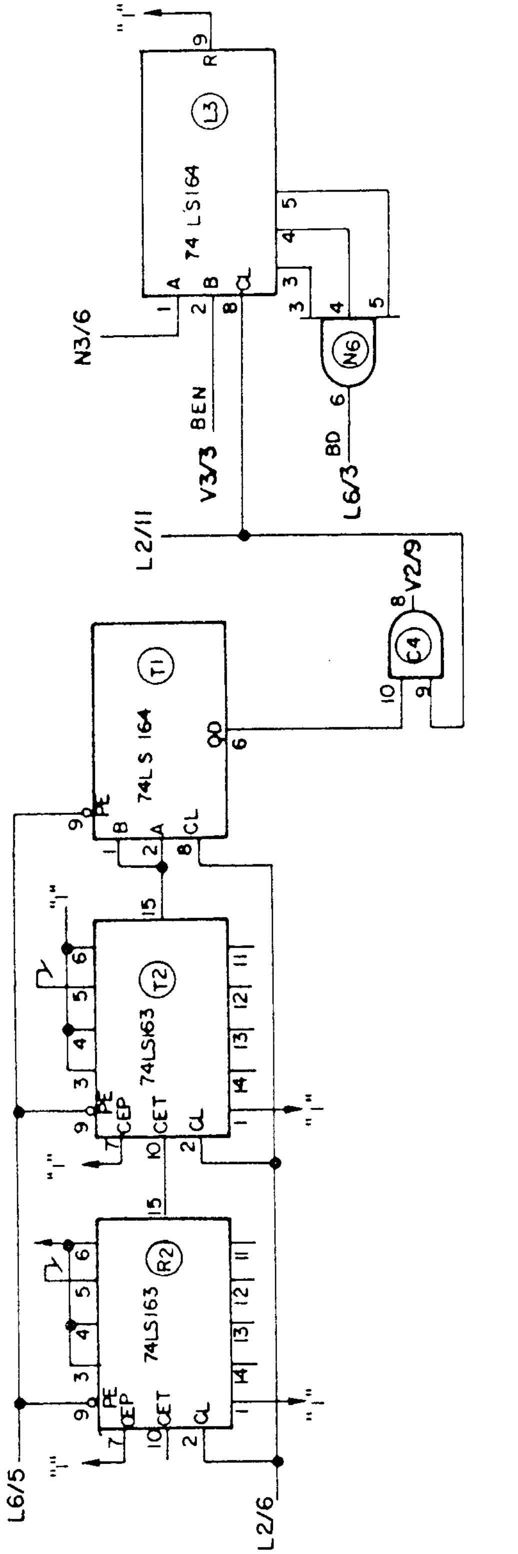
Figure 92G:
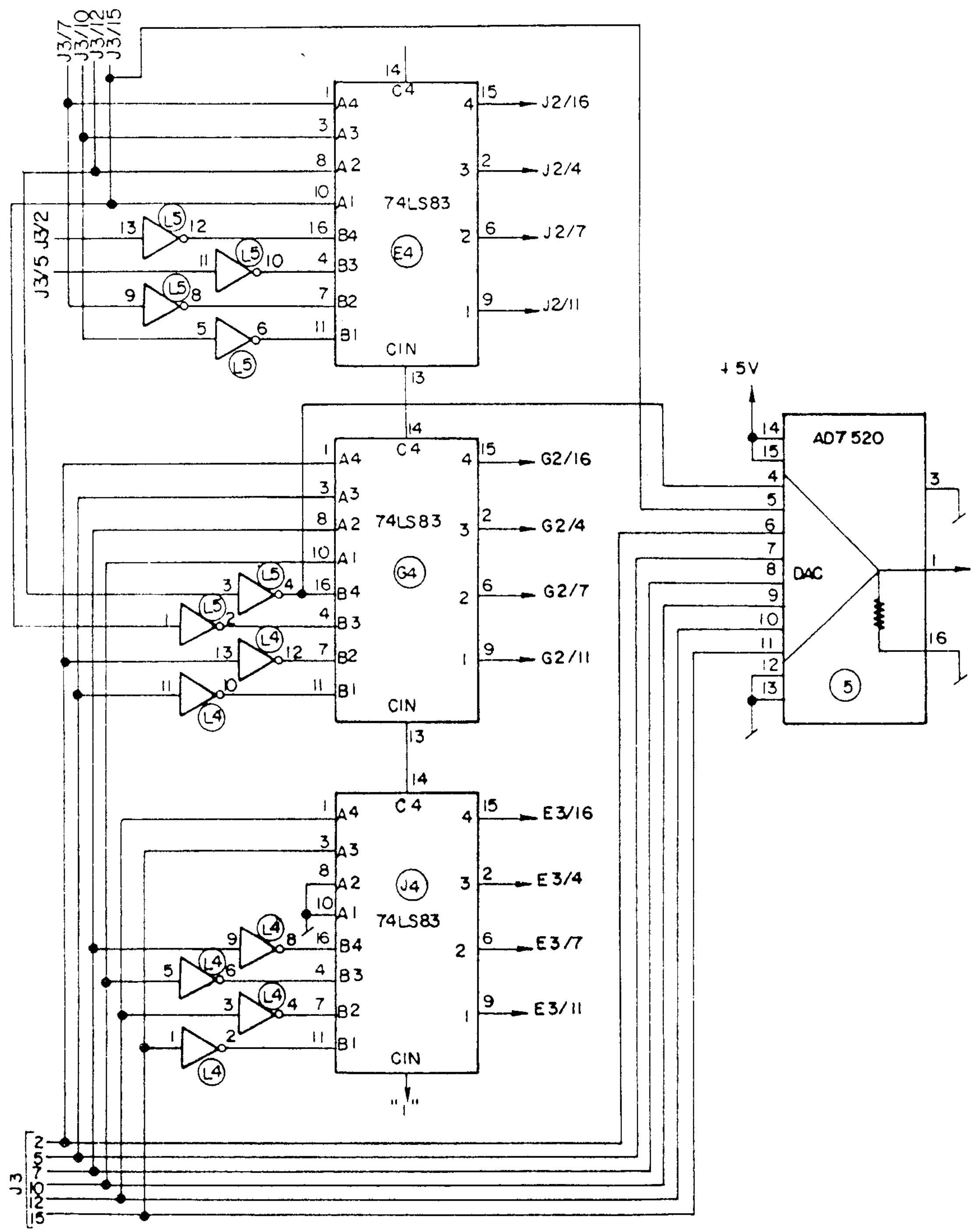
Figure 92H:
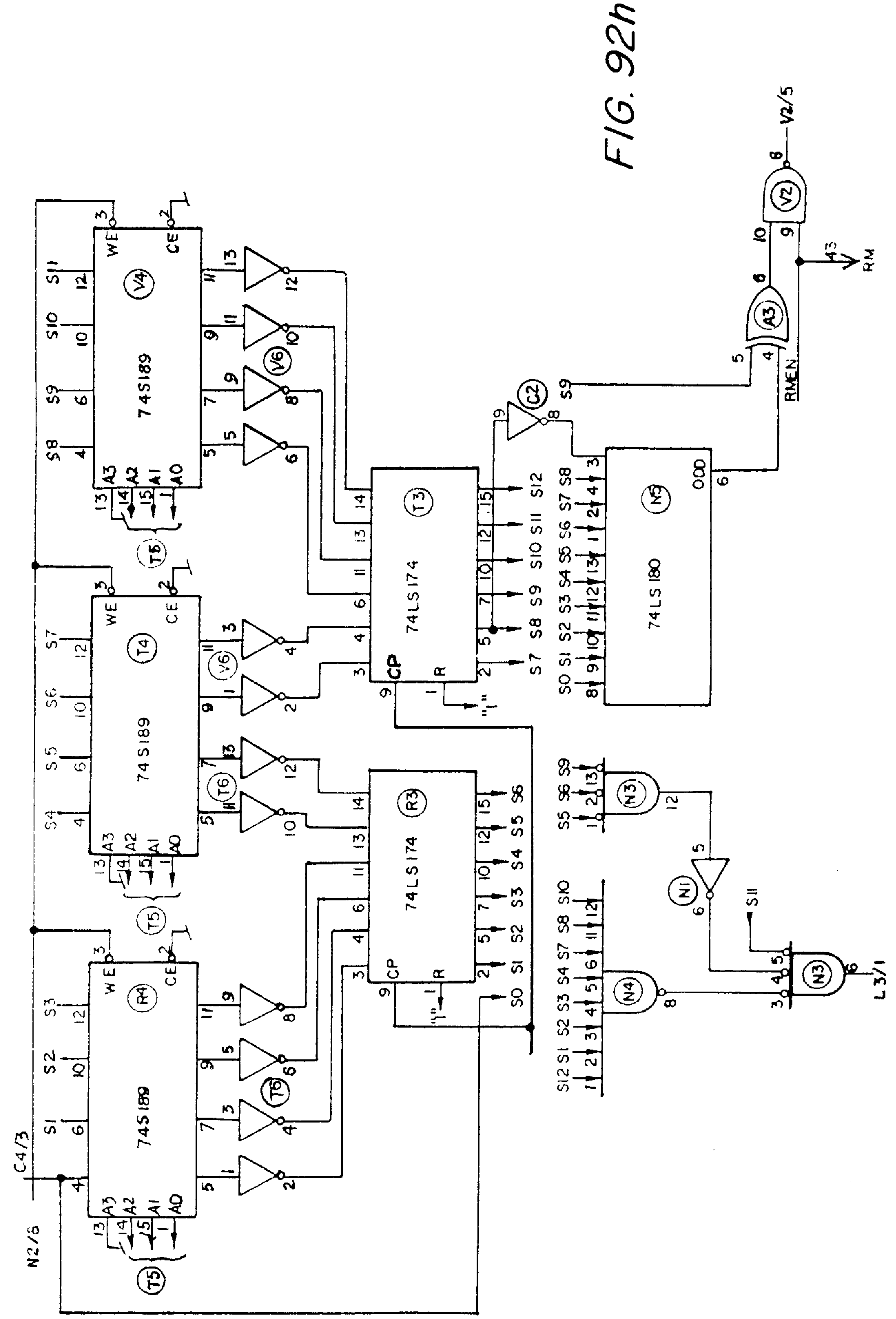
Figure 92I:
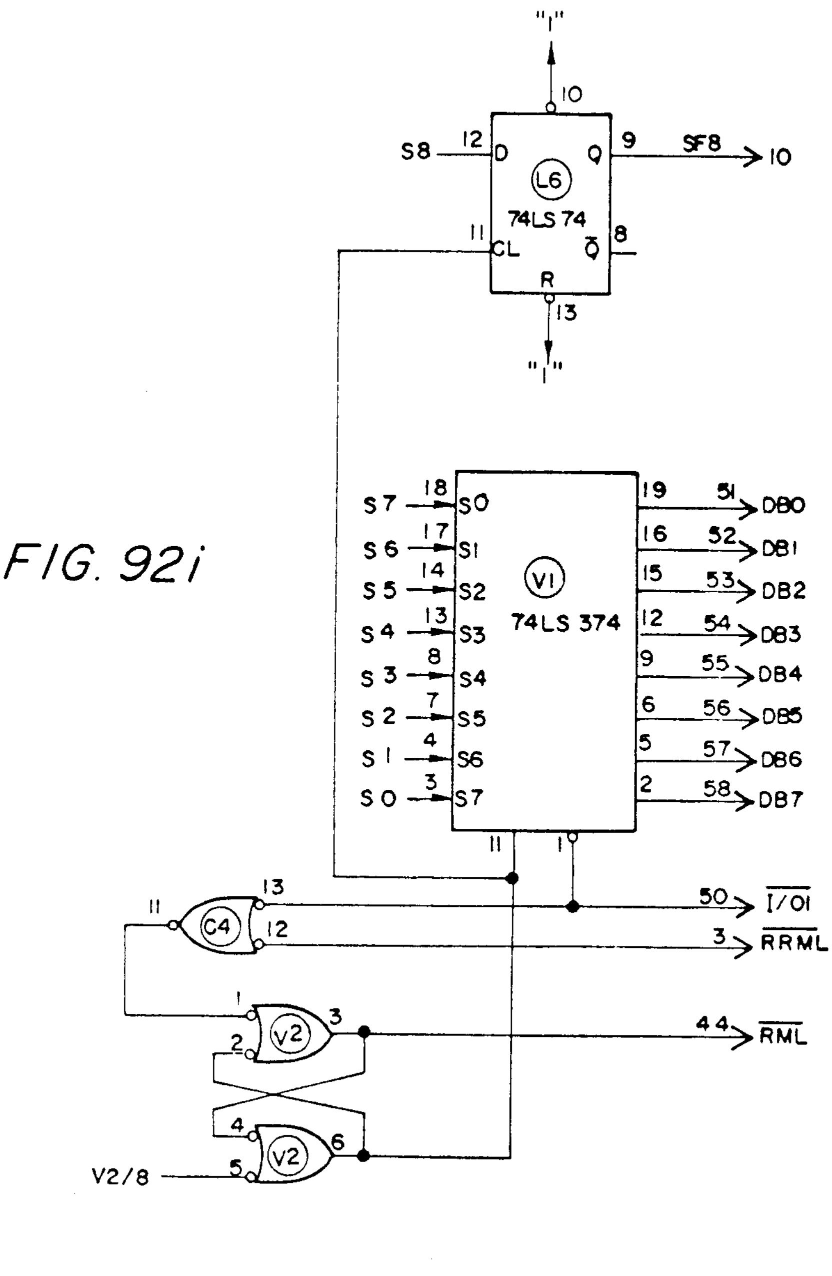

Reference is now made to FIG. 91*a, b* which illustrates in block diagram form message receiver circuitry 61 comprising a delay memory 660 (50 in FIG. 2) which contains 240 samples for each of 24 communication channels.

It is appreciated that control messages including assignment information are transmitted in TASI apparatus as described herein over the communication channels serially using DPSK modulation, generated by a modem transmitter and received by a modem receiver. The modem transmitter provides digital samples of an analog waveform. Thus the message transmission may employ either analog or digital transmission facilities. Each message comprises 24 data bits, each of which comprises eight digital samples. The modem transmitter operates cyclically in a time sharing mode for the 24 communication channels.

For each time slot corresponding to a communication channel, the modem transmitter checks the message status of the channel, computes the digital value of the message sample to be transmitted and outputs it to the transmit speech flow unit.

Message transmission is initiated by setting B (blank) and M (message) bits in the transmit control memory. A blank code is outputed form the modem transmitted until the designated time slot occurs. The 24 data bits of the message are then transmitted serially followed by a blanking period.

In accordance with a preferred embodiment of the invention, the message format comprises:

1. one bit period-internal blank
2. one bit period- DPSK reference
3. 12 bit period-Barker code
4. one bit period-parity
5. nine bit period-message data
   subdivided as follows:
      3 bits-message type
      6 bits-line number Returning now to the description of the receive delay memory 660, it is noted that the contents of the memory represent the last 240 samples for each communication channel. A speed up counter 662 causes the contents of delay memory to be scanned rapidly, such that each channel is scanned during 250 microseconds, i.e. 2 real time sampling intervals. Thus all 24 communication channels are scanned during a total of 48 real time sampling intervals.

Since the message length of 192 samples plus the total 24 channel scanning period of 48 samples exactly equals the 240 sample capacity of the memory for each channel, scanning of the delay memory 660 by the speed up counter 662 enables detection of the entire message irrespective of the timing relationship between the receiver timing and the incoming messages.

A samples counter 664 counts 240 samples for each channel. The samples counter includes a channel number section output which is incremented by one, to the next channel, each 240 samples, and also includes a sample counter section which is incremented by two, since each channel scan period is the length of two real time sampling intervals.

It is a particular feature of the modem receives circuitry described in FIG. 91*a,b* that it enables the receiver circuitry to operate with communication channels having different propagation times.

Receive delay memory 660 stores the samples in logarithmic form in accordance with the companding $\mu$ law. The samples are converted to a linear code by an expander 666 and the eight most significant bits of the linear output of the expander 666 are supplied to a 1 message bit delay circuit 668, typically comprising a memory which delays the eight DPSK samples forming each message bit by one message bit. The output of delay circuit 668 is supplied to a multiplier 670 which multiplies the value of each sample by the value of each delayed sample. The output $x\eta$ of multiplier 670 is supplied to a digital low pass filter 672.

Digital low pass filter 672 comprises an adder 674 which outputs to an accumulator 676, whose output is supplied directly and also via an inverter 678 to a second adder 680. The output of adder 680 is supplied as a second input to adder 674. Filter 672 is of first order with a 3dB frequency of 2 KHz. It executes the following function:

$$y_{\eta+1} = y_\eta + \tfrac{1}{4}(x_\eta - y_\eta)$$

where $y_\eta$ is the output filter 672 for the $\eta$'th sample.

The $y_\eta$ output of filter 672 at the output of accumulator 676 is supplied via x or gates 681 which generate absolute value to a magnitude comparator 682 which compares it with a predetermined threshold. The output of the magnitude comparator 682 is supplied via an AND gate 684 which receives the sign bit of $y_{72}$.

If the magnitude of $y_\eta$ is less than the predetermined threshold, then the output of AND gate 684, hereinafter termed $S_o$, is zero. The $S_o$ output is supplied to a memory 686. Memory 686 stores the last 96 samples of $S_o$ and provides outputs $S_1$–$S_{12}$. The time relationship between outputs $S_o$–$S_{12}$ is such that there is an interval of 8 sampling intervals between adjacent outputs $S_n$ and $S_{n-1}$. Since each message bit comprises 8 samples, the outputs $S_1$–$S_{12}$ are each samples of a corresponding message bit.

The outputs $S_1$–$S_{12}$ are supplied to a 12-bit Barker code detector 688. In the preferred embodiment the Barker code is selected to be 111100110101. When the Barker code is detected for three consecutive sampling intervals, a nine-bit counter 690 is enabled. Counter 690 counts 9 bit periods, which are equivalent to 72 samples. When counter 690 completes its count, outputs $S_o$–$S_9$ comprise nine message bits and a parity bit. A parity check circuit 692 receives outputs $S_0$–$S_9$ fro m the memory 686 and determines if parity is present. If parity is present, circuitry 692 provides an output to an AND gate 694 which also receives the output from counter 690.

The output of AND gate 694 referred to hereinafter as RM is supplied as a CPU interrupt signal to indicate receipt of a message and is also supplied to a message register 696, causing register 696 to store outputs $S_0$–$S_8$ of the output of memory 686. Message register 696 also interfaces with the CPU data bus of TASI type apparatus as described hereinabove.

FIG. 92 is a detailed schematic illustration of message receiver circuitry of FIG. 91*a,b*.

Figure 45A:
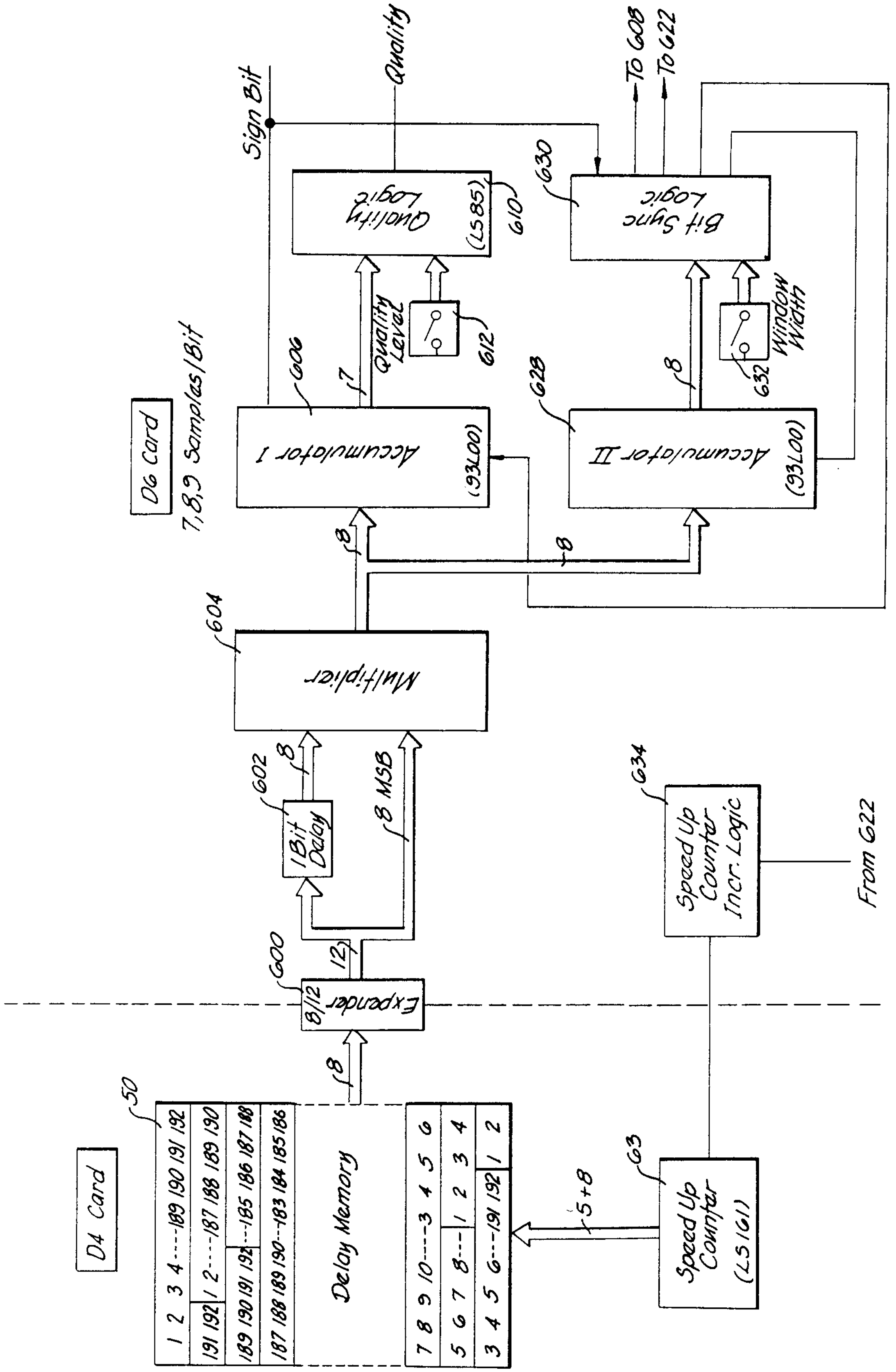
FIG. 45(*a* & *b*) is a block diagram of the modem receiver.
Figure 45B:
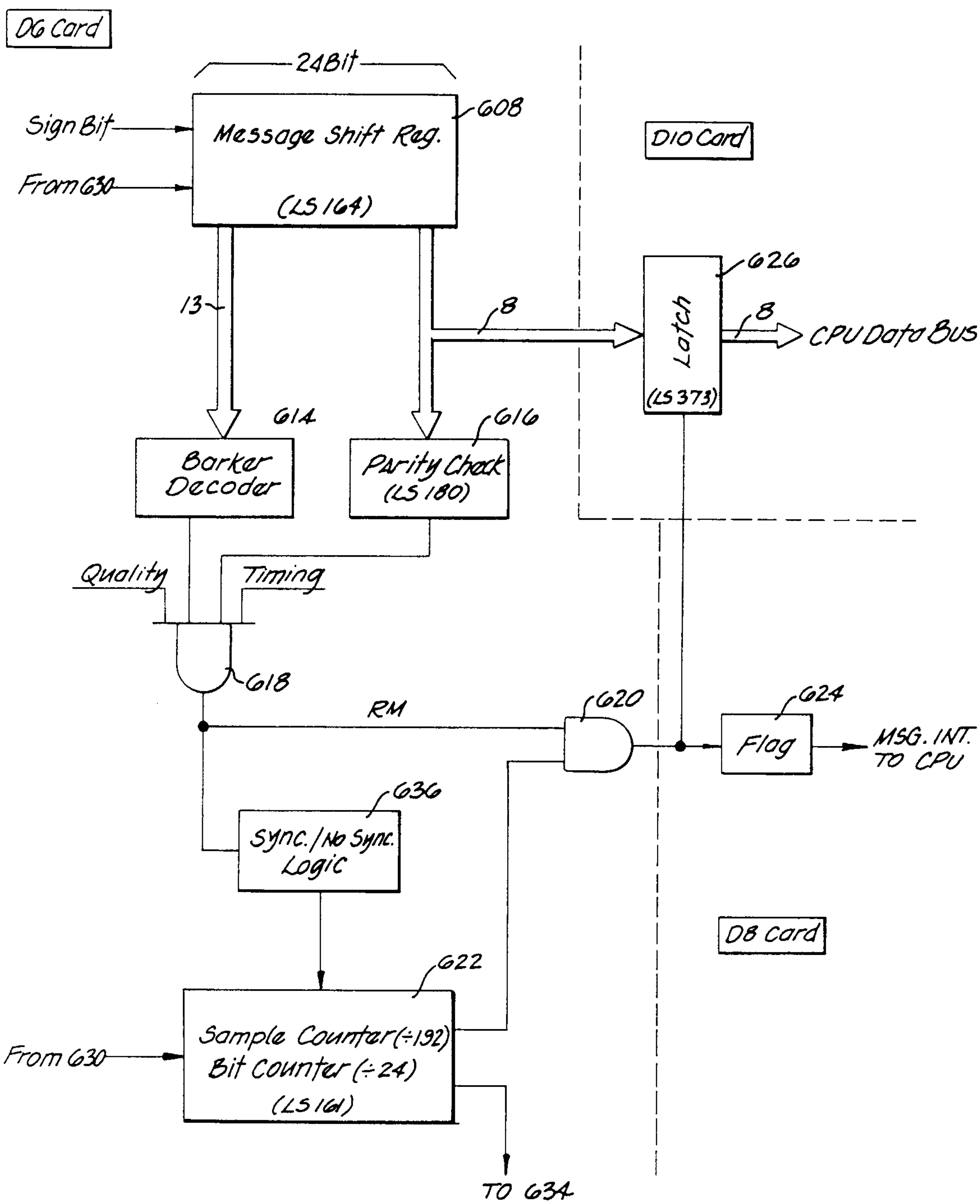
Figure 46A:
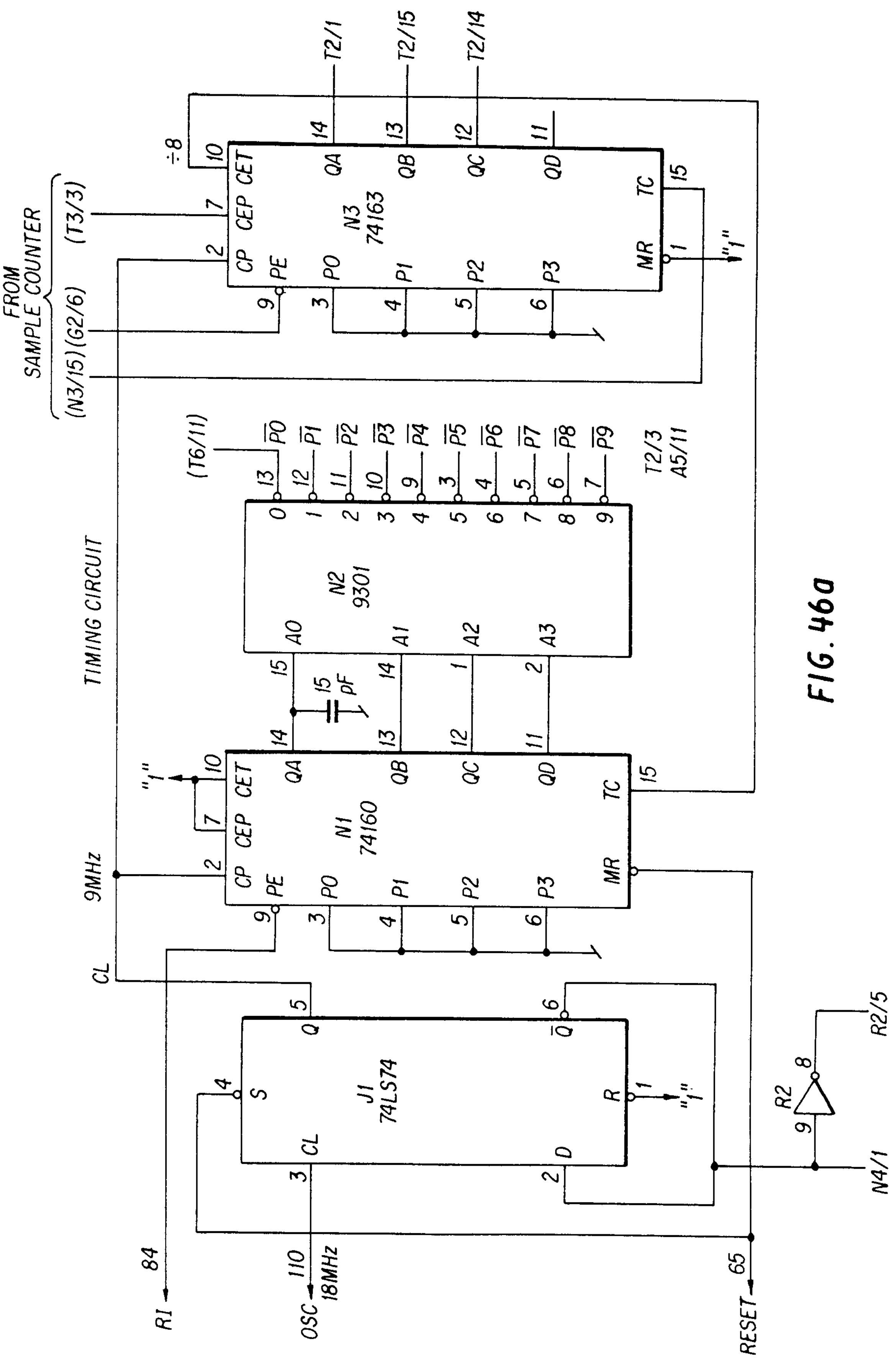
FIG. 46(*a* to *f*) is a schematic illustration of receiver modem circuitry.
Figure 46B:
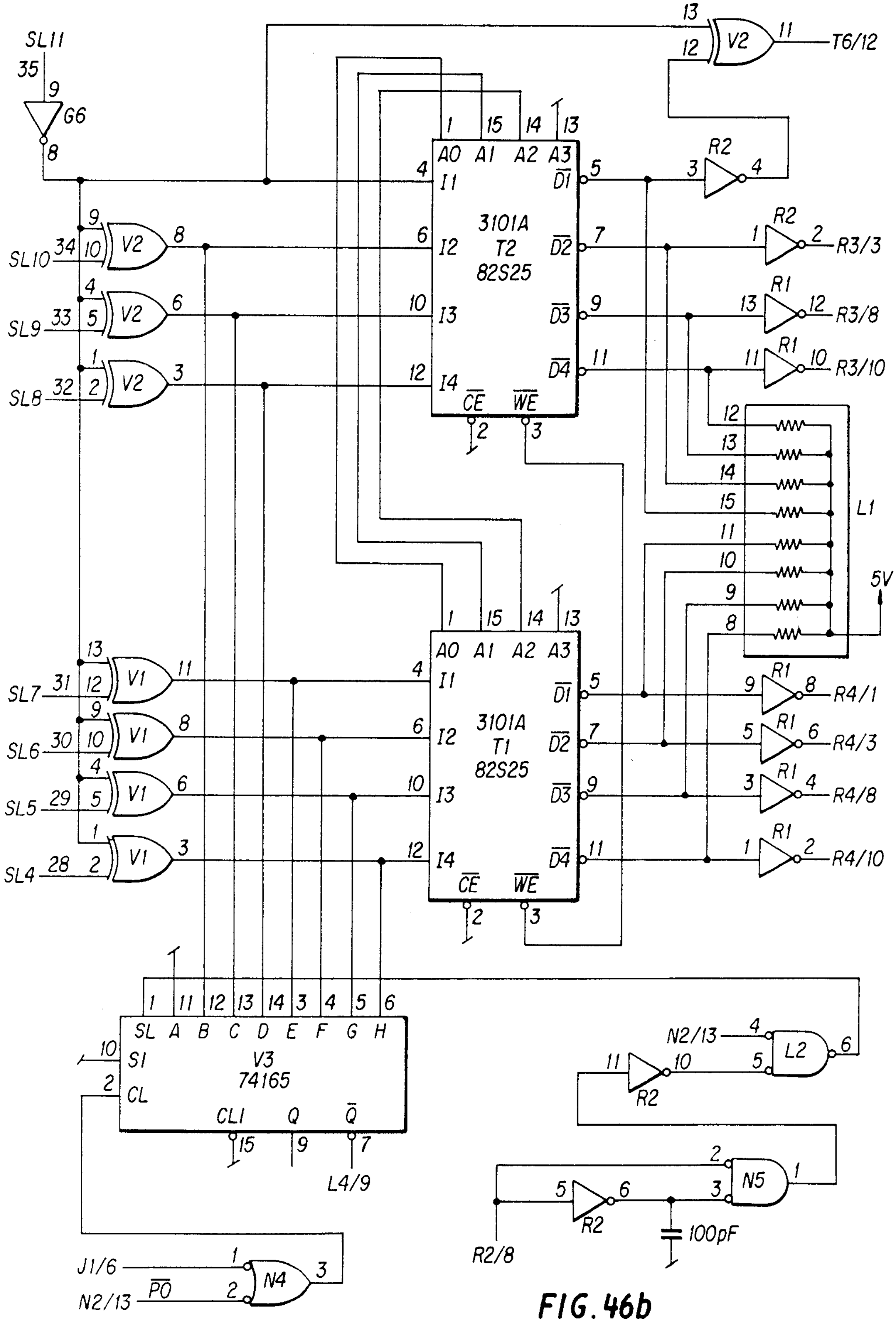
Figure 46C:
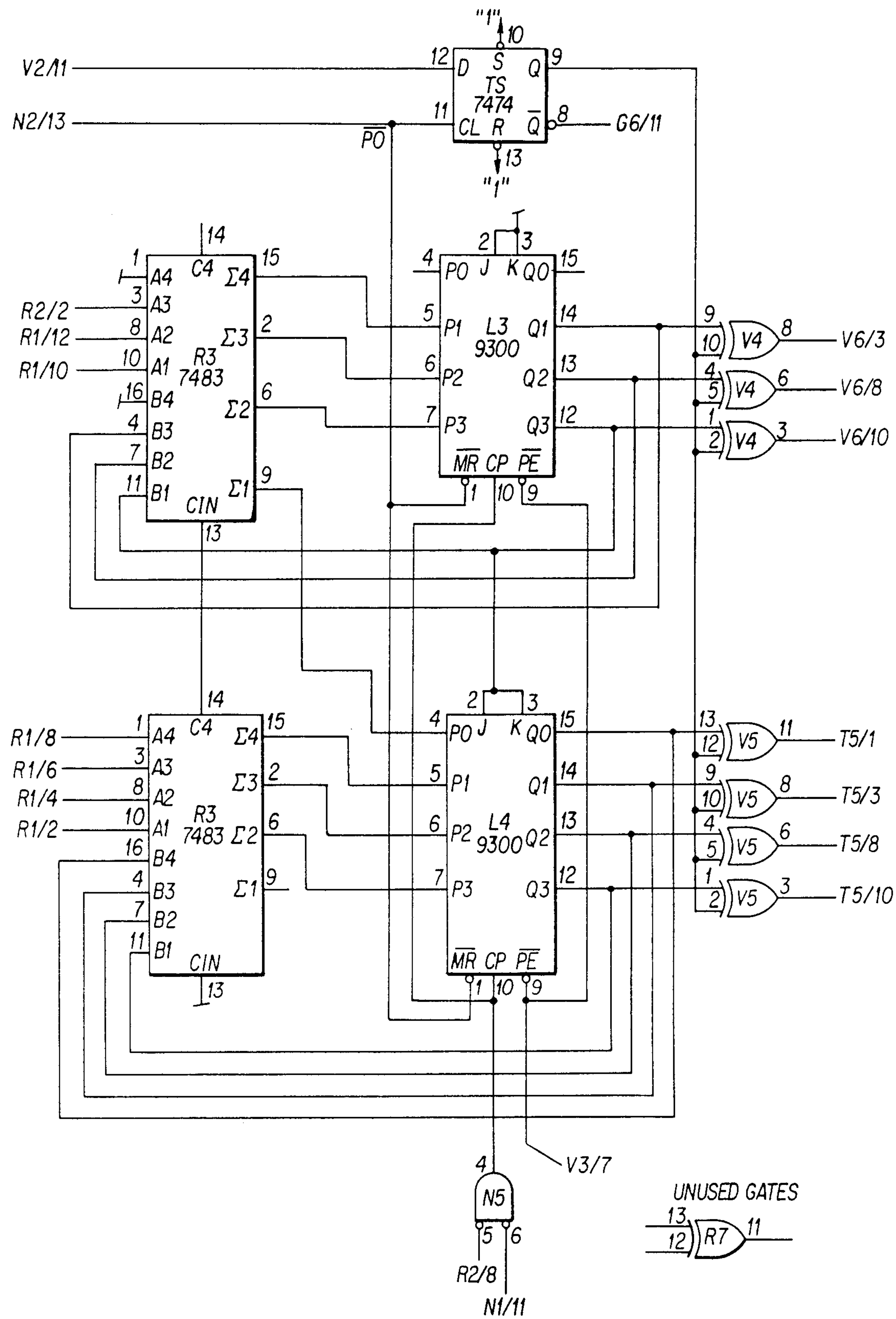
Figure 46D:
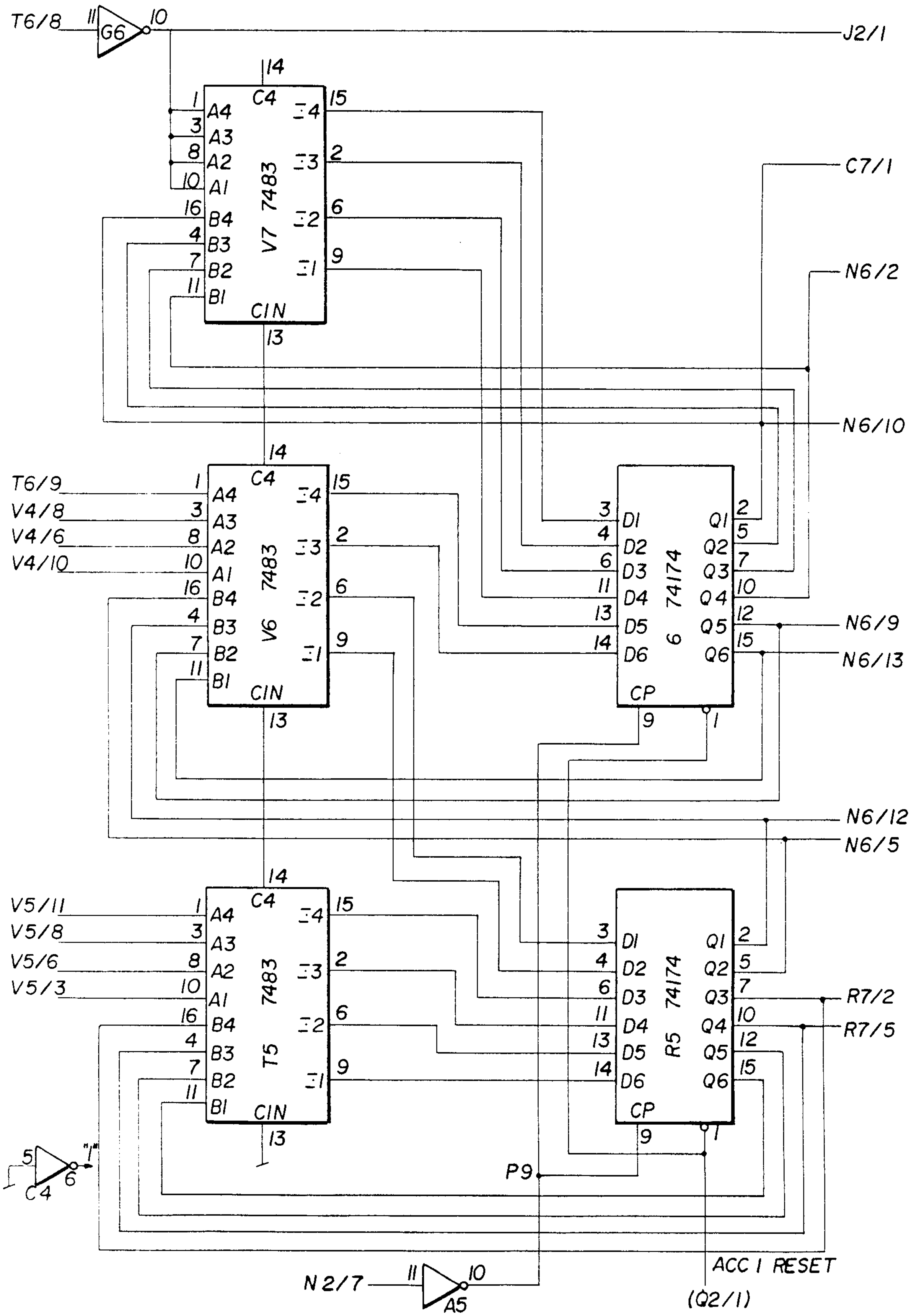
Figure 46E:
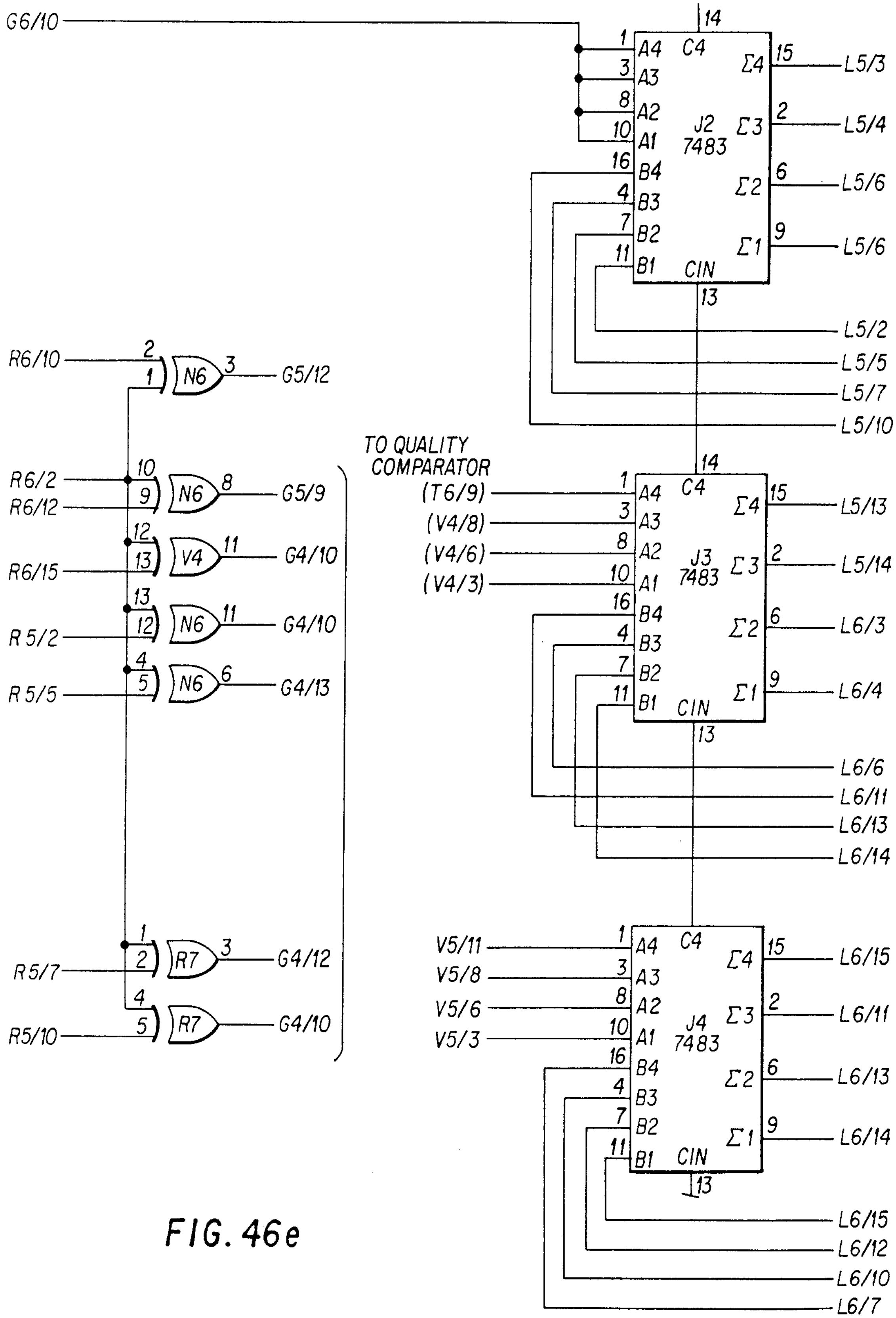
Figure 46F:
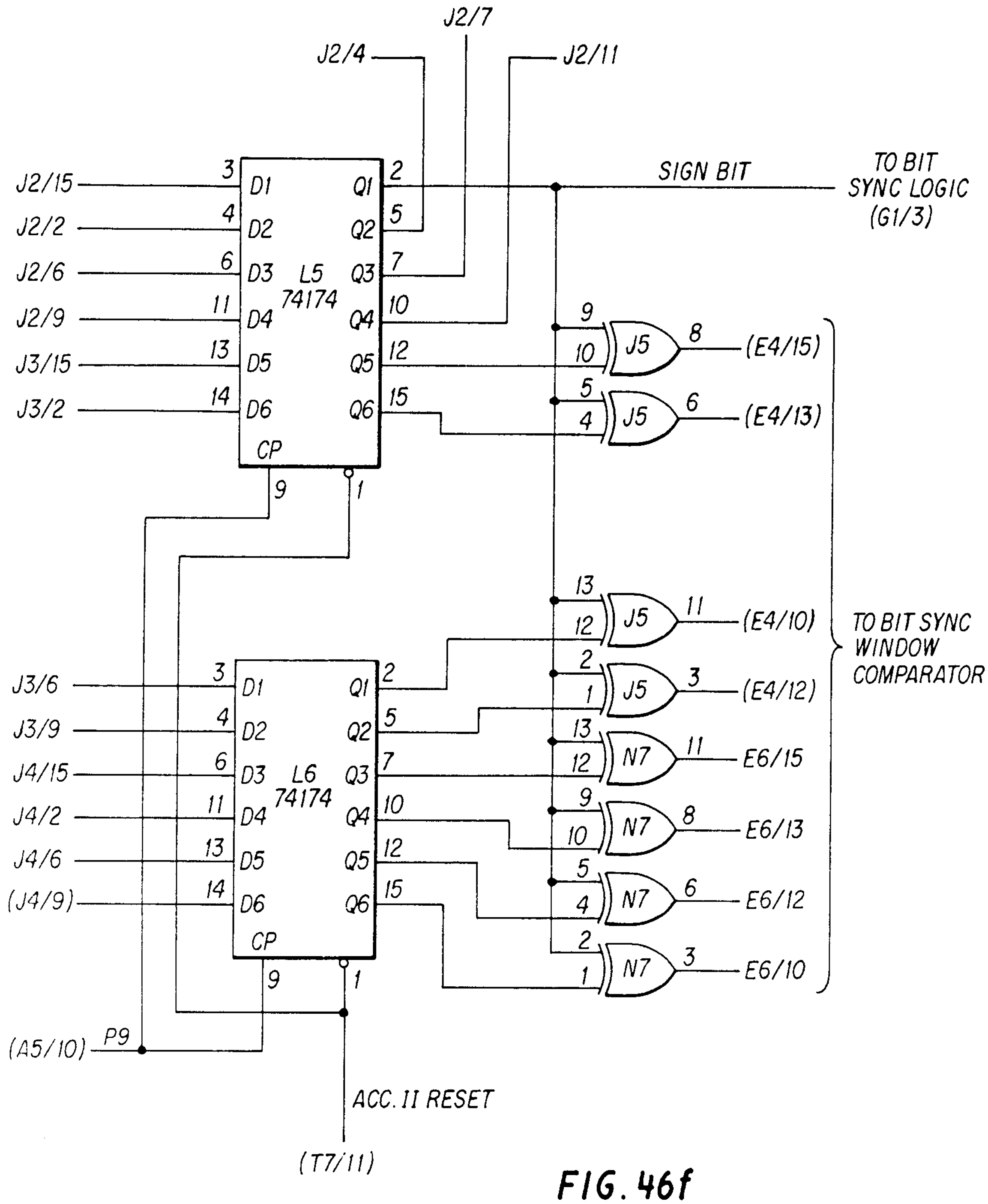
Figure 47A:
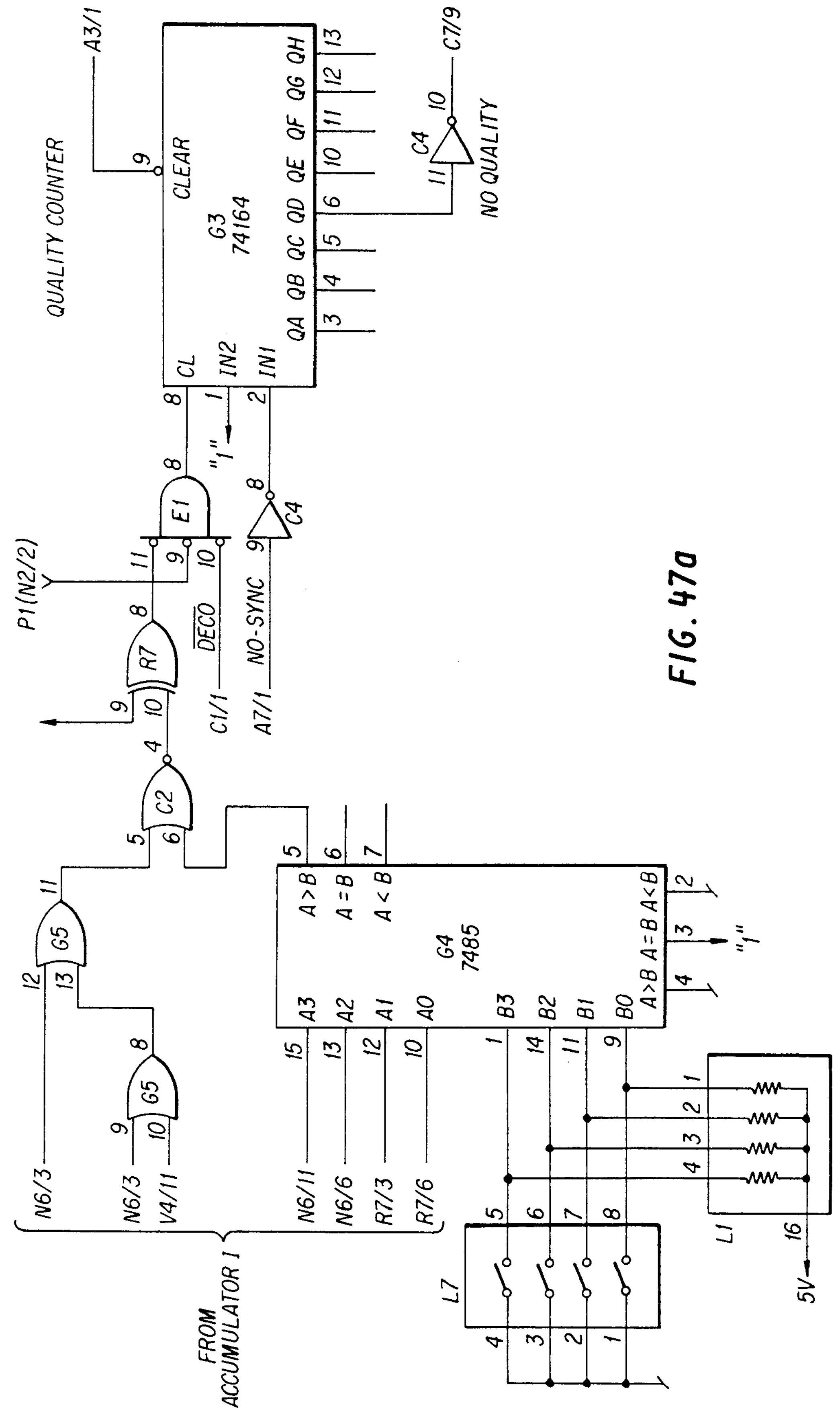
FIG. 47(*a* to *g*) is a schematic illustration of synchronization logic circuitry.
Figure 47B:
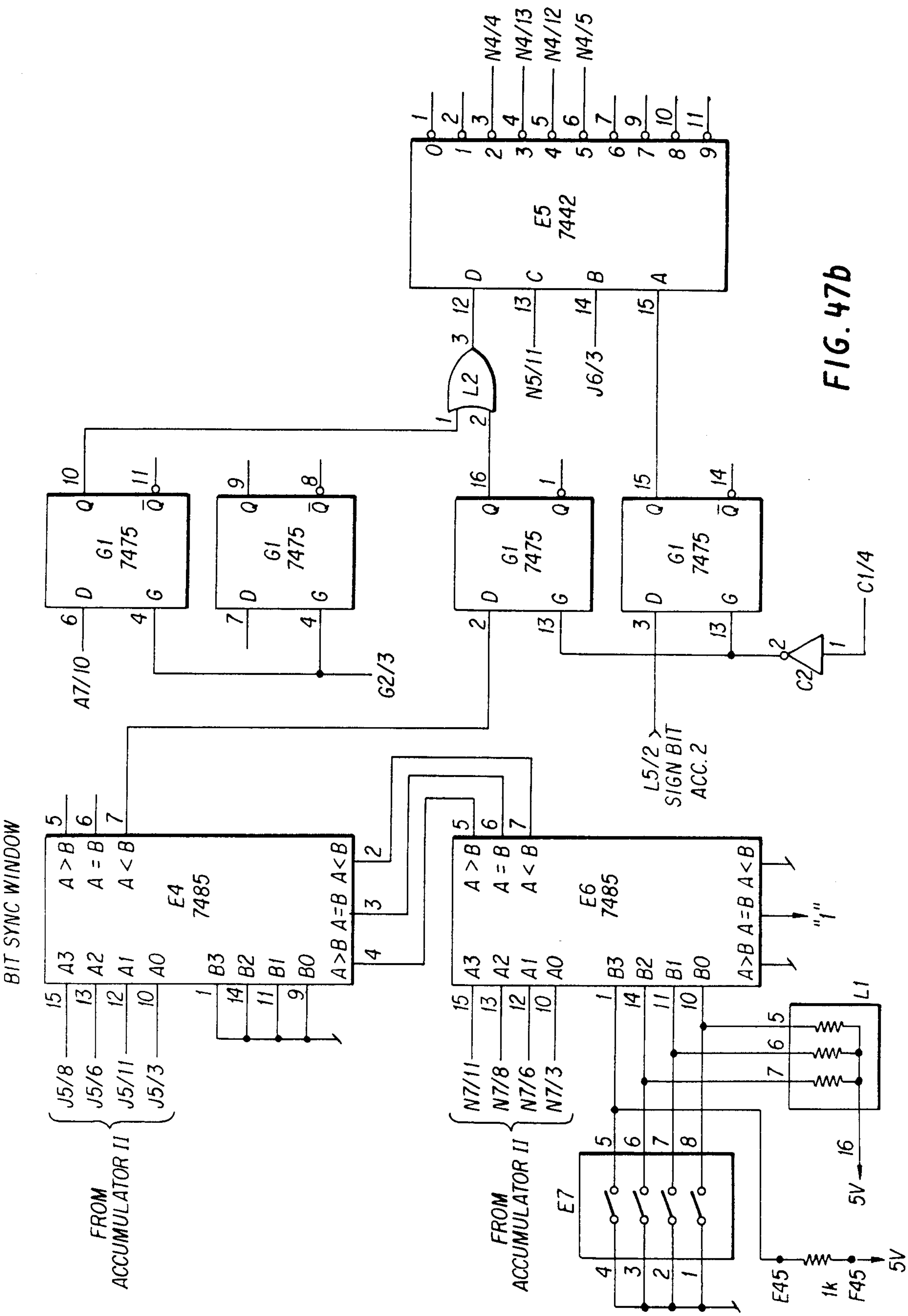
Figure 47C:
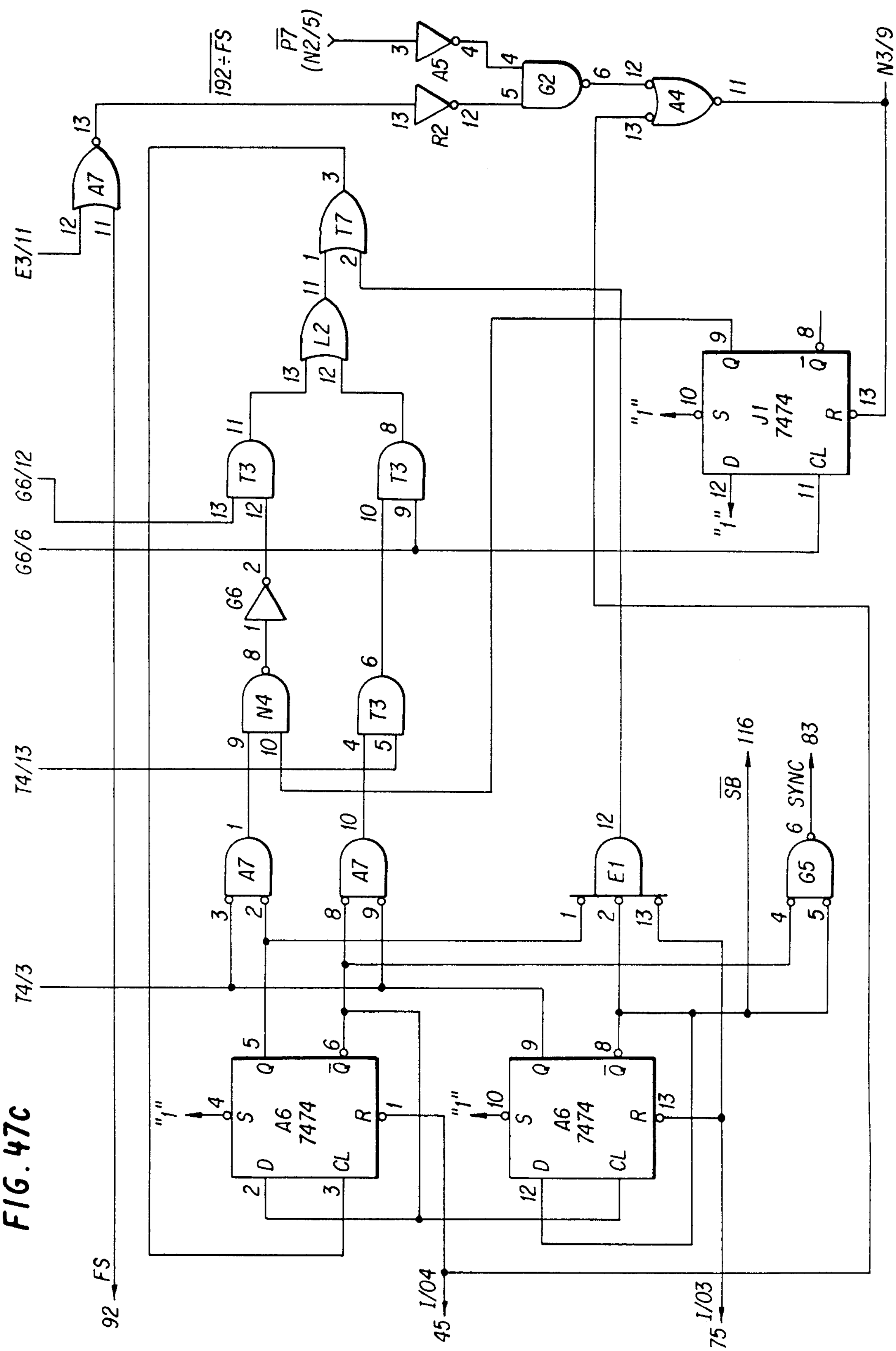
Figure 47D:
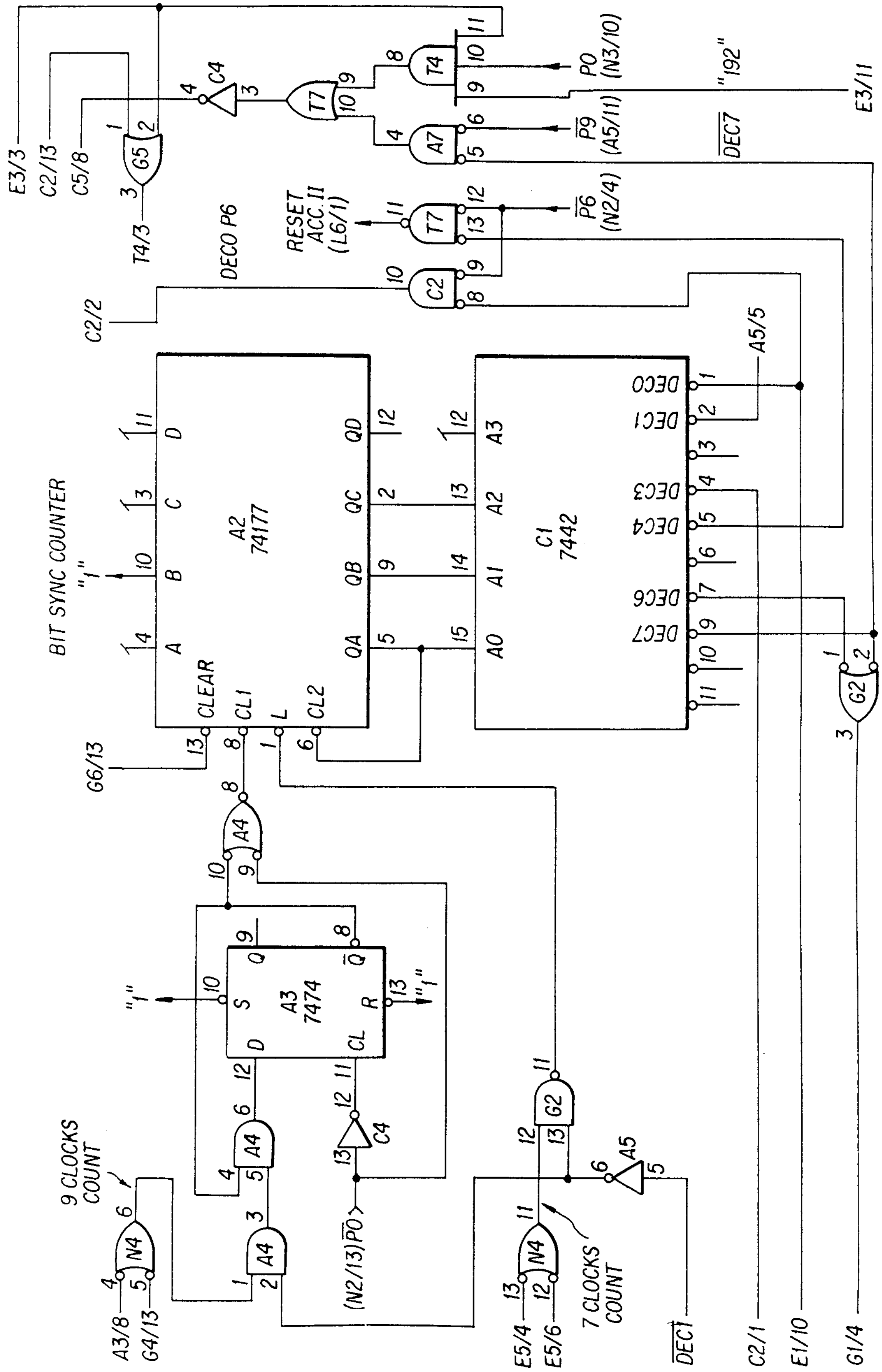
Figure 47E:
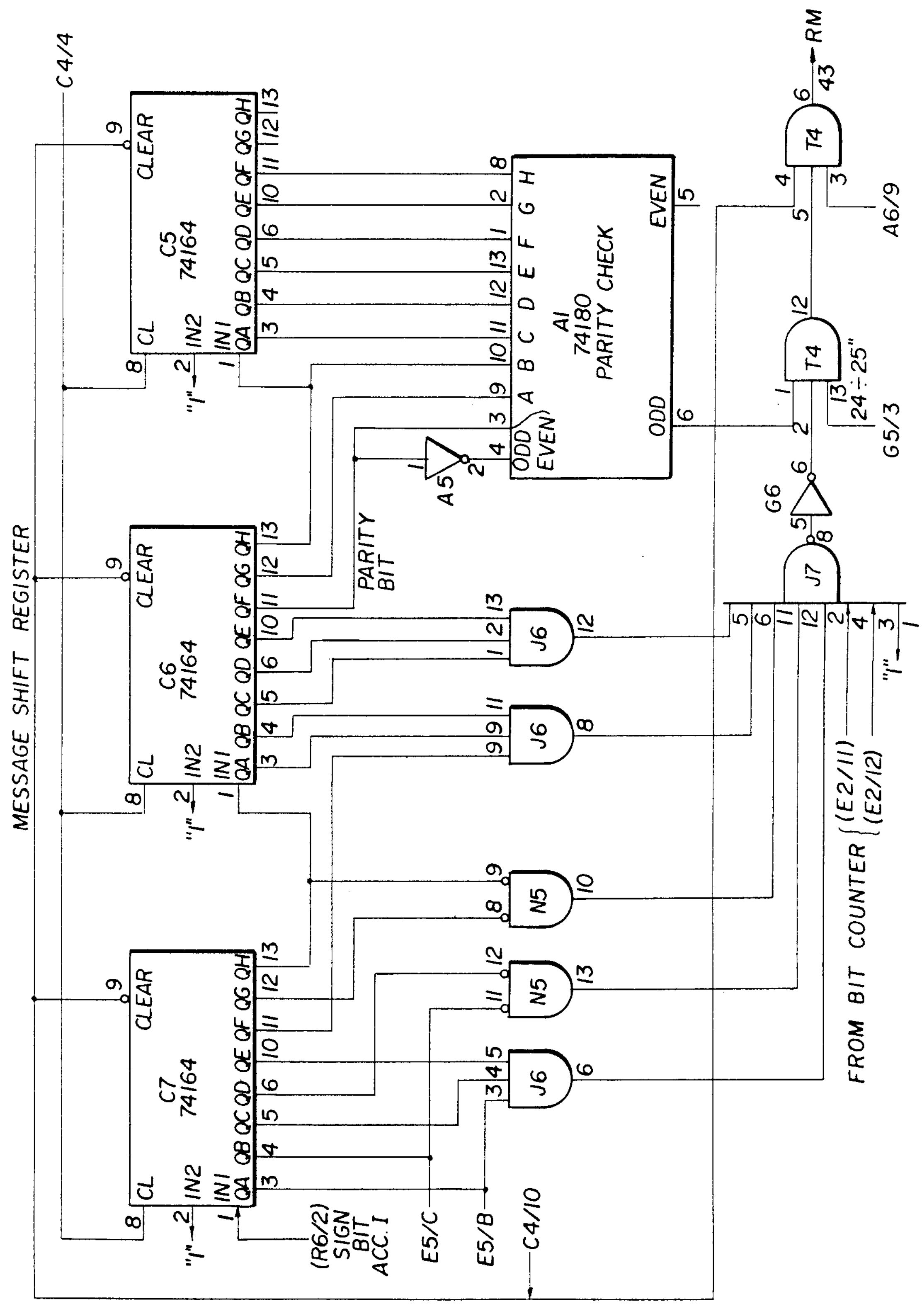
Figure 47F:
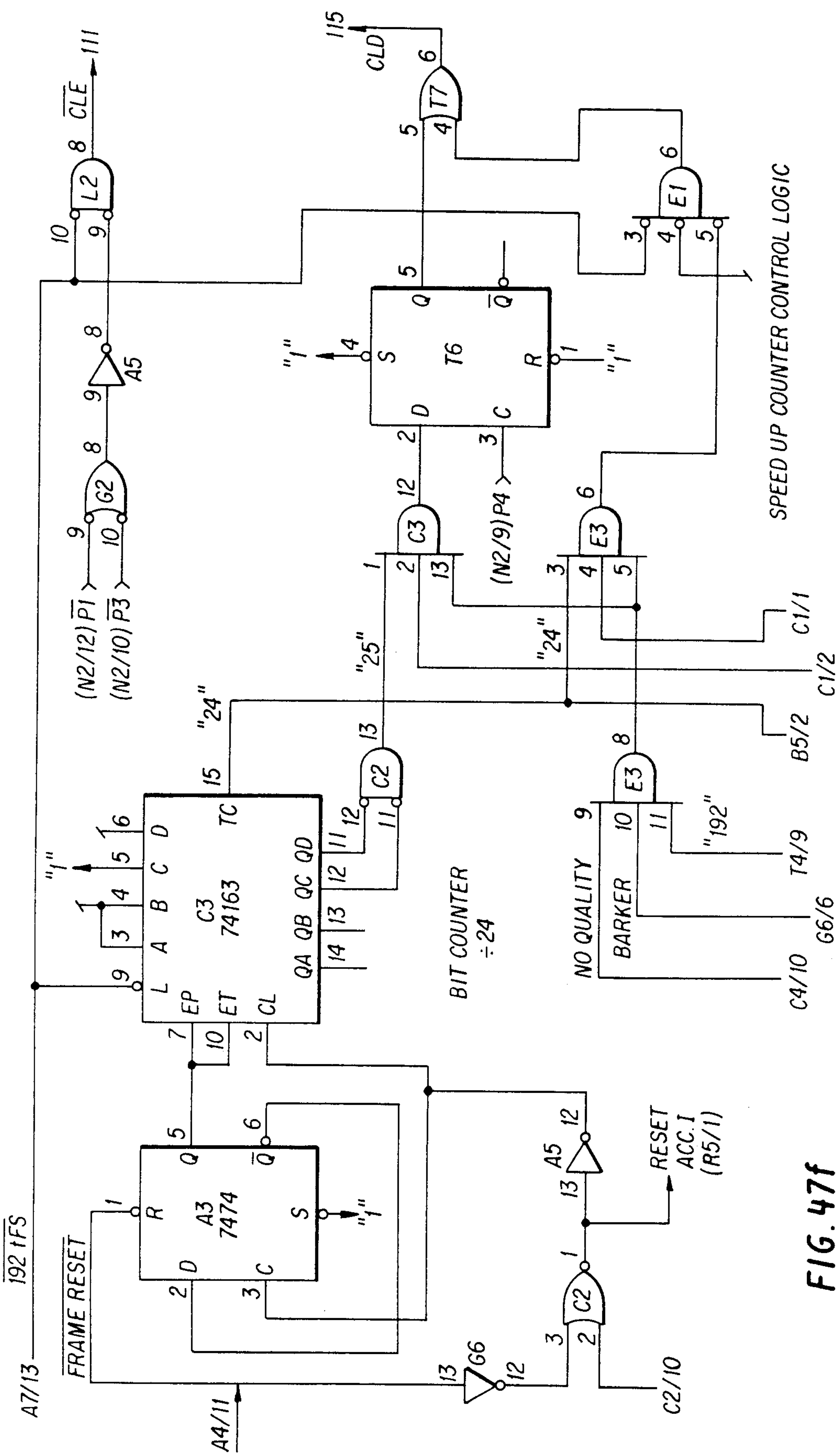
Figure 47G:
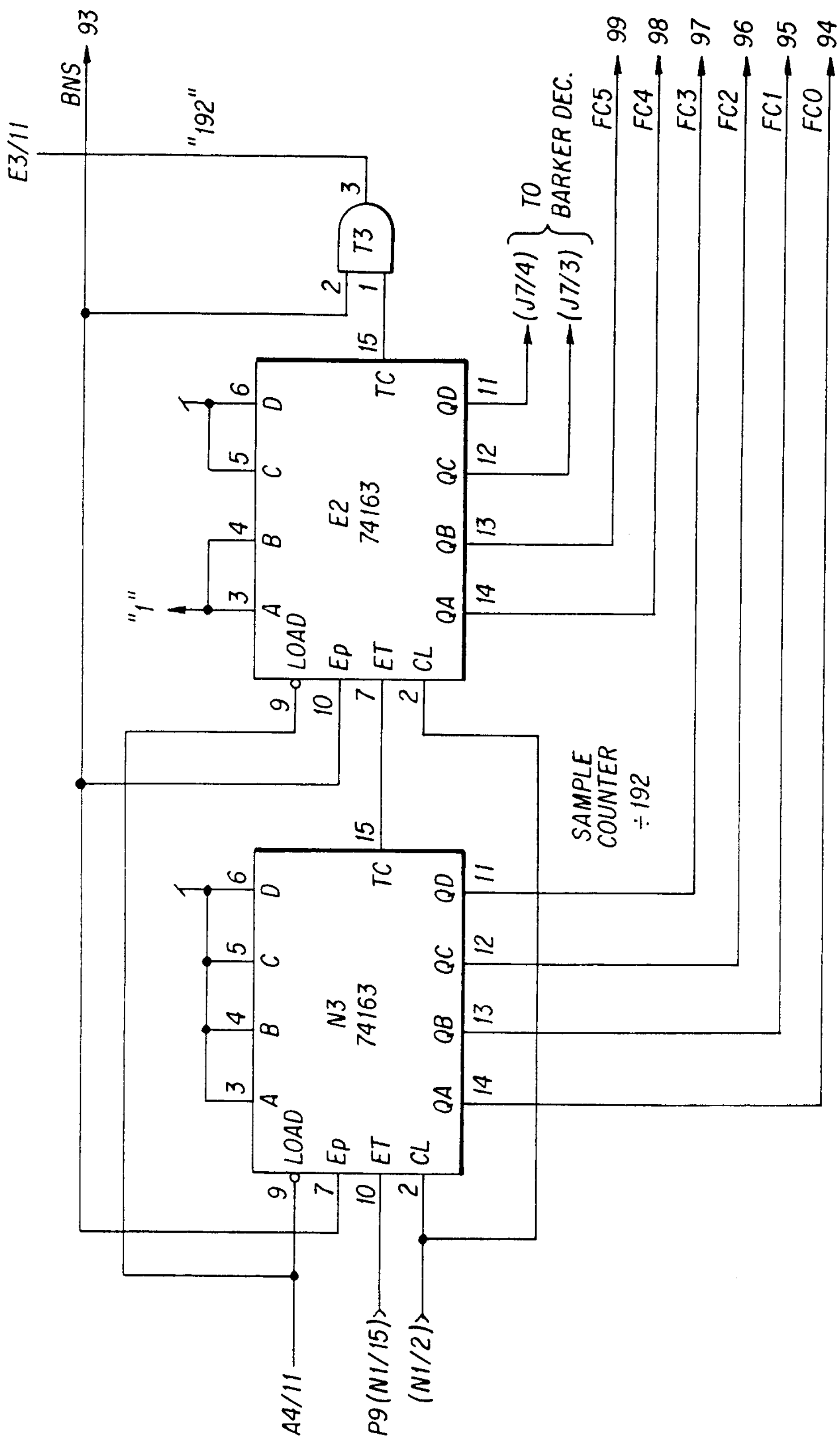

An alternative embodiment of the modem receiver is shown in block diagram illustration in FIG. 45. As noted above the receiver modem circuitry is responsible for DPSK detection of messages illustration in FIG. 45. As noted above the receiver modem circuitry is responsible for DPSK detection of messages appearing at the output of the delay memory 50 (FIG. 2), produced in response to the scanning of the the delay memory by the speed up counter 63 (FIG. 2). The speed up counter scans rapidly the contents of the last 192 samples of each communication channel in the RX delay memory. In the RX delay memory the samples are stored in logarithmic form in accordance with the companding $\mu$ law. The samples are converted to a linear code by an expander 600 and the eight most significant bits of the linear output of the expander 600 are supplied to a 1 message bit delay circuit 602, typically comprising a memory which delays the eight DPSK samples forming each message bit by one message bit. The output of delay 602 is supplied to a multiplier 604 which multiplies the value of each sample by the value of each delayed sample. A first accumulator 606 receives the output of multiplier 604 and integrates the multiplied samples over each message bit.

At the end of each message bit the sign bit of the result is supplied to a message shift register 608, typically an LS 164. The output of accumulator 606 is supplied to quality logic circuitry 610 which compares the absolute value of the integrated value at accumulator 606 with a threshold established by quality level circuitry 612.

Following 24 detection periods, the contents of the message shift register 608 are supplied to a barker code decoder 614 and a parity check circuit 616, which checks the parity of the eight message bits. The outputs of decoder 614, circuit 616, quality logic circuity 610 and a timing signal are supplied to inputs of an AND gate 618. The output of AND gate 618, referred to as the RM signal is supplied to an AND gate 620 where it is ANDed with the output of the output of a sample and bit counter 622 which indicates that 193 samples and 24 messages bits were received. When all of these conditions occur simultaneously AND gate 620 provides, via flag circuitry 624 a received message interrupt signal to the CPU, instructing the CPU to read the 8 bit message output from shift register 608 which is stored in a latch 626, via the CPU data bus.

Timing and synchronizing is provided by circuitry which will now be described. The 8 bit output of multiplier 604 is supplied to a second accumulator 628, such as a 93 LOO, which integrates the multiplication results 90 degrees out of phase with the integration of accumulator 606. Accumulator 628 compares the value of the last four samples of a previous bit with the first four samples of the current bit to establish a timing error output. This output is compared in bit synchronization logic circuity 630 with an error window determined by window width circuitry 632. If the error is greater than the window width, the bit synchronization logic circuity 630 provides an output signal to the sample counter 622 causing the number of samples per message bit to be lowered to 7 or increased to 9 depending on the direction of the error. An output from circuity 630 is also supplied to accumulator 628 for suitable adjustment thereof.

The bit counter of counters 622 integrates the correction produced by bit synchronization logic circuitry 630. If at the end of receipt of 192 samples, the bit counter is not completing receipt of the 24th message bit, the bit counter provides a large scale correction output which increments by two the channel counter in speed up counter 63 by means of increment logic circuitry 634 to provide a forward correction if at the end of receipt of 192 samples, the bit counter has already completed receipt of the 24 message bit, the bit counter prevents the normal incrementing by one of the channel counter.

Synchronization/No Synchronization circuitry 636 receives the RM output of AND gate 618 and senses when synchronization is achieved. It operates in two modes. During the synchronization acquisition mode the barker code detector is enabled during the entire channel scanning cycle and when the barker code is detected, the timing is shifted to coincide with its detection. During a synchronization tracking mode, barker code detection is enabled only at the completion of the channel scanning cycle. Once achieved, synchronization is maintained as described hereinabove.

FIG. 46 is a detailed schematic illustration of a portion of the modem receiver circuitry shown in FIG. 45 containing the digital DPSK detector.

FIG. 47 is a detailed schematic illustration of the remainder of the modem receiver circuitry shown in FIG. 45.

Figure 48A:
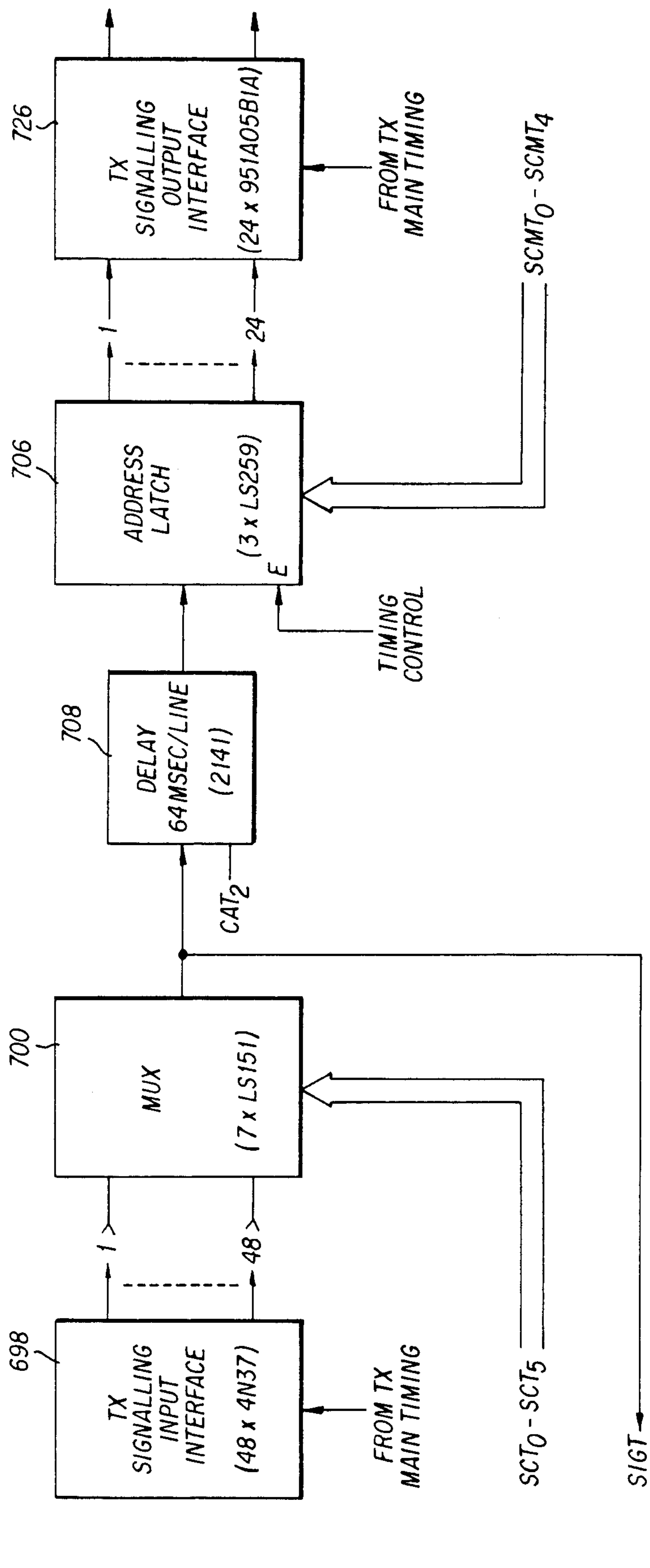
FIG. 48(*a* & *b*) is a block diagram of transmit signalling circuitry, divided into three parts, a–c.
Figure 48B:
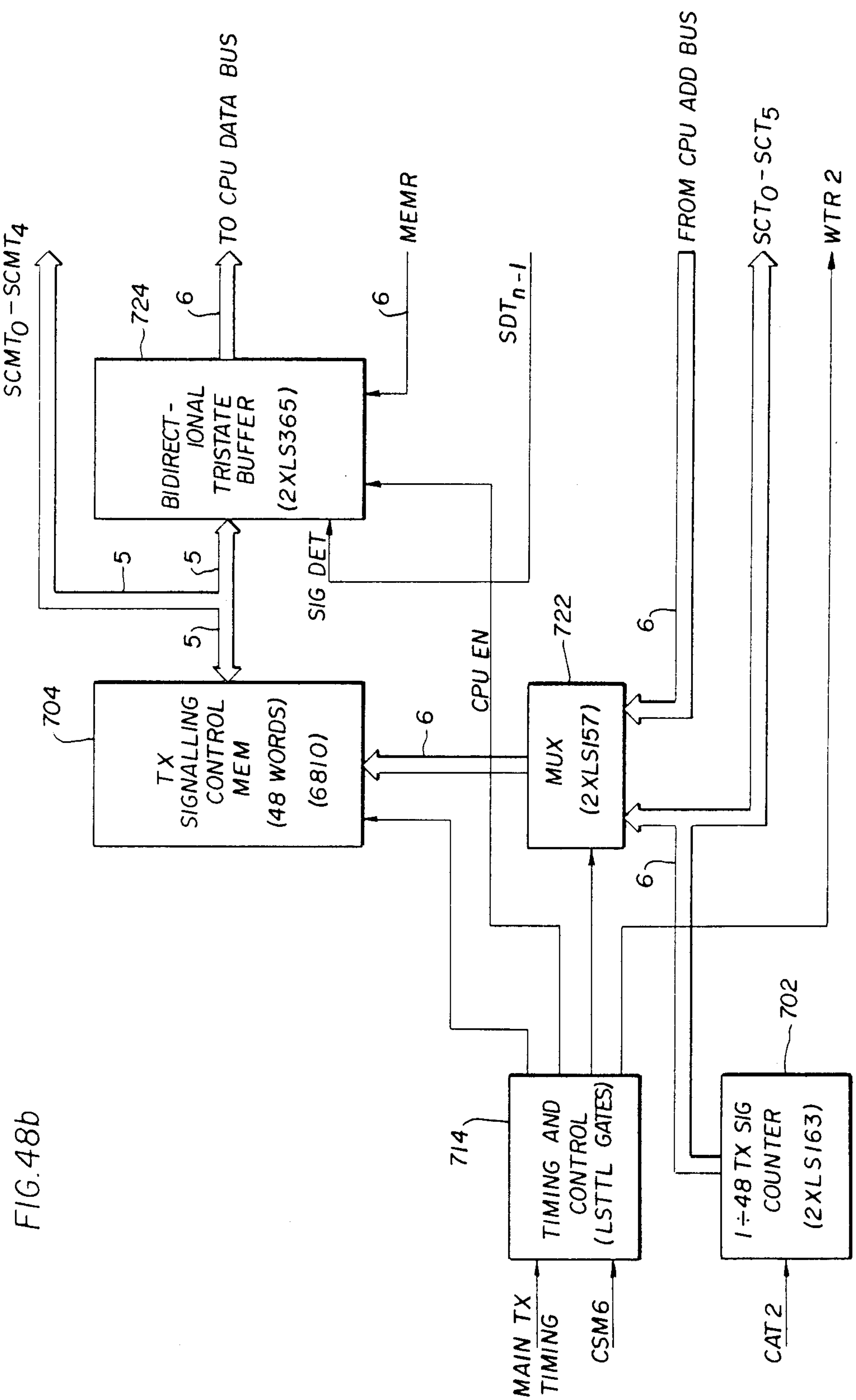
Figure 52:
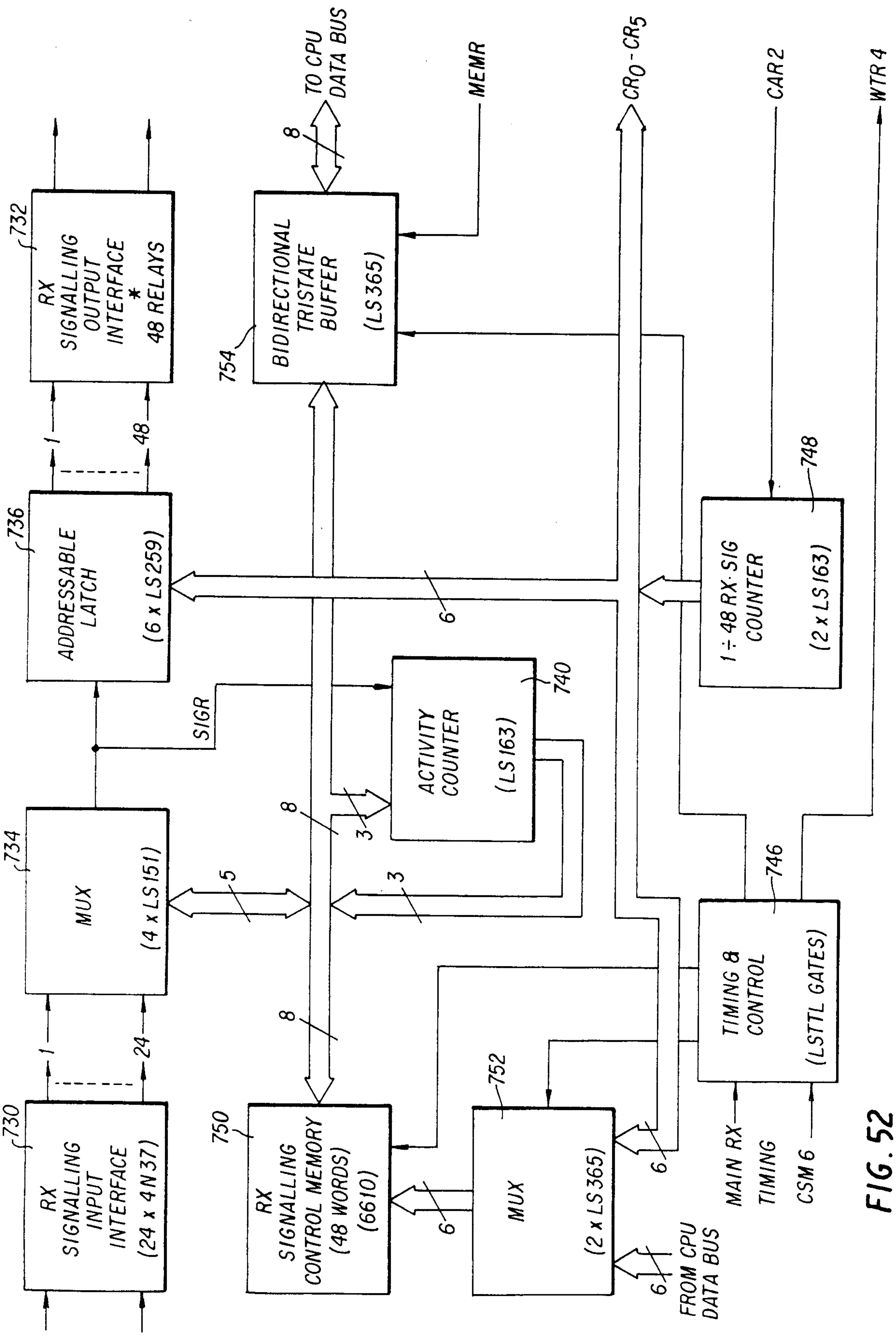
FIG. 52 is a block diagram of signalling circuitry.
Figure 53A:
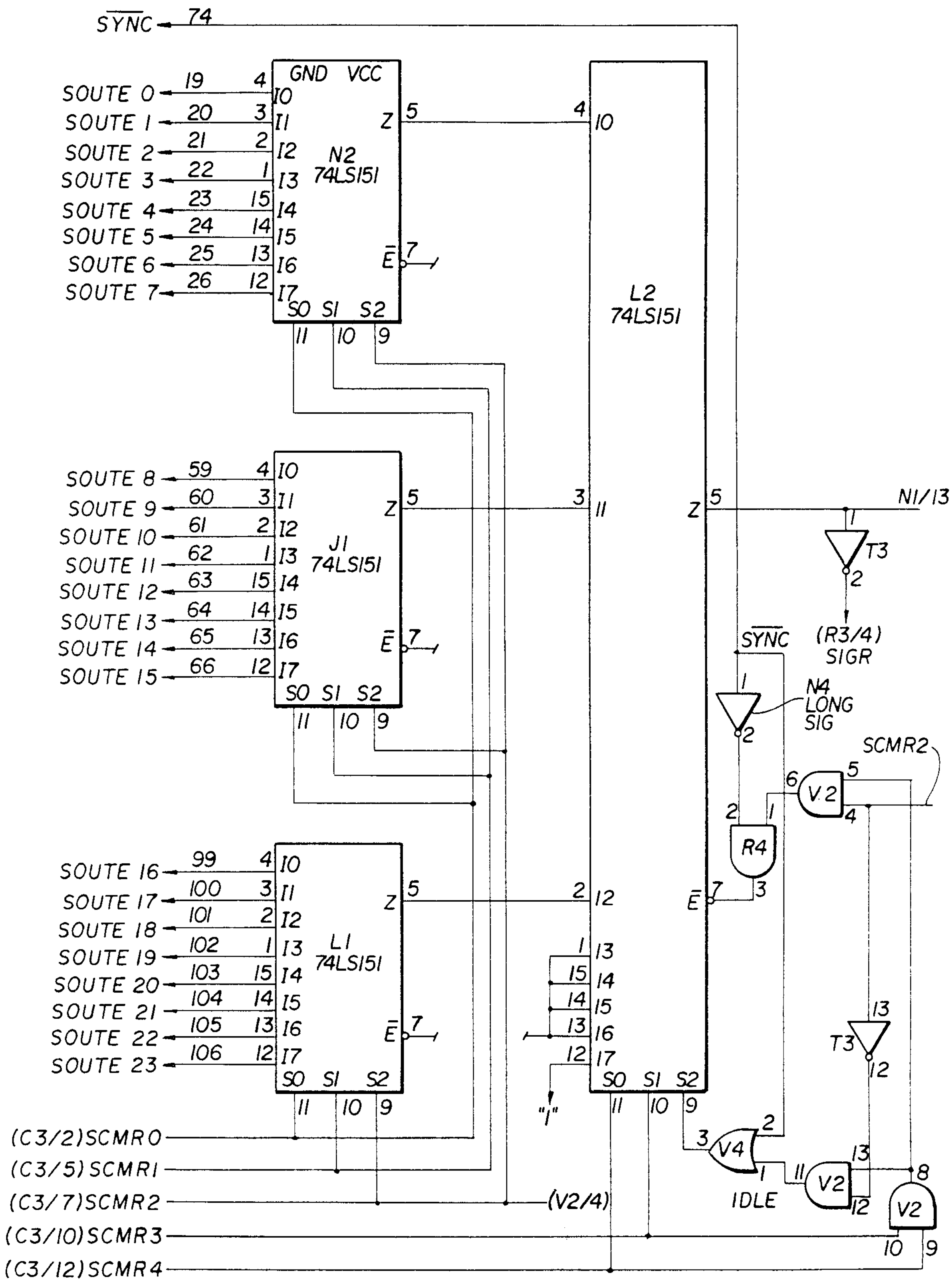
FIG. 53(*a* to *g*) is a schematic illustration of receive signalling.
Figure 53B:
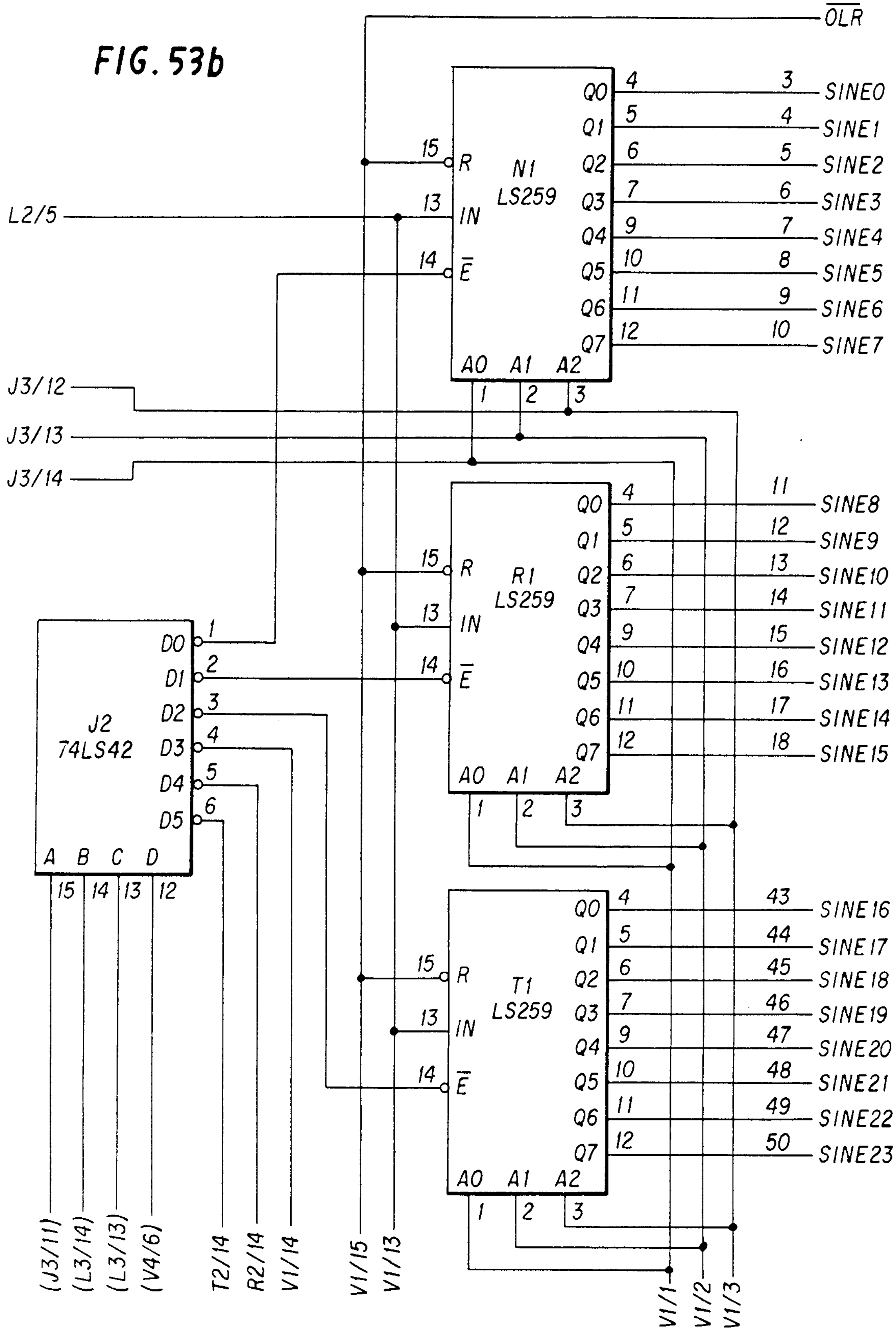
Figure 53C:
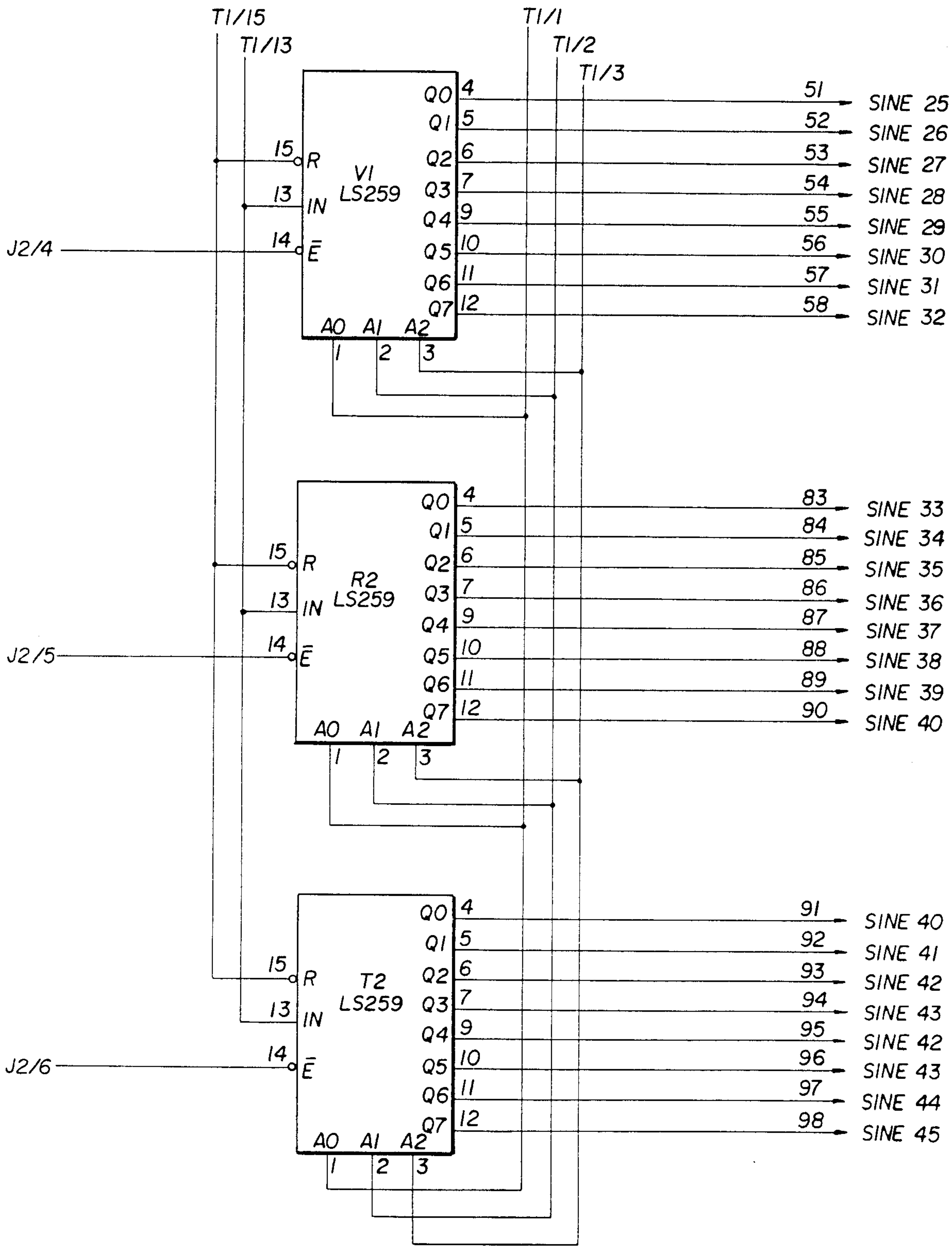
Figure 53D:
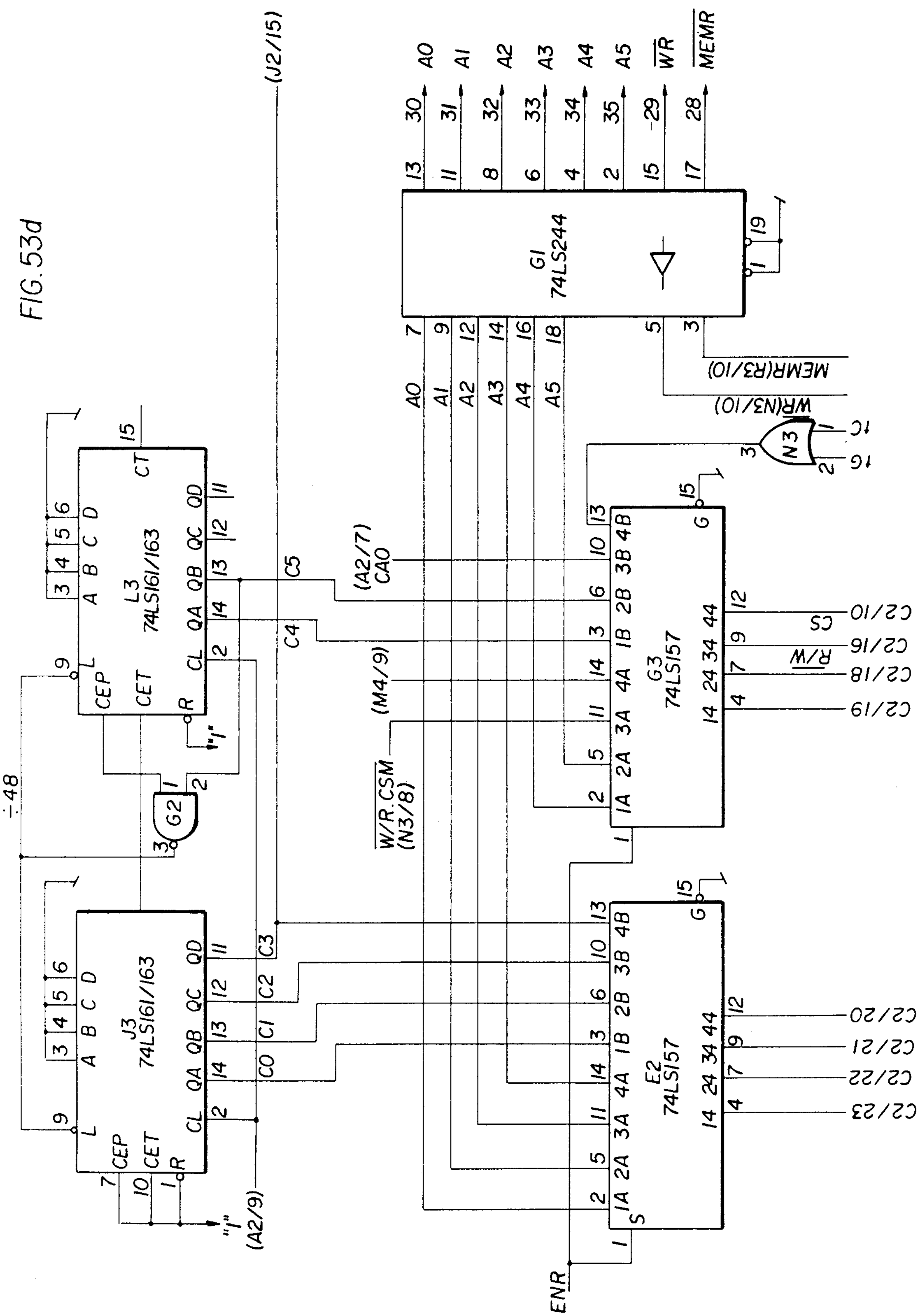
Figure 53E:
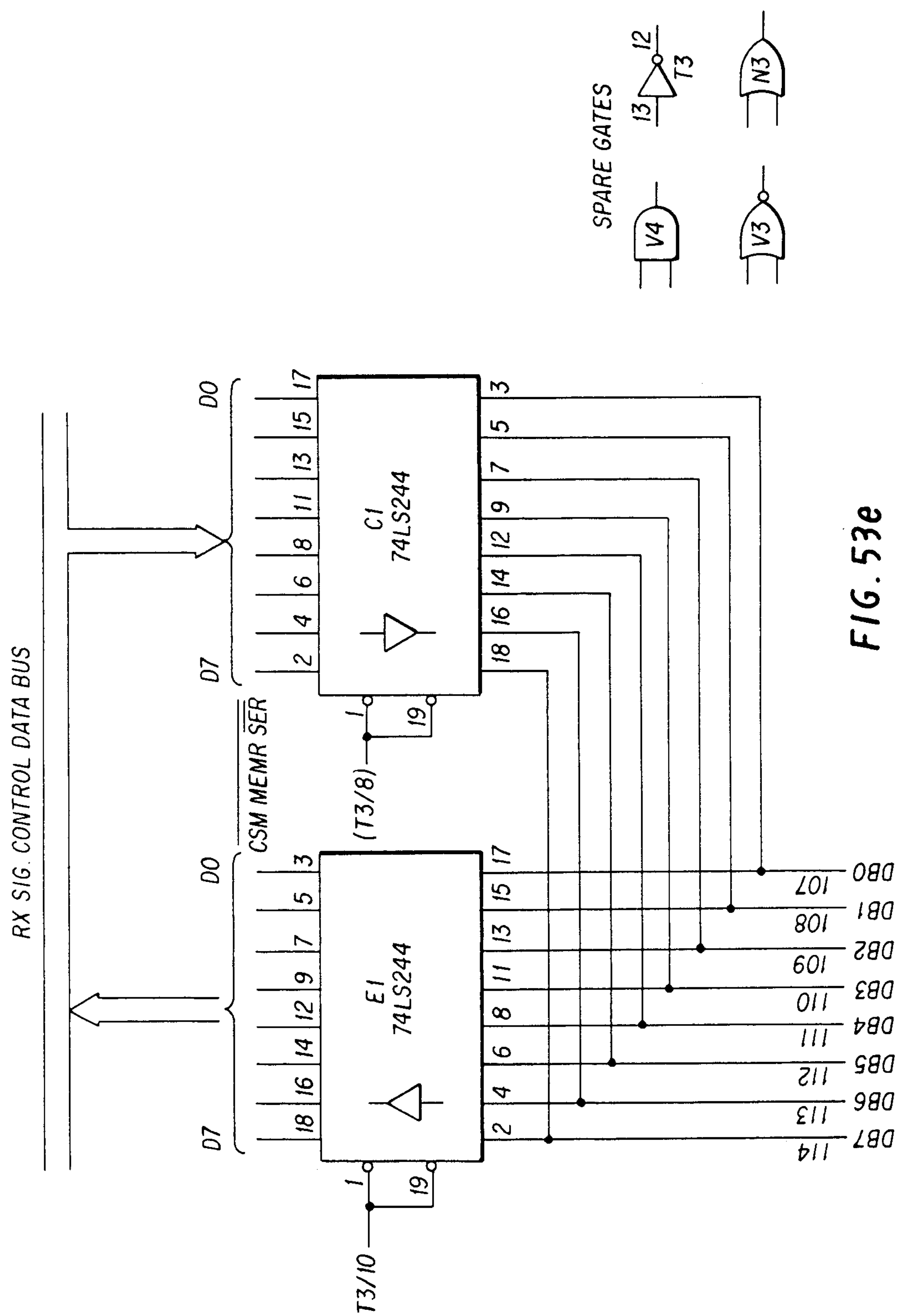
Figure 53F:
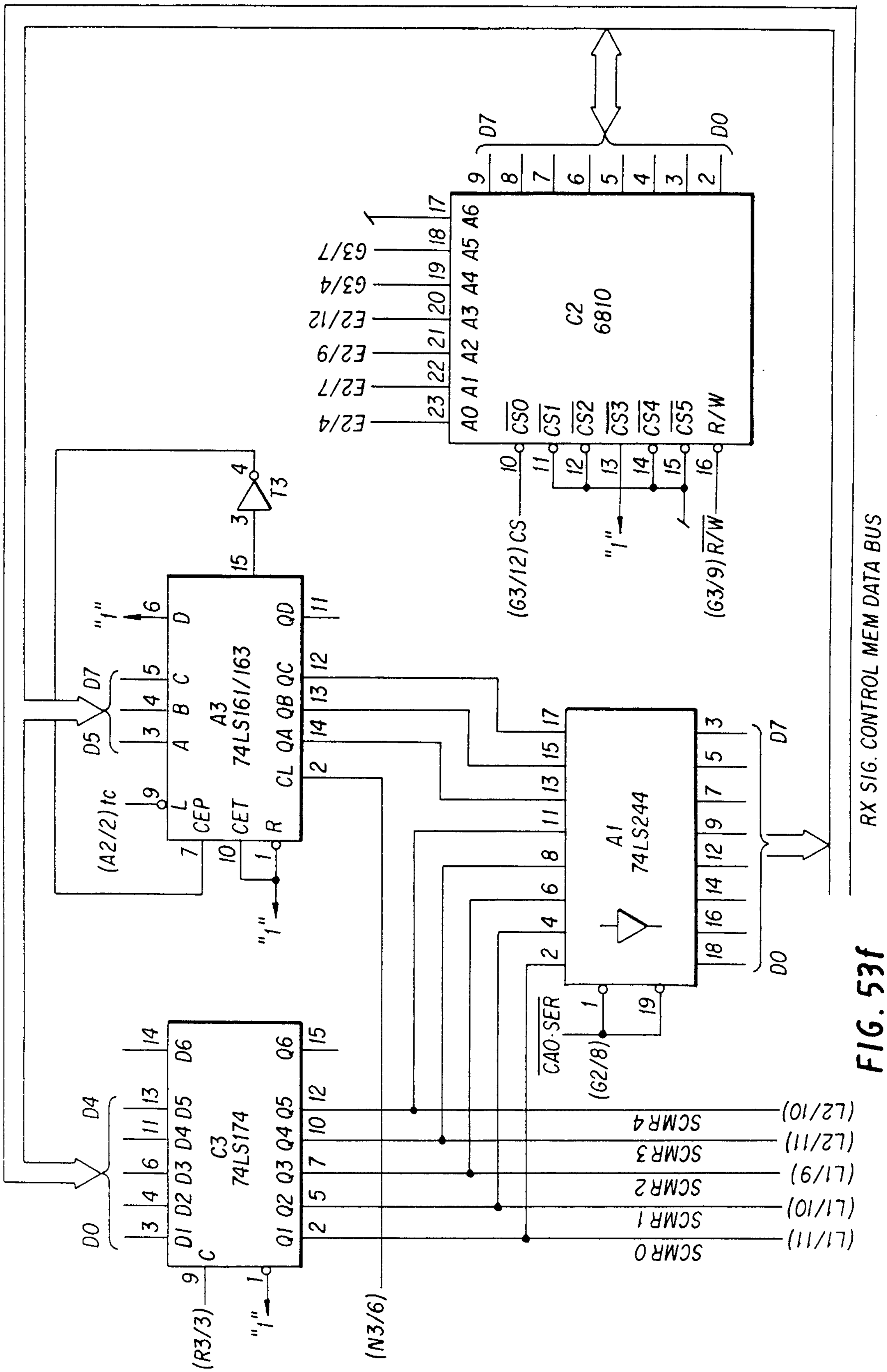
Figure 53G:
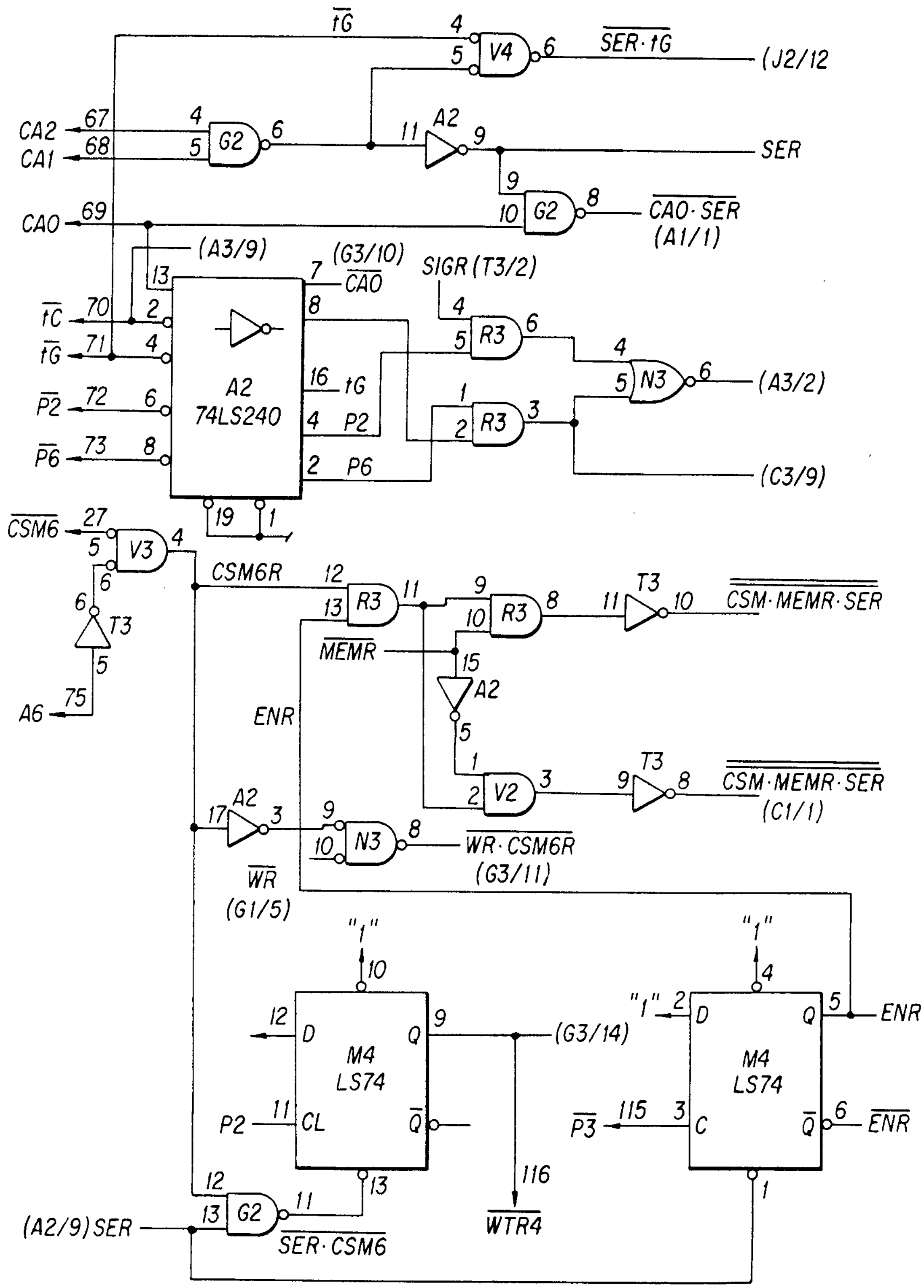
Figure 54A:
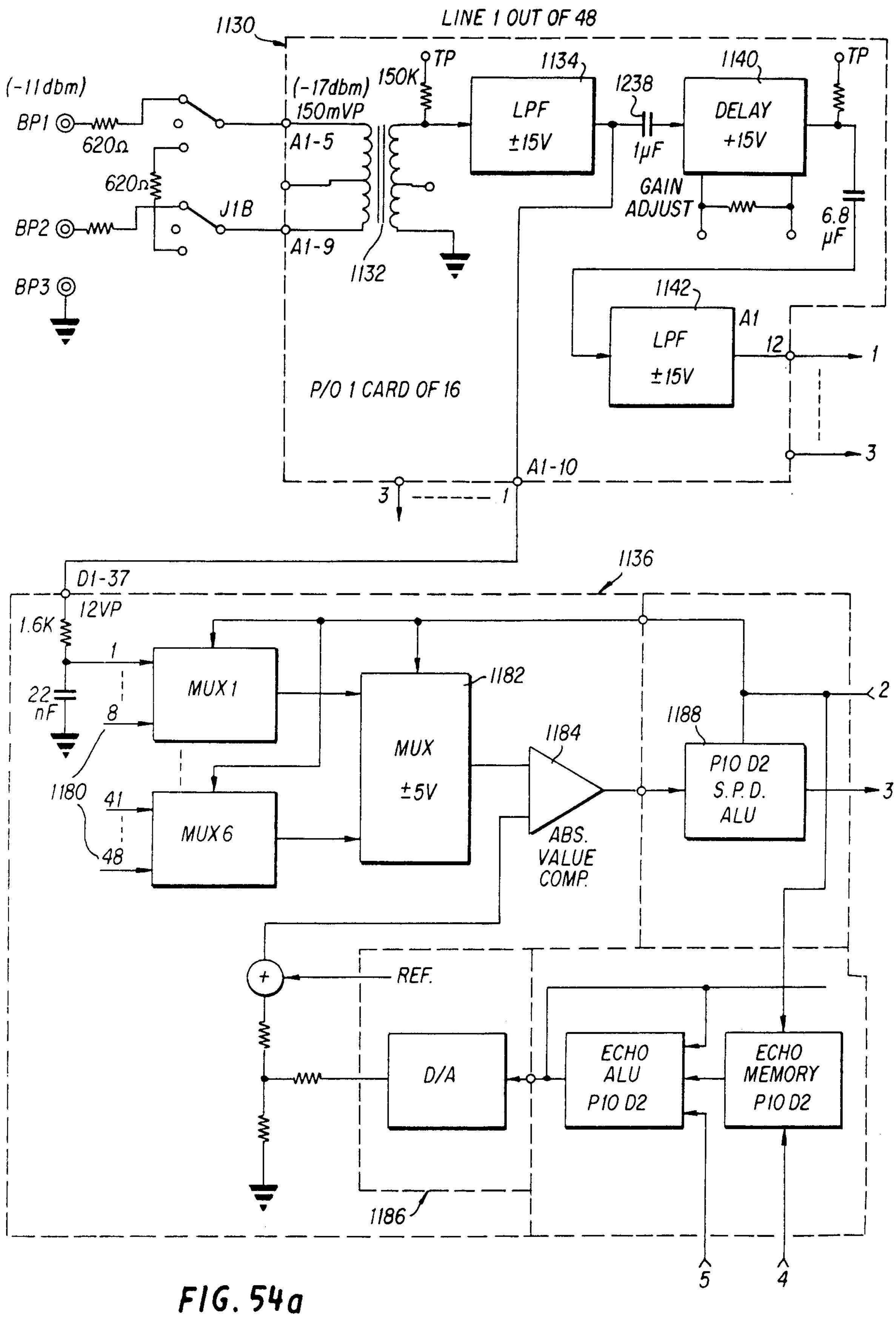
FIG. 54(*a* to *d*) is a block diagram of a system constructed and operative in accordance with an embodiment of the invention for use with analog transmission facilities.
Figure 54B:
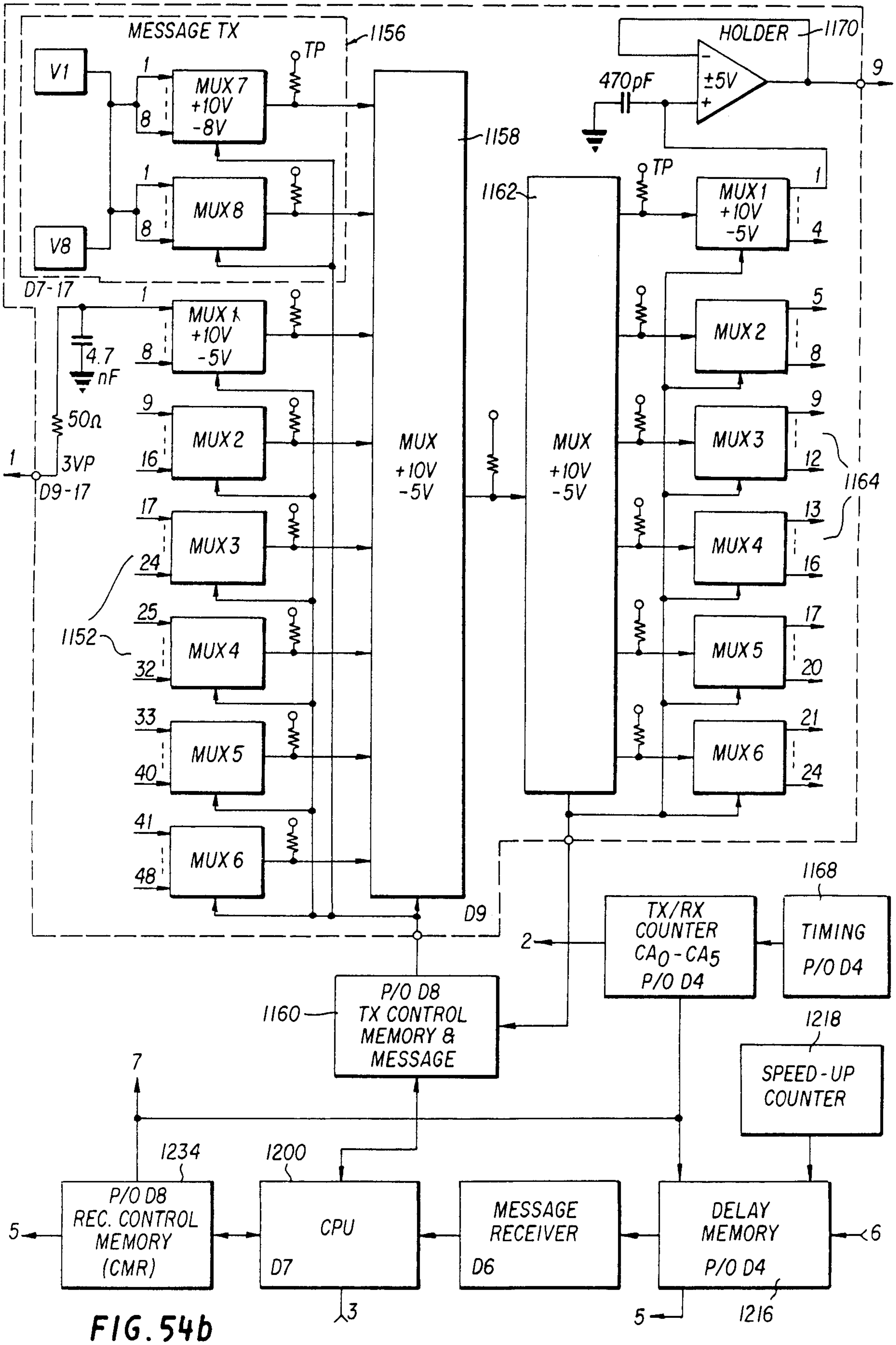
Figure 54C:
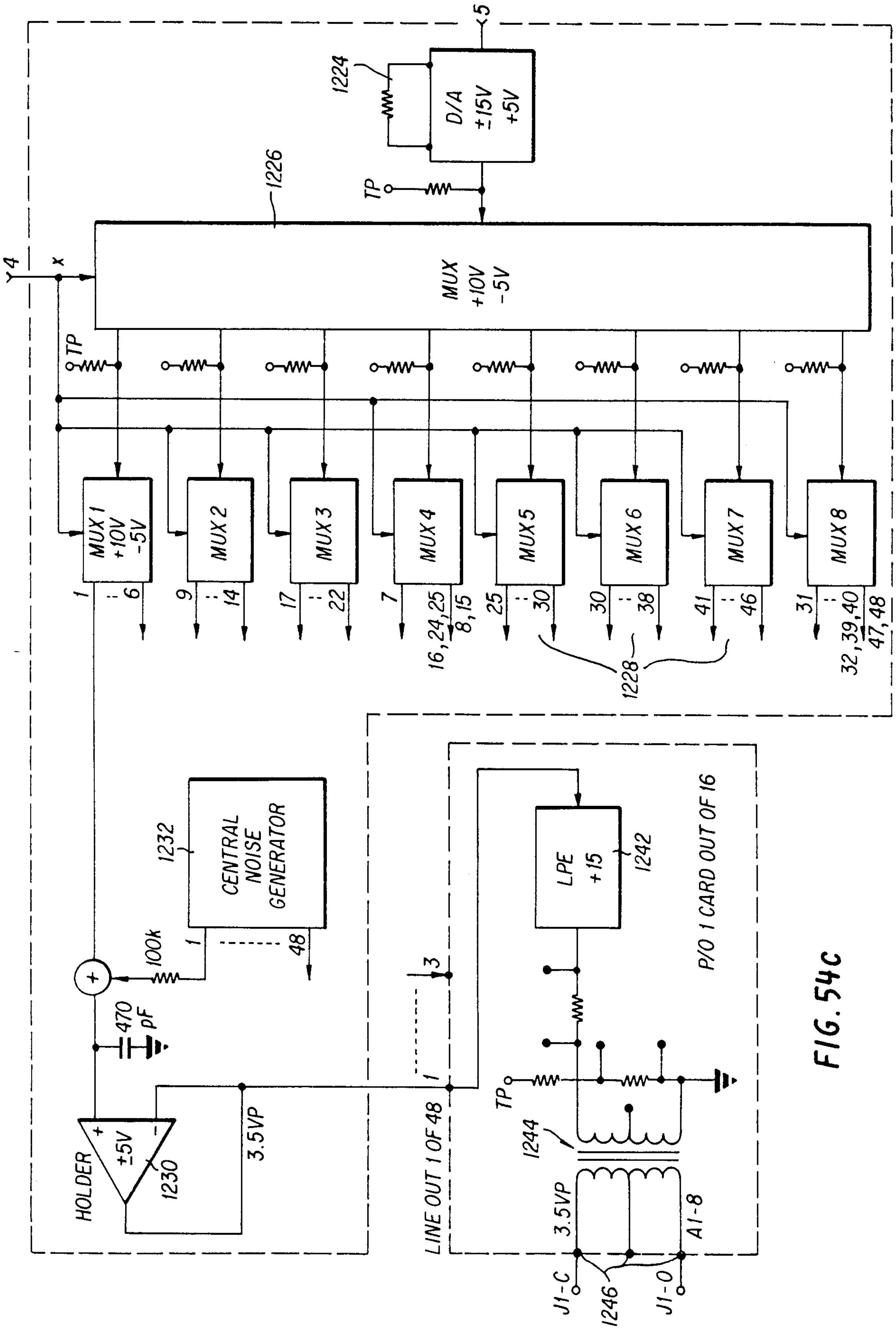
Figure 54D:
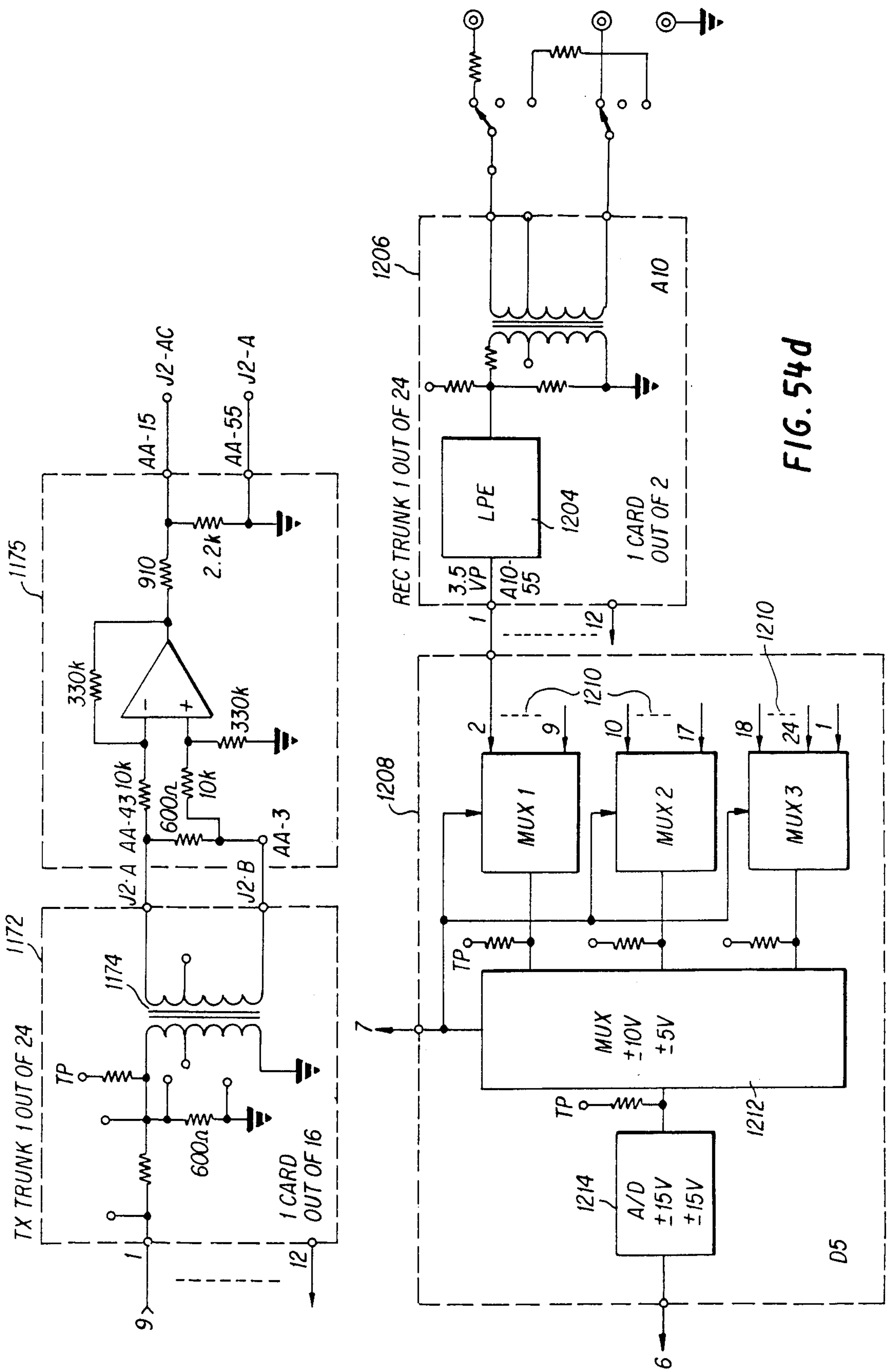

Reference is now made to FIG. 48 which illustrates in block diagram form apparatus for treatment of out of band signalling in accordance with the embodiment of the invention here described. The apparatus shown here and in FIG. 52 is combined with the apparatus of FIG. 2 when out of band signalling is involved. Where in band signalling is used, the apparatus described here may be omitted.

A transmission signalling input interface 698, which may be the same for example as the interface circuitry described above in connection with FIG. 12 provides 48 parallel signalling inputs, each corresponding to a telephone communication line to a 48 to 1 multiplexer 700 which may comprise 7 LS151 chips. The multiplexer is controlled by a 48 counter and delay counter 702, which may comprise 3 LS-163 chips and which also controls a signalling control memory 704 such as a 6810 which governs the operation of an addressable latch 706, which may comprise 3 LS-259 chips, operating as a 1 to 24 demultiplexer.

Thus during a given time slot, one of 48 multiplexer 700 couples a predetermined one of the 48 telephone communication line signalling wires to the signalling wire of a communication channel determined by the control memory 704.

A delay memory 708, typically an INTEL 2141 4K static RAM is addressed by the output of Counter 702 and is interposed between the output of multiplexer 700 and the input of addressabel latch 706 in order to provide a delay (typically 64 milliseconds) which is sufficient to enable signalling detection circuitry to determine whether signalling activity is present and if so to effect assignment of a signalling wire corresponding to a communication channel to the signalling wire carrying signalling information.

The SIGT output of multiplexer 700 is also supplied to signalling detection circuitry, at the input of control logic circuitry 712, comprising TTL gates, which is described in detail in FIG. 50.

The signalling detection circuitry also comprises signalling detection memory 718, UP/DOWN Counter 716, detection status flip-flops 720 and signalling FIFO 728.

The signalling detection memory 718 comprises 2 6810 chips and contains 12 bits of signalling detection counter and 3 bits of detection status for each of the communication lines. A calculation cycle comprising 48 time slots, for each of the communication lines, is executed every 1 msec. In each time slot detection counter and status bits are updated for one of the communication lines, according to the output of multiplexer. The updating sequence comprises: a read cycle from memory 718, loading its contents into counter 716 and status flip-flops 720, updating the contents of the counter and flip-flops according to the output of multiplexer 706, and a write cycle of updated data into memory 718.

It may be appreciated that the signalling detection circuitry provides integration of the input samples so as to establish a minimum threshold for duration and also to provide hangover time after termination in order to prevent loss of signalling information.

Additionally, the signalling detection circuitry provides detection of signalling activity of long duration, for example more than 1 second. As such long activity is not suitable for signalling interpolation, a communication channel is not assigned for long signalling activity. Instead, a long signalling message is sent and a forced connection is established on the other side until the termination of the long activity when a long signalling termination message is transmitted.

The three detection status bits are:

SDT - indicates detection of signalling activity
LSD - indicates detection of long signalling activity
HGFL - indicates that hangover should be provided after termination of signalling activity.

Detector timing and control circuitry 712 detects any change in SDT and LSD. Whenever such a change occurs, a write cycle to Signalling FIFO 728 takes place.

The number of the communication line SCT0–SCT5, and the new values of SGD and LSD are written into the FIF0.

Whenever there is any new information in the FIFO an output request is generated which interrupts the CPU through gate 820. The output from the FIFO is connected to the data bus of the CPU and is read by the CPU after the interrupt is generated.

The control memory 704 operates in two modes in response to timing signals from circuitry 714. As described above, it outputs to addressable latch 706 in response to inputs from counter 702 supplied via a multiplexer 722, which is also controlled by circuitry 714. When it is not outputing to addressable latch 706, the control memory 704 is available for being updated by the CPU via a CPU data bus and a bidirectional tristate buffer 724, which receives control signals from circuitry 714 and from the CPU. When the control memory 704 is being updated by the CPU, multiplexer 722 passes addresses from the CPU address bus to the control memory.

The output of addressable latch 706 is supplied along 24 parallel signalling wires corresponding to 24 communication channels via a transmit signalling output interface 726, which may be similar to that illustrated in FIG. 12 hereinabove or any other suitable interface circuitry.

It is noted that the control memory operates cyclically in outputing to the addressable latch and is approached by the CPU in an asynchronous manner. When the CPU addresses the control memory when it is engaged in outputing to the addressable latch, timing circuitry 714 provides a WTR 2 wait signal to the CPU until the cyclic operation is completed.

When there is a change in assignment of signalling the CPU searches for a communication channel having both signal and data portions free. Upon finding an available communication channel, the CPU transmits over the data carrying channel, as opposed to the signalling wire, assignment information regarding the new assignment.

FIG. 49 is a detailed schematic illustration described in FIG. 48*a,b*.

Figure 48C:
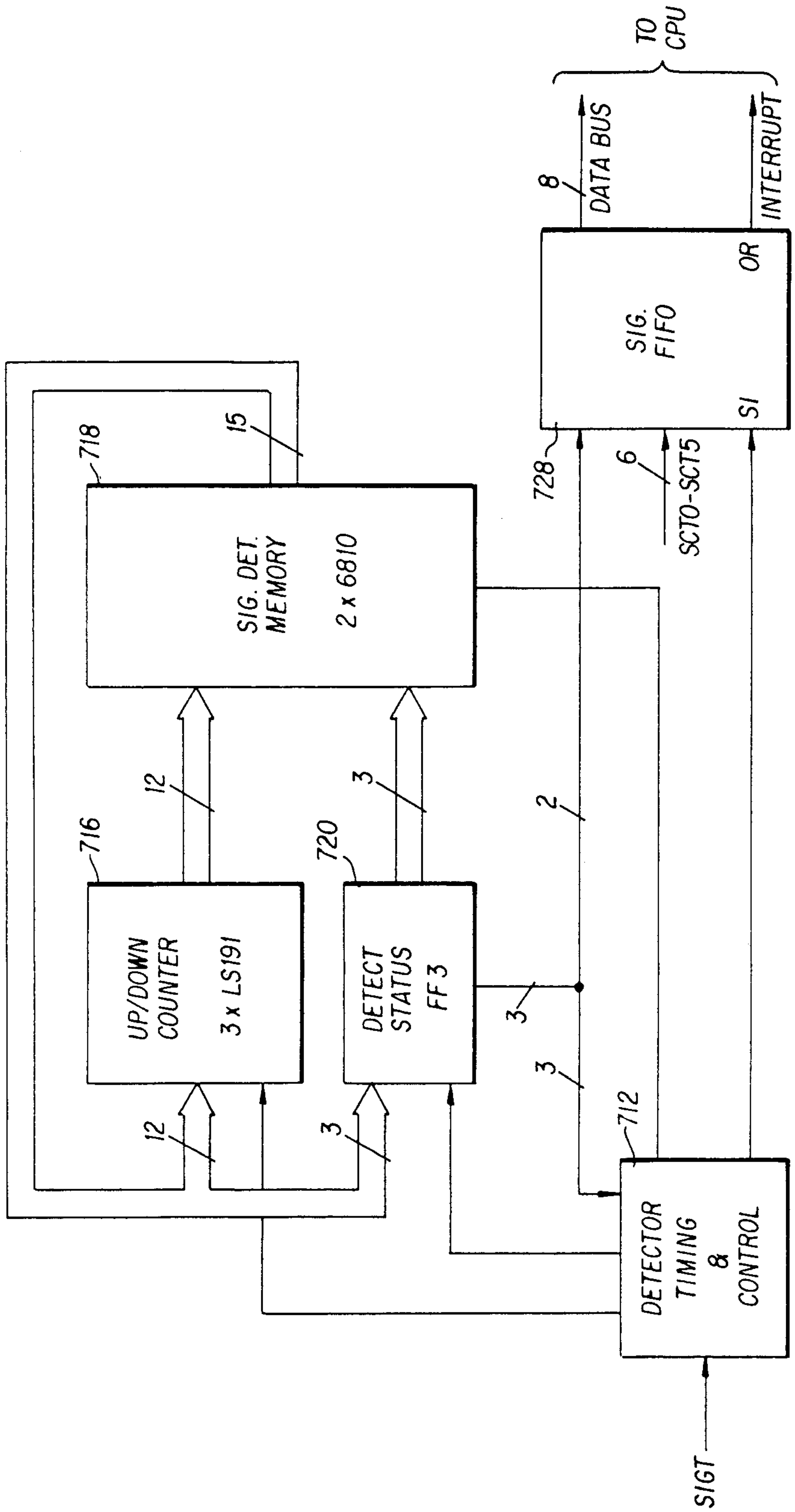
Figure 49A:
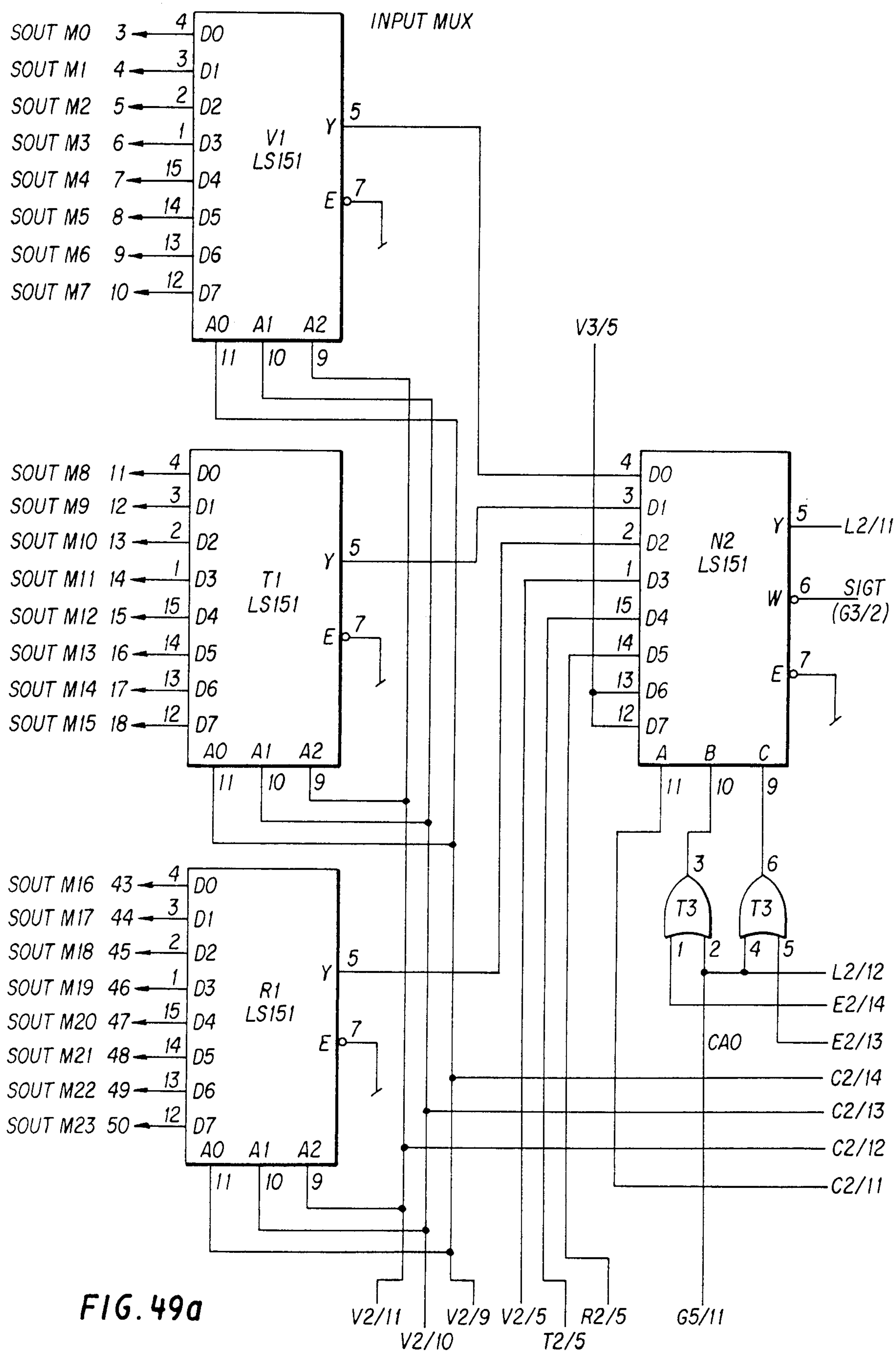
FIG. 49(*a* to *g*) is a schematic illustration of transmit signalling data and control circuitry.
Figure 49B:
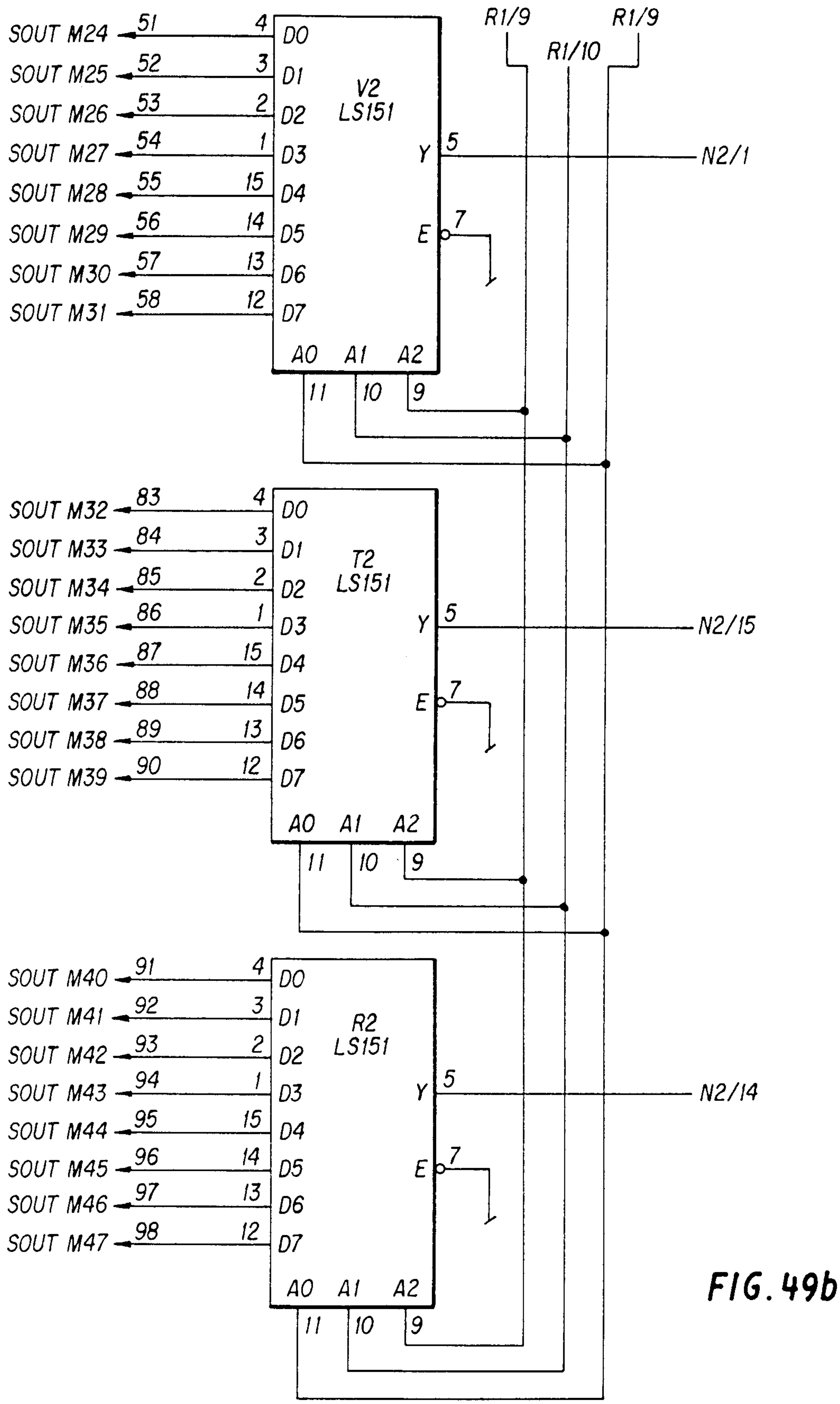
Figure 49C:
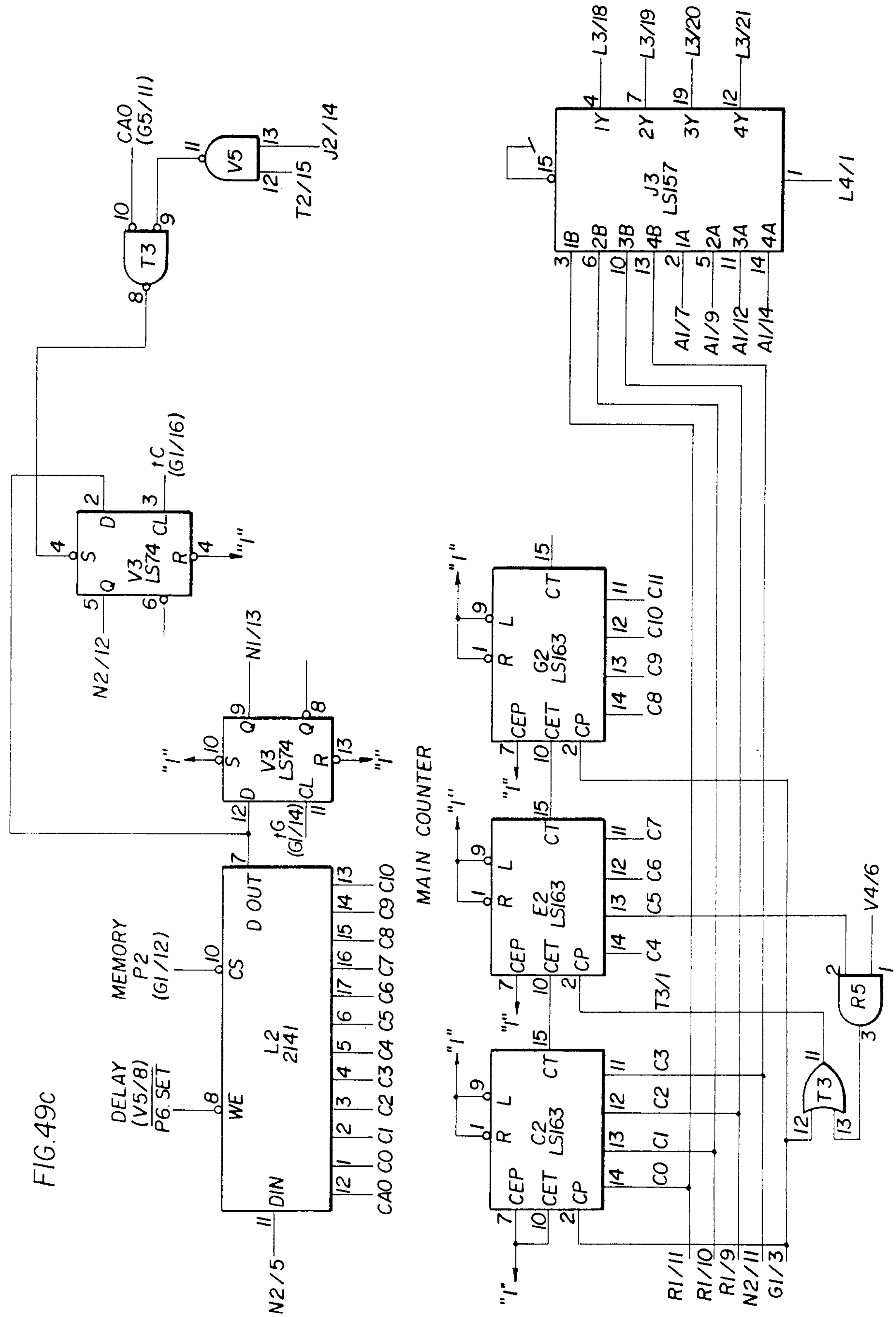
Figure 49D:
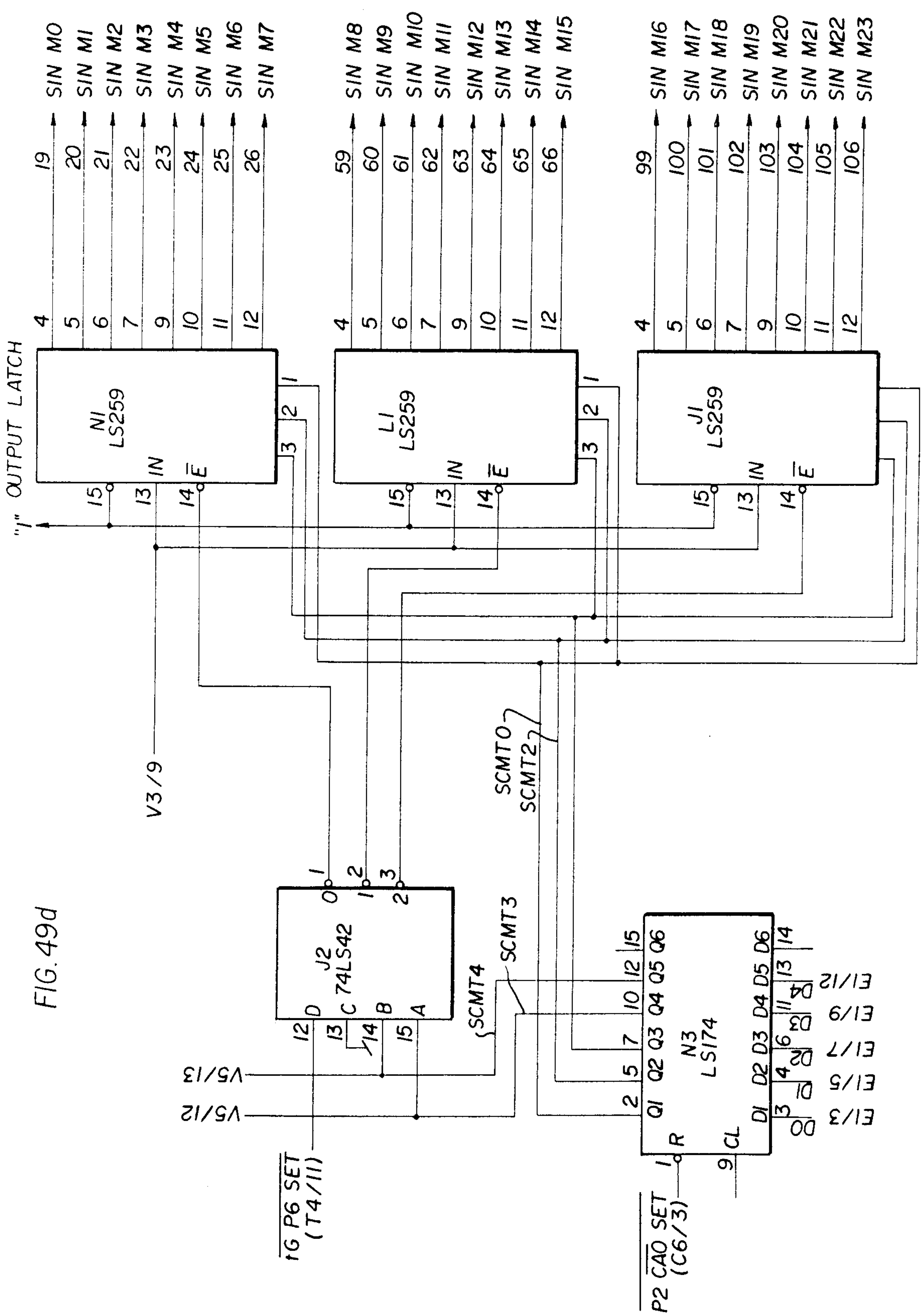
Figure 49E:
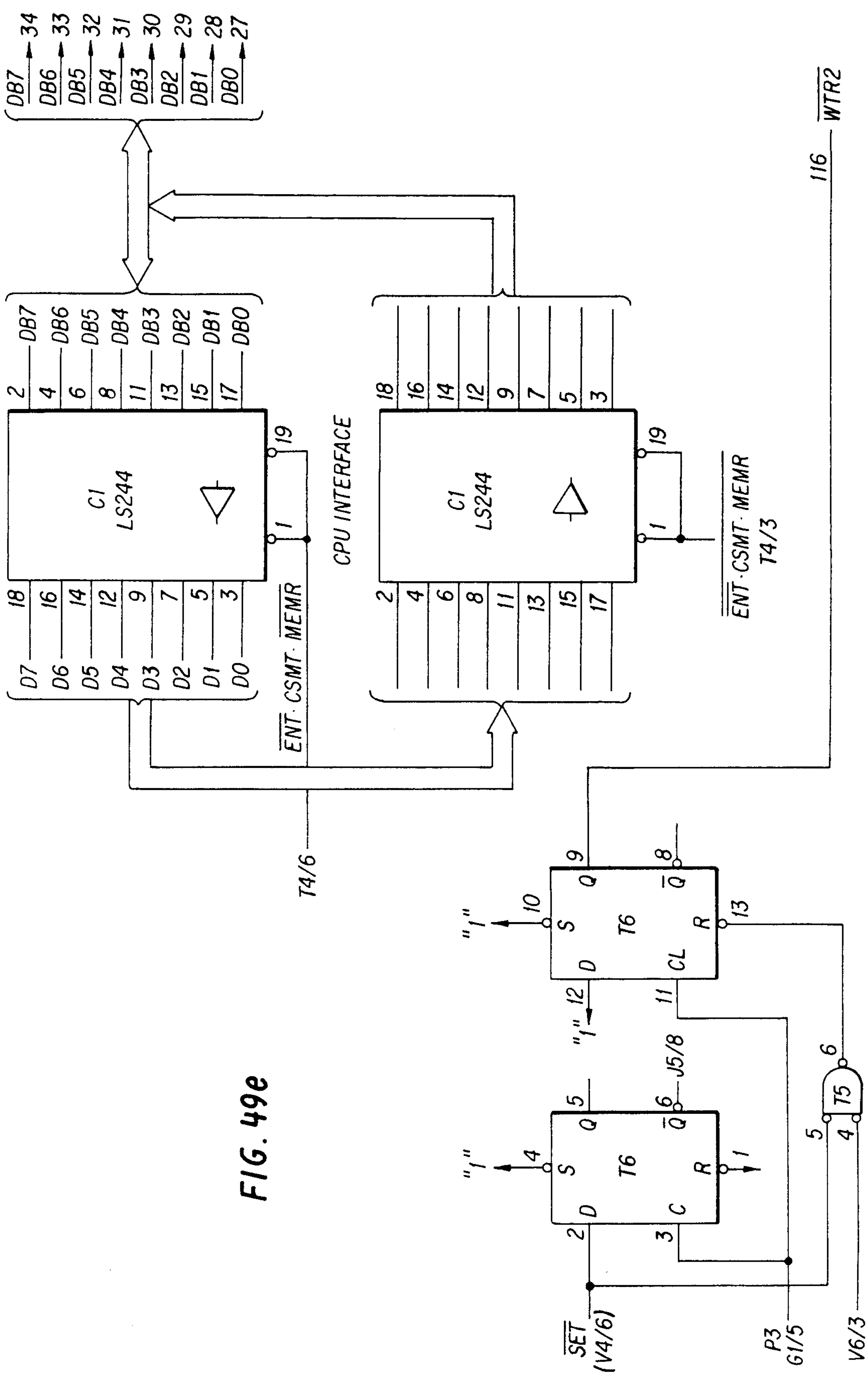
Figure 49F:
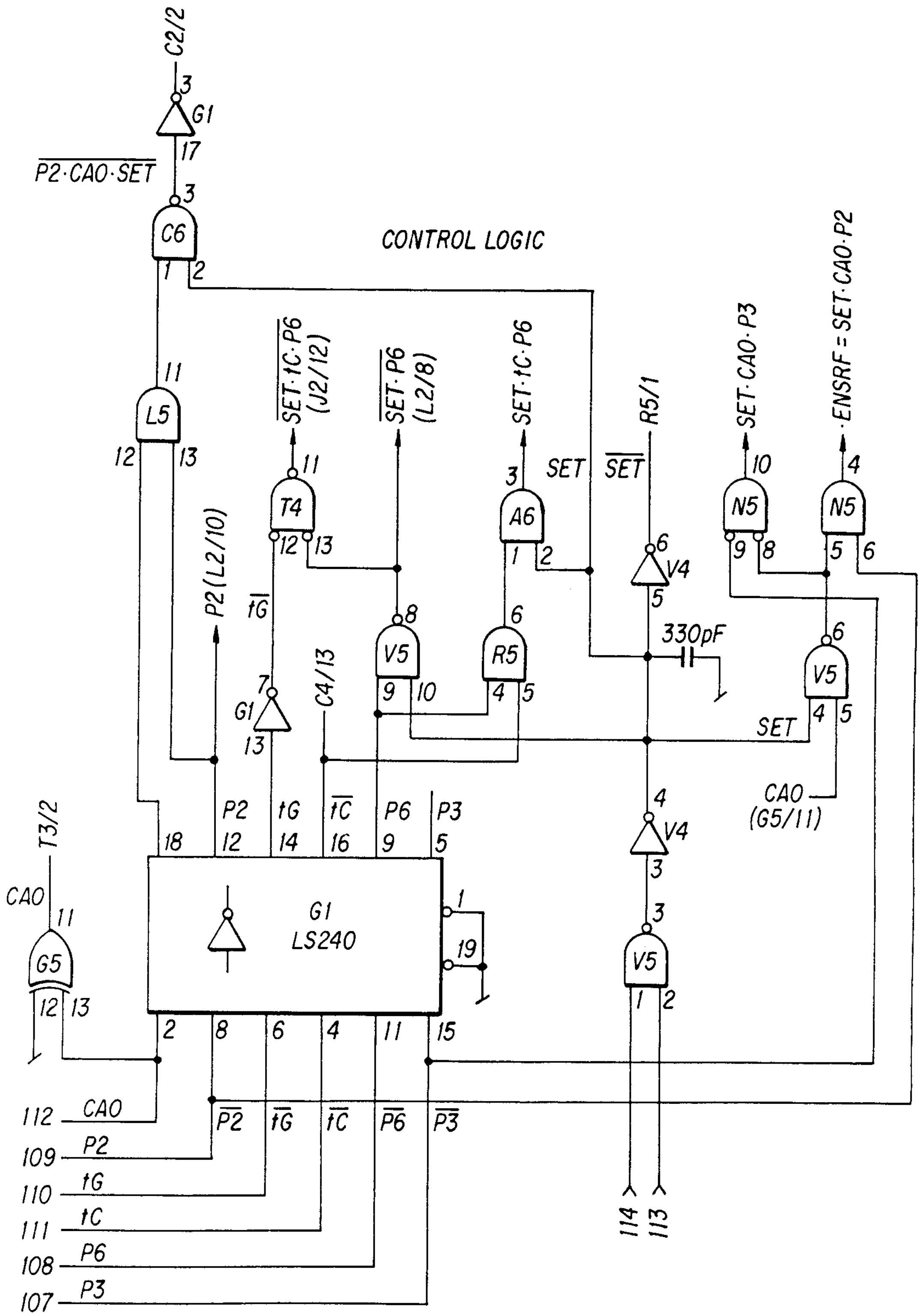
Figure 49G:
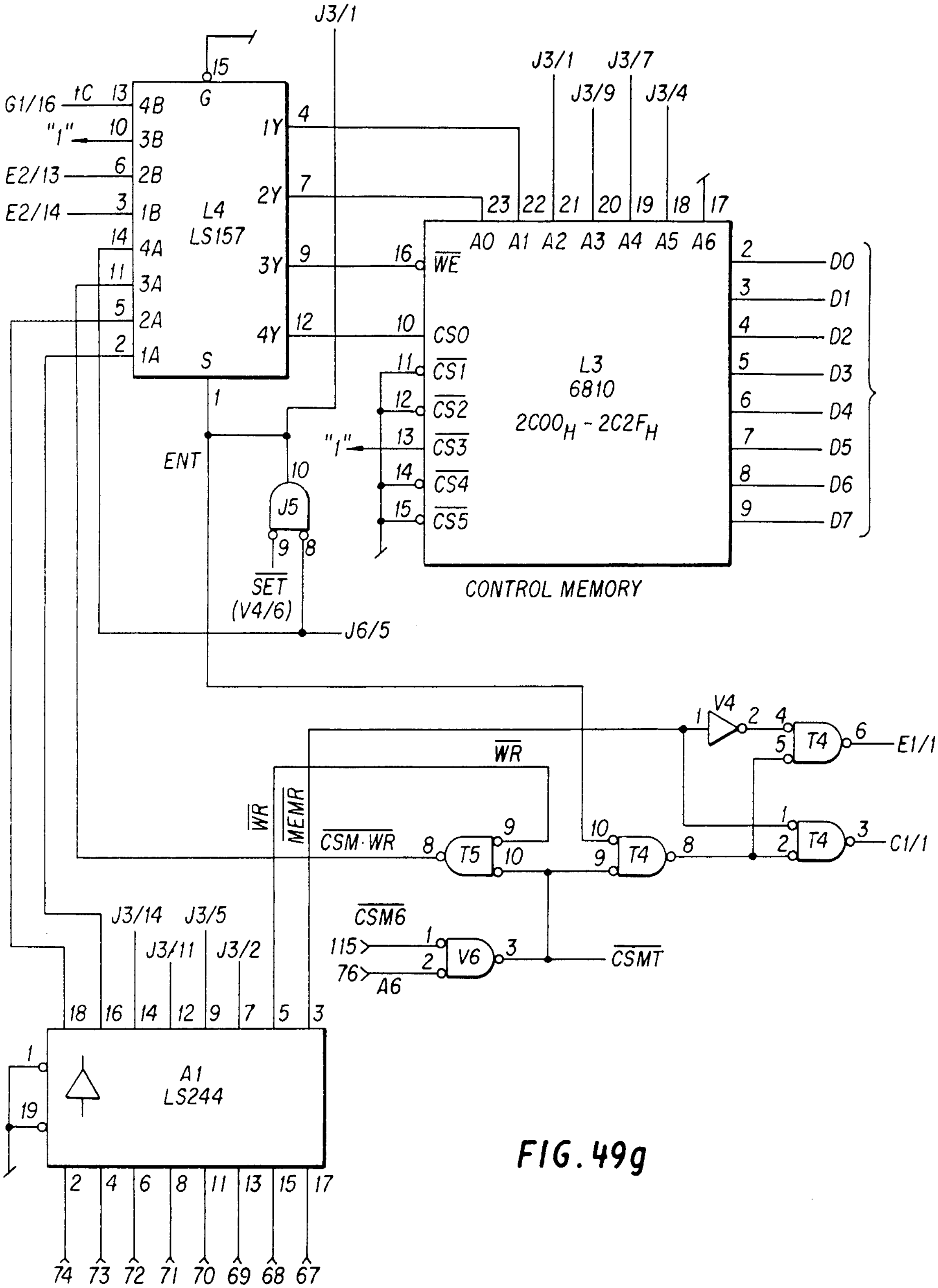
Figure 50A:
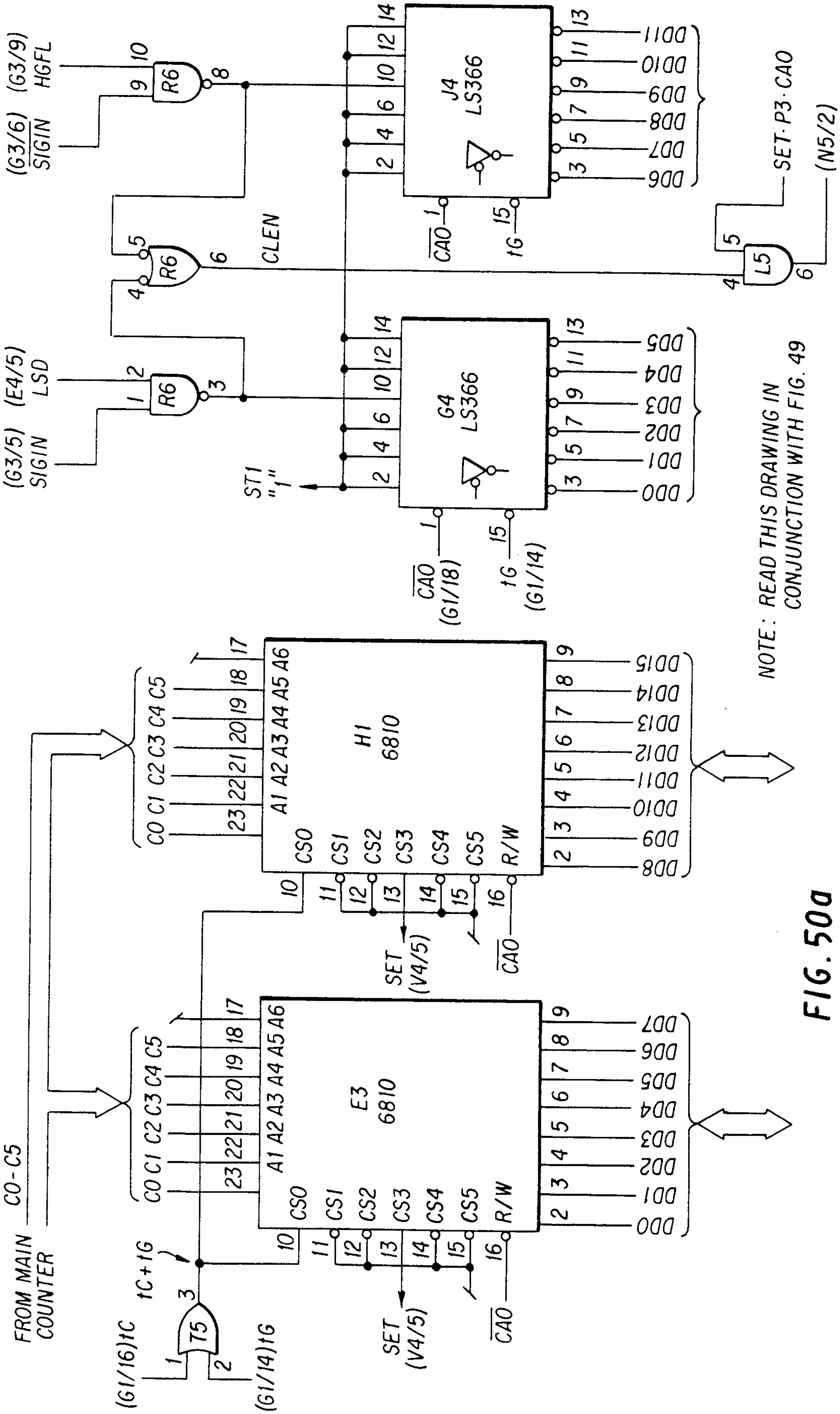
FIG. 50(*a* to *d*) is a schematic illustration of transmit signalling detector circuitry.
Figure 50B:
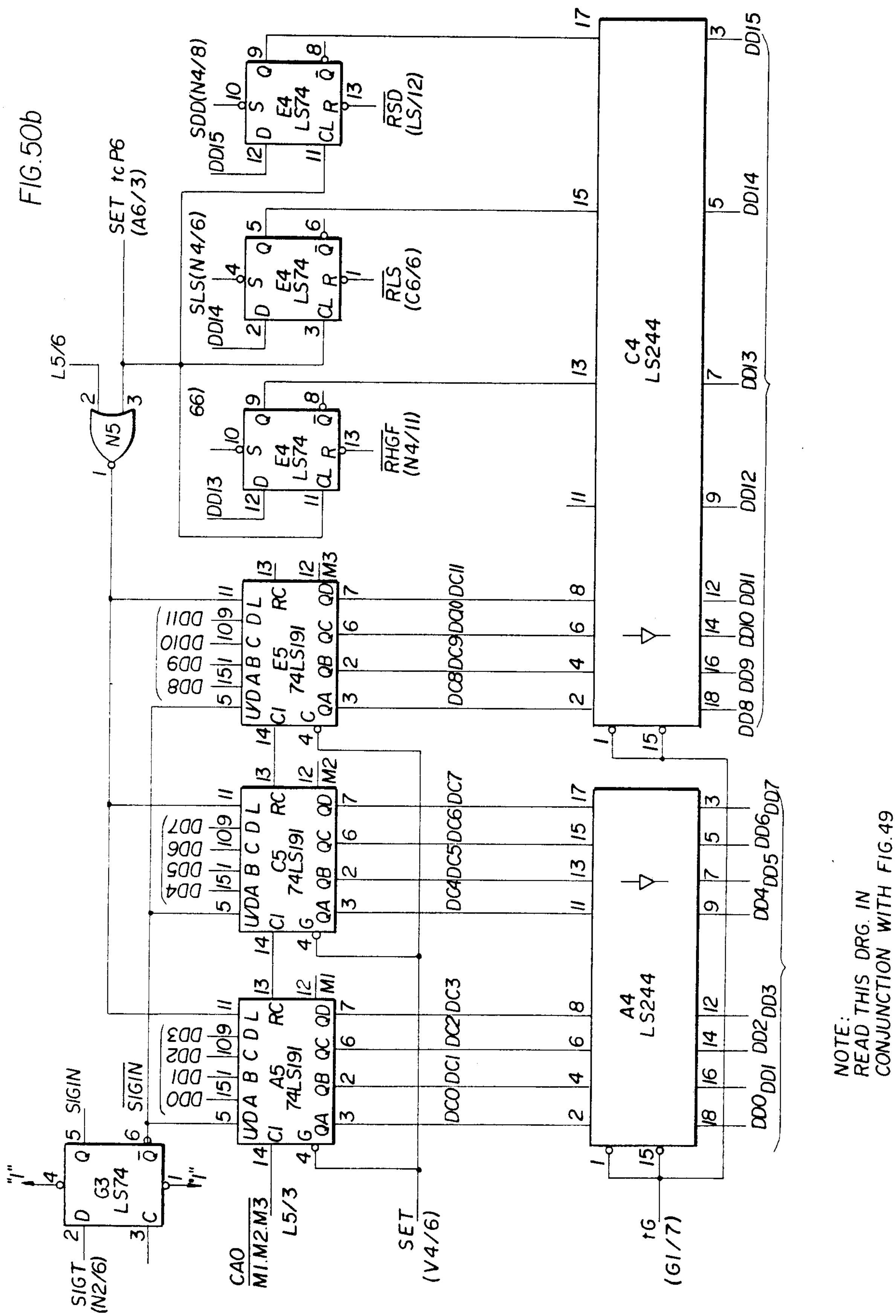
Figure 50C:
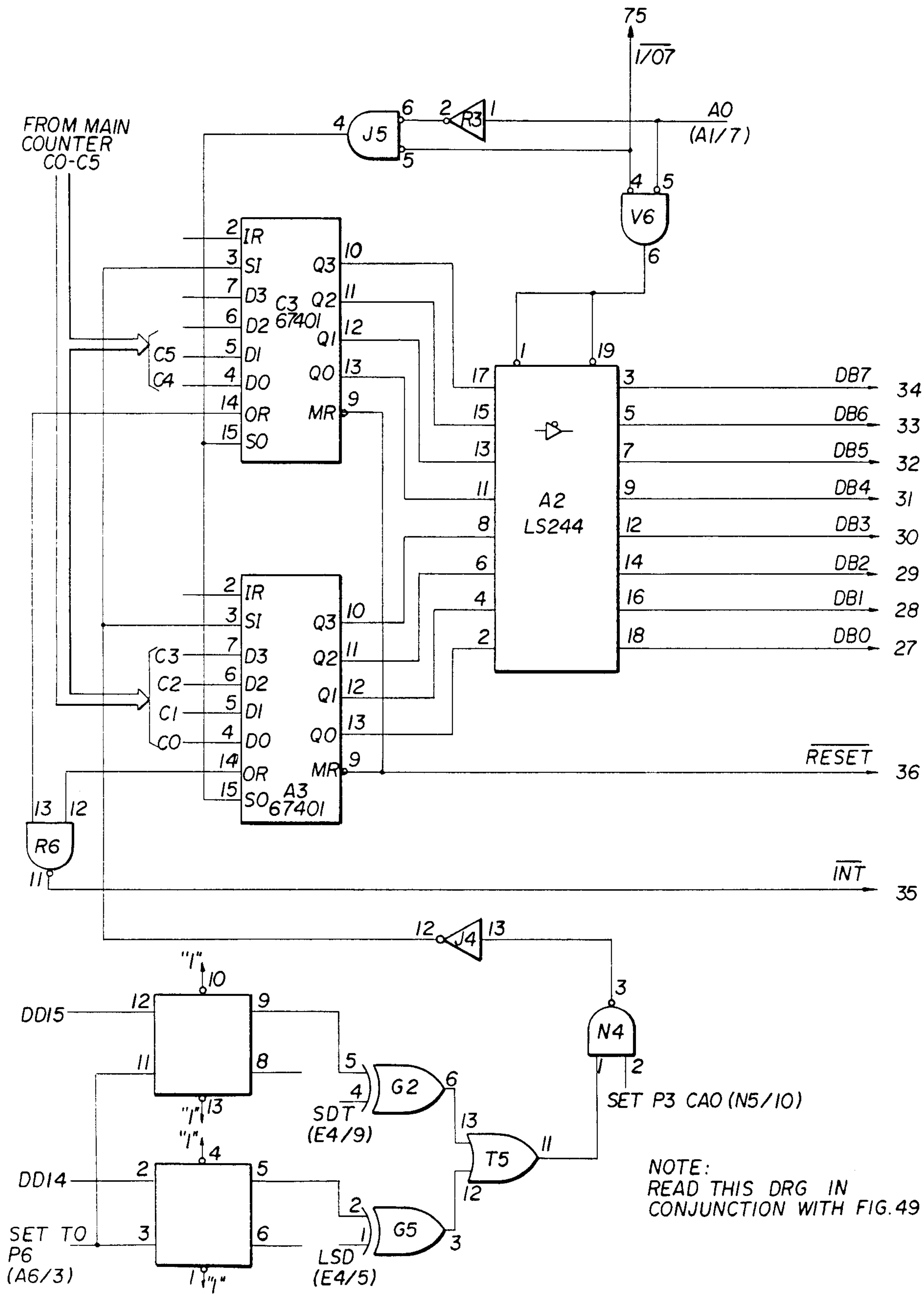
Figure 50D:
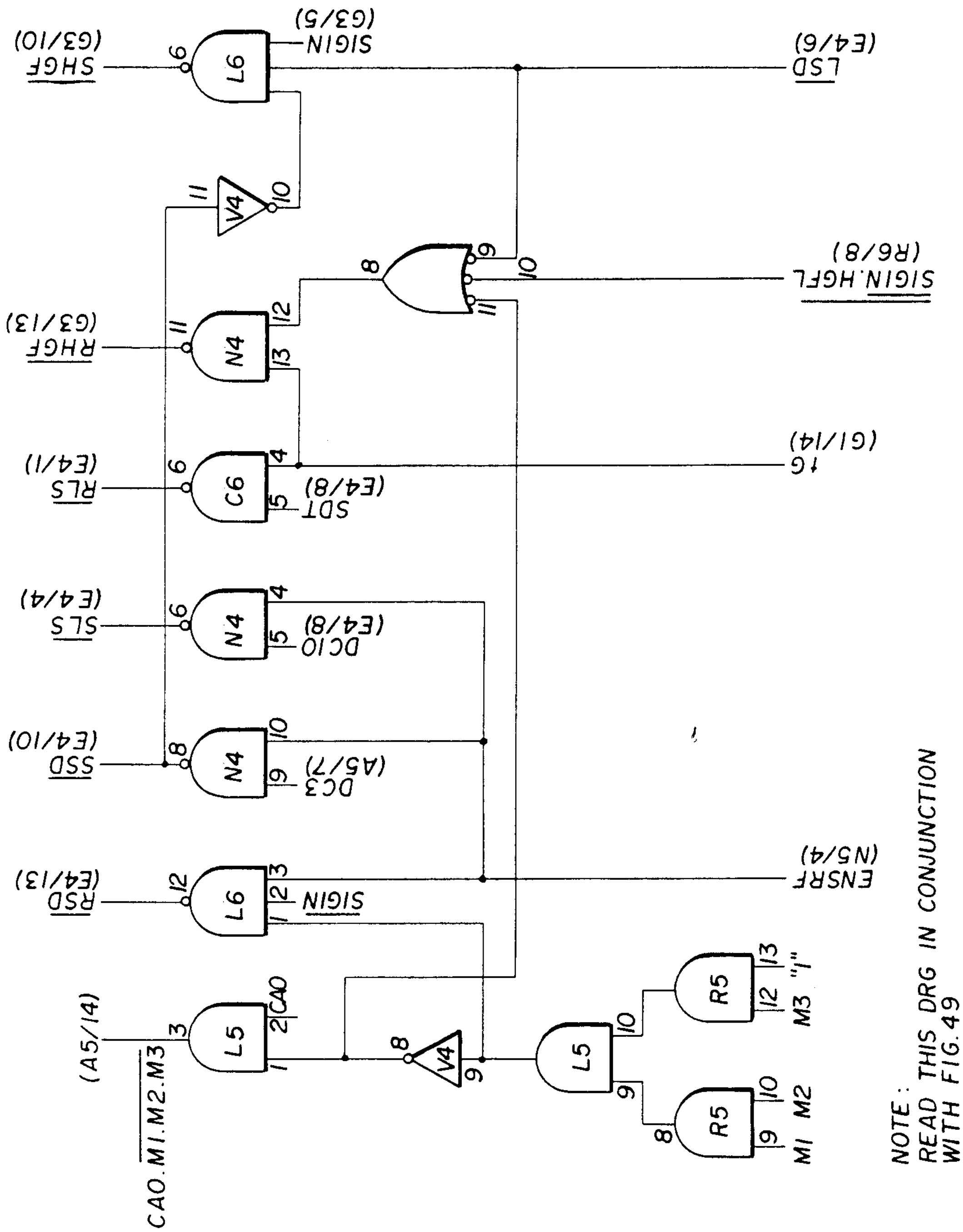

FIG. 50 is a detailed schematic illustration described in FIG. 48*c*.

Figure 51A:
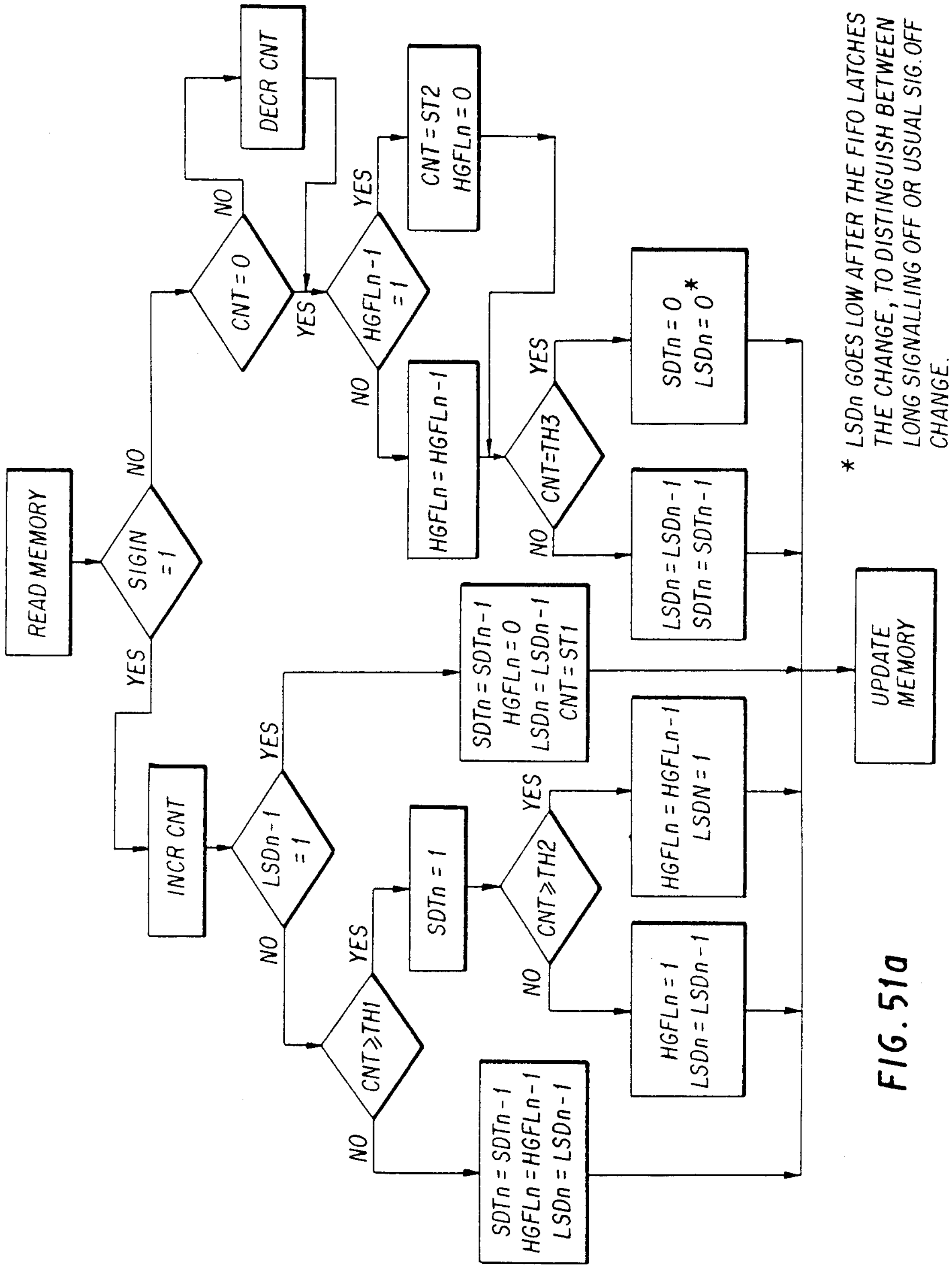
FIG. 51(*a* to *c*) is a flow chart and timing diagram of signalling detection circuitry divided into three parts a–c.
Figure 51B:
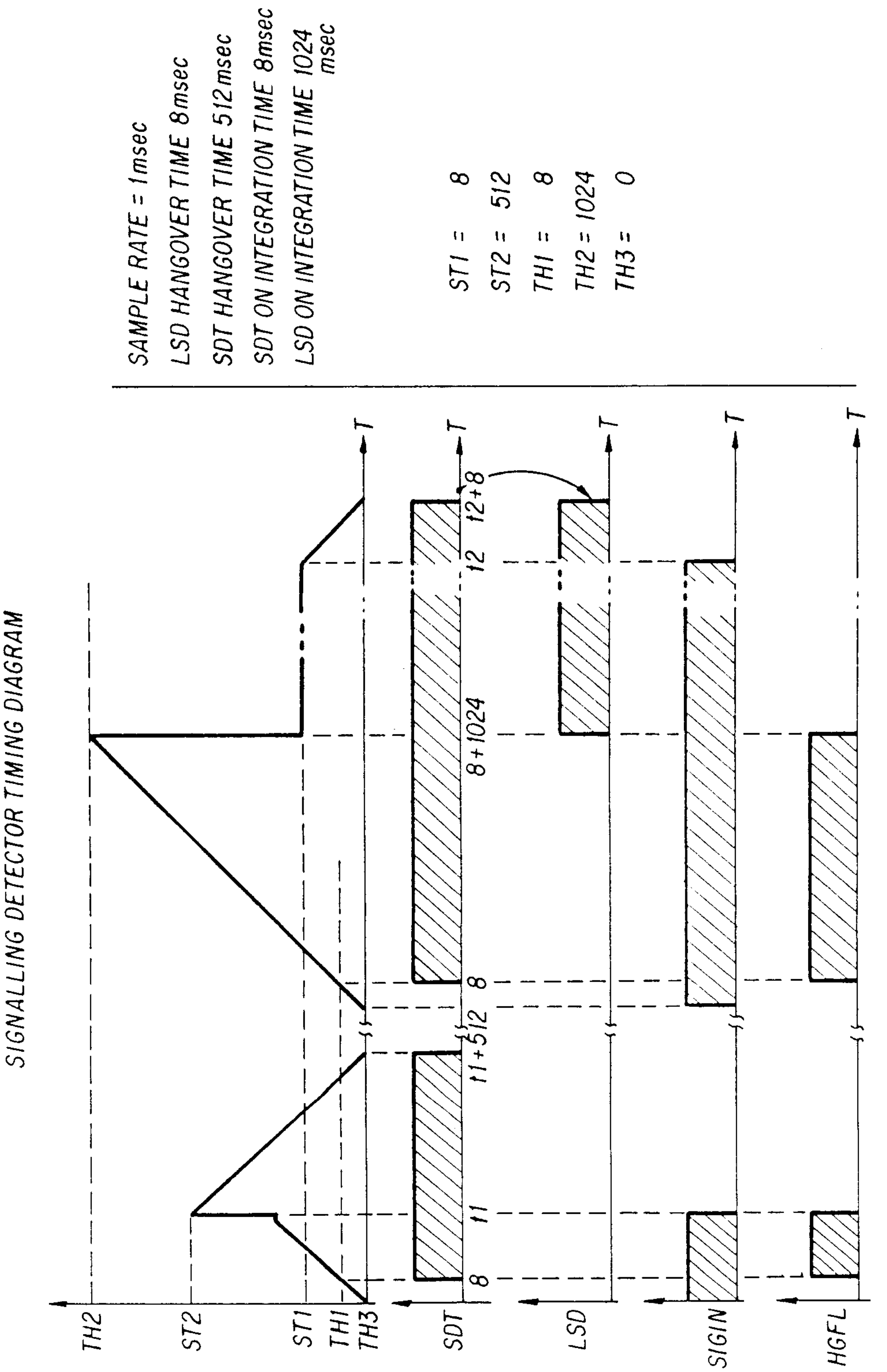

FIG. 51*a* is a flowchart illustrating in principle the operation of the signalling detection circuitry shown in FIG. 48*c*. FIG. 51*b* is a timing diagram illustrating the integration function of the signalling detection circuitry of FIG. 48*c*. FIG. 51*c* is a timing diagram illustrating the time relationship of the signals provided by detector timing and control circuitry 712.

Reference is now made to FIG. 52 which illustrates in block diagram form apparatus for treatment of out of band signalling at the receive end, as opposed to the transmit end described hereinabove. The circuitry shown here is similar in many respects to that of the transmit end described above but differs therefrom in that it does not contain a delay memory which is not required since the receive signalling circuitry merely monitors proper operation of the signalling wires and does not provide new assignments.

An RX signalling input interface 730 and an RX signalling output interface 732 each receive timing signals from timing circuitry 71 (FIG. 2) and may be similar in construction to the interface circuitry illustrated in FIG. 12 hereinabove. Interface 730 interconnects signalling wires corresponding to 24 communication channels to a multiplexer 734, typically 4 LS151 chips. The output of multiplexer 734 is supplied directly to an addressable latch 736, such as 6 LS 259 chips, which outputs along 48 parallel lines via interface 732 to signalling wires corresponding to the 48 telephone communication lines.

A counter 748 provides a six bit output to latch 736, memories 742 and 744 and to a signalling control memory 750, the latter via a multiplexer 752. Control memory, in turn provides a five bit output which operates multiplexer 734 for matching the received signalling information to the signalling wire indicated by the control memory 750. Both control memory 750 and multiplexer 752 receive timing inputs from circuitry 746 and operate in two modes, one in which the cyclic addressing of counter 748 provides cyclic, synchronized operation of latch 736 and multiplexer 734 and the second, which occurs when the cyclic operation is not taking place, in which the CPU interacts with the control memory via the CPU data bus and a bidirectional tristate buffer 754 for updating thereof in an asynchronous manner.

Signalling control memory 750 also provides a three bit output to activity counter 740 such as LS-163. The activity counter is also connected to the output of multiplexer 734 SIGR and is incremented whenever signalling activity is present on the signalling wire of the communication channel.

The CPU resets the the three bits in the control memory and checks their value after a predetermined period of time.

Bidirectional tristate buffer receives a five bit output from control memory 750 and three bit output from activity counter 740, as well as control signals from the CPU and circuitry 746 and provides an eight bit output to the CPU, which instructs the CPU to send an acknowledge signal in response to the received signalling information. This acknowledge signal is sent over a speech channel. When the CPU attempts to interact with the control memory during cyclic operation thereof, control circuitry 746 provides a WTR 4 wait signal to the CPU.

In summary it may be understood that the receive signalling circuitry described hereinabove provides the necessary matching between incoming signalling information and the appropriate signalling wires and also senses the presence of signalling information in order to provide an acknowledge signal indicating receipt thereof.

FIG. 53 is a detailed schematic illustration of the received signalling data and control circuitry including blocks appearing in FIG. 52.

There is also provided in accordance with an embodiment of the present invention TASI apparatus for use with analog transmission facilities. This apparatus will not be described with reference to FIG. 54 and the following figures.

The circuitry of FIG. 54 will be described in the following order: Transmission circuitry from signal input to output followed by Receiving circuitry from signal input to output.

Two conductors from the relay set (not shown) representing each of the 48 active subscriber lines are connected to an input circuit 1130 Only one input circuit 1130 is shown in the drawing, it being understood that 48 identical input circuits are provided in the apparatus in accordance with the invention. Input circuit 1130 comprises a 1:1 audio transformer 1132 which receives the inputs from the relay set and which provides an output to a low-pass filter 1134 having a pass band of 0.3 to 3.4 kH approximately. Transformer 1132 is operative to provide impedance matching and balancing while low-pass filter 1134 is operative for eliminating noise.

The output of low pass filter 1134 is supplied to decision circuitry 1136 which determines whether voice is present and which will be described hereinafter. The output of low pass filter 1134 is also applied across a capacitor 1138, typically of value 1 $\mu$F to a delay line 1140 which provides a 40 ms delay. The delayed output of delay line 1140 is supplied across a second low pass filter 1142 having a pass band of 0.3 to 3.4 kH approximately to an output 1140. The delay provided by delay line 1140 is designed to allow for operation of the decision circuitry 1136 (about 10 ms) the central processing unit to be described hereinafter (about 2 ms), and the transmission of a message prefix containing channel assignment and synchronization information (about 20 ms) prior to transmission of the voice signals. The second low pass filter 1142 is provided to smooth the output of delay line 1140.

The respective outputs of 48 input circuits 1130 each corresponding to an active subscriber line are supplied to 48 respective inputs of Time Division Multiplexer circuitry 1150 which is operative to match subscriber lines on which voice is present to an available one of 24 communications channels. Time Division Multiplexer circuitry 1150 comprises a 64 to 1 multiplexer including six 8 to 1 multiplexers 1152 such as 4051 chips, each of which receives eight of the 48 inputs, and additional multiplexers which form part of Message Modem output circuitry 1156 which provides a 24 bit message prefix including assignment, synchronization, acknowledge and reference information in a manner which will be described hereinafter. It is a particular feature of the present invention that the assignment, synchronization and identification information is transmitted along the communications channels instead of on separate signalling channels as in the prior art.

The six multiplexers 1152 and the Message Modem output circuitry 115 output to an 8 to 1 multiplexer 1158 also typically a 4051. Multiplexers 1152 receive control signals from a control memory 1160. Multiplexer 1158 supplies an output to a 1–24 multiplexer comprising a 1–6 multiplexer 1162 whose outputs are supplied to respective inputs of six 1–4 multiplexers 1164. Multiplexers 1162 and 1164 receive control inputs from a counter 1166 which receives inputs from timing circuitry 1168.

The operation of Time Division Multiplexer circuitry 1150 will now be described briefly. Counter 1166 is a cyclic devide by 24 counter which provides a binary output both to multiplexers 1162 and 1164 and to control memory 1160. At any given time, the output of counter 1166 refers to one of the communications channels. The control memory 1160 receives information from the central processing unit (CPU) which indicates whether the communications channel addressed to the control memory is available for assignment. The control memory also contains information, received via the CPU indicating which active subscriber lines are carrying voice signals. Thus for each communications channel addressed thereto in time sequence, the control memory provides a binary code in the same time sequence to multiplexers 1152 and 1158 identifying the active subscriber line to be assigned thereto.

Each of the 24 outputs of multiplexers 1164 is supplied to a hold circuit 1170, only one of which is illustrated in the drawing for the sake of simplicity. Hold circuits 1170 provide a desired amount of signal holdover so as to avoid attenuation of the conversion due to the duty cycle of the sampling technique employed.

The output of each of the 24 hold circuits is supplied to an output circuit 1172, only one of which is shown in the drawing, for simplicity. Output circuit 1172 comprises a 1:1 audio transformer 1174 for impedance matching and output balancing. The two-conductor output of each of the 24 transformers 1174 is supplied to a filter 1175 and to corresponding input of a carrier (not shown).

It is appreciated that assignment of a given active subscriber circuit to a communication channel is carried out only upon detection of voice signals present thereon. The decision circuitry 1136 which is operative for voice detection will now be described briefly.

As noted above, the output from low-pass filter 1134 of input circuit 1130 is supplied to decision circuitry 1136. A total of 48 such outputs are supplied from the respective input circuits to respective inputs of six 8 to 1 multiplexers 1180 whose outputs are supplied to respective inputs of a 6 to 1 multiplexer 1182. Multiplexers 1180 and 1182 receive timing signals from counter 1166 and are operative to provide a time-shared cyclic sampling of the 48 active subscriber lines. The sampled signal is applied to a threshold comparator 1184. Threshold comparator receives a reference input from echo suppression circuitry 1186 which will be described in detail hereinafter. The output of the threshold comparator is supplied to SPD circuitry 1188 which is operative to determine whether predetermined criteria for voice detection have been fulfilled and which determines a hangover period during which the active subscriber line is to remain assigned to a communication channel following termination of voice detection. The SPD circuitry receives timing signals from counter 1166 and provides output signals to the CPU.

Echo suppression circuitry 1186 and SPD circuitry 1188 will be described hereinafter in detail with reference to detailed circuit diagrams.

The operation of the decision circuitry described generally above will now be briefly explained. Multiplexers 1180 and 1182 provide a cyclic time shared sampling of the active subscriber lines. As each line is sampled it is applied to threshold comparator 1184, which compares its amplitude with a variable reference. The reference is determined, within predetermined limits by the echo suppression circuitry 1186 which increases the threshold when an echo is detected, in order that the echo should not be detected as a voice signal. The echo suppression circuitry is operative such that the threshold is not raised sufficiently to ignore a voice signal having the same amplitude as the echo. The SPD circuitry senses the proportion of time during which the signal exceeds the threshold. If within a given minimum period of time, typically 8 ms, the threshold is continually exceeded, voice detection is indicated. The SPD is also operative to determine the hangover time during which assignment is continued following termination of voice detection. This hangover time is designed to avoid chopping of speech as the result of the pronunciation of consonants or whispered syllables which produce a low amplitude voice signal. The hangover time varies between a predetermined minimum and maximum as a function of the duration and proportion of time that the sampled signal exceeds the threshold. The SPD circuitry 1188 provides an output indication of a change in the status of each active subscriber line to the CPU, referred to hereinafter by the reference numeral 1200.

Turning now to the receiving circuitry, it is seen that two conductors from a carrier (not shown) representing each of the 24 communication channels are connected to respective inputs of a 1:1 audio transformer 1202 whose output is supplied to a low pass filter 1204. The transformer and low-pass filter together constitute a receiver input circuit 1206 whose function is to match impedances and balance the inputs as well as to limit the pass band to 0.3–3.4 kHz approximately. Twenty four receiver input circuits are provided, only one of which is illustrated in the drawing, for the purposes of clarity and conciseness.

The respective outputs of the 24 receiver input circuits 1206, each corresponding to a communications channel, are supplied to respective inputs of multiplexer circuitry 1208 which comprises three 4051 8 to 1 multiplexers 1210 which output to a 3 to 1 multiplexer 1212. Multiplexers 1210 and 1212 receive control inputs from counter 1166 so as to perform a cyclic sampling function. The output of multiplexer 1212 is supplied to an A/D converter 1214 such as an ADC 6012 of Burr-Brown.

The output of A/D converter 1214 is a 12 bit parallel signal and is supplied to a digital delay line 1216, which provides a delay of 20 ms. Delay line 1216 is actually a delay memory and receives a relatively slow timing signal from counter 1166 and a relatively fast timing signal from a speed up counter 1218, which enables the signal contained in the delay memory 1216 to be read out to a message receiving circuit 1220 at a greatly accelerated rate.

The message receiving circuit 1220 reviews the signal to identify if there is a message contained therein. It will be recalled that the message is produced by Modem circuitry 1156 of the TASI apparatus on the other end of the transmission trunk link and contains, among other things an identification code. This identification code is sensed by message receiving circuit 1220, which will be described in greater detail hereinafter. In response to a sensed identification code, message receiving circuit 1220 provides an output indication to the CPU 1200.

Another output of delay memory 1216 is supplied to echo suppression circuitry 186, to be described in detail hereinafter, for enabling echo detection. This output is also supplied to receiver output multiplexer circuitry 1222 which includes a D/A converter 1224 which receives the output and supplies it to a 1 to 8 multiplexer 1226. The respective outputs of the multiplexer 1226 are supplied to 1 to 6 multiplexers 1228.

Each of the 48 outputs of the multiplexers 1228 is supplied to a hold circuit 1230 which provides a desired amount of holdover in order to permit continuous transmission of the voice signals. The output of a noise generator 1232 is added to the input of each hold circuit to provide a natural sounding background noise to the subscriber during times when the active subscriber line is not assigned to a communication channel.

Multiplexers 1226 and 1228 operate in response to control signals received from a control memory circuit 1234. Control memory circuit receives timing signals from counter interfaces with the CPU 1200 and provides an output also to echo suppression circuitry 1186. Control memory circuit 1234 is operative to assign one of the 48 active subscriber lines to the signal received from D/A converter in accordance with the assignment information contained in the message sent by the Message Modem 1156 of the TASI apparatus on the other end of the transmission link and received by message receiving circuit 1220. Control memory circuit receives the necessary assignment information from circuit 1220 via the CPU.

The output of each of the hold circuits 1230 is supplied to a receiver output circuit 1240 comprising a low pass filter 1242 which outputs to a 1:1 audio transformer 1244 whose two output terminals 1246 are connected to respective voice receiving leads of an active subscriber line in a relay set. Although only one hold circuit 1230 and receiver output circuit 1240 are illustrated in the drawing, it is appreciated that 48 of these circuits are provided, one for each active subscriber line.

Figure 55:
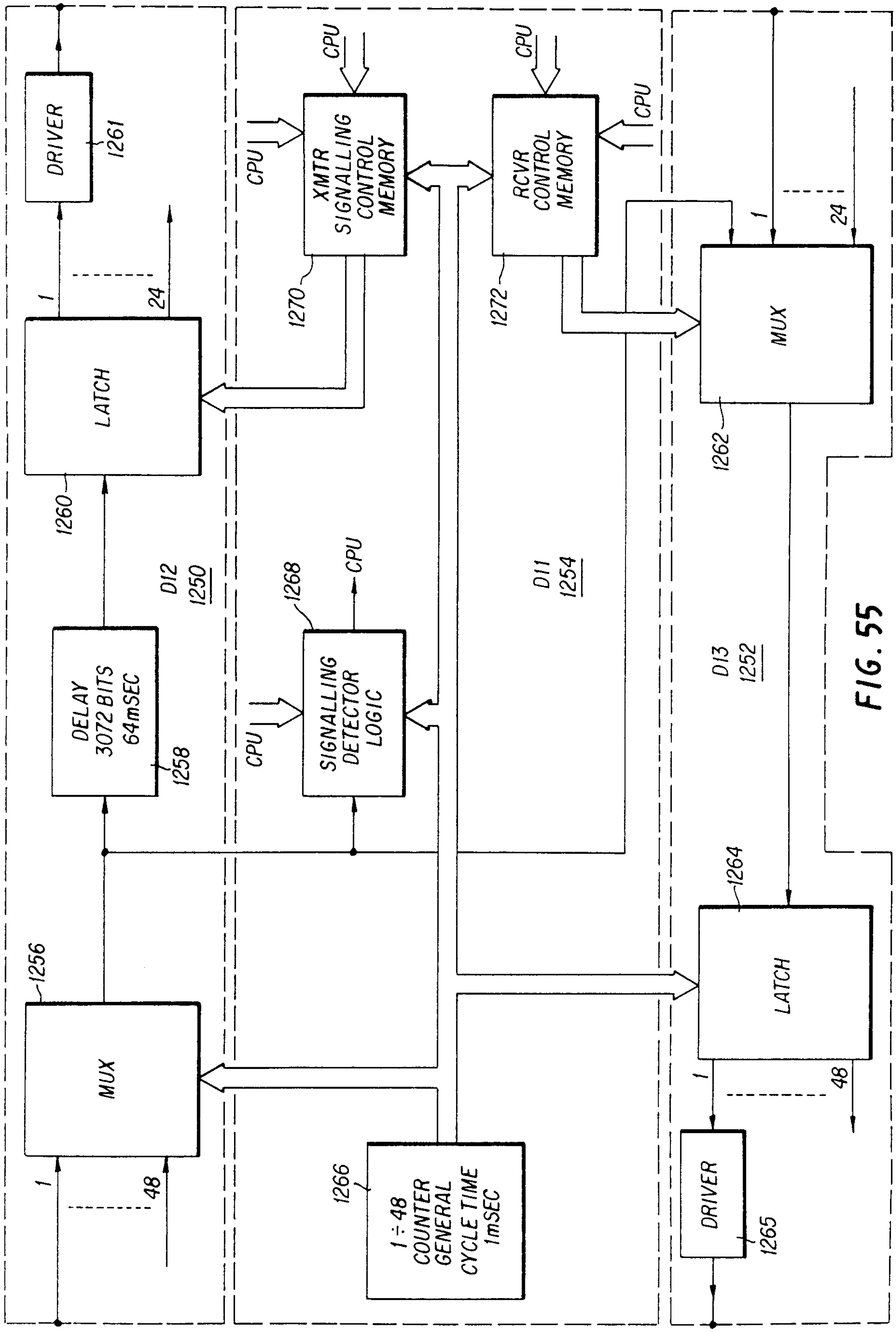
FIG. 55 is a block diagram of signalling circuitry for the system of FIG. 54.
Figure 56A:
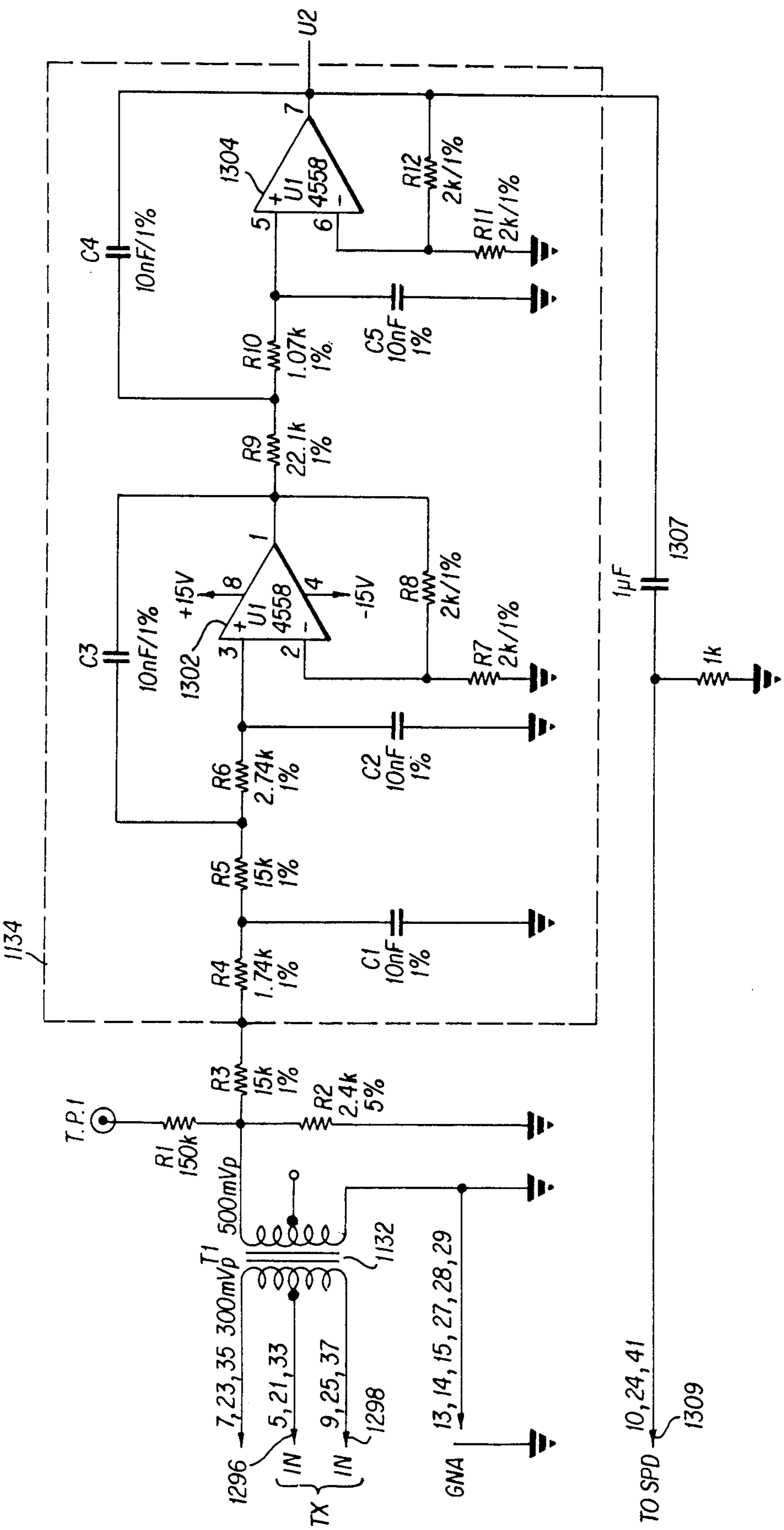
FIG. 56(*a* to *d*) is a schematic illustration of interface circuitry.
Figure 56B:
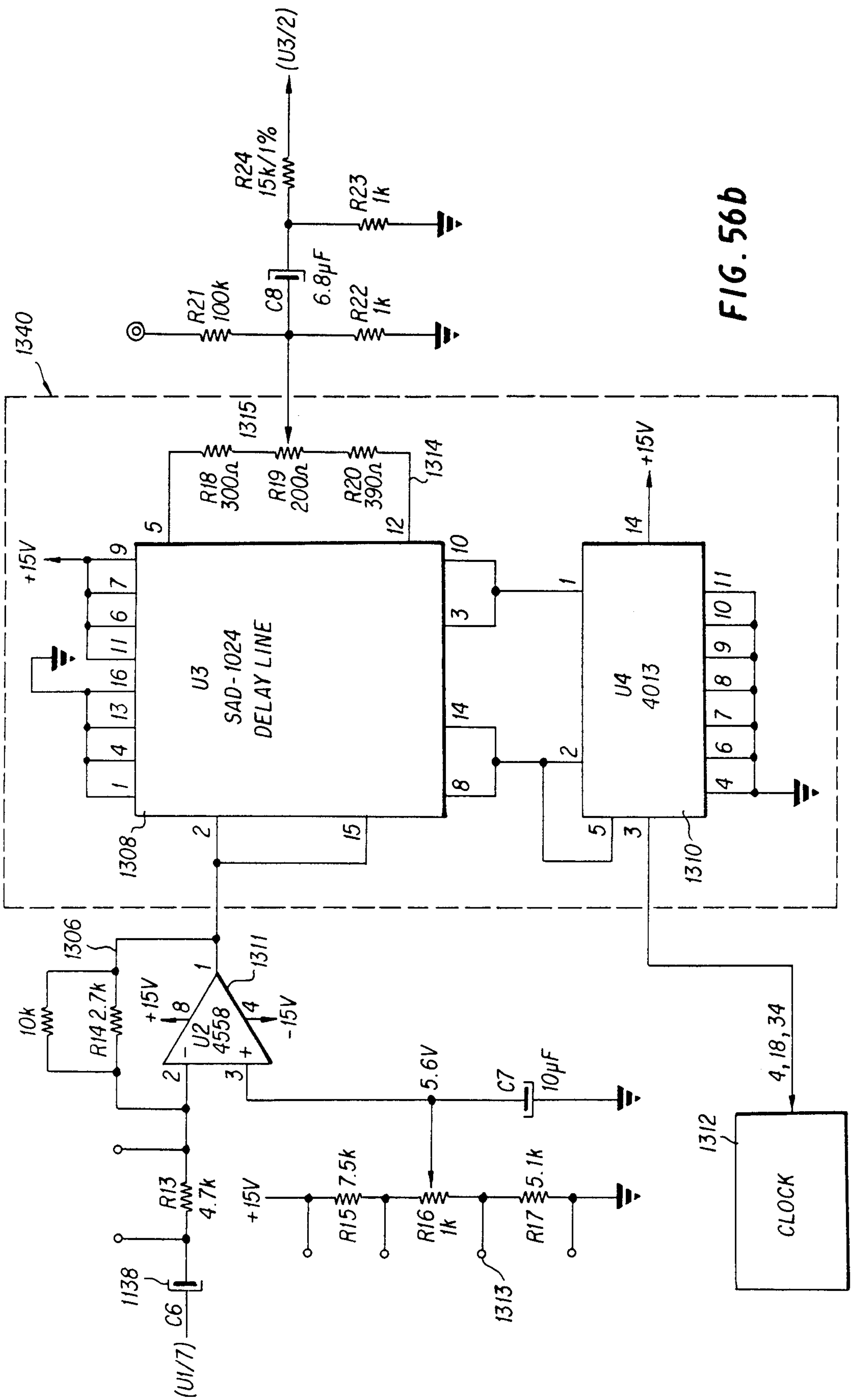
Figure 56C:
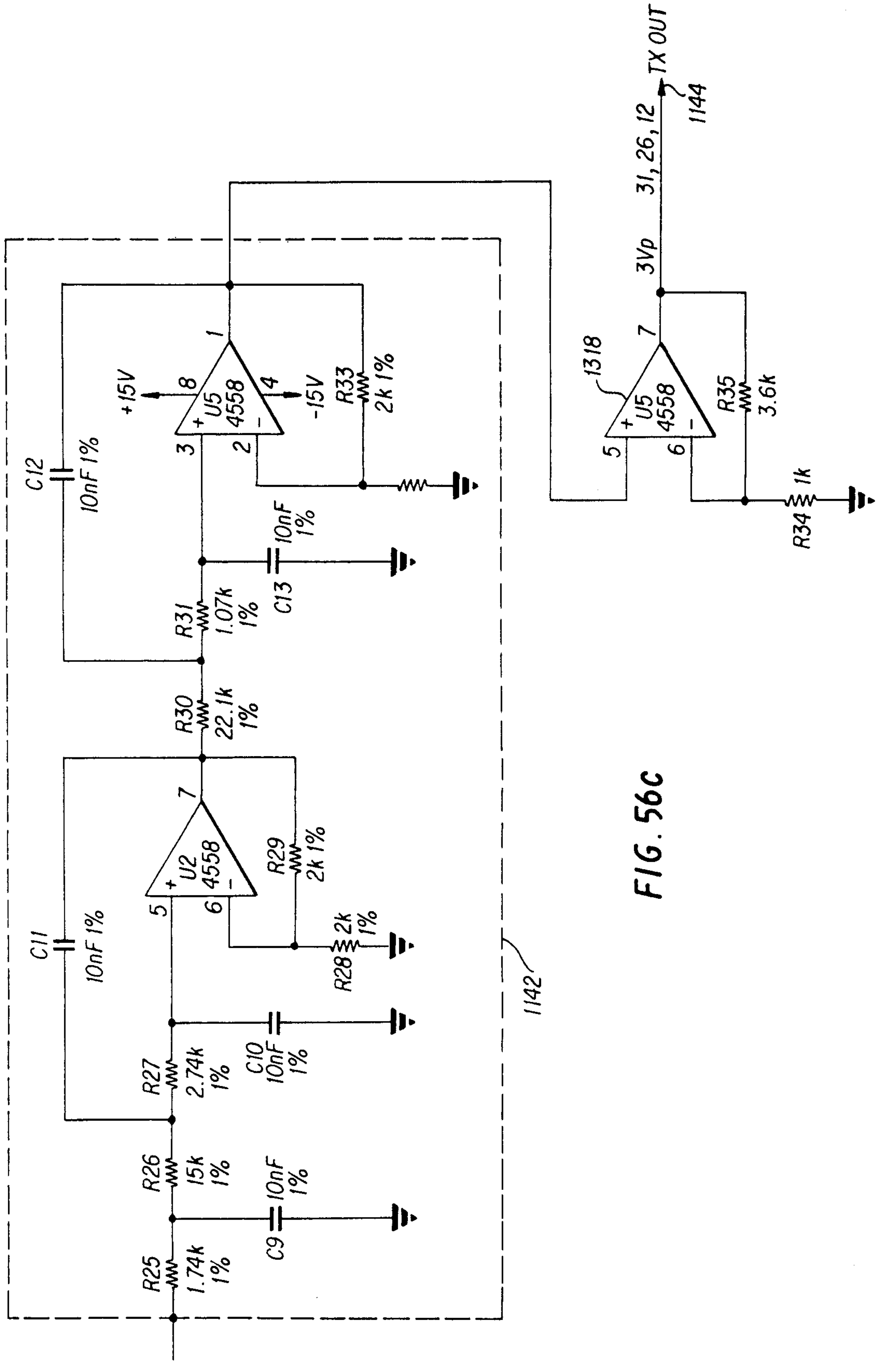
Figure 56D:
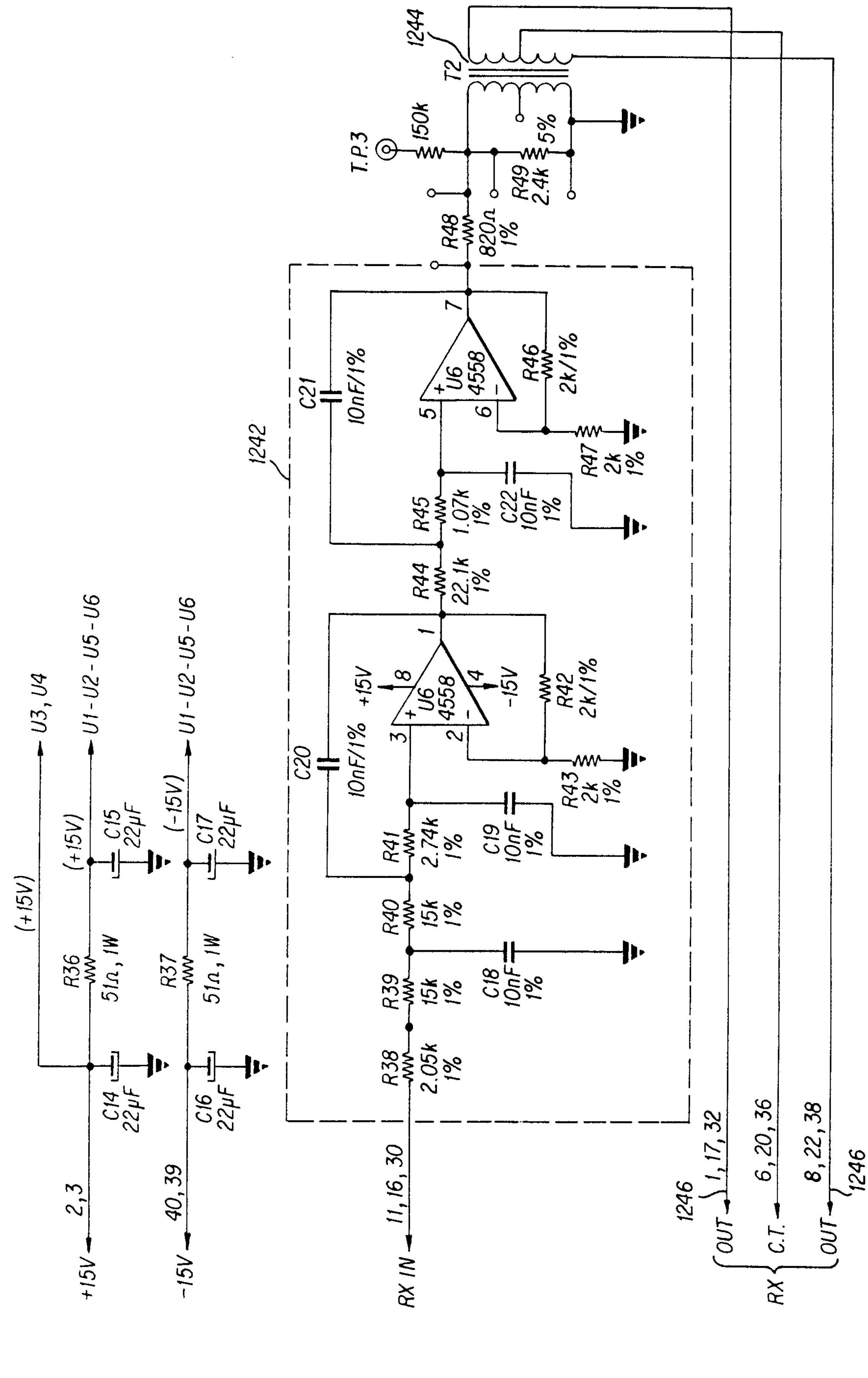
Figure 57A:
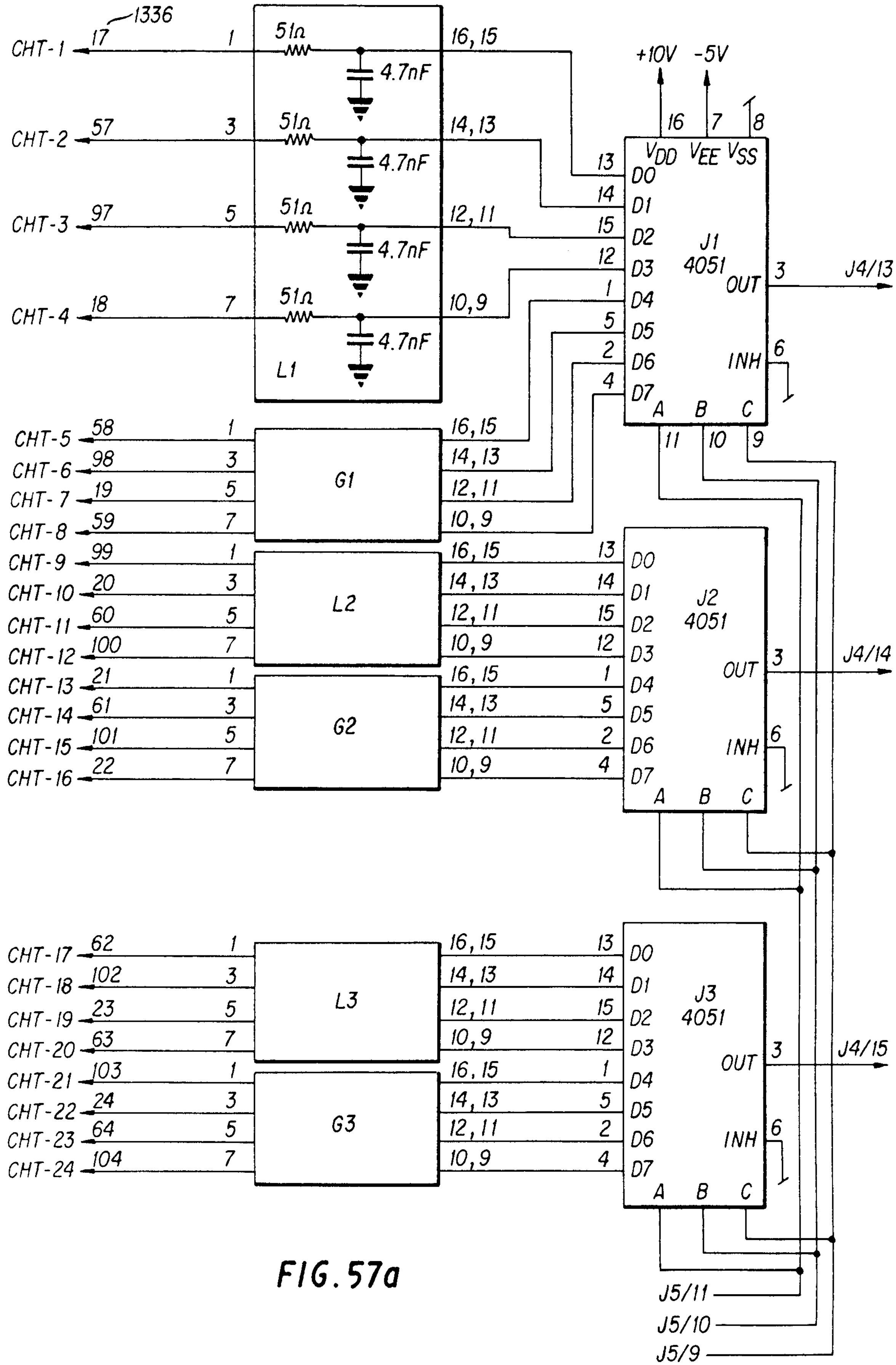
FIG. 57(*a* to *h*) is a schematic illustration of a transmit multiplexer.
Figure 57B:
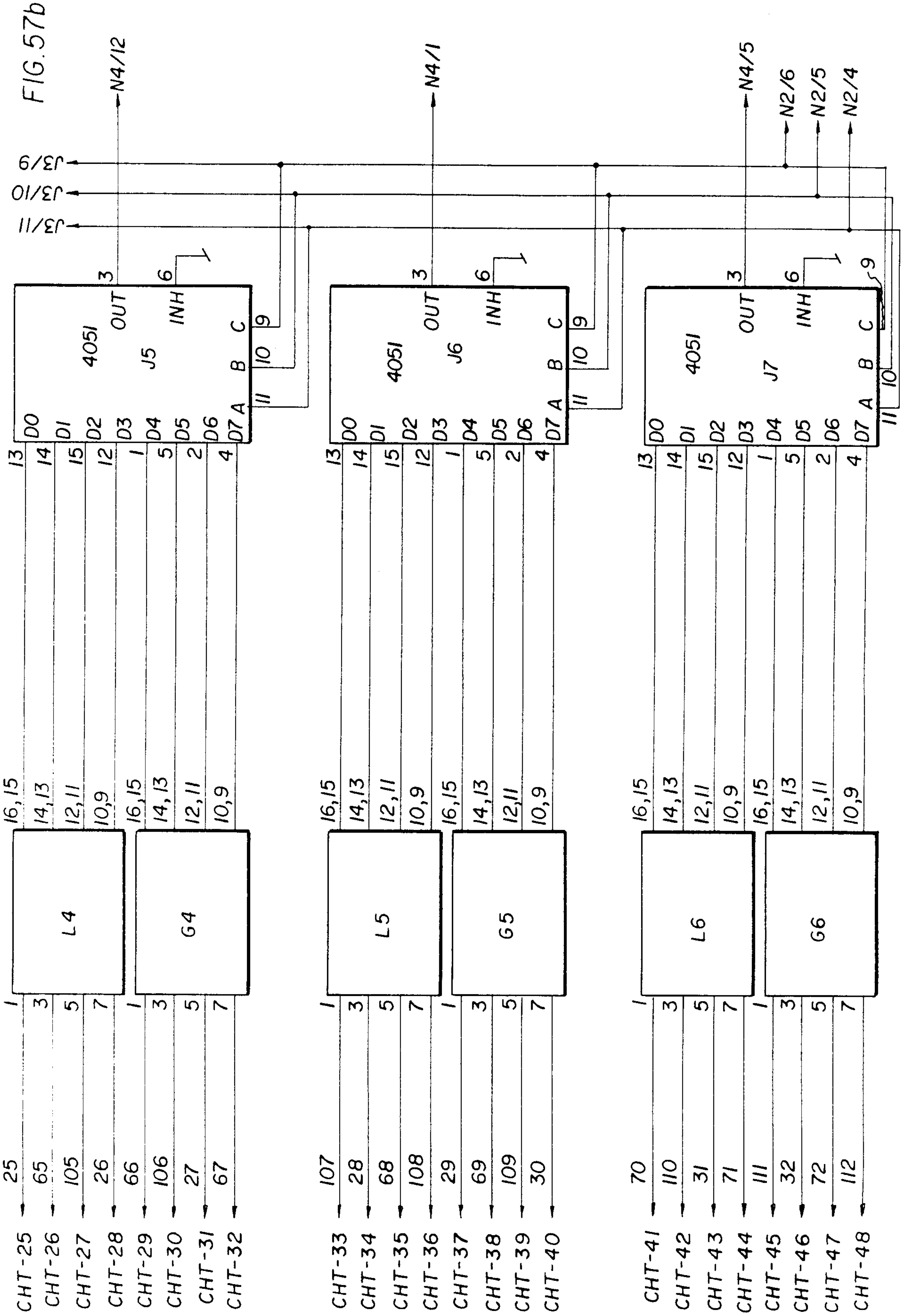
Figure 57C:
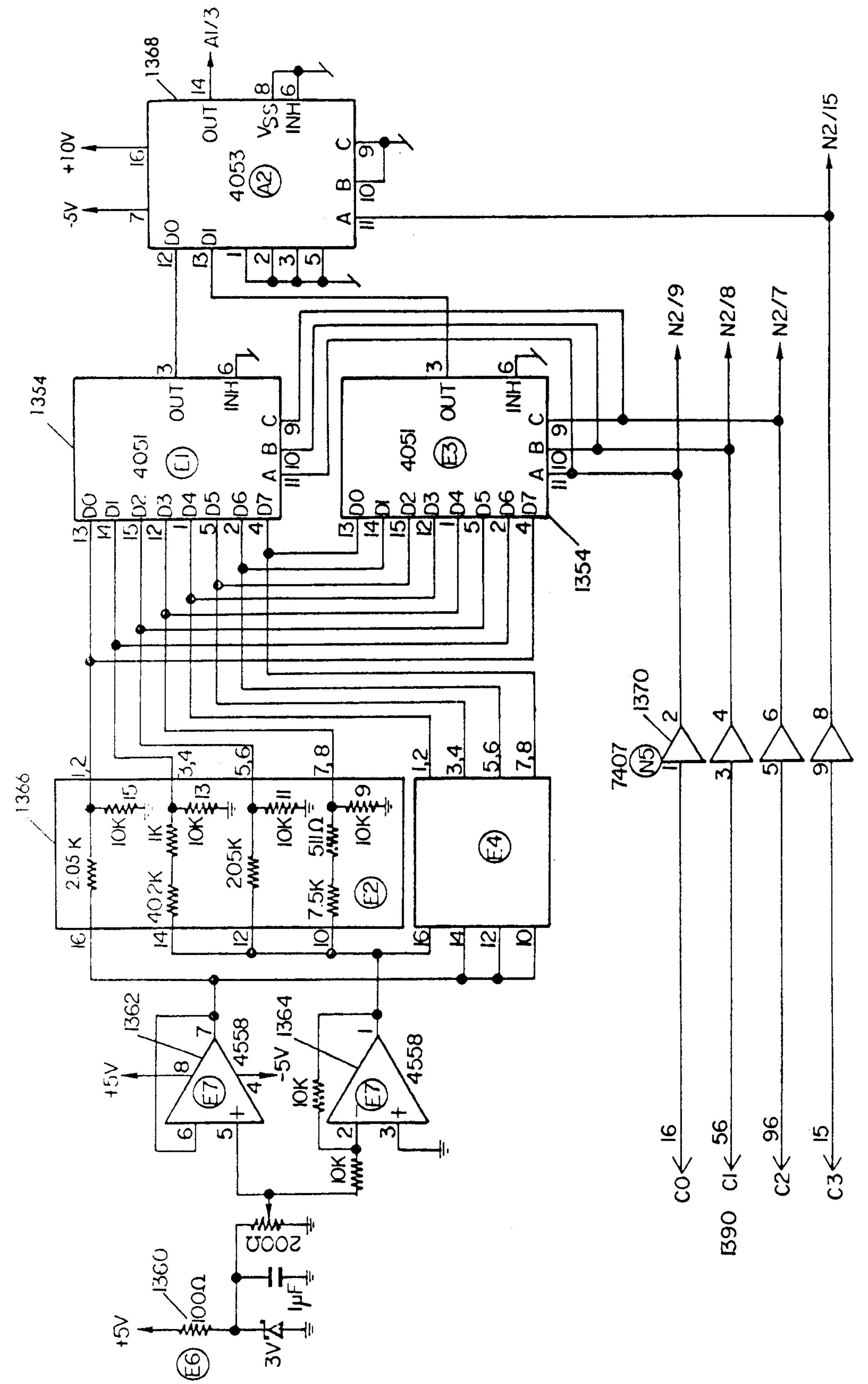
Figure 57D:
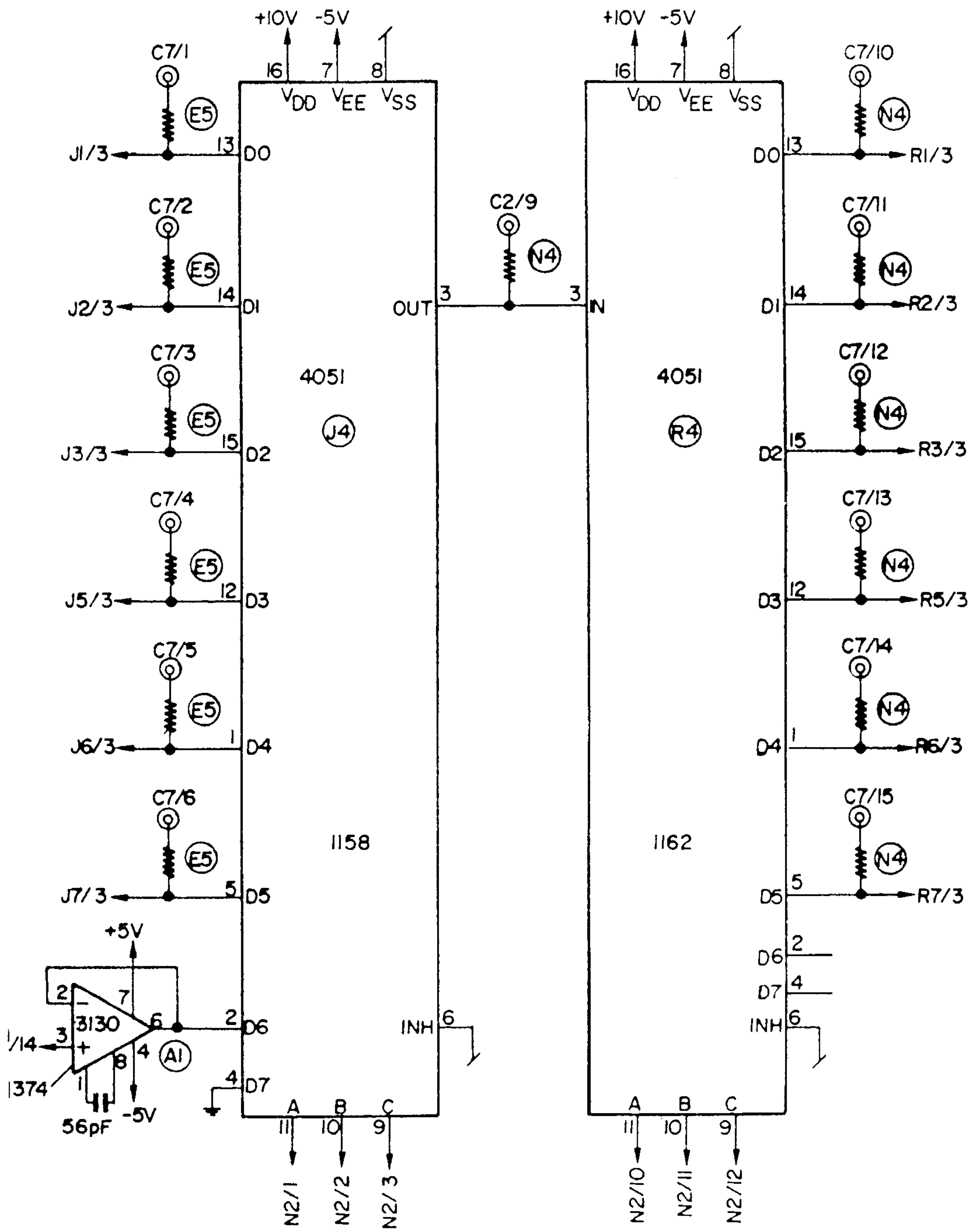
Figure 57E:
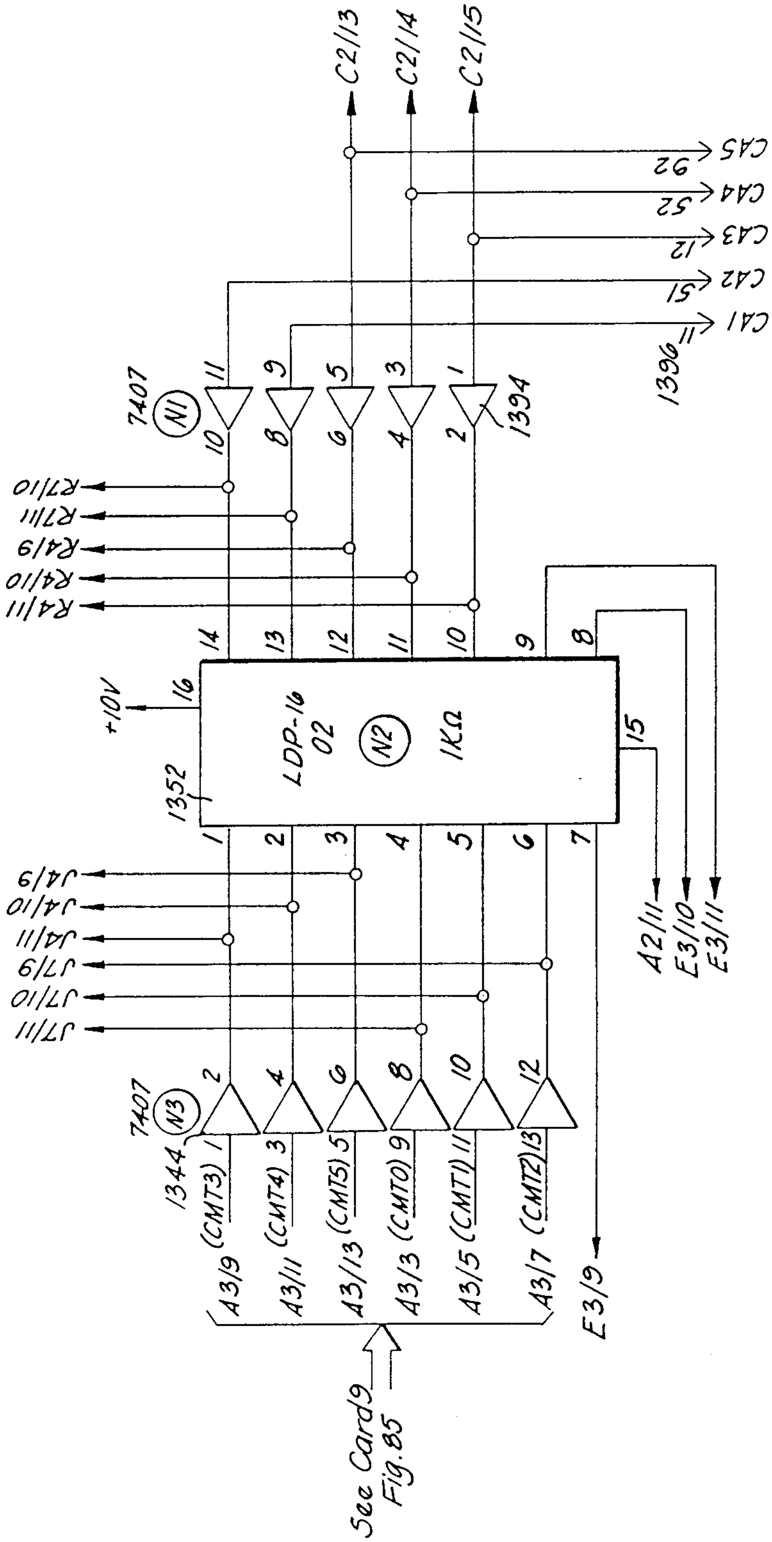
Figure 57F:
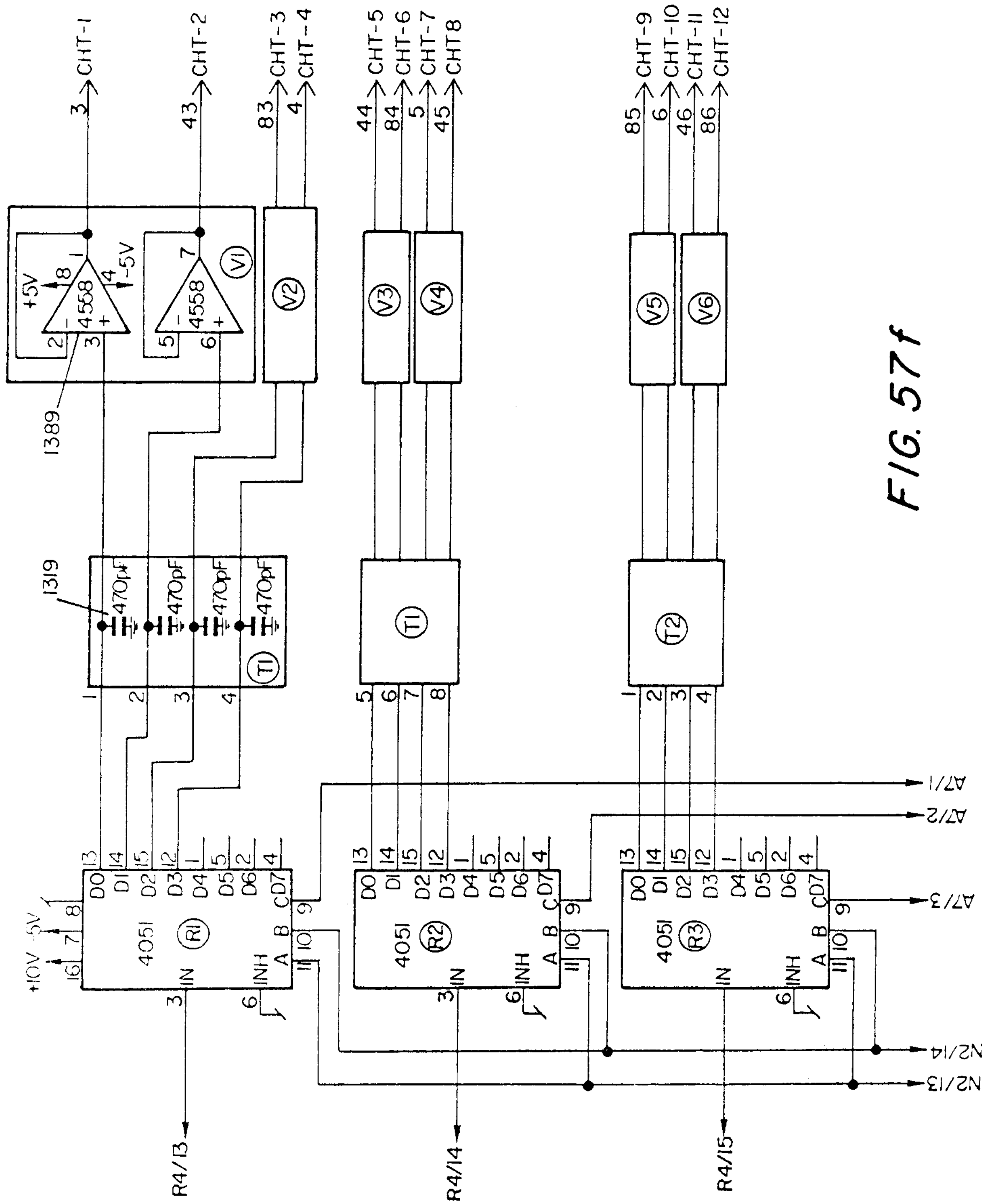
Figure 57G:
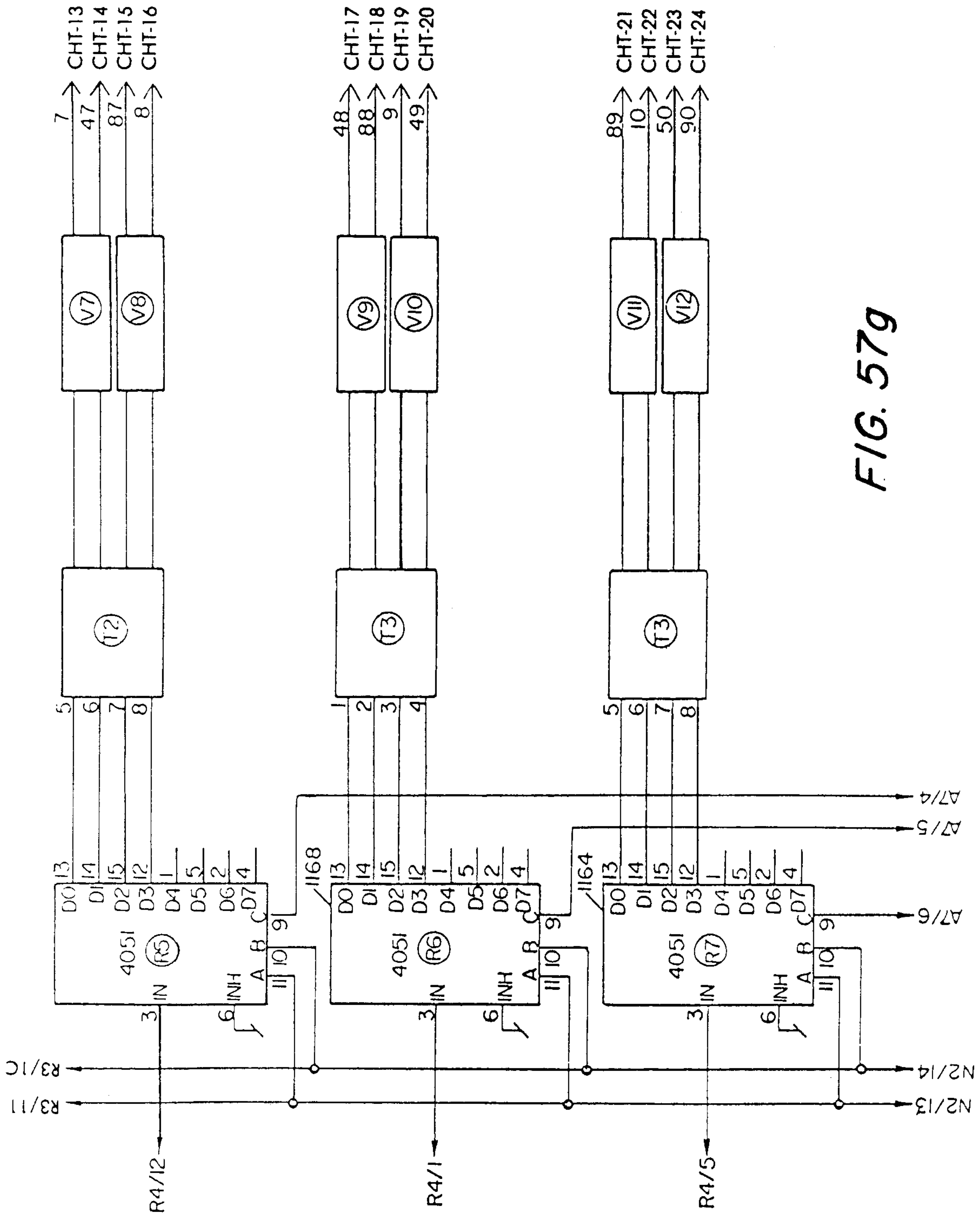
Figure 57H:
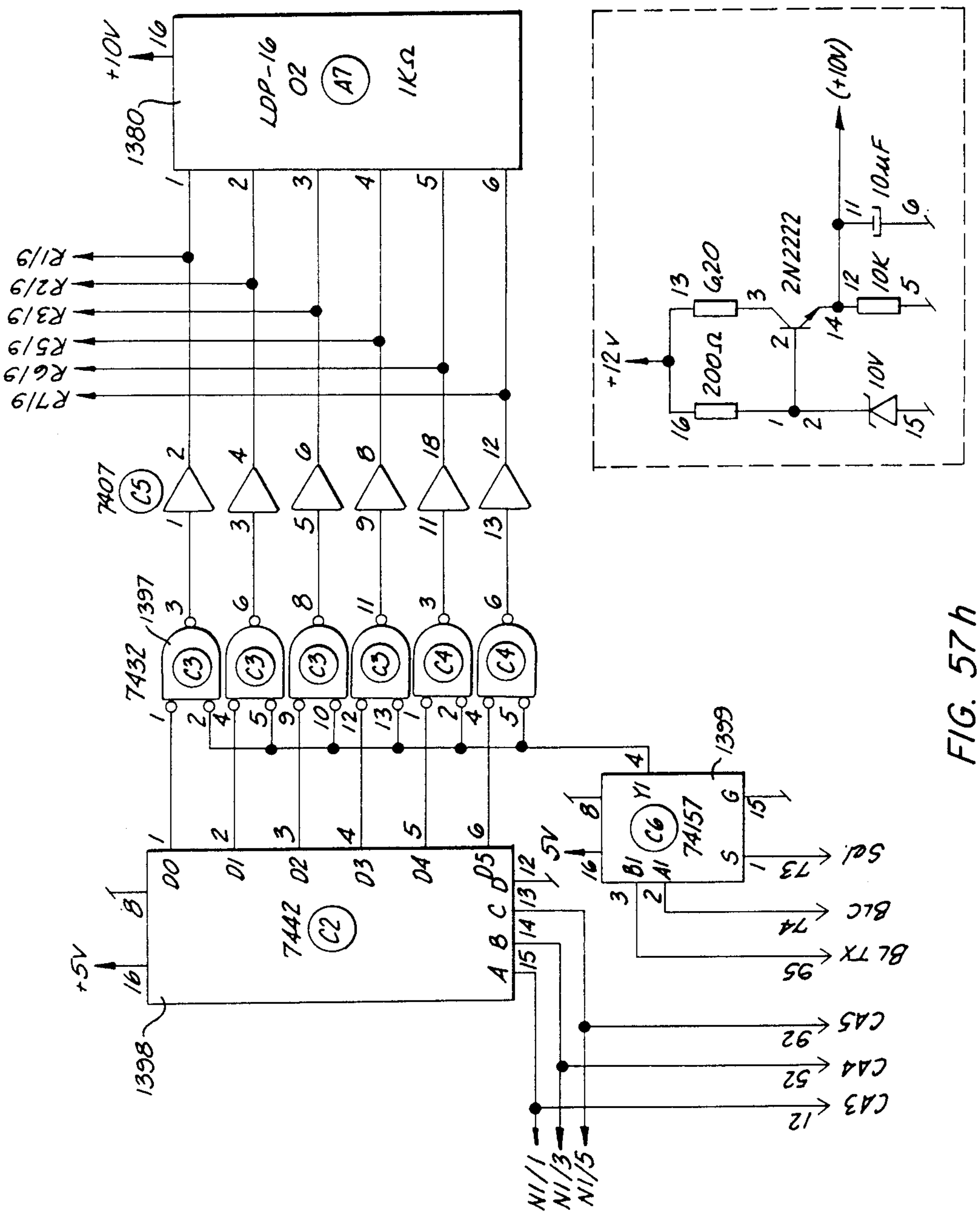

Reference is now made to FIG. 55 which illustrates a portion of the TASI apparatus of the present invention which deals with signalling, as opposed to voice channels. The signalling circuitry illustrated in FIG. 55 is purely digital and comprises a transmitting portion 1250, a receiving portion 1252 and a control portion 1254.

The transmitting portion 1250 comprises a 48-1 multiplexer 1256 which is connected at a relay set (not shown) to 48 active subscriber lines and which provides an output to a digital delay circuit 1258, which provides a delay of 64 msec. The output of delay 1258, is supplied to a latch 1260 having 24 outputs, each connected via a driver 1261 to a communication channel.

Similarly the receiving portion 1252 comprises a 24-1 multiplexer 1262 connected to a carrier having 24 communication channels and providing an output to a latch 1264 having 48 outputs, each of which is connected via a driver to an active subscriber line.

The control portion comprises a a cyclic counter 1266 which supplies timing pulses to multiplexers 1256 and 1262 of the transmitting and receiving portions respectively for synchronously cycling the multiplexers and for operating signalling detector logic circuitry 1268, a signalling control memory 1270 and a receiver control memory 1272. The signalling detector logic circuitry 1268 also receives an input from the output of multiplexer 1256 and interfaces with the CPU.

The signalling control memory 1270 also receives inputs from the CPU and provides a control output to latch 1260 indicating the assignment of one of the 24 communication channels for each time slot indicated by the counter 1266.

The receiver control memory 1272 receives inputs from the CPU and provides a control output to multiplexer 1262 indicating the assignment of one of the 48 active subscriber lines for each time slot indicated by the counter 1266 in accordance with received assignment instructions.

It is another particular feature of the invention that signalling communication channel assignment information is also supplied via the voice channels rather than via the signalling channels. This is accomplished by instructions sent by the logic circuitry 1268 to the CPU indicating what assignment information is to be sent by the message transmitting modem.

Reference is now made to FIG. 56 which is a detailed schematic illustration of input circuitry 1130 and of receiver output circuit 1240. The two circuits are shown together for convenience since they contain some identical circuitry and are located on the same circuit board in an actual constructed embodiment.

Inputs 1296 and 1298 which are connected to an active subscriber line in the relay set (not shown) are connected to a transformer 1132, also seen in FIG. 54 whose function has already been described. The output of transformer 1132 is supplied to low pass filter 1134 which is a two stage active filter and which is an RC filter network 1300 followed by first and second operational amplifiers 1302 and 1304 which are provided with capacitive feedback. The output of filter 1134 is applied across a capacitor 1138, also shown in FIG. 54 and which provides AC coupling only thereacross, to circuitry 1306 which attenuates the output of filter 1134 and applies a DC bias voltage thereto. Capacitor 1138 prevents this DC voltage from reaching filter 1134.

Filter 1134 also provides an output signal via a capacitor 1307 to decision circuitry 1136 at a terminal 1309.

Circuitry 1306 comprises an operational amplifier such as a 4558 chip 1311 having a negative input connected to the output of capacitor 1138 and a positive input connected to a voltage divider 1313.

The output of circuit 1306 is supplied to delay line 1140 which comprises a SAD - 1024 chip 1308 which is controlled by a 4013 Flip Flop 1310. Flip flop 1310 receives clock pulses from a clock 1312, which will be described hereinafter in greater detail. The two outputs of delay line chip 1308 are summed and properly weighted by summing circuitry 1314 which includes a potentiometer 1315.

The output of summing circuitry 1314 is supplied via a capacitor 1316 to low pass filter 1144 which is identical in construction to low pass filter 1134 and whose function has already been described. The output of low pass filter 1142 is supplied to an amplifier 1318 which raises the signal level thereof to be suitable for supply to multiplexer circuitry 1150.

Receiver output circuit 1240 will now be briefly considered. An input from holder circuit 1230 (FIG. 54) indicated by reference numeral 1320, is supplied to low pass filter 1242 which is identical to low pass filters 1134 and 1142 illustrated in FIG. 56. The output of filter 1242 is supplied to audio transformer 1244 whose outputs 1246 are supplied to the relay set.

It is to be noted that the respective input and receiver output circuits have been shown for only one active subscriber line. The actual TASI apparatus incorporates 48 input circuits 1130 and 48 receiver output circuits 1242.

Reference is now made to FIG. 57 which is a schematic diagram of time division multiplexer circuitry 1150. Circuitry 1150 has 48 inputs, indicated by reference numeral 1336, each of which is connected to the respective output 1144 of an input circuit 1130. Each of the 48 inputs is passed through an RC filter 1338, which comprises a resistor 1340 typically of value 51 ohms and a grounded capacitor 1342, typically of capacitance 4.7 nF.

The output of each filter 1338 is applied to a respective input of an 8 to 1 multiplexer 1152, typically a 4051 chip, of which six are provided. The six outputs of multiplexers 1152 are supplied to six inputs of an 8 to 1 multiplexer 1158, also a 4051 chip. Multiplexer 1158 also receives an input from Message Modem Output circuitry 1156, which will be described hereinafter. One input of multiplexer 1158 is grounded to provide blanking for separation of adjacent signals.

The operation of multiplexers 1152 and 1154 is controlled by signals supplied to respective A, B and C inputs of the respective multiplexers. These signals, which are supplied by control logic circuitry 1350, to be described hereinafter with reference to a separate figure, pass through an open collector buffer 1344, typically a 7407 chip. The logic 1 inputs are pegged to 10 V by a resistor bank 1352, which receives a 10 Volt DC input. Resistor bank 1352 may be a LDP - 16 of value 1 Kohm. The open collector buffer isolates the 10 Volt DC voltage from the TTL circuitry in logic circuitry 1350.

Reference is now made to Message Modem Output Circuitry 1156 which comprises a stable voltage source 1360 which provides an output to first and second operational amplifiers 1362 and 1364, typically 4558 chips, which provide respective positive and negative voltage low impedance outputs. The outputs of operational amplifiers 1362 and 1364 are supplied to a resistor bank 1366 having four different resistance paths so as to provide eight outputs of which four are positive at four different voltages and four are negative at four different voltages. It will be appreciated that the eight voltages represent amplitude samples of a sine wave over one and one half cycles and are employed in DPSK (Differential Phase Shift Keying) signal modulation, as will be described hereinafter.

The eight outputs of resistor bank 1366 are supplied to respective inputs of both of two multiplexers 1354, typically 4051 8-1 multiplexers. The outputs of multiplexers 1354 are supplied to a 2-1 multiplexer 1368. Respective A, B and C inputs of multiplexers 1354 receive via an open collector buffer 1370 a cyclic three bit input which causes them to output their eight inputs in a predetermined order. These inputs are supplied from a Modem 1390 which will be described hereinafter and which governs the transmission of messages along the communication channels. The A terminal of multiplexer 1368 receives a fourth input from modem 1390 via buffer 1370 and in response thereto outputs the input received from a selected one of the two multiplexers 1354.

It may be understood that the outputs of multiplexers represent one and one half cycles of a sine wave in respective opposite phase relationship. Thus multiplexing of these outputs by multiplexer 1368 produces a PSK output, which is either a logic 0 or a logic 1. The output of multiplexer 1368 is supplied to a fast amplifier 1374 which produces a low impedance output of multiplexer 1158.

It is noted that the outputs of buffer 1370 are also coupled to outputs of resistor bank 1352 for providing a suitable voltage bias.

Multiplexer 1158 provides an output to the input of 4051 multiplexer 1162, which in turn provides six outputs to respective 1-4 4051 multiplexers 1164. Multiplexers 1164 provide a total of 24 outputs corresponding to 24 communications channels. Multiplexers 1162 and 1164 may be understood to perform a demultiplexing function.

The A, B and C terminals of multiplexer 1162 and the A and B terminals of multiplexers 164 receive control signals at terminals 1196 from counter 1166 (FIG. 54) via an open collector buffer 1394, typically a 7407 chip. These signals are coupled to outputs of resistor bank 1352 to provide them with a desired logic 1 , 10 Volt DC level.

The 4051 multiplexers 1164 display a make-before-break switching characteristic which requires intermediate blanking at each switching step in order to prevent crosstalk between the outputs of the multiplexers. A decoder 1398, typically a 7442 chip receives inputs at its A, B and C terminals from clock terminals 1196 and provides an ON signal at one of its six outputs at any given time. The six outputs are applied to respective inputs of six ANDing means incorporated in a 7432 OR gate chip 1397. Each of the gates also receives an input from a 2 to 1 multiplexer 1399. Multiplexer 1399 receives two blanking signals BLTX and BLC, one of these for normal operation and the other for emergency operation in a failure mode when 24 communication channels are always assigned to the same 24 active subscriber lines.

The six outputs of the 7432 chip 1397 are supplied to respective C inputs of the six multiplexers 1164 via an open collector buffer 1395, typically a 7407 chip. A 10 Volt DC-level is impressed on the logic 1 inputs to the multiplexers by a resistor bank 1380.

Each of the 24 outputs of multiplexers 1164 is supplied to a hold circuit 1170 which comprises a grounded capacitor 1391, typically of value 470 pF followed by a unity follower 1389 typically a 4558 chip. The output of each unity follower is supplied to an output circuit 1172 (FIG. 54).

Figure 58:
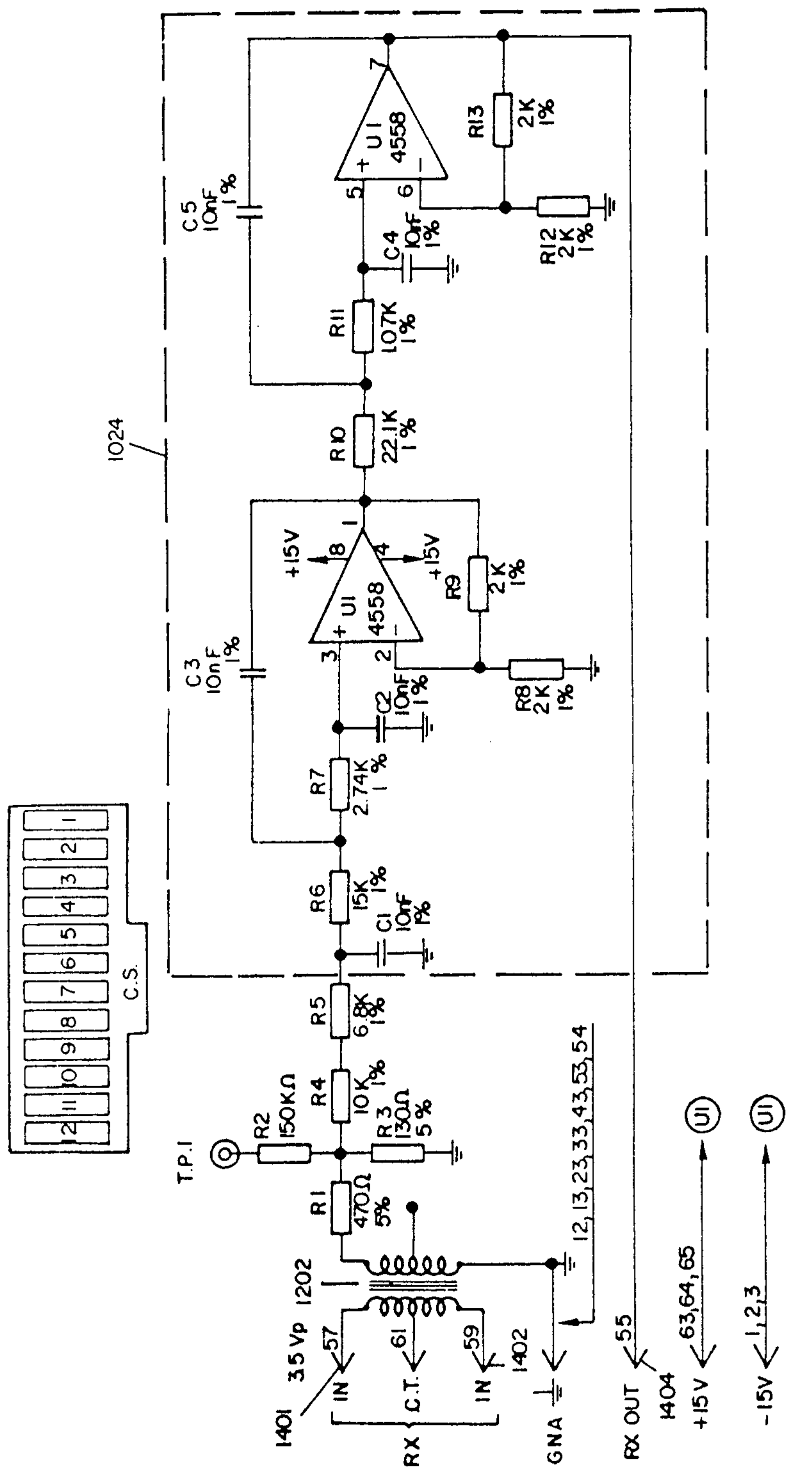
FIG. 58 is a schematic illustration of interface circuitry.

The receiver circuitry will now be considered, beginning with a reference to FIG. 58 which illustrates one of 24 receiver input circuits 1206. Each communication channel at the carrier multiplexer in (FIG. 1) is coupled to input terminals 1401 and 1402 of transformer 1202 (FIG. 54) and is supplied to low pass filter 1204 which is identical to low pass filters 1134, 1142 and 1242 (FIG. 56). The output of low pass filter 1204 at a terminal 1404 is supplied to one of the 24 inputs of receive multiplexer circuitry 1208 (FIG. 54).

Figure 59A:
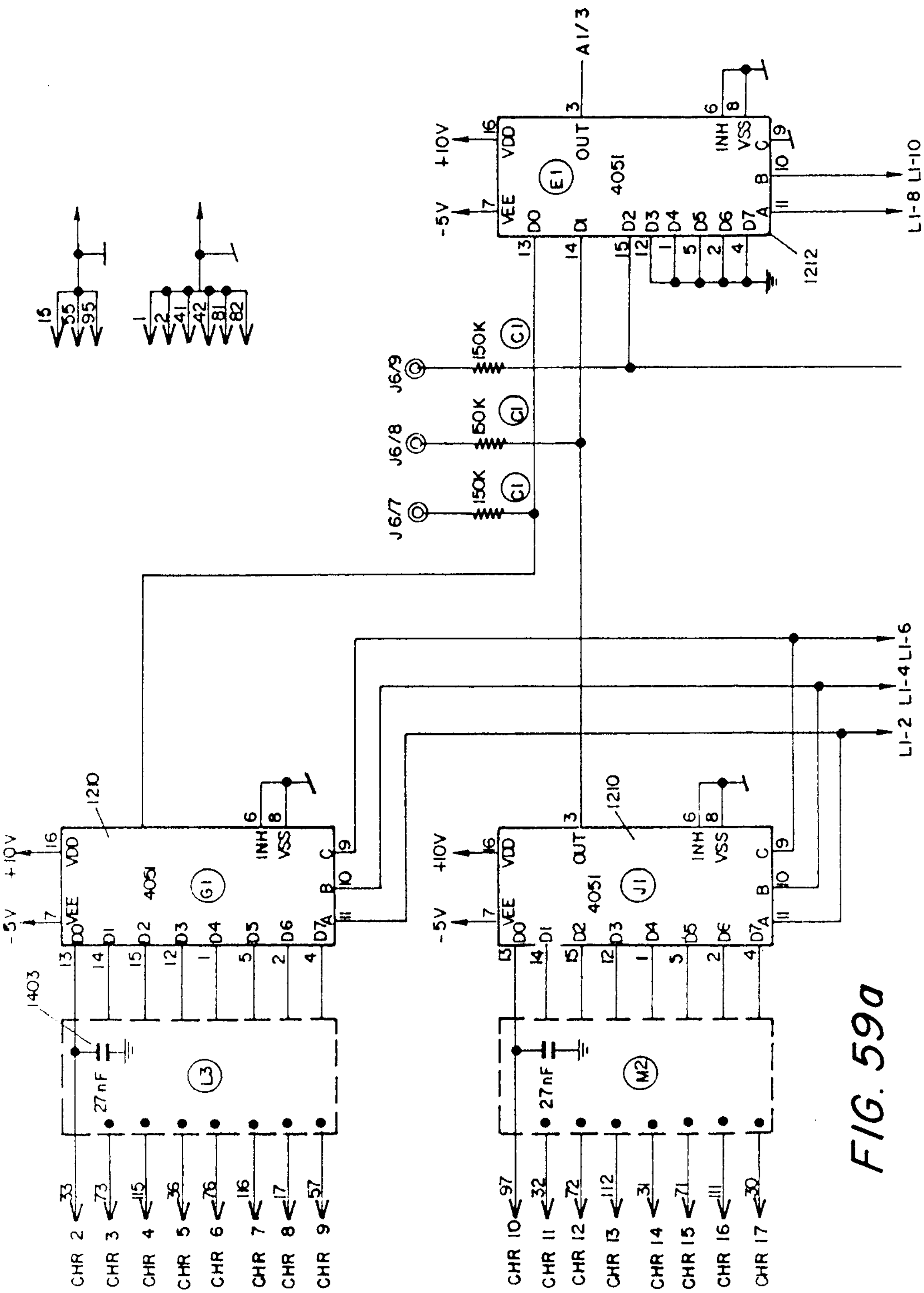
FIG. 59(*a* to *c*) is a schematic illustration of a receive multiplexer.
Figure 59B:
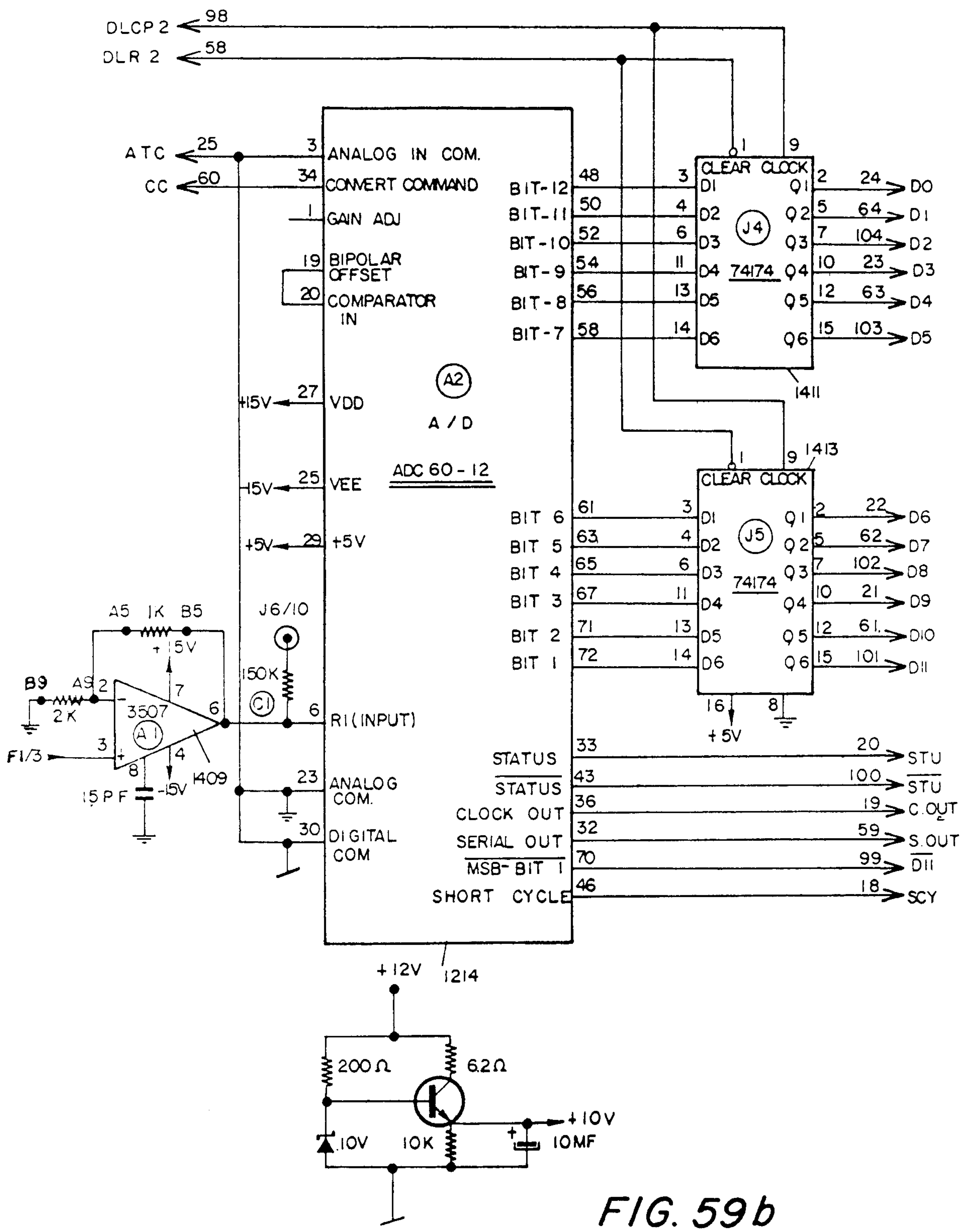
Figure 59C:
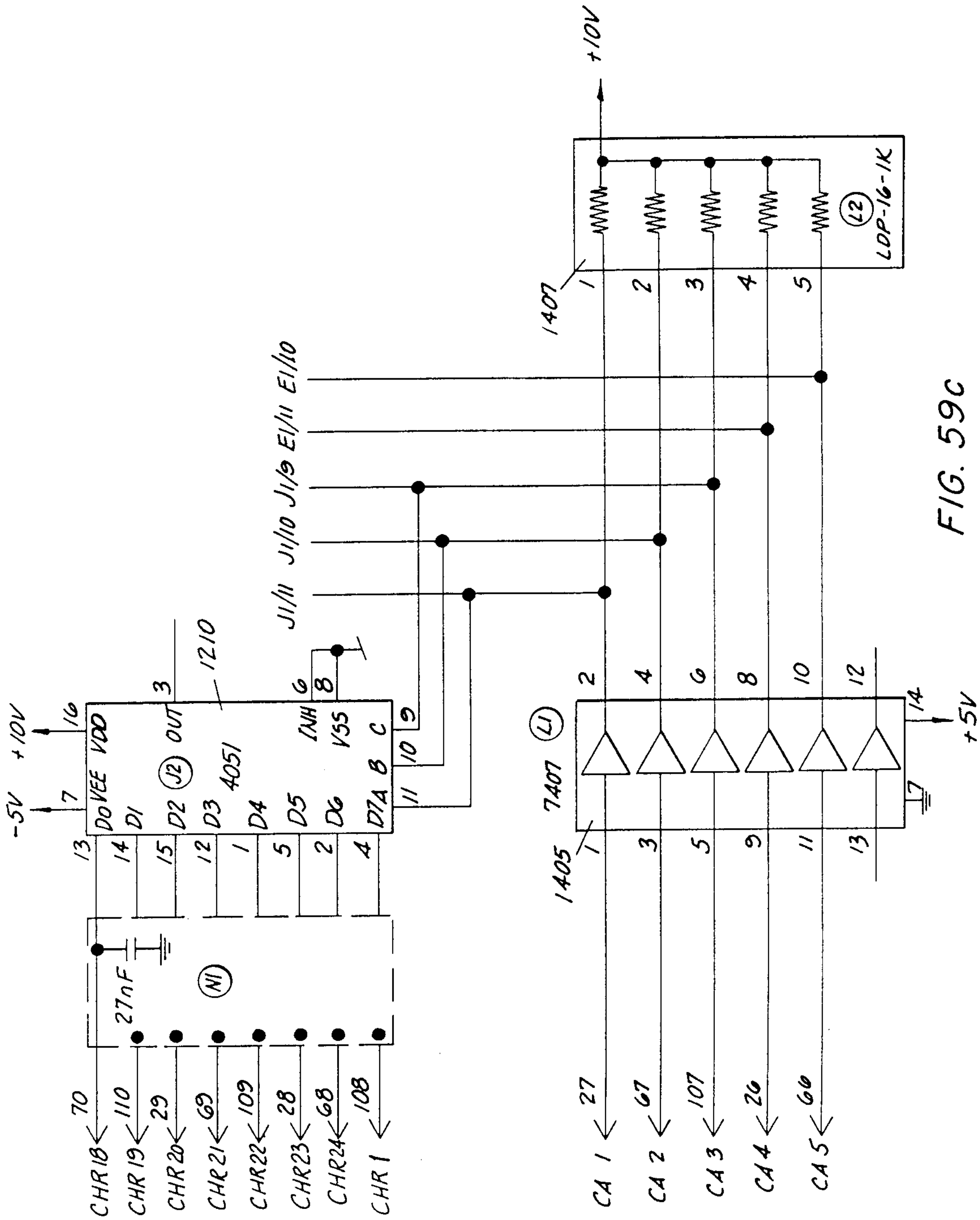
Figure 60A:
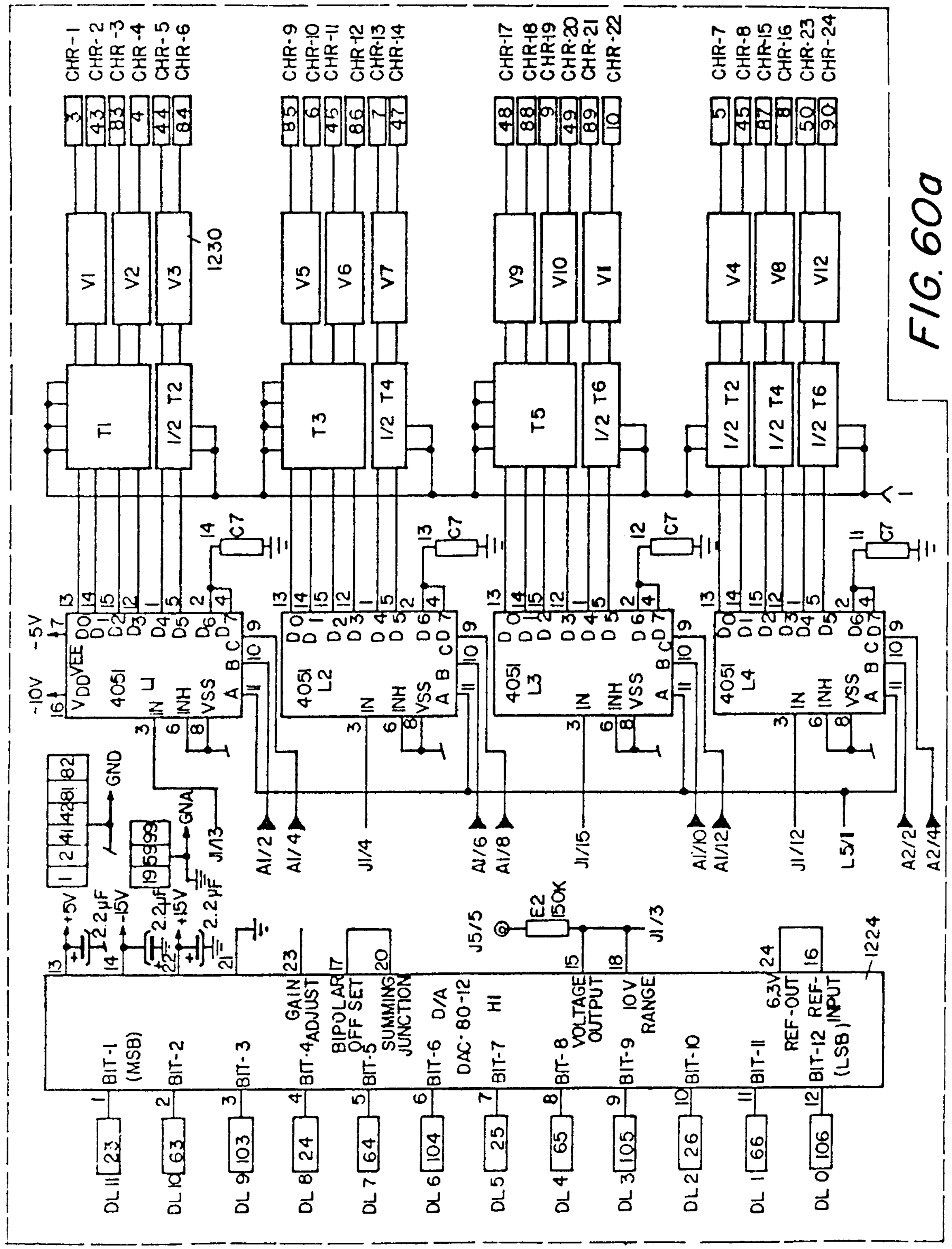
FIG. 60(*a* to *d*) is a schematic illustration of a receive demultiplexer.
Figure 60B:
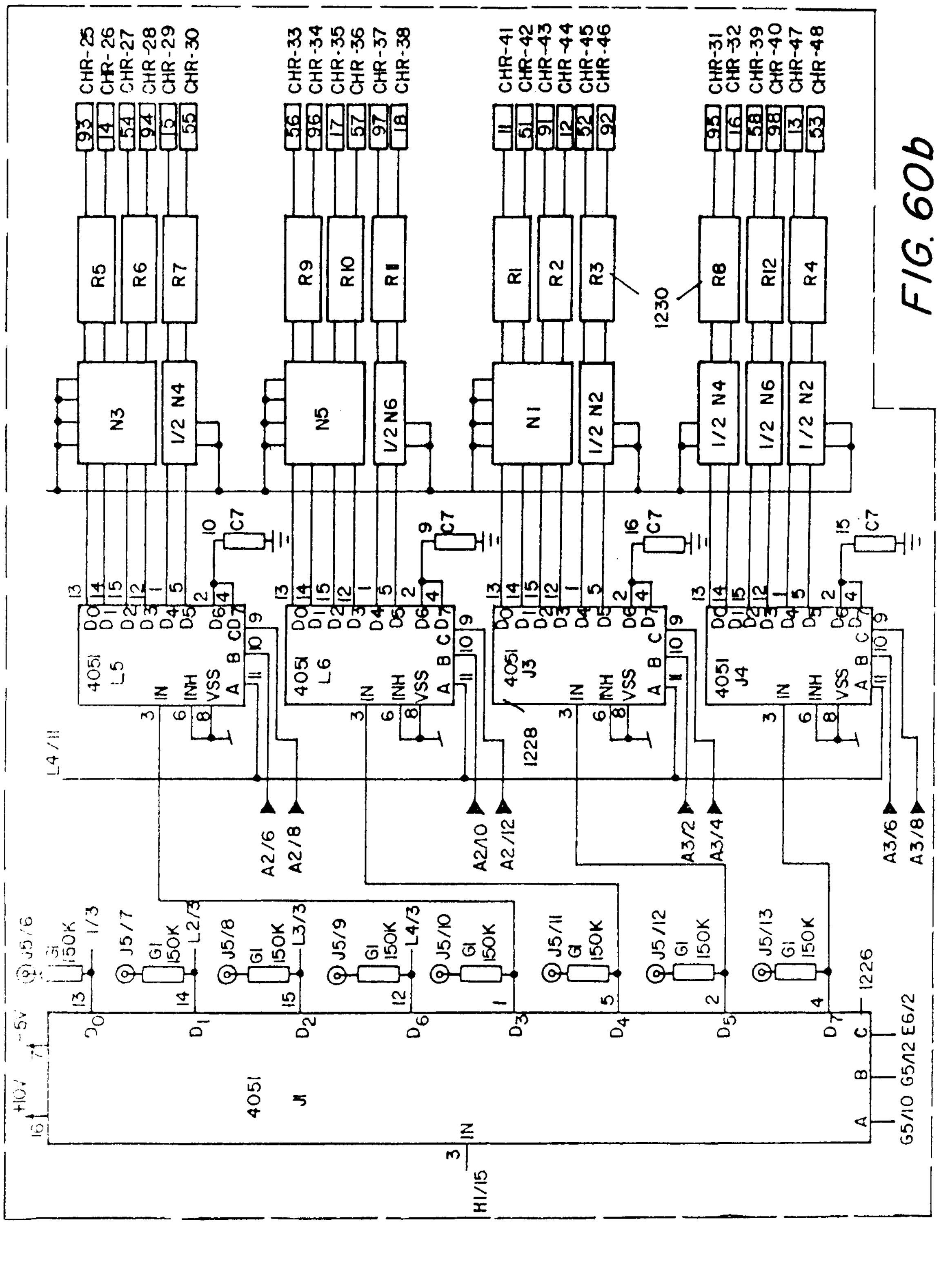
Figure 60C:
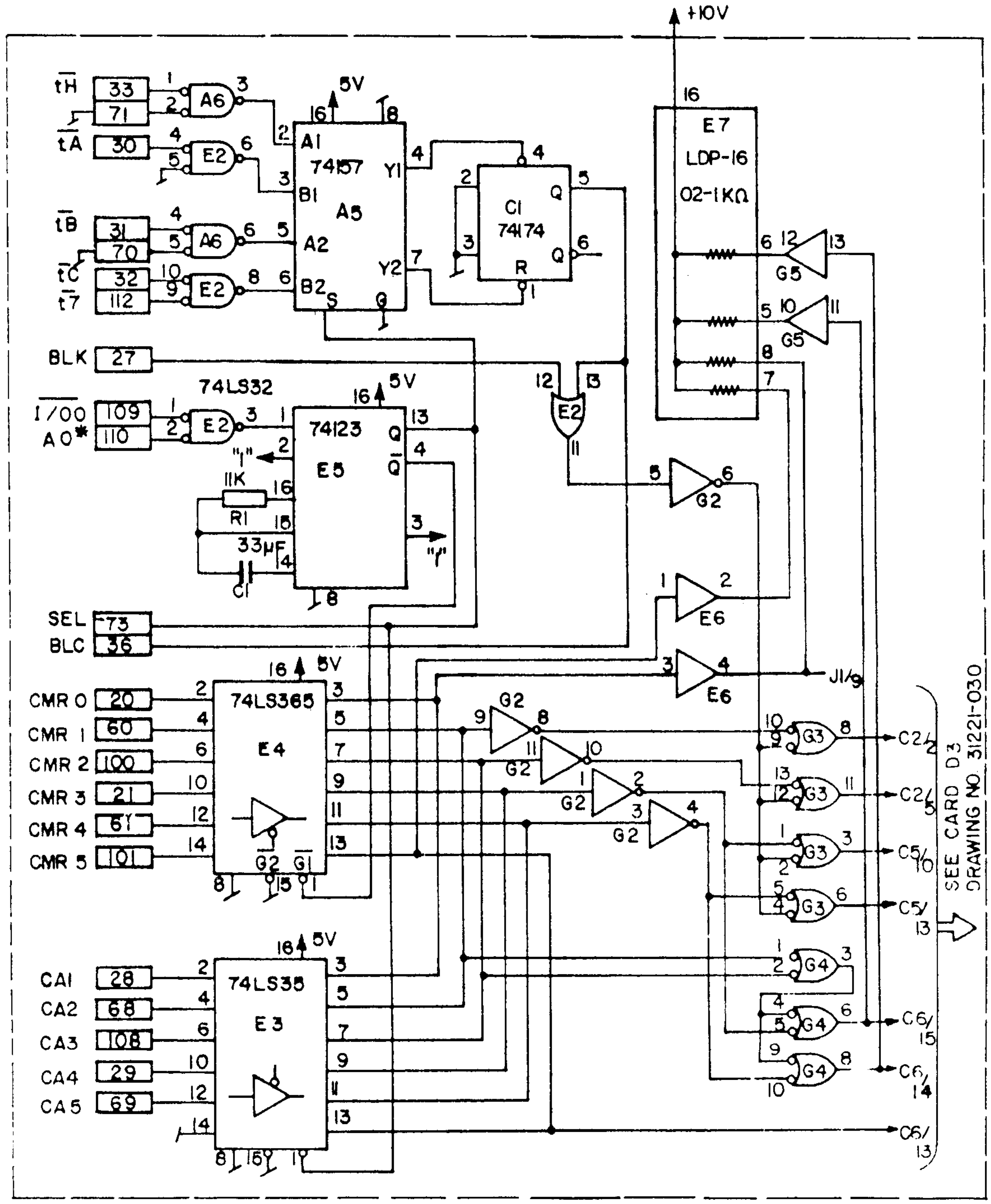
Figure 60D:
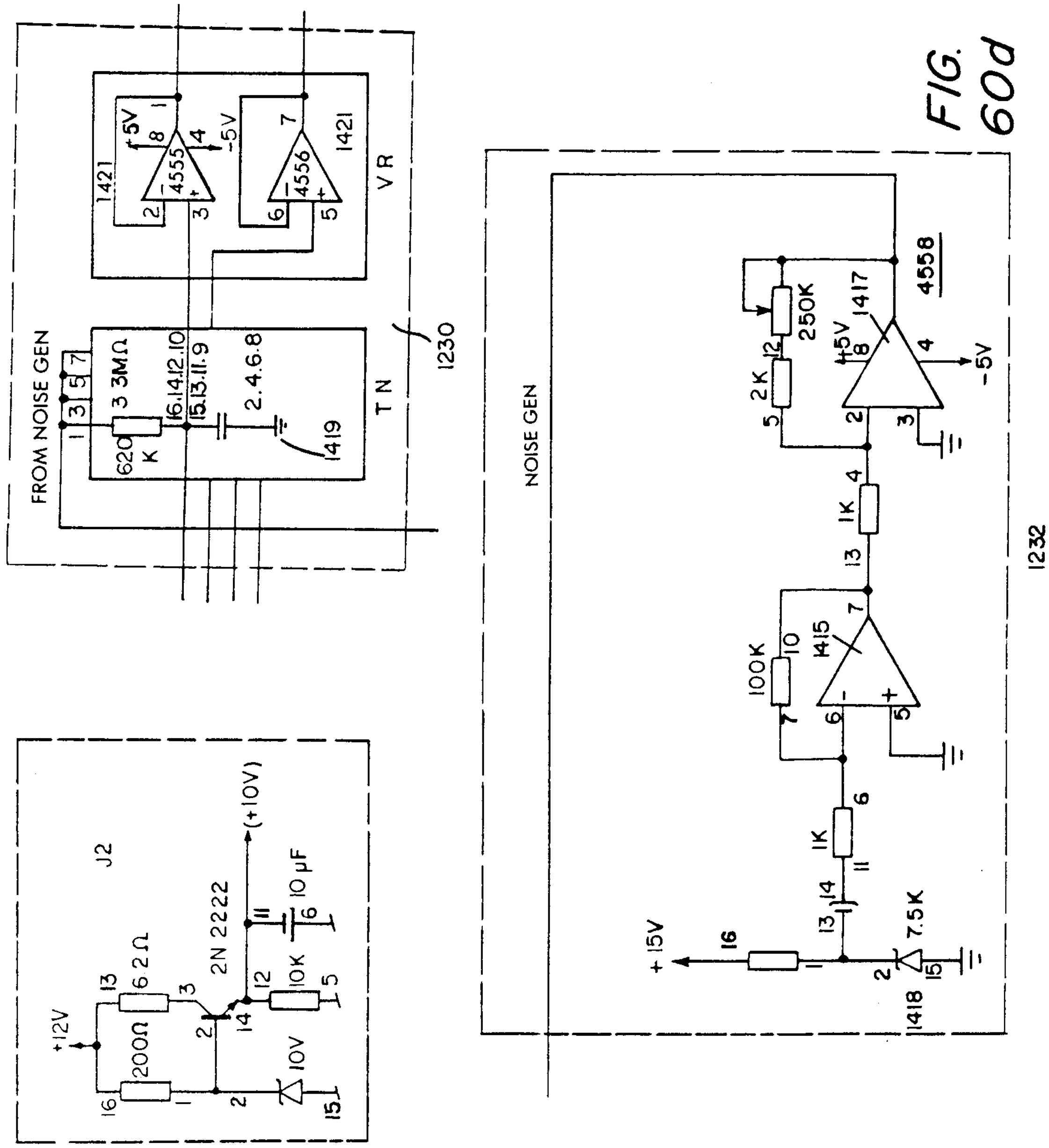
Figure 61A:
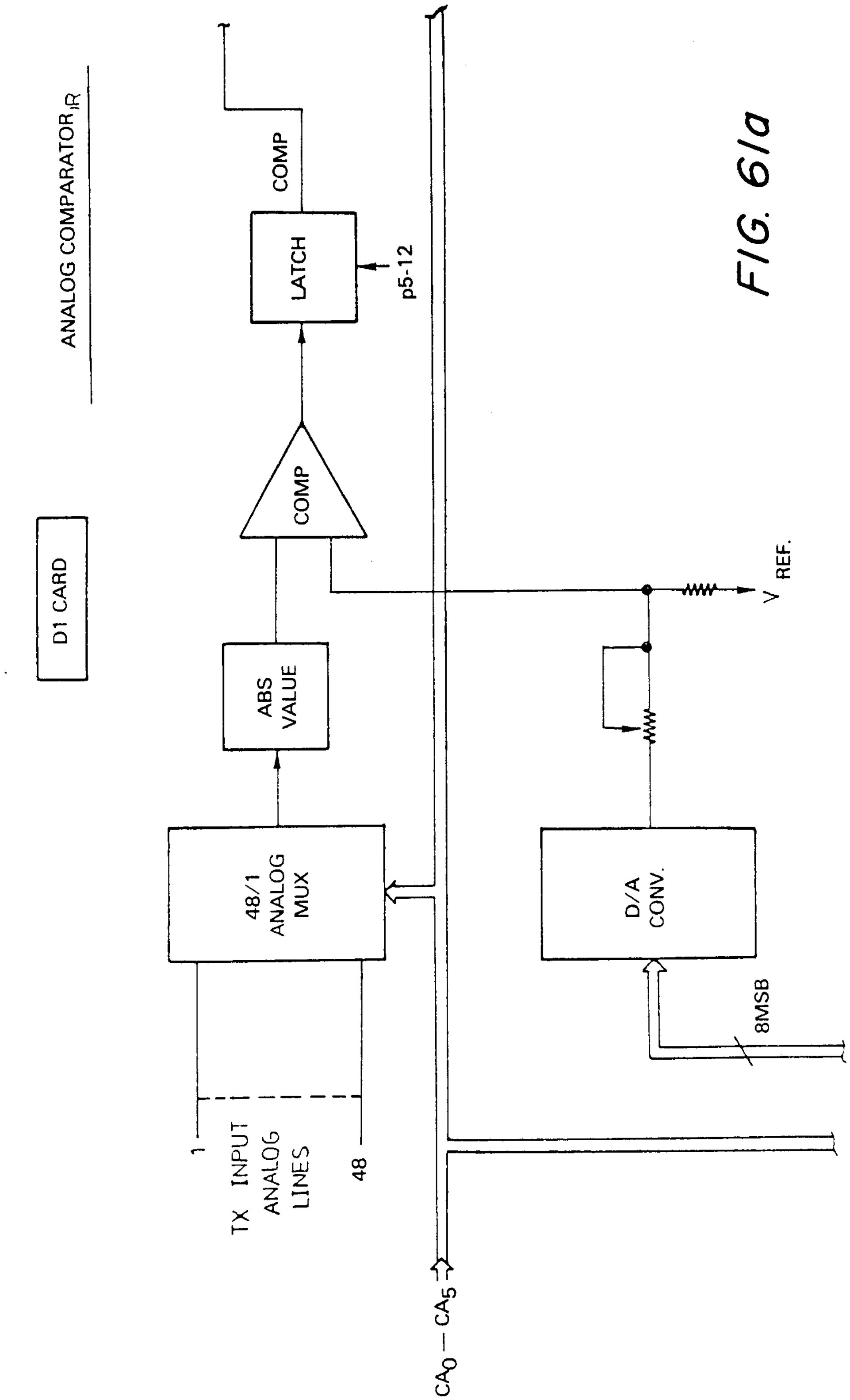
FIG. 61(*a* to *d*) is a block diagram of SPD and Echo Suppression circuitry.
Figure 61B:
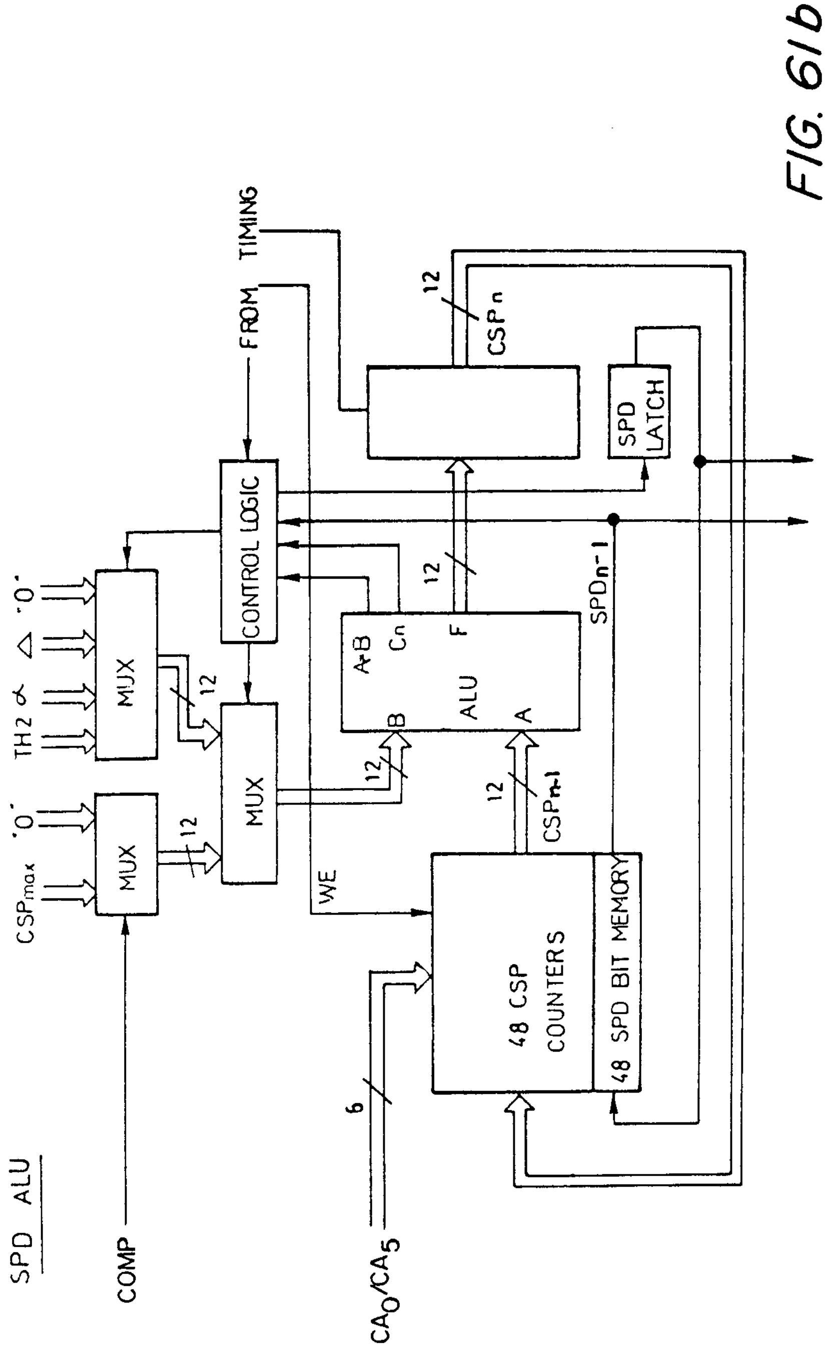
Figure 61C:
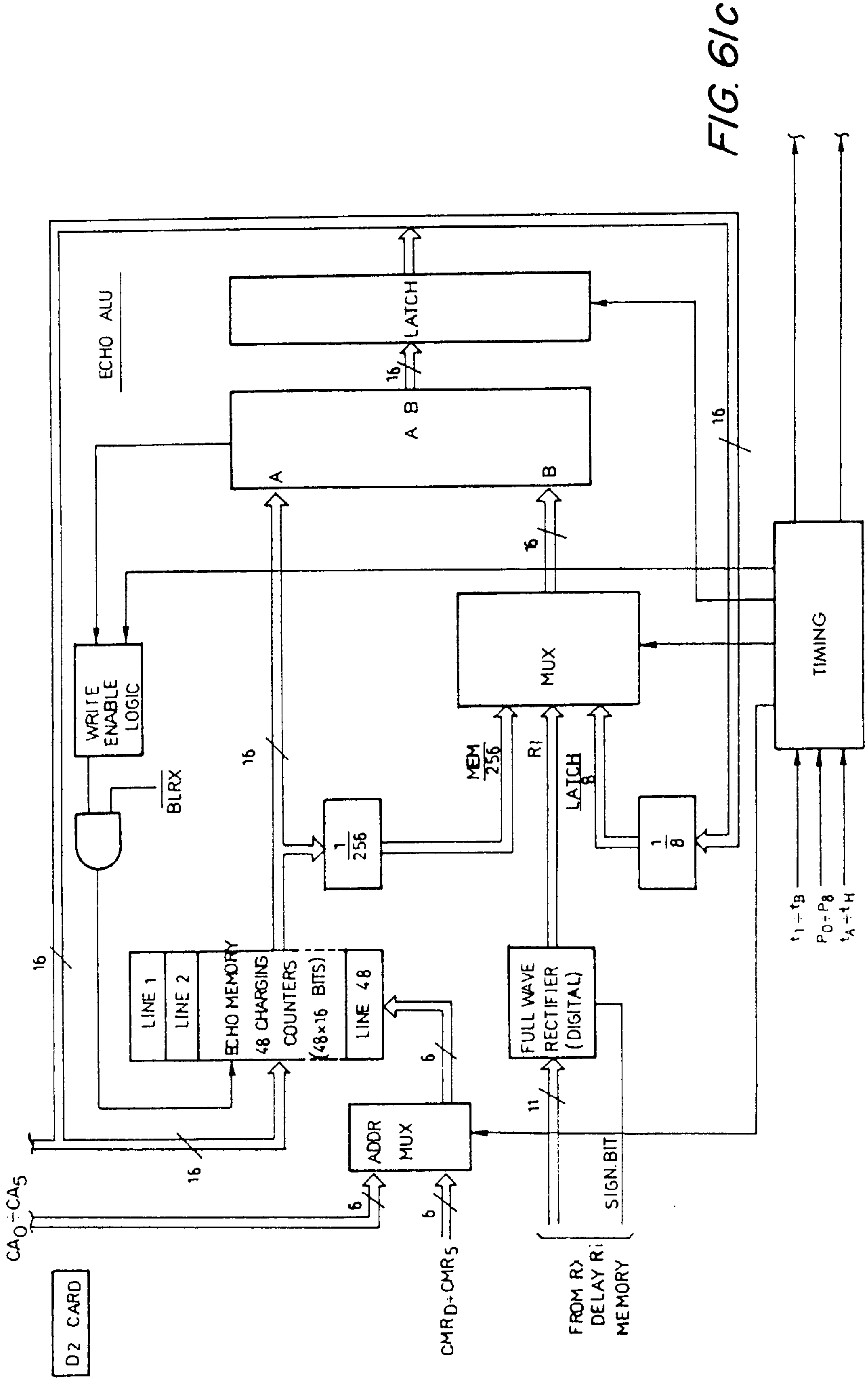
Figure 61D:
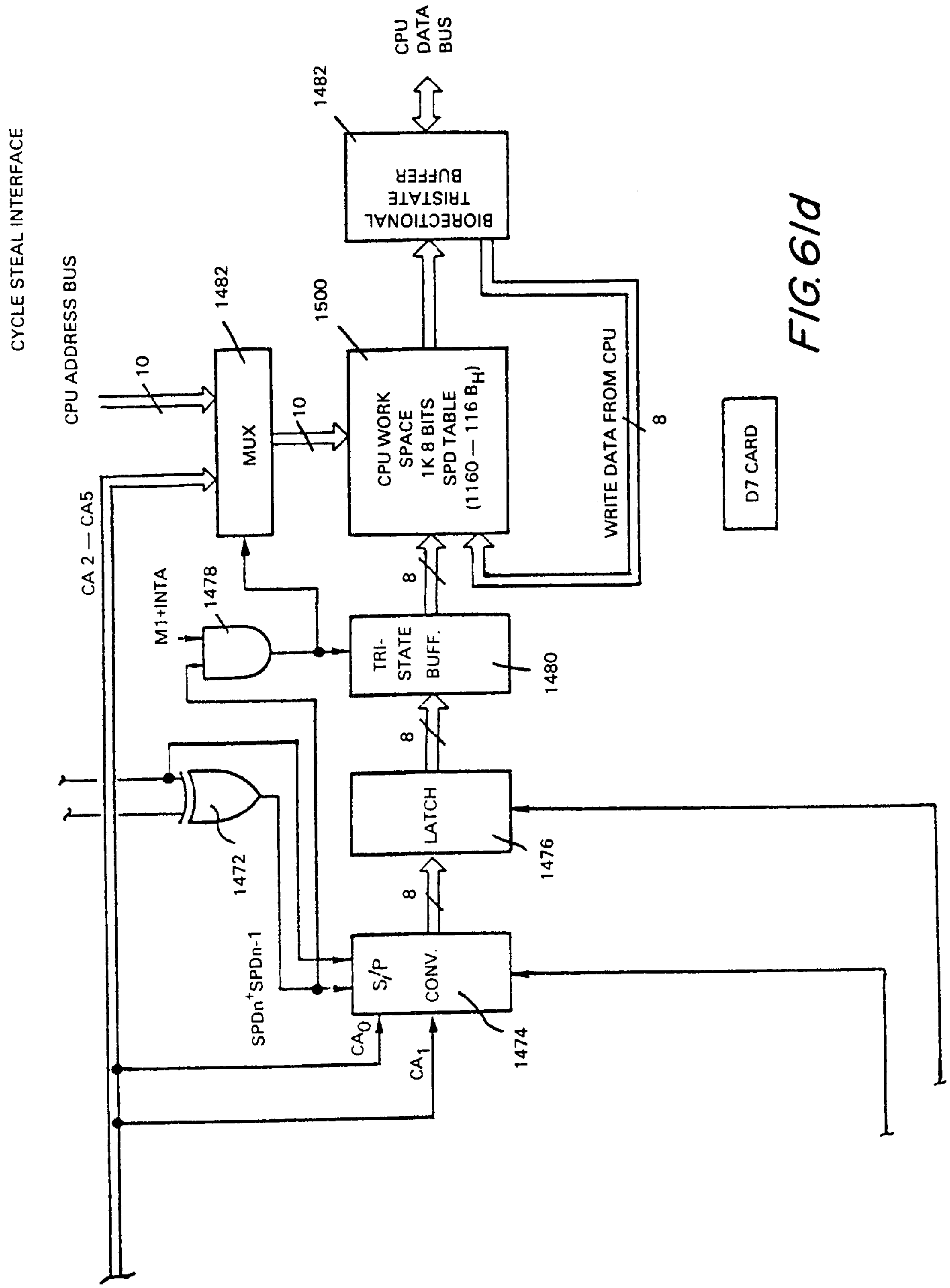

Receive multiplexer circuitry 1208 is illustrated in FIG. 60. Referring now to FIG. 59, there are illustrated three 8 to 1 multiplexers 1210 having a total of 24 inputs, each of which receives a corresponding output of one of the 24 receiver input circuits 1206 via a capacitive filter comprising a grounded 27 nF capacitor 1403.

Multiplexers 1210 provide outputs to multiplexer 1212. The A, B and C inputs of multiplexers 1210 and the A and B inputs of multiplexer 1212 are received via an open collector buffer 1405 from counter 1166 (FIG. 2). A resistor bank 1407 coupled to the output of buffer 1405 provides a 10 Volt DC level to the logic 1 signals.

The output of multiplexer 1212 is supplied to an operational amplifier 1409, functioning as an non-inverting amplifier. The output of operational amplifier 1409 is supplied to A/D converter 1214. The digital outputs of A/D converter are supplied to latches 1411 and 1413 which store the digital outputs and make them available to delay memory 1216. Reference is now made to receiver output multiplexer circuitry 1222, illustrated in FIG. 60. A twelve bit output from delay memory 1216 is received by D/A converter 1224, typically a DAC 80-12, which provides an analog output to 1-8 multiplexer 1226, typically a 4051 chip. The eight outputs of multiplexer 1226 are supplied to 1 to 6 multiplexers 1228, typically 4051 chips. The A, B and C inputs of respective multiplexers 1226 and 1228 are supplied from memory circuit 1234 which will not now be described in detail. Reference is made, however, to the detailed schematic diagram of this circuitry in FIG. 60.

The outputs of multiplexers 1228, 48 in number, are each supplied to a hold circuit 1230 together with the output of noise generator 1232 which comprises first and second 4558 operational amplifiers 1415 and 1417 which amplify the noise inherent in the operation of a Zener diode 1418. Hold circuit 1230 comprises a grounded 470 pF capacitor 1419 and a 4558 operational amplifier 1421. The output of each of the 48 hold circuits is supplied to a receiver output circuit 1240 which has already been described in detail by reference to FIG. 56.

Reference is now made to FIG. 61 which is a block diagram of Decision circuitry 1136. The outputs of low pass filters 1134 in each of the 48 input circuits 1130 are supplied to respective inputs of a 48-1 analog multiplexer 1410. The output of multiplexer 1410 is supplied, via a rectifier 1412 to the input of comparator 1184. It is noted, for the purposes of clarity, that multiplexer 1410 comprises multiplexers 1180 and 1182 illustrated in FIG. 54.

Comparator 1184 receives a fixed minimum reference voltage from a voltage source 1414 and an additional reference voltage from echo suppression circuitry 1186 (FIG. 54) via a D/A convertor 1416. The output of comparator 1184 is supplied via a latch 1418 to SPD circuitry 1188.

Figure 62A:
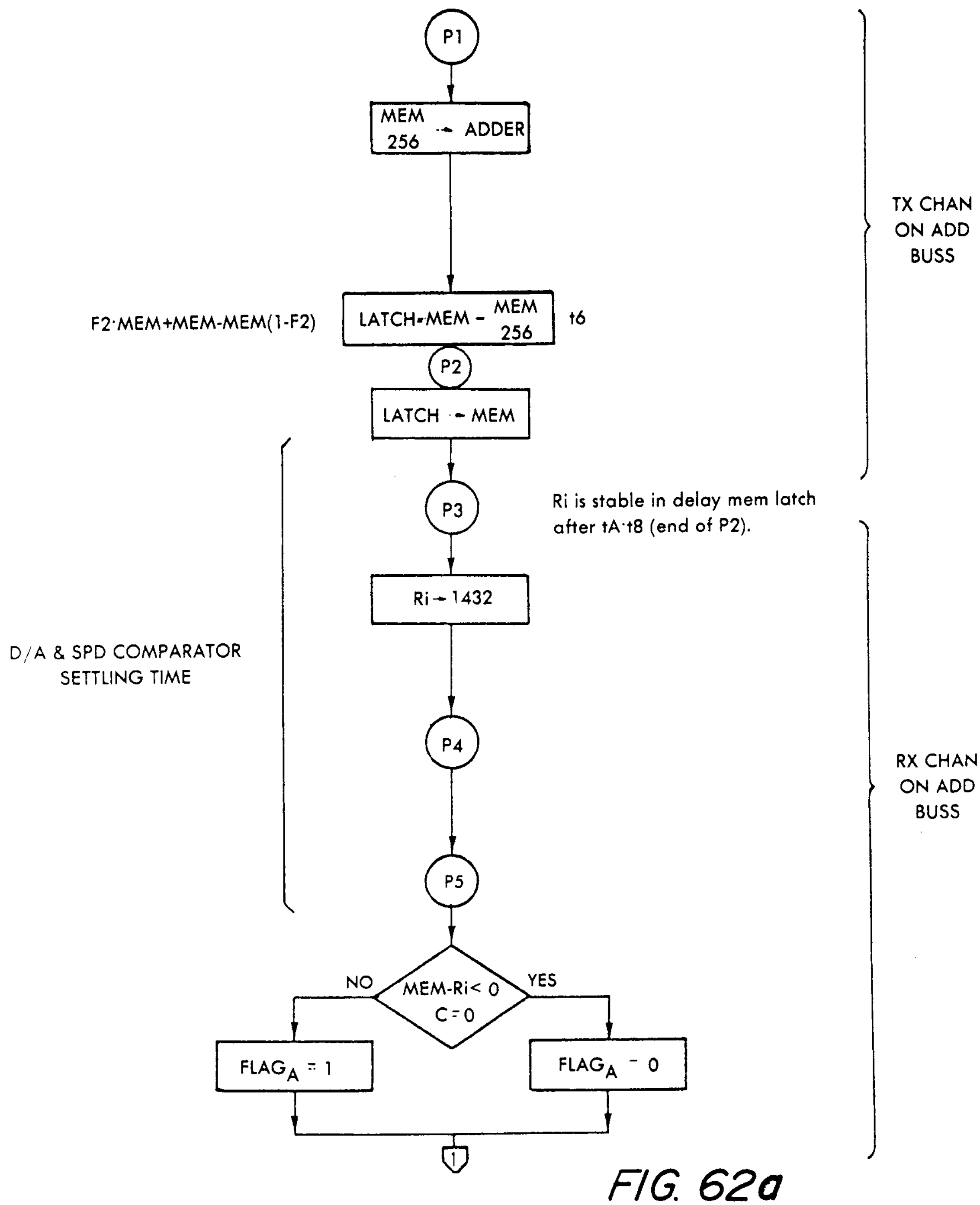
FIG. 62(*a* & *b*) is a flowchart illustrating the operation of the Echo Suppresion circuitry.
Figure 62B:
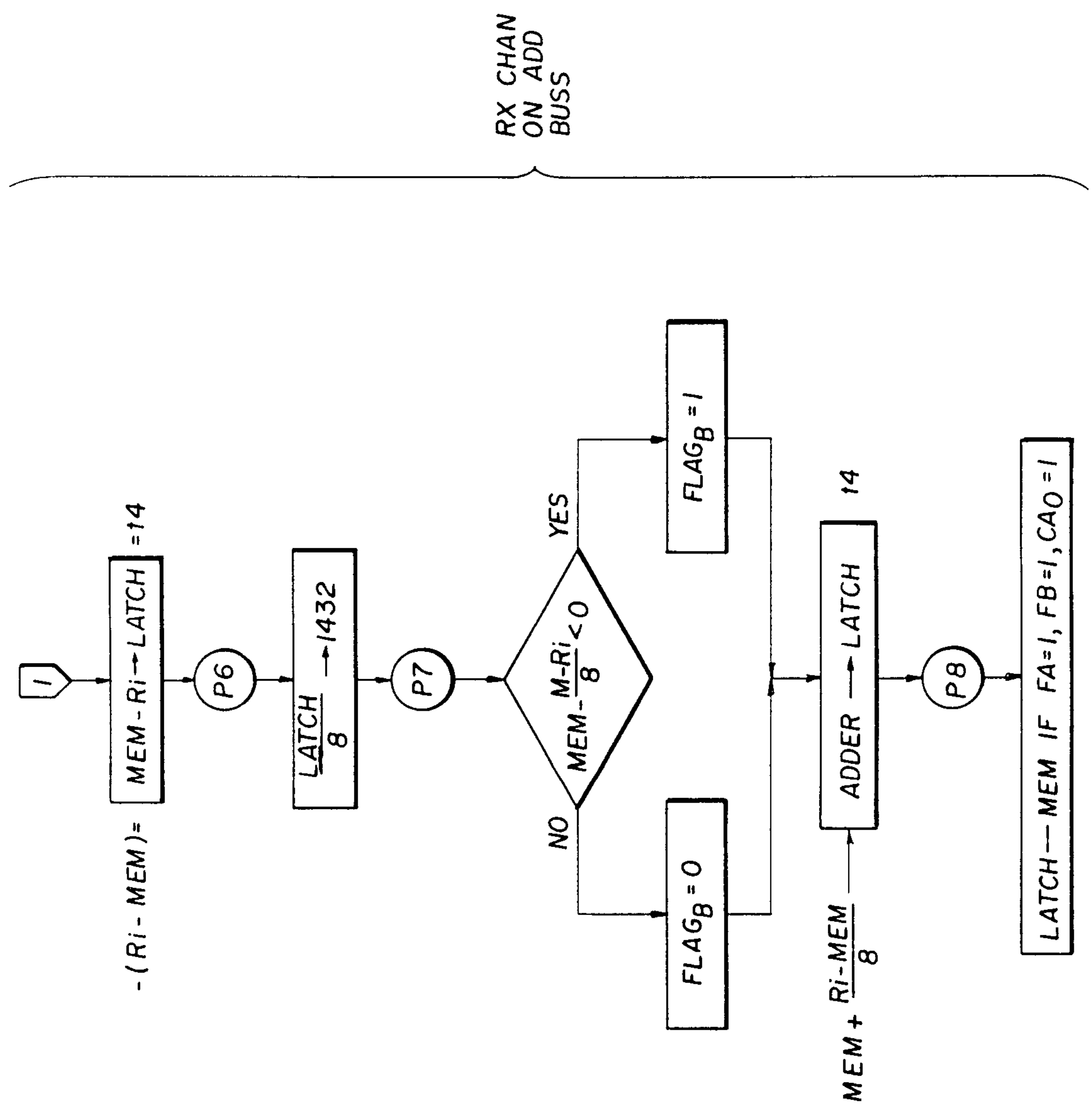
Figure 63A:
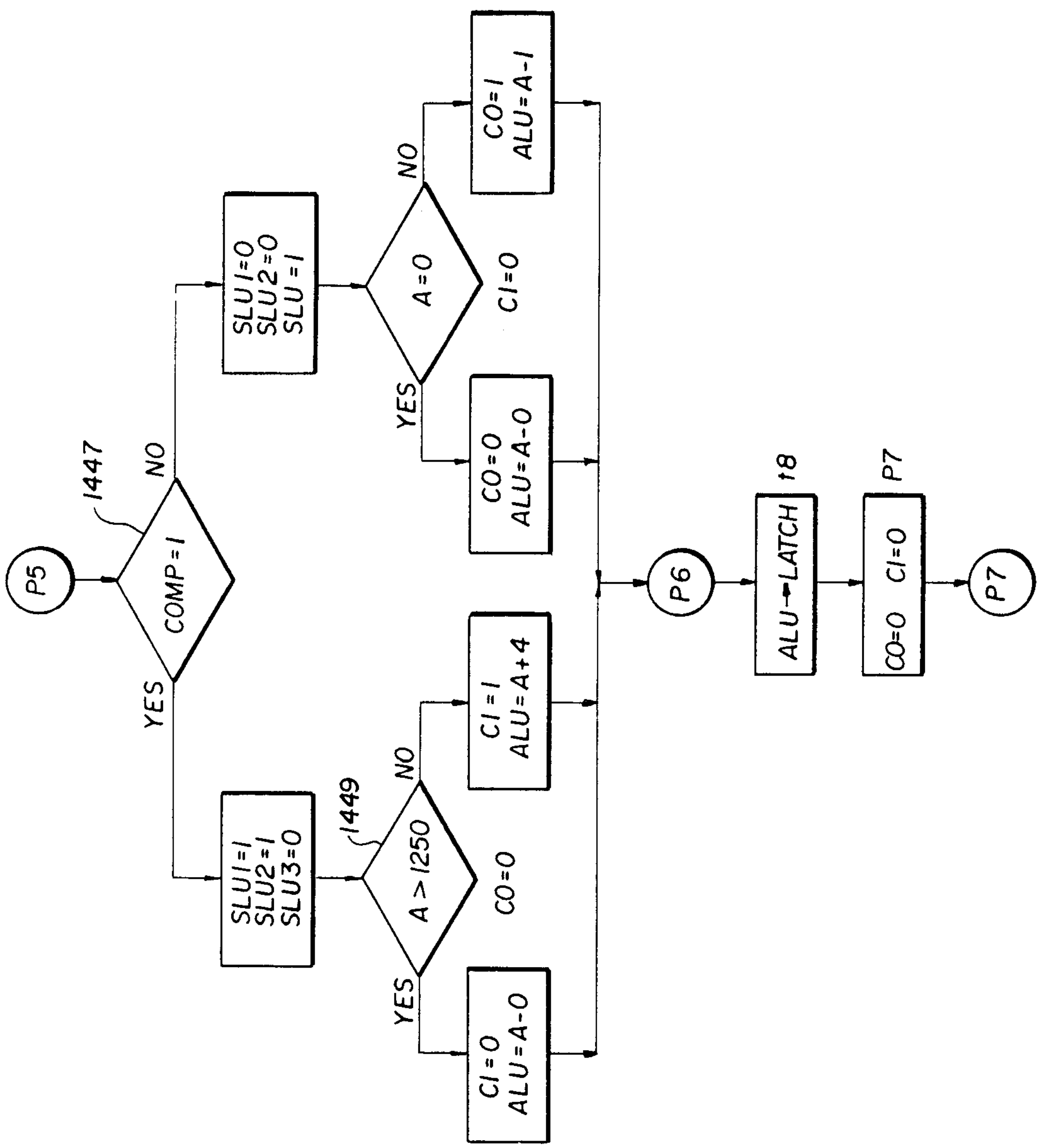
FIG. 63(*a* & *b*) is a flowchart illustrating the operation of the SPD circuitry.
Figure 63B:
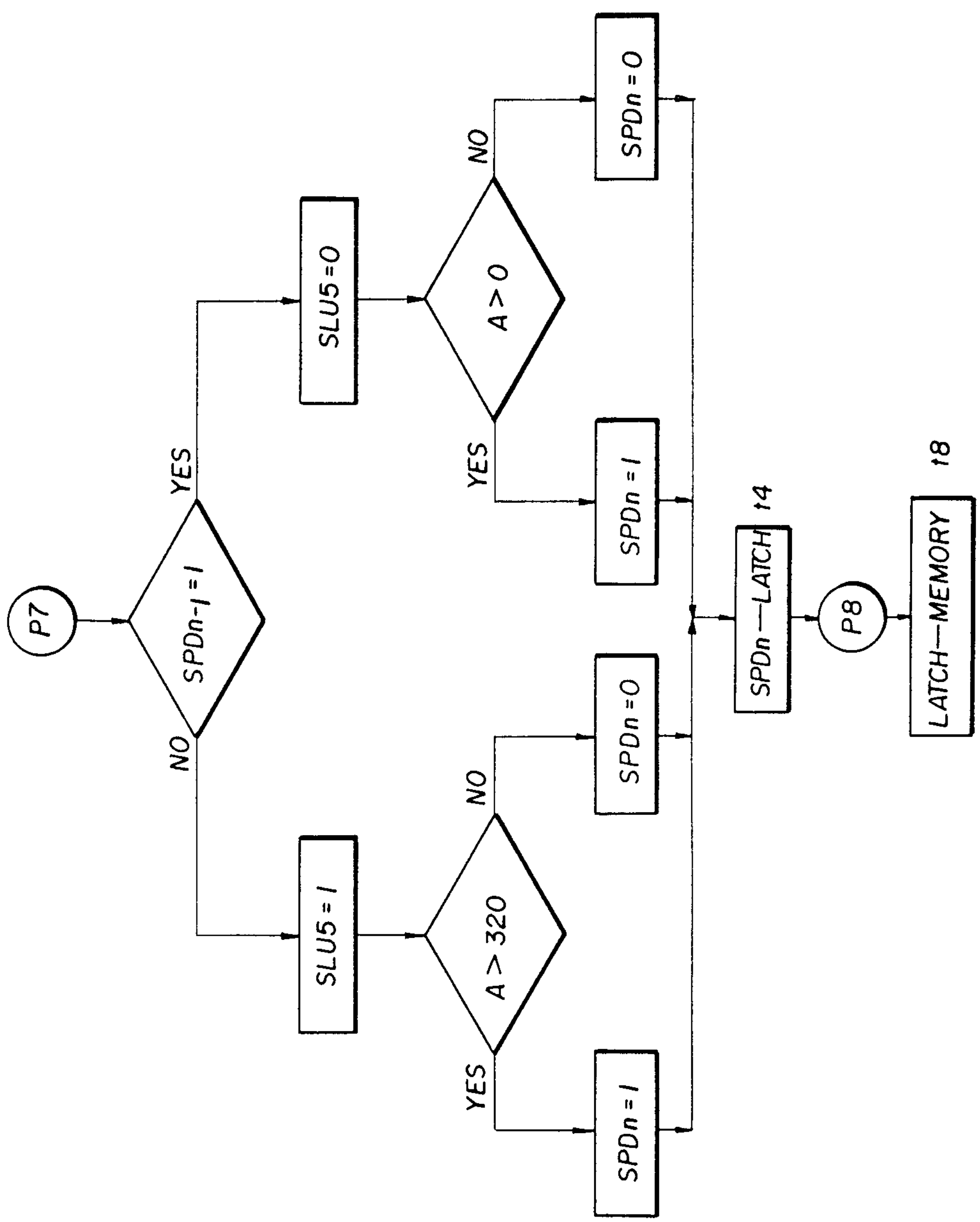
Figure 64A:
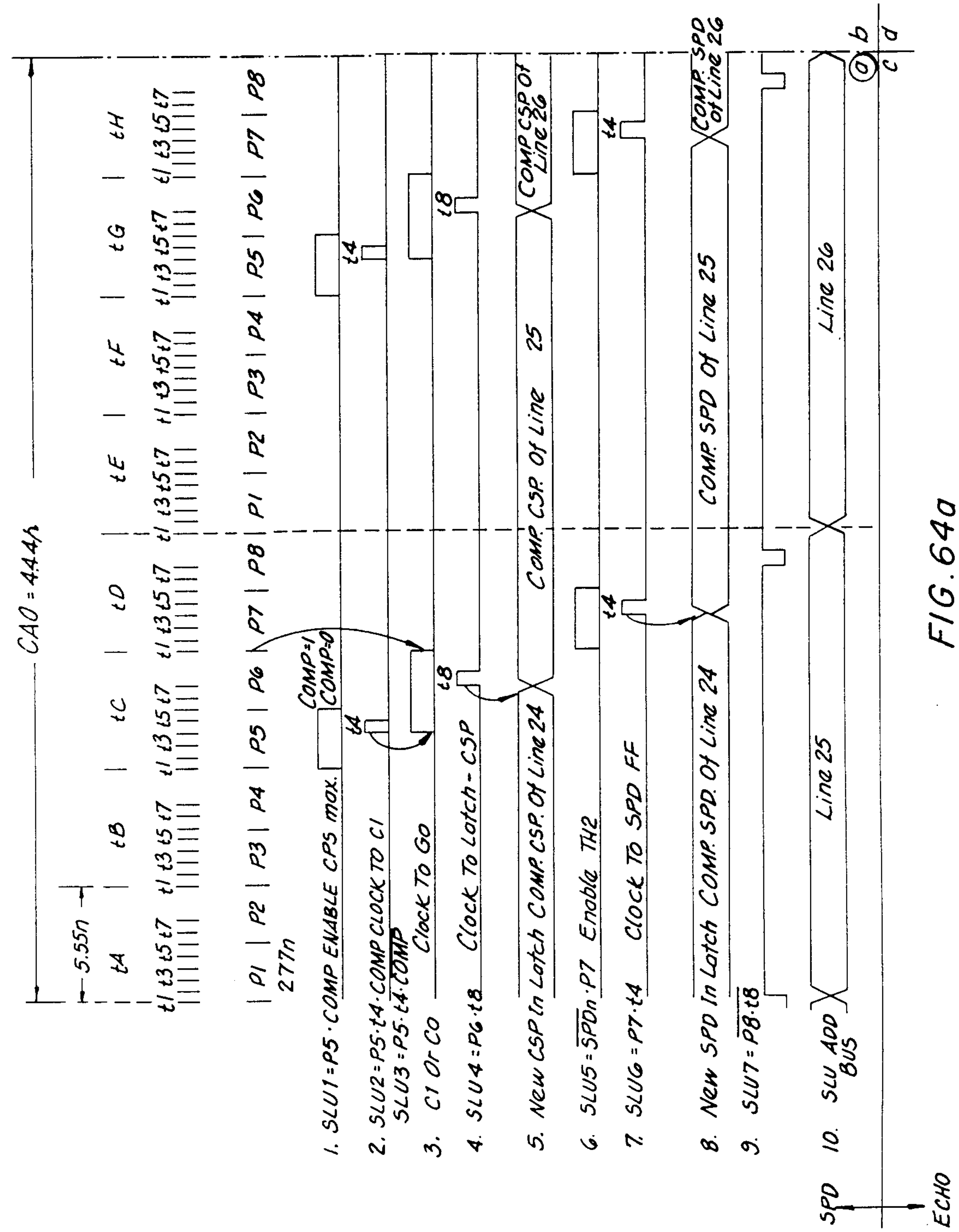
FIG. 64(*a* to *d*) is a timing diagram illustrating operation of the SPD and Echo Suppression circuitry.
Figure 64B:
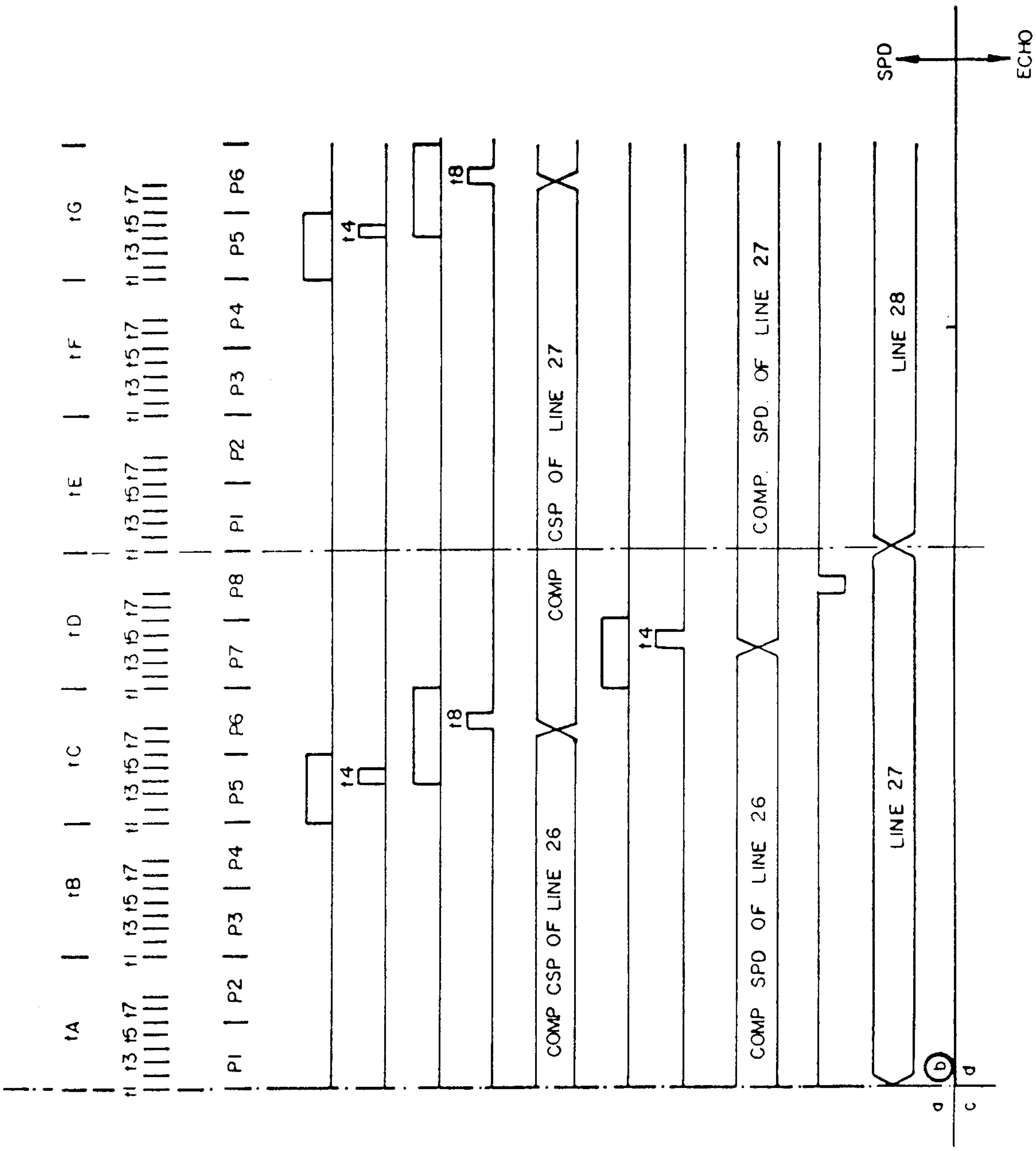
Figure 64C:
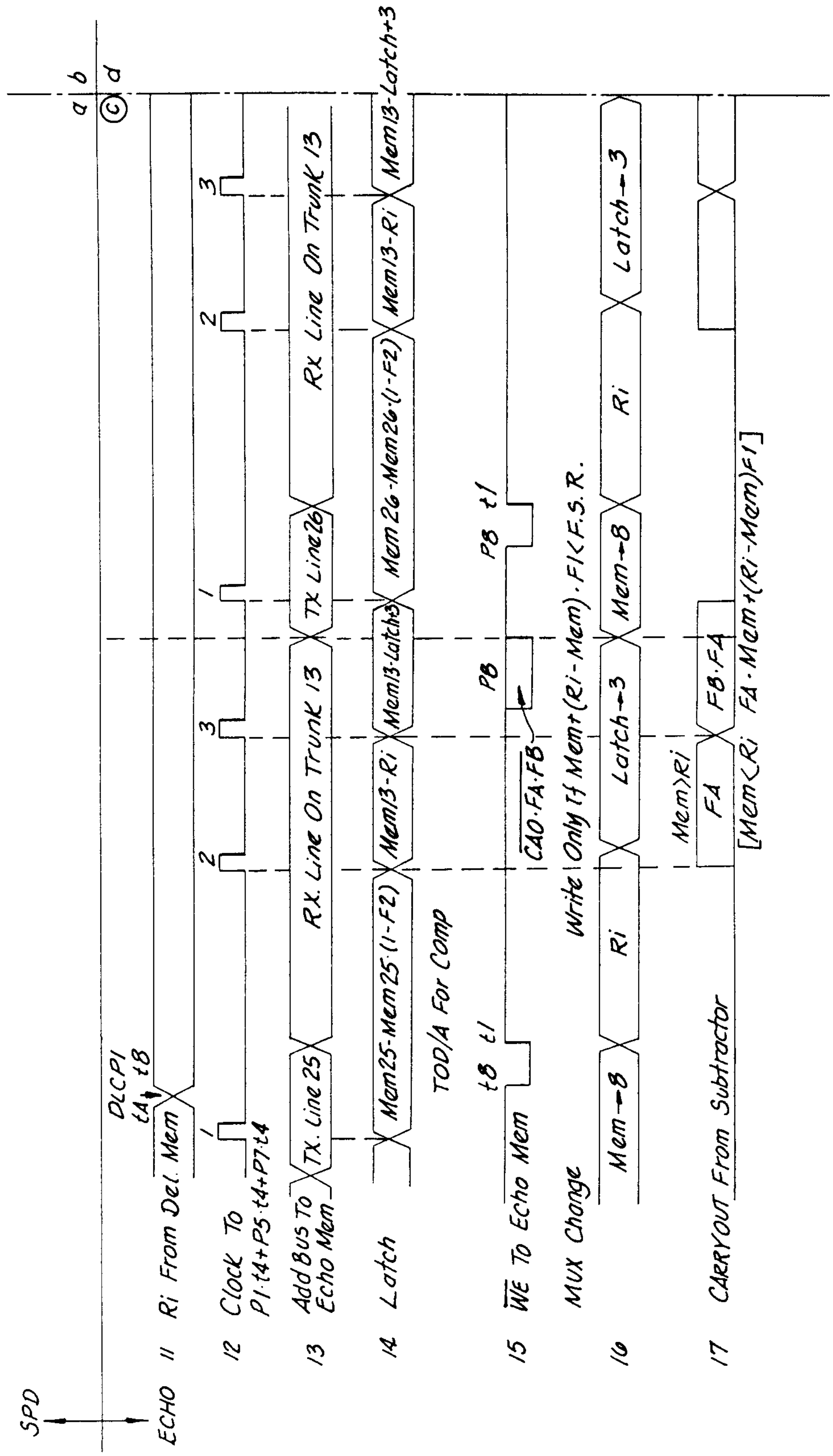
Figure 64D:
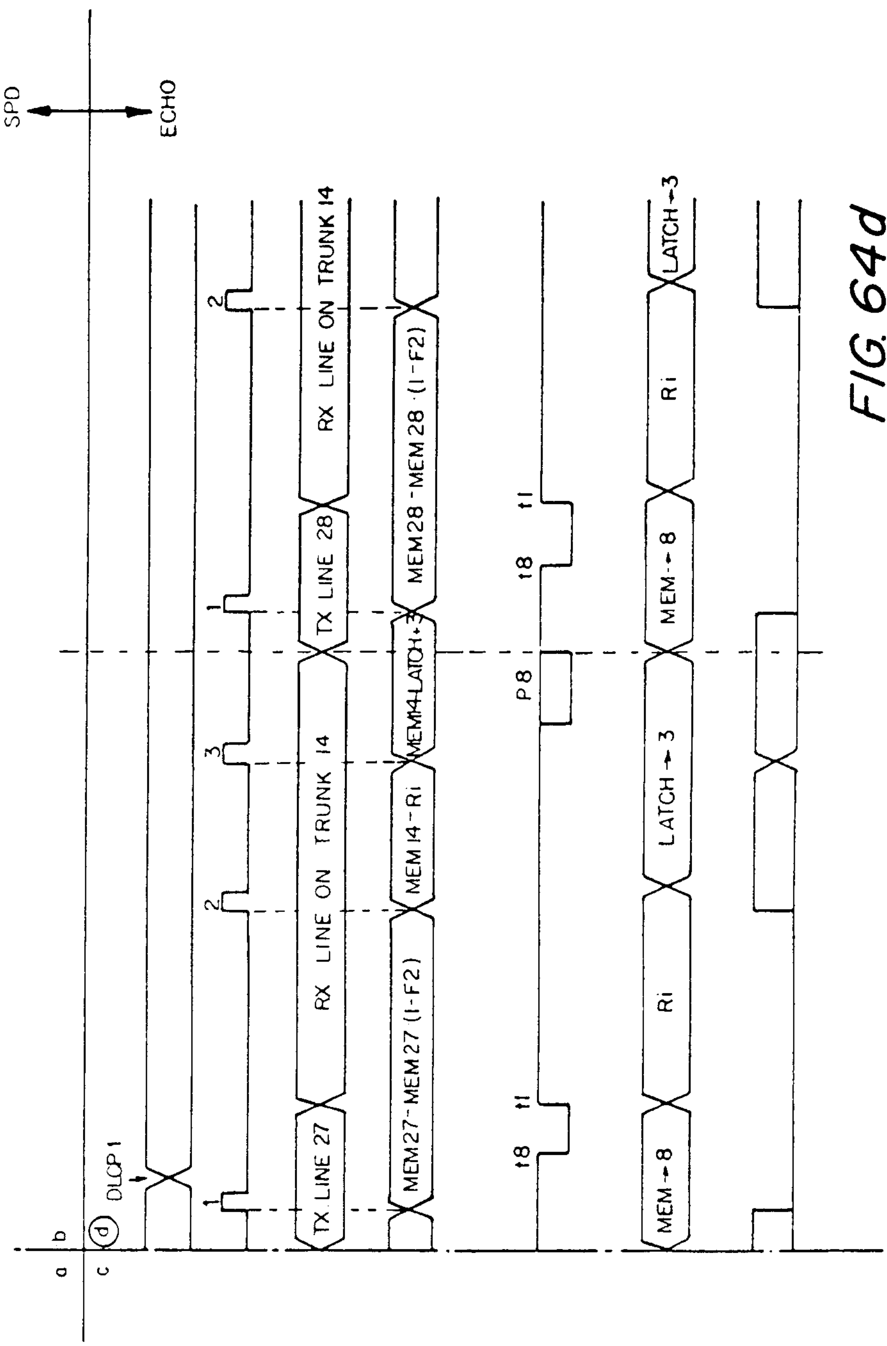
Figure 65A:
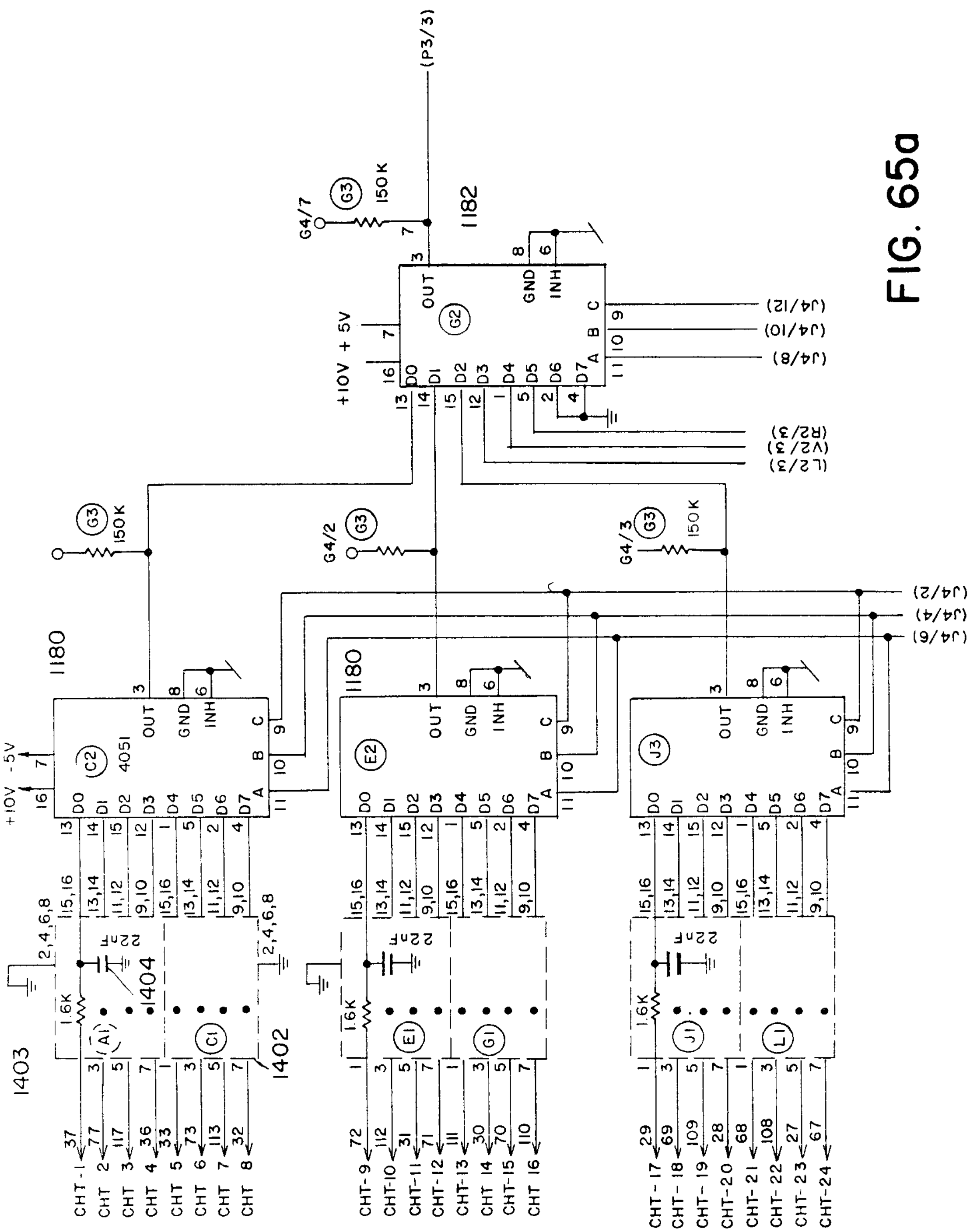
FIG. 65(*a* to *e*) is a schematic illustration of a portion of the SPD circuitry.
Figure 65B:
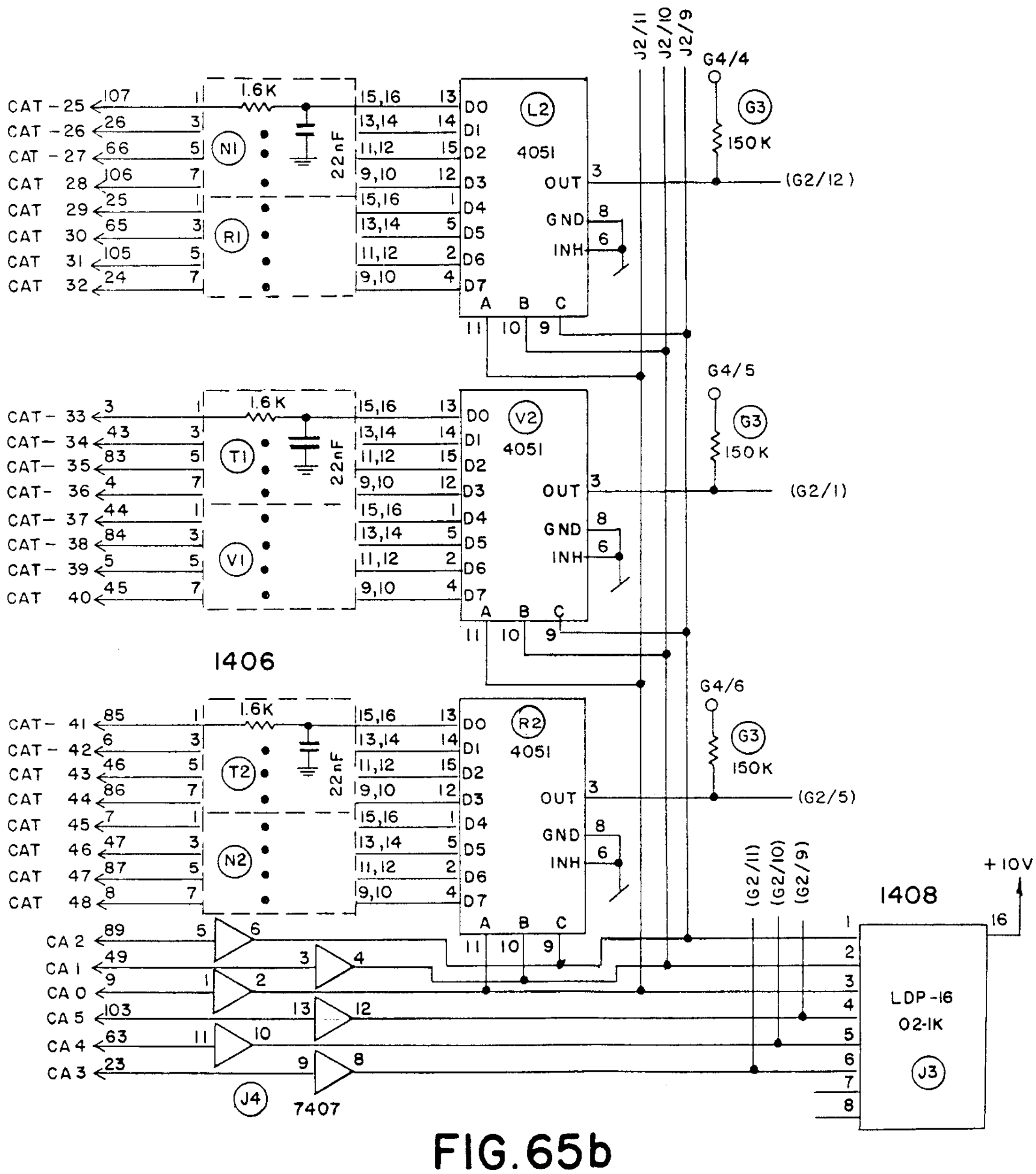
Figure 65C:
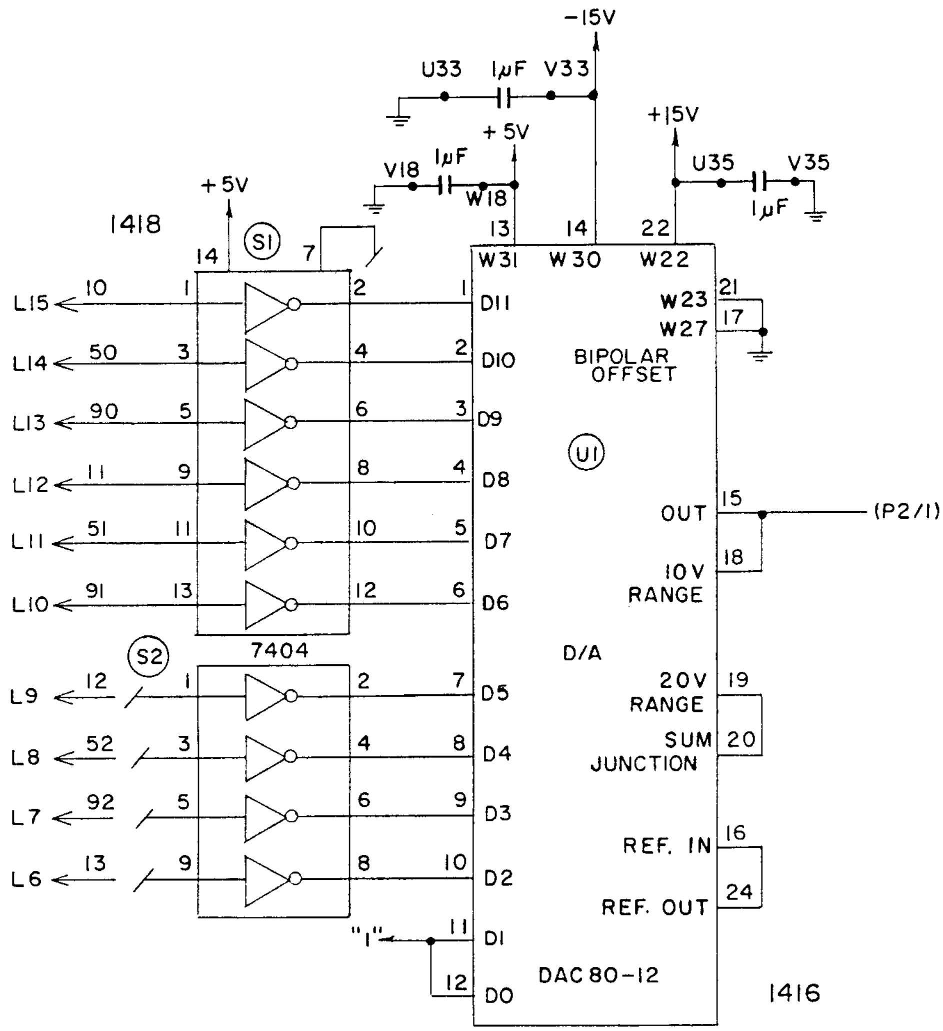
Figure 65D:
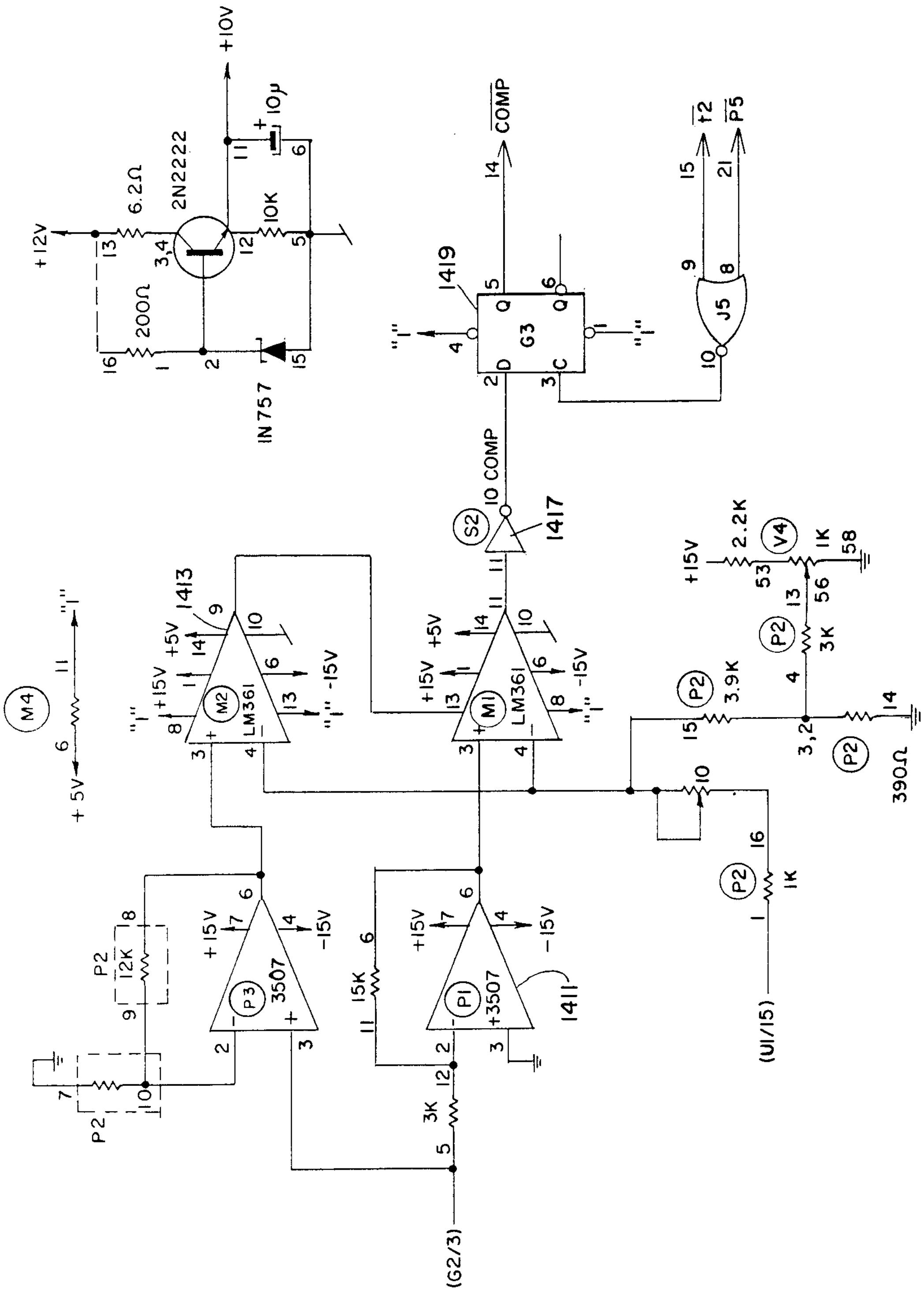
Figure 65E:
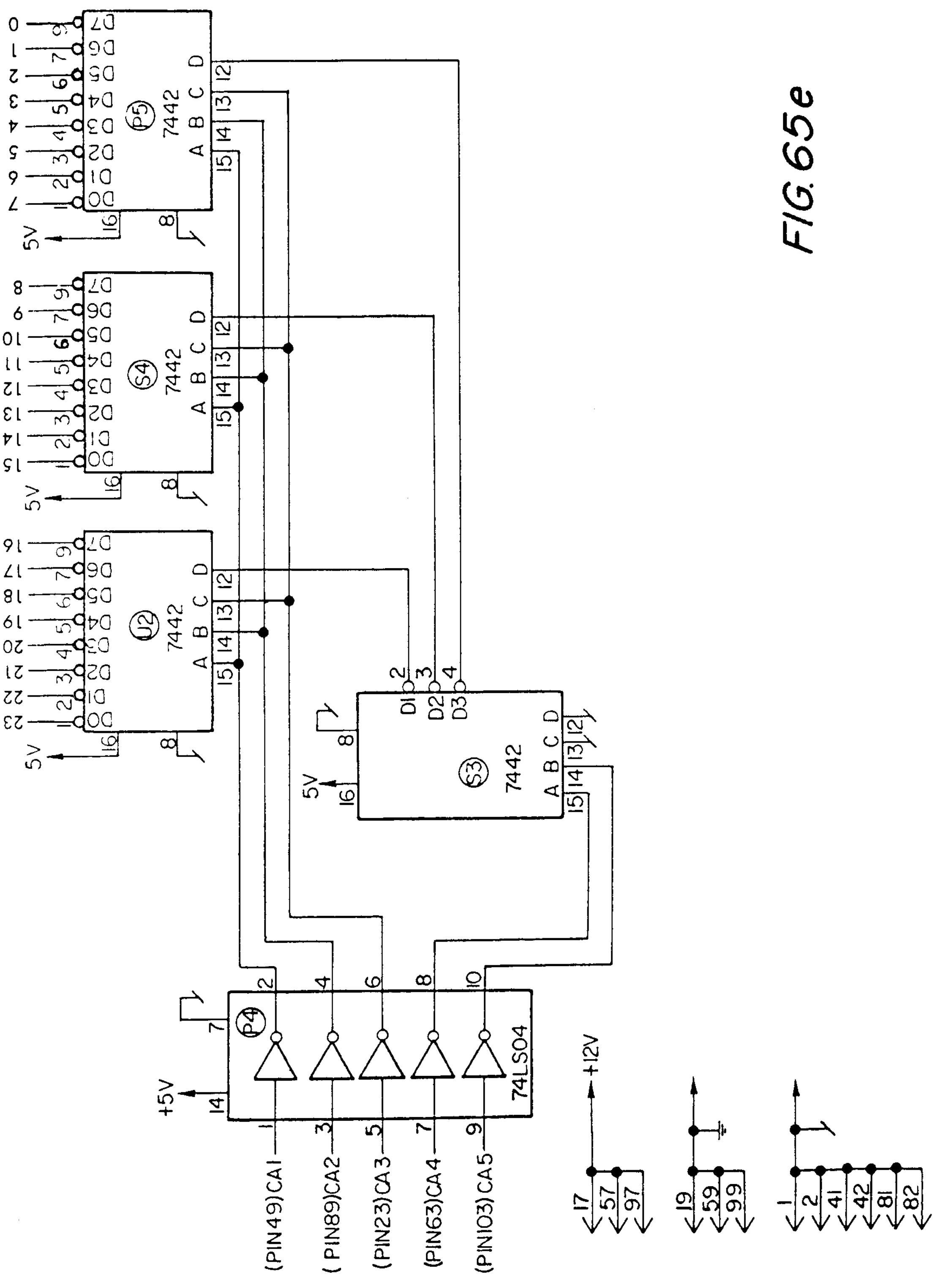
Figure 66A:
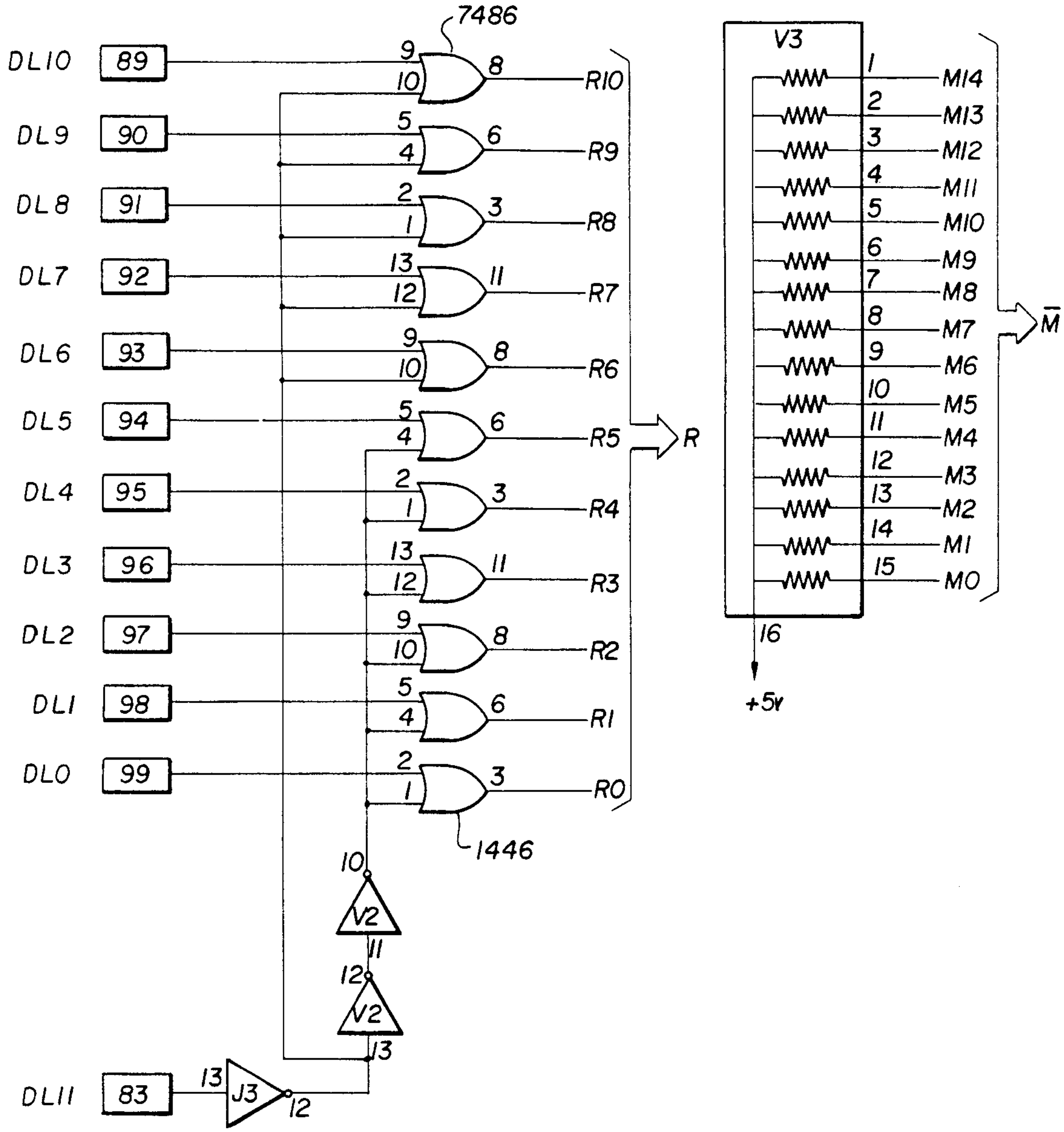
FIG. 66(*a* to *d*) is a schematic illustration of the Echo ALU circuitry.
Figure 66B:
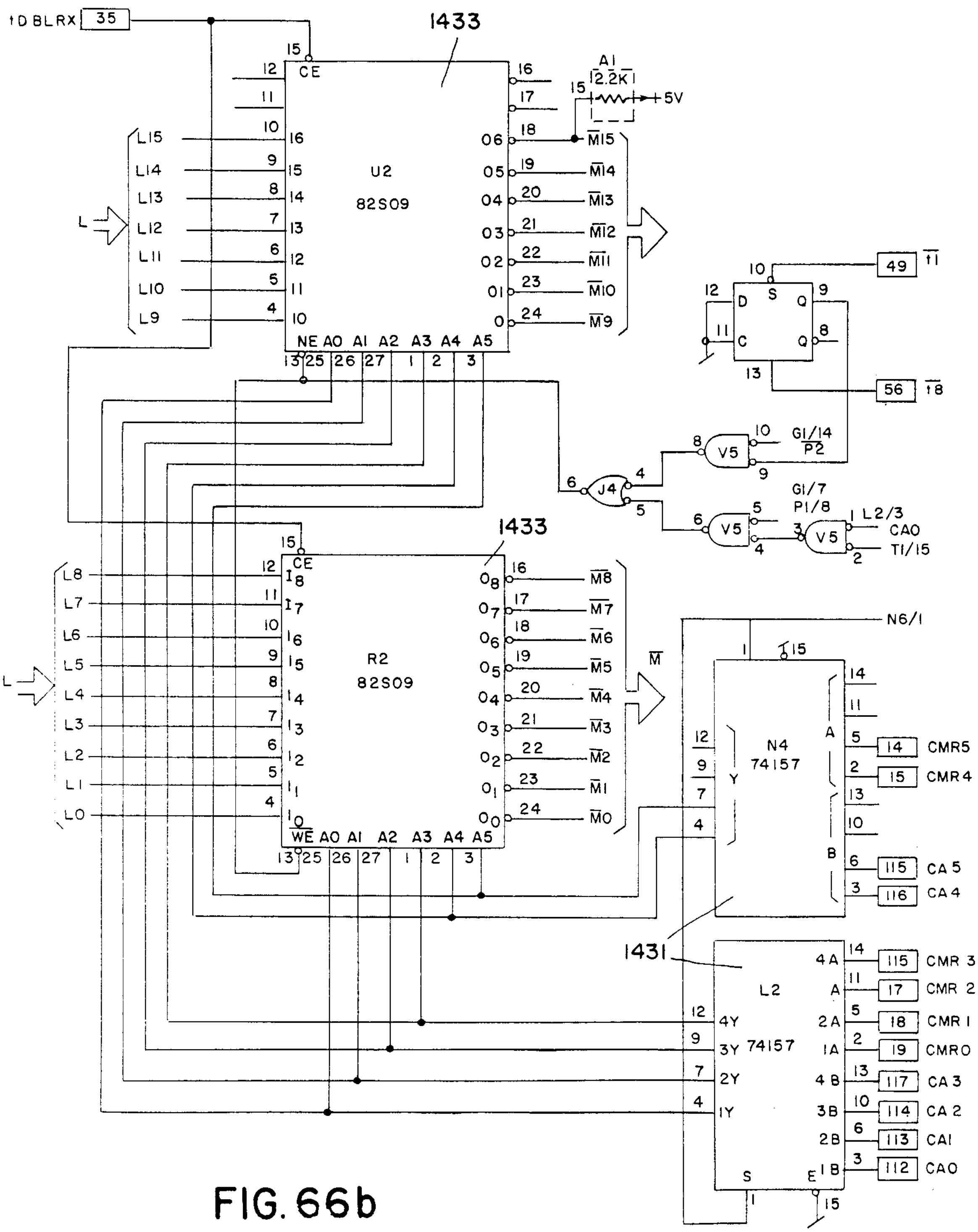
Figure 66C:
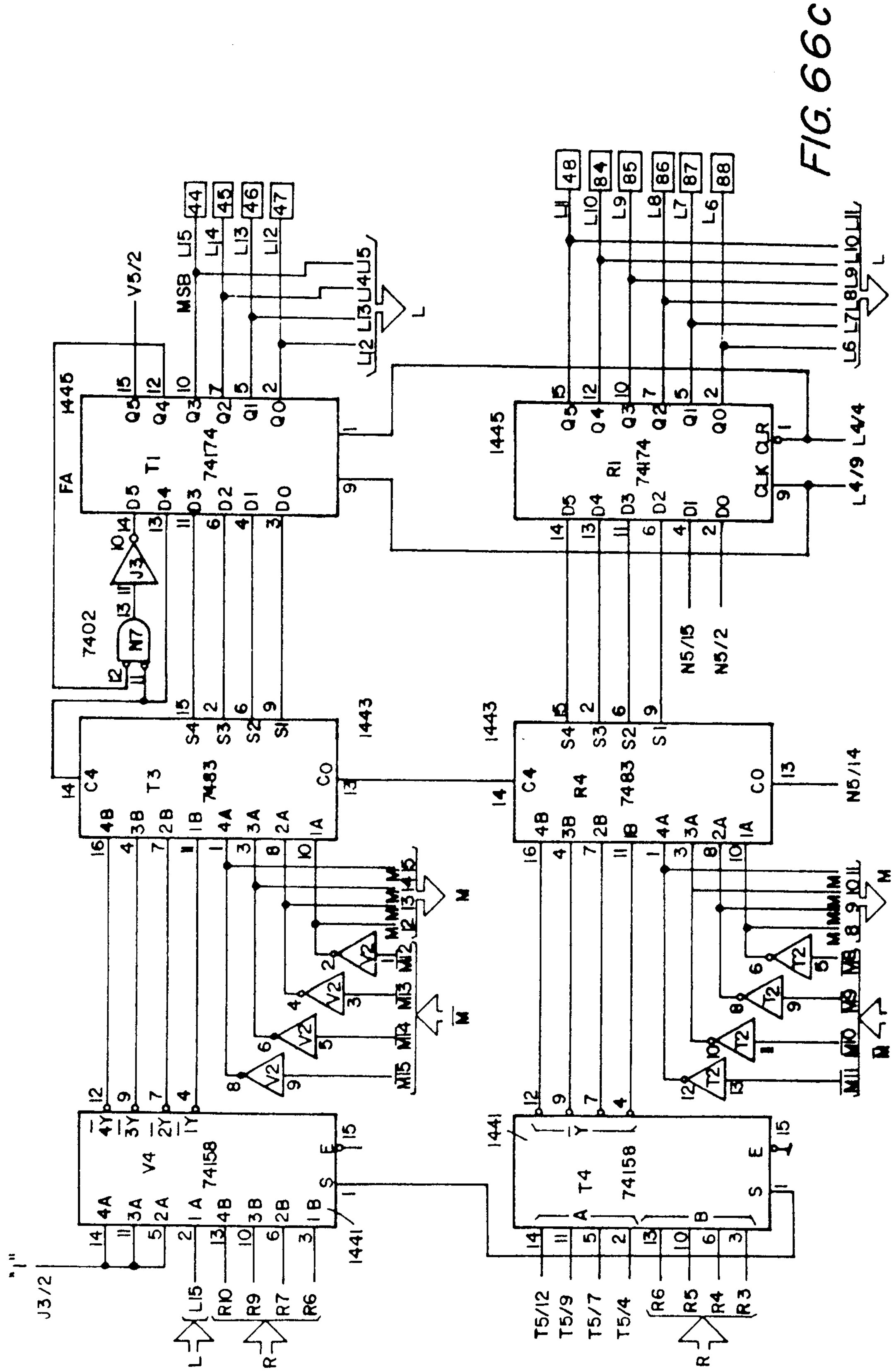
Figure 66D:
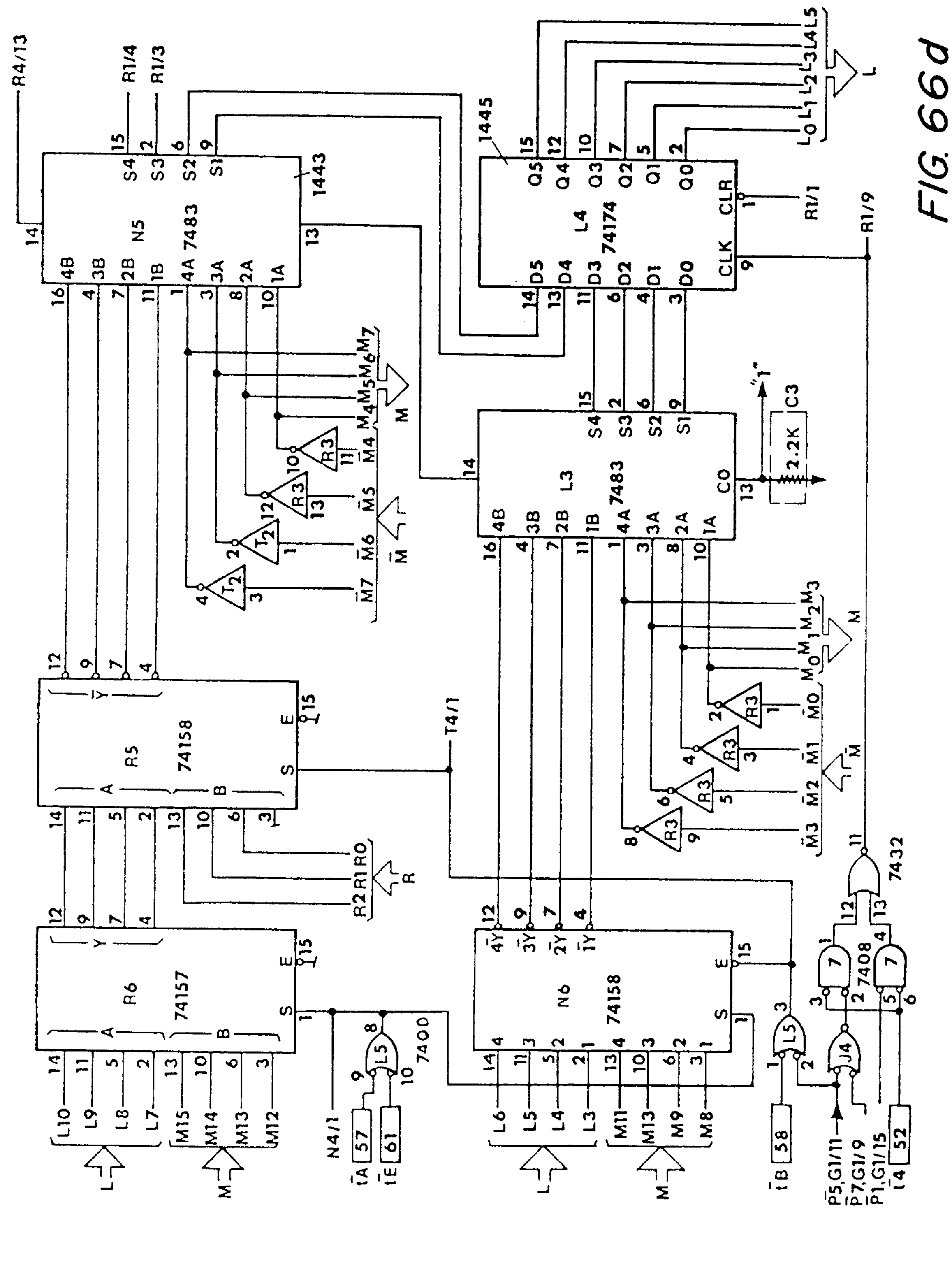
Figure 67A:
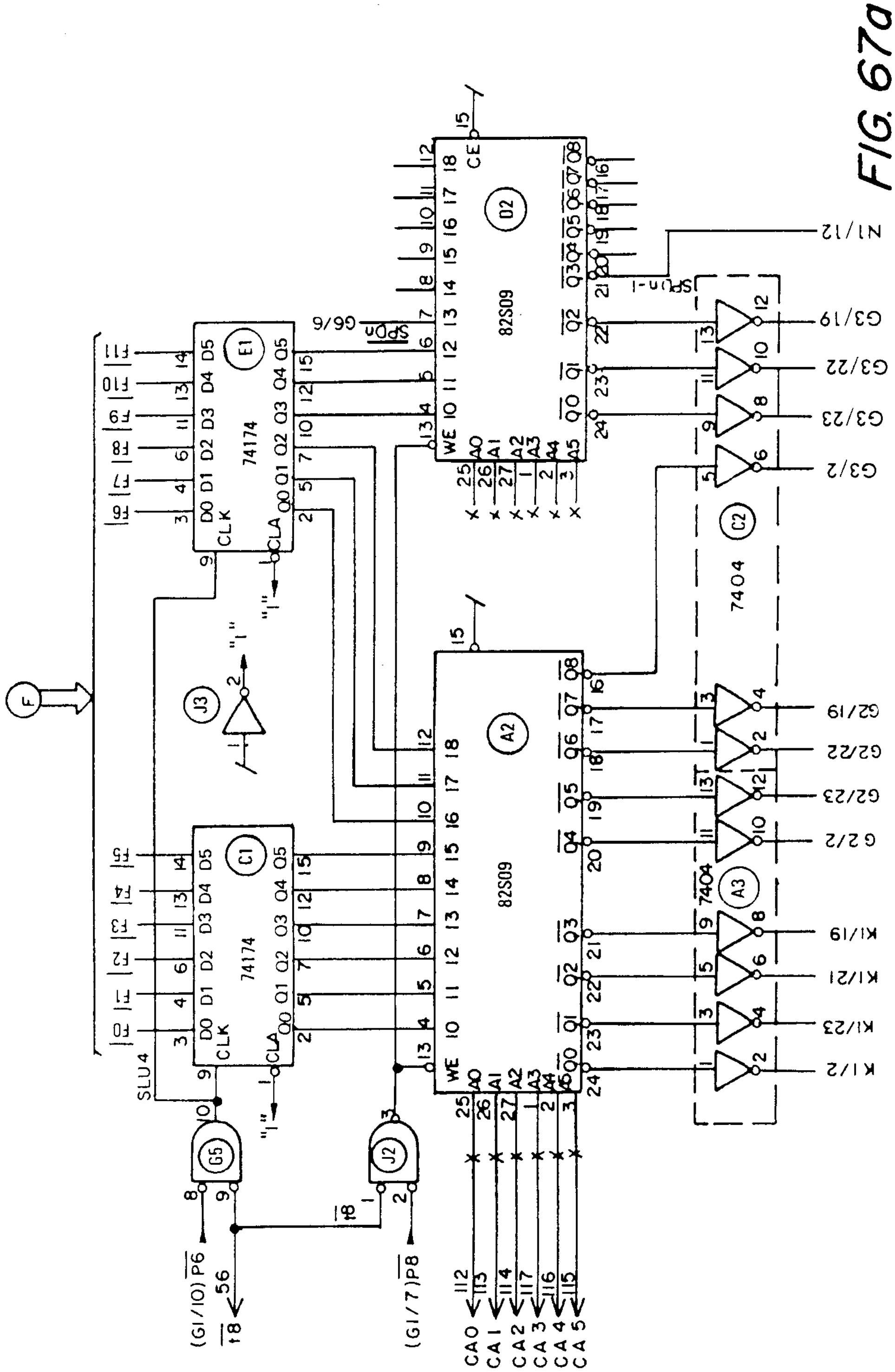
FIG. 67(*a* to *d*) is a schematic illustration of the SPU ALU circuitry.
Figure 67B:
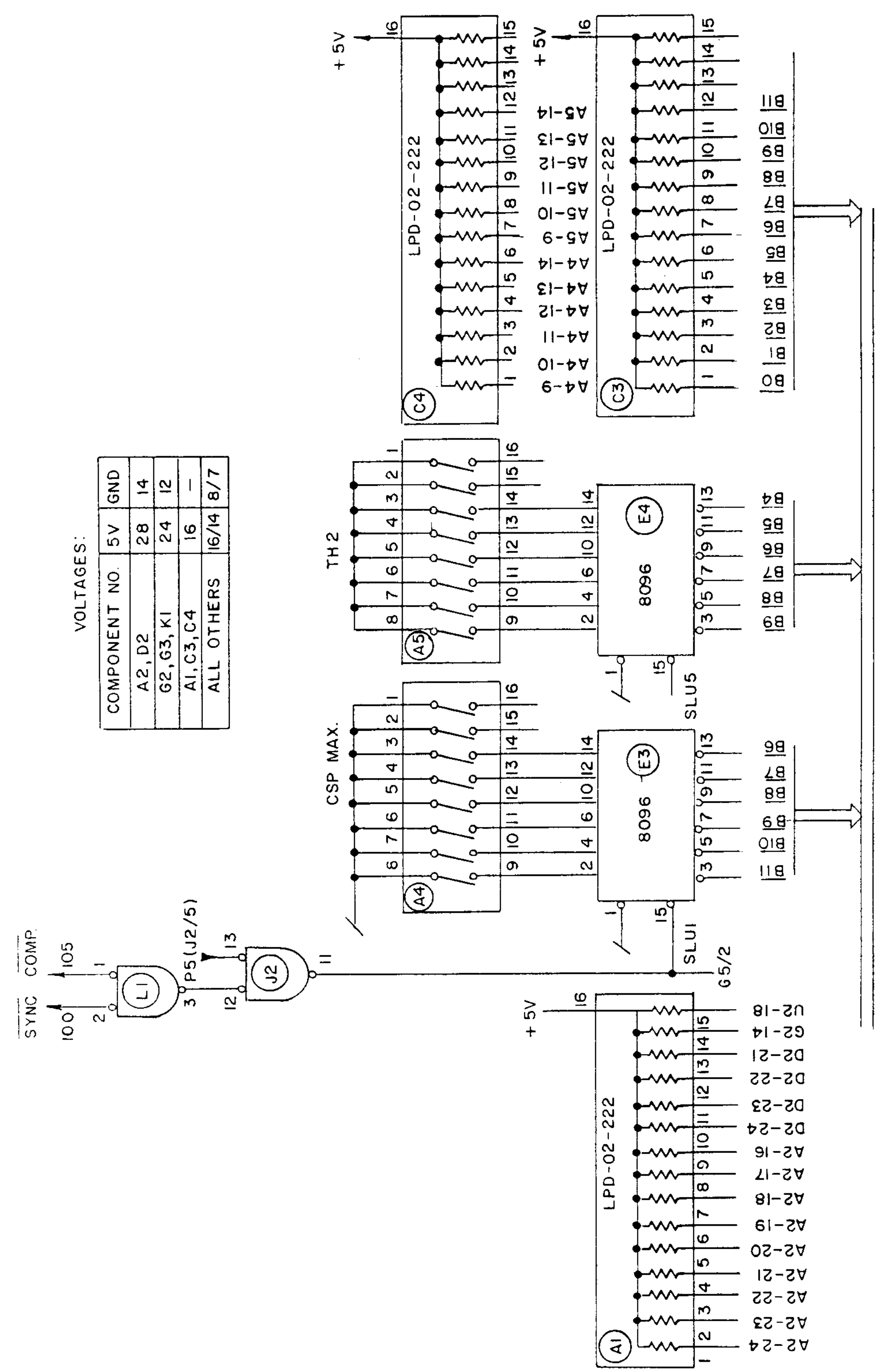
Figure 67C:
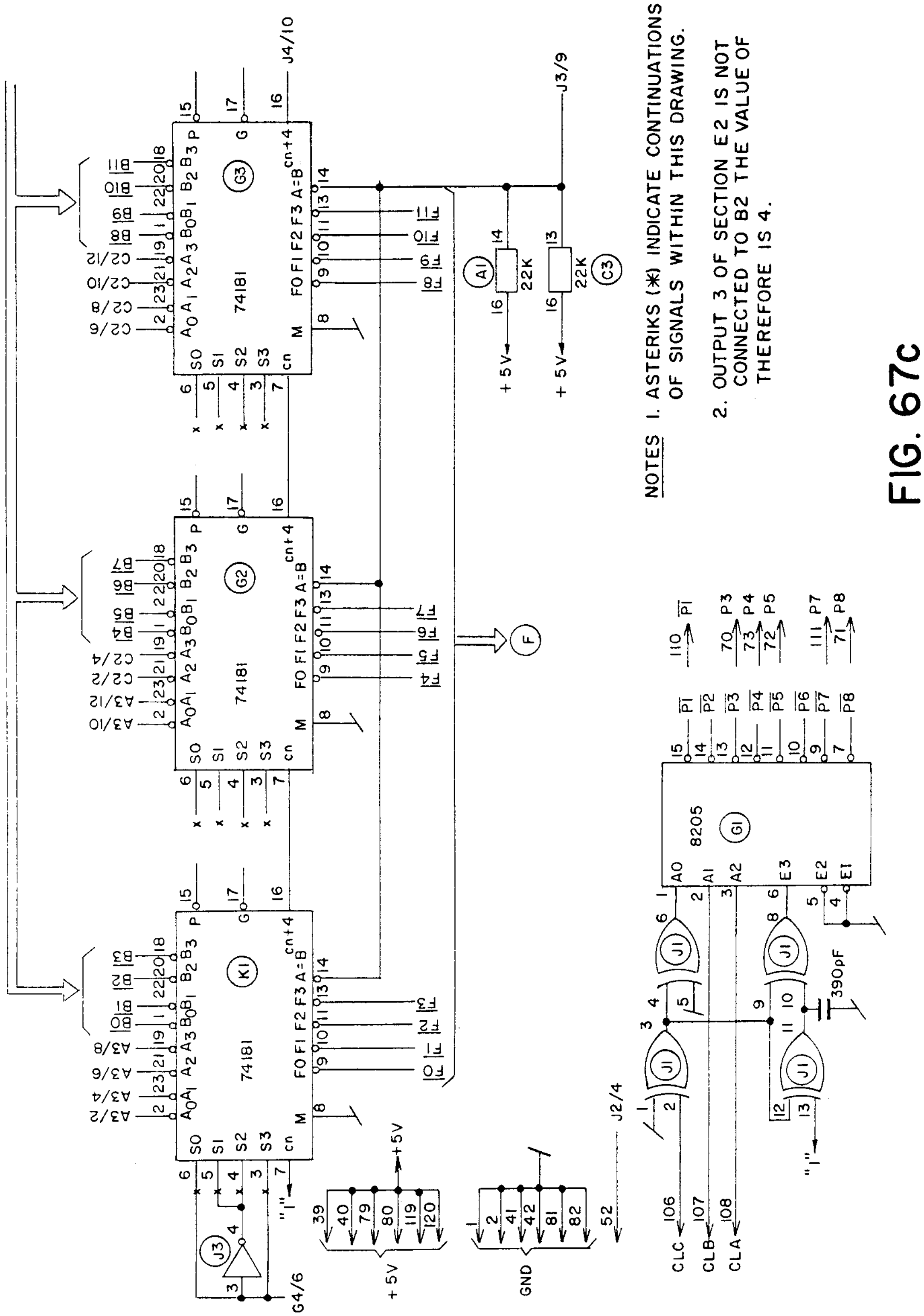
Figure 67D:
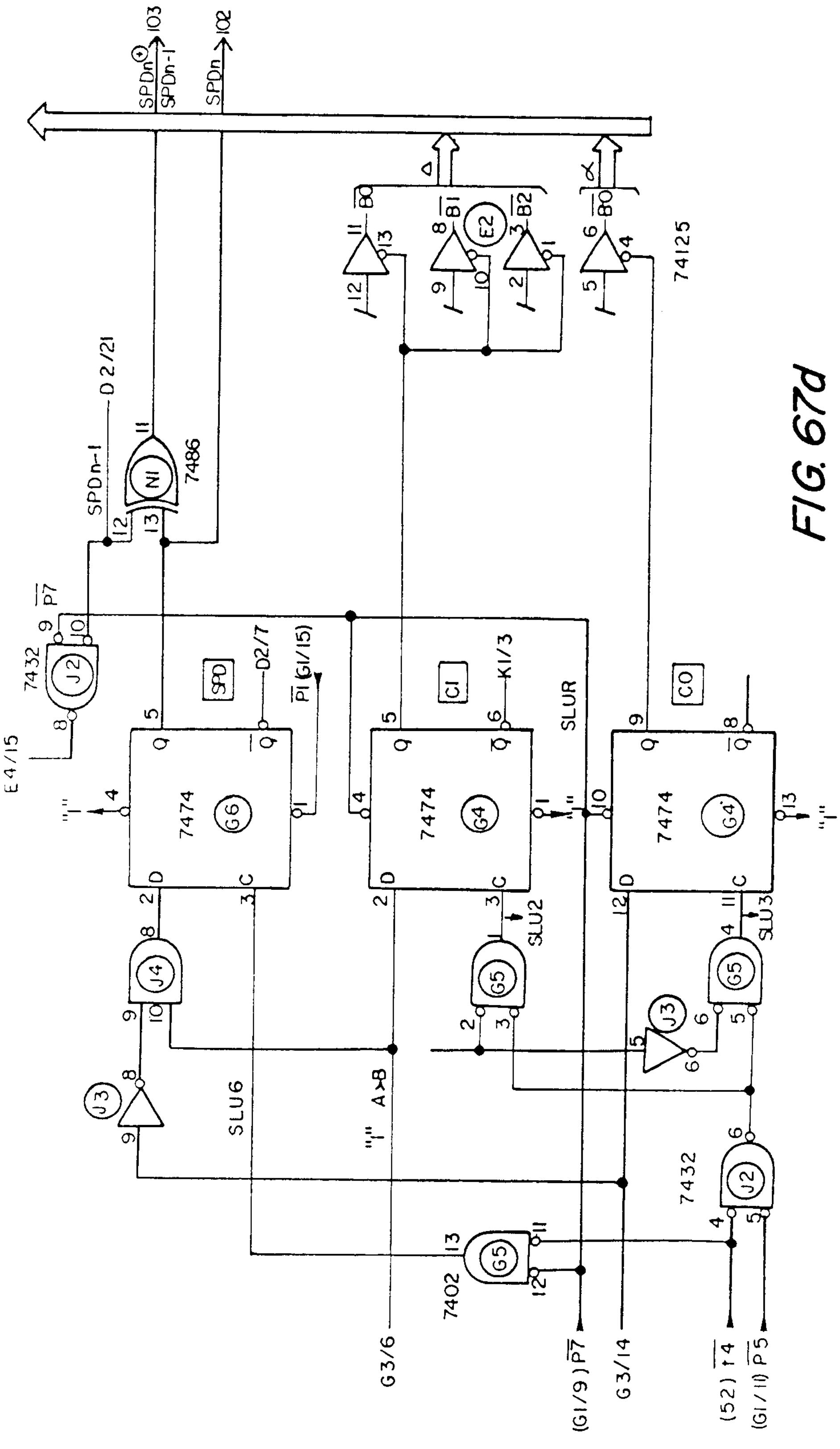

The remainder of FIG. 61 will be described with additional reference to flow charts provided in FIGS. 62 and 63. FIG. 62 is a flow chart illustrating the operation of Expected Echo Amplitude Indication circuitry which provides a suitable reference to comparator 1184 for echo suppression. FIG. 63 illustrates the operation of SPD Arithmetic Logic Unit circuitry 1188.

It is to be appreciated that the Expected Echo Amplitude Indication circuitry indicated by reference numeral 1420 operates in the first portion of a sampling cycle to provide a suitable reference to comparator 1184. During a second portion of the sampling cycle, the comparator provides an output to the SPD circuitry 1188 which determines if voice is detected and how long a hangover is to be provided.

Considering now the Expected Echo Amplitude Indication circuitry 1420, which is a digital circuit, we can nevertheless understand its operation in analog terms by considering an echo memory 1422 as 48 capacitors which are either charged or discharged in accordance with signals detected by the receiver circuitry. Actually echo memory 1422 comprises 48 charging counters each of 16 bit capacity. The operation of echo memory and the remainder of the circuitry illustrated in FIG. 61 will now be described with additional reference to timing diagrams illustrated in FIG. 64. In FIG. 64 the first 10 diagrams relate to the operation of SPD circuitry and diagrams 11-17relate to the operation of the Expected Echo Amplitude Indication circuitry 1420, hereinafter referred to as Echo circuitry, for the sake of conciseness.

Echo circuitry operates on a sampling cycle of 4 microseconds, which cycle is divided into two 2 microsecond portions, as indicated above. Each of these 2 microsecond portions are divided into 8 equal 1250 nanosecond portions, indicated on the flow charts of FIGS. 62 and 63 as P 1 to P 8.

During P 1, echo memory 1422 makes available its contents to the A terminal of subtract circuitry 1432, indicating the status of one of its 48 counters. During P 1 timing circuitry 1438, which receives various timing inputs illustrated at the top of the timing diagram of FIG. 64, instructs a multiplexer 1436 to make available to the B input of subtract circuitry 1432 the output of echo memory 1422 divided by 1256 by divider 1434. The unaltered output of the echo memory is supplied to input A subtract circuitry 1432 and the output of subtract circuitry is inserted into a latch 1440. Towards the end of P 2 the output of latch 1440 is inserted into memory 1422 for updating thereof, via a bus 1442. The above described process reduces the count in each of the counters by 1/256 th.

At the same time that information is inserted into memory 1422 it is supplied via bus 1442 to the D/A converter 416. D/A converter then supplies a reference input to comparator 1185. Comparator 1185 inserts its output signal into latch 1418 at a time P 5 t 2 which is defined by the scale at the top of the timing diagrams of FIG. 64 to be the second 50 nanosecond portion of time P 5.

The relatively long time between insertion of the information to memory 1422 and the insertion of the comparator output into latch 1418 is required for proper operation of the D/A converter 1416 and of the comparator 1184.

Once the information has been entered into latch 1418, the echo circuitry 1420 is freed to deal with the received signal.

Beginning at time P 3, an address multiplexer 1444 routes to the echo memory address inputs the six bit output from receiver ($R_x$) control memory 1234 (FIG.

54) indicating the assigned active subscriber line for the appropriate one of the 24 communications channels.

The output of delay memory 1216, identified as R i, is supplied to a full-wave rectifier 1446 which provides an output signal to multiplexer 1436 indicating the absolute value of R i. Multiplexer 1436 supplies this signal to the B input of subtractor 1432 when suitably instructed by timing circuitry 1438.

As indicated in the timing diagram of FIG. 10, subtract circuitry 1432, at time p 5 compares the contents of echo memory 1432 with the respective received signals R i. The difference between the two signals is then inserted into latch 1440, and the sign of the difference is noted.

The contents of the latch, i.e. the difference between the contents of memory 1422 and R i, are supplied to a divide by 8 circuit. The output of divide by 8 circuit 1448 are supplied via multiplexer 1436 to the B input of subtract circuitry 1432 at time P 6 in response to suitable signals from timing circuitry 1438.

Subtract circuitry 1432 is operative to subtract one eighth of the difference of R i and the memory contents from the contents of the memory, that is MEM—-(MEM−R i)/8. The subtracted output is inserted into latch 1440. The contents of latch 1440 are inserted into memory 1422 for updating thereof at time P 8 if the contents of the latch are positive and R i is less than the contents of the memory. This is done only every second P 1-P 8 cycle, i.e. every 4.44 microseconds.

SPD circuitry 1188 will now be described, with particular reference to the flow chart of FIG. 63 which begins from time P 5, also referred to in the flow chart of FIG. 62. At time P 5 the comparator 1184 provides, via latch 1418, a control input to a multiplexer 1449, which receives two inputs. One of the inputs, CSP max, indicates the state of a CSP counter 1450 at which the hangover time is at a maximum, the other input is zero and represents the minimum count in counter 1450. A second multiplexer 1451 receives four inputs, TH 2, the minimum count, corresponding to a minimum time limit, for producing an indication that voice is detected, α the number by which counter 1450 is decremented each time voice is not detected in a sampling, Δ the amount by which counter is incremented each time voice is detected, so long as the counter is not at a maximum, and zero. Multiplexer 1451 is controlled by logic circuitry 1454 which also controls a multiplexer 1456 which receives the outputs of multiplexers 1449 and 1451.

The operation of multiplexers 1449, 1451 and 1456 is illustrated in the flow chart of FIG. 63 at time P 5. The first step is to decide whether the comparator 1184 has detected voice characteristics at a given sampling of a given one of the 48 active subscriber lines.

If the answer is YES, then it is determined whether the counter 1450 is at a count corresponding to a maximum hangover. If YES, no change is made in the count in counter 1450. If NO, the counter 1450 is to be incremented by 4. If speech characteristics are not detected at the sampling, then it is determined whether the counter 1450 is at zero. If it is, then the count therein is not changed, otherwise the counter is to be decremented by 1. The above determinations are carried out by an arithmetic logic unit 1458 in response to the outputs of multiplexer 1456 and the output of counter 1450. At time P 6 the output of arithmetic logic unit 1458 is inserted into a latch 1460 which is operated by suitable timing signals. Arithmetic logic unit 1458 is generally similar to subtractror 1432 but may additionally operate as an adder.

A 48 bit memory 1468 referred to hereinafter as the SPD memory contains a logic signal for each of the active subscriber lines. The logic signal is 1 if at the previous sampling of that active subscriber line the count in counter 1450 had increased to above TH 2 or had decreased to a value exceeding zero. The logic signal is 0 if at the previous sampling of that active subscriber line the count in counter 1450 had increased to a level below TH 2 or had decreased to zero. The bi-level threshold results from a built in hysterisis which increases the hangover following detection of voice. Thus when the SPD level is 1, an SPD change is only produced when the level reaches zero, while when the SPD level is 0, an SPD change is only produced when the level reaches TH 2.

The mechanism for changing the SPD count will now be described with reference to FIG. 61 and to the flow chart of FIG. 63 at time P 7, SPD memory supplies an output signal SPD n−1, indicating the current contents thereof, to control logic circuitry 1454 which performs the determinations indicated at P 7. First, it is determined whether SPD n−1 is 1 or 0. If SPD n−1 is 1 and the count in counter 1450, is greater than zero as determined by arithmetic logic unit 1458, then SPD n is 1. If SPD n−1 is 1 and the count in counter 1450 is 0, then SPD n is 0.

If SPD n−1 is zero and the count in counter 1450 is greater than TH 2, then SPD n is 1. If SPD n−1 is zero and the count in counter 1450 is less than TH 2, then SPD n is 0. SPD n is inserted in a latch 1470.

The SPD n−1 and SPD n signals are supplied to inputs of an exclusive OR gate 1472 which provides an output indicating whether there has been a change in the SPD. The output of XOR gate 1472 is supplied together with the SPD n to respective inputs of a Serial to Parallel converter 1474, which receives timing signals from circuitry 1438 and control signals from clock 1166. S/P converter 1474 collects data on SPD n and change in SPD from four successive samples of respective active subscriber lines and then inserts this information in parallel, to a latch 1476, which also receives timing signals from circuitry 1438. The SPD change output of XOR gate 1472 is also supplied to an AND gate 1478 which also receives a CPU interrupt or Fetch cycle indication. Upon receiving this indication and when there is a change in SPD, AND gate 1478 instructs a Tristate Buffer 1480 to permit data from latch 1476 into a CPU workspace 1500. At the same time a multiplexer 1482, which also receives the SPD change input from AND gate 1478 as well as information from the CPU address bus and the four most significant bits of the active subscriber line address from counter 1166, supplies the active subscriber line address to the workspace 1500. It is noted that the only data that is supplied via tristate buffer 1480 is in respect of changes in SPD. Thus at each CPU interrupt or fetch cycle from 0-8 bits of data may enter. It is a particular feature of the invention that this data entry is accomplished in a "Cycle Steal Mode" during times when the CPU is referring to its program memory during a Fetch cycle and when the workspace 1500 is available, without adding additional load to the CPU.

The CPU workspace is coupled to the CPU data bus via a bidirectional tristate buffer 1484. It is noted that it is necessary for a CPU fetch cycle to occur at least every 8 microseconds. in order to prevent possible loss of data entry.

The output of SPD latch 1470 takes place at time P 8 both to SPD memory 1468 and to the Cycle Steal Interface circuitry including XOR gate 1472 and S/P converter 1474.

Reference is now made briefly once again to FIG. 64 which provides timing diagrams for the various components described hereinabove.

Reference is now made to FIGS. 65, 66 and 67 which are detailed schematic illustrations of multiplexer and comparator circuitry, Expected Echo Amplitude Indication circuitry 1420, and SPD circuitry 1188, all of which are illustrated schematically in FIG. 61.

With reference now to FIG. 65, there are shown 48 inputs each from the output of an input circuit 1130 FIG. 54, which are connected to respective RC filters 1402, each comprising a 1.6 K resistor 1403 and a 22 nF capacitor 1404. The output of each RC filter is supplied to an input of an 8 to 1 multiplexer 1180 of which six are provided. The outputs of multiplexers 110 are supplied to a 6 to 1 multiplexer 1182 such as a 4051 chip. Multiplexers 1180 and 1182 receive assignment instructions at their respective A, B and C inputs from the output of counter 1166 which is passed through an open collector buffer 1406, such as a 7407 chip. The logic 1 outputs are provided with a 10 Volt level by a pull up resistor bank 1408.

The output of multiplexer 1182 is supplied to a pair of operational amplifiers 1409 and 1411, arranged in respective non-inverting and inverting modes, and typically comprising 3507 chips. Operational amplifiers 1409 and 1411 operate together as a full-wave rectifier (1412 FIG. 6), such that when a negative signal is received, a positive signal is supplied at the output of amplifier 1411 and when a positive signal is received, a positive signal is supplied at the output of amplifier 1409. The respective outputs of amplifiers 1409 and 1411 are respective positive inputs of comparators 1413 and 1415 which together function as comparator 1184 (FIG. 54). The negative inputs of comparators 1413 and 1415 receive inputs from reference fixing circuitry including a resistor network 1417 which defines a minimum reference voltage.

An additional voltage, which is a function of the expected echo amplitude is received from D/A converter 1416, such as a DAC 80-12 via inverter logic 1418, such as a 7404 chip from the output of latch 1440 (FIG. 61) of Expected Echo Amplitude Indication circuitry 1420.

The output of comparator 1413 is supplied to comparator 1415 and the output of comparator 1415 is supplied via an inverter 1417 to a flip flop 1419 which provides a logic 1 signal when the threshold is not exceeded and a logic 0 signal when the threshold in comparator 1184 is exceeded. The output of flip-flop 1419 is supplied as a control input to a multiplexer 1449 (FIG. 61).

Referring now to FIG. 66, there is seen Expected Echo Amplitude Indication circuitry 1420 (FIG. 61). Inputs from Control Memory 1234 are supplied to Address Multiplexer 1444 typically comprising a pair of 74157 chips 1431 which supplies address control inputs to Echo Memory 1422, typically comprising a pair of 82S09 chips 1433. Inputs from Delay Memory 1216 are supplied to a rectifier bank 1446 whose output is supplied to multiplexers 1441, typically 74158 and 74157 chips. Multiplexers 1441, which comprise part of multiplexer 1436 (FIG. 61), also receive the outputs of rectifier bank 1446, and provide outputs to subtractors 1443, which also receive outputs from memory chips 1433. The outputs from subtractors 1443 are supplied to latch chips 1445. The outputs of latches 1445 are supplied to the inputs of D/A converter 1416 (FIG. 6) via inverters 1418 (FIG. 65) and to divide by 8 circuitry 1448 (FIG. 61).

Reference is now made to FIG. 67, which shows in detailed schematic illustration the construction of SPD ALU circuitry 1188 (FIG. 61). The CSP counters 1450 and the SPD bit memory are embodied in a pair of 82S09 memories and the arithmetic logic unit 1458 is embodied in three 74181 chips connected as illustrated. Latch 1460 which receives the output of ALU 1458 comprises a pair of 74174 chips connected as illustrated.

Multiplexers 1449, 1451 and 1456 are embodied in 8096 chips 1455 and 1457 and a 74125 chip 1473 whose outputs are supplied to pull up resistors 1459 to provide desired voltage levels. SPD n latch 1470 is embodied in a 7474 flip-flop and provides an output to XOR gate 1472. Control logic circuitry is illustrated in detail at box 1461.

Figure 68A:
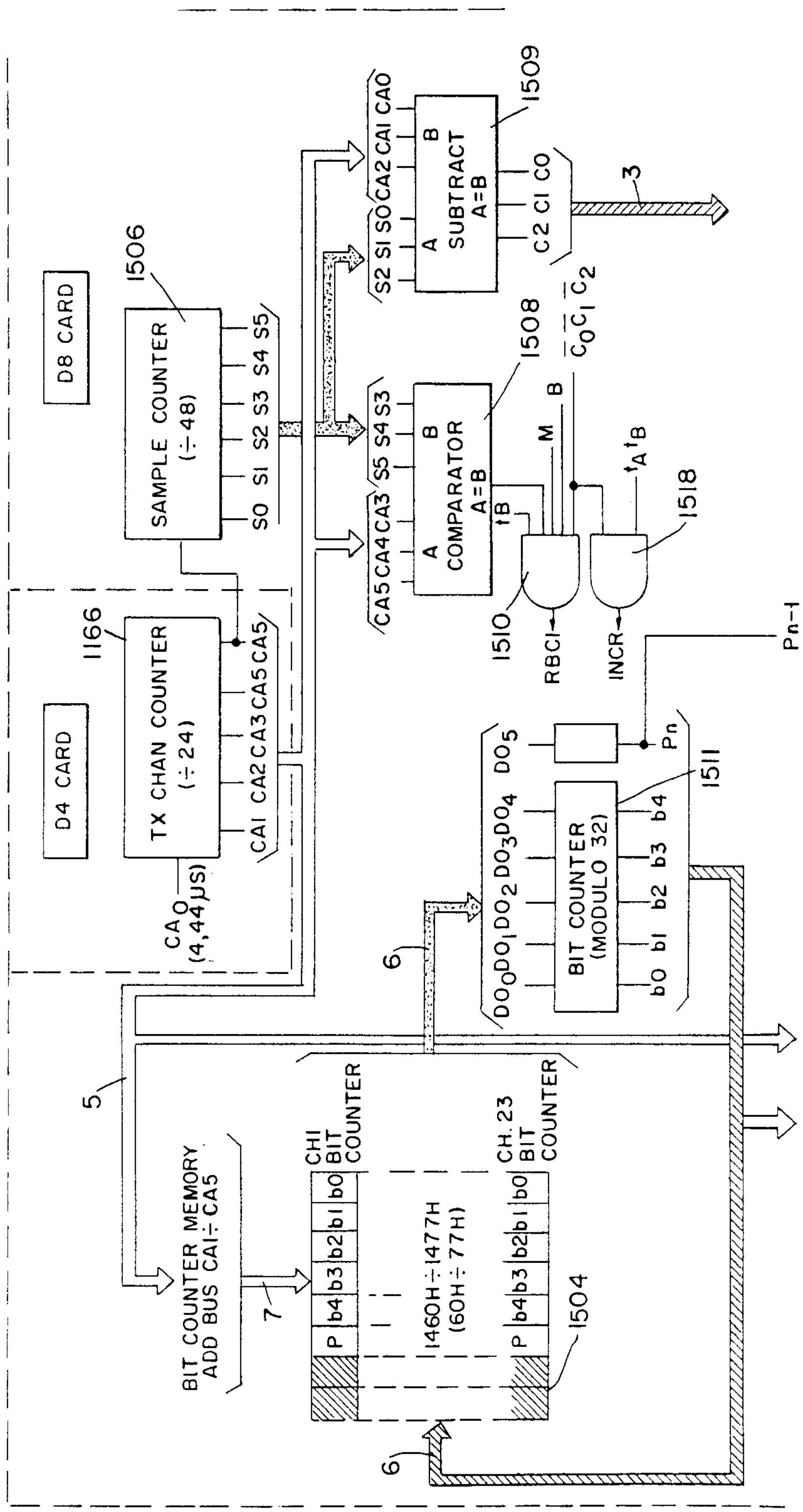
FIG. 68(*a* & *b*) is a block diagram of the modem transmitter.
Figure 68B:
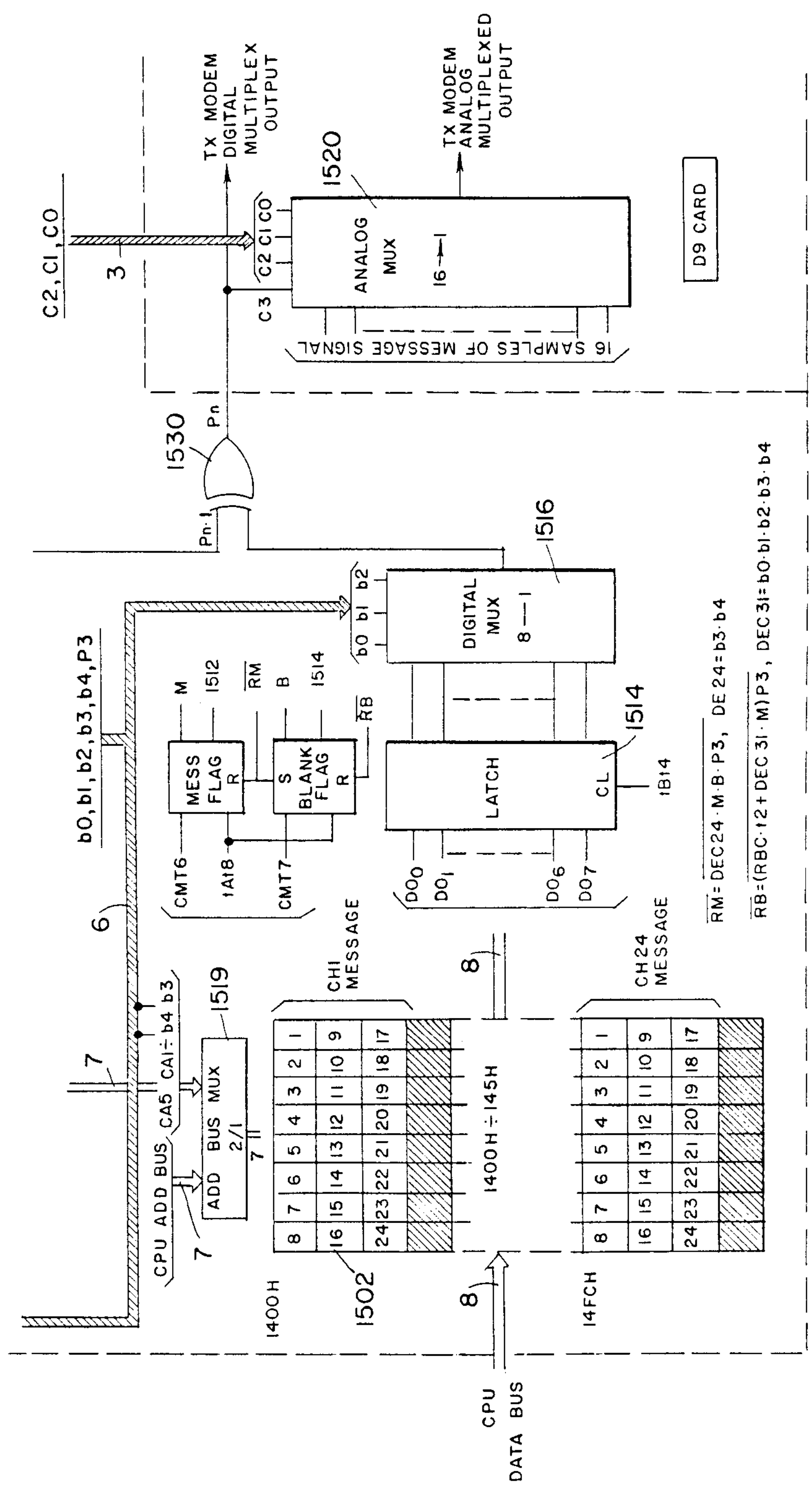

Reference is now made to FIG. 68, which is a block diagram illustration of Transmitter Modem Circuitry 1390 referred to hereinabove in connection with FIG. 57.

In general terms, it is to be understood that Transmitter Modem Circuitry transmits messages along the communication channels in a synchronous manner in response to information which is supplied to it by the CPU in an asynchronous manner. The required synchronization results from the drum-like nature of the delay memory 1216 (FIG. 54). The delay memory may be understood to contain 24 concentric rings arranged side by side to define an imaginary cylinder. Each of the rings holds 1192 information samples which corresponds to 24 bits of message, each of which comprises 8 samples. Normal sampling of the communications channels occurs per 100 microseconds. However the operation of speed up counter 1218 also produces an accelerated readout of all the samples corresponding to a given communications channel in 200 microseconds.

Since the speed-up readout takes place concurrently with the normal speed operation of the delay memory, 1126, the starting point for reading out each channel under speed-up is shifted by two steps. Synchronization is required to match the readout of the messages with the transmittal of further messages.

Referring now to FIG. 68, a message memory 1502, which receives inputs from a CPU data bus contains the message to be transmitted along each of the 24 communications channels, following a blank bit, 13 bits of a Barker code, 8 bits of acknowledge or assignment data, one bit of parity, and one reference bit required for DPSK transmissions. A second memory 1504 serves to monitor all of the 24 communications channels to indicate whether the message has been transmitted and the state of transmission of the message at each channel.

Counter 1166 (FIG. 54) which provides an address corresponding to each of the 24 communication channels, provides an output to memory 1504, to a comparator 1508 and to a subtractor 1509. The most significant bit output of counter 1166 is supplied as a clock input to a sample counter 1506 which is operative for counting 48 samples, and provides an output to comparator 1508 and to subtractor 1509. Comparator 1508 is operative to provide an enable output to an AND gate 1510 when the counts in counter 1166 and in sample counter 1506 are equal. This equality corresponds to the time slot at which a given channel on the imaginary drum of the delay memory is at the point in real time when the message starts. The time separation between outputs of the comparator is slightly greater than 200 microseconds in order to take into account the "rotation" of the drum during the "speed up" readout thereof, mentioned above.

AND gate 1510 also receives B and M inputs which are provided by respective FLIP FLOPs 1512 and 1514 in response to inputs from the control memory 1160 and which indicate the permissible time span for message transmission. AND gate 1510 also receives the all zero decoded output of subtractor 1509. The output of subtractor 1509 is all zero when the outputs of counters 1166 and 1506 are equal, i.e. at the beginning of message transmission. The output of subtractor 1509 is also supplied to an analog multiplexer 1520 which comprises multiplexers 1354 (FIG. 57).

Figure 69A:
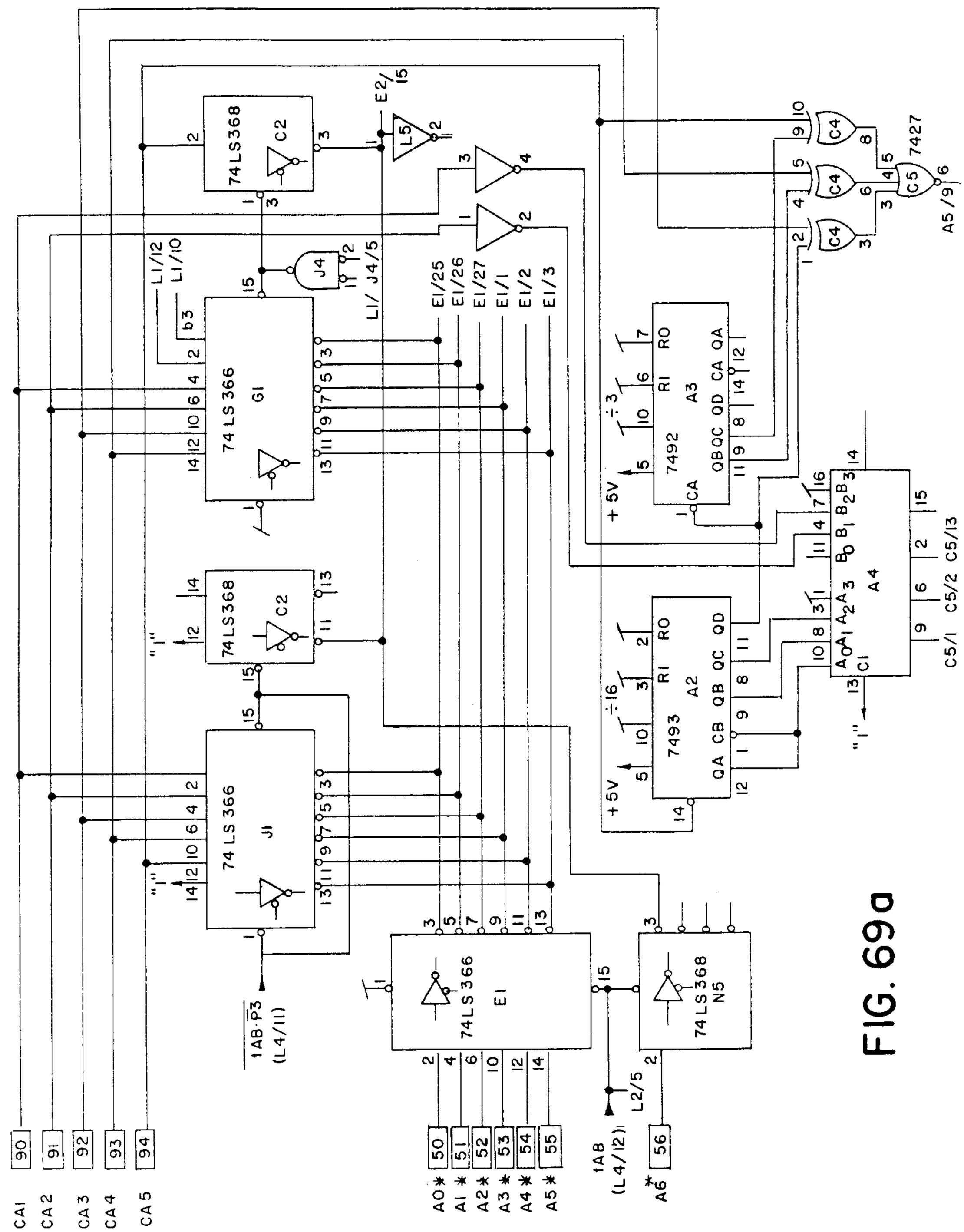
FIG. 69(*a* to *d*) is a schematic illustration of the modem transmitter.
Figure 69B:
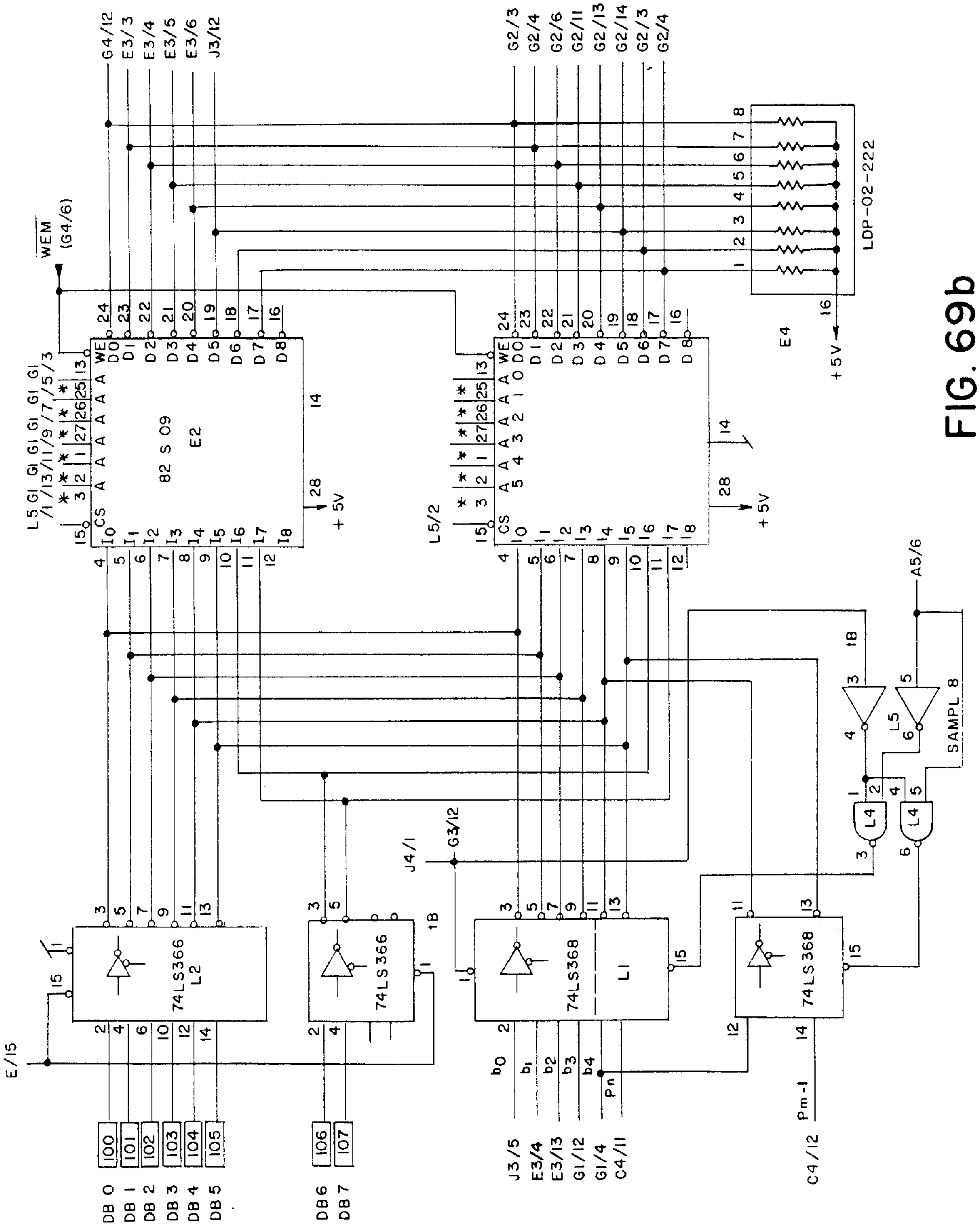
Figure 69C:
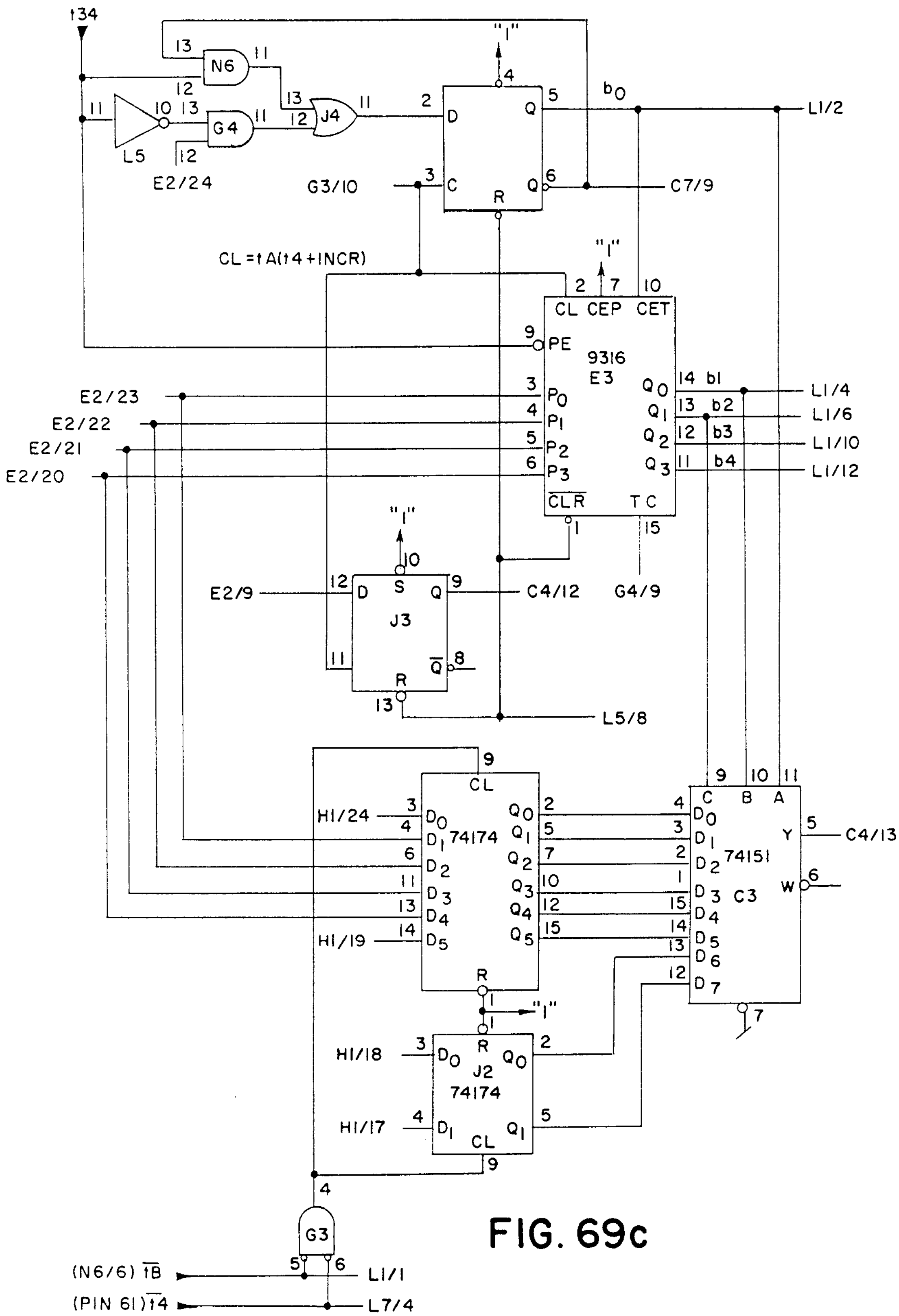

Reference is now made to FIG. 69 which is a detailed schematic illustration of the circuitry of FIG. 68. It is seen that message memory 1502 is embodied in a pair of 82s09 chips 1550 and 1552, which comprise fast bipolar memories which output to a latch 1514 embodied in a 74174 chip. Latch 1514 outputs to multiplexer 1516 embodied in a 74151 chip.

Bit counter 1511 is embodied in a 9316 counter chip 1553 and a flip-flop 1554. Chip 1553 deals with the most significant bits while flip-flop 1554 deals with the least significant bit.

A flip-flop 1556 embodies the phase memory P associated with bit counter 1511 for remembering the previous P bit. Memory 1504 is also embodied in chips 1550 and 1552.

Multiplexers 1519 are embodied in 3 pair of 74LS 1366 chips and a pair of 74 LS1368 chips which comprise three state buffers.

Sample counter 1506 is embodied in counter chips 7493 and 7492, indicated by reference numerals 1558 and 1560. The subtractor 1509 is embodied in a 7483 chip 1562 while the comparator 1508 comprises 3 XOR gates 1564, 1566, 1568 which output to an OR gate 1570. Gates 1564, 1566 and 1568 are typically 7486 chips while gate 1570 is typically a 7427 chip. AND gate 1510 is a 7420 chip.

The circuitry in box 1572 is used to activate and deactivate B and M flags which are not described herein.

The output of subtractor 1562 is supplied to multiplexer 1520 (FIG. 68) and the output of XOR gate 1530 is supplied as a digital multiplexed modem output if required and also to multiplexer 1520.

The output of subtractor 1509 is operative as a control input to multiplexer 1520 together with an additional control input from a XOR gate 1530, as will be described hereinafter.

AND gate 1510 provides a signal RBC 1 to reset a bit counter 1511 each time that message transmission for a given communications channel should begin. A second AND gate 1518, which also receives the output of subtractor 1509ANDed with timing signals t A t 6 increments counter 1511 upon transmission of each eight samples.

Bit ccounter 1511 provides an output to a P n−1 input of XOR gate 1530, indicating the sign of the previous bit. The output of bit counter 1511 is supplied to memory 1504 for updating thereof and the two most significant bits thereof are supplied as addresses to the memory 1502 via an address bus multiplexer 1519, instructing the memory which 8 bits of the 24 bit message for each communications channel to read out at a given time. The 8 bit read out is entered into a latch 1514 and thence into a digital multiplexer 1516 which receives as control inputs the three least significant bits of the output of counter 1511. The output of multiplexer 1516 is supplied to XOR gate 1530. XOR gate 1530 provides an output indicating whether there has been a change in the P output, i.e. in each bit. In accordance with this input, analog multiplexer 1520 determines which of two groups each of 8 samples is to be transmitted for each bit, in accordance with DPSK transmission techniques. The output of analog multiplexer 1520 is supplied to multiplexer 1158 (FIG. 54).

Figure 70:
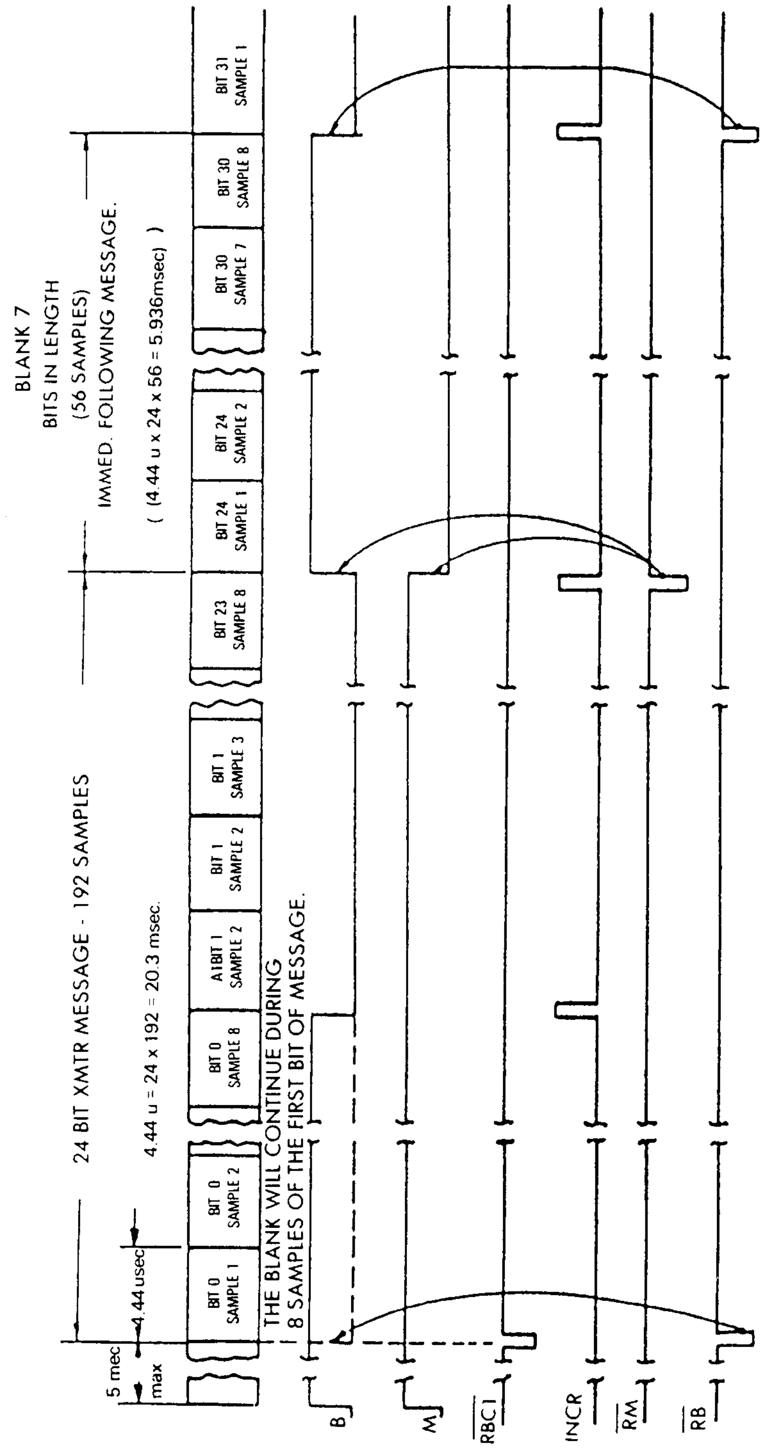
FIG. 70 is a timing diagram of the operation of the modem transmitter.

Reference is now made to FIG. 70 which is a timing diagram of the operation of the Modem circuitry of FIGS. 68 and 69.

Figure 71A:
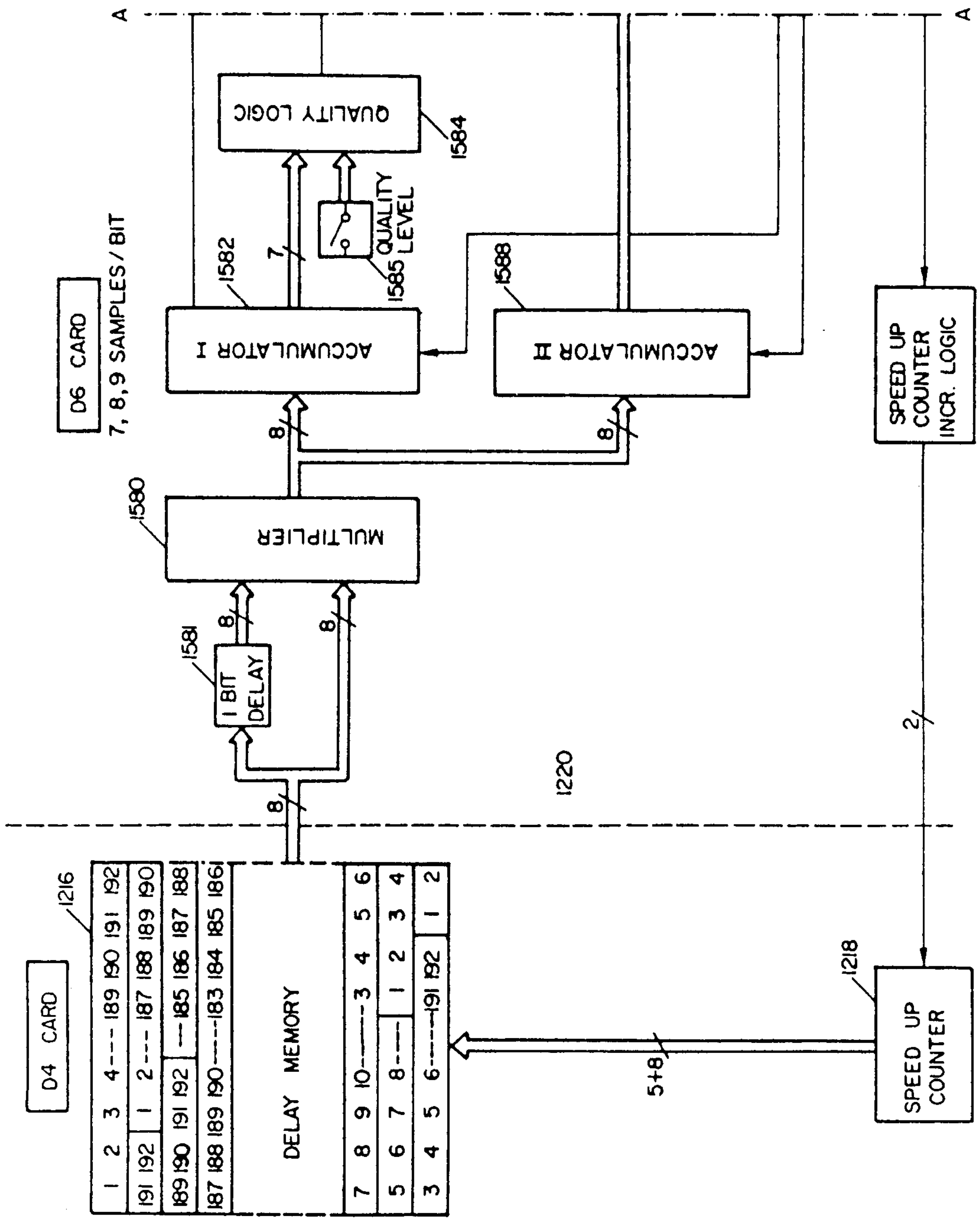
FIG. 71(*a* & *b*) is a block diagram of the modem receiver.
Figure 71B:
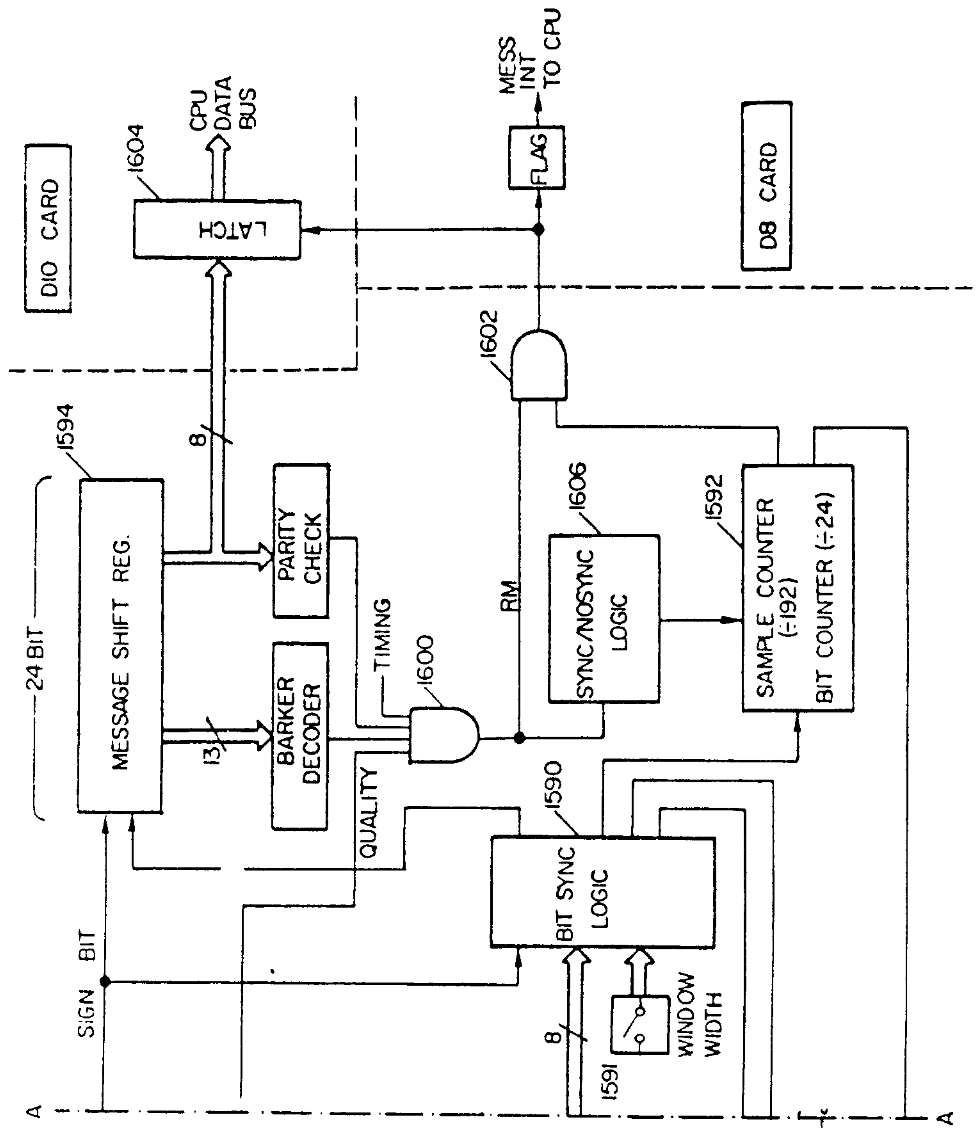

Reference is now made to the Receiver Modem Circuitry which is illustrated in Block diagram form in FIG. 71. As noted above, the receiver Modem circuitry is responsible for DPSK detection of messages on the output of the delay memory 1216 (FIG. 54) produced in response to click inputs from the speed up counter 1218. The 8 most significant bits of the 12 bit output of delay memory 1216 are supplied to message detector 1220 which comprises a multiplier 1580 which receives two parallel 8 bit inputs from the delay memory, one of the inputs being subject to a one message bit delay by delay circuit 1581. The output of the multiplier is positive when the current and delayed bits are of the same phase and is negative when there is a phase difference between them of 180°.

The output of multiplier 1580 is supplied to first and second accumulators 1582 and 1588 which integrate the multiplier outputs sample by sample. The output of the first accumulator 1582 is supplied to quality logic circuitry 1584, which is similar to a comparator and which decides whether a message is detected. A quality level control 1585 supplies a reference threshold input to circuitry 1584.

The output of the second accumulator 1588 is supplied to bit synchronization logic circuitry 1590, which also receives a reference threshold input from a window width control 1591 and also receives an output from the first accumulator 1582. Accumulator 1588 integrates each bit on a center-to-center basis, that is 90°, out of phase with the integration of accumulator 1582. Bit synchronization logic circuitry 1590, which receives both integrated outputs, is operative to sense whether the timing of accumulator 1582 is correct. If it is not correct, then circuitry 1590 is operative to instruct accumulator 1582 to adjust its timing. A corresponding adjustment signal is supplied to a sample counter 1592 and to a message shift register 1594 for adjusting their timing in a corresponding manner.

Bit synchronization logic circuitry 1590 also instructs accumulator 1588 to adjust its integration so as to correspond to the adjustment at accumulator 1582. The most significant bit output, being the sign bit output of accumulator 1582 is serially read into message shift register 1594. The shift register provides outputs to a Barker decoder 1596 and to a parity check circuit 1598. The outputs of decoder 1596 and of parity check circuit 1598 are supplied to an AND gate 1600, which also receives an output from quality logic 1584 and a timing input from sample counter 1592 which indicates that 1192 samples have been received and that 24 bits have been received. When all of these inputs are simultaneously present, AND gate 1600 provides an output signal to a second AND gate 1602, which also receives an output signal from sample counter 1592 indicating the end of the message.

The output of AND gate 1602 enables a latch 604 to pass the contents of shift register 1594 into the CPU upon receipt of a message interrupt signal at the CPU.

Synchronization logic, which also receives an input from the output of AND gate 1600 and provides an output to sample counter 1592 determines whether the system is generally in synchronization. If it is not, it requires that the barker decoder sample all parts of the incoming signal to look for messages. If the system is generally in synchronization, the baker decoder is only operative when a message is expected.

Figure 72A:
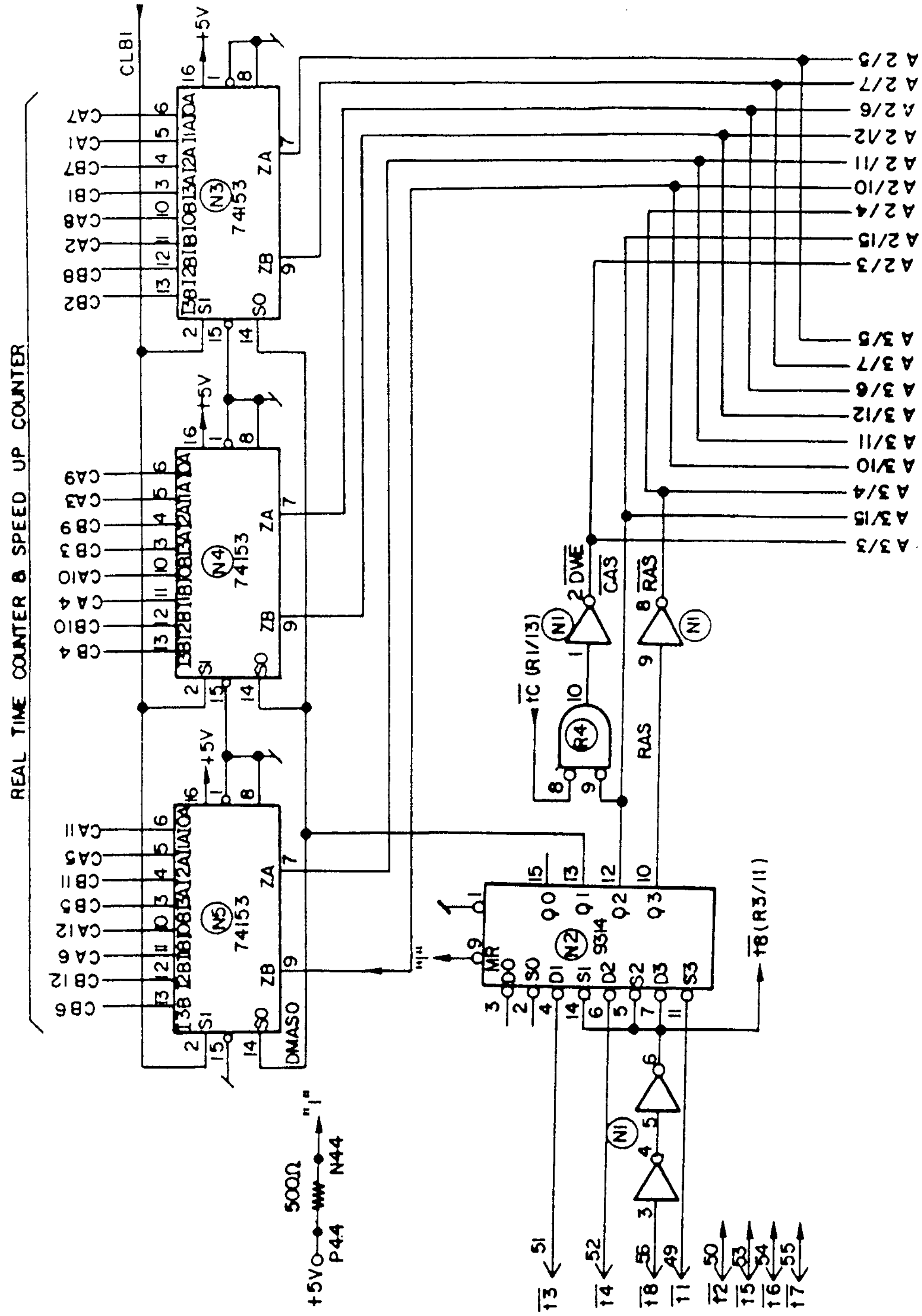
FIG. 72(*a* to *c*) is a schematic illustration of the receive delay memory.
Figure 72B:
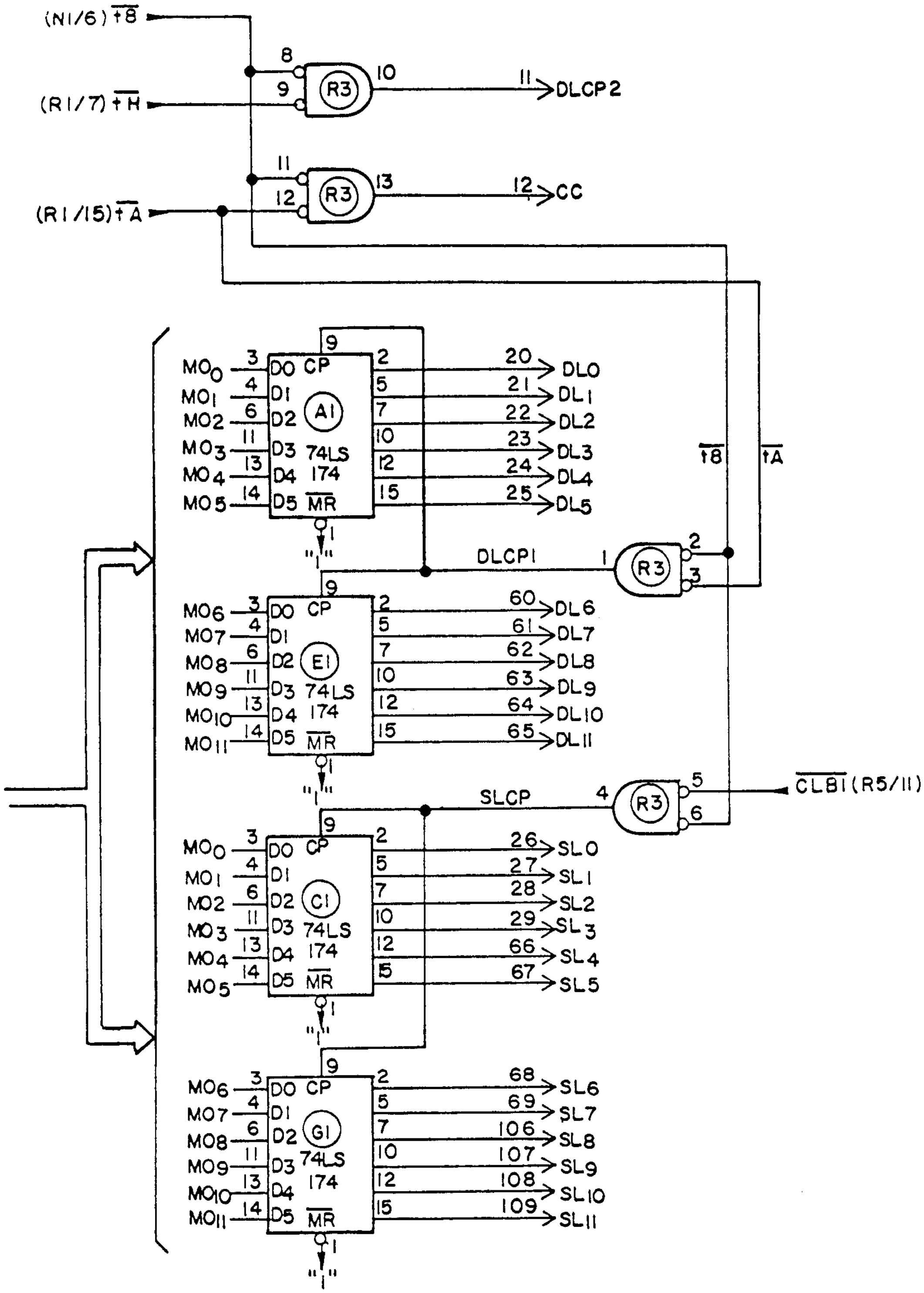
Figure 72C:
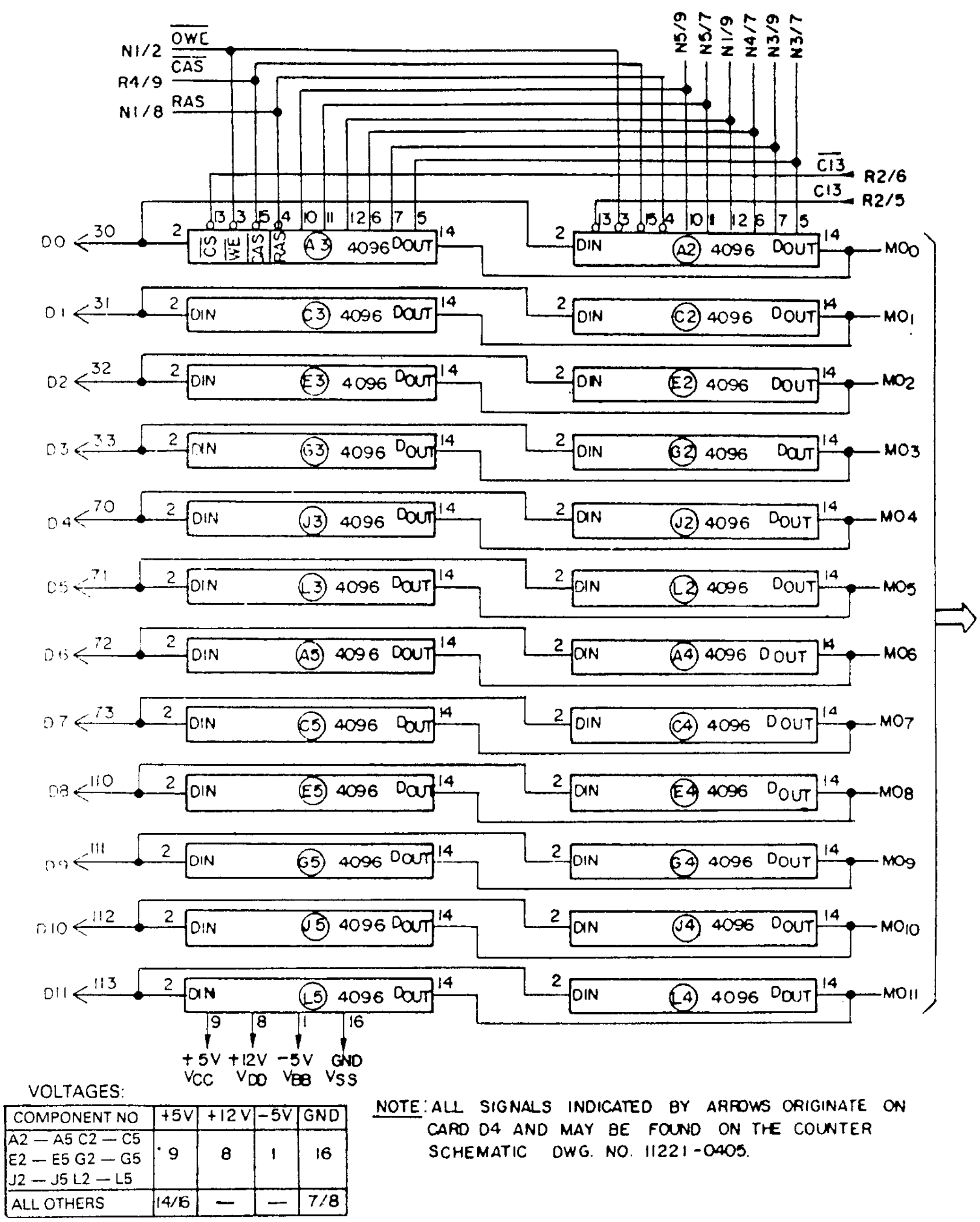
Figure 73A:
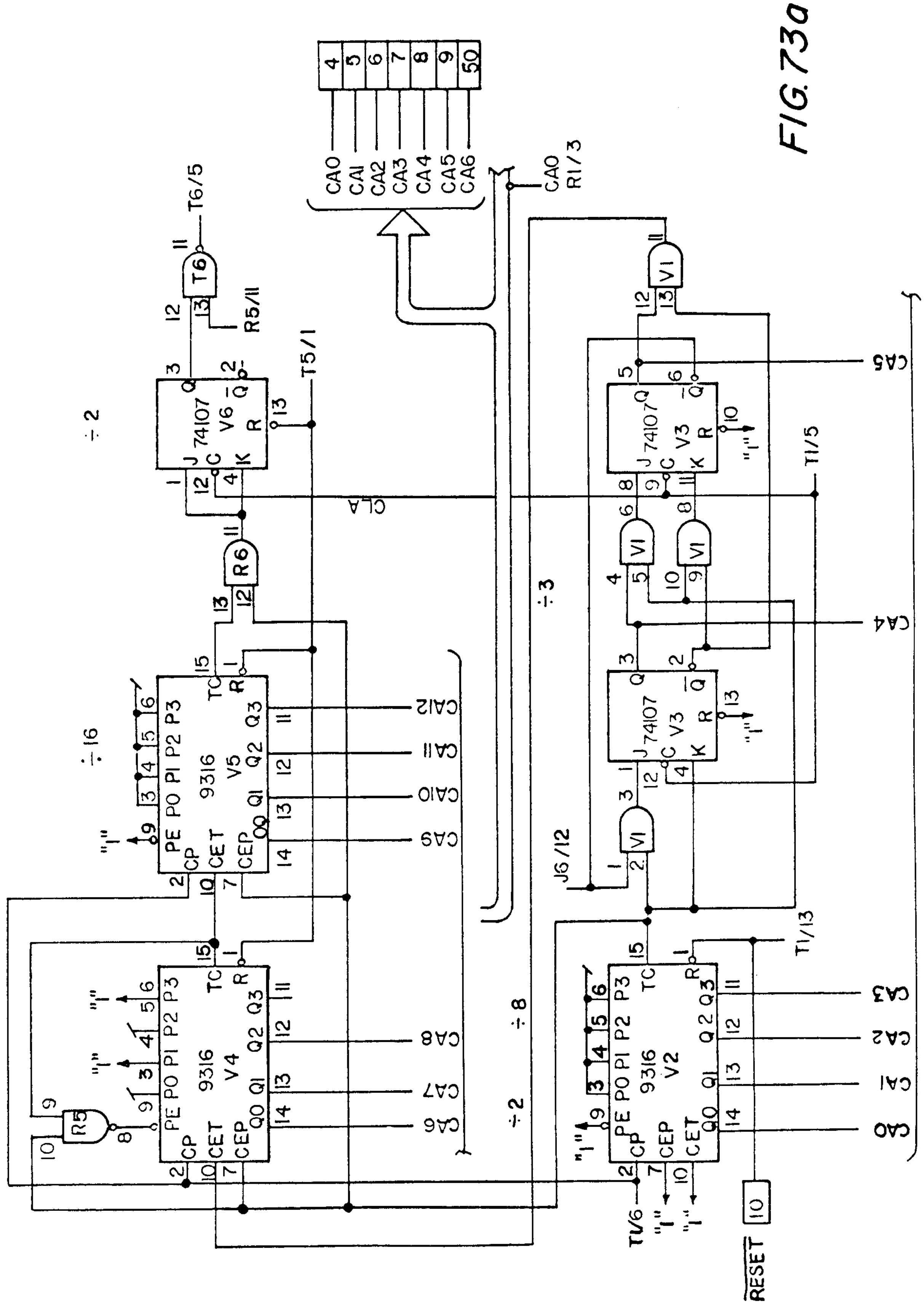
FIG. 73(*a* to *d*) is a schematic illustration of counter circuitry.
Figure 73B:
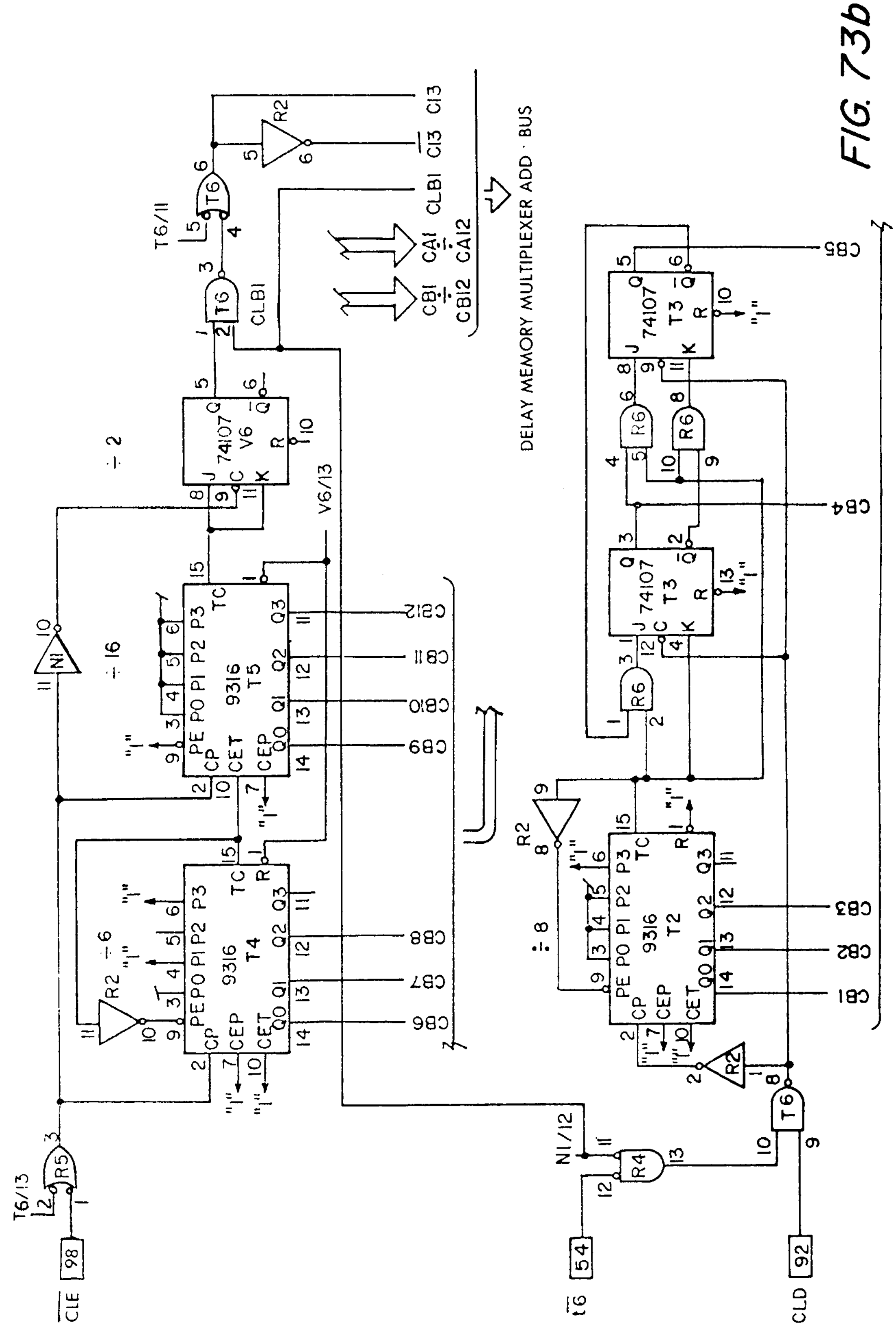
Figure 73C:
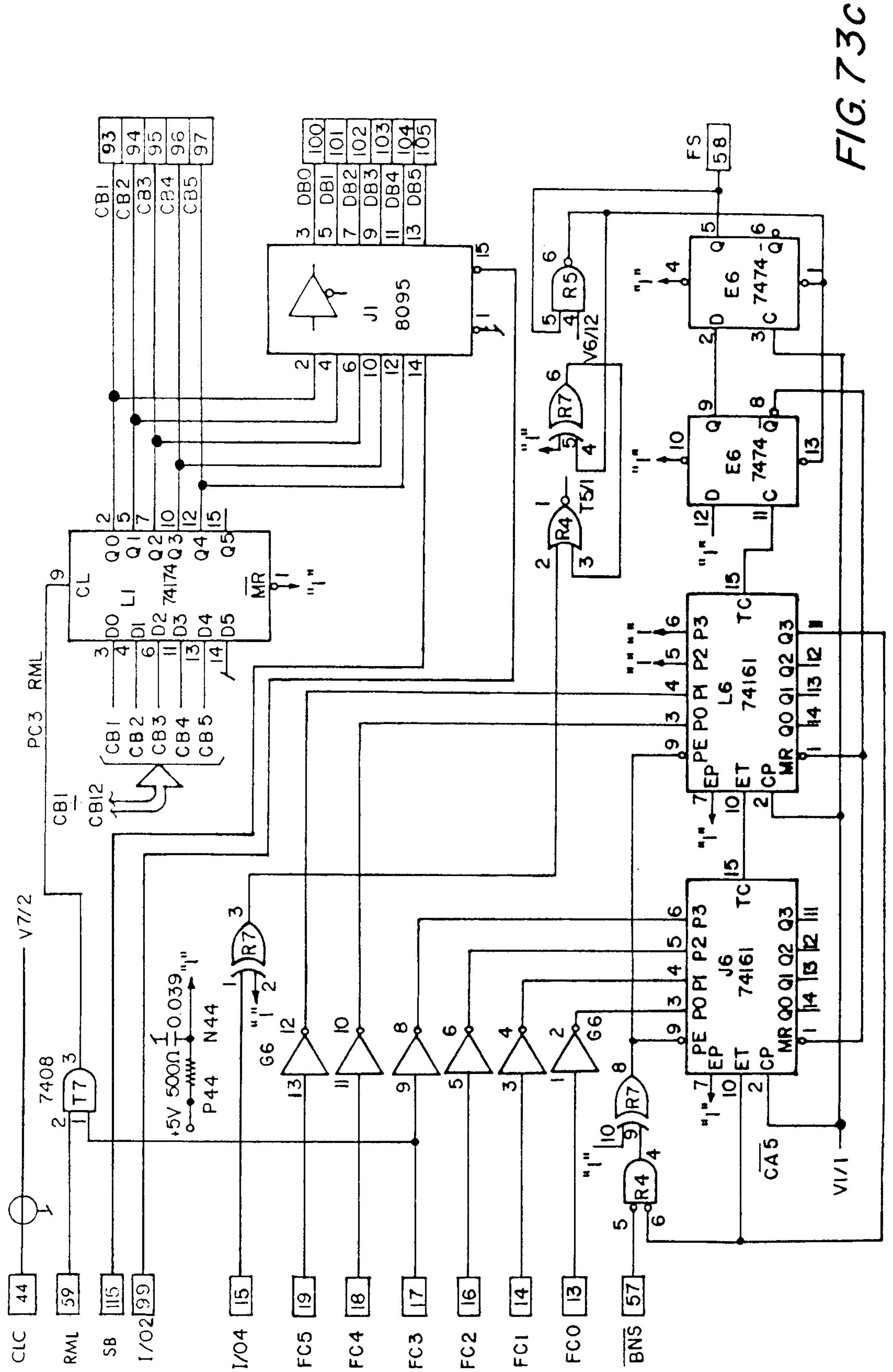
Figure 73D:
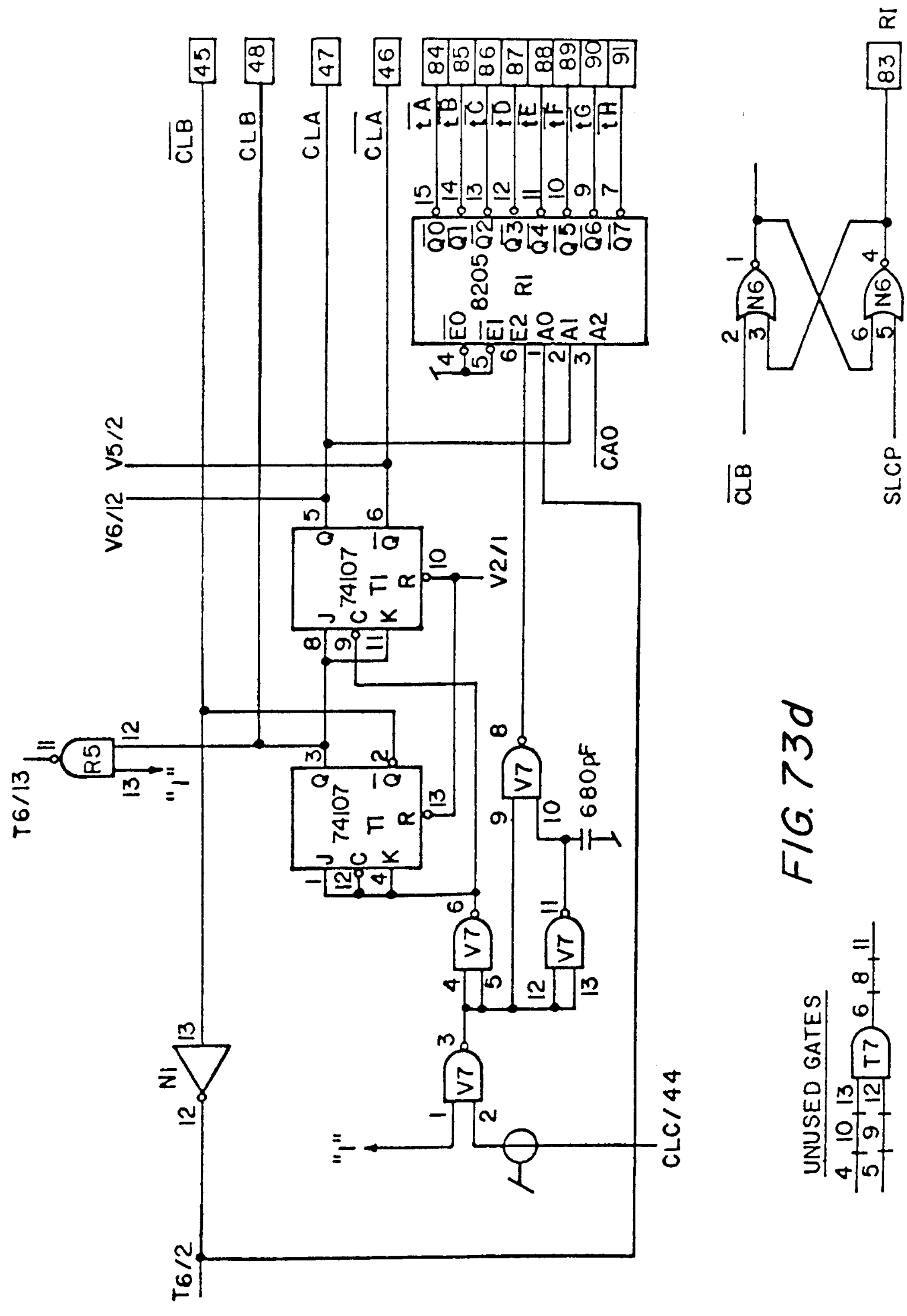
Figure 74:
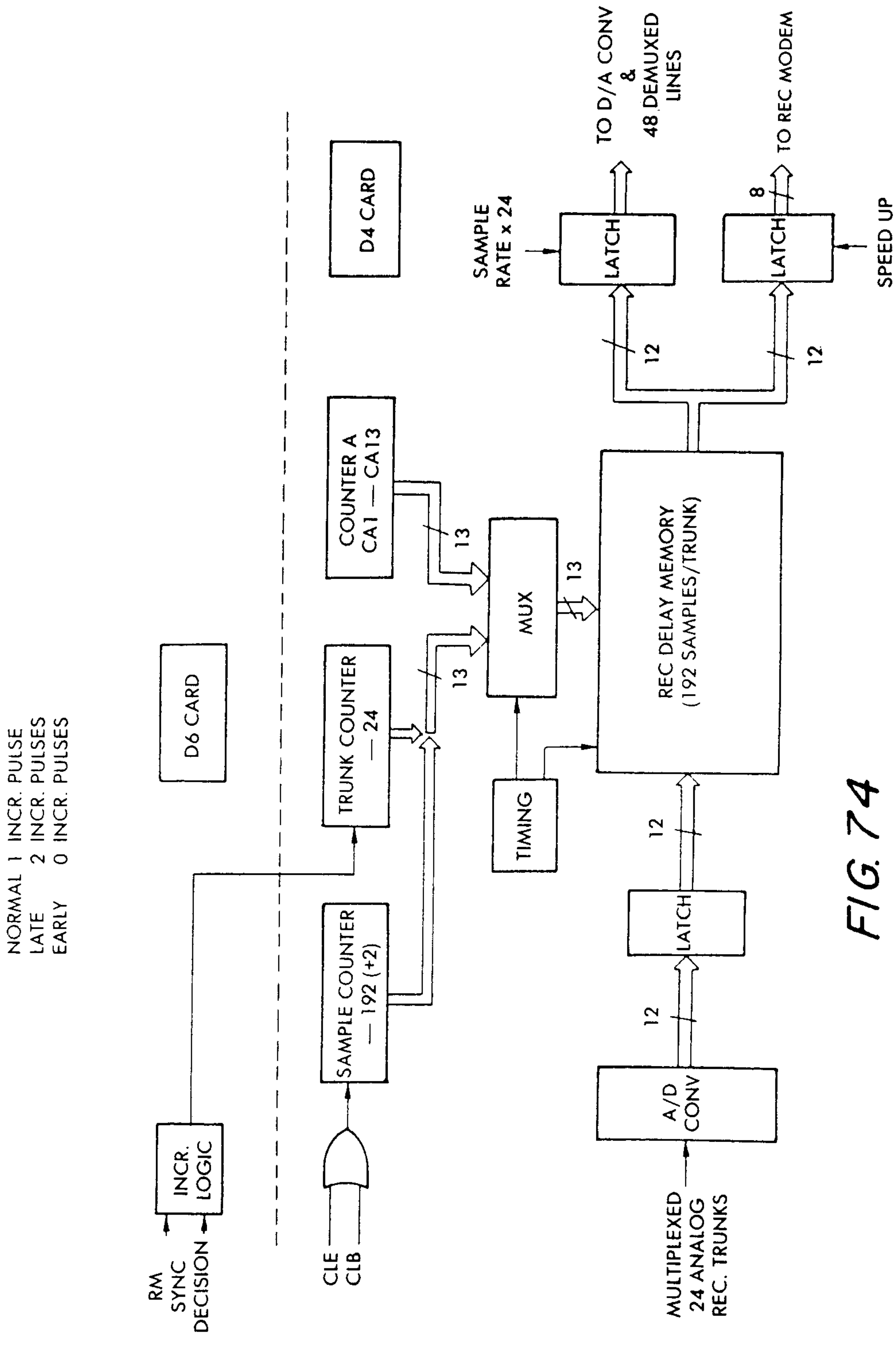
FIG. 74 is a block diagram of the receive delay memory.

The delay memory and the speed up counter and timing circuitry 1162 and 1166 associated therewith are illustrated in FIGS. 72 and 73 which are detailed schematic drawings and FIG. 74 which is a schematic block diagram.

Figure 75A:
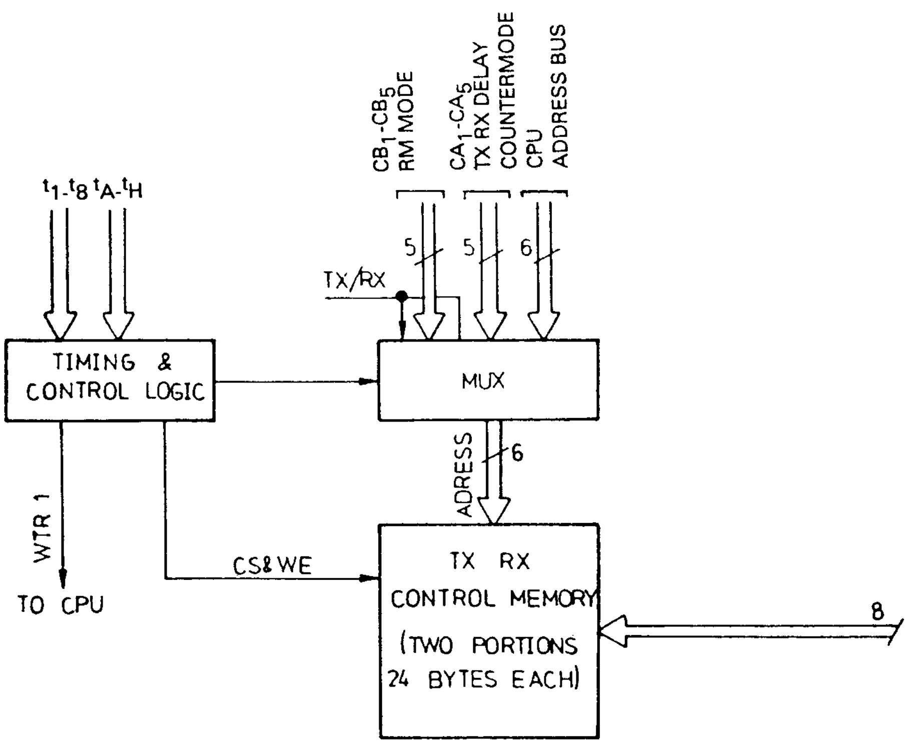
FIG. 75(*a* & *b*) is a block diagram of the control memory.
Figure 75B:
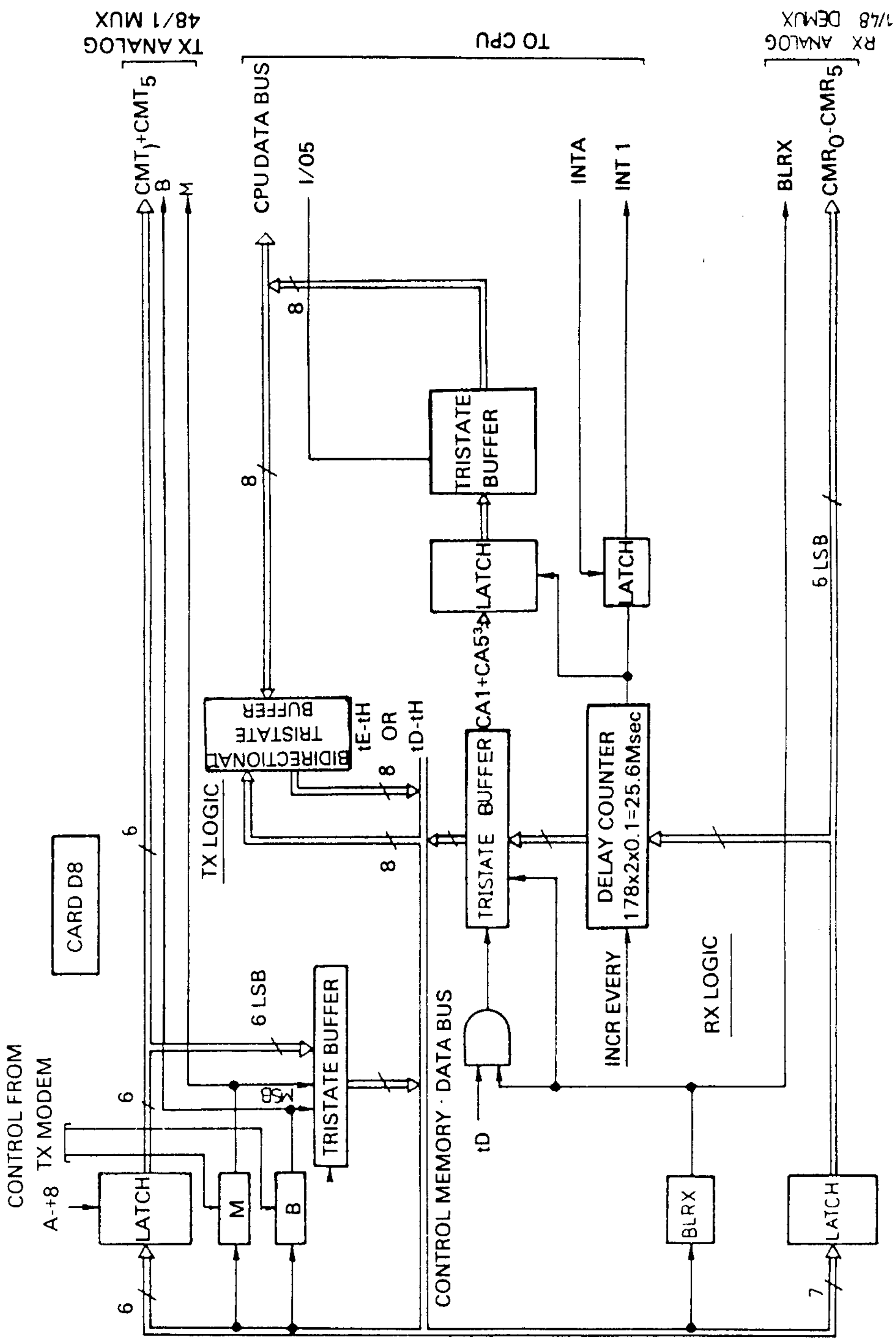
Figure 76A:
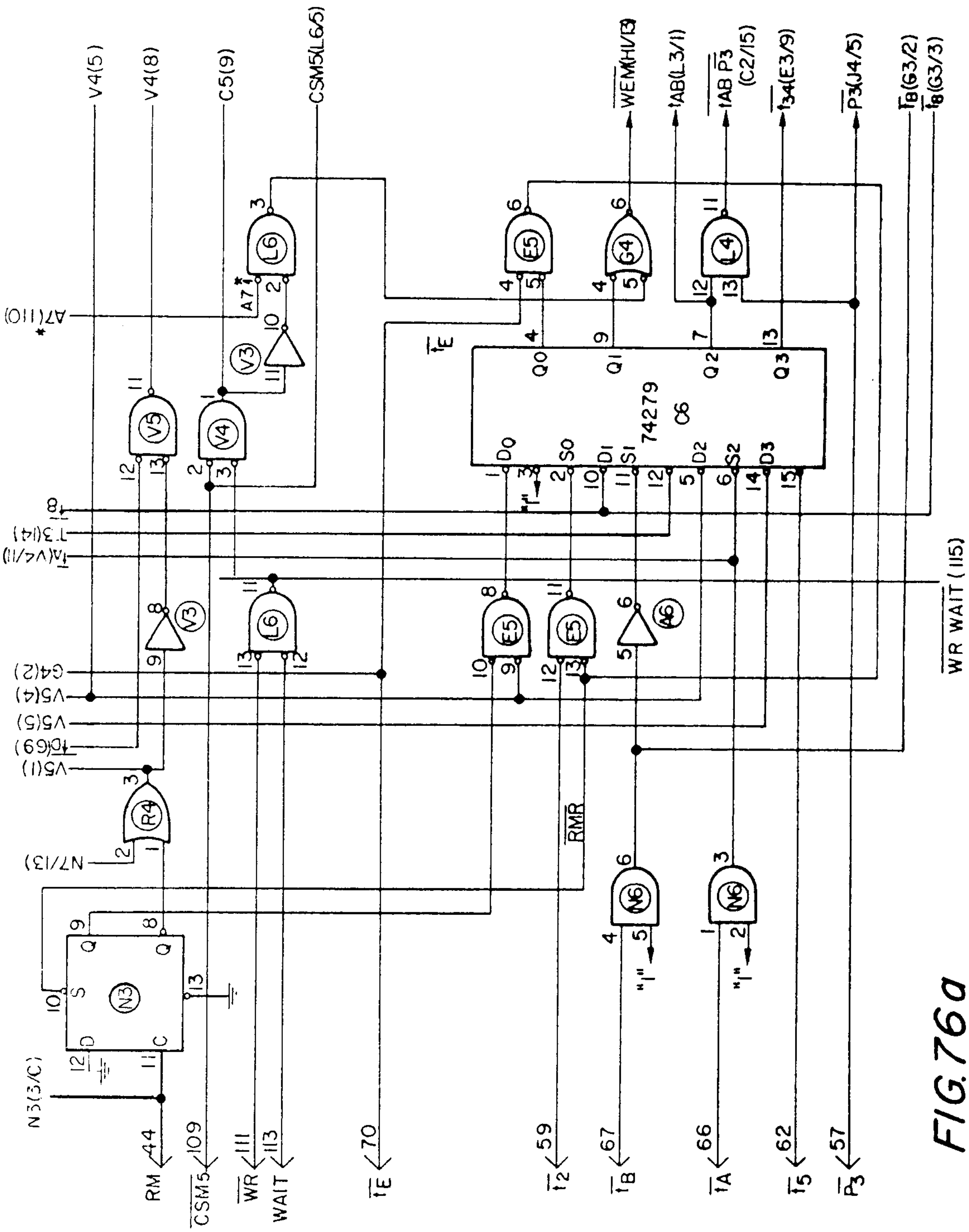
FIG. 76(*a* to *e*) is a schematic illustration of the control memory.
Figure 76B:
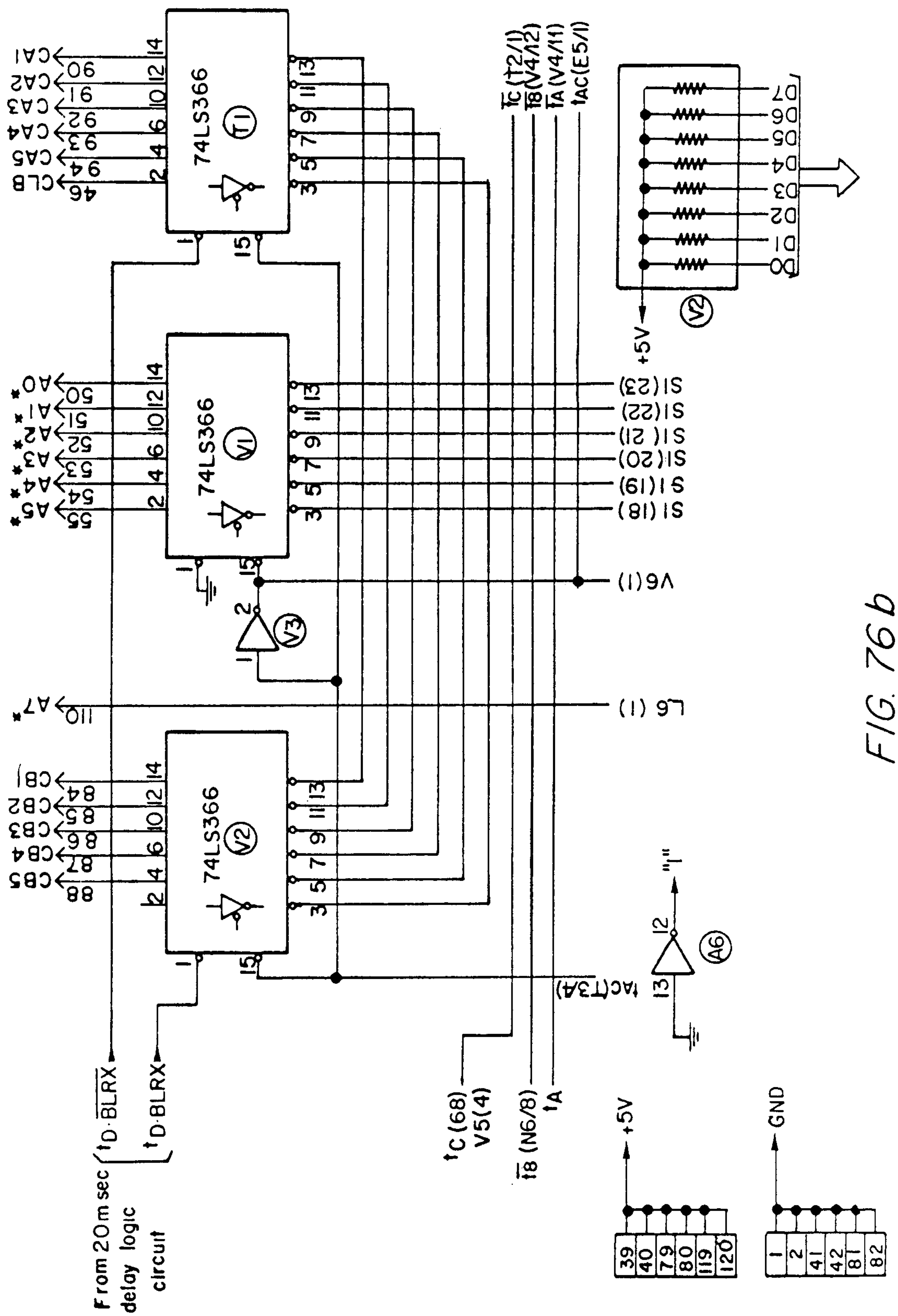
Figure 76C:
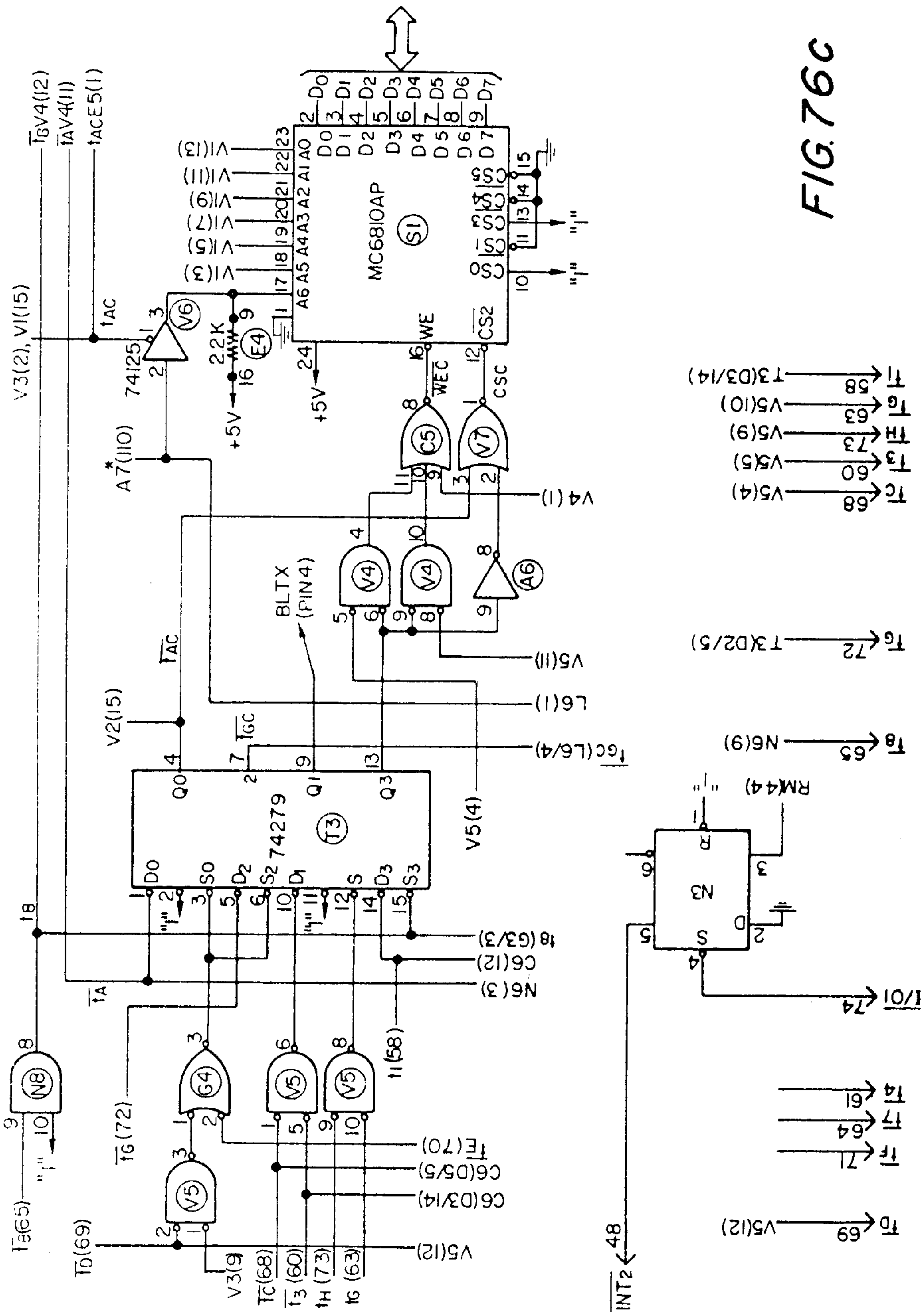
Figure 76D:
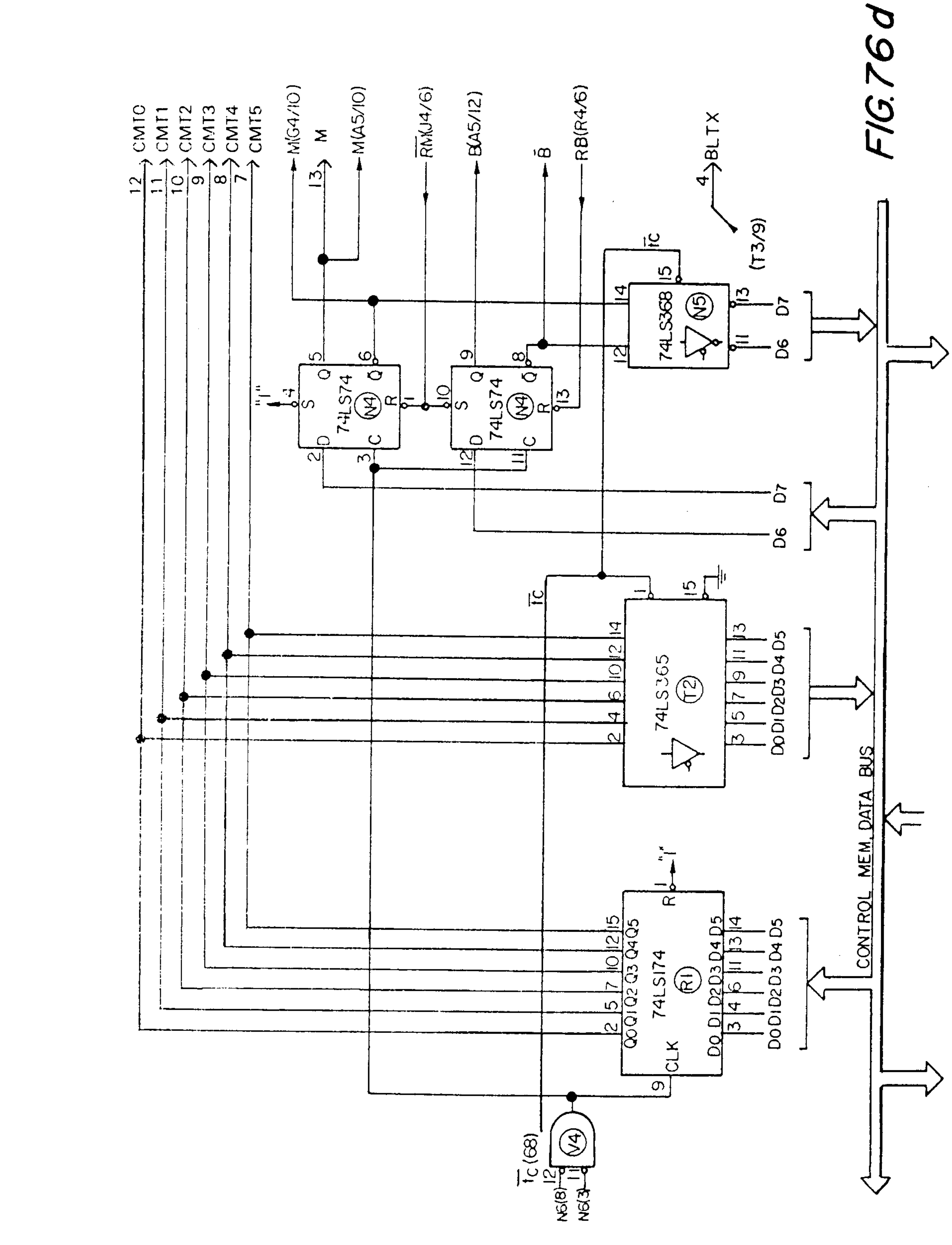
Figure 76E:
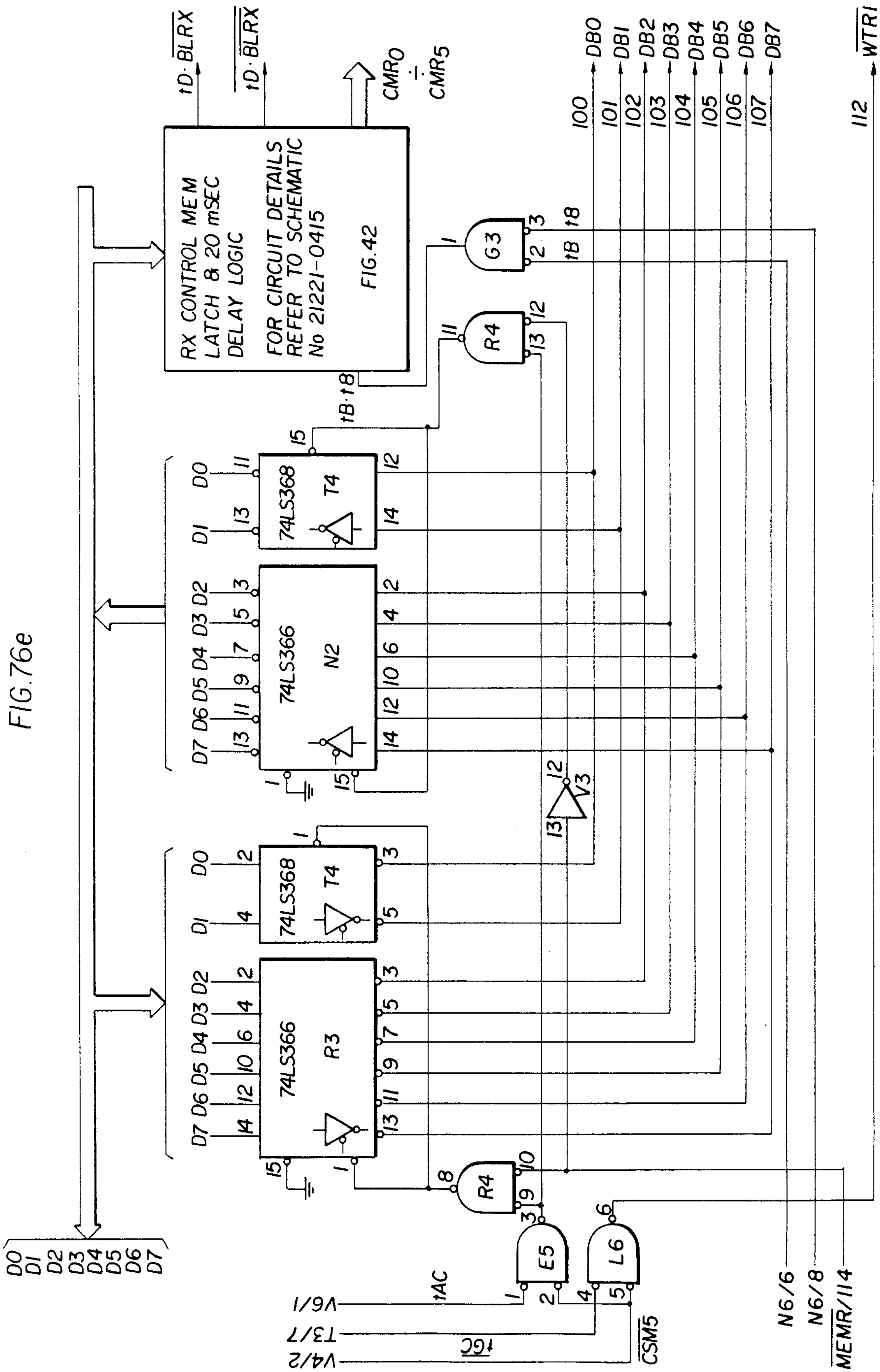

FIG. 75 is a schematic block diagram illustration of the control memory operative in both transmit and receive modes.

FIG. 76 is a detailed schematic illustration of the circuitry of control memory 1160 and control memory 1234, which includes control memory latch circuitry 1700.

Figure 77:
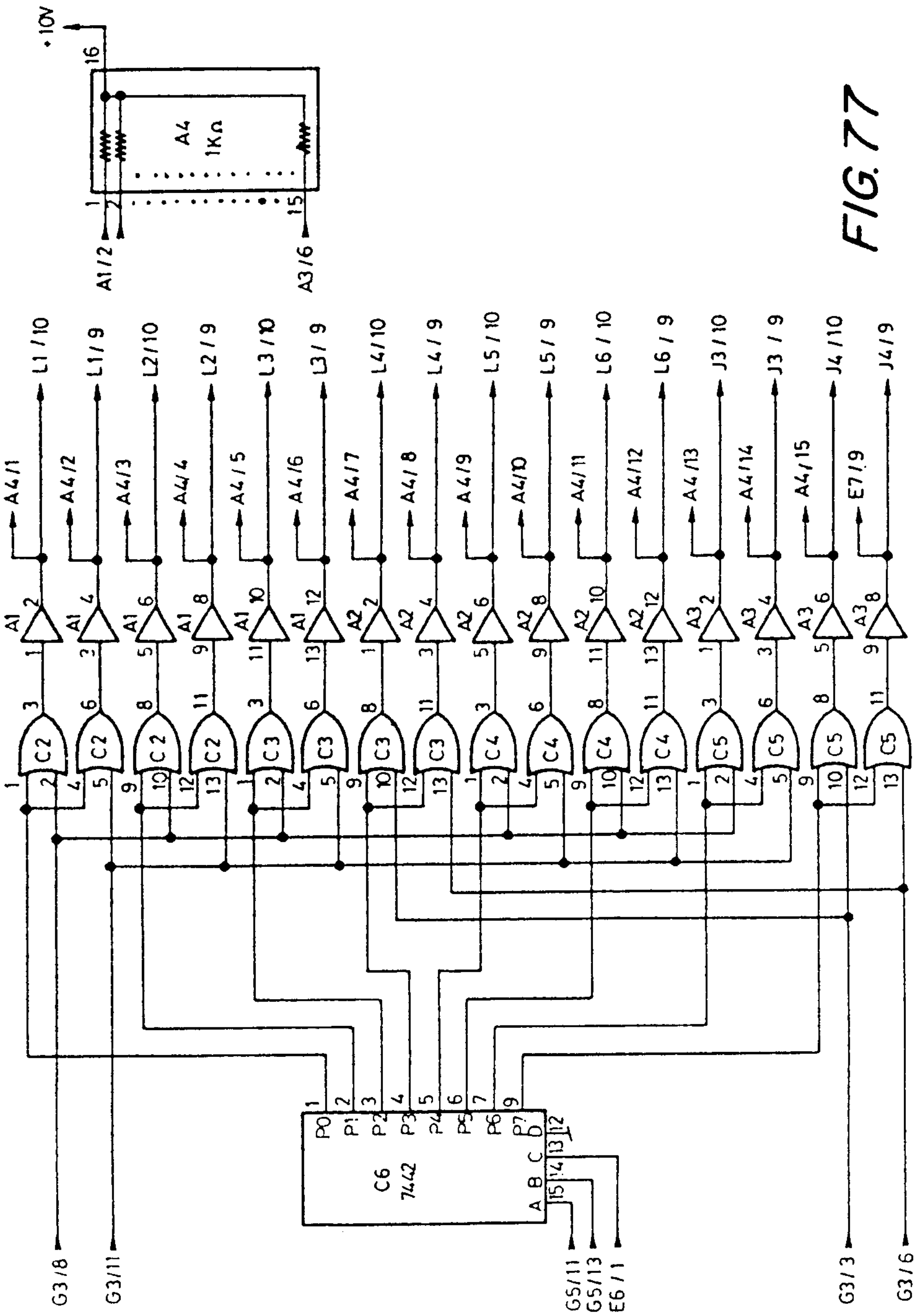
FIG. 77 is a schematic illustration of the multiplxer.

FIG. 77 is a schematic illustration of blanking circuitry which outputs to multiplexers 1228 for blanking thereof when not in use to prevent crosstalk therebetween.

Figure 78A:
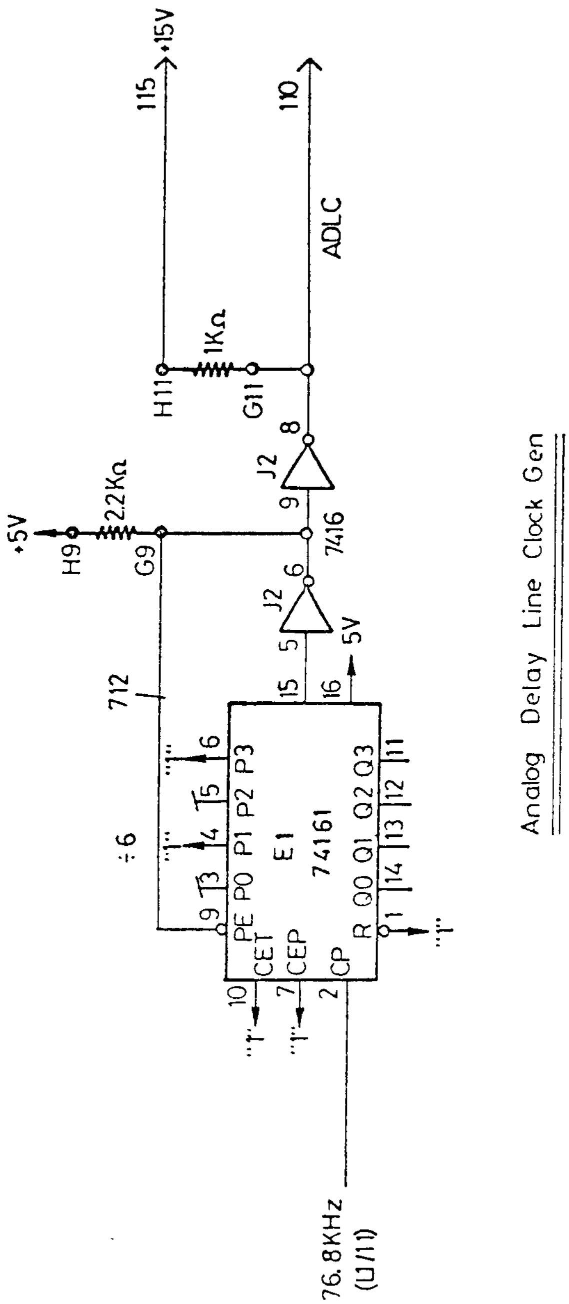
FIG. 78(*a* & *b*) is a schematic illustration of modem receiver and other circuitry.
Figure 79A:
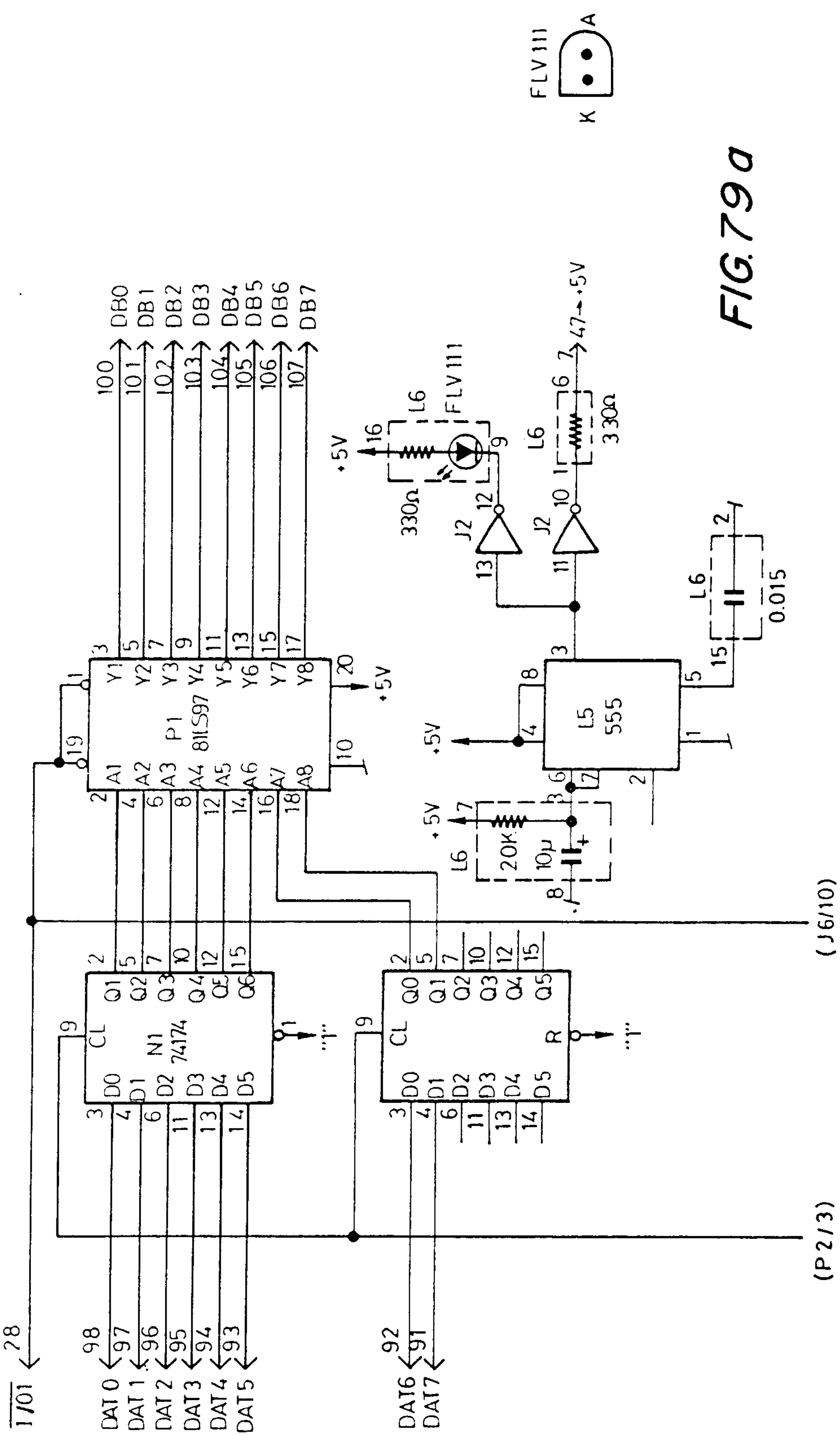
FIG. 79(*a* & *b*) is a schematic illustration of LED display circuitry.
Figure 79B:
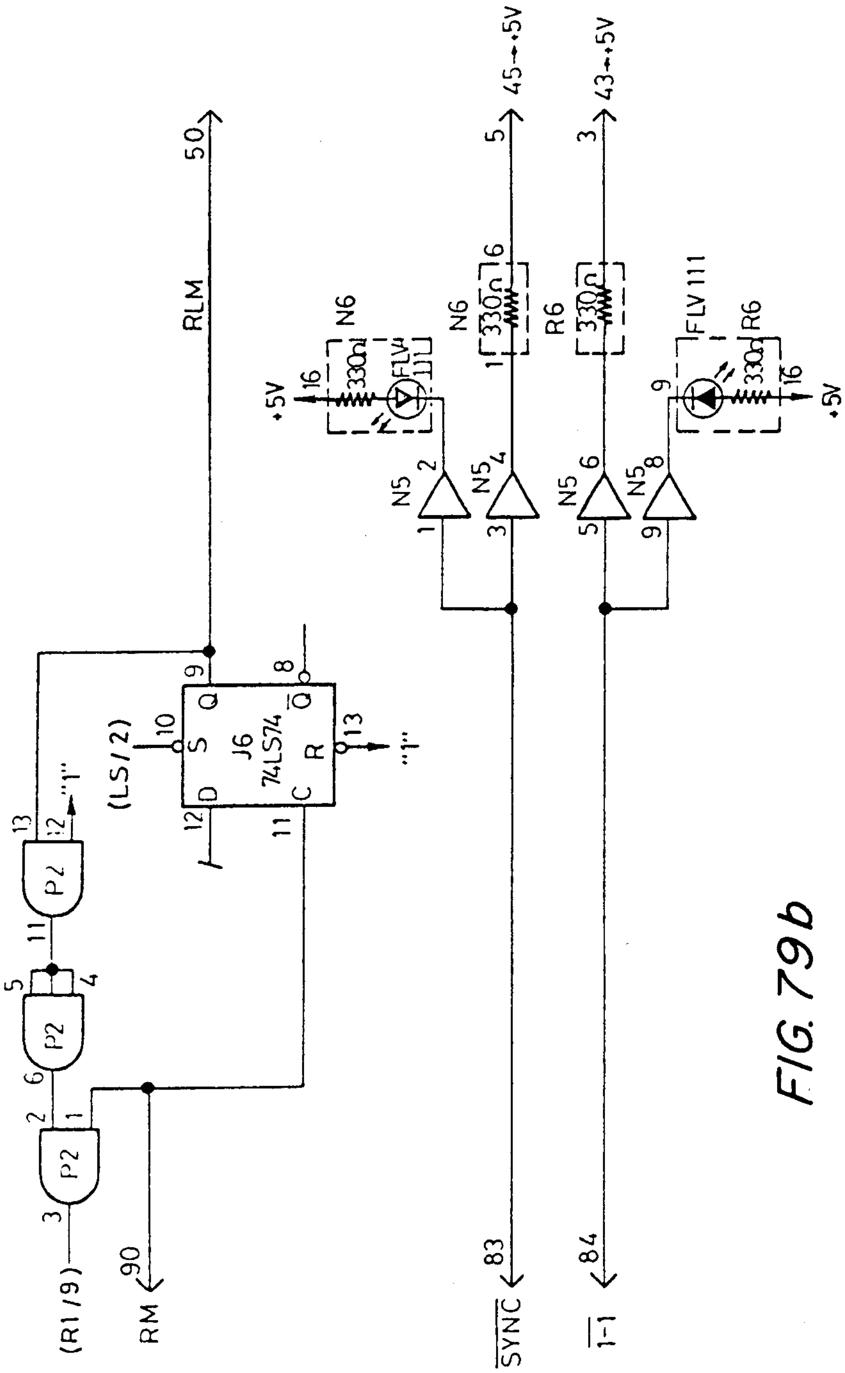

FIG. 78 illustrates a clock 1712 governing operation of delay line (1140 FIG. 54) and and a timer 1714 which operates part of the software in the CPU, and main oscillator 1716. FIG. 79.

FIG. 79 is a detailed schematic illustration of latch 1604 of the Receiver Modem circuitry illustrated in FIG. 71.

Figure 80A:
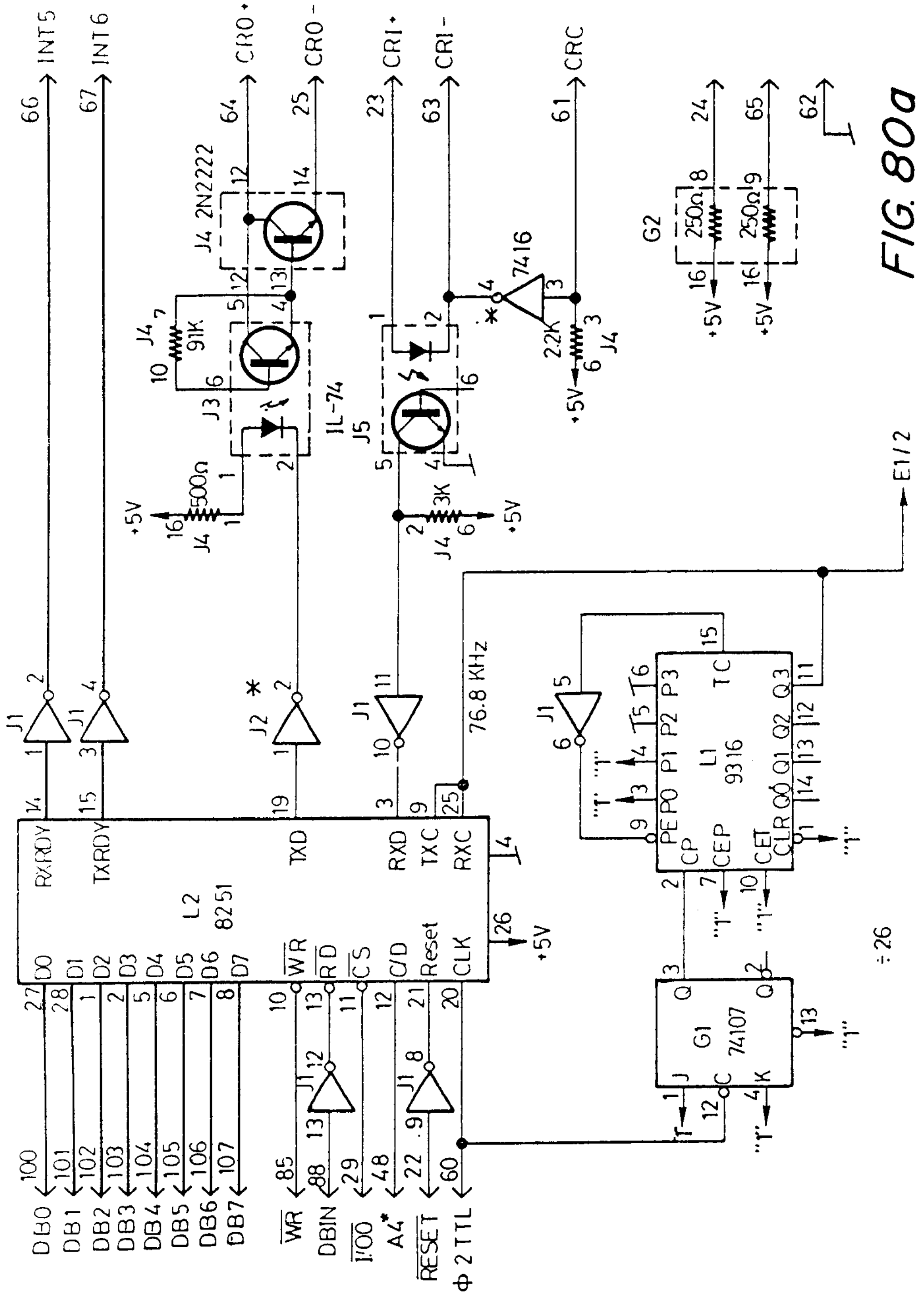
FIG. 80(*a* & *b*) is a schematic illustration of CRT interface circuitry.
Figure 80B:
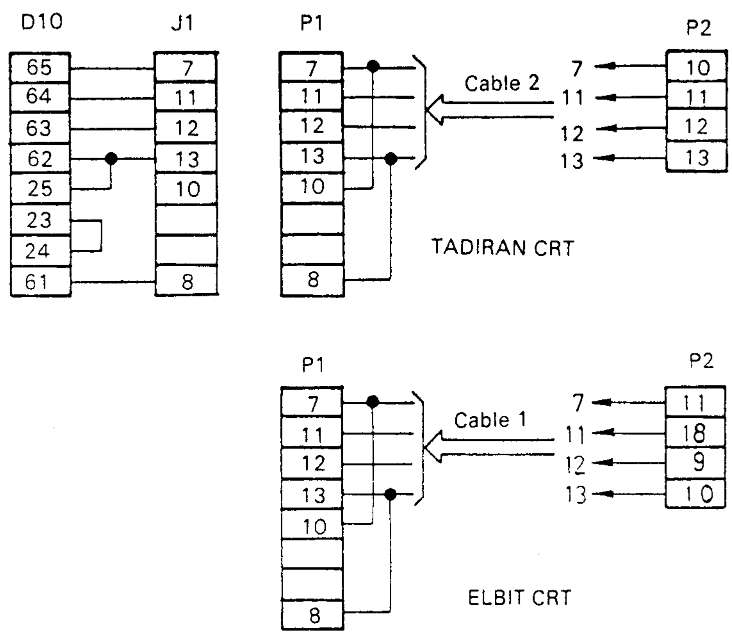

FIG. 80 illustrates a display interface for a CRT display.

Figure 81:
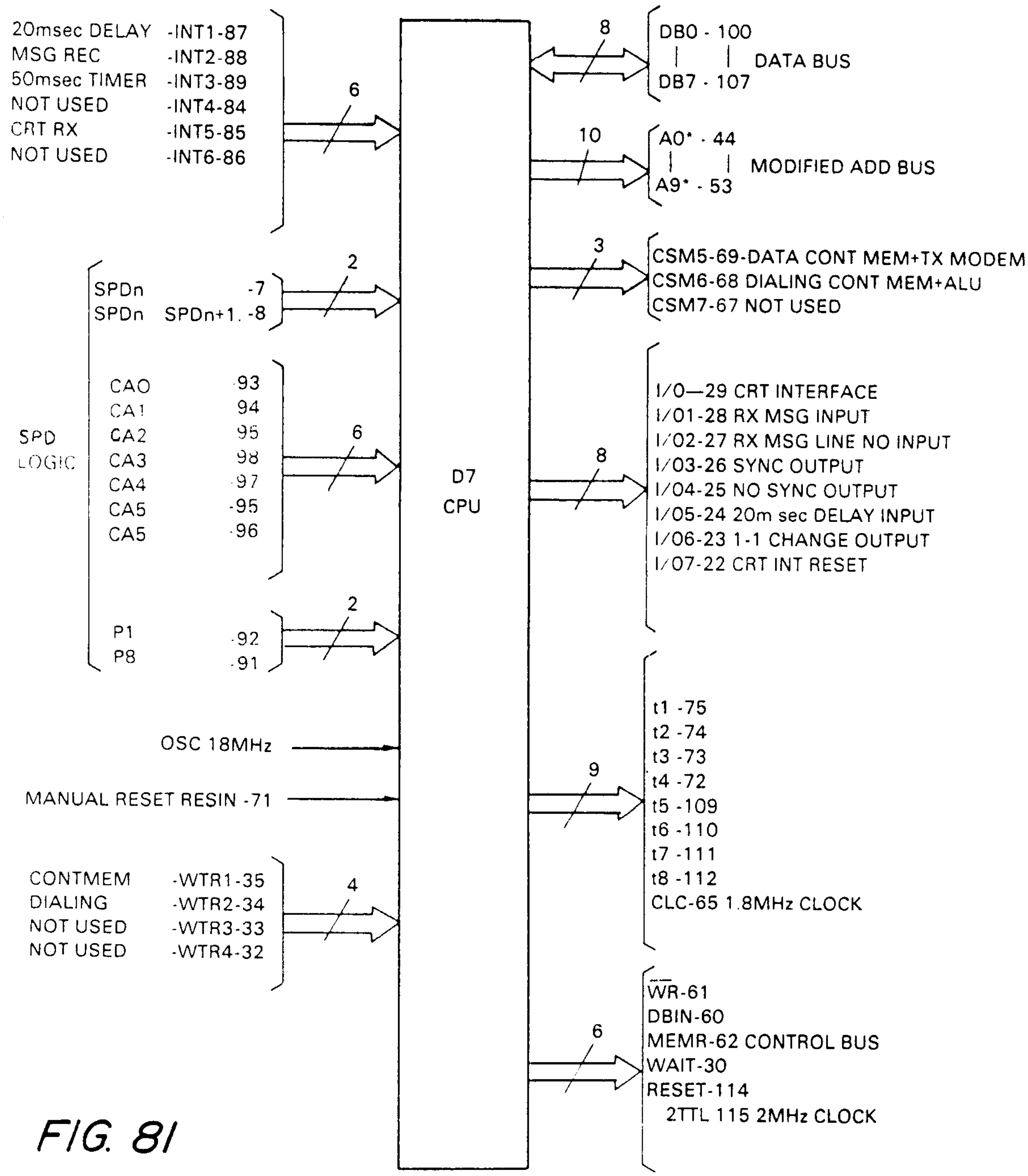
FIG. 81 is a block diagram illustrating CPU functions.
Figure 82A:
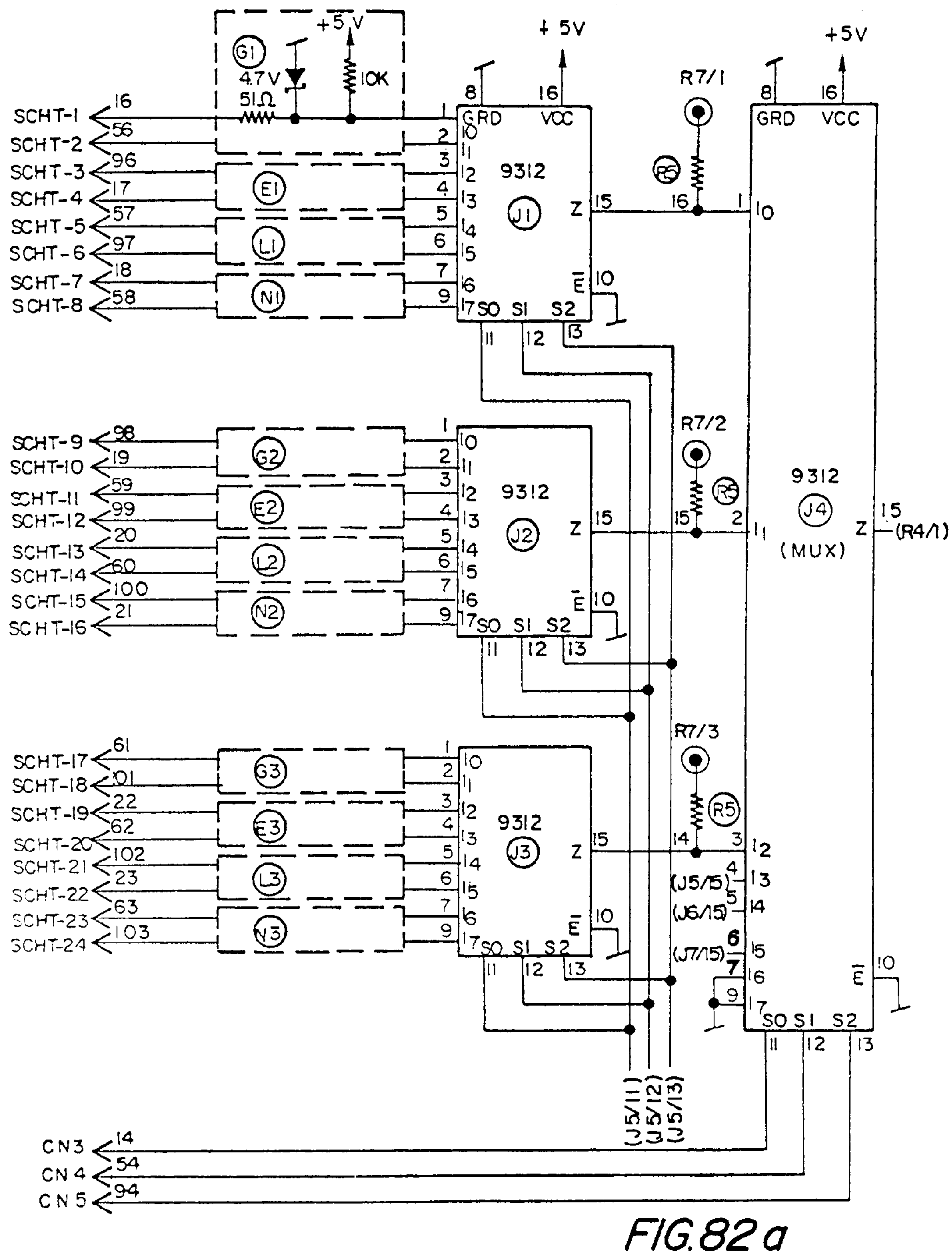
FIG. 82(*a* to *d*) is a schematic illustration of transmit signalling circuitry.
Figure 82B:
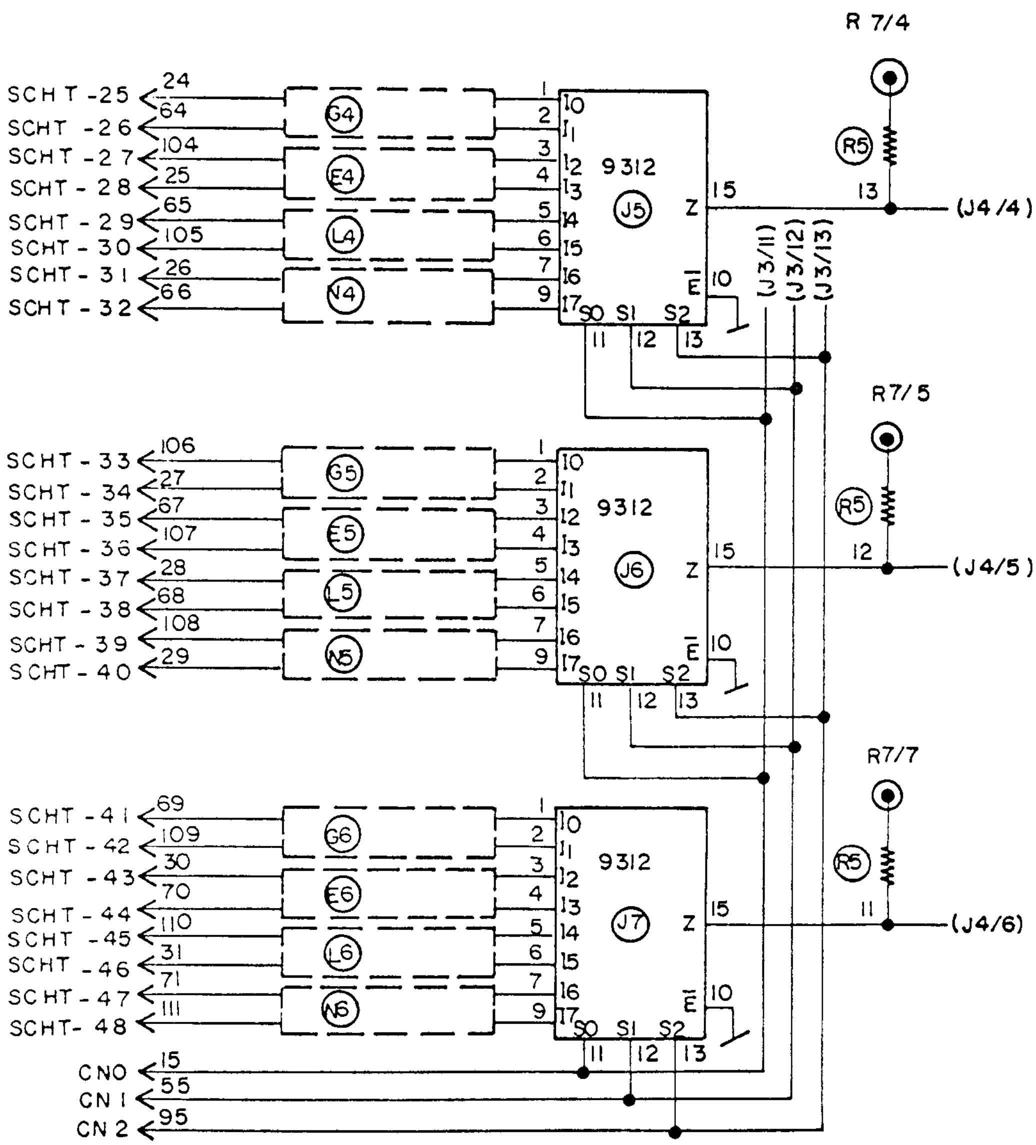
Figure 82C:
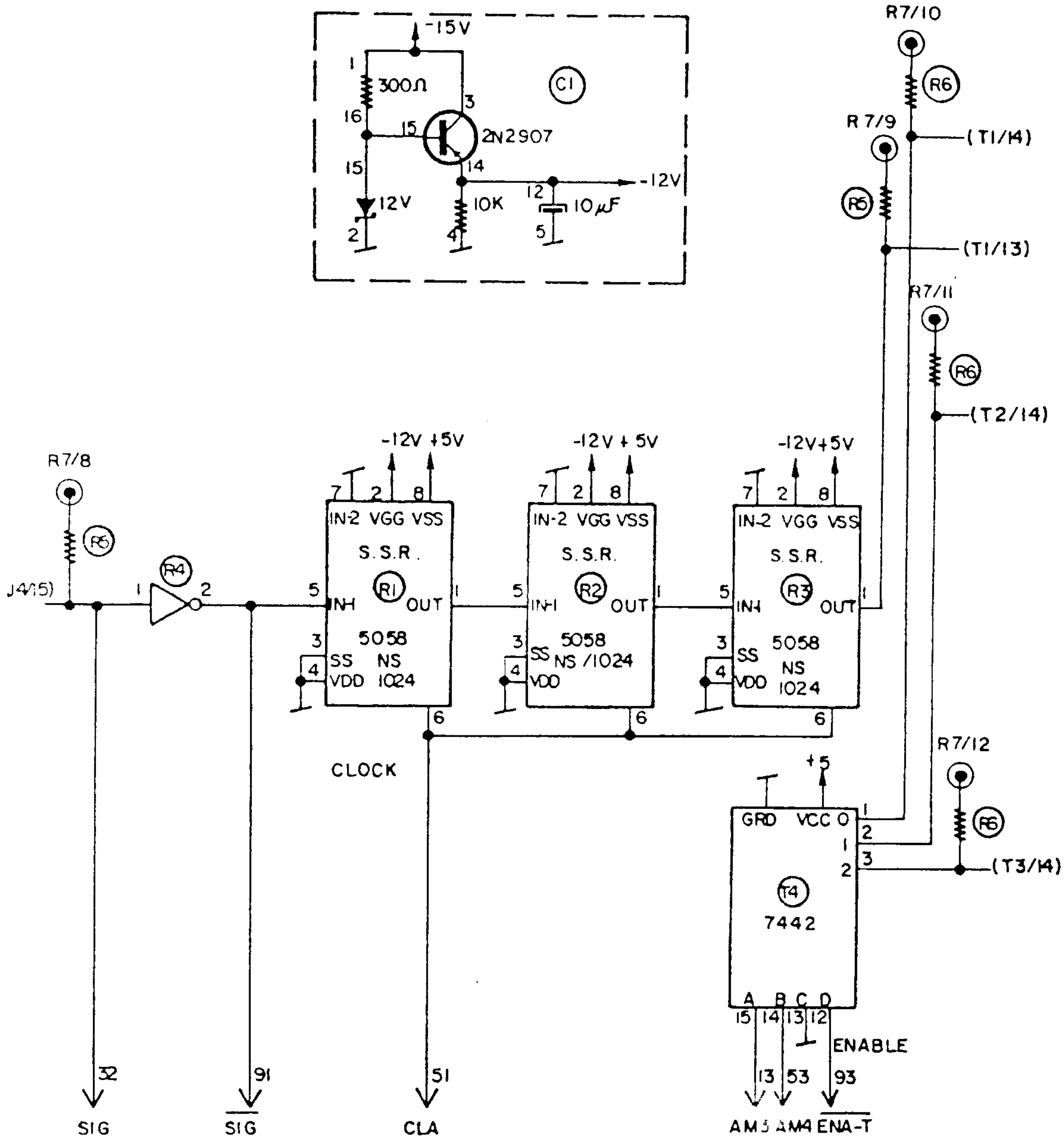
Figure 82D:
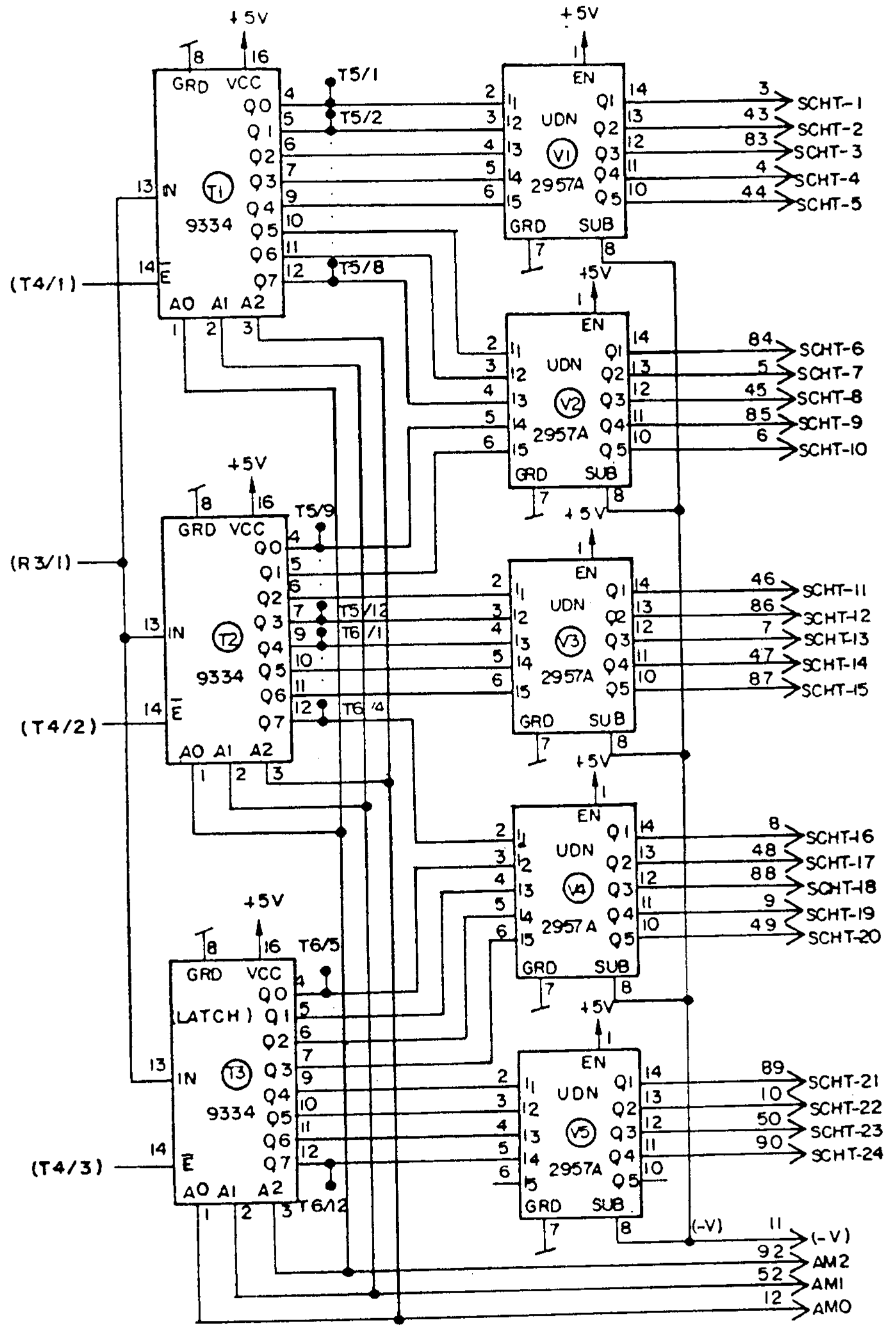
Figure 83A:
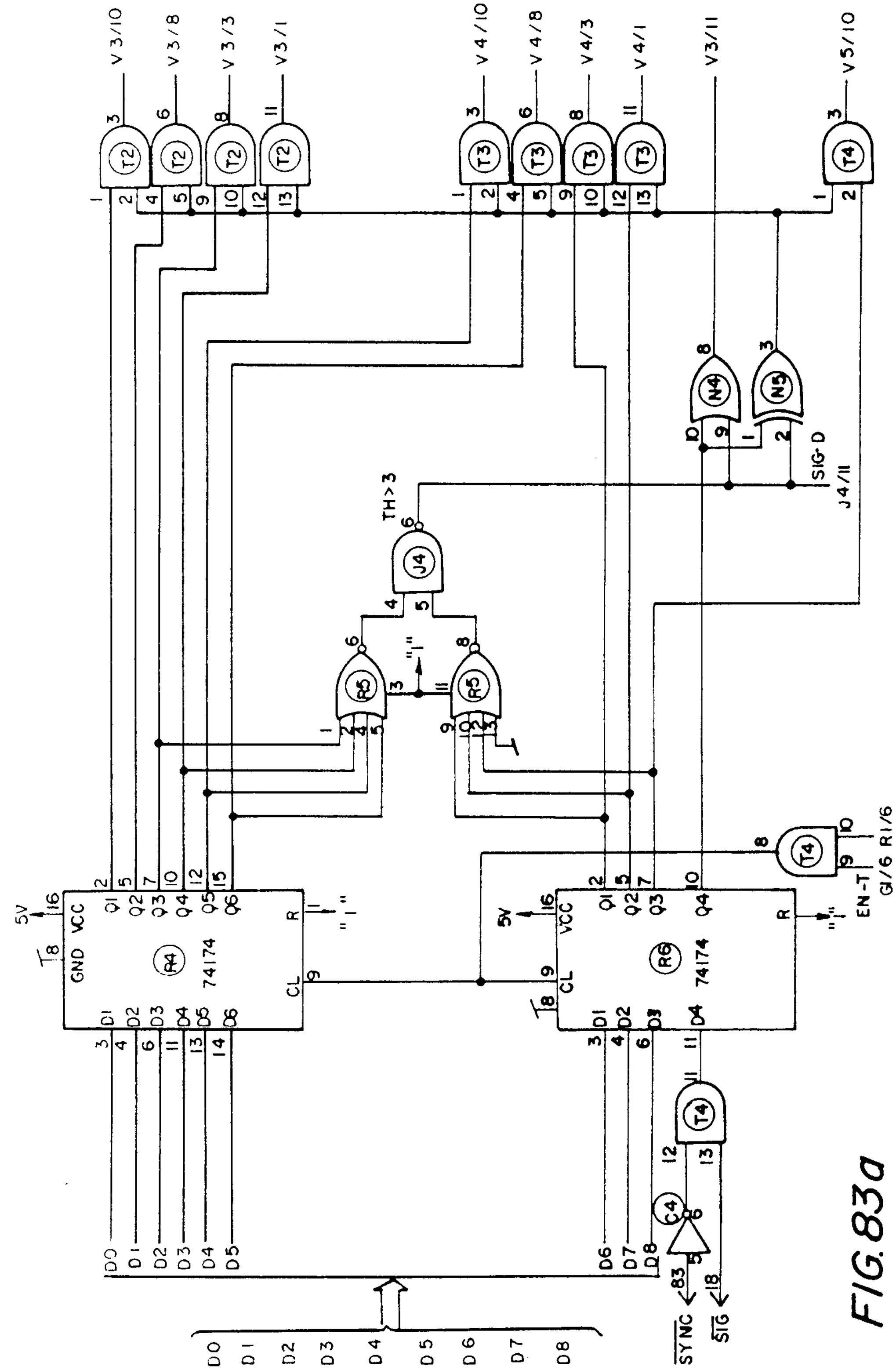
FIG. 83(*a* to *f*) is a schematic illustration of signalling control circuitry.
Figure 83B:
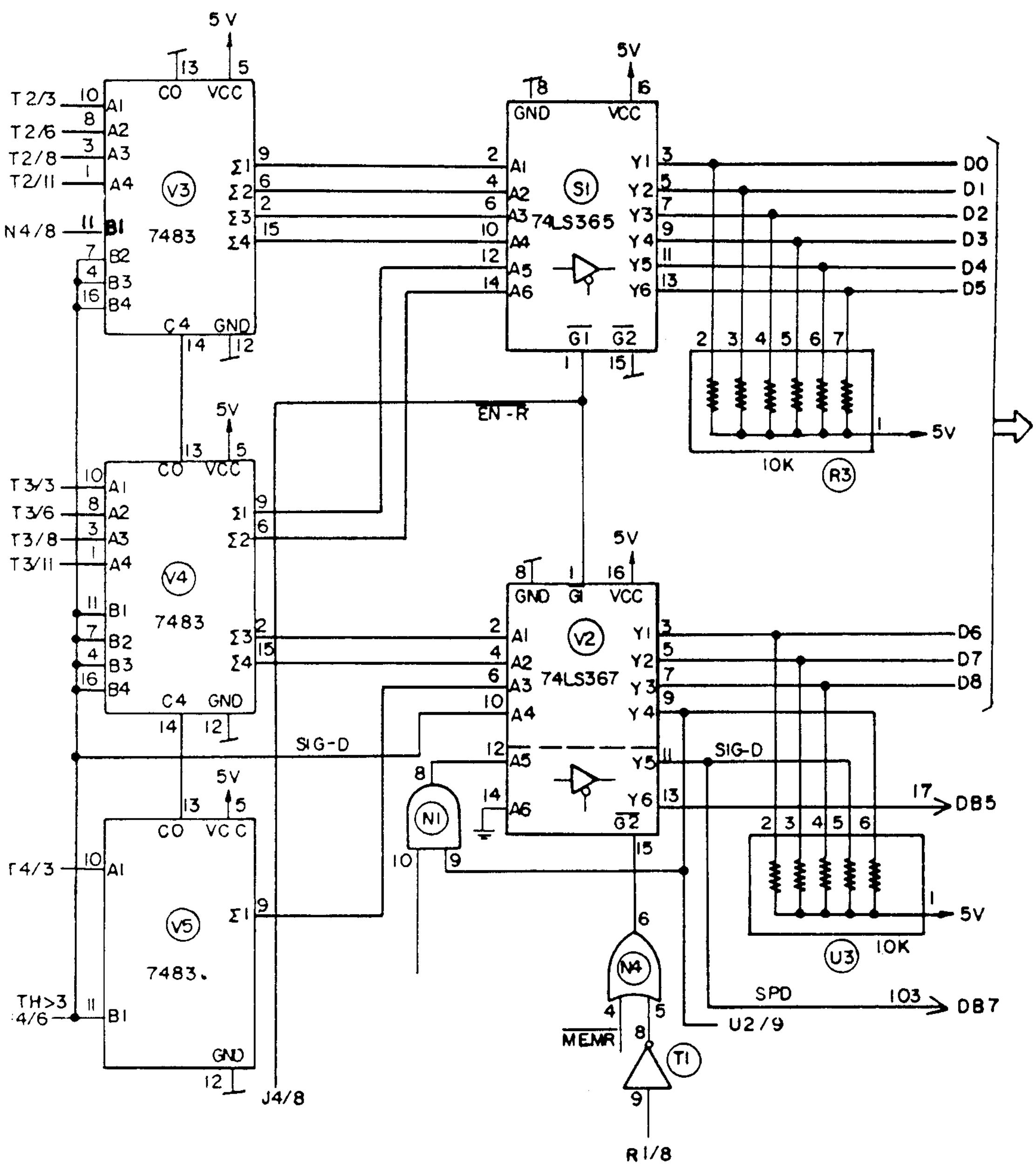
Figure 83C:
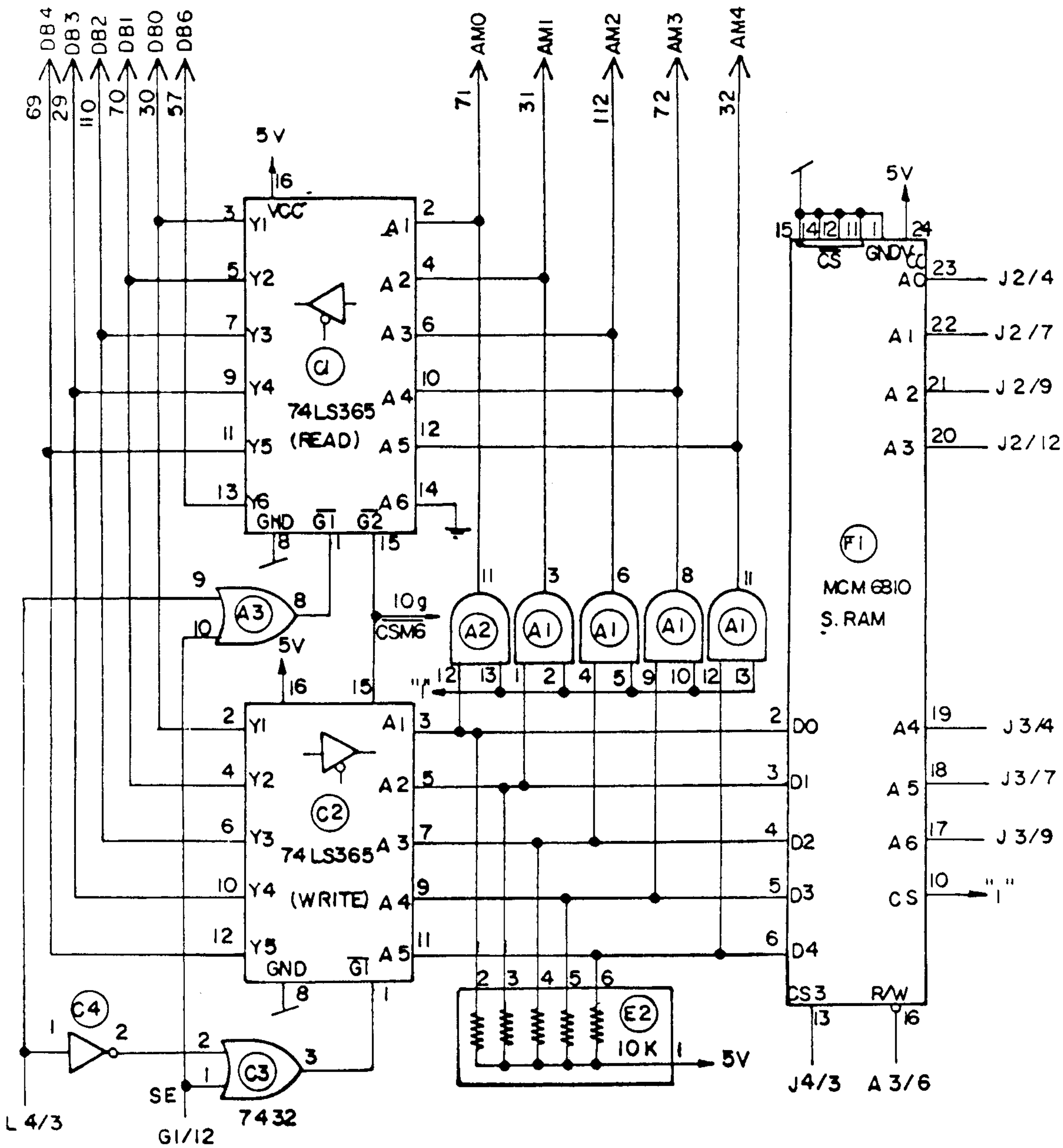
Figure 83D:
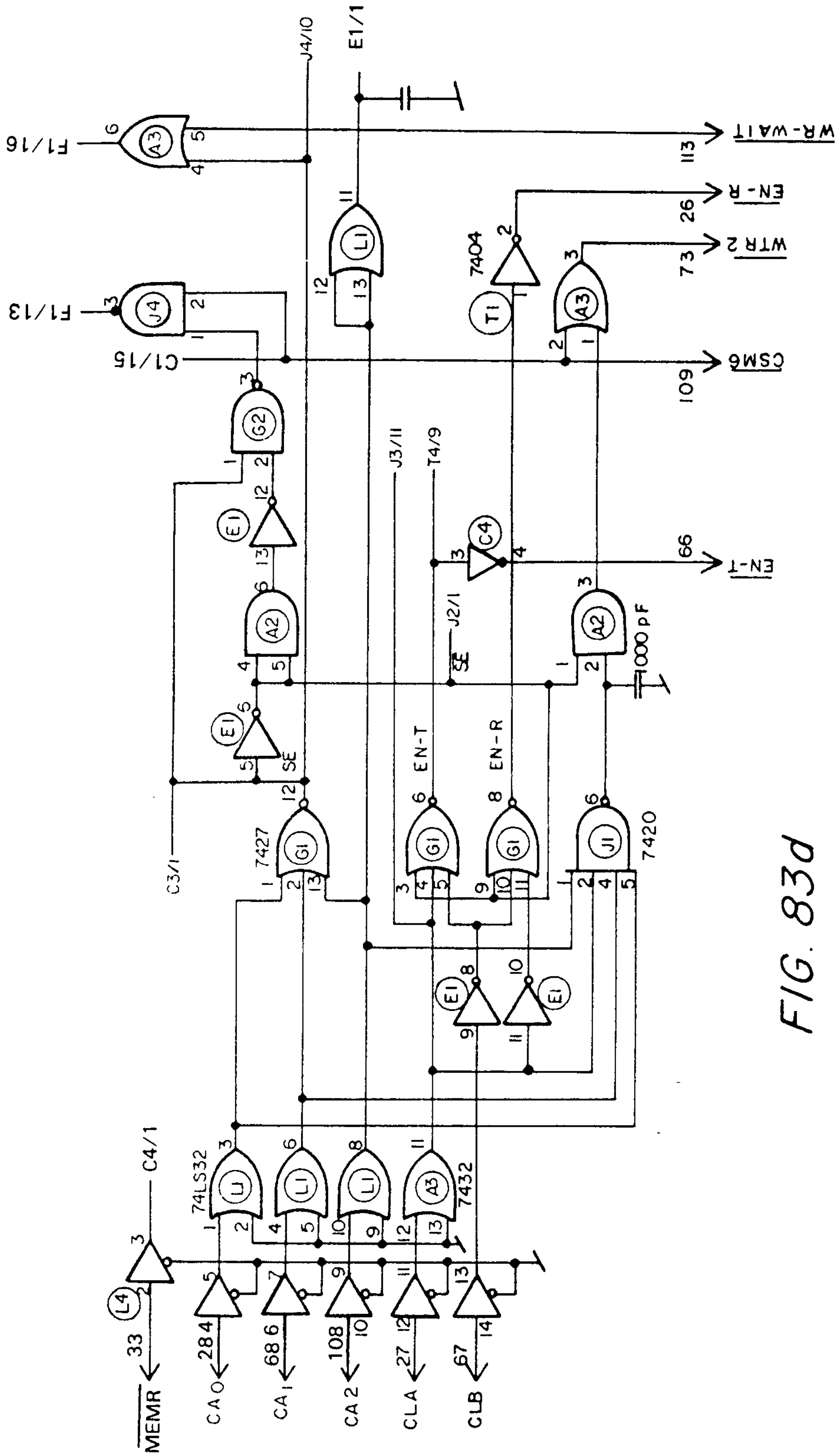
Figure 83E:
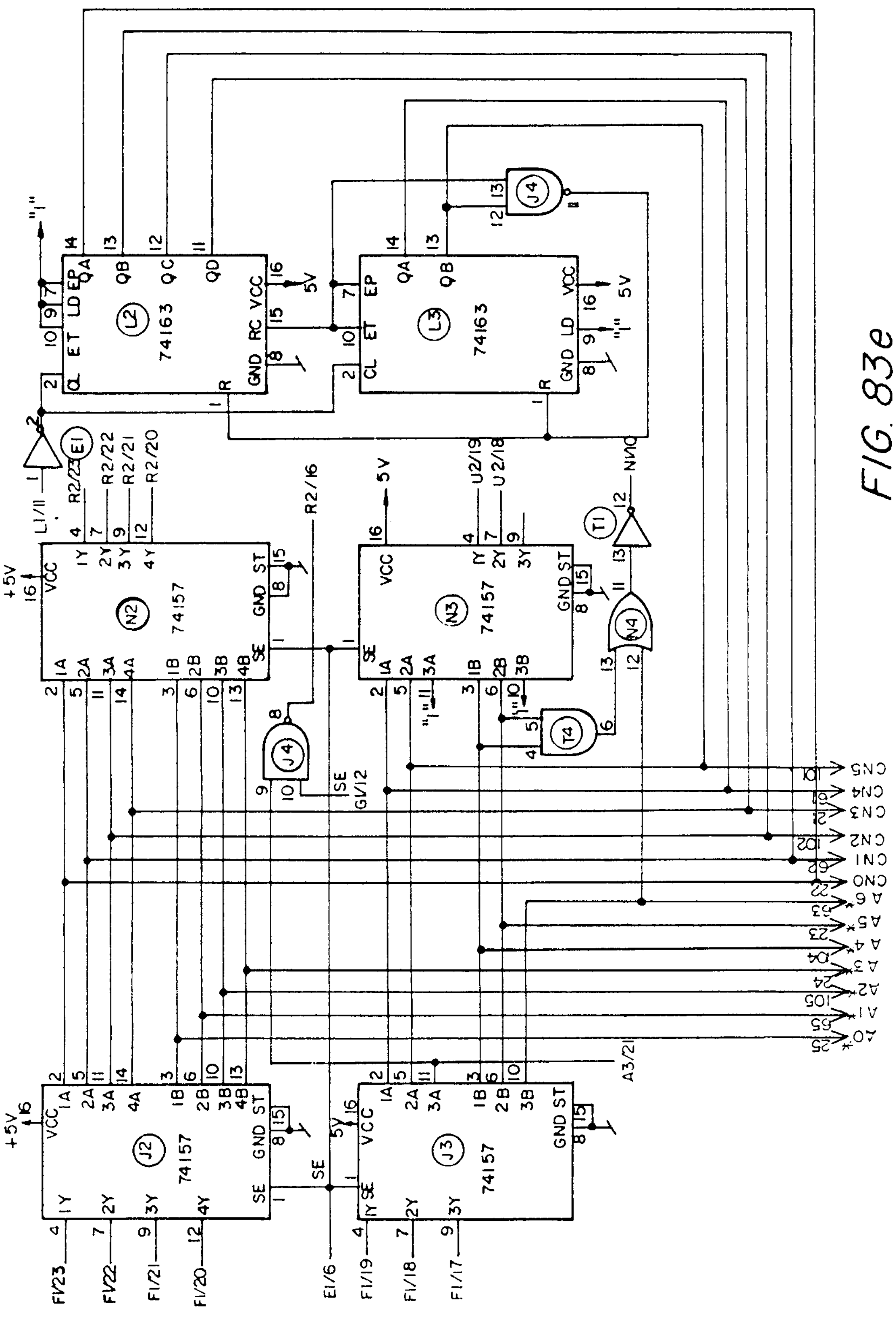
Figure 83F:
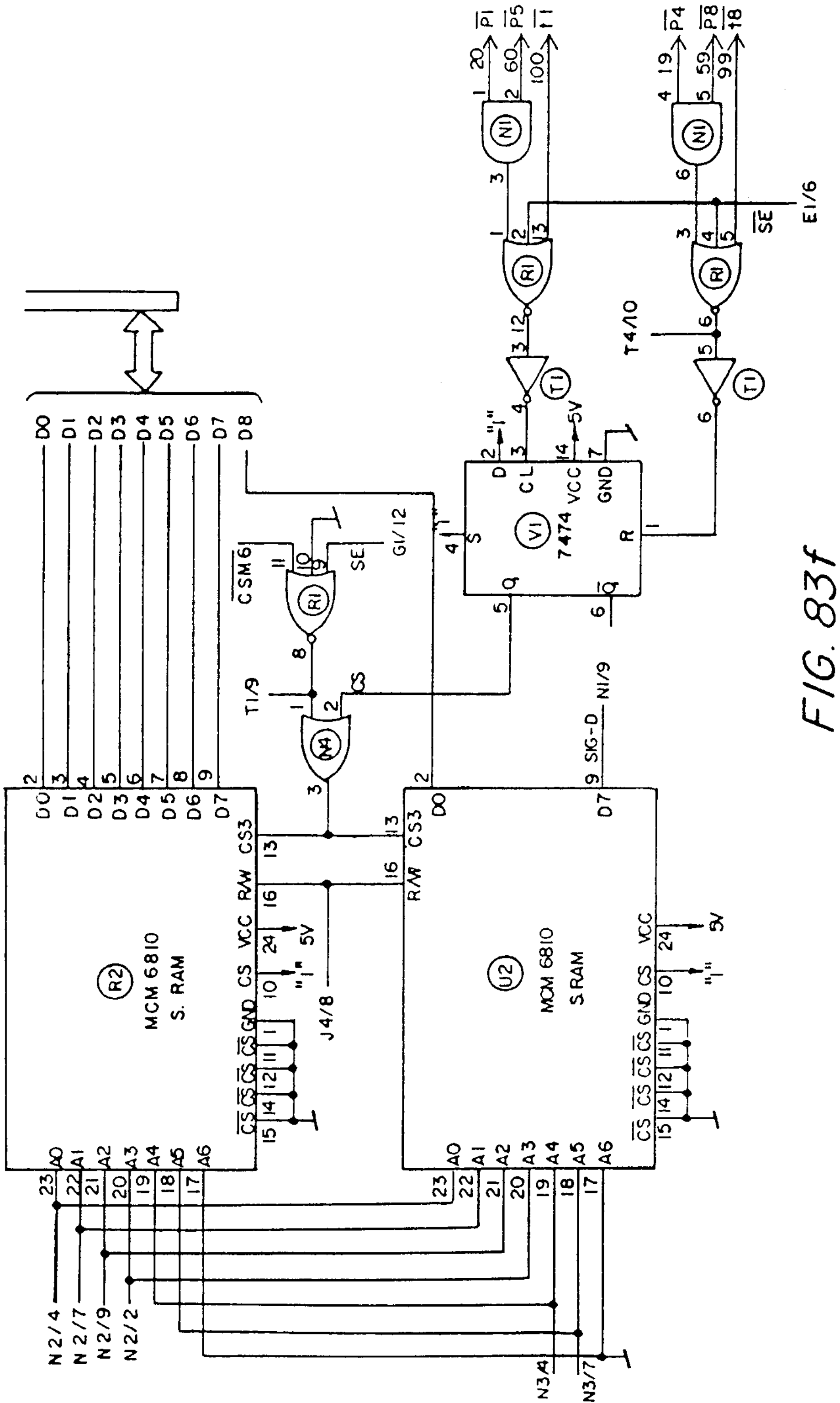
Figure 84A:
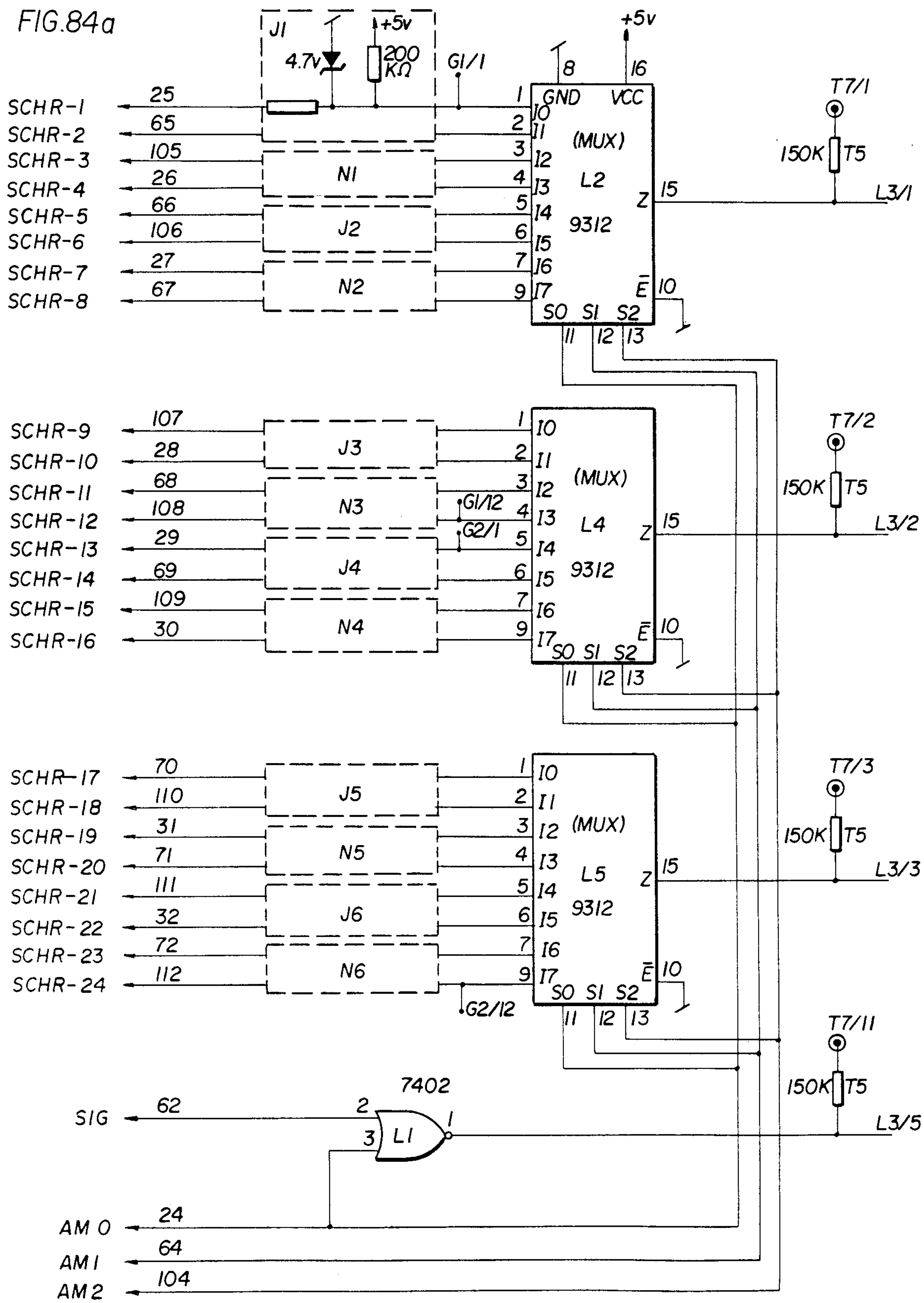
FIG. 84(*a* to *d*) is a schematic illustration of receive signalling circuitry.
Figure 84B:
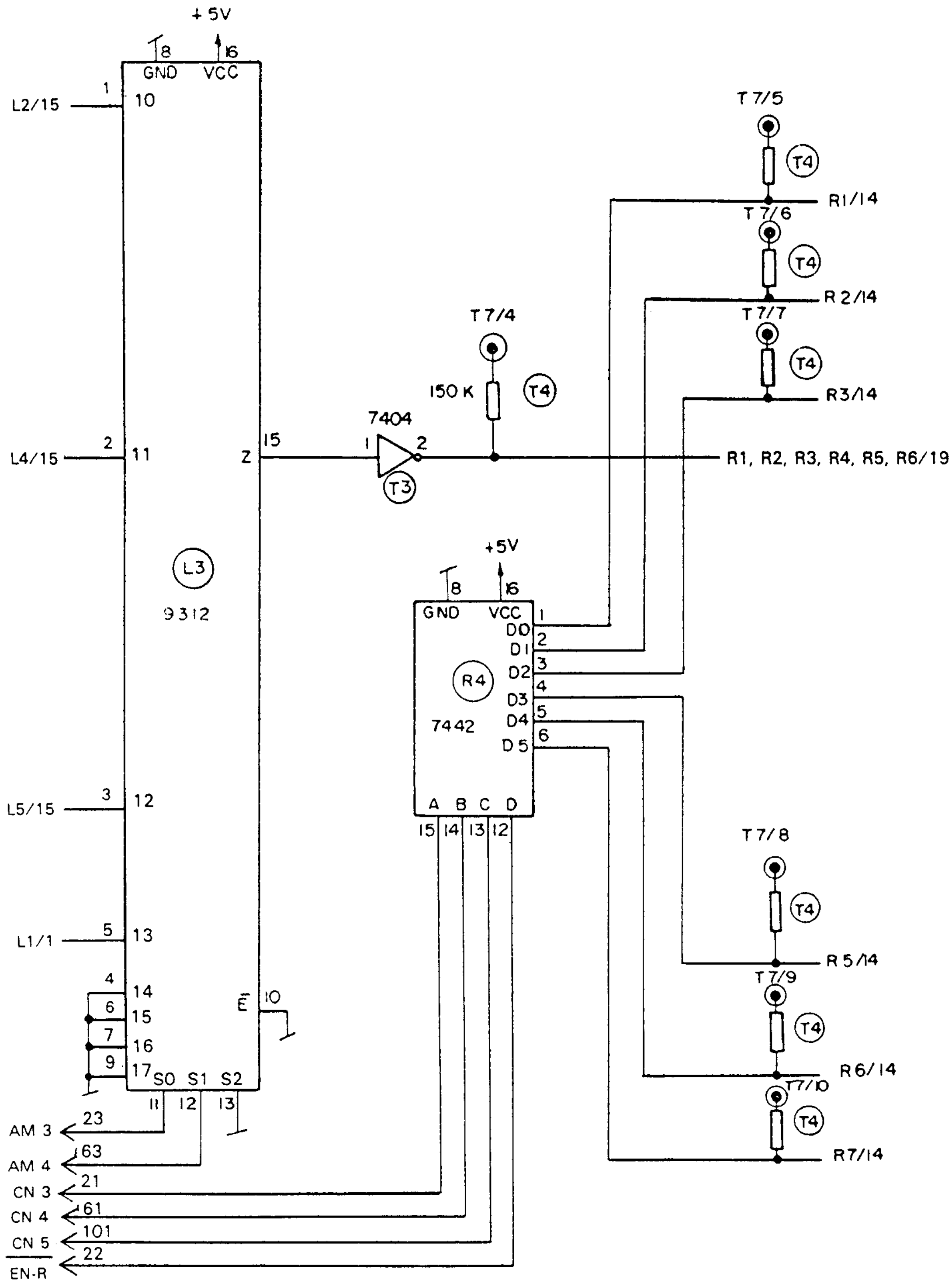
Figure 84C:
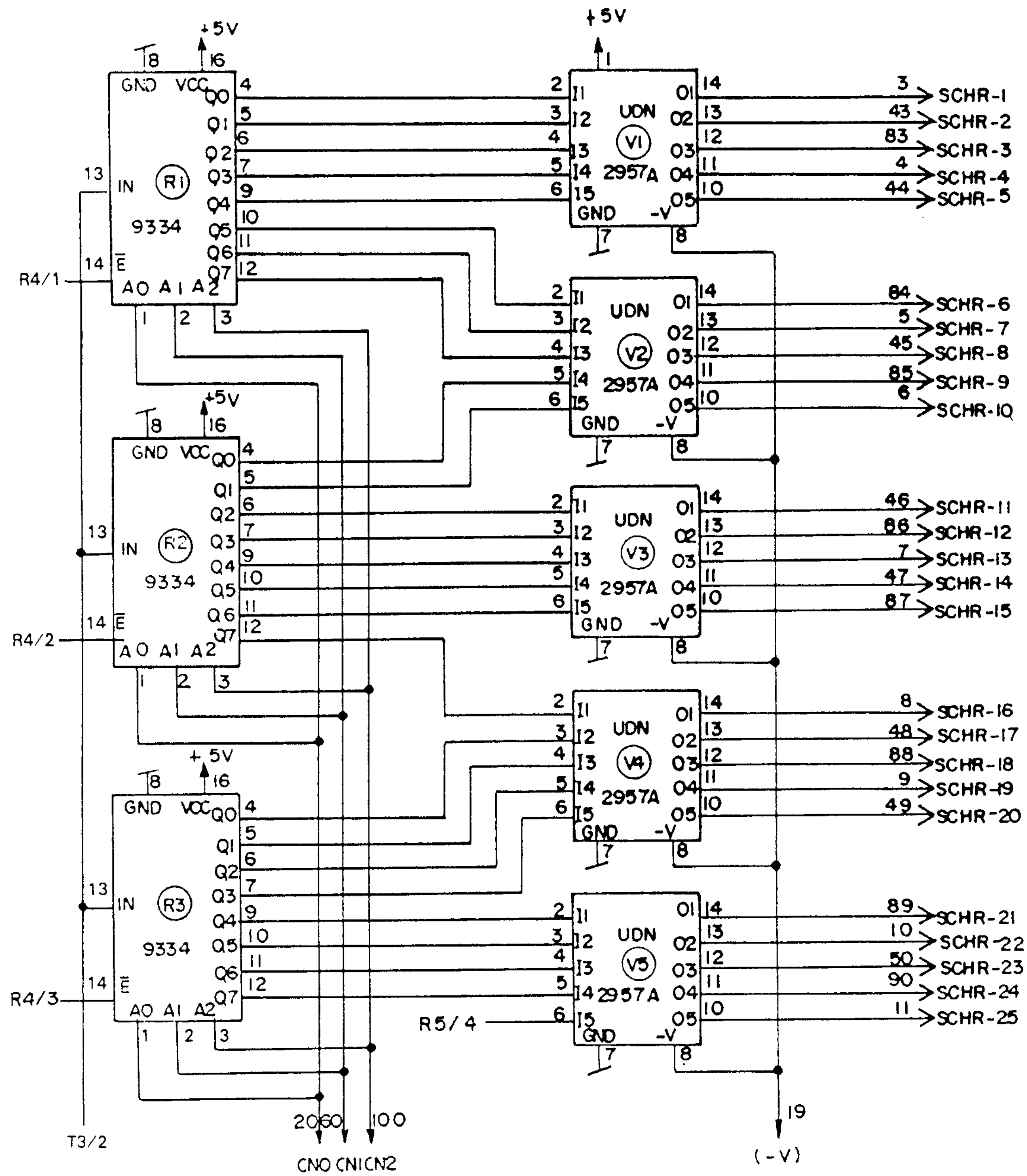
Figure 84D:
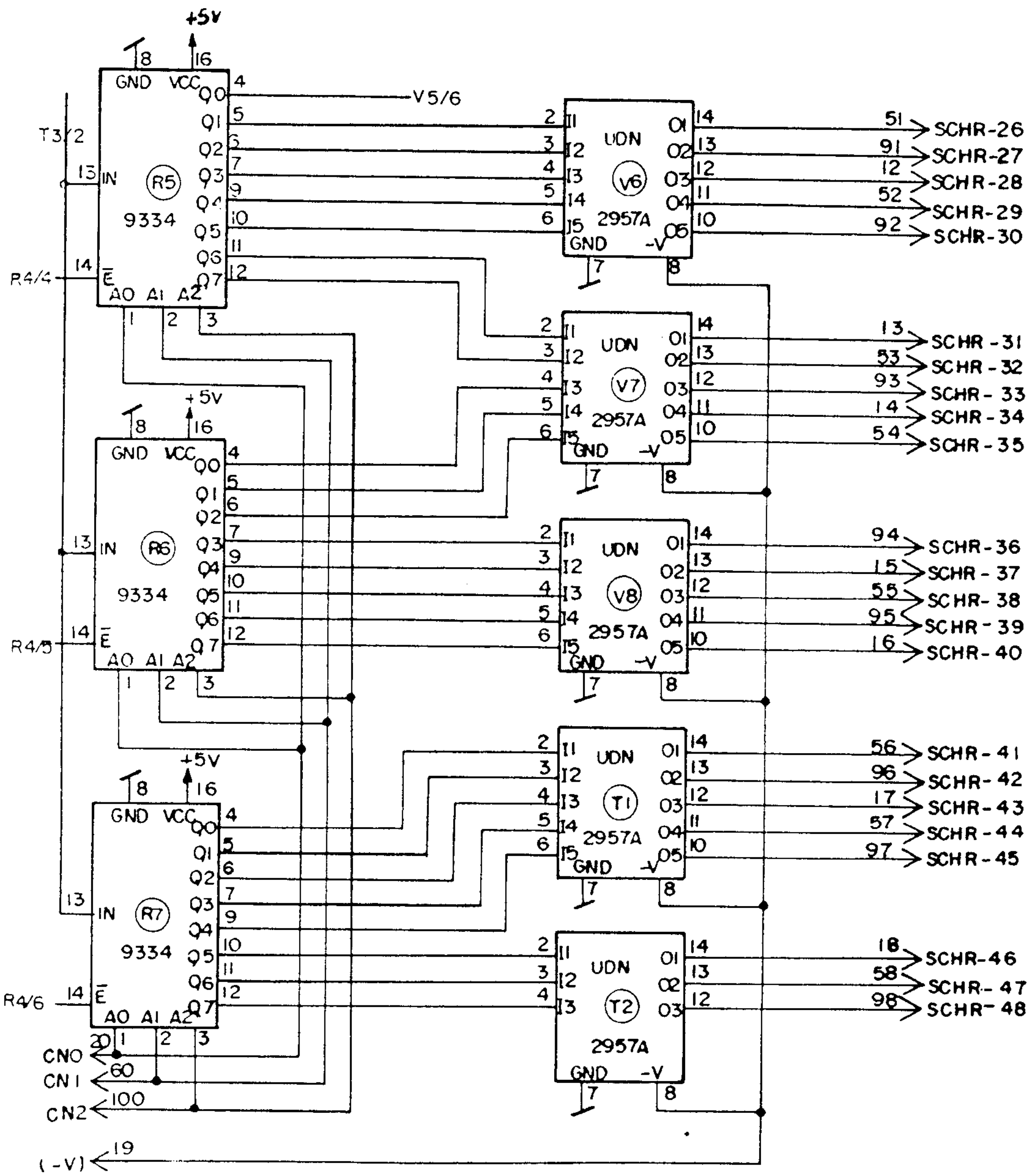

FIG. 81 is a function block diagram for CPU circuitry 1200 (FIG. 54).

FIGS. 82, 83 and 84 are detailed schematic diagrams of signalling transmission, control and receiving circuitry 1250, 1254 and 1252, illustrated generally in FIG. 55.

Figure 85:
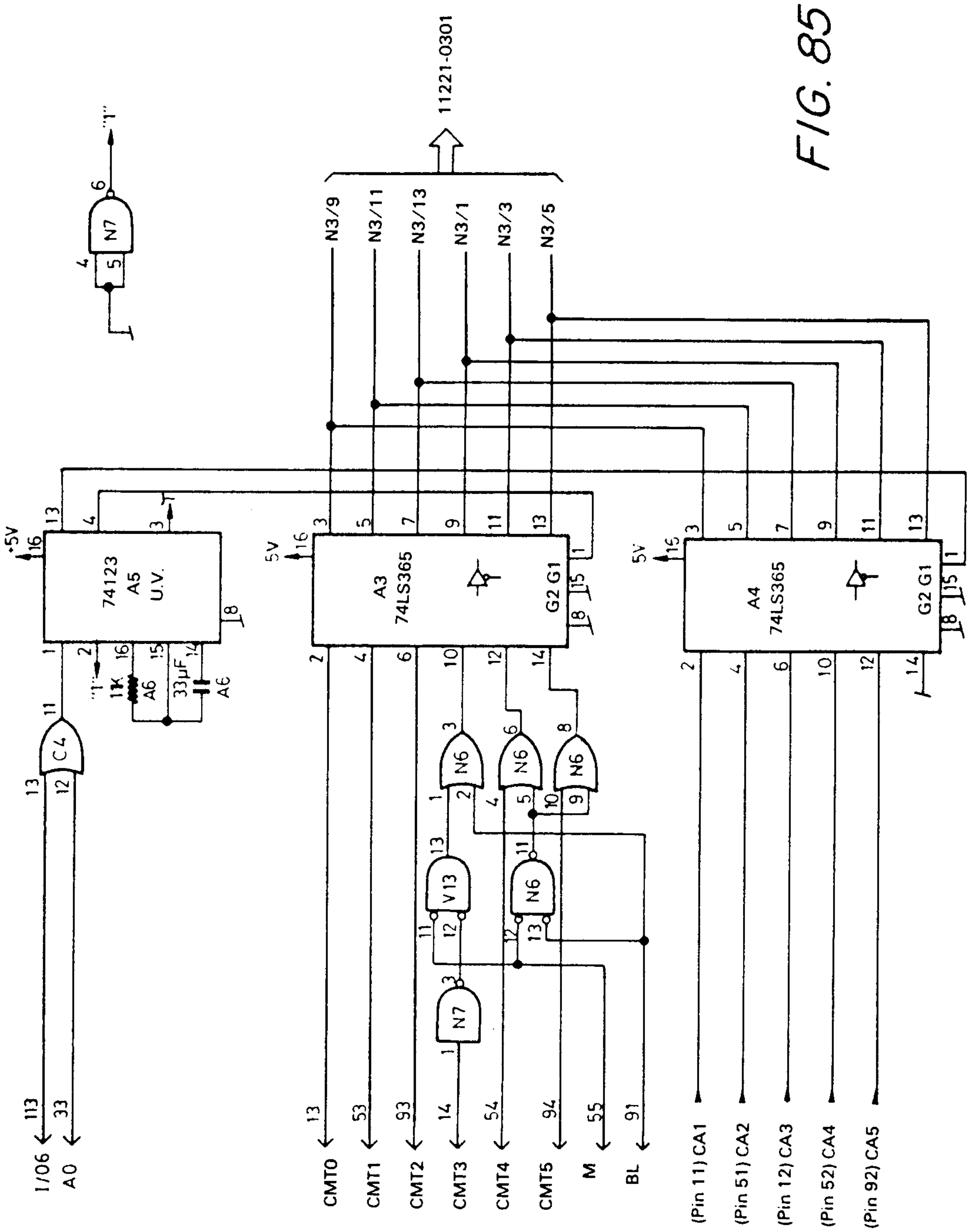
FIG. 85 is a schematic illustration of transmitter multiplexer circuitry.

FIG. 85 is a detailed schematic illustration of logic circuitry 350, referred to in FIG. 57.

Figure 86:
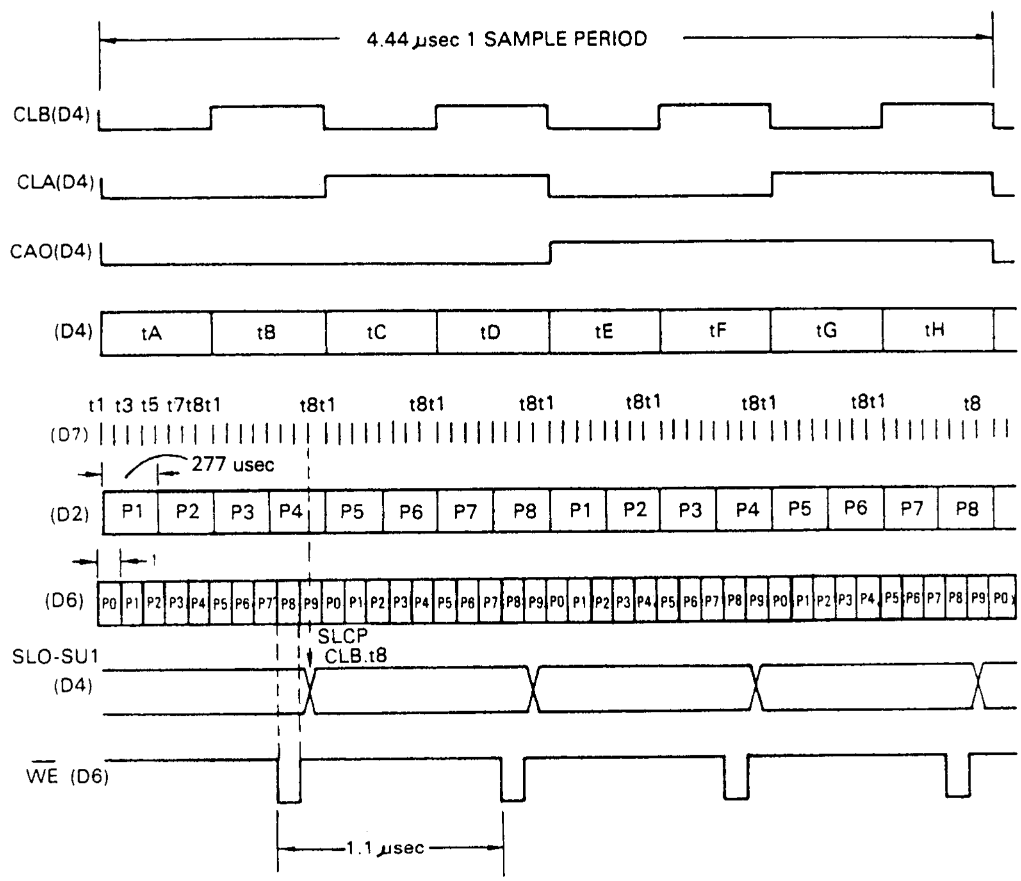
FIG. 86 is a timing diagram indicating the timing relations between the modem receiver and delay memory.

FIG. 86 is a timing diagram illustrating the timing interface between the receiver modem circuitry illustrated in FIG. 71 and the delay memory 1216 illustrated in FIGS. 72 and 75.

Figure 87:
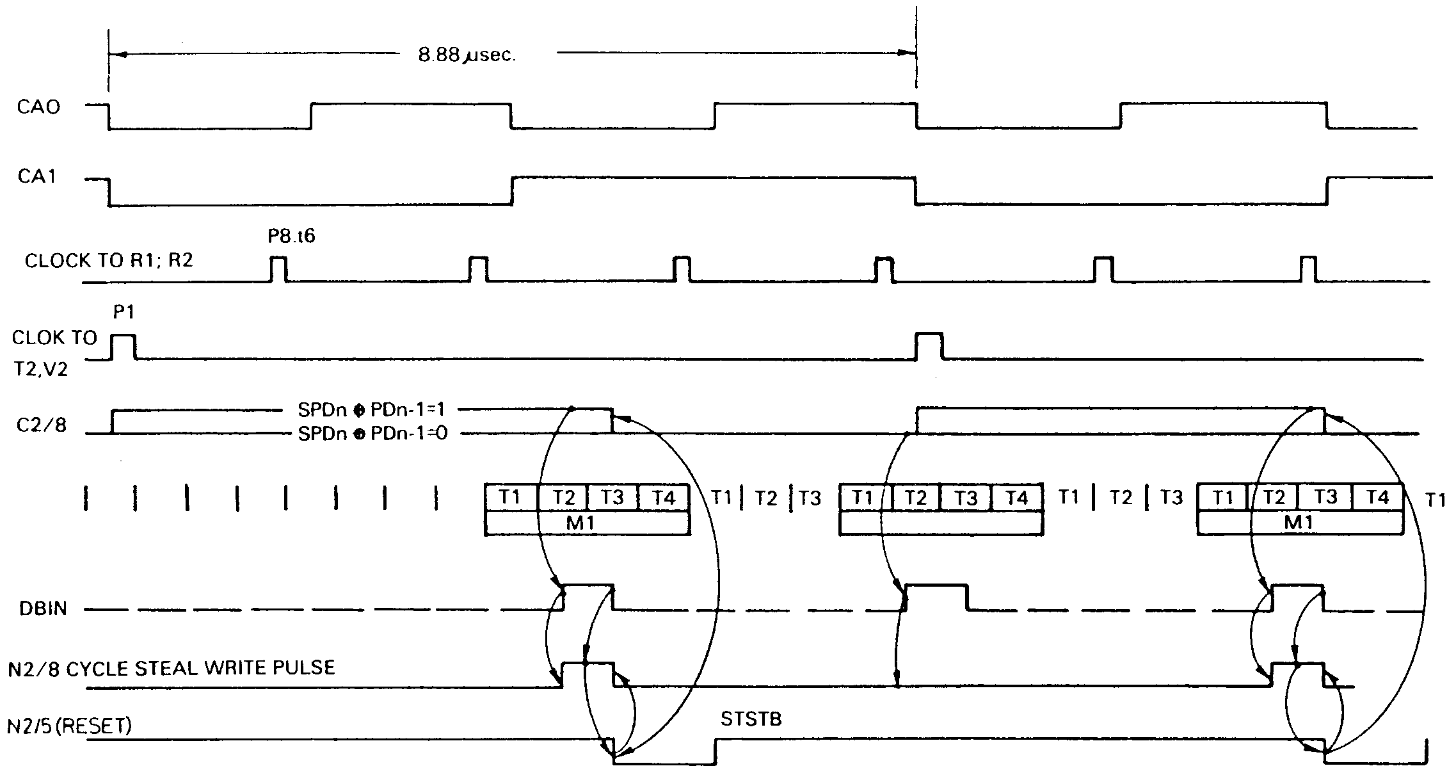
FIG. 87 is a timing diagram illustrating the CPU cycle steal operation.

FIG. 87 is a timing diagram of the CPU Cycle Steal operation of the interface circuitry illustrated in FIG. 61.

Figure 88:
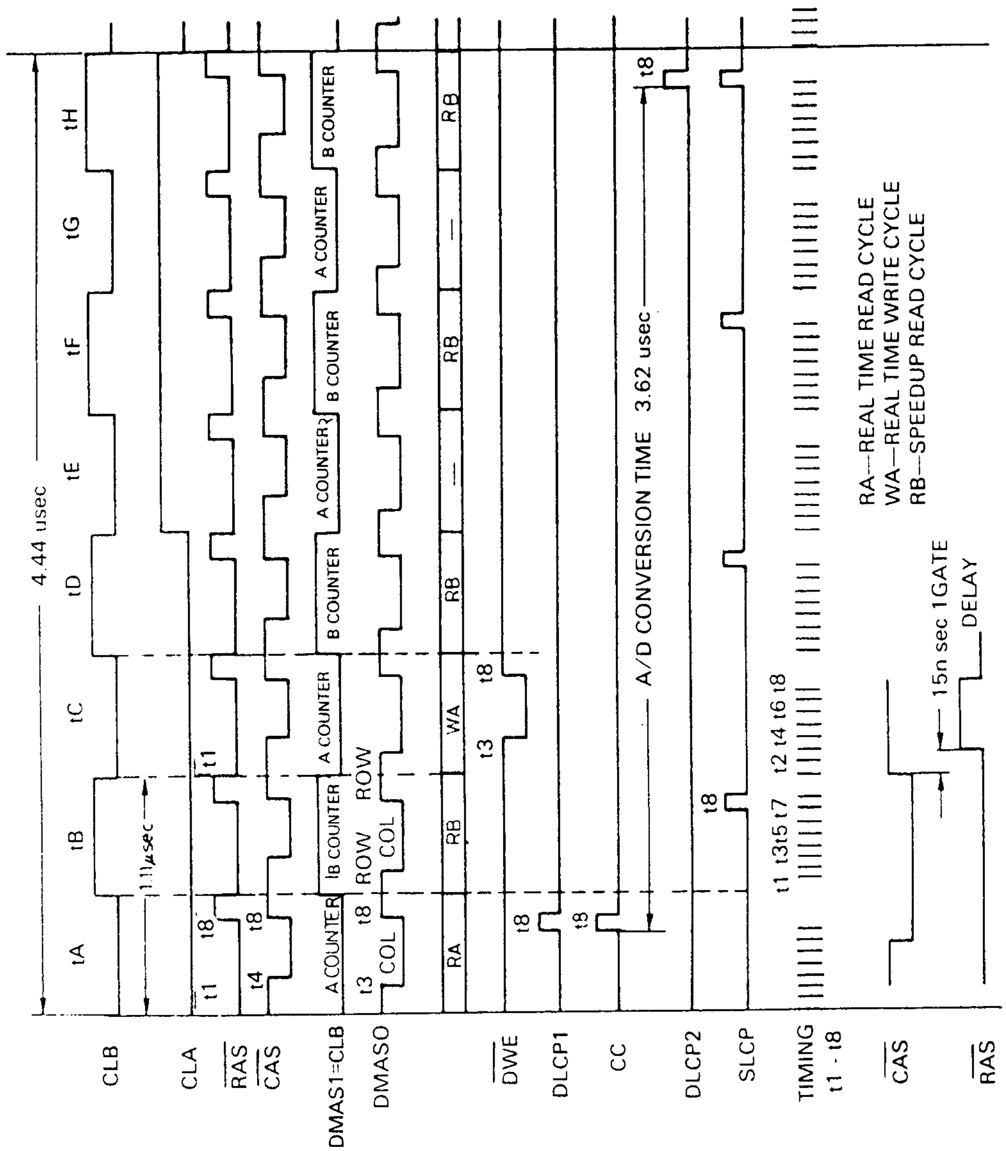
FIGS. 88 & 89(*a* & *b*) are timing diagrams of the operation of the delay memory and the control memory.

FIG. 88 is a timing diagram of the operation of delay memory 1216.

Figure 89A:
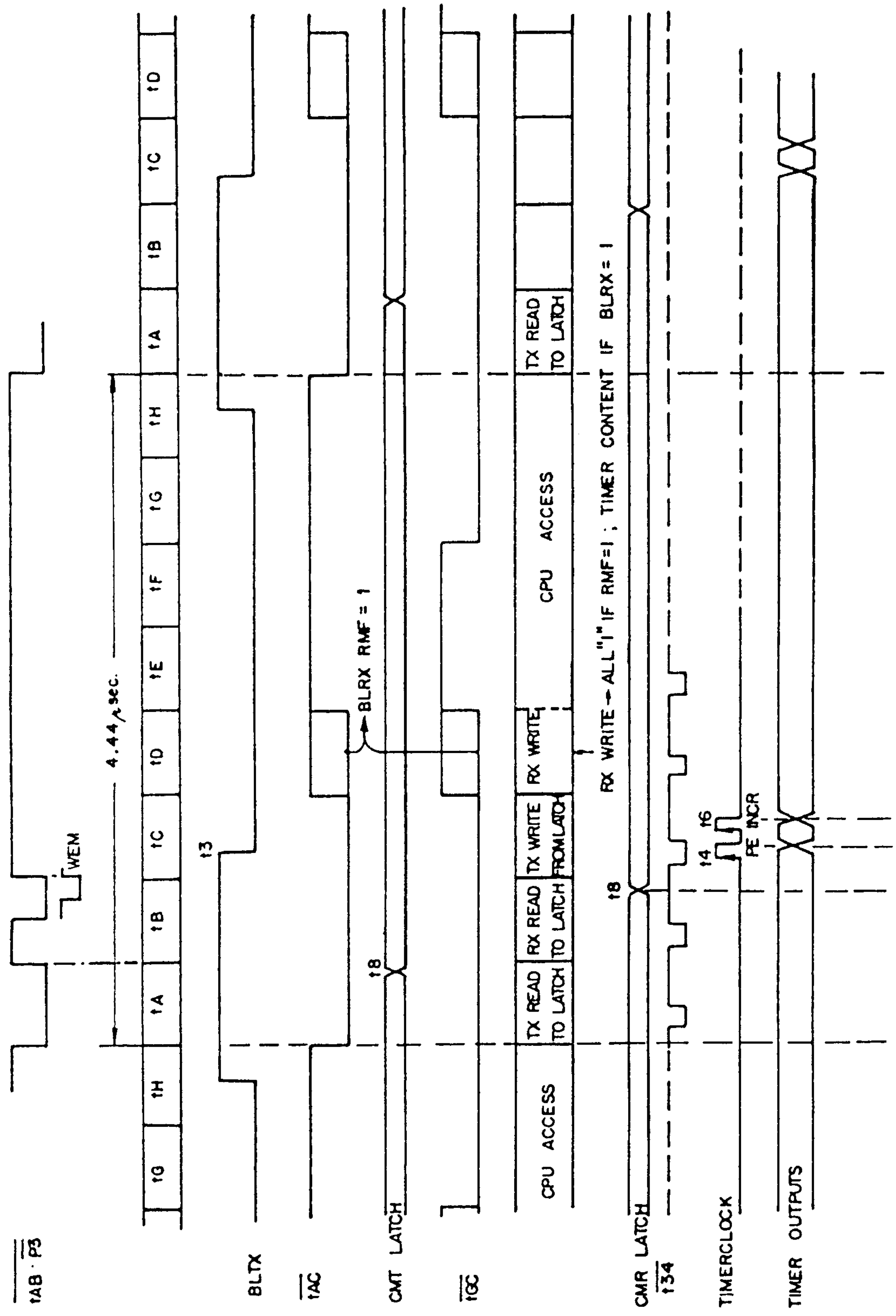
Figure 89B:
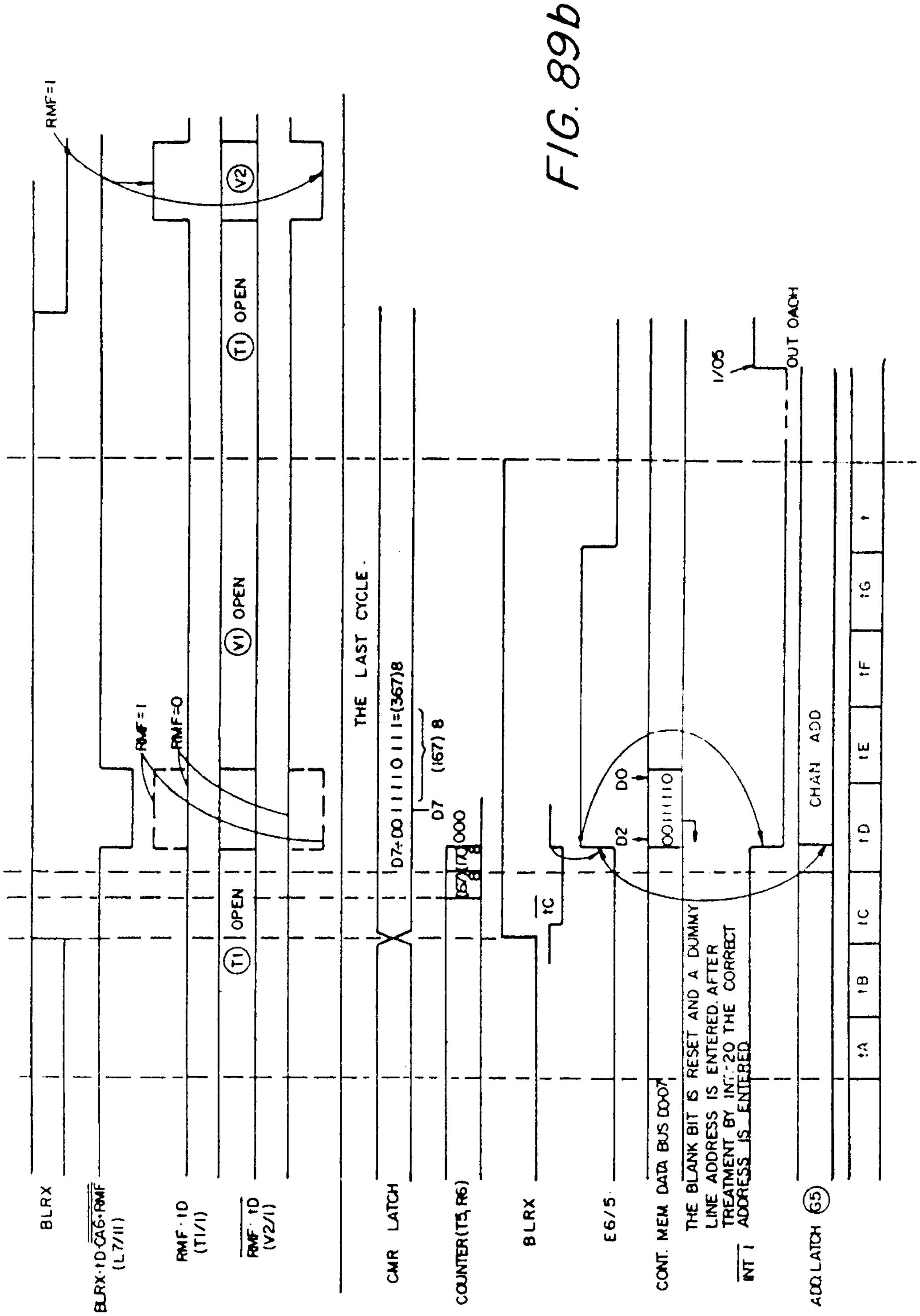

FIG. 89 is a timing diagram illustrating operation of the Control Memory.

Figure 90A:
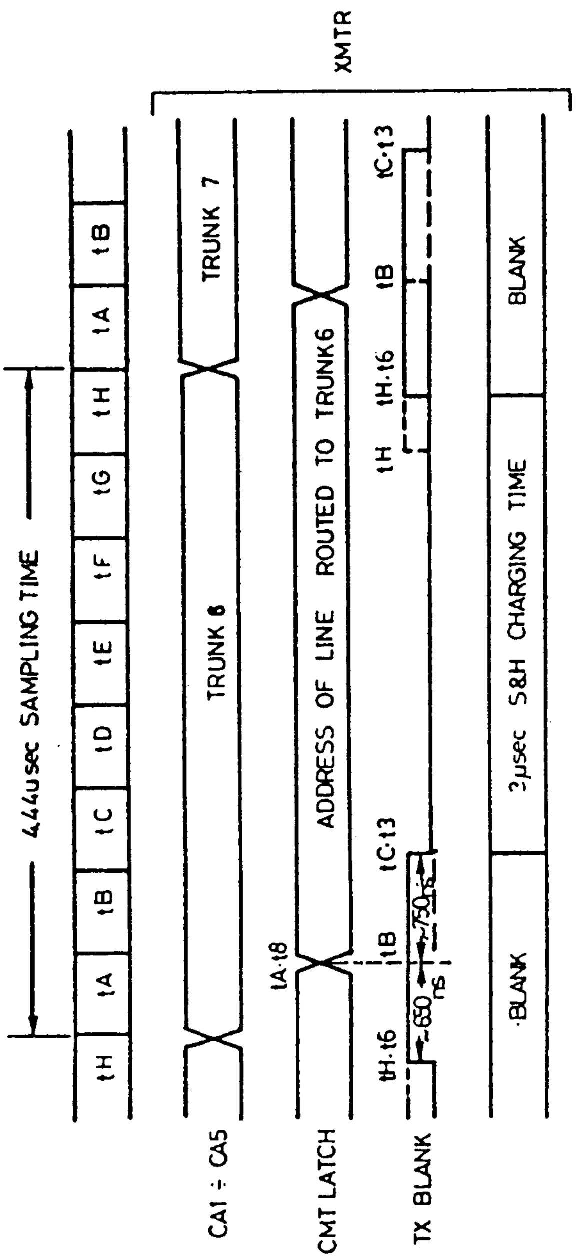
FIG. 90(*a* & *b*) is an overall system timing diagram.
Figure 90B:
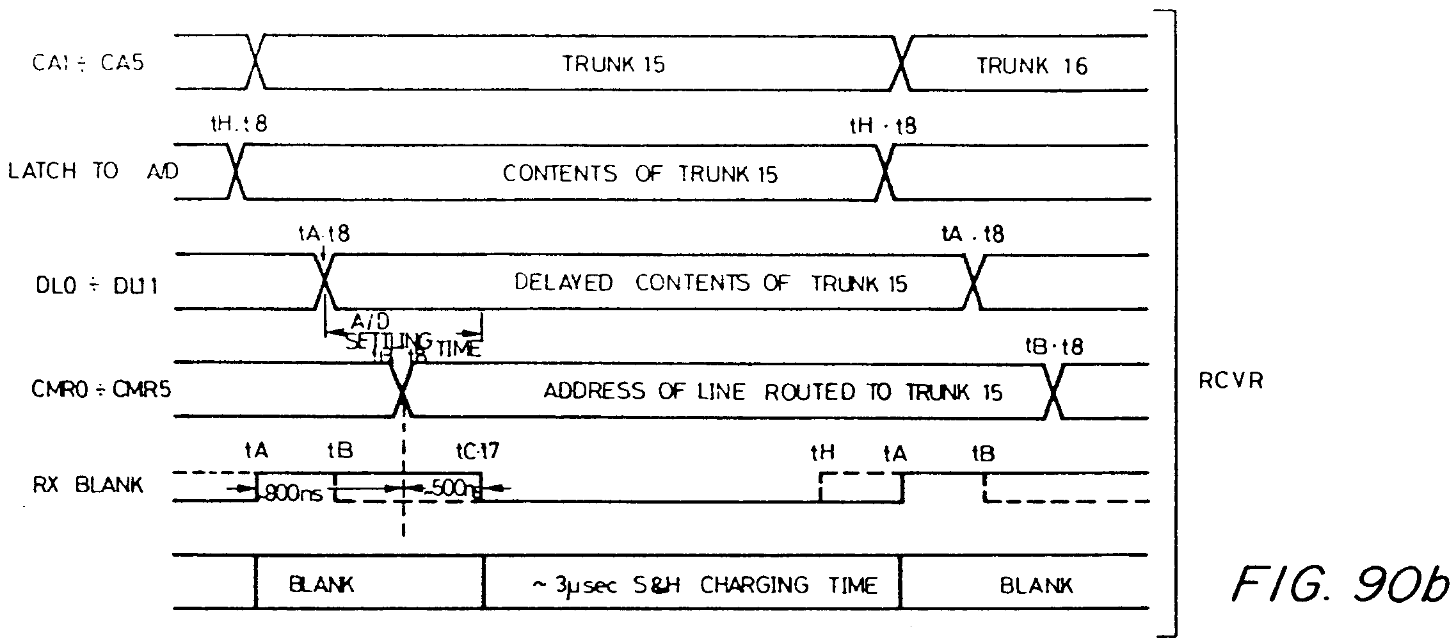

FIG. 90 is a timing diagram of system operation.

It is an additional feature of the circuitry described herein that in the event that due to long term conversations messages are not sent for a relatively long period of time, a message whose purpose is to maintain synchronization between the TASI installations on the opposite ends of the communication channels is transmitted.

It will be appreciated by persons skilled in the art that the apparatus and the operation thereof described hereinabove represents a preferred embodiment of the invention and is described herein solely for the purpose of explanation and illustration. The invention is not limited to what has been specifically shown and described above and may be embodied in any other suitable circuitry within the scope of the present invention.

For the purposes of clarity, the same reference numerals have been used to indicate identical components in more than one drawing. Where components have not been identified with particularity, they are conventional TTL components suitable for the indicated application.

The invention is defined only by the claims which follow.

We claim:

1. A time assignment speech interpolation communication system for interconnecting a transmission trunk link having a plurality of communication channels to a second plurality of telephone communication lines, the second plurality exceeding the first plurality, and comprising:

transmission apparatus at a first end of the transmission trunk link including first input/out means comprising A-D conversion means operative to translate signals received along at least one of said second plurality of communications lines into digital form, digital means for detecting signals on said second plurality of telephone communication lines, and means for assigning each telephone communication line on which signals are present to an available one of the first plurality of communication channels, and second input/output means comprising D-A conversion means operative to translate said signals in digital form for transmission along at least one of said first plurality of communication channels into analog form;

receiving apparatus at a second end of the transmission link including third input/output means comprising A-D conversion means operative to translate signals received along at least one of said first plurality of communication channels into digital form, means for assigning each of the first plurality of communication channels carrying signals to a corresponding one of said second plurality of communication lines in accordance with assignment information received from said transmission apparatus, and fourth input/output means comprising D-A conversion means operative to translate signals in digital form into analog form for transmission along at least one of said second plurality of communication lines, at least one of said first, second, third and fourth input/output means including direct digital input/output means operative to permit direct digital communication with at least one of said first plurality of communication channels and said second plurality of communication lines;

apparatus for communicating messages including assignment information between said transmission apparatus and said receiving apparatus;

said transmission apparatus, receiving apparatus and message communicating apparatus being operative for selectable analog and digital speech signal transmissions along said transmission trunk link.

2. A system according to claim 1 and wherein said apparatus for communicating messages is operative for communicating assignment information along said first plurality of communication channels.

3. A system according to claim 1 and wherein said apparatus for communicating messages also comprises means for transmitting message information in addition to said assignment information.

4. A system according to claim 3 and wherein said message information comprises audio assignment information, assignment information receipt acknowledge signals and signalling assignment information.

5. A system according to claim 4 and wherein said message information also comprises synchronization messages and idle messages.

6. A system according to claim 3 and wherein said message comprises an error check portion, a synchronization portion and an identification portion.

7. A system according to claim 1 and also comprising means for time assignment speech interpolation of out of band signalling information.

8. A system according to claim 1 and wherein said transmission apparatus comprises first timing means and said receiving circuitry comprises second timing means independent of said first timing means, so as to enable operation of said system with communication channels and lines whose transmission and receiving timing differs in phase.

9. A system according to claim 1 and wherein said message communicating apparatus comprises synchronization means which enable it to synchronize itself with the timing of received messages.

10. A system according to claim 1 and also comprising means for disconnecting communication channels from the system in response to sensed malfunction of said communication channels.

11. Apparatus according to claim 10 and also comprising means for sensing malfunction of communication channels in response to failure to receive an acknowledge signal therealong.

12. Apparatus according to claim 1 and wherein said second plurality is at least twice as large as said first plurality.

13. Apparatus according to claim 1 and wherein said apparatus for communicating messages includes means for synthesizing digital samples representing analog waveforms corresponding to assignment information for transmission in serial data form.

14. A time assignment speech interpolation communication system for interconnecting a transmission trunk link defining first and second ends and having a plurality of analog communication channels with a defined signal transmission frequency band to a second plurality of telephone communication lines at both said first and second ends of said trunk link, the second plurality exceeding the first plurality;

said system being operative to transmit signals appearing on said second plurality of telephone communication lines at said first end of said transmission trunk link over substantially the entire said defined signal transmission frequency band to said second plurality of telephone communication lines at said second end of said transmission trunk link, and comprising:

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus; and apparatus for communicating messages including assignment information between said transmission apparatus and said receiving apparatus in said signal transmission band in serial data form;

and wherein said transmission apparatus also includes switching means for switching said messages including assignment information which are communicated in serial data form and said signals received along said second plurality of telephone communication lines onto said first plurality of communications channels.

15. A system according to claim 14 and wherein said apparatus for communicating messages comprises means for transmitting an acknowledge signal which forms part of said messages and whose receipt indicates receipt of said assignment information.

16. A system according to claim 14 and wherein said apparatus for communicating messages also comprises means for transmitting message information in addition to said assignment information.

17. A system according to claim 14 and wherein said message communicating apparatus comprises synchronization means which enable it to synchronize itself with the timing of received messages.

18. A system according to claim 14, and wherein said detecting means comprise echo suppression circuitry including means for increasing the speech detection threshold on the telephone communication lines selectably in accordance with the received signal level on said telephone communication lines.

19. A system according to claim 14 and also comprising means for disconnecting communication channels from the system in response to sensed malfunction of said communication channels.

20. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band in serial data form along said first plurality of communication channels, serial data bits containing messages being distinguished from serial data bits containing speech by means of coded identifying portions inserted by said transmission apparatus and decoded by said receiving apparatus; and means for time assignment speech interpolation of out of band signalling information.

21. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band in serial data form along said first plurality of communication channels, serial data bits containing messages being distinguished from serial data bits containing speech by means of coded identifying portions inserted by said transmission apparatus and decoded by said receiving apparatus; and said detecting means comprise echo suppression circuitry including means for increasing the speech detection threshold on the telephone communication lines selectably in accordance with the received signal level on said telephone communication lines, and wherein the ratio between the absolute increase in speech detection threshold and the increase in the received signal level is determined by the transhybrid loss characteristic of the telephone communication lines.

22. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band in serial data form along said first plurality of communication channels, serial data bits containing messages being distinguished from serial data bits containing speech by means of coded identifying portions inserted by said transmission apparatus and decoded by said receiving apparatus; and means for sensing malfunction of communication channels in response to failure to receive an acknowledge signal therealong.

23. A time assignment speech interpolation communication system for interconnecting a transmission trunk link having a first plurality of communication channels to a second plurality of telephone communication lines, the second plurality exceeding the first plurality, each of said second plurality of telephone communication lines comprising separate voice transmission means and signalling transmission means and each of the first plurality of communication channels comprising separate trunk voice transmission means and trunk signalling transmission means, apparatus for carrying out time assignment interpolation of signalling information carried on said signalling transmission means comprising:

first signalling detection means coupled to said signalling transmission means;

first switching means operated by said signalling detection means for selectively connecting signalling transmission means to available trunk signalling transmission means;

second switching means coupled to said trunk signalling transmission means for connecting said trunk signalling transmission means carrying signalling information to signalling transmission means of telephone communication lines at a remote location in accordance with received assignment information; and means for providing signalling assignment information from said first switching means to said second switching means;

and wherein said means for providing assignment information comprises transmission apparatus located at a first end of said transmission trunk link and operative for transmitting signalling assignment information over said voice transmission means of said first plurality of communication channels.

24. Apparatus according to claim 23 and wherein said transmission apparatus is operative for transmitting voice assignment information over the voice transmission means of the same one of said first plurality of communication channels on which the signalling assignment occurs.

25. Apparatus according to either claim 23 or 24 and also comprising second signalling detection means coupled to said trunk signalling transmission means for providing an output indication of receipt of signalling information at said second switching means.

26. Apparatus according to either claim 23 or claim 24 and also comprising delay means coupled to said signalling transmission means and operative to delay signalling information carried thereon until said second switching means is operative to complete a connection therefor.

27. Apparatus according to claim 23 and also comprising means for transmitting signalling acknowledge messages in response to received signalling assignment information and to the receipt of signalling information and means for disconnecting the signalling transmission means in respect of which an acknowledge message is not received.

28. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band along said first plurality of communication channels in serial data form along said first plurality of communication channels, said apparatus for communicating messages including means for synthesizing digital samples for transmission, said samples representing analog waveforms corresponding to assignment information; and means for time assignment speech interpolation of out of band signalling information.

29. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the first plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band along said first plurality of communication channels in serial data form along said first plurality of communication channels, said apparatus for communicating messages including means for synthesizing digital samples for transmission, said samples representing analog waveforms corresponding to assignment information; and wherein said detecting means comprise echo suppression circuitry including means for increasing the speech detection threshold on the telephone communication lines selectably in accordance with the received signal level on said telephone communication lines, and wherein the ratio between the absolute increase in speech detection threshold and the increase in the received signal level is determined by the transhybrid loss characteristic of the telephone communication lines.

30. A time assignment speech interpolation communication system for interconnecting a transmission trunk link having a plurality of analog communication channels with a defined signal transmission frequency band to a second plurality of telephone communication lines, the second plurality exceeding the first plurality and comprising;

transmission apparatus at a first end of the transmission trunk link including means for detecting signals on said second plurality of telephone communication lines and means for assigning each telephone communication line on which signals are present to an available one of the first plurality of communication channels;

receiving apparatus at a second end of the transmission link including means for assigning each of the plurality of communication channels carrying signals to a corresponding one of said second plurality of telephone communication lines in accordance with assignment information received from said transmission apparatus;

apparatus for communicating messages including assignment information between said transmission apparatus and said receiving apparatus in said signal transmission band along said first plurality of communication channels in serial data form along said first plurality of communication channels, said apparatus for communication messages including means for synthesizing digital samples for transmission, said samples representing analog waveforms corresponding to assignment information; and means for sensing malfunction of communication channels in response to failure to receive an acknowledge signal therealong.

31. Apparatus according to claim 14 and wherein said second plurality is at least twice as large as said first plurality.

* * * * *

UNITED STATES PATENT AND TRADEMARK OFFICE

CERTIFICATE OF CORRECTION

PATENT NO. : 4,523,309

DATED : June 11, 1985

INVENTOR(S) : PIASECKI et al.

It is certified that error appears in the above-identified patent and that said Letters Patent is hereby corrected as shown below:

[30] Foreign Application Priority Data

| | | |
|---|---|---|
| December 5, 1978 | Israel | 56127 |
| February 8, 1979 | Israel | 56624 |
| April 26, 1979 | Israel | 57146 |
| July 26, 1979 | Israel | 57903 |
| August 2, 1979 | Israel | 57965 |

Signed and Sealed this

*Eighteenth* Day of *February 1986*

[SEAL]

*Attest:*

DONALD J. QUIGG

*Attesting Officer* *Commissioner of Patents and Trademarks*